US011224237B2

(12) United States Patent
Ulmasov et al.

(10) Patent No.: US 11,224,237 B2
(45) Date of Patent: Jan. 18, 2022

(54) LOW FIBER PENNYCRESS MEAL, SEEDS, AND METHODS OF MAKING

(71) Applicants: COVERCRESS INC., St. Louis, MO (US); BOARD OF TRUSTEES OF ILLINOIS STATE UNIVERSITY, Normal, IL (US); REGENTS OF THE UNIVERSITY OF MINNESOTA, Minneapolis, MN (US)

(72) Inventors: Tim Ulmasov, St. Louis, MO (US); Cristine Handel, St. Louis, MO (US); Gary Hartnell, St. Peters, MO (US); John C. Sedbrook, Bloomington, IL (US); Michael David Marks, Roseville, MN (US); Ratan Chopra, St. Paul, MN (US); Maliheh Esfahanian, Bloomington, IL (US)

(73) Assignees: Covercress Inc., St. Louis, MO (US); Board of Trustees of Illinois State University, Normal, IL (US); Regents of the University of Minnesota, Minneapolis, MN (US)

( * ) Notice: Subject to any disclaimer, the term of this patent is extended or adjusted under 35 U.S.C. 154(b) by 113 days.

(21) Appl. No.: 16/893,636

(22) Filed: Jun. 5, 2020

(65) Prior Publication Data

US 2020/0296993 A1 Sep. 24, 2020

Related U.S. Application Data

(62) Division of application No. 16/131,633, filed on Sep. 14, 2018, now Pat. No. 10,709,151.

(60) Provisional application No. 62/559,122, filed on Sep. 15, 2017.

(51) Int. Cl.
*A23K 10/30* (2016.01)
*A23K 20/158* (2016.01)
*A01H 5/10* (2018.01)
*A01H 6/20* (2018.01)

(52) U.S. Cl.
CPC ............ *A23K 10/30* (2016.05); *A23K 20/158* (2016.05)

(58) Field of Classification Search
None
See application file for complete search history.

(56) References Cited

U.S. PATENT DOCUMENTS 4,933,166 A 6/1990 Shen et al.
7,268,276 B2 * 9/2007 Ruezinsky ........... C07K 14/415 426/630
7,960,612 B2 6/2011 Zhang et al.
10,266,575 B2 * 4/2019 Heard .................. C07K 14/415
2004/0045049 A1 3/2004 Zhang et al.
2006/0150283 A1 7/2006 Alexandrov et al.
2009/0138981 A1 5/2009 Repetti et al.
2016/0138034 A1 5/2016 Hancock et al.

FOREIGN PATENT DOCUMENTS

EP 312763 A1 4/1989
WO 2006010096 A2 1/2006
WO 20090148336 A1 12/2009
WO 2010002984 A1 1/2010
WO 2016055838 A1 4/2016

OTHER PUBLICATIONS

Alhotan et al., 2017, Poultry Science, 96:2281-2293.*
Badani et al, 2006, Genome, 49:1499-1509).*
Tsogtbaatar et al, 2015, Journal of Experimental Biology, 66:4267-4277.*
"AOAC Official Method 973.18 Fiber (Acid Detergent) and Lignin (H2SO4) in Animal Feed", AOAC International, 2000, downloaded from http://www.cankaowuzhi.com/document/guowai/AOAC973_18.pdf on Mar. 21, 2020.
Alhotan, RA, "Nutritive Value and the Maximum Inclusion Level of Pennycress Meal for Broiler Chickens", Poultry Science, Jan. 2017, pp. 2281-2293, vol. 96.
An et al., "Phylogeography of Thlaspi arvense (*Brassicacea*) in China Inferred from Chloroplast and Nuclear DNA Sequences and Ecological Niche Modeling", Int. J. Mol. Sci. 2015, pp. 13339-13355, vol. 16.
Appelhagen et al., "Transparent Testa1 Interacts with R2R3-MYB Factors and Affects Early and Late Steps of Flavonoid Biosynthesis in the Endothelium of *Arabidopsis thaliana* Seeds", The Plant Journal, 2011, pp. 406-419, vol. 67.
Appelhagen et al., "Update on Transparent Testa Mutants from *Arabidopsis thaliana*: Characterisation of New Alleles from an Isogenic Collection", Planta, 2014, pp. 955-970, vol. 240.
Badani et al., "Colocalization of a Partially Dominant Gene for Yellow Seed Colour with a Major QTL Influencing Acid Detergent Fibre (ADF) Content in Different Crosses of Oilseed Rape (*Brassica napus*)", Genome, 2006, pp. 1499-1509, vol. 49.
Baudry et al., "TT2, TT8, and TTG1 Synergistically Specify the Expression of BANYULS and Proanthocyanidin Biosynthesis in *Arabidopsis thaliana*", The Plant Journal, 2004, pp. 366-380, vol. 39.
Chen et al., "The Effect of Transparent Testa2 on Seed Fatty Acid Biosynthesis and Tolerance to Environmental Stresses during Young Seedling Establishment in *Arabidopsis*", Oct. 2012, pp. 1023-1036, vol. 160.
Chen et al., "Transparent Testa8 Inhibits Seed Fatty Acid Accumulation by Targeting Several Seed Development Regulators in *Arabidopsis*", Plant Physiology, Jun. 2014, pp. 905-916, vol. 165.

(Continued)

*Primary Examiner* — Jason Deveau Rosen
(74) *Attorney, Agent, or Firm* — McKee, Voorhees & Sease, PLC

(57) ABSTRACT

Pennycress seed, seed lots, and seed meal having reduced fiber content and improved suitability for use in producing animal feed are provided.

20 Claims, 6 Drawing Sheets

Specification includes a Sequence Listing.

(56) References Cited

OTHER PUBLICATIONS

Debeaujon et al., "The Transparent Testa12 Gene of *Arabidopsis* Encodes a Multidrug Secondary Transporter-like Protein Required for Flavonoid Sequestration in Vacuoles of the Seed Coat Endothelium", The Plant Cell, Apr. 2001, pp. 853-871, vol. 13.
Dehaan et al., "A Pipeline Strategy for Grain Crop Domestication", Crop Science, 2016, pp. 917-930, vol. 56.
Dorn et al., "A Draft Genome of Field Pennycress (Thlaspi arvense) Provides Tools for the Domestication of a New Winter Biofuel Crop", DNA Research, 2015, pp. 121-131, vol. 22, No. 2.
Evangelista et al.,"Extraction of Pennycress (*Thlaspi arvense* L.) Seed Oil by Full Pressing", Industrial Crops and Products, Dec. 2011, pp. 76-81, vol. 37.
Herbicide Safener Definition Downloaded from the National Agricultural Library of the US Department of Agriculture webiste https://agclass.nal.usda.gov/glossary.shtml on Mar. 25, 2020.
International Search Report and Written Opinion for PCT/US2018/051163 dated Jan. 4, 2019.
Jordan et al., "Sustainable Commercialization of New Crops for the Agricultural Bioeconomy", Elementa: Science of the Anthropocene, Jan. 8, 2016, Vo. 4, No. 81.
Kantar et al., "Perennial Grain and Oilseed Crops", Plant Biology, 2016, pp. 703-729, vol. 67.
Li et al., "A Large Insertion in bHLH Transcription Factor BrTT8 Resulting in Yellow Seed Coat in *Brassica rapa*", PLOS One, 2012, vol. 7, No. 9.
Li et al., "Transformation with TT8 and HB12 RNAi Constructs in Model Forage (*Medicago sativa*, Alfalfa) Affects Carbohydrate Structure and Metabolic Characteristics in Ruminant Livestock Systems", Journal of Agricultural and Food Chemistry, 2015, pp. 9590-9600, vol. 63.
Lian et al., "Silencing of BnTT1 Family Genes Affects Seed Flavonoid Biosynthesis and Alters Seed Fatty Acid Composition in *Brassica napus*", Plant Science, 2017, pp. 32-47, vol. 254.
National Institute of Food and Agriculture, "Advancing Field Pennycress as a New Oilseed Biodiesel Feedstock that Does Not Require New Land Commitments Annual Report", Accession No. 1004021, Retrieved from https://portal.nifa.usda.gov/web/crisprojectpages/1004021 on Nov. 26, 2018, 10 pages.
Nesi et al., "The *Arabidopsis* TT2 Gene Encodes an R2R3 MYB Domain Protein That Acts as a Key Determinant for Proanthocyanidin Accumulation in Developing Seeds", The Plant Cell, Sep. 2001, pp. 2099-2114, vol. 13.
Nesi et al., "The Transparent Testa16 Locus Encodes the *Arabidopsis* Bsister Mads Domain Protein and is Required for Proper Development and Pigmentation of the Seed Coat", The Plant Cell, Oct. 2002, pp. 2463-2479, vol. 14.
Nesi et al., "The TT8 Gene Encodes a Basic Helix-Loop-Helix Domain Protein Required for Expression of DFR and BAN Genes in *Arabidopsis siliques*", The Plant Cell, Oct. 2000, pp. 1863-1878, vol. 12.
Pourcel et al., "Transparent Testa10 Encodes a Laccase-Like Enzyme Involved in Oxidative Polymerization of Flavonoids in *Arabidopsis* Seed Coat", The Plant Cell, Nov. 2005, pp. 2966-2980, vol. 17.
Sagasser et al., "*A. thaliana* Transparent Testa 1 is Involved in Seed Coat Development and Defines the WIP Subfamily of Plant Zinc Finger Proteins", Genes and Development, Jan. 1, 2002, pp. 138-149, vol. 16, No. 1.
Sedbrook et al., "New Approaches to Facilitate Rapid Domestication of a Wild Plant to an Oilseed Crop: Example Pennycress (*Thlaspi arvense* L.)", Plant Science, 2014, pp. 122-132, vol. 227.
Selling et al., "Extraction of Proteins from Pennycress Seeds and Press Cake", Industrial Crops and Products, Apr. 2012, pp. 113-119, vol. 41.
Slominski et al., "Nutritive Value for Broilers of Meals Derived from Newly Developed Varieties of Yellow-Seeded Canola", Animal Feed Science and Technology, 1999, pp. 249-262, vol. 78.
Tsogtbaatar et al., "Metabolite Fingerprinting of Pennycress (*Thlaspi arvense* L.) Embryos to Assess Active Pathways During Oil Synthesis", Journal of Experimental Botany, 2015, pp. 4267-4277, vol. 66, No. 14.
United States Department of Agriculture, "Advancing Field Pennycress as a New Oilseed Biodiesel Feedstock that does not Require New Land Commitments Annual Progress Report", Accession No. 1004021, Date Submitted to NIFA Dec. 6, 2016, 9 pages.
United States Department of Agriculture, "Advancing Field Pennycress as a New Oilseed Biodiesel Feedstock that does not Require New Land Commitments Annual Progress Report", Accession No. 1004021, Date Submitted to NIFA Jan. 9, 2018, 7 pages.
United States Department of Agriculture, "Advancing Field Pennycress as a New Oilseed Biodiesel Feedstock that does not Require New Land Commitments Annual Progress Report", Accession No. 1004021, Date Submitted to NIFA Nov. 30, 2015, 7 pages.
Vaughn et al., "Biofumigant Compounds Released by Field Pennycress (*Thlaspi arvense*) Seedmeal", Journal of Chemical Ecology, 2005, pp. 167-177, vol. 31, No. 1.
Zhang et al., "Map-Based Cloning and Characterization of a Gene Controlling Hairiness and Seed Coat Color Traits in *Brassica rapa*", Plant Molecular Biology, 2009, pp. 553-563, vol. 69.
Chopra, et al., "Translational genomics using *Arabidopsis* as a model enables the characterization of pennycress genes through forward and reverse genetics", The Plant Journal, vol. 96, pp. 1093-1105, 2018.
European Patent Office, "Extended European Search Report", issued in connection to Application No. 18855603.9, 9 pages, dated May 19, 2021.
Hojilla-Evangelista et al., "Preparation, composition and functional properties of pennycress (*Thlaspi arvense* L.) seed protein isolates", Industrial Crops and Products, vol. 55, pp. 173-179, 2014.
Piotrowska et al., "Characteristic of yellow-seeded lines of winter oilseed rape", pp. 1-3, XP55801867, Dec. 1, 2003.

* cited by examiner

A.
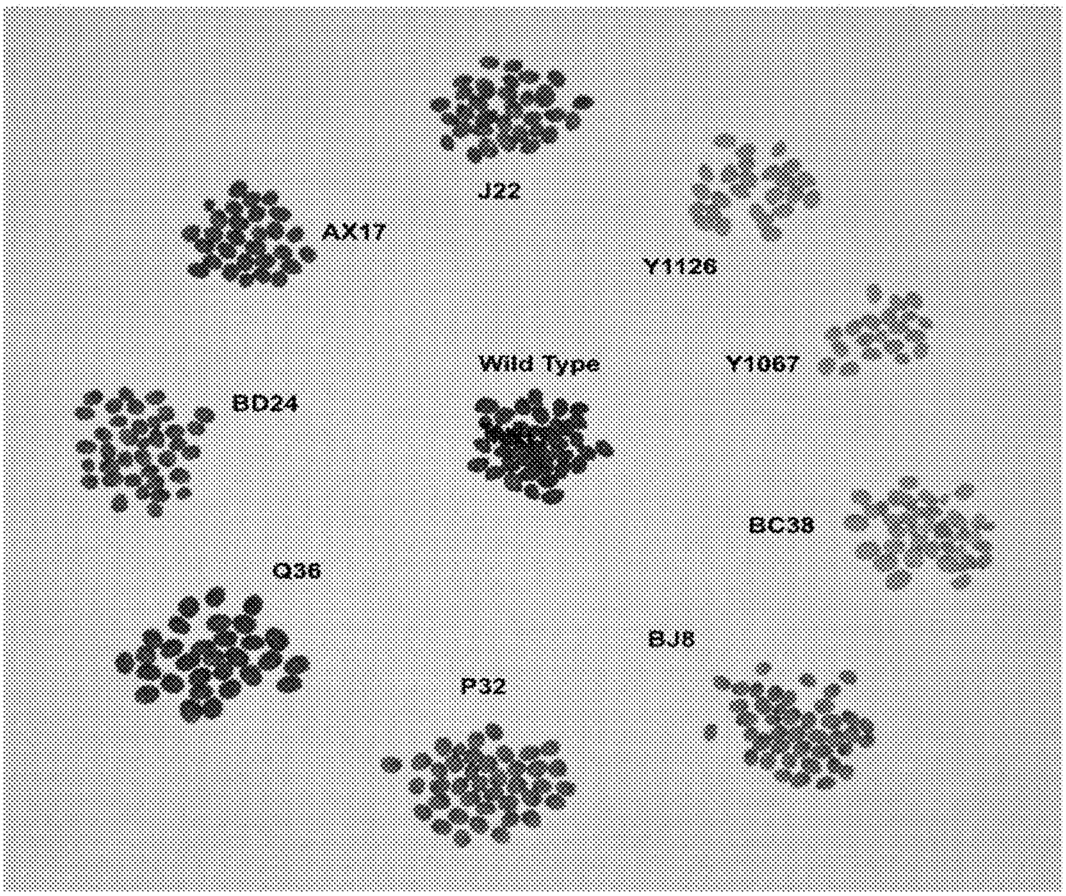
B.
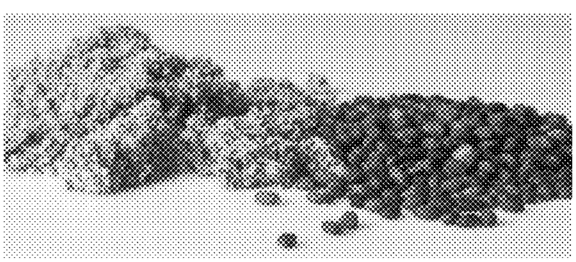
C.
FIGURE 1A, B, C

A.
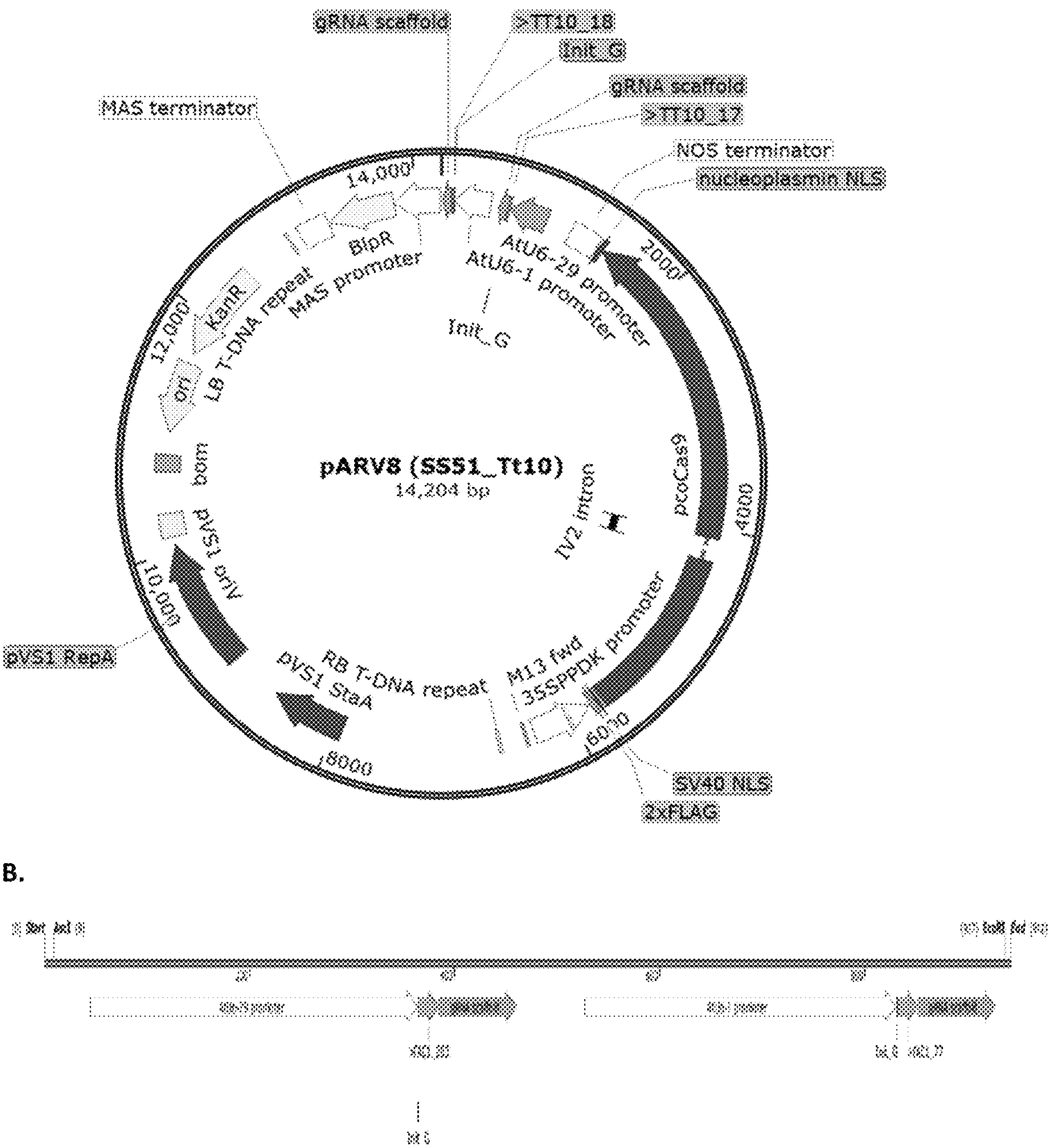
FIGURE 2A, B

FIGURE 4
pARV191_SmCsm1 Base Vector
14,137 bp
14,000
2000
4000
6000
8000
10,000
12,000
ori
bom site from pBR322
Kan
pVS1 oriV
pVS1 RepA
bom
Rep2
Rep_Origin_1
T-DNA LB
LB T-DNA repeat
AtU6-1 promoter
Poly-T Term
FnCpf1 stem-20
FnCpf1 Leader 20
FnCpf1 stem-20
FnCpf1 Leader 20
Intial G
pea 3A term
nucleoplasmin NLS
SmCsm1
3xFLAG
ATG
N-Term NLS
Ta_RPS5A_promoter
CMV Promoter
EGFP
NOS terminator
T-DNA RB
RB T-DNA repeat
pVS1 StaA

FIGURE 5A, B, C, D, E, F, G

LOW FIBER PENNYCRESS MEAL, SEEDS, AND METHODS OF MAKING

CROSS-REFERENCE TO RELATED APPLICATIONS

This is a Division of U.S. Non-Provisional patent application Ser. No. 16/131,633, filed Sep. 14, 2018, and incorporated herein by reference in its entirety, which claims the benefit of U.S. Provisional Patent Application Ser. No. 62/559,122, filed Sep. 15, 2017 and incorporated herein by reference in its entirety.

STATEMENT REGARDING FEDERAL FUNDING

This invention was made with government support under Grant Number 2014-67009-22305 and 2018-67009-27374 awarded by the National Institute of Food and Agriculture, USDA. The government has certain rights in the invention.

INCORPORATION OF SEQUENCE LISTING

The sequence listing contained in the file named "63612_179003_ST25.txt", which is 511,444 bytes in size (measured in operating system MS-Windows), contains 183 sequences, and which was created on Sep. 13, 2018, is contemporaneously filed with this specification by electronic submission (using United States Patent Office EFS-Web filing system) and is incorporated herein by reference in its entirety.

BACKGROUND

Different plants have seed contents that make them desirable for feed compositions. Examples are soybean, canola, rapeseed and sunflower. After crushing the seeds and recovering the oil, the resulting meal has a protein content making the meal useful as a feed ingredient for ruminants, monogastrics, poultry, and aquaculture. Nevertheless, there remains a desire for improved plant seeds that can provide additional sources of nutrition to animals.

Field Pennycress *Thlaspi arvense* L. (common names: fanweed, stinkweed, field pennycress), hereafter referred to as Pennycress or pennycress, is a winter cover crop that helps to protect soil from erosion, prevent the loss of farm-field nitrogen into water systems, and retain nutrients and residues to improve soil productivity. While it is well established that cover crops provide agronomic and ecological benefits to agriculture and environment, only 5% of farmers today are using them. One reason is economics—it requires on average ~$30-40/acre to grow a cover crop on the land that is otherwise idle between two seasons of cash crops such as corn and soy. In the last 5 years, it has been recognized that pennycress could be used as a novel cover crop, because in addition to providing cover crop benefits, it is an oilseed with its oil being useful as a biofuel. Extensive testing indicates that it can be interseeded over standing corn in early fall and harvested in spring prior to soybean planting (in appropriate climates). As such, its growth and development requires minimal incremental inputs (e.g., no/minimum tillage, no/low nitrogen, insecticides or herbicides). Pennycress also does not directly compete with existing crops when intercropped for energy production, and the recovered oil and meal can provide an additional source of income for farmers.

Pennycress is a winter annual belonging to the Brassicaceae (mustard) family. It's related to cultivated crops, rapeseed and canola, which are also members of the Brassicaceae family. Pennycress seeds are smaller than canola, but they are also high in oil content. They typically contain 36% oil, which is roughly twice the level found in soybean, and the oil has a very low saturated fat content (~4%). Pennycress represents a clear opportunity for sustainable optimization of agricultural systems. For example, in the US Midwest, ~35M acres that remain idle could be planted with pennycress after a corn crop is harvested and before the next soybean crop is planted. Pennycress can serve as an important winter cover crop working within the no/low-till corn and soybean rotation to guard against soil erosion and improve overall field soil nitrogen and pest management.

Pennycress has an oil content that makes it highly desirable as a biofuel, and potentially as a food oil. Once the oil is obtained from pennycress, either from mechanical expeller pressing or hexane extraction, the resulting meal has a high protein level with a favorable amino acid profile that could provide nutritional benefits to animals. However, studies of pennycress processing have consistently demonstrated that the meal produced has a high level of non-digestible fiber, and as a result, not enough metabolizable energy to be competitive with high-value products like soybean and canola meals as an animal feed.

SUMMARY

Compositions comprising non-defatted pennycress seed meal comprising an acid detergent fiber (ADF) content of 5% to 20% by dry weight are provided herein.

Compositions comprising defatted pennycress seed meal comprising an acid detergent fiber (ADF) content of 7% to 25% by dry weight are provided herein.

Pennycress seed meals comprising an acid detergent fiber (ADF) content of 5% to 20% by dry weight, wherein the seed meal is non-defatted, are provided herein.

Pennycress seed meals comprising an acid detergent fiber (ADF) content of 7% to 25% by dry weight, wherein the seed meal is defatted, are provided herein.

Pennycress seed cakes comprising an acid detergent fiber (ADF) content of 7% to 25% by dry weight are provided herein.

In one embodiment, this disclosure provides a low fiber pennycress meal composition.

Seed lots comprising a population of pennycress seeds that comprise an acid detergent fiber (ADF) content of 5% to 20% by dry weight are provided herein.

Methods of making non-defatted pennycress seed meal comprising an acid detergent fiber (ADF) content of 5% to 20% by dry weight, comprising the step of grinding, macerating, extruding, and/or crushing the aforementioned seed lots, thereby obtaining the non-defatted seed meal, are provided herein.

Methods of making defatted pennycress seed meal comprising an acid detergent fiber (ADF) content of 7% to 25% by dry weight, comprising the step of solvent extracting the, separating the extracted seed meal from the solvent, thereby obtaining the defatted seed meal, are provided herein.

Methods of making pennycress seed cake comprising an acid detergent fiber (ADF) content of 7% to 25% by dry weight, comprising the step of crushing or expelling the seed of any of the aforementioned seed lots, thereby obtaining a seed cake, are provided herein.

Methods of making a pennycress seed lot comprising the steps of: (a) introducing at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof; (b) selecting germplasm that is homozygous for said loss-of-function mutation; and, (c) harvesting seed from the homozygous germplasm, thereby obtaining a seed lot, wherein said seed lot comprises an acid detergent fiber (ADF) content of 5% to 20% by dry weight, are provided herein.

Method of making a pennycress seed lot comprising the steps of: (a) introducing at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof into a pennycress plant genome; (b) selecting a transgenic plant line that comprises said transgene and (c) harvesting seed from the transgenic plant line, thereby obtaining a seed lot, wherein said seed lot comprises an acid detergent fiber (ADF) content of 5% to 20% by dry weight, are provided herein.

In one embodiment, this disclosure provides a method for producing low fiber pennycress seeds and meal. The method comprises genetically modifying pennycress seed (e.g., using gene editing or transgenic approach) to modify expression of one or more genes involved in seed coat development. Genetically altered seed lots with improved composition, such as lower fiber content, increased oil content, and increased protein content, all in comparison to control seed lots that lack the genetic alteration can be obtained by these methods.

BRIEF DESCRIPTION OF THE DRAWINGS

The accompanying drawings, which are incorporated in and form a part of the specification, illustrate the embodiments of the present disclosure and together with the description, serve to explain the principles of the disclosure. In the drawings:

FIG. 1 A, B, C illustrate mutant pennycress seeds with varying seed color. Dark seeds in the center are representative of a wild-type genetic background. The seeds of two pennycress seed isolates (Y1126 and Y1067), along with 7 pennycress M3-generation EMS mutants in the Spring 32 background are shown. All mutant seeds exhibit light-colored seed coats compared to the dark color of typical wild-type pennycress seeds (wild-type Spring 32 seeds shown as an example). Examples of dark and light-colored seed and meal (non-defatted) are also shown. Panel A: Spectrum of seed coat color ranging from dark to light in wild type and mutant pennycress seeds. Panel B: Pennycress meal produced from wild type (Beecher). Panel C: Pennycress meal produced from one of the light-colored seed lines (Y1126).

FIG. 2A, B illustrates pARV8 (SS51_Tt10), *Agrobacterium* CRISPR-Cas9 vector and its gene editing sgRNA cassette, for targeting pennycress homolog of *Transparent testa* 10 (Tt10) gene. Panel A: Plasmid map of pARV8 (SS51_Tt10). Panel B: sgRNA cluster in pARV8, targeting nucleotides 341-360 and 382-401 of SEQ ID NO: 33.

FIG. 5A illustrates a gRNA cassette stuffer, designed for insertion into the AarI-digested plant genome editing vector (such as pARV187 or pARV191) for targeting pennycress Tt1 gene, nucleotides 59-81 and 307-329 of SEQ ID NO: 27; FIG. 5B: gRNA cassette stuffer for targeting pennycress Tt2 gene, nucleotides 177-199 and 240-262 of SEQ ID NO: 1; FIG. 5C: gRNA cassette stuffer for targeting pennycress Tt8 gene, nucleotides 261-283 and 153-175 of SEQ ID NO: 69; FIG. 5D: gRNA cassette stuffer for targeting pennycress Tt8 gene, nucleotides 145-167 and 274-296 of SEQ ID NO: 69; FIG. 5E: gRNA cassette stuffer for targeting pennycress Tt10 gene, nucleotides 304-326 and 415-437 of SEQ ID NO: 33; FIG. 5F: gRNA cassette stuffer for targeting pennycress Tt12 gene, nucleotides 399-421 and 450-472 of SEQ ID NO: 36; FIG. 5G: gRNA cassette stuffer for targeting pennycress Tt15 gene, nucleotides 255-277 and 281-303 of SEQ ID NO: 42.

DETAILED DESCRIPTION

Figure 3:
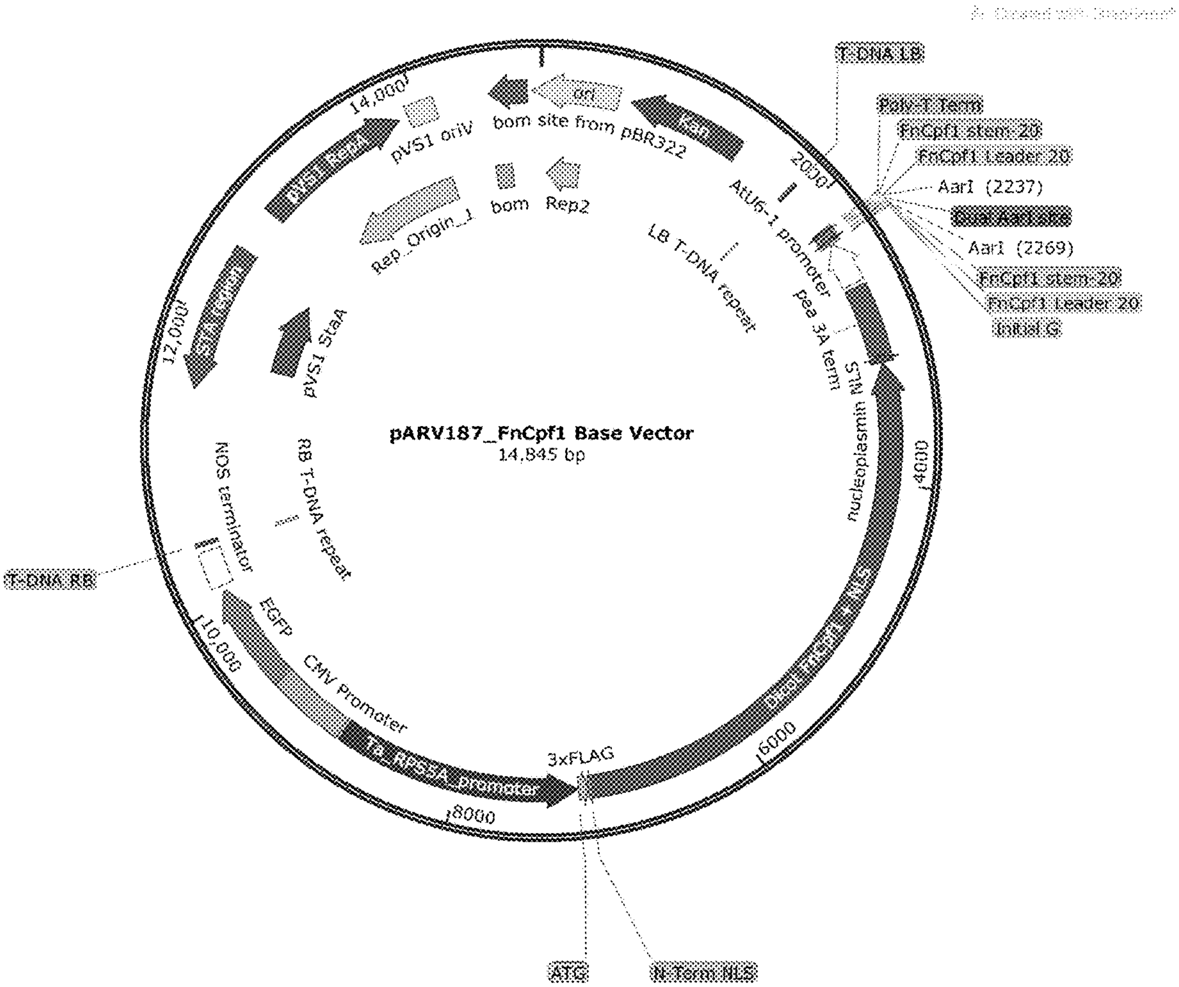
FIG. 3 illustrates pARV187, *Agrobacterium* CRISPR-FnCpf1 base vector for editing plant genome. gRNA cassette stuffers are inserted at the dual AarI site, replacing a small fragment of the vector with synthetic gRNA cassette.

The term "and/or" where used herein is to be taken as specific disclosure of each of the two specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the terms "include," "includes," and "including" are to be construed as at least having the features to which they refer while not excluding any additional unspecified features.

Where a term is provided in the singular, other embodiments described by the plural of that term are also provided.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

Pennycress has value in both its oil and the resulting meal following the removal of oil. The meal is used for animal feed and is typically valued for its energy, protein and sometimes fiber. Fiber is usually delivered by forage elements (not protein supplements) and only a modest amount is desired. Fiber is measured by multiple measures including Crude Fiber (CF), Acid detergent Fiber (ADF) and Neutral detergent fiber (NDF). ADF is a useful determinant in estimating the energy available to animals. In certain embodiments, ADF can be measured gravimetrically using Association of Official Analytical Chemists (AOAC) Official Method 973.18 (1996): "Fiber (Acid Detergent) and Lignin in Animal Feed". In certain embodiments, modifications of this method can include use of Sea Sand for filter aid as needed. NDF can be determined as disclosed in JAOAC 56, 1352-1356, 1973. In certain embodiments, fiber (ADF and/or NDF), protein, and/or oil content can be determined by Near-infrared (NIR) spectroscopy.

Defatted-pennycress seed meal having less fiber than defatted control pennycress seed meal obtained from wild type pennycress seed is provided herein. In certain embodiments, the ADF content of defatted pennycress seed meal and compositions comprising the same that are provided herein is reduced from about 1.25-, 1.5-, 2-, or 3-fold to about 4-, 5-, 6-, or 7-fold in comparison to control defatted pennycress seed meal and compositions comprising the same obtained from control wild-type pennycress seeds. Typically, the level of acid detergent fiber (ADF) in wild-type pennycress seed varies from about 25 to about 31% by dry weight. Defatted-pennycress meal is a product obtained from high-pressure crushing of seed, via mechanical pressing and/or expanding/extrusion, followed by a solvent extraction process, which removes oil from the whole seed. Solvents used in such extractions include, but are not limited to, hexane or mixed hexanes. The meal is the material that remains after most of the oil has been removed. During a typical oilseed processing procedure, extraction of the oil leads to concentration of fiber as a result of oil mass removal. The typical range of ADF in meal made from wild-type pennycress seed is 35-45%. To be useful as a high protein animal feed, and competitive with other protein feedstuffs, the level of ADF level in meal should be less than 20% by dry weight, less than 15% by dry weight, or less than 10% by dry weight of the meal. In certain embodiments, defatted pennycress seed meal having an ADF content of less than 25% by dry weight, less than 20% by dry weight, less than 15% by dry weight, less than 10% by dry weight, or less than 7% by dry weight of meal is provided herein. In certain embodiments, defatted pennycress seed meal having an ADF content of about 5%, 8%, or 10% to 15%, 18%, 20%, or 25% by dry weight is provided herein. Compositions comprising such defatted pennycress seed meal are also provided herein.

Non-defatted pennycress seed meal having less fiber than non-defatted control pennycress seed meal obtained from wild type pennycress seed is provided herein. In certain embodiments, the ADF content of non-defatted pennycress seed meal and compositions comprising the same that are provided herein is reduced from about 1.25-, 1.5-, 2-, or 3-fold to about 4-, 5-, 6-, or 7-fold in comparison to control non-defatted pennycress seed meal and compositions comprising the same obtained from control wild-type pennycress seeds. In certain embodiments, the non-defatted pennycress seed meal is obtained from pennycress seeds that have been crushed, ground, macerated, expelled, extruded, expanded, or any combination thereof. Typically, the level of acid detergent fiber (ADF) in wild-type pennycress seed and non-defatted seed meal obtained therefrom varies from about 20% to about 38% by dry weight. To be useful as a high protein animal feed, and competitive with other protein feedstuffs, the level of ADF level in non-defatted meal should be less than 20% by dry weight, less than 15% by dry weight, or less than 10% by dry weight of the meal. In certain embodiments, non-defatted pennycress seed meal having an ADF content of less than 20% by dry weight, less than 15% by dry weight, less than 10% by dry weight, or less than 7% by dry weight of the meal is provided herein. In certain embodiments, non-defatted pennycress seed meal having an ADF content of about 5%, 8%, or 10% to 15%, 18%, or 20% by dry weight is provided herein. Compositions comprising such non-defatted pennycress seed meal are also provided herein.

In certain embodiments, pennycress seed lots comprising a population of seed having reduced fiber content, reduced fiber content and increased protein content, reduced fiber content and increased oil content, or reduced fiber content and increased protein and oil content, all in comparison to fiber, protein, and oil content of the control seed lots of wild-type pennycress seed, are provided. In certain embodiments, the seed lots will comprise loss-of-function (LOF) mutations in one or more genes, coding sequences, and/or proteins that result in reduced fiber content, reduced fiber content and increased protein content, reduced fiber content and increased oil content, or reduced fiber content, increased protein, and increased oil content. Such LOF mutations include, but are not limited to, INDELS (insertions, deletions, and/or substitutions or any combination thereof), translocations, inversions, duplications, or any combination thereof in a promoter, a 5' untranslated region, coding region, an intron of a gene, and/or a 3' UTR of a gene. Such Indels can introduce one or more mutations including, but not limited to, frameshift mutations, missense mutations, pre-mature translation termination codons, splice donor and/or acceptor mutations, regulatory mutations, and the like that result in an LOF mutation. In certain embodiments, the LOF mutation will result in: (a) a reduction in the enzymatic or other biochemical activity associated with the encoded polypeptide in the plant comprising the LOF mutation in comparison to a wild-type control plant; or (b) both a reduction in the enzymatic or other biochemical activity and a reduction in the amount of a transcript (e.g., mRNA) in the plant comprising the LOF mutation in comparison to a wild-type control plant. Such reductions in activity or activity and transcript levels can, in certain embodiments, comprise a reduction of at least 50%, 60%, 70%, 75%, 80%, 85%, 90%, 95%, 98%, 99%, or 100% of activity or activity and transcript levels in the LOF mutant in comparison to the activity or transcript levels in a wild-type control plant. In certain embodiments, reductions in activity, specific activity, and/or transcript levels are provided by at least one LOF mutation in an endogenous wild-type pennycress gene, promoter, terminator, or protein set forth in Table 1. In certain embodiments, such aforementioned reductions in activity, specific activity and/or transcript levels are provided by at least one LOF mutation in an endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, allelic variants thereof, or any combination thereof. In certain embodiments, such aforementioned reductions in activity, specific activity, and/or transcript levels are provided by at least one LOF mutation in an endogenous wild-type pennycress gene, promoter, or terminator comprising a polynucleotide sequence selected from the group consisting of SEQ ID NO: 69, 71, 75, 77, 87, 88, allelic variants thereof, or any combination thereof. In certain embodiments, any of the aforementioned allelic variants of endogenous wild-type pennycress genes can have at least 80, at least 85, at least 90, at least 95, at least 98, or at least 99 percent sequence identity to SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, or 173. In certain embodiments, such aforementioned reductions in activity, specific activity, and/or transcript levels are provided by at least one LOF mutation in an endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, allelic variants thereof, or any combination thereof. In certain embodiments, such aforementioned reductions in activity or activity and transcript levels are provided by at least one LOF mutation in an endogenous wild-type pennycress gene encoding a polypeptide selected from the group consisting of SEQ ID NO: 70, 76, allelic variants thereof, or any combination thereof. In certain embodiments, an endogenous wild-type pennycress gene can encode a polypeptide allelic variant having at least 80, at least 85, at least 90, at least 95, at least 98, or at least 99 percent sequence identity to SEQ ID NO:2, 7, 10, 13, 16, 19, 22, 25, 28, 31, 34, 37, 40, 43, 46, 49, 52, 55, 58, 61, 64, 67, 70, 73, 76, 79, or 172. In certain embodiments, an endogenous wild-type pennycress gene can encode a polypeptide allelic variant having one or more (e.g., 2, 3, 4, 5, 6, 7, 8, 9, or 10) amino acid modifications (e.g., substitutions) relative to SEQ ID NO:2, 7, 10, 13, 16, 19, 22, 25, 28, 31, 34, 37, 40, 43, 46, 49, 52, 55, 58, 61, 64, 67, 70, 73, 76, 79, or 172. In certain embodiments, the seed lots will comprise one or more transgenes that suppress expression of one or more genes, coding sequences, and/or proteins, thus resulting in reduced fiber content, reduced fiber content and increased protein content, reduced fiber content and increased oil content, or reduced fiber content, increased protein content, and increased oil content, all in comparison to control or wild-type pennycress seed lots. Transgenes that can provide for such suppression include, but are not limited to, transgenes that produce artificial miRNAs targeting a given gene or gene transcript for suppression. In certain embodiments, the transgenes that suppress expression will result in: (a) a reduction in the enzymatic or other biochemical activity associated with the encoded polypeptide in the plant comprising the transgene in comparison to a wild-type control plant; or (b) both a reduction in the enzymatic or other biochemical activity and a reduction in the amount of a transcript (e.g., mRNA) in the plant comprising the transgene in comparison to a wild-type control plant. Such reductions in activity and transcript levels can in certain embodiments comprise a reduction of at least 50%, 60%, 70%, 75%, 80%, 85%, 90%, 95%, 98%, 99%, or 100% of activity and/or transcript levels in the transgenic plant in comparison to the activity or transcript levels in a wild-type control plant. In certain embodiments, certain genes, coding sequences, and/or proteins that can be targeted for introduction of LOF mutations or that are targeted for transgene-mediated suppression are provided in the following Table 1 and accompanying Sequence Listing. In certain embodiments, allelic variants of the wild-type genes, coding sequences, and/or proteins provided in Table 1 and the sequence listing are targeted for introduction of LOF mutations or are targeted for transgene-mediated suppression. Allelic variants found in distinct pennycress isolates or varieties that exhibit wild-type seed fiber, protein, and or oil content can be targeted for introduction of LOF mutations or are targeted for transgene-mediated suppression to obtain seed lots having reduced fiber content, reduced fiber content and increased protein content, reduced fiber content and increased oil content, or reduced fiber content, increased protein, and increased oil content, all in comparison to fiber, protein, and oil content of the control seed lots of wild-type pennycress. Such allelic variants can comprise polynucleotide sequences that have at least 80%, 85%, 90%, 95%, 96%, 97%, 98%, or 99% sequence identity across the entire length of the polynucleotide sequences of the wild-type coding regions or wild-type genes of Table 1 and the sequence listing. Such allelic variants can comprise polypeptide sequences that have at least 80%, 85%, 90%, 95%, 96%, 97%, 98%, or 99% sequence identity across the entire length of the polypeptide sequences of the wild-type proteins of Table 1 and the sequence listing. Pennycress seed lots having reduced seed coat fiber, lighter-colored seed coat due to reduced proanthocyanidins content, increased protein content, and/or higher seed oil content as described herein can comprise one or more LOF mutations in one or more genes that encode polypeptides involved in seed coat and embryo formation or can comprise transgenes that suppress expression of those genes. Polypeptides affecting these traits include, without limitation, *TRANSPARENT TESTA*1 (TT1) through *TRANSPARENT TESTA*19 (TT19) (e.g., TT1, TT2, TT3, TT4, TT5, TT6, TT7, TT8, TT9, TT10, TT12, TT13, TT15, TT16, TT18, and TT19), *TRANSPARENT TESTA* GLABRA1 and 2 (TTG1 and TTG2), GLABROUS 2 (GL2), GLABROUS 3 (GL3), ANR-BAN, and AUTOINHIBITED H+-ATPASE 10 (AHA10) disclosed in Table 1. In certain embodiments, pennycress seed lots provided herein can comprise LOF mutations in any of the aforementioned wild-type pennycress genes disclosed in Table 1 or any combination of mutations disclosed in Table 1. Compositions comprising defatted or non-defatted seed meal obtained from any of the aforementioned seed lots, defatted or non-defatted seed meal obtained from any of the aforementioned seed lots, and seed cakes obtained from any of the aforementioned seed lots are also provided herein. Methods of making any of the aforementioned seed lots, compositions, seed meals, or seed cakes are also provided herein. As used herein, the phrase “seed cake” refers to the material obtained after the seeds are crushed, ground, heated, and expeller pressed or extruded/expanded prior to solvent extraction.

In certain embodiments, reductions or increases in various features of seed lots, seed meal compositions, seed meal, or seed cake are in comparison to a control or wild-type seed lots, seed meal compositions, seed meal, or seed cake. Such controls include, but are not limited to, seed lots, seed meal compositions, seed meal, or seed cake obtained from control plants that lack the LOF mutations or transgene-mediated gene suppression. In certain embodiments, control plants that lack the LOF mutations or transgene-mediated gene suppression will be otherwise isogenic to the plants that contain the LOF mutations or transgene-mediated gene suppression.

In certain embodiments, the controls will comprise seed lots, seed meal compositions, seed meal, or seed cake obtained from plants that lack the LOF mutations or transgene-mediated gene suppression and that were grown in parallel with the plants having the LOF mutations or transgene-mediated gene suppression. Such features that can be compared to wild-type or control plants include, but are not limited to, ADF content, NDF fiber content, protein content, oil content, protein activity and/or transcript levels, and the like.

TABLE 1

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 1 | TT2 CDS | WT Coding region | R2R3 MYB domain transcription factor, a key determinant in proanthocyanidin accumulation | MYB123, TRANSPARENT TESTA 2 (TT2) |
| 2 | TT2 ORF | WT Protein | | |
| 3 | TT2 Ta locus | WT Gene | | |
| 4 | TT2 CDS-Mut | Mutant Coding region | Modified TT2 gene isolated from an EMS-mutagenized population, GAACCATTG**G**AACTCAAAC (nt 321-339 of SEQ ID NO: 1) → GAACCATTG**A**AACTCAAAC (nt 321-339 of SEQ ID NO: 4) | tt2-1, tt2-2, BC38, E5-547 |
| 5 | TT2 Mut P1 | Mutant Protein | Truncated protein, due to Trp (W) codon -> Stop mutation | |
| 6 | ATS-KAN4 CDS | WT Coding region | Member of the KANADI family of transcription factors, involved in integument formation during ovule development and expressed at the boundary between the inner and outer integuments. Essential for directing laminar growth of the inner integument | ABERRANT TESTA SHAPE, ATS, KAN4, KANADI 4 |
| 7 | ATS-KAN4 ORF | WT Protein | | |
| 8 | ATS-KAN4 Ta locus | WT Gene | | |
| 9 | BAN-ANR CDS | WT Coding region | Negative regulator of flavonoid biosynthesis, putative oxidoreductase. Mutants accumulate flavonoid pigments in seed coat. Putative ternary complex composed of TT2, TT8 and TTG1 is believed to be required for correct expression of BAN in seed endothelium | BAN, BANYULS, NAD(P)-binding Rossmann-fold superfamily protein |
| 10 | BAN-ANR ORF | WT Protein | | |
| 11 | BAN-ANR Ta locus | WT Gene | | |
| 12 | DTX35 CDS | WT Coding region | Encodes a multidrug and toxin efflux family transporter. Involved in flavonoid metabolism, affecting root growth, seed development and germination, pollen development, release and viability | Detoxifying Efflux Carrier 35, FFT, FLOWER FLAVONOID TRANSPORTER |
| 13 | DTX35 ORF | WT Protein | | |
| 14 | DTX35 Ta locus | WT Gene | | |
| 15 | GL2 CDS | WT Coding region | Glabra 2, a homeodomain protein affects epidermal cell identity including trichomes, root hairs, and seed coat. Abundantly expressed during early seed development and in atrichoblasts. Directly regulated by WER | Glabra 2, HD-ZIP IV homeobox-leucine zipper protein with lipid-binding START domain |
| 16 | GL2 ORF | WT Protein | | |
| 17 | GL2 Ta locus | WT Gene | | |
| 18 | MUM4_like 1 CDS | WT Coding region | Encodes a putative NDP-L-rhamnose synthase, an enzyme required for the synthesis of the pectin rhamnogalacturonan I, major component of plant mucilage. Involved in seed coat mucilage cell development. Required for complete mucilage synthesis, cytoplasmic rearrangement and seed coat development | MUCILAGE-MODIFIED 4, RHAMNOSE BIOSYNTHESIS 2, RHM2, ATRHM2 |
| 19 | MUM4_like 1 ORF | WT Protein | | |
| 20 | MUM4_like 1 Ta locus | WT Gene | | |
| 21 | MUM4_like 2 CDS | WT Coding region | | |
| 22 | MUM4_like 2 ORF | WT Protein | | |
| 23 | MUM4_like 2 Ta locus | WT Gene | | |
| 24 | MYB61 CDS | WT Coding region | Putative transcription factor. Mutants are deficient in mucilage extrusion from the seeds during imbibition, | MYB DOMAIN PROTEIN 61, ATMYB61 |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 25 | MYB61 ORF | WT Protein | resulting in reduced deposition of mucilage during development of the seed coat epidermis in myb61 mutants | |
| 26 | MYB61 Ta locus | WT Gene | | |
| 27 | TT1_like1 CDS | WT Coding region | Encodes a zinc finger protein; involved in photomorphogenesis, flavonoid biosynthesis, flower and seed development | WIP DOMAIN PROTEIN 1, WIP1 |
| 28 | TT1_like1 ORF | WT Protein | | |
| 29 | TT1_like1 Ta locus | WT Gene | | |
| 30 | TT1_like2 CDS | WT Coding region | | |
| 31 | TT1_like2 ORF | WT Protein | | |
| 32 | TT1_like2 Ta locus | WT Gene | | |
| 33 | TT10 CDS | WT Coding region | Protein similar to laccase-like polyphenol oxidases, with conserved copper binding domains. Involved in lignin and flavonoids biosynthesis. Expressed in developing testa, colocalizing with flavonoid end products proanthocyanidins and flavonols. Mutants exhibit delay in developmentally determined browning of the testa, characterized by the pale brown color of seed coat | ATLAC15, ATTT10, LAC15 (LACCASE-LIKE 15), TRANSPARENT TESTA 10 (TT10) |
| 34 | TT10 ORF | WT Protein | | |
| 35 | TT10 Ta locus | WT Gene | | |
| 36 | TT12 CDS | WT Coding region | Proton antiporter, involved in the transportation of proanthocyanidin precursors into the vacuole. Loss-of-function mutation has strong reduction of proanthocyanidin deposition in vacuoles and reduced dormancy. Expressed in the endothelium of ovules and in developing seeds | TRANSPARENT TESTA 12 (TT12), ATTT12, MATE efflux family protein |
| 37 | TT12 ORF | WT Protein | | |
| 38 | TT12 Ta locus | WT Gene | | |
| 39 | TT13 CDS | WT Coding region | Proton pump from the $H^{+}$-ATPase family, involved in proanthocyanidin biosynthesis. Mutations disturb vacuolar biogenesis and acidification process. The acidification of the vacuole provides energy for import of proanthocyanidins into the vacuole | AHA10 (AUTOINHIBITED H(+)-ATPASE ISOFORM 10), TRANSPARENT TESTA 13 (TT13) |
| 40 | TT13 ORF | WT Protein | | |
| 41 | TT13 Ta locus | WT Gene | | |
| 42 | TT15 CDS | WT Coding region | Encodes a UDP-glucose: sterol-glucosyltransferase. Mutants produce pale greenish-brown seeds with slightly reduced dormancy | TRANSPARENT TESTA 15 (TT15), TRANSPARENT TESTA GLABROUS 15 (TTG15), UGT80B1, UDP-Glycosyltransferase superfamily protein |
| 43 | TT15 ORF | WT Protein | | |
| 44 | TT15 Ta locus | WT Gene | | |
| 45 | TT16 CDS | WT Coding region | MADS-box protein regulating proanthocyanidin biosynthesis and cell shape in the inner-most cell layer of the seed coat. Required for determining the identity of the endothelial layer within the ovule. | ABS, AGAMOUS-LIKE 32 (AGL32), *ARABIDOPSIS* BSISTER, TRANSPARENT |
| 46 | TT16 ORF | WT Protein | | |
| 47 | TT16 Ta | WT Gene | | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| | | | Paralogous to GOA. Plays a maternal role in fertilization and seed development | TESTA16 (TT16) |
| 48 | TT18 CDS | WT Coding region | Encodes leucoanthocyanidin dioxygenase, which is involved in proanthocyanin biosynthesis. Mutant analysis suggests that this gene is also involved in vacuole formation | ANS, ANTHOCYANIDIN SYNTHASE, LDOX, LEUCOANTHO-CYANIDIN DIOXYGENASE, TANNIN DEFICIENT SEED 4 (TDS4), TT18 |
| 49 | TT18 ORF | WT Protein | | |
| 50 | TT18 Ta locus | WT Gene | | |
| 51 | TT19 CDS | WT Coding region | Encodes glutathione transferase belonging to the phi class of GSTs. Mutants display no pigments in the leaves or stems. Likely to function as a carrier to transport anthocyanin from the cytosol to tonoplasts | GLUTATHIONE S-TRANSFERASE PHI 12, ATGSTF12, GLUTATHIONE S-TRANSFERASE 26 (GST26), GLUTATHIONE S-TRANSFERASE PHI 12, GSTF12, TRANSPARENT TESTA 19 (TT19) |
| 52 | TT19 ORF | WT Protein | | |
| 53 | TT19 Ta locus | WT Gene | | |
| 54 | TT3 CDS | WT Coding region | Dihydroflavonol reductase. Catalyzes conversion of dihydroquercetin to leucocyanidin in the biosynthesis of anthocyanins | DFR, DIHYDROFLAV-ONOL 4-REDUCTASE, M318, TRANSPARENT TESTA 3, (TT3) |
| 55 | TT3 ORF | WT Protein | | |
| 56 | TT3 Ta locus | WT Gene | | |
| 57 | TT4 CDS | WT Coding region | Encodes chalcone synthase (CHS), a key enzyme in biosynthesis of flavonoids. Required for accumulation of purple anthocyanins in leaves, stems and seed coat. Also involved in regulation of auxin transport and root gravitropism | ATCHS, CHALCONE SYNTHASE, CHS, TRANSPARENT TESTA 4 (TT4) |
| 58 | TT4 ORF | WT Protein | | |
| 59 | TT4 Ta locus | WT Gene | | |
| 60 | TT5 CDS | WT Coding region | Another key enzyme in biosynthesis of flavonoids. Catalyzes the conversion of chalcones into flavanones. Required for the accumulation of purple anthocyanins leaves, stems and seed coat. Co-expressed with CHS | A11, ATCHI, CFI, CHALCONE FLAVANONE ISOMERASE, CHALCONE ISOMERASE, CHI, TRANSPARENT TESTA 5 (TT5) |
| 61 | TT5 ORF | WT Protein | | |
| 62 | TT5 Ta locus | WT Gene | | |
| 63 | TT6 CDS | WT Coding region | Encodes flavanone 3-hydroxylase, regulating flavonoid biosynthesis. Coordinately expressed with chalcone synthase and chalcone isomerases | F3'H, F3H, FLAVANONE 3-HYDROXYLASE, TRANSPARENT TESTA 6 (TT6) |
| 64 | TT6 ORF | WT Protein | | |
| 65 | TT6 Ta locus | WT Gene | | |
| 66 | TT7 CDS | WT Coding region | Required for flavonoid 3'-hydroxylase activity. Enzyme abundance relative to CHS | F3'H CYP75B1, CYTOCHROME P450 75B1, D501, |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 67<br>68 | TT7 ORF<br>TT7 Ta locus | WT Protein<br>WT Gene | determines Quercetin/Kaempferol metabolite ratio | TRANSPARENT TESTA 7 (TT7) |
| 69<br><br><br>70<br>71 | TT8 CDS<br><br><br>TT8 ORF<br>TT8 Ta locus | WT Coding region<br>WT Protein<br>WT Gene | TT8 is a transcription factor acting in concert with TT1, PAP1 and TTG1 on regulation of flavonoid pathways, namely proanthocyanidin and anthocyanin biosynthesis. Affects dihydroflavonol 4-reductase gene expression. It is believed that a ternary complex composed of TT2, TT8 and TTG1 is required for correct expression of BAN in seed endothelium. Interacts with JAZ proteins to regulate anthocyanin accumulation | ATTT8, BHLH42, TRANSPARENT TESTA 8, (TT8) |
| 72<br><br><br>73<br>74 | TT9 CDS<br><br><br>TT9 ORF<br>TT9 Ta locus | WT Coding region<br>WT Protein<br>WT Gene | Encodes a peripheral membrane protein localized at the Golgi apparatus. Involved in membrane trafficking, vacuole development and in flavonoid accumulation in the seed coat. Mutant seed color is pale brown | GFS9, GREEN FLUORESCENT SEED 9, TRANSPARENT TESTA 9, TT9 CLEC16A-like protein |
| 75<br><br><br>76<br>77 | TTG1 CDS<br><br><br>TTG1 ORF<br>TTG1 Ta locus | WT Coding region<br>WT Protein<br>WT Gene | Part of a ternary complex composed of TT2, TT8 and TTG1 necessary for correct expression of BAN in seed endothelium. Required for the accumulation of purple anthocyanins in leaves, stems and seed coat. Controls epidermal cell fate specification. Affects dihydroflavonol 4-reductase gene expression. TTG1 was shown to act non-cell autonomously and to move via plasmodesmata between cells | TTG1, TTG, URM23, ATTTG1, Transducin/ WD40-repeat-containing protein |
| 78<br><br><br>79<br>80 | TTG2 CDS<br><br><br>TTG2 ORF<br>TTG2 Ta locus | WT Coding region<br>WT Protein<br>WT Gene | Belongs to a family of WRKY transcription factors expressed in seed integument and endosperm. Mutants are defective in proanthocyanidin synthesis and seed mucilage deposition. Seeds are yellow colored. Seed size is also affected; seeds are reduced in size but only when the mutant allele is transmitted through the female parent | TRANSPARENT TESTA GLABRA 2 (TTG2), AtWRKY44, DSL1 (DR. STRANGELOVE 1) |
| 81 | TT1 aMIR319a gene | Artificial miRNA | Artificial micro-RNA designed to reduce expression of TT1 in corresponding cell layer of developing seed coat | |
| 82 | TT10 aMIR319a gene | Artificial mTNA | Artificial micro-RNA designed to reduce expression of TT10 in corresponding cell layer of developing seed coat | |
| 83 | TT2 aMIR319a gene | Artificial miRNA | Artificial micro-RNA designed to reduce expression of TT2 in corresponding cell layer of developing seed coat | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 84 | TT8 aMIR319A gene | Artificial mRNA | Artificial micro-RNA designed to reduce expression of TT8 in corresponding cell layer of developing seed coat | |
| 85 | TT1 Promoter | Promoter | Genomic region of TT1 locus upstream of TT1 start codon containing TT1 promoter regulatory elements | |
| 86 | TT1 Terminator | Transcriptional terminator | Genomic region of TT1 locus downstream of TT1 stop codon containing regulatory elements | |
| 87 | TT8 Promoter | Promoter | Genomic region of TT8 locus upstream of TT8 start codon containing TT8 promoter regulatory elements | |
| 88 | TT8 Terminator | Transcriptional terminator | Genomic region of TT8 locus downstream of TT8 stop codon containing regulatory elements | |
| 89 | TT2_CRISPR-SpCAS9_F1 | Oligo-nucleotide | TT2 CDS targeted for cleavage by SpCAS9 enzyme; part of gRNA cassette | |
| 90 | TT2_CRISPR-SpCAS9_R1 | Oligo-nucleotide | TT2 CDS targeted for cleavage by SpCAS9 enzyme; part of gRNA cassette | |
| 91 | TT2_CRISPR-SaCAS9_F2 | Oligo-nucleotide | TT2 CDS targeted for cleavage by SpCAS9 enzyme; part of gRNA cassette | |
| 92 | TT2_CRISPR-SaCAS9_R2 | Oligo-nucleotide | TT2 CDS targeted for cleavage by SpCAS9 enzyme; part of gRNA cassette | |
| 93 | TT2_CRISPR-SaCAS9_F3 | Oligo-nucleotide | TT2 CDS targeted for cleavage by SpCAS9 enzyme; part of gRNA cassette | |
| 94 | TT2_CRISPR-SaCAS9_R3 | Oligo-nucleotide | TT2 CDS targeted for cleavage by SpCAS9 enzyme; part of gRNA cassette | |
| 95 | TT8_CRISPR-SpCAS9_F1 | Oligo-nucleotide | TT8 CDS targeted for cleavage by SpCAS9 enzyme; part of gRNA cassette | |
| 96 | TT8_CRISPR-SpCAS9_R1 | Oligo-nucleotide | TT8 CDS targeted for cleavage by SpCAS9 enzyme; part of gRNA cassette | |
| 97 | TT8_CRISPR-SpCAS9_F2 | Oligo-nucleotide | TT8 CDS targeted for cleavage by SpCAS9 enzyme; part of gRNA cassette | |
| 98 | TT8_CRISPR-SpCAS9_R2 | Oligo-nucleotide | TT8 CDS targeted for cleavage by SpCAS9 enzyme; part of gRNA cassette | |
| 99 | TT8_CRISPR-SpCAS9_F3 | Oligo-nucleotide | TT8 CDS targeted for cleavage by SpCAS9 enzyme; part of gRNA cassette | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 100 | TT8_CRISPR-SpCAS9_R3 | Oligo-nucleotide | TT8 CDS targeted for cleavage by SpCAS9 enzyme; part of gRNA cassette | |
| 101 | TT10_CRISPR-SpCAS9_F1 | Oligo-nucleotide | TT10 CDS targeted for cleavage by SpCAS9 enzyme;part of gRNA cassette | |
| 102 | TT10_CRISPR-SaCAS9_R1 | Oligo-nucleotide | TT10 CDS targeted for cleavage by SpCAS9 enzyme; part of gRNA cassette | |
| 103 | TT10_CRISPR-SaCAS9_F2 | Oligo-nucleotide | TT10 CDS targeted for cleavage by SpCAS9 enzyme; part of gRNA cassette | |
| 104 | TT10_CRISPR-SaCAS9_R2 | Oligo-nucleotide | TT10 CDS targeted for cleavage by SpCAS9 enzyme; part of gRNA cassette | |
| 105 | TT16_CRISPR-SpCAS9_F1 | Oligo-nucleotide | TT16 CDS targeted for cleavage by SpCAS9 enzyme; part of gRNA cassette | |
| 106 | TT16_CRISPR-SpCAS9_R1 | Oligo-nucleotide | TT16 CDS targeted for cleavage by SpCAS9 enzyme; part of gRNA cassette | |
| 107 | TT16_CRISPR-SpCAS9_F2 | Oligo-nucleotide | TT16 CDS targeted for cleavage by SpCAS9 enzyme; part of gRNA cassette | |
| 108 | TT16_CRISPR-SpCAS9_R2 | Oligo-nucleotide | TT16 CDS targeted for cleavage by SpCAS9 enzyme; part of gRNA cassette | |
| 109 | TT8_CRISPR-SpCAS9_F4 | Oligo-nucleotide | TT8 CDS targeted for cleavage by SpCAS9 enzyme; part of gRNA cassette | |
| 110 | TT8_CRISPR-SpCAS9_F5 | Oligo-nucleotide | TT8 CDS targeted for cleavage by SpCAS9 enzyme; part of gRNA cassette | |
| 111 | TT8_CRISPR-SaCAS9_F1 | Oligo-nucleotide | TT8 CDS targeted for cleavage by SaCAS9 enzyme; part of gRNA cassette | |
| 112 | TT8_CRISPR-SaCAS9_F2 | Oligo-nucleotide | TT8 CDS targeted for cleavage by SaCAS9 enzyme; part of gRNA cassette | |
| 113 | TTG1_CRISPR-SpCAS9_F1 | Oligo-nucleotide | TTG1 CDS targeted for cleavage by SpCAS9 enzyme; part of gRNA cassette | |
| 114 | TTG1_CRISPR-SpCAS9_F2 | Oligo-nucleotide | TTG1 CDS targeted for cleavage by SpCAS9 enzyme; part of gRNA cassette | |
| 115 | TTG1_CRISPR-SaCAS9_F1 | Oligo-nucleotide | TTG1 CDS targeted for cleavage by SaCAS9 enzyme; part of gRNA cassette | |
| 116 | TTG1_CRISPR-SaCAS9_F2 | Oligo-nucleotide | TTG1 CDS targeted for cleavage by SaCAS9 enzyme; part of gRNA cassette | |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 117 | TT4-1 CDS-Mut | Mutant Coding region | GTCTGCTCC**G**AGATCACAG (nt 580-598 of SEQ ID NO: 57) → GTCTGCTCC**A**AGATCACAG (nt 580-598 of SEQ ID NO: 117) | tt4-1, A7-95 |
| 118 | TT4 Mut P1 | Mutant Protein | Presumed LOF due to E->K aa change | |
| 119 | TT4-2 CDS-Mut | Mutant Coding region | AAGTGACTG**G**AACTCTCTC (nt 894-912 of SEQ ID NO:57) → AAGTGACTG**A**AACTCTCTC (nt 894-912 of SEQ ID NO: 119) | tt4-2, E5-549 |
| 120 | TT4 Mut P2 | Mutant Protein | Truncated protein, W-> Stop change | |
| 121 | TT6-1 CDS-Mut | Mutant Coding region | GAGACTGTG**C**AAGATTGGA (nt 364-382 of SEQ ID NO: 63) → GAGACTGTG**T**AAGATTGGA (nt 364-382 of SEQ ID NO: 121) | tt6-1, AX17 |
| 122 | TT6 Mut P1 | Mutant Protein | Truncated protein, Q->Stop change | |
| 123 | TT6-2 CDS-Mut | Mutant Coding region | TTCAGAATC**C**GGCGCAGGA (nt 872-890 of SEQ ID: 63) → TTCAGAATC**T**GGCGCAGGA (nt 872-890 of SEQ ID: 123) | tt6-2, Q36 |
| 124 | TT6 Mut P2 | Mutant Protein | Presumed LOF due to P->L aa change | |
| 125 | TT7-1 CDS-Mut | Mutant Coding region | CCAAATTCA**G**GAGCCAAAC (nt 304-322 of SEQ ID: 66) → CCAAATTCA**A**GAGCCAAAC (nt 304-322 of SEQ ID: 125) | tt7-1, A7-3, E5-586, E5-484 P15, E5-484 P5 |
| 126 | TT7-1 Mut P1 | Mutant Protein | Presumed LOF due to G->R aa change | |
| 127 | TT8-1 CDS-Mut | Mutant Coding region | TTTACGGCA**G**AGAAAGTGA (nt 19-37 of SEQ ID: 69) → TTTACGGCA**A**AGAAAGTGA (nt 19-37 of SEQ ID: 127) | tt8-1, D3-N10 P5 |
| 128 | TT8 Mut P1 | Mutant Protein | Presumed LOF due to E->K aa change | |
| 129 | TT8-2 CDS-Mut | Mutant Coding region | TCTTACATC**C**AATCATCAT (nt 940-958 of SEQ ID: 69) → TCTTACATC**T**AATCATCAT (nt 940-958 of SEQ ID: 129) | tt8-2, D5-191, D3-N25P1, E5-590, A7-191 |
| 130 | TT8 Mut P2 | Mutant Protein | Truncated protein, Q->Stop change | |
| 131 | TT8-3 CDS-Mut | Mutant Coding region | TGCCACATG**G**AAGGCTGAT (nt 960-978 of SEQ ID: 69) → TGCCACATG**A**AAGGCTGAT (nt 960-978 of SEQ ID: 131) | tt8-3, I0193, E5-542, E5-548 |
| 132 | TT8 Mut P3 | Mutant Protein | Truncated protein, W->Stop change | |
| 133 | TT8-11 CDS-Mut | Mutant Coding region | GCAATAAAGACGAGGAAGA (nt 172-190 of SEQ ID: 69) → GCAATAAAGA**A**CGAGGAAGA (nt 172-191 of SEQ ID: 133) | tt8-11 |
| 134 | TT8 Mut P4 | Mutant Protein | Frameshift caused by 1 bp insertion | |
| 135 | TT8-12 CDS-Mut | Mutant Coding region | GCAATAAAGACGAGGAAGA (nt 172-190 of SEQ ID: 69) → GCAATAAA--CGAGGAAGA (nt 172-188 of SEQ ID: 135) | tt8-12 |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 136 | TT8 Mut P5 | Mutant Protein | Frameshift caused by 2 bp deletion | |
| 137 | TT8-13 CDS-Mut | Mutant Coding region | GCAATAAAGACGAGGAAGA (nt 172-190 of SEQ ID: 69) → GCAATAAAG**G**ACGAGGAAGA (nt 172-191 of SEQ ID: 137) | tt8-13 |
| 138 | TT8 Mut P6 | Mutant Protein | Frameshift caused by 1 bp insertion | |
| 139 | TT10-1 CDS-Mut | Mutant Coding region | GACTGTTTG**G**TGGCATGCG (nt 354-372 of SEQ ID: 33) → GACTGTTTG**A**TGGCATGCG (nt 354-372 of SEQ ID: 139) | tt10-1, E5-539, E5-543 |
| 140 | TT10 Mut P1 | Mutant Protein | Truncated protein, W->Stop change | |
| 141 | TT10-2 CDS-Mut | Mutant Coding region | TACCGCATT**C**GGATGGTAA (nt 646-664 of SEQ ID: 33) → TACCGCATT**T**GGATGGTAA (nt 646-664 of SEQ ID: 141) | tt10-2, E5-545 |
| 142 | TT10 Mut P2 | Mutant Protein | Presumed LOF due to R->W aa change | |
| 143 | TT10-11 CDS-Mut | Mutant Coding region | GGACCAGTGTTAAGGGCT (nt 154-171 of SEQ ID: 33) → GGACCAGTG**T**TTAAGGGCT (nt 154-172 of SEQ ID: 143) | tt10-11 |
| 144 | TT10 Mut P3 | Mutant Protein | Frameshift caused by 1 bp insertion | |
| 145 | TT10-12 CDS-Mut | Mutant Coding region | GGACCAGTGTTAAGGGCT (nt 154-171 of SEQ ID: 33) → GGACCAGTG**A**TTAAGGGCT (nt 154-172 of SEQ ID: 145) | tt10-12 |
| 146 | TT10 Mut P4 | Mutant Protein | Frameshift caused by 1 bp insertion | |
| 147 | TT10-13 CDS-Mut | Mutant Coding region | TCCTGGACCAGTGTTAAGG (nt 150-168 of SEQ ID: 33) → TCCTGG--------TTAAGG (nt 150-161 of SEQ ID: 147) | tt10-13 |
| 148 | TT10 Mut P5 | Mutant Protein | Frameshift caused by 7 bp deletion | |
| 149 | TT12-1 CDS-Mut | Mutant Coding region | AACCCTTTGGCTTACATGTC (nt 604-623 of SEQ ID: 36) → AACCCTTT----TACATGTC (nt 604-619 of SEQ ID: 149) | tt12-1, A7-261 |
| 150 | TT12 Mut P1 | Mutant Protein | Frameshift caused by 4 bp deletion | |
| 151 | TT12-2 CDS-Mut | Mutant Coding region | ATTCTCTCT**G**GTGTTGCCA (nt 1237-1255 of SEQ ID: 36) → ATTCTCTCT**A**GTGTTGCCA (nt 1237-1255 of SEQ ID: 151) | tt12-2, J22 |
| 152 | TT12 Mut P2 | Mutant Protein | Presumed LOF due to G→S aa change | |
| 153 | TT13-1 CDS-Mut | Mutant Coding region | GCTCTTAAC**C**TTGGAGTTT (nt 895-913 of SEQ ID: 39) → GCTCTTAAC**T**TTGGAGTTT (nt 895-913 of SEQ ID: 153) | tt13-1, aha10-1, J22 |
| 154 | TT13 Mut P1 | Mutant Protein | Truncated protein, L->F change | |
| 155 | TT13-2 CDS-Mut | Mutant Coding | ACAGGAAGG**C**GACTTGGGA (nt 958-976 of SEQ ID: 39) → | tt13-2, P32 |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| | | region | ACAGGAAGG**T**GACTTGGGA (nt 958-976 of SEQ ID: 155) | |
| 156 | TT13 Mut P2 | Mutant Protein | Truncated protein, R->Stop change | |
| 157 | TT13-3 CDS-Mut | Mutant Coding region | GGAATGACC**G**GAGATGGTG (nt 1144-1162 of SEQ ID: 39) → GGAATGACC**A**GAGATGGTG (nt 1144-1162 of SEQ ID: 157) | tt13-3, E5-540 |
| 158 | TT13 Mut P3 | Mutant Protein | Truncated protein, G->R change | |
| 159 | TT16-1 CDS-Mut | Mutant Coding region | TACTTGAAGACCAGTGGAAT (nt 211-230 of SEQ ID: 45) → TACTTGAAGAC**C**CAGTGGAAT (nt 211-231 of SEQ ID: 159) | tt16-1 |
| 160 | TT16 Mut P1 | Mutant Protein | Frameshift caused by 1 bp insertion | |
| 161 | TT16-2 CDS-Mut | Mutant Coding region | TACTTGAAGACCAGTGGAAT (nt 211-230 of SEQ ID: 45) → TACTTGAAGAC**G**CAGTGGAAT (nt 211-231 of SEQ ID: 161) | tt16-2 |
| 162 | TT16 Mut P2 | Mutant Protein | Frameshift caused by 1 bp insertion | |
| 163 | TT16-3 CDS-Mut | Mutant Coding region | TACTTGAAGACCAGTGGAAT (nt 211-230 of SEQ ID: 45) → TACTTGAAGAC**T**CAGTGGAAT (nt 211-231 of SEQ ID: 163) | tt16-3 |
| 164 | TT16 Mut P3 | Mutant Protein | Frameshift caused by 1 bp insertion | |
| 165 | TTG1 CDS-Mut | Mutant Coding region | GATCTCCTCGCTTCCTCCGGCG ATTTCCT (nt 286-314 of SEQ ID: 75) → GATC---------------------TCCT (nt 286-293 of SEQ ID: 165) | Y1067, Y1126 |
| 166 | TTG1 Mut P1 | Mutant Protein | LOF caused by 21 bp/7aa deletion | |
| 167 | TTG1-1 CDS-Mut | Mutant Coding region | TCGCTTCCT**C**CGGCGATTT (nt 293-311 of SEQ ID: 75) → TCGCTTCCT**TC**GGCGATTT (nt 293-311 of SEQ ID: 167) | ttg1-1, E5-544 |
| 168 | TTG1 Mut P2 | Mutant Protein | Presumed LOF due to S->F aa change | |
| 169 | TTG1-2 CDS-Mut | Mutant Coding region | TCGCTTGGG**G**AGAAGCTAG (nt 542-560 of SEQ ID: 75) → TCGCTTGGG**A**AGAAGCTAG (nt 542-560 of SEQ ID: 169) | ttg1-2, A7-187 |
| 170 | TTG1 Mut P3 | Mutant Protein | Presumed LOF due to G->E aa change | |
| 171 | GL3 CDS | WT Coding region | Transcription activator of bHLH superfamily involved in cell fate specification. In association with TTG1, promotes trichome formation. Together with MYB75/PAP1, plays a role in the activation of anthocyanin biosynthesis. Activates the transcription of GL2. | GL3, MYC6.2 basic helix-loop-helix protein |
| 172 | GL3 ORF | WT Protein | | |
| 173 | GL3 Ta locus | WT Gene | | |
| 174 | GL3-1 CDS-Mut | Mutant Coding region | CAACTTAGG**G**AGCTTTACG (nt 241-259 of SEQ ID: 171) → CAACTTAGG**A**AGCTTTACG (nt 241-259 of SEQ ID: 174) | gl3-1, E5-541, E5-559 |

TABLE 1-continued

Wild-type (WT) coding regions, encoded proteins, and genes that can be targeted for introduction of LOF mutations or transgene-mediated suppression, their mutant variants and representative genetic elements for achieving suppression of gene expression.

| SEQ ID NO: | Sequence Name | Type | Function/Nature of the mutation | Other Names Used and Representative Pennycress LOF Mutants Disclosed Herein |
|---|---|---|---|---|
| 175 | GL3 Mut P1 | Mutant Protein | Presumed LOF due to E->K aa change | |
| 176 | GL3-2 CDS-Mut | Mutant Coding region | GCCGACACA**G**AGTGGTACT (nt 358-376 of SEQ ID: 171) → GCCGACACA**A**AGTGGTACT (nt 358-376 of SEQ ID: 176) | gl3-2, A7-92, E5-444 |
| 177 | GL3 Mut P2 | Mutant Protein | Presumed LOF due to E->K aa change | |
| 178 | GL3-3 CDS-Mut | Mutant Coding region | GGTTTAACT**G**ATAATTTAA (nt 1663-1681 of SEQ ID: 171) → GGTTTAACT**A**ATAATTTAA (nt 1663-1681 of SEQ ID: 178) | gl3-3, A7-229, E5-582 |
| 179 | GL3 Mut P3 | Mutant Protein | Presumed LOF due to D->N aa change | |
| 180 | BAN-1 CDS-Mut | Mutant Coding region | ATCAAGCCA**G**GGATACAAG (nt 319-337 of SEQ ID: 9) → ATCAAGCCA**A**GGATACAAG (nt 319-337 of SEQ ID: 9 and SEQ ID: 180) | ban-1, BJ8, BJ8D |
| 181 | BAN Mut P1 | Mutant Protein | Presumed LOF due to G->R aa change | |
| 182 | TT4-3 CDS-Mut | Mutant Coding region | CTCACCCTG**G**AGGTCCTGC (nt 923-941 of SEQ ID: 57) → CTCACCCTG**A**AGGTCCTGC (nt 923-941 of SEQ ID: 182) | tt4-3, A7-229, E5-582 |
| 183 | TT4-3 Mut P1 | Mutant Protein | Presumed LOF due to G->R aa change | |

In certain embodiments, pennycress plants having reduced seed coat fiber, lighter-colored seed coat, and/or higher seed oil content as described herein can be from the Y1067, Y1126, BC38, BJ8, P32, J22, Q36, BD24, AX17, E5-444, E5-540, E5-541, E5-542, E5-543, E5-544, E5-545, E5-547, E5-549, E5-582, E5-586, D3-N10 P5, D5-191, A7-95, A7-187, or A7-261 variant lines provided herein, or can be progeny derived from those lines.

A representative wild-type (WT) pennycress TT2 coding sequence is as shown in sequence listing (SEQ ID NO:1). In certain embodiments, a WT pennycress TT2 coding sequence can have a sequence that deviates from the coding sequence set forth above (e.g., SEQ ID NO:1), and is referred to as an allelic variant sequence. In certain embodiments, a TT2 coding sequence allelic variant can have at least 80, at least 85, at least 90, at least 95, at least 98, or at least 99 percent sequence identity to SEQ ID NO:1. A representative wild-type pennycress TT2 polypeptide is shown in sequence listing (SEQ ID NO:2). In certain embodiments, a WT pennycress TT2 polypeptide can have a sequence that deviates from the polypeptide sequence set forth above (SEQ ID NO:2) and is referred to as an allelic variant sequence.

In certain embodiments, a WT pennycress TT2 polypeptide can have a sequence that deviates from the polypeptide sequence set forth above (SEQ ID NO:2), referred to herein as an allelic variant sequence, provided the polypeptide maintains its wild-type function. For example, a TT2 polypeptide can have at least 80, at least 85, at least 90, at least 95, at least 98, or at least 99) percent sequence identity to SEQ ID NO:2. A TT2 polypeptide of an allelic variant can have one or more (e.g., 2, 3, 4, 5, 6, 7, 8, 9, or 10) amino acid modifications (e.g., substitutions) relative to SEQ ID NO:2.

In certain embodiments, pennycress seed lots having reduced seed coat fiber, lighter-colored seed coat due to reduced proanthocyanidins content, and/or higher seed oil content as described herein can include at least one loss-of-function modification in a TT2 gene (e.g., in a TT2 coding sequence, in a TT2 regulatory sequence including the promoter, 5' UTR, intron, 3' UTR, or in any combination thereof) or a transgene that suppresses expression of the TT2 gene. As used herein, a loss-of-function mutation in a TT2 gene can be any modification that is effective to reduce TT2 polypeptide expression or TT2 polypeptide function. In certain embodiments, reduced TT2 polypeptide expression and/or TT2 polypeptide function can be eliminated or reduced in comparison to a wild-type plant. Examples of genetic modifications that can provide for a loss-of-function mutation include, without limitation, deletions, insertions, substitutions, translocations, inversions, duplications, or any combination thereof.

In certain embodiments, pennycress seed lots having reduced seed coat fiber, lighter-colored seed coat, and/or higher seed oil and/or protein content as described herein can include a substitution (e.g., a single base-pair substitution) relative to the WT pennycress TT2 coding sequence. In certain embodiments, a modified TT2 coding sequence can include a single base-pair substitution of the cytosine (G) at nucleotide residue 330 in a WT pennycress TT2 coding sequence (e.g., SEQ ID NO:1 or an allelic variant thereof). The G at nucleotide residue 330 can be substituted with any appropriate nucleotide (e.g., thymine (T), adenine (A), or cytosine (C)). For example, a single base-pair substitution can be a G to A substitution at nucleotide residue 330 in a WT pennycress TT2 coding sequence thereby producing a premature stop codon. A representative modified pennycress TT2 coding sequence having a loss-of-function single base pair substitution is presented in SEQ ID NO:4.

A modified pennycress TT2 coding sequence having a loss-of-function single base pair substitution (e.g., SEQ ID NO:4) can encode a modified TT2 polypeptide (e.g., a modified TT2 polypeptide having reduced TT2 polypeptide expression and/or reduced TT2 polypeptide function). For example, a modified pennycress TT2 coding sequence having a single base-pair substitution (e.g., SEQ ID NO:4) can encode a modified TT2 polypeptide. In certain embodiments, a modified TT2 polypeptide can include a truncation resulting from the introduction of a stop codon at codon position 110 within the TT2 open reading frame (e.g., SEQ ID NO:4). A representative truncated pennycress TT2 polypeptide is presented in SEQ ID NO:5. Representative pennycress varieties having a mutation in the TT2 gene include the tt2-1, tt2-2, BC38, and E5-547 varieties.

Figure 4:
FIG. 4 illustrates pARV191, *Agrobacterium* CRISPR-SmCsm1 base vector for editing plant genome. gRNA cassette stuffers are inserted at the dual AarI site, replacing a small fragment of the vector with synthetic gRNA cassette.
Figure 5:
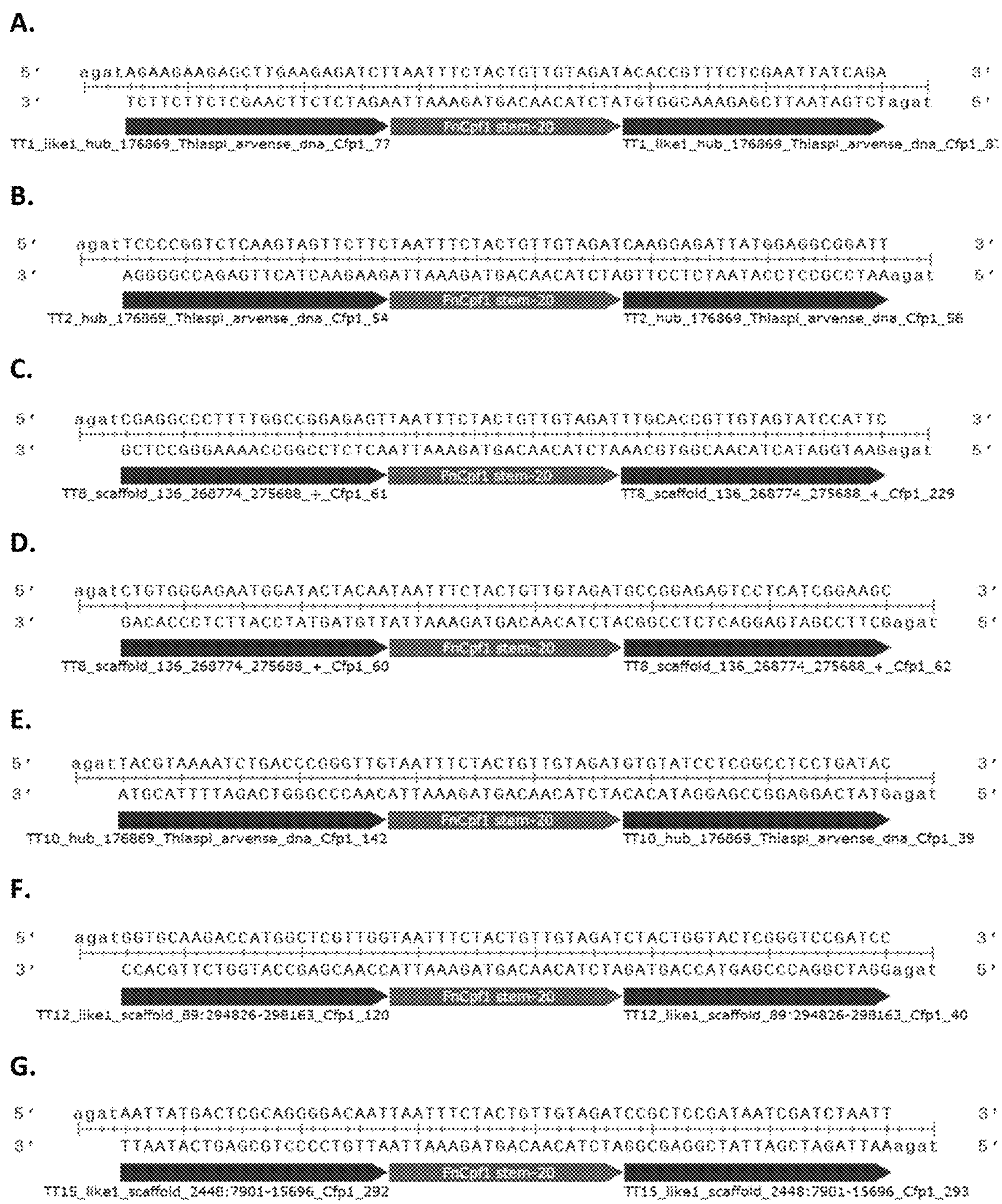
FIGS. 5 A, B, C, D, E, F, G, gRNA cassettes targeting pennycress *Transparent testa* (Tt) genes.
Figure 6:
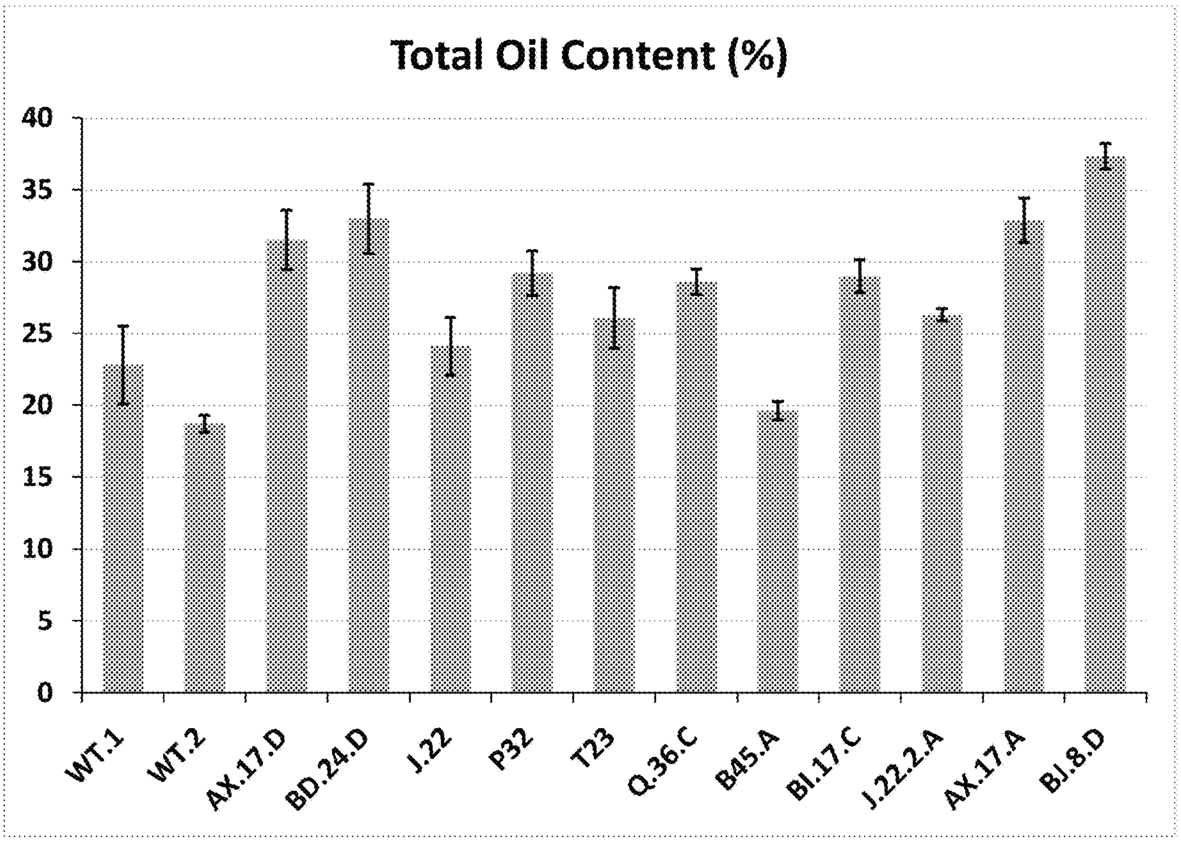
FIG. 6 illustrates total oil content in seeds of selected yellow-seeded pennycress mutants measured using GC-chromatography analysis.

A representative WT pennycress *TRANSPARENT TESTA*8 (TT8) coding region is presented in SEQ ID NO:69. Two protospacer locations and adjacent protospacer-adjacent motif (PAM) sites that can be targeted by, for example, CRISPR-SpCAS9 correspond to nucleotides 164-183 and 287-306 (protospacers) or 184-186 and 284-286 (PAM sites). In another embodiment, two separate examples of alternative protospacer locations and adjacent protospacer-adjacent motifs (PAM) sites are provided in FIGS. 3-5. In each case, two protospacer locations can be targeted by, for example, CRISPR-FnCpf1, CRISPR-SmCsm1 or a similar enzyme, correspond to nucleotides 175-153 and 261-283 (protospacers) or 179-176 and 257-260 (PAM sites); and nucleotides 145-167 and 274-296 (protospacers) or 141-144 and 270-273 (PAM sites), all of SEQ ID NO:69.

In certain embodiments, a WT pennycress TT8 coding sequence can have a sequence that deviates from the coding sequence set forth above (e.g., SEQ ID NO:69), and is referred to as an allelic variant sequence. In certain embodiments, a TT8 coding sequence allelic variant can have at least 80, at least 85, at least 90, at least 95, at least 98, or at least 99 percent sequence identity to SEQ ID NO:69. A representative WT pennycress TT8 polypeptide is presented in SEQ ID NO:70.

In certain embodiments, a WT pennycress TT8 polypeptide can have a sequence that deviates from the polypeptide sequence set forth above (SEQ ID NO:70) and is referred to as an allelic variant sequence. For example, a TT8 polypeptide can have at least 80, at least 85, at least 90, at least 95, at least 98, or at least 99 percent sequence identity to SEQ ID NO:70. A TT8 polypeptide can have one or more (e.g., 2, 3, 4, 5, 6, 7, 8, 9, or 10) amino acid modifications (e.g., substitutions) relative to SEQ ID NO:70.

In certain embodiments, pennycress seed lots having reduced fiber content as described herein can include a loss-of-function modification in a TT8 gene (e.g., in a TT8 coding sequence) or a transgene that suppresses expression of the TT8 gene. As used herein, a loss-of-function mutation in a TT8 gene can be any modification that is effective to reduce TT8 polypeptide expression or TT8 polypeptide function. In certain embodiments, reduced TT8 polypeptide expression and/or TT8 polypeptide function can be eliminated or reduced. Examples of genetic modifications include, without limitation, deletions, insertions, substitutions, translocations, inversions, duplications, and any combination thereof. Representative TT8 gene mutations include the mutations shown in SEQ ID NO:127, 129, 131, 133, 135, and 137 that result in the TT8 mutant polypeptides of SEQ ID NO:128, 130, 132, 134, 136, and 138, respectively. Representative pennycress varieties with TT8 gene mutations include the tt4-2 tt8-1, tt8-2, tt8-3, tt8-11, tt8-12, tt8-12, tt8-13, 10193, E5-542, E5-548, D5-191, D3-N25P1, E5-590, A7-191, and D3-N10 P5 varieties.

In certain embodiments, a WT pennycress TT1 coding sequence can have a sequence that deviates from the coding sequence set forth above (e.g., SEQ ID NO:27 or 30), and is referred to as an allelic variant sequence. In certain embodiments, a TT1 coding sequence allelic variant can have at least 80, at least 85, at least 90, at least 95, at least 98, or at least 99 percent sequence identity to SEQ ID NO:27 or 30. In certain embodiments, a WT pennycress TT1 polypeptide can have a sequence that deviates from the polypeptide sequence set forth above (SEQ ID NO:28 or 31), and is referred to as an allelic variant sequence. For example, a TT1 polypeptide allelic variant can have at least 80, at least 85, at least 90, at least 95, at least 98, or at least 99 percent sequence identity to SEQ ID NO:28 or 31. A TT1 polypeptide allelic variant can have one or more (e.g., 2, 3, 4, 5, 6, 7, 8, 9, or 10) amino acid modifications (e.g., substitutions) relative to SEQ ID NO:28 or 31.

In certain embodiments, pennycress seed lots having reduced fiber as described herein can include a loss-of-function modification in a TT1 encoding gene or a transgene that suppresses expression of the TT1 gene. As used herein, a loss-of-function mutation in a TT1 gene can be any modification that is effective to reduce TT1 polypeptide expression or TT1 polypeptide function. In certain embodiments, reduced TT1 polypeptide expression and/or TT1 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT1 encoding gene, a promoter thereof, or a terminator, thereof, or a transgene that suppresses expression of the TT1 gene. As used herein, a loss-of-function mutation in a TT1 gene can be any modification that is effective to reduce TT1 polypeptide expression or TT1 polypeptide function. In certain embodiments, reduced TT1 polypeptide expression and/or TT1 polypeptide function can be eliminated or reduced. Examples of genetic modifications include, without limitation, deletions, insertions, substitutions, translocations, inversions, duplications, and any combination thereof.

In certain embodiments, a WT pennycress TT4 coding sequence can have a sequence that deviates from the coding sequence set forth above (e.g., SEQ ID NO:57), and is referred to as an allelic variant sequence. In certain embodiments, a TT4 coding sequence allelic variant can have at least 80, at least 85, at least 90, at least 95, at least 98, or at least 99 percent sequence identity to SEQ ID NO:57. In certain embodiments, a WT pennycress TT4 polypeptide can have a sequence that deviates from the polypeptide sequence set forth above (SEQ ID NO:58), and is referred to as an allelic variant sequence. For example, a TT4 polypeptide allelic variant can have at least 80, at least 85, at least 90, at least 95, at least 98, or at least 99 percent sequence identity to SEQ ID NO:58. A TT4 polypeptide allelic variant can have one or more (e.g., 2, 3, 4, 5, 6, 7, 8, 9, or 10) amino acid modifications (e.g., substitutions) relative to SEQ ID NO:58.

In certain embodiments, pennycress seed lots having reduced fiber as described herein can include a loss-of-function modification in a TT4 encoding gene or a transgene that suppresses expression of the TT4 gene. As used herein, a loss-of-function mutation in a TT4 gene can be any modification that is effective to reduce TT4 polypeptide expression or TT4 polypeptide function. In certain embodiments, reduced TT4 polypeptide expression and/or TT4 polypeptide function can be eliminated or reduced. Examples of genetic modifications include, without limitation, deletions, insertions, substitutions, translocations, inversions, duplications, and any combination thereof. Representative TT4 gene mutations include the mutation shown in SEQ ID NO:119 that results in the truncated TT4 mutant polypeptide of SEQ ID NO:120. Representative TT4 gene mutations also include the mutations shown in SEQ ID NO:117 and 182 that result in the TT4 mutant polypeptides of SEQ ID NO: 118 and 183, respectively. Representative pennycress varieties with TT4 gene mutations include the tt4-1, tt4-2, tt4-3, A 7-229, E5-582 and E5-549 varieties.

In certain embodiments, a WT pennycress TT5, TT9, TT15, TT18, or TT19 coding sequence can have a sequence that deviates from the coding sequence set forth above (e.g., SEQ ID NO:60, 72, 42, 48, or 51, respectively), and is referred to as an allelic variant sequence. In certain embodiments, a TT5, TT9, TT15, TT18, or TT19 coding sequence allelic variant can have at least 80, at least 85, at least 90, at least 95, at least 98, or at least 99 percent sequence identity to SEQ ID NO:60, 72, 42, 48, or 51, respectively. In certain embodiments, a WT pennycress TT5, TT9, TT15, TT18, or TT19 polypeptide can have a sequence that deviates from the polypeptide sequence set forth above (SEQ ID NO:61, 73, 43, 49, or 52, respectively), and is referred to as an allelic variant sequence. For example, a TT5, TT9, TT15, TT18, or TT19 polypeptide allelic variant can have at least 80, at least 85, at least 90, at least 95, at least 98, or at least 99 percent sequence identity to SEQ ID NO:61, 73, 43, 49, or 52, respectively. A TT5, TT9, TT15, TT18, or TT19 polypeptide allelic variant can have one or more (e.g., 2, 3, 4, 5, 6, 7, 8, 9, or 10) amino acid modifications (e.g., substitutions) relative to SEQ ID NO:61, 73, 43, 49, or 52, respectively.

In certain embodiments, pennycress seed lots having reduced fiber as described herein can include a loss-of-function modification in a TT5, TT9, TT15, TT18, or TT19 encoding gene or a transgene that suppresses expression of the TT5, TT9, TT15, TT18, or TT19 gene. As used herein, a loss-of-function mutation in a TT5 gene can be any modification that is effective to reduce TT5, TT9, TT15, TT18, or TT19 polypeptide expression or TT5, TT9, TT15, TT18, or TT19 polypeptide function. In certain embodiments, TT5, TT9, TT15, TT18, or TT19 polypeptide expression and/or TT5, TT9, TT15, TT18, or TT19 polypeptide function can be eliminated or reduced. Examples of genetic modifications include, without limitation, deletions, insertions, substitutions, translocations, inversions, duplications, and any combination thereof.

In certain embodiments, a WT pennycress TT6 coding sequence can have a sequence that deviates from the coding sequence set forth above (e.g., SEQ ID NO:63), and is referred to as an allelic variant sequence. In certain embodiments, a TT6 coding sequence allelic variant can have at least 80, at least 85, at least 90, at least 95, at least 98, or at least 99 percent sequence identity to SEQ ID NO:63. In certain embodiments, a WT pennycress TT6 polypeptide can have a sequence that deviates from the polypeptide sequence set forth above (SEQ ID NO:64), and is referred to as an allelic variant sequence. For example, a TT6 polypeptide allelic variant can have at least 80, at least 85, at least 90, at least 95, at least 98, or at least 99 percent sequence identity to SEQ ID NO:64. A TT6 polypeptide allelic variant can have one or more (e.g., 2, 3, 4, 5, 6, 7, 8, 9, or 10) amino acid modifications (e.g., substitutions) relative to SEQ ID NO:64.

In certain embodiments, pennycress seed lots having reduced fiber as described herein can include a loss-of-function modification in a TT6 encoding gene or a transgene that suppresses expression of the TT6 gene. As used herein, a loss-of-function mutation in a TT6 gene can be any modification that is effective to reduce TT6 polypeptide expression or TT6 polypeptide function. In certain embodiments, reduced TT6 polypeptide expression and/or TT6 polypeptide function can be eliminated or reduced. Examples of genetic modifications include, without limitation, deletions, insertions, substitutions, translocations, inversions, duplications, and any combination thereof. Representative TT6 gene mutations include the mutation shown in SEQ ID NO:121 that results in the TT6 mutant polypeptide of SEQ ID NO:122. Representative pennycress varieties with TT6 gene mutations mutants include the tt6-1 and AX17 varieties. Representative TT6 gene mutations also include the mutation shown in SEQ ID NO:123 that results in the TT6 mutant polypeptide of SEQ ID NO:124. Representative pennycress varieties with TT6 gene mutations mutants also include the tt6-1, tt6-2 and Q36 varieties.

In certain embodiments, a WT pennycress TT7 coding sequence can have a sequence that deviates from the coding sequence set forth above (e.g., SEQ ID NO:66), and is referred to as an allelic variant sequence. In certain embodiments, a TT7 coding sequence allelic variant can have at least 80, at least 85, at least 90, at least 95, at least 98, or at least 99 percent sequence identity to SEQ ID NO:66. In certain embodiments, a WT pennycress TT7 polypeptide can have a sequence that deviates from the polypeptide sequence set forth above (SEQ ID NO:67), and is referred to as an allelic variant sequence. For example, a TT7 polypeptide allelic variant can have at least 80, at least 85, at least 90, at least 95, at least 98, or at least 99 percent sequence identity to SEQ ID NO:67. A TT7 polypeptide allelic variant can have one or more (e.g., 2, 3, 4, 5, 6, 7, 8, 9, or 10) amino acid modifications (e.g., substitutions) relative to SEQ ID NO:67.

In certain embodiments, pennycress seed lots having reduced fiber as described herein can include a loss-of-function modification in a TT7 encoding gene or a transgene that suppresses expression of the TT7 gene. As used herein, a loss-of-function mutation in a TT7 gene can be any modification that is effective to reduce TT7 polypeptide expression or TT7 polypeptide function. In certain embodiments, reduced TT7 polypeptide expression and/or TT7 polypeptide function can be eliminated or reduced. Examples of genetic modifications include, without limitation, deletions, insertions, substitutions, translocations, inversions, duplications, and any combination thereof. Representative TT7 gene mutations include the mutation shown in SEQ ID NO:125 that results in the TT7 mutant polypeptide of SEQ ID NO:126. Representative pennycress varieties with TT7 gene mutations include the tt7-1, A7-3, E5-586, E5-484 P15, and E5-484 P5 varieties.

In certain embodiments, a WT pennycress TTG1 coding sequence can have a sequence that deviates from the coding sequence set forth above (e.g., SEQ ID NO:75), and is referred to as an allelic variant sequence. In certain embodiments, a TTG1 coding sequence allelic variant can have at least 80, at least 85, at least 90, at least 95, at least 98, or at least 99 percent sequence identity to SEQ ID NO:75. In certain embodiments, a WT pennycress TTG1 polypeptide can have a sequence that deviates from the polypeptide sequence set forth above (SEQ ID NO:76), and is referred to as an allelic variant sequence. For example, a TTG1 polypeptide allelic variant can have at least 80, at least 85, at least 90, at least 95, at least 98, or at least 99 percent sequence identity to SEQ ID NO:28 or 31. A TTG1 polypeptide allelic variant can have one or more (e.g., 2, 3, 4, 5, 6, 7, 8, 9, or 10) amino acid modifications (e.g., substitutions) relative to SEQ ID NO:76.

In certain embodiments, pennycress seed lots having reduced fiber as described herein can include a loss-of-function (LOF) modification in a TTG1 encoding gene or a transgene that suppresses expression of the TTG1 gene. As used herein, a loss-of-function mutation in a TTG1 gene can be any modification that is effective to reduce TTG1 polypeptide expression or TTG1 polypeptide function. In certain embodiments, reduced TTG1 polypeptide expression and/or TTG1 polypeptide function can be eliminated or reduced. Examples of genetic modifications include, without limitation, deletions, insertions, substitutions, translocations, inversions, duplications, and any combination thereof. In certain embodiments, a LOF mutation in a TTG1 gene can comprise a 21 bp deletion in the TTG1 coding sequence as shown in SEQ ID NO:165. In other embodiments, a LOF mutation in a TTG1 gene can comprise ttg1-1 and ttg1-2 mutant alleles having single nucleotide substitutions that result in the substitution of a conserved amino acid residue in the TTG protein (SEQ ID NOs:167-170). Representative TTG1 gene mutations thus include the mutations shown in SEQ ID NO:165, 167, and 169 that result in the TTG1 mutant polypeptides of SEQ ID NO:166, 1268, and 170, respectively. Representative pennycress varieties with TTG1 gene mutations include the Y1067, Y1126, ttg1-1, E5-544, ttg1-2, and A7-187 varieties.

In certain embodiments, a WT pennycress TT10 coding sequence can have a sequence that deviates from the coding sequence set forth above (e.g., SEQ ID NO:33), and is referred to as an allelic variant sequence. In certain embodiments, a TT10 coding sequence allelic variant can have at least 80, at least 85, at least 90, at least 95, at least 98, or at least 99 percent sequence identity to SEQ ID NO:33. In certain embodiments, a WT pennycress TT10 polypeptide can have a sequence that deviates from the polypeptide sequence set forth above (SEQ ID NO:34), and is referred to as an allelic variant sequence. For example, a TT10 polypeptide allelic variant can have at least 80, at least 85, at least 90, at least 95, at least 98, or at least 99 percent sequence identity to SEQ ID NO:34. A TT10 polypeptide allelic variant can have one or more (e.g., 2, 3, 4, 5, 6, 7, 8, 9, or 10) amino acid modifications (e.g., substitutions) relative to SEQ ID NO:34.

In certain embodiments, pennycress seed lots having reduced fiber as described herein can include a loss-of-function modification in a TT10 encoding gene or a transgene that suppresses expression of the TT10 gene. As used herein, a loss-of-function mutation in a TT10 gene can be any modification that is effective to reduce TT10 polypeptide expression or TT10 polypeptide function. In certain embodiments, reduced TT10 polypeptide expression and/or TT10 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT10 encoding gene or a transgene that suppresses expression of the TT10 gene. As used herein, a loss-of-function mutation in a TT10 gene can be any modification that is effective to reduce TT10 polypeptide expression or TT10 polypeptide function. In certain embodiments, reduced TT10 polypeptide expression and/or TT10 polypeptide function can be eliminated or reduced. Examples of genetic modifications include, without limitation, deletions, insertions, substitutions, translocations, inversions, duplications, and any combination thereof. Representative TT10 gene mutations include the mutations shown in SEQ ID NO:139, 141, 143, 145, or 147 that result in the TT10 mutant polypeptides of SEQ ID NO: 140, 142, 144, 146, or 148, respectively. Representative pennycress varieties with TT10 gene mutations include the tt10-1, tt10-2, tt10-1, tt10-12, tt10-/3, E5-539, E5-543, and E5-545 varieties.

In certain embodiments, a WT pennycress TT12 coding sequence can have a sequence that deviates from the coding sequence set forth above (e.g., SEQ ID NO:36), and is referred to as an allelic variant sequence. In certain embodiments, a TT12 coding sequence allelic variant can have at least 80, at least 85, at least 90, at least 95, at least 98, or at least 99 percent sequence identity to SEQ ID NO:36. In certain embodiments, a WT pennycress TT12 polypeptide can have a sequence that deviates from the polypeptide sequence set forth above (SEQ ID NO:37), and is referred to as an allelic variant sequence. For example, a TT12 polypeptide allelic variant can have at least 80, at least 85, at least 90, at least 95, at least 98, or at least 99 percent sequence identity to SEQ ID NO:37. A TT12 polypeptide allelic variant can have one or more (e.g., 2, 3, 4, 5, 6, 7, 8, 9, or 10) amino acid modifications (e.g., substitutions) relative to SEQ ID NO:37.

In certain embodiments, pennycress seed lots having reduced fiber as described herein can include a loss-of-function modification in a TT12 encoding gene or a transgene that suppresses expression of the TT12 gene. As used herein, a loss-of-function mutation in a TT12 gene can be any modification that is effective to reduce TT12 polypeptide expression or TT12 polypeptide function. In certain embodiments, reduced TT12 polypeptide expression and/or TT12 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT12 encoding gene or a transgene that suppresses expression of the TT12 gene. As used herein, a loss-of-function mutation in a TT12 gene can be any modification that is effective to reduce TT12 polypeptide expression or TT12 polypeptide function. In certain embodiments, reduced TT12 polypeptide expression and/or TT12 polypeptide function can be eliminated or reduced. Examples of genetic modifications include, without limitation, deletions, insertions, substitutions, translocations, inversions, duplications, and any combination thereof. Representative TT12 gene mutations include the mutations shown in SEQ ID NO:149 or 151 that result in the TT12 mutant polypeptides of SEQ ID NO:150 or 152, respectively. Representative pennycress varieties with TT12 gene mutations include the tt12-1, tt12-2, A7-261, and J22 varieties.

In certain embodiments, a WT pennycress TT13 coding sequence can have a sequence that deviates from the coding sequence set forth above (e.g., SEQ ID NO:39), and is referred to as an allelic variant sequence. In certain embodiments, a TT13 coding sequence allelic variant can have at least 80, at least 85, at least 90, at least 95, at least 98, or at least 99 percent sequence identity to SEQ ID NO:39. In certain embodiments, a WT pennycress TT13 polypeptide can have a sequence that deviates from the polypeptide sequence set forth above (SEQ ID NO:40), and is referred to as an allelic variant sequence. For example, a TT13 polypeptide allelic variant can have at least 80, at least 85, at least 90, at least 95, at least 98, or at least 99 percent sequence identity to SEQ ID NO:40. A TT13 polypeptide allelic variant can have one or more (e.g., 2, 3, 4, 5, 6, 7, 8, 9, or 10) amino acid modifications (e.g., substitutions) relative to SEQ ID NO:40.

In certain embodiments, pennycress seed lots having reduced fiber as described herein can include a loss-of-function modification in a TT13 encoding gene or a transgene that suppresses expression of the TT13 gene. As used herein, a loss-of-function mutation in a TT13 gene can be any modification that is effective to reduce TT13 polypeptide expression or TT13 polypeptide function. In certain embodiments, reduced TT13 polypeptide expression and/or TT13 polypeptide function can be eliminated or reduced. Examples of genetic modifications include, without limitation, deletions, insertions, substitutions, translocations, inversions, duplications, and any combination thereof. Representative TT13 gene mutations include the mutations shown in SEQ ID NO:153, 155, or 157 that result in the TT13 mutant polypeptides of SEQ ID NO:154, 156, or 158, respectively. Representative pennycress varieties with TT13 gene mutations include the tt13-1, tt13-2, tt13-3, aha10-1, J22, and P32 E5-540 varieties.

In certain embodiments, a WT pennycress TT16 coding sequence can have a sequence that deviates from the coding sequence set forth above (e.g., SEQ ID NO:45), and is referred to as an allelic variant sequence. In certain embodiments, a TT16 coding sequence allelic variant can have at least 80, at least 85, at least 90, at least 95, at least 98, or at least 99 percent sequence identity to SEQ ID NO:45. In certain embodiments, a WT pennycress TT16 polypeptide can have a sequence that deviates from the polypeptide sequence set forth above (SEQ ID NO:46), and is referred to as an allelic variant sequence. In certain embodiments, a TT16 polypeptide allelic variant can have at least 80, at least 85, at least 90, at least 95, at least 98, or at least 99 percent sequence identity to SEQ ID NO:46. A TT16 polypeptide allelic variant can have one or more (e.g., 2, 3, 4, 5, 6, 7, 8, 9, or 10) amino acid modifications (e.g., substitutions) relative to SEQ ID NO:46.

In certain embodiments, pennycress seed lots having reduced fiber as described herein can include a loss-of-function modification in a TT16 encoding gene or a transgene that suppresses expression of the TT16 gene. As used herein, a loss-of-function mutation in a TT16 gene can be any modification that is effective to reduce TT16 polypeptide expression or TT16 polypeptide function. In certain embodiments, reduced TT16 polypeptide expression and/or TT16 polypeptide function can be eliminated or reduced. Examples of genetic modifications include, without limitation, deletions, insertions, substitutions, translocations, inversions, duplications, and any combination thereof.

In certain embodiments, pennycress seed lots having reduced fiber as described herein can include a loss-of-function modification in a TT16 encoding gene or a transgene that suppresses expression of the TT16 gene. As used herein, a loss-of-function mutation in a TT16 gene can be any modification that is effective to reduce TT16 polypeptide expression or TT16 polypeptide function. In certain embodiments, reduced TT16 polypeptide expression and/or TT16 polypeptide function can be eliminated or reduced. Examples of genetic modifications include, without limitation, deletions, insertions, substitutions, translocations, inversions, duplications, and any combination thereof. Representative TT16 gene mutations include the mutations shown in SEQ ID NO:159, 161, or 163 that result in the TT16 mutant polypeptides of SEQ ID NO:160, 162, or 164, respectively. Representative pennycress varieties with TT16 gene mutations include the tt16-1, tt16-2, and tt16-3 varieties.

In certain embodiments, a genome editing system such as a CRISPR-Cas9 system can be used to introduce one or more loss-of-function mutations into genes such as the *TRANSPARENT TESTA* (TT) and related genes provided herewith in Table 1 and the sequence listing that are associated with agronomically-relevant seed traits including reduced seed coat fiber, lighter-colored seed coat due to reduced proanthocyanidins content, increased protein content, and/or higher seed oil content. For example, a CRISPR-Cas9 vector can include at least one guide sequence specific to a pennycress TT2 sequence (see, e.g., SEQ ID NO:1) and/or at least one guide sequence specific to a pennycress TT8 sequence (see, e.g., SEQ ID NO:5). A Cas9 enzyme will bind to and cleave within the gene when the target site is followed by a PAM sequence. For example, the canonical SpCAS9 PAM site is the sequence 5'-NGG-3', where N is any nucleotide followed by two guanine (G) nucleotides. The Cas9 component of a CRISPR-Cas9 system designed to introduce one or more loss-of-function modifications described herein can be any appropriate Cas9. In certain embodiments, the Cas9 of a CRISPR-Cas9 system described herein can be a *Streptococcus pyogenes* Cas9 (SpCas9). One example of an SpCas9 is described in (Fauser et al., 2014).

In certain embodiments, a WT pennycress GL3 coding sequence can have a sequence that deviates from the coding sequence set forth above (e.g., SEQ ID NO:171), and is referred to as an allelic variant sequence. In certain embodiments, a GL3 coding sequence allelic variants can have at least 80, at least 85, at least 90, at least 95, at least 98, or at least 99 percent sequence identity to SEQ ID NO:171. In certain embodiments, a WT pennycress GL3 polypeptide can have a sequence that deviates from the polypeptide sequence set forth above (SEQ ID NO:172), and is referred to as an allelic variant sequence. For example, a GL3 polypeptide allelic variant can have at least 80, at least 85, at least 90, at least 95, at least 98, or at least 99 percent sequence identity to SEQ ID NO:160. A GL3 polypeptide allelic variant can have one or more (e.g., 2, 3, 4, 5, 6, 7, 8, 9, or 10) amino acid modifications (e.g., substitutions) relative to SEQ ID NO:172.

In certain embodiments, pennycress seed lots having reduced fiber as described herein can include a loss-of-function modification in a GL3 encoding gene or a transgene that suppresses expression of the GL3 gene. As used herein, a loss-of-function mutation in a GL3 gene can be any modification that is effective to reduce GL3 polypeptide expression or GL3 polypeptide function. In certain embodiments, GL3 polypeptide expression and/or GL3 polypeptide function can be eliminated or reduced. Examples of genetic modifications include, without limitation, deletions, insertions, substitutions, translocations, inversions, duplications, and any combination thereof. In certain embodiments, the GL3 mutation can comprise the coding sequence mutations of SEQ ID NO:174, 176, 178 and/or the protein sequence mutation of SEQ ID NO:175, 177, 180. Representative pennycress varieties with GL3 gene mutations include the gl3-1, gl3-2, gl3-3, E5-541, E5-559, A7-92, E5-444, A7-229, and E5-582 varieties.

In certain embodiments, a WT pennycress BAN-ANR (or BAN) coding sequence can have a sequence that deviates from the coding sequence set forth above (e.g., SEQ ID NO:9), and is referred to as an allelic variant sequence. In certain embodiments, a BAN coding sequence allelic variant can have at least 80, at least 85, at least 90, at least 95, at least 98, or at least 99 percent sequence identity to SEQ ID NO:9. In certain embodiments, a WT pennycress BAN polypeptide can have a sequence that deviates from the polypeptide sequence set forth above (SEQ ID NO:10), and is referred to as an allelic variant sequence. For example, a BAN polypeptide allelic variant can have at least 80, at least 85, at least 90, at least 95, at least 98, or at least 99 percent sequence identity to SEQ ID NO:10. A BAN polypeptide allelic variant can have one or more (e.g., 2, 3, 4, 5, 6, 7, 8, 9, or 10) amino acid modifications (e.g., substitutions) relative to SEQ ID NO:10.

In certain embodiments, pennycress seed lots having reduced fiber as described herein can include a loss-of-function modification in a BAN encoding gene or a transgene that suppresses expression of the BAN gene. As used herein, a loss-of-function mutation in a BAN gene can be any modification that is effective to reduce BAN polypeptide expression and/or BAN polypeptide function. In certain embodiments, BAN polypeptide expression and/or BAN polypeptide function can be eliminated or reduced. Examples of genetic modifications include, without limitation, deletions, insertions, substitutions, translocations, inversions, duplications, and any combination thereof. In certain embodiments, the BAN mutation can comprise the coding sequence mutation of SEQ ID NO:180 and/or the protein sequence mutation of SEQ ID NO:181. Representative pennycress varieties with BAN gene mutations include the ban-1, BJ8, and BJ8D varieties.

In certain embodiments, pennycress seeds or seed lots having reduced fiber, as well as pennycress seed meal obtained therefrom (including both defatted and non-defatted seed meal), as described herein can include a loss-of-function mutation in more than one of the genes or coding sequences set forth in Table 1. In certain embodiments, pennycress seeds or seed lots having reduced fiber can have a LOF mutation in the gene(s) and/or coding sequences of any combination of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80,171, 173, and/or any allelic variants thereof. In certain embodiments, pennycress seed meal, including de-fatted and non-defatted forms) and having reduced fiber can comprise a detectable amount of any combination of nucleic acids having a LOF mutation in the gene(s) and/or coding sequences of any combination of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and/or any allelic variants thereof.

The LOF mutations in any of the genes or coding sequences of Table 1 can be introduced by a variety of methods. Methods for introduction of the LOF mutations include, but are not limited to, traditional mutagenesis (e.g., with EMS or other mutagens), TILLING, meganucleases, zinc finger nucleases, transcription activator-like effector nucleases, clustered regularly interspaced short palindromic repeat (CRISPR)-associated nuclease (e.g., *S. pyogenes* Cas9 and its variants, *S. aureus* Cas9 and its variants, eSpCas9, Cpf1, Cms1 and their variants) targetrons, and the like. Various tools that can be used to introduce mutations into genes have been disclosed in Guha et al. Comput Struct Biotechnol J. 2017; 15: 146-160. Methods for modifying genomes by use of Cpf1 or Csm1 nucleases are disclosed in US Patent Application Publication 20180148735, which is incorporated herein by reference in its entirety, and can be adapted for introduction of the LOF mutations disclosed herein. Methods for modifying genomes by use of CRISPR/CAS systems are disclosed in US Patent Application Publication 20180179547, which is incorporated herein by reference in its entirety, and can be adapted for introduction of the LOF mutations disclosed herein. The genome editing reagents described herein can be introduced into a pennycress plant by any appropriate method. In certain embodiments, nucleic acids encoding the genome editing reagents can be introduced into a plant cell using *Agrobacterium* or *Ensifer* mediated transformation, particle bombardment, liposome delivery, nanoparticle delivery, electroporation, polyethylene glycol (PEG) transformation, or any other method suitable for introducing a nucleic acid into a plant cell. In certain embodiments, the Site-Specific Nuclease (SSN) or other expressed gene editing reagents can be delivered as RNAs or as proteins to a plant cell and the RT, if one is used, can be delivered as DNA.

The disclosure will be further described in the following examples, which do not limit the scope of the disclosure described in the claims.

EXAMPLES

Example 1: Meal Made from Wild Type Pennycress Plants is High in Fiber, but Low in Metabolizable Energy Higher dietary fiber results in lower net energy for swine (Kil et al., 2013) and poultry (Meloche et al., 2013). It was also reported that hemicellulose displayed the strongest correlation with apparent metabolizable energy (AMEn), followed by neutral detergent fiber (NDF), total dietary fiber (TDF), and crude fiber (CF) in broilers fed corn co-products (Rochelle et al., 2011). Thus, a reduction in fiber will result in increased available energy to pigs and poultry.

When comparing mechanically expeller-pressed meals made from two USDA-developed pennycress varieties (Beecher and Ruby II) to mechanically expeller-pressed canola meal, the various fiber fractions when analyzed as crude fiber (CF), acid detergent fiber (ADF), neutral detergent fiber (NDF) and total dietary fiber (TDF) were 1.5-2 times the levels in canola meal (Table 2). Similar levels were observed when comparing different lots of pennycress meal with canola meal (Table 3). Analysis conducted by Arvegenix at University of Georgia showed similar results (Table 4).

TABLE 2

Nutrient composition of mechanically expeller-pressed canola and pennycress meals produced at Dairyland by Arvegenix in August 2015. All numbers are in percent dry weight (% DW).

| Meal Constituent | Expeller-Pressed Canola Meal | Pennycress Meal (Beecher) | Pennycress Meal (Ruby II) |
|---|---|---|---|
| Crude Protein | 38.7 | 31.3 | 31.1 |
| Either extract | 11.2 | 10.1 | 10.6 |
| Crude fiber | 10.9 | 27.1 | 27.9 |
| ADF | 18.1 | 35.6 | 33.8 |
| NDF | 22.7 | 40.5 | 36.8 |
| Total Dietary Fiber | 29.5 | 43.3 | 37.8 |

TABLE 5

Total metabolizable energy corrected for nitrogen (TMEn) for mechanically expeller-pressed canola and pennycress meal when fed to chickens.

| | Mech Pennycress Meal (Beecher) | Mech Canola Meal | Difference, % |
|---|---|---|---|
| Energy | Parsons 2015 | Parsons 2006 | |
| TMEn (kcal/g DM) | 2.455 | 3 | −18.17 |

TABLE 3

Lot variation in proximate values in mechanically expeller-pressed pennycress meal, composite mechanically expeller-pressed pennycress meal blend (all produced by Arvegenix), and commercially available mechanically expeller-pressed canola (ME Canola). All numbers represent the average of duplicate analytical runs for mean and standard error measured in percent dry weight (% DW).

| | Meal Constituent Processing Date(s) | | | | | |
|---|---|---|---|---|---|---|
| | Lot 1 22 Jul. 2015 | Lot 2 23 Jul. 2015 | Lot 3 23 Jul. 2015 | Lot 4 23 Jul. 2015 | Blend* 22-27 Jul. 2015 | ME Canola N/A |
| Moisture (% FW) | 2.12 ± 0.08 | 6.10 ± 0.1 | 5.20 ± 0.01 | 4.06 ± 0.08 | 3.36 ± 0.05 | 4.41 ± 0.13 |
| Ash Content | 7.32 ± 0.06 | 7.24 ± 0.1 | 7.13 ± 0.01 | 7.17 ± 0.02 | 5.62 ± 2.38 | 6.88 ± 0.02 |
| Carbohydrates | 51.4 ± 0.07 | 50.9 ± 0.7 | 50.9 ± 0.14 | 49.7 ± 0.07 | 49.8 ± 2.26 | 40.7 ± 1.3 |
| Crude Fat | 8.99 ± 0.03 | 10.3 ± 0.01 | 10.6 ± 0.14 | 11.1 ± 0.01 | 11.6 ± 0.01 | 13.5 ± 1.5 |
| Crude Protein | 32.2 ± 0.1 | 31.6 ± 0.7 | 31.4 ± 0.1 | 32.0 ± 0.01 | 33.1 ± 0.1 | 38.9 ± 0.2 |
| Crude Fiber | 28.7 ± 1.2 | 29.5 ± 2.1 | 30.3 ± 0.2 | 28.0 ± 0.1 | 26.4 ± 0.6 | 10.9 ± 0.5 |
| Acid Detergent Fiber | 37.9 ± 0.5 | 38.7 ± 0.1 | 36.7 ± 2.8 | 36.8 ± 0.5 | 32.1 ± 0.8 | 18.25 ± 0.1 |
| Neutral Detergent Fiber | 39.8 ± 0.6 | 39.9 ± 0.1 | 39.5 ± 0.8 | 38.5 ± 0.6 | 34.8 ± 2.0 | 23.3 ± 0.2 |
| Total Dietary Fiber | 41.6 ± 1.2 | 41.2 ± 1.2 | 41.0 ± 1.0 | 39.0 ± 0.1 | 42.2 ± 7.4 | 29.7 ± 1.3 |

*The Blend sample, consisting of Lots 1-4 (~66% by we'ght) and Lot 5 (~33% by weight), was blended and analyzed for nutrition studies.

TABLE 4

Proximate compositions (% as is) for canola meal (CM) and pennycress meal samples.

| | CM [1] | PM [2] |
|---|---|---|
| Crude Protein | 36.7 | 32.0 |
| Fat | 11.4 | 8.61 |
| Crude Fiber | 9.27 | 19.9 |
| ADF [3] | 18.3 | 39.6 |
| NDF [4] | 22.7 | 43.0 |
| Ash | 6.51 | 7.57 |
| Dry Matter | 94.1 | 94.4 |

Total Metabolizable Energy (TMEn) corrected for nitrogen was measured in mechanically expeller-pressed pennycress meal and canola meal. TMEn was found to be 18.2% or 18.9% less in the pennycress meal as compared to the canola meal when fed to chickens due to the higher fiber content (Table 5) and Metabolizable Energy (ME) was 16% less in pennycress meal as compared to the canola meal when fed to pigs due to the higher fiber content (Table 6).

TABLE 6

Concentration of digestible energy (DE) and metabolizable energy (ME) in pennycress expeller and canola expellers when fed to pigs (data[1] produced at University of Illinois).

| | Ingredients | | | |
|---|---|---|---|---|
| Item | Pennycress expellers | Canola expellers | SEM | P - value |
| DE, kcal/kg | 3,191 | 3,582 | 92.18 | 0.009 |
| DE, kcal/kg of DM | 3,536 | 3,833 | 99.43 | 0.053 |
| ME, kcal/kg | 2,652 | 3,269 | 143.98 | 0.009 |
| ME, kcal/kg of DM | 2,938 | 3,499 | 158.17 | 0.025 |

[1]Data are means of 8 observations per treatment. SEM abbreviation stands for standard error of the mean. DM abbreviation is for Dry Matter.

In summary, Beecher and Ruby II varieties of pennycress meal contain between 1.5× to 2× the fiber content as compared to similarly processed canola meal resulting in 18-19% less energy when fed to chickens and pigs. Reduction in the fiber content of pennycress to levels of those in canola should result in a significant increase in value and energy to poultry and pigs.

Example 2: Selection of Mutant Pennycress Plants Low in Fiber, High in Oil and Protein from Cultivated Isolates About 850 wildtype pennycress seed samples exhibited a dark-brown seed coat were collected. These wildtype samples were then cultivated as independent lines for over two seasons in over 10,000 unique and managed plots. Upon careful analysis of the harvests from these dark type plantings, a few individual seeds which were yellow in color were identified in only two of the 850 cultivated lines (Table 2) and selected for further propagation and breeding. Certain selected pennycress variant lines Y1067 and Y1126 were isolated from a cultivated field in Grantfork Ill. Certain selected pennycress Y1126 lines were isolated from a cultivated field in Macomb Ill. in 2015. As no yellow pennycress seeds were reported to date, initially, the isolates were first assumed to be weed seeds from a species other than pennycress. However, upon careful evaluations of plants grown from these seeds in the greenhouse, they were positively identified as pennycress using visual (plant morphology) and molecular (PCR/sequencing) inspections. The selected Y1067 and Y1126 lines were then carefully grown as single seed isolates to produce progeny lines which consisted of 100% yellow seeds. The yellow seed coat trait in the selected Y1067 and Y1126 lines has now been confirmed to be stable for several generations in both greenhouse and field environments.

Seeds from the yellow-seeded lines (Y1067 and Y1126) were carefully bulked up and sent to an analytical lab (Dairyland Laboratories) for analysis. Upon removal of the oil using standard defatting procedure, a small amount of yellow pennycress meal was produced and determined to have an ADF level (adjusted for oil content) of 15.5% and 11.5% vs. 27.5% in wild type, demonstrating 43-58% reduction in ADF fiber. Other measurements of fiber content such as NDF and CF were also significantly (29-55%) lower in the yellow-seeded lines relative to wild type, while the protein level was significantly (~50%) higher. The composition of yellow and dark brown seeds is listed in Table 7. The yellow Y1067 and Y1126 lines have since been crossed with "regular" dark brown-seeded pennycress and demonstrated a non-reciprocal pattern of inheritance indicating that yellow seed coat is a maternally inherited trait.

TABLE 7

The composition of meal (adjusted for oil content) made from yellow and dark brown seeds (Dairyland Laboratories, Arcadia, Wisconsin).

| Pennycress line | Seed coat color | % moisture | ADF fiber | NDF fiber | Crude fiber | Protein |
|---|---|---|---|---|---|---|
| Y1067 | yellow | 6.63 | 15.5 | 22.3 | 15.5 | 32.4 |
| Y1126 | yellow | 6.38 | 11.5 | 15.2 | 9.9 | 31.9 |
| 1063 | dark brown | 7.39 | 27.2 | 30.6 | 22.6 | 21.3 |
| 1067 | dark brown | 7.29 | 26.6 | 29.8 | 19.9 | 19.8 |
| 1126 | dark brown | 6.43 | 28.4 | 33.7 | 24.7 | 24.6 |
| 1139 | dark brown | 6.50 | 26.4 | 29.8 | 19.9 | 22.4 |
| 1204 | dark brown | 6.58 | 26.3 | 28.9 | 18.7 | 20.9 |
| 1228 | dark brown | 6.30 | 28.8 | 33.8 | 25.4 | 22.1 |
| 1326 | dark brown | 6.47 | 29.2 | 32.6 | 23.4 | 21.7 |
| 2032 | dark brown | 6.16 | 24.7 | 28.8 | 17.6 | 22.1 |
| 2084 | dark brown | 6.89 | 26.0 | 29.0 | 19.4 | 22.2 |
| 2116 | dark brown | 7.16 | 30.4 | 36.2 | 24.4 | 20.1 |
| 2133 | dark brown | 6.64 | 29.6 | 34.4 | 25.0 | 21.5 |
| 2206 | dark brown | 6.69 | 25.5 | 29.4 | 18.1 | 20.7 |
| 2229 | dark brown | 6.61 | 27.1 | 32.5 | 23.0 | 21.9 |
| 2253 | dark brown | 6.42 | 24.0 | 28.3 | 17.8 | 22.5 |
| 2288 | dark brown | 6.28 | 26.6 | 33.0 | 25.5 | N/A |
| 2329 | dark brown | 6.57 | 26.6 | 31.9 | 18.8 | 20.8 |
| 2369 | dark brown | 6.05 | 23.1 | 26.7 | 17.9 | 23.2 |
| 2458 | dark brown | 6.39 | 25.4 | 29.8 | 18.8 | 22.2 |
| 2460 | dark brown | 6.49 | 30.6 | 36.3 | 26.7 | 21.2 |
| 2369 | light brown | 6.50 | 36.9 | 45.8 | 32.1 | 19.1 |
| Average | yellow | 6.51 | 13.5 | 18.7 | 12.7 | 32.2 |
| Average | dark brown | 6.59 | 27.5 | 32.1 | 22.0 | 21.6 |
| % change | yellow | Y1067 | −43% | −30% | −29% | 50% |
| % change | yellow | Y1126 | −58% | −53% | −55% | 48% |

Example 3: Identification of Mutated Gene in Pennycress Plants Low in Fiber, High in Oil and Protein from Cultivated Isolates In order to determine molecular nature of the mutations responsible for the low fiber, high oil/high protein phenotype in Y1067 and Y1126 lines, a combination of a genetic method called bulk segregant analysis (Michelmore et. al., 1991) and a next generation sequencing (NGS) method was used. In brief, for each of the yellow-seeded lines, a genetically close black-seeded relative line was identified and 200 individuals from each population were grown. They were harvested in bulk and used for DNA isolation that was subsequently used for preparation of NGS libraries and sequencing using standard Illumina technology. It was determined that Y1067 and Y1126 lines carry the same 21 bp deletion in TTG1 gene (Seq ID No. 165) by analyzing the sequencing data through comparative bioinformatics techniques. Comparative bioinformatics tools that were used in part to analyze the data are disclosed in Magwene et. al., 2011. This mutation results in a deletion of 7 amino acids in the conserved area of TTG1 protein, likely leading to a complete loss of function. The definitive nature of this 21 bp deletion was confirmed in heterologous (black ♀ ×yellow ♂) crosses, where only the progeny of F2 segregants carrying the described deletion displayed the yellow-seeded phenotype.

Example 4: Generation and Characterization of EMS-Mutagenized Light-Colored Seed Coat Mutant Lines BC38, BJ8, P32, J22, Q36, BD24, AX17, E5-444, E5-540, E5-541, E5-542, E5-543, E5-545, E5-547, E5-549, E5-582, E5-586, D3-N10 P5, D5-191, A7-95, A7-187 and A7-261

In addition to mutants carrying domestication enabling traits selected from natural isolates, light colored pennycress mutants were isolated from a mutant population created using chemical mutagen (EMS) using the protocol described in the Materials and Methods section below.

To identify useful domestication genes in pennycress plants, pennycress seeds were mutagenized with several different mutagens, including ethyl methanesulfonate (EMS), fast neutrons (FN) and gamma rays (γ rays). Treatment of dry plant seeds with mutagens results in the generation of distinct sets of mutations in a variety of cells in the seed. The fate of many of these cells can be followed when a mutation in one of these cells results in a visible phenotype creating a marked plant sector.

Pennycress plants exhibiting domestication enabling traits such as reduced seed coat fiber, lighter-colored seed coat due to reduced proanthocyanidins content, and/or higher seed oil content were analyzed and loss of function mutations in domestication genes were identified.

Materials and Methods

Solutions:

| | | | |
|---|---|---|---|
| A) | 0.2M sodium phosphate monobasic ($NaH_2PO_4$*$H_2O$) | | 6.9 g/250 mL |
| B) | 0.2M sodium phosphate dibasic ($NaH_2PO_4$ anhydrous) | | 7.1 g/250 mL |
| For 50 mL of 0.1M sodium phosphate buffer at pH 7: | | | |
| | 9.75 mL | A | |
| | 15.25 mL | B | |
| | 25.0 mL | $dH_2O$ | |
| 0.2% EMS in buffer: | | | |
| | 20 mL 0.1M Sodium Phosphate Buffer, pH 7 | | |
| | 40 μL EMS liquid (Sigma #M0880-5G) | | |
| 0.1M sodium thiosulfate at pH 7.3: | | | |
| | 12.4 g sodium thiosulfate in 500 mL | | |

Primary Seed Surface Sterilization

Wild-type pennycress (*Thlaspi arvense*) seeds (Spring 32 ecotype) were surface sterilized for 10 minutes in a 30% bleach, 0.05% SDS solution before being rinsed 3× with sterile water. Sterilized seeds were immediately subjected to EMS treatment.

Ethyl Methane Sulfonate (EMS) Treatment of Pennycress Seeds

Sterilized pennycress seeds (41 g) were agitated in distilled water overnight. Four 250 mL Erlenmeyer flasks with 10 g seed each, and 1 g in a separate small flask as a control, were agitated. The water was decanted.

25 mLs of 0.2% EMS in 0.1M sodium phosphate buffer (pH 7) was added. The control received only phosphate buffer with no EMS. The flasks were shaken in fume hood for 18 hours. The EMS solution was decanted off into an EMS waste bottle.

To rinse the seeds, 25 ml of $dH_2O$ was added to each flask, and the flasks were shaken for 20 minutes. The rinse water was decanted into the EMS waste bottle.

To deactivate the EMS, seeds were washed for 20 minutes in 0.1M sodium thiosulfate (pH 7.3), rinsed 4 with $dH_2O$ for 15 minutes, suspended in 0.1% agarose, and germinated directly in autoclaved Reddiearth soil at a density of approximately 10 seeds per 4-inch pot.

Plant Growth Conditions

EMS-treated pennycress seeds were germinated and grown in an environmental growth chamber at 21° C., 16:8 6400K fluorescent light/dark, 50% humidity. Approximately 14 days after planting, plants were thinned and transplanted to a density of 4 plants per 4-inch pot. These $M_1$-generation plants showed telltale chlorotic leaf sectors that are indicative of a successful mutagenesis.

After dry down, these $M_1$-generation plants were catalogued and harvested. The M2- and M3-generation seeds were surface sterilized, planted and grown according to the protocols previously described.

Identification and Characterization of Light-Colored Seed Coat Mutant Lines

Light-colored seed coat mutants in the M3-generation were identified as those having mature seed coats of a lighter color relative to that of wild type. Seeds (M3-generation) from putative M2-generation mutants were planted and grown in potting soil-containing 4-inch pots in a growth chamber and the seed coat color phenotype re-assessed upon plant senescence.

Near infrared (NIR) spectroscopic analysis was used to determine the fiber content of selected seed lines to compare the obtained values to the range of fiber in control dark brown seeds. The results are presented in Table 8 of Example 5 (five light-colored lines mentioned above vs. almost one hundred control dark brown seed lines). These results indicate that ADF and NDF fiber levels in certain selected light-colored seed lines are significantly lower and are outside of the corresponding ranges found in control dark-colored seeds, while oil and protein levels are often higher and are also outside of their corresponding ranges found in dark-colored control seeds.

EMS mutagenesis typically introduces single-nucleotide transition mutations (e.g. G to A, or C to T) into plant genomes. To identify the causative mutations in selected light seed colored plants, DNA was extracted from mutant and wild-type leaf tissue and used for NGS and comparative bioinformatics analysis as described in Example 3. Underlying gene and protein mutations were identified (Table 1, SEQ ID NO: 117-132, 139-142, 149-158, 167-170 and 174-181) and confirmed using standard Sanger sequencing and genetic segregation analyses.

Example 5: Generation of Transgenic Pennycress Lines Harboring the CRISPR-Cas9 or CRISPR-Cpf1 or CRISPR-Cms1 Constructs Materials and Methods Construction of the *Thlaspi arvense* (Pennycress) TT1, TT2, TT8, TT10, and TT16 Gene-Specific CRISPR Genome-Editing Vectors.

The constructs and cloning procedures for generation of the *Thlaspi arvense* (pennycress) TT2-, TT8-, TT10-, and TT16-specific CRISPR-SpCas9, CRISPR-SaCas9, CRISPR-Cpf1 and CRISPR-Cms1 constructs are described in Fauser et. al., 2014, Steinert et. al., 2015 and Begemann et. al., 2017.

The plant selectable markers (formerly NPT) in the original pDe-SpCas9 and pDe-SaCas9 binary vectors were swapped for hygromycin resistance (Hygromycin phosphotransferase (HPT) gene.

Complementary oligo pairs described in Table 1 (Seq ID NO: 89-116) were synthesized, annealed to create the 20-mer protospacers specific to the designated pennycress genes and used for construction of gene-editing binary vectors as described (Fauser et. al., 2014, Steinert et. al., 2015 and Begemann et. al., 2017).

Vector Transformation into *Agrobacterium*

The pDe-SpCas9_Hyg and pDe-SaCas9_Hyg and related vectors containing the CRISPR nuclease and guide RNA cassettes with the corresponding sequence-specific protospacers were transformed into *Agrobacterium tumefaciens* strain GV3101 using the freeze/thaw method (Holsters et al, 1978).

The transformation product was plated on 1% agar Luria Broth (LB) plates with gentamycin (50 μg/ml) rifampicin (50 μg/ml) and spectinomycin (75 μgimp. Single colonies were selected after two days of growth at 28° C.

Plant Transformation—Pennycress Floral Dip

DAY ONE: 5 mL of LB+5 uL with appropriate antibiotics (Rifampin (50), Spectinomycin (75), and/or Gentamycin (50)) were inoculated with *Agrobacterium*. The cultures were allowed to grow, with shaking, overnight at 28° C.

DAY TWO (early morning): 25 mL of Luria Broth+25 uL appropriate antibiotics (Rifampin (50), Spectinomycin (75), and/or Gentamycin (50)) were inoculated with the initial culture from day one. The cultures were allowed to grow, with shaking, overnight at 28° C.

DAY TWO (late afternoon): 250 mL of Luria Broth+250 uL appropriate antibiotic (Rifampin (50), Spectinomycin (75), and/or Gentamycin (50)) were inoculated with 25 mL culture. The cultures were allowed to grow, with shaking, overnight at 28° C.

DAY THREE: When the culture had grown to an OD600 of ~1.0, the culture was decanted into large centrifuge tubes and spun at 3,500 RPM at room temperature for 10 minutes to pellet cells. The supernatant was decanted off. The pelleted cells were resuspended in a solution of 5% sucrose and 0.02% Silwet L-77. The suspension was poured into clean beakers and placed in a vacuum chamber.

Newly flowering inflorescences of pennycress were fully submerged into the beakers and subjected to a negative vacuum pressure of 25-30 PSI for 10 minutes.

After pennycress plants were dipped, they were covered loosely with Saran wrap to maintain humidity and kept in the dark overnight before being uncovered and placed back in the environmental growth chamber.

Screening Transgenic Plants and Growth Condition

Pennycress seeds were surface sterilized by first rinsing in 70% ethanol then incubating 10 minutes in a 30% bleach, 0.05% SDS solution before being rinsed two times with sterile water and plated on selective plates (0.8% agar/one half-strength Murashige and Skoog salts with hygromycin B selection (40 U/ml) or glufosinate (18 μg/ml). Plates were wrapped in parafilm and kept in an environmental growth chamber at 21° C., 16:8 day/night for 8 days until antibiotic or herbicide selection was apparent.

Surviving hygromycin or glufosinate-resistant $T_1$-generation seedlings were transplanted into autoclaved Reddiearth soil mix and grown in an environmental growth chamber set to 16-hour days/8-hour nights at 21° C. and 50% humidity. T2-generation seeds were planted, and ~1.5 mg of leaf tissue from each T2-generation plant was harvested with a 3-mm hole punch, then processed using the Thermo Scientific™ Phire™ Plant Direct PCR Kit as per manufacturer's instructions. Subsequently, PCR reactions for genotyping (20 μl volume) were performed.

Gene editing using Cas9, Cpf1 and Cms1 nucleases typically introduces a double-stranded break into a targeted genome area in close proximity to the nuclease's PAM site. During non-homologous end-joining process (NHEJ), these double-stranded breaks are repaired, often resulting in introduction of indel-type mutations into targeted genomes. To identify plants with small indels in genes of interest, standard Sanger sequencing or T7 endonuclease assay (Guschin et. al., 2010) were employed. Sequence analysis revealed that multiple guide RNAs/CRISPR nuclease combinations were effective in generating loss-of-function (LOF) mutations in targeted genes, as described in Table 1 (Seq ID Nos. 133-138, 143-148, 159-164). Plants carrying LOF mutations were grown to homozygosity, and the phenotypes were confirmed using visual and analytical assessments.

Example 6. Selected Yellow-Seeded Pennycress Mutants Demonstrate Significant Reductions in Fiber and Fiber Components Homozygous light seed coat-colored mutants obtained from screening EMS populations or from gene editing were bulked up in the greenhouse or in the fields and their fiber composition was assessed using standard methods below at Dairyland Laboratories (Arcadia, Wis.).

ADF (Acid Detergent Fiber)

Fiber (Acid Detergent) and Lignin in Animal Feed: AOAC Official Method 973.18 (1996) (Modification includes use of Sea Sand for filter aid as needed).

Crude Fiber

Fiber (Crude) in Animal Feed and Pet Food (Fritted Glass Crucible Method): AOAC Official Method 978.10 ch4 p28 (1979) (Modification includes use of Sea Sand for filter aid as needed).

Lignin

Fiber (Acid Detergent) and Lignin in Animal Feed: AOAC Official Method 973.18 (1996) (Modification includes use of Sea Sand for filter aid as needed, use of Whatman GF/C filter paper to collect residue, and holding crucibles in beakers to cover fiber with 72% sulfuric acid for full time required).

NDF (Neutral Detergent Fiber)

Amylase-Treated Neutral Detergent Fiber in Feeds AOAC Official Method 2002.04 2005 (Modification includes use of Sea Sand for filter aid and Whatman GF/C filter paper for residue collection).

The results presented in Table 8 indicate that majority of the light-colored mutants have 35-60% less fiber and its components relative to WT plants (MN106 and Beecher).

TABLE 8

Composition of sixteen selected light-colored pennycress mutants vs. two wild type pennycress accessions measured using wet chemistry methods at Dairyland Laboratories (Arcadia, Wisconsin). The numbers represent percent of dry matter (% DM).

| No. | Name/ID | Mutated Gene/ Allele | Seed Coat | Moisture | Crude Protein | ADF | aNDF | Crude fiber |
|---|---|---|---|---|---|---|---|---|
| 1 | Y1126 | ttgl | light | 7.6 | 28.1 | 13.9 | 16.6 | 9.6 |
| 2 | E5-543 | tt10-1 | light | 7.4 | 26.5 | 15.3 | 19.7 | 14.4 |
| 3 | E5-542 | tt8 | light | 7.5 | 30.6 | 9.1 | 17.5 | 13.8 |
| 4 | E5-547 | tt2-1 | light | 6.7 | 28.1 | 12.8 | 17.2 | 12.1 |
| 5 | A7-63 | N/A | light | 6.9 | 28.7 | 14.6 | 20.5 | 11.8 |
| 6 | A7-187 | ttg1-2 | light | 7.5 | 29.2 | 12.9 | 17.8 | 13.1 |
| 7 | E5-559 | gl3-1 | light | 7.0 | 26.3 | 21.8 | 32.5 | 22.5 |
| 8 | E5-539 | tt10-1 | light | 7.5 | 27.3 | 13.9 | 17.6 | 12.0 |
| 9 | A7-261 | tt12-1 | light | 6.6 | 27.2 | 14.9 | 19.5 | 13.6 |
| 10 | E5-549 | tt4-2 | light | 7.4 | 26.5 | 16.2 | 22.3 | 12.7 |
| 11 | E5-444 | gl3-2 | light | 7.8 | 27.7 | 14.6 | 17.5 | 10.8 |
| 12 | D5-191 | tt8-2 | light | 6.5 | 26.6 | 13.3 | 17.9 | 13.0 |
| 13 | E5-586 | tt7-1 | light | 7.4 | 27.9 | 12.6 | 17.2 | 11.3 |
| 14 | E5-542 | tt8-3 | light | 6.9 | 26.0 | 13.5 | 19.9 | 16.2 |
| 15 | E5-541 | gl3-1 | light | 6.8 | 27.2 | 15.1 | 19.2 | 13.2 |
| 16 | E5-545 | tt10-2 | light | 6.7 | 24.5 | 14.8 | 18.5 | 12.9 |
| 17 | MN106 | WT | dark | 6.7 | 25.2 | 22.7 | 25.8 | 16.1 |
| 18 | Beecher | WT | dark | 6.5 | 25.6 | 21.1 | 23.9 | 15.4 |
| 19 | MIN of | light-colored | % of DM | 6.5 | 24.5 | 9.1 | 16.6 | 9.6 |
| 20 | MAX of | light-colored | % of DM | 7.8 | 30.6 | 21.8 | 32.5 | 22.5 |
| 21 | MIN of | light-colored | % of WT | 97% | 97% | 40% | 64% | 60% |

Example 7. Selected Yellow-Seeded Pennycress Mutants Demonstrate Significant Increases in Protein and Oil Composition

TABLE 9

Composition of five selected light-colored pennycress mutants vs. 95 wild type pennycress accessions harvested at various locations across USA and measured using NIR spectroscopy analysis.

| No. | Accession | Color | % Moisture | % Erucic Acid | % Total Oil | Sinigrin μmol/g | % ADF Fiber | % NDF Fiber | % Protein |
|---|---|---|---|---|---|---|---|---|---|
| 1 | Y1067 | Yellow | 7.2 | 25.1 | 37.6 | 149.1 | 15.5 | 16.2 | 32.5 |
| 2 | Y1126 | Yellow | 8.3 | 31.1 | 43.3 | 49.9 | 11.5 | 14.9 | 31.8 |
| 3 | P32 | Light brown | 6.0 | 39.5 | 36.4 | 180.2 | 13.5 | 18.0 | 29.1 |
| 4 | Q36.0 | Brown | 6.1 | 22.8 | 33.0 | 196.2 | 19.7 | 24.1 | 25.0 |
| 5 | BJ.8 | Tan | 7.0 | 39.0 | 49.0 | 107.4 | 10.0 | 13.1 | 33.6 |
| 6 | 1126 | Dark brown | 10.2 | 33.7 | 30.8 | 59.2 | 27.6 | 31.2 | 22.2 |
| 7 | Spring32 (WT) | Dark brown | 8.6 | 34.8 | 30.6 | 116.0 | 27.6 | 32.2 | 22.0 |
| 8 | 1069 | Dark brown | 8.8 | 32.9 | 29.4 | 103.4 | 37.8 | 35.1 | 22.6 |
| 9 | 1096 | Dark brown | 8.4 | 31.3 | 26.0 | 128.7 | 32.9 | 34.2 | 20.1 |
| 10 | 2139 | Dark brown | 8.7 | 29.6 | 23.1 | 147.0 | 29.0 | 33.9 | 20.4 |
| 11 | 2057 | Dark brown | 8.2 | 31.0 | 23.7 | 157.6 | 31.5 | 33.8 | 18.7 |
| 12 | 1126 | Dark brown | 7.8 | 29.2 | 30.6 | 117.4 | 34.7 | 31.1 | 20.8 |
| 13 | 2066 | Dark brown | 8.7 | 36.8 | 35.2 | 83.0 | 26.2 | 29.1 | 22.4 |
| 14 | 2142 | Dark brown | 8.9 | 32.6 | 32.5 | 85.5 | 29.8 | 32.7 | 20.4 |
| 15 | 2170 | Dark brown | 8.8 | 31.8 | 29.4 | 118.4 | 30.6 | 31.3 | 22.3 |
| 16 | 2055 | Dark brown | 8.7 | 30.8 | 27.6 | 87.1 | 36.1 | 34.0 | 21.1 |
| 17 | 2065 | Dark brown | 9.0 | 27.8 | 29.7 | 127.6 | 30.0 | 33.9 | 19.7 |
| 18 | 2110 | Dark brown | 9.0 | 27.3 | 31.4 | 85.3 | 35.4 | 33.1 | 20.5 |
| 19 | 2154 | Dark brown | 8.7 | 32.0 | 34.6 | 58.1 | 33.2 | 32.2 | 20.1 |
| 20 | 2195 | Dark brown | 8.6 | 32.3 | 34.3 | 61.6 | 29.2 | 32.5 | 19.1 |
| 21 | 1311 | Dark brown | 8.3 | 34.8 | 30.1 | 126.6 | 26.7 | 28.4 | 25.0 |
| 22 | 2003 | Dark brown | 8.3 | 33.4 | 25.4 | 79.5 | 29.6 | 29.6 | 20.7 |
| 23 | 1065 | Dark brown | 8.7 | 34.2 | 29.6 | 112.5 | 29.2 | 31.7 | 23.5 |
| 24 | 2045 | Dark brown | 8.8 | 33.9 | 25.3 | 122.0 | 33.0 | 31.9 | 22.4 |
| 25 | 2128 | Dark brown | 8.5 | 34.6 | 29.5 | 129.3 | 23.4 | 27.2 | 25.2 |
| 26 | 2182 | Dark brown | 8.4 | 32.7 | 33.7 | 81.6 | 28.2 | 29.6 | 22.2 |
| 27 | 2030 | Dark brown | 7.7 | 31.3 | 33.2 | 105.8 | 24.0 | 27.7 | 20.3 |
| 28 | 2034 | Dark brown | 8.1 | 32.4 | 29.6 | 116.9 | 26.6 | 30.0 | 22.9 |
| 29 | 2072 | Dark brown | 8.2 | 30.2 | 27.8 | 97.3 | 30.8 | 31.0 | 21.3 |
| 30 | 2145 | Dark brown | 8.2 | 33.1 | 29.7 | 119.0 | 23.3 | 28.6 | 24.1 |
| 31 | 1027 | Dark brown | 8.0 | 29.4 | 30.6 | 110.6 | 30.5 | 29.1 | 23.4 |
| 32 | 1323 | Dark brown | 8.5 | 31.2 | 28.2 | 115.3 | 33.0 | 32.2 | 23.3 |
| 33 | 1340 | Dark brown | 8.0 | 32.3 | 29.2 | 129.8 | 28.5 | 29.4 | 22.9 |
| 34 | 2129 | Dark brown | 8.0 | 33.1 | 29.6 | 109.4 | 21.5 | 27.4 | 24.1 |
| 35 | 2167 | Dark brown | 8.5 | 28.6 | 34.8 | 71.8 | 34.4 | 31.7 | 21.5 |

TABLE 9-continued

Composition of five selected light-colored pennycress mutants vs. 95 wild type pennycress accessions harvested at various locations across USA and measured using NIR spectroscopy analysis.

| No. | Accession | Color | % Moisture | % Erucic Acid | % Total Oil | Sinigrin µmol/g | % ADF Fiber | % NDF Fiber | % Protein |
|---|---|---|---|---|---|---|---|---|---|
| 36 | 2171 | Dark brown | 8.0 | 33.4 | 28.6 | 108.1 | 24.5 | 28.5 | 20.7 |
| 37 | 1054 | Dark brown | 8.3 | 34.0 | 29.0 | 128.4 | 29.4 | 31.3 | 22.2 |
| 38 | 1092 | Dark brown | 8.3 | 36.6 | 29.8 | 131.6 | 27.2 | 30.1 | 22.6 |
| 39 | 2196 | Dark brown | 9.2 | 32.4 | 32.5 | 113.1 | 22.7 | 30.7 | 21.2 |
| 40 | 2183 | Dark brown | 8.1 | 33.4 | 28.0 | 111.7 | 27.0 | 30.0 | 21.2 |
| 41 | 2020 | Dark brown | 8.5 | 32.5 | 31.9 | 128.1 | 22.5 | 29.0 | 21.4 |
| 42 | 2123 | Dark brown | 8.5 | 34.9 | 30.9 | 122.3 | 22.7 | 27.1 | 25.3 |
| 43 | 1296 | Dark brown | 8.0 | 36.2 | 30.6 | 113.3 | 25.9 | 28.3 | 23.7 |
| 44 | 2062 | Dark brown | 8.8 | 31.6 | 26.7 | 117.5 | 29.5 | 31.7 | 22.2 |
| 45 | 1167 | Dark brown | 8.0 | 34.0 | 28.3 | 121.0 | 31.7 | 30.4 | 22.3 |
| 46 | 1359 | Dark brown | 7.7 | 33.4 | 29.4 | 125.9 | 25.2 | 27.2 | 22.9 |
| 47 | 1265 | Dark brown | 8.4 | 34.6 | 32.2 | 78.0 | 29.6 | 30.7 | 22.8 |
| 48 | 1331 | Dark brown | 8.0 | 37.6 | 29.0 | 112.3 | 27.0 | 28.3 | 23.1 |
| 49 | 2002 | Dark brown | 7.9 | 33.1 | 27.4 | 59.8 | 28.6 | 30.0 | 20.6 |
| 50 | 2009 | Dark brown | 7.4 | 35.9 | 32.3 | 67.1 | 26.7 | 26.9 | 22.7 |
| 51 | 2079 | Dark brown | 8.0 | 37.5 | 29.3 | 126.2 | 21.0 | 28.3 | 22.5 |
| 52 | 2092 | Dark brown | 9.1 | 32.3 | 33.4 | 89.7 | 27.6 | 33.4 | 21.0 |
| 53 | 2107 | Dark brown | 8.8 | 35.8 | 29.7 | 103.4 | 21.3 | 28.8 | 21.5 |
| 54 | 2113 | Dark brown | 8.8 | 31.9 | 33.7 | 83.4 | 28.5 | 30.3 | 23.0 |
| 55 | 2117 | Dark brown | 8.2 | 30.8 | 26.6 | 99.0 | 23.7 | 29.5 | 20.9 |
| 56 | 2132 | Dark brown | 8.0 | 36.1 | 29.2 | 121.4 | 25.1 | 27.9 | 23.4 |
| 57 | 2137 | Dark brown | 7.9 | 32.9 | 28.8 | 115.6 | 27.7 | 28.8 | 22.2 |
| 58 | 2140 | Dark brown | 8.7 | 32.0 | 27.5 | 103.9 | 24.7 | 31.2 | 20.7 |
| 59 | 2008 | Dark brown | 7.7 | 35.0 | 29.7 | 75.5 | 23.8 | 26.3 | 22.1 |
| 60 | 2102 | Dark brown | 7.9 | 18.3 | 24.0 | 193.8 | 35.2 | 32.3 | 16.4 |
| 61 | 2021 | Dark brown | 9.0 | 30.5 | 28.1 | 127.7 | 26.4 | 33.3 | 19.7 |
| 62 | 2114 | Dark brown | 9.4 | 30.6 | 30.1 | 114.7 | 27.1 | 32.2 | 20.3 |
| 63 | 1022 | Dark brown | 8.7 | 33.8 | 28.4 | 137.0 | 26.6 | 30.8 | 22.3 |
| 64 | 2051 | Dark brown | 9.4 | 34.8 | 31.7 | 73.9 | 30.1 | 32.7 | 21.3 |
| 65 | 2073 | Dark brown | 9.8 | 33.5 | 27.6 | 132.3 | 27.3 | 34.0 | 20.2 |
| 66 | 2078 | Dark brown | 7.6 | 37.1 | 29.2 | 74.5 | 22.3 | 27.4 | 22.0 |
| 67 | 2209 | Dark brown | 8.1 | 31.0 | 28.4 | 104.2 | 27.3 | 29.2 | 22.1 |
| 68 | 2210 | Dark brown | 8.6 | 32.5 | 33.4 | 86.3 | 24.9 | 29.4 | 20.5 |
| 69 | 1332 | Dark brown | 7.9 | 36.5 | 30.1 | 113.4 | 24.1 | 26.9 | 23.8 |
| 70 | 2095 | Dark brown | 8.6 | 31.0 | 27.4 | 114.6 | 30.7 | 31.2 | 22.8 |
| 71 | 2143 | Dark brown | 9.0 | 29.1 | 33.1 | 97.8 | 23.7 | 32.3 | 21.5 |

TABLE 9-continued

Composition of five selected light-colored pennycress mutants vs. 95 wild type pennycress accessions harvested at various locations across USA and measured using NIR spectroscopy analysis.

| No. Accession | Color | % Moisture | % Erucic Acid | % Total Oil | Sinigrin μmol/g | % ADF Fiber | % NDF Fiber | % Protein |
|---|---|---|---|---|---|---|---|---|
| 72 2156 | Dark brown | 8.1 | 35.5 | 28.5 | 144.4 | 22.1 | 28.7 | 23.7 |
| 73 1235 | Dark brown | 8.1 | 32.7 | 27.8 | 148.3 | 27.4 | 28.4 | 23.0 |
| 74 2058 | Dark brown | 8.2 | 31.1 | 26.1 | 142.6 | 26.3 | 28.8 | 23.4 |
| 75 2151 | Dark brown | 8.7 | 29.5 | 33.2 | 68.4 | 37.3 | 34.1 | 20.4 |
| 76 1002 | Dark brown | 8.1 | 29.2 | 26.8 | 141.7 | 28.7 | 31.1 | 22.1 |
| 77 1218 | Dark brown | 8.0 | 23.9 | 26.6 | 120.2 | 37.9 | 34.9 | 18.3 |
| 78 1345 | Dark brown | 8.0 | 36.1 | 32.5 | 99.1 | 27.4 | 27.9 | 24.5 |
| 79 1366 | Dark brown | 8.0 | 36.5 | 31.3 | 115.1 | 26.9 | 28.2 | 22.4 |
| 80 2185 | Dark brown | 9.1 | 32.9 | 31.7 | 97.0 | 28.1 | 32.4 | 21.5 |
| 81 2221 | Dark brown | 7.7 | 35.8 | 29.9 | 123.2 | 23.3 | 26.9 | 23.2 |
| 82 2332 | Dark brown | 8.2 | 30.6 | 28.7 | 70.4 | 34.0 | 31.9 | 20.9 |
| 83 1149 | Dark brown | 8.2 | 31.7 | 29.8 | 114.2 | 30.5 | 31.0 | 23.1 |
| 84 1001 | Dark brown | 7.7 | 30.4 | 30.7 | 124.6 | 29.6 | 28.2 | 23.7 |
| 85 1082 | Dark brown | 8.1 | 30.8 | 30.7 | 85.6 | 33.3 | 30.2 | 22.4 |
| 86 2286 | Dark brown | 8.5 | 34.2 | 34.3 | 74.7 | 27.2 | 30.7 | 22.8 |
| 87 2298 | Dark brown | 8.0 | 33.6 | 27.5 | 106.8 | 25.2 | 30.6 | 20.8 |
| 88 2304 | Dark brown | 7.6 | 33.5 | 29.7 | 108.0 | 23.8 | 26.9 | 23.0 |
| 89 2308 | Dark brown | 8.7 | 36.0 | 29.0 | 113.9 | 27.0 | 30.0 | 22.8 |
| 90 2318 | Dark brown | 9.2 | 31.4 | 32.5 | 90.6 | 28.8 | 32.3 | 21.5 |
| 91 2319 | Dark brown | 9.0 | 27.4 | 32.2 | 71.6 | 31.1 | 35.1 | 20.2 |
| 92 2332 | Dark brown | 8.8 | 25.0 | 22.9 | 169.3 | 26.7 | 31.5 | 17.0 |
| 93 2338 | Dark brown | 8.0 | 24.5 | 24.1 | 145.7 | 20.8 | 30.9 | 15.3 |
| 94 2346 | Dark brown | 8.3 | 31.7 | 27.6 | 140.9 | 27.6 | 30.4 | 22.8 |
| 95 2347 | Dark brown | 8.8 | 31.0 | 34.4 | 78.9 | 27.8 | 30.5 | 22.9 |
| 96 2349 | Dark brown | 9.6 | 31.2 | 32.3 | 88.0 | 26.6 | 32.2 | 21.7 |
| 97 2354 | Dark brown | 8.3 | 28.9 | 27.2 | 84.5 | 30.4 | 30.1 | 21.7 |
| 98 2359 | Dark brown | 7.6 | 29.3 | 27.7 | 101.4 | 28.2 | 30.2 | 20.3 |
| 99 2362 | Dark brown | 8.7 | 30.5 | 28.6 | 86.7 | 30.1 | 31.3 | 22.7 |
| 100 2364 | Dark brown | 9.2 | 31.4 | 32.2 | 89.6 | 28.9 | 34.4 | 21.6 |
| Minimum | Light | 6.0 | 22.8 | 33.0 | 49.9 | 10.0 | 13.1 | 25.0 |
| Minimum | Dark | 7.4 | 18.3 | 22.9 | 58.1 | 20.8 | 26.3 | 15.3 |
| Maximum | Light | 8.3 | 39.5 | 49 | 196.2 | 19.7 | 24.1 | 33.6 |
| Maximum | Dark | 10.2 | 37.6 | 35.2 | 193.8 | 37.9 | 35.1 | 25.3 |

Example 8. Composition and Performance of Pennycress Meal Produced from Y1126 Yellow-Seeded Mutant is Superior Relative to Meal Made from Black-Seeded Pennycress and is Similar to Canola Meal Approximately 13 lbs each of cleaned Y1126 yellow-seeded mutant and regular black-seeded pennycress seed were processed into oil and hexane-extracted meal at the Texas A&M Engineering Experiment Station's Process Engineering Research & Development Center (College Station, Tex.). The material was conditioned using a single deck of the French cooker for approximately 5 minutes at 100° F.±10° F. Conditioned seed was processed using a Ferrel Ross flaking rolls to yield flakes with a thickness of approximately 0.012 inches or thinner.

The flakes were loaded into a cooker with the objective of inactivating lipases, myrosinases, and other hydrolytic enzymes to facilitate pre-pressing. Maximum steam was used to get the flakes to 190° F. without lingering to avoid activation of such enzymes. This was achieved in 10-15 minutes. The press (Rosedowns Mini 200) was fed from a Wenger metered feeder with flake at a rate of 3.5-4 pounds per minute. The press operated best at 50-55 Hz, which corresponds to 38-40 RPM.

The presscake was extracted in stainless batch cans using commercial hexane at a temperature of 110-140° F.±10° F. Solvent was added and drained sequentially in 6 rounds of incubation, each of which was approximately 12 minutes. To remove residual hexane and yield desolventized meal, a batch-type desolventizer/toaster (DT) was heated, which showed a product temperature of 150-175° F. under vacuum. Crude oil was made by desolventizing using a Precision Scientific Evaporator. The hexane extracted meal was air dried overnight.

Samples of the hexane extracted meal were sent to Dairyland and DairyOne Laboratories for analysis. A sample of commercial canola meal was acquired from a feed plant in Wisconsin, which was also sent to DairyOne for comparison.

TABLE 10

The meal produced from Y1126 yellow-seeded pennycress mutant is significantly more valuable (lower in fiber, higher in protein and available energy and nutrients) than regular pennycress meal and is closer in composition and predicted performance to canola meal.

| | Meal Component | Type | Unit | Desired Change | Pennycress | Yellow seed (Y1126) | Canola |
|---|---|---|---|---|---|---|---|
| CP | Crude Protein | Protein | % Dry Matter | Increased | 31.9 | 40.5 | 41.4 |
| RUP | Rumen Undegraded Protein | Protein | % CP | No change | 41.45 | 42 | 55 |
| Fat | Oil | Oil | % Dry Matter | No change | 1.17 | 1.69 | 3.6 |
| ADF | Acid Detergent Fiber | Fiber | % Dry Matter | Reduce | 41.7 | 20.6 | 22.9 |
| NDF | Neutral Detergent Fiber | Fiber | % Dry Matter | Reduce | 45.5 | 27.2 | 34.3 |
| Lignin | indigestible cell wall material | Fiber | % Dry Matter | Reduce | 24.3 | 7.7 | 10 |
| Starch | Starch | Starch | % Dry Matter | No change | 0.5 | 0.5 | 0.3 |
| Sugar | Sugar | Sugar | % Dry Matter | No change | 6.5 | 9.5 | 8 |
| IVTD 24 | 24 hour In Vitro Total Digestibility | Energy | % Dry Matter | Increase | 65 | 89 | 82 |
| TDN | Total Digestible Nutrients | Energy | % Dry Matter | Increase | 53 | 68.5 | 67 |
| ME, 1X | Calculated Metabolizable Energy, 1X maintenance | Energy | Mcal/lb | Increase | 0.93 | 1.33 | 1.33 |
| NEL, 1X | Calculated Net Energy Lactation, 1X maintenance | Energy | Mcal/lb | Increase | 1.08 | 1.52 | 1.55 |
| NEG, 1X | Calculated Net Energy Gain, 1X maintenance | Energy | Mcal/lb | Increase | 0.32 | 0.91 | 0.93 |
| NEM, 1X | Calculated Net Energy Maintenance, 1X maintenance | Energy | Mcal/lb | Increase | 0.86 | 1.5 | 1.52 |

Samples of the meal made from Y1126 yellow-seeded mutant, regular black-seeded pennycress and commercial canola meal were sent to the University of Illinois (Urbana-Champaign, Ill.) for Total Metabolizable Energy corrected for nitrogen (TMEn) and digestible amino acid analysis. The University of Illinois utilized the cecectomized rooster assay to measure TMEn and the digestibility of amino acids.

TABLE 11

Y1126 yellow-seed mutant had increased TMEn as compared to the black-seeded pennycress and was comparable to canola.

| Feed | Dry Matter (DM) % | TMEn Kcal/g DM |
|---|---|---|
| Pennycress | 97.0 | 1.68 |
| Yellow Seed (Y1126) | 97.6 | 2.02 |
| Canola | 89.1 | 2.14 |

TABLE 12

Y1126 yellow-seeded mutant has increased true amino acid digestibility as compared to the black-seeded pennycress and was as digestible or more so than canola.

| No. | Amino Acid | Unit | Canola | Yellow Seed Y1126 | Pennycress |
|---|---|---|---|---|---|
| 1 | ASP | % | 77.6 | 84.8 | 79.6 |
| 2 | THR | % | 77.0 | 79.2 | 73.6 |
| 3 | SER | % | 76.7 | 81.8 | 81.8 |
| 4 | GLU | % | 87.5 | 90.0 | 82.6 |
| 5 | PRO | % | 76.0 | 82.2 | 66.0 |
| 6 | ALA | % | 76.9 | 82.4 | 76.1 |
| 7 | CYS | % | 76.6 | 71.0 | 63.7 |
| 8 | VAL | % | 75.5 | 81.3 | 72.9 |
| 9 | MET | % | 85.9 | 84.9 | 75.8 |
| 10 | ILE | % | 77.2 | 82.2 | 75.7 |
| 11 | LEU | % | 81.5 | 86.1 | 79.1 |
| 12 | TYR | % | 77.1 | 83.8 | 78.2 |
| 13 | PHE | % | 81.6 | 87.1 | 80.4 |
| 14 | LYS | % | 73.5 | 76.7 | 68.9 |
| 15 | HIS | % | 83.4 | 86.6 | 70.1 |
| 16 | ARG | % | 87.0 | 93.0 | 83.6 |
| 17 | TRP | % | 95.4 | 93.2 | 89.2 |

REFERENCES

Kil, D. J., B. G. Kim, and H. H. Stein. (2013). Feed energy evaluation for growing pigs. Asian-Austrs. J. Animal. Sci. 26(9):1205-1217.

Meloche, K. J., B. J. Kerr, G. C. Shurson, and W. A. Dozier, III. (2013). Apparent metabolizable energy and prediction equations for reduced-oil corn distillers fried grains with solubles in broiler chicks. Poultry Science 92(12):3176-3183.

Rochelle, S. J., B. J. Kerr, and W. A. Dozier III. (2011). Energy determination of corn co-products fed to broiler chicks from 15 to 24 days of age and use of composition analysis to predict nitrogen-corrected apparent metabolizable energy. Poultry Science 90:1999-2007.

Slominski B A, Simbaya J, Campbell L D, Rakow G, Guenter W (1999) Nutritive value for broilers of meals derived from newly developed varieties of yellow-seeded canola. Anim Feed Sci Technol 78:249-262.

Chauhan, Y. S. and Kumar, K. (1987). Genetics of seed colour in mustard (*Brassica juncea* L. Czern and Coss), *Cruciferae* Newsletter 12, 22-23.

Appelhagen I, Lu G H, Huep G, Schmelzer E, Weisshaar B, Sagasser M. (2011) *TRANSPARENT TESTA*1 interacts with R2R3-MYB factors and affects early and late steps of flavonoid biosynthesis in the endothelium of *Arabidopsis thaliana* seeds. *Plant J* 67:406-419.

Appelhagen I, Thiedig K, Nordholt N, Schmidt N, Huep G, Sagasser M, Weisshaar B. (2014) Update on *transparent testa* mutants from *Arabidopsis thaliana*: characterisation of new alleles from an isogenic collection. *Planta* 240: 955-970.

Baudry A, Heim M A, Dubreucq B, Caboche M, Weisshaar B, Lepiniec L. (2004) TT2, TT8, and TTG1 synergistically specify the expression of BANYULS and proanthocyanidin biosynthesis in *Arabidopsis thaliana. Plant J.* 39:366-380.

Begemann M B, Gray B N, January E, Gordon G C, He Y, Liu H, Wu X, Brutnell T P, Mockler TC, Oufattole M. (2017) Precise insertion and guided editing of higher plant genomes using Cpf1 CRISPR nucleases. *Scientific reports* 7:11606.

Begemann M B, Gray B N, January E, Singer A, Kesler D C, He Y, Liu H, Guo H, Jordan A, Brutnell T P, Mockler T C. (2017) Characterization and Validation of a Novel Group of Type V, Class 2 Nucleases for in vivo Genome Editing. *bioRxiv.* 2017:192799.

Chen M, Wang Z, Zhu Y, Li Z, Hussain N, Xuan L, Guo W, Zhang G, Jiang L. (2012) The effect of *TRANSPARENT TESTA*2 on seed fatty acid biosynthesis and tolerance to environmental stresses during young seedling establishment in *Arabidopsis. Plant Physiol.* 160:1023-1036.

Chen M, Xuan L, Wang Z, Zhou L, Li Z, Du X, Ali E, Zhang G, Jiang L. (2014) *TRANSPARENT TESTA*8 inhibits seed fatty acid accumulation by targeting several seed development regulators in *Arabidopsis. Plant Physiol* 165:905-916.

Debeaujon I, Peeters A J, Leon-Kloosterziel K M, Koornneef M. (2001) The *TRANSPARENT TESTA*12 gene of *Arabidopsis* encodes a multidrug secondary transporter-like protein required for flavonoid sequestration in vacuoles of the seed coat endothelium. *Plant Cell* 13:853-871.

Fauser F, Schiml S, Puchta H (2014) Both CRISPR/Cas-based nucleases and nickases can be used efficiently for genome engineering in *Arabidopsis thaliana. Plant J*79: 348-359.

Guschin D Y, Waite A J, Katibah G E, Miller J C, Holmes M C, Rebar E J. (2010) A rapid and general assay for monitoring endogenous gene modification. In: *Engineered zinc finger proteins:*247-256. Humana Press, Totowa, N.J.

Holsters, M., De Waele, D., Depicker, A., Messens, E., Van Montagu, M., & Schell, J. (1978). Transfection and transformation of *Agrobacterium tumefaciens. Molecular and General Genetics* (*MGG*), 163(2), 181-187.

Li X, Chen L, Hong M, Zhang Y, Zu F, Wen J, Yi B, Ma C, Shen J, Tu J, Fu T. (2012) A large insertion in bHLH transcription factor BrTT8 resulting in yellow seed coat in *Brassica rapa. PLoS One* 7:e44145.

Lian J, Lu X, Yin N, Ma L, Lu J, Liu X, Li J, Lu J, Lei B, Wang R, Chai Y. (2017) Silencing of BnTT1 family genes affects seed flavonoid biosynthesis and alters seed fatty acid composition in *Brassica napus. Plant Sci.* 254:32-47.

Liang M, Davis E, Gardner D, Cai X, Wu Y. (2006) Involvement of AtLAC15 in lignin synthesis in seeds and in root elongation of *Arabidopsis. Planta* 224:1185-1196.

Michelmore R W, Paran I, Kesseli R V. (1991) Identification of markers linked to disease-resistance genes by bulked segregant analysis: a rapid method to detect markers in specific genomic regions by using segregating populations. *Proceedings of the National Academy of Sciences* 88: 9828-9832.

Magwene P M, Willis J H, Kelly J K. (2011) The statistics of bulk segregant analysis using next generation sequencing. *PLoS computational biology* 7:11.

Nesi N, Debeaujon I, Jond C, Pelletier G, Caboche M, Lepiniec L. (2000) The TT8 gene encodes a basic helix-loop-helix domain protein required for expression of DFR and BAN genes in *Arabidopsis* siliques. *Plant Cell* 12:1863-1878.

Nesi N, Debeaujon I, Jond C, Stewart A J, Jenkins G I, Caboche M, Lepiniec L. (2002) The *TRANSPARENT TESTA*16 locus encodes the *ARABIDOPSIS* BSISTER MADS domain protein and is required for proper development and pigmentation of the seed coat. *Plant Cell* 14:2463-2479.

Nesi N, Jond C, Debeaujon I, Caboche M, Lepiniec L. (2001) The *Arabidopsis* TT2 gene encodes an R2R3

MYB domain protein that acts as a key determinant for proanthocyanidin accumulation in developing seed. *Plant Cell* 13:2099-2114.

Pourcel L, Routaboul J M, Kerhoas L, Caboche M, Lepiniec L, Debeaujon I. (2005) *TRANSPARENT TESTA*10 encodes a laccase-like enzyme involved in oxidative polymerization of flavonoids in *Arabidopsis* seed coat. *Plant Cell* 17:2966-2980.

Sagasser M, Lu G H, Hahlbrock K, Weisshaar B. (2002) *A. thaliana TRANSPARENT TESTA* 1 is involved in seed coat development and defines the WIP subfamily of plant zinc finger proteins. *Genes Dev* 16:138-149.

Steinert J, Schiml S, Fauser F, Puchta H (2015) Highly efficient heritable plant genome engineering using Cas9 orthologues from *Streptococcus thermophilus* and *Staphylococcus aureus. Plant J* 84:1295-305.

Zhang J, Lu Y, Yuan Y, Zhang X, Geng J, Chen Y, Cloutier S, McVetty P B, Li G. (2008) Map-based cloning and characterization of a gene controlling hairiness and seed coat color traits in *Brassica rapa. Plant Mol Biol.* 69:553-563.

OTHER EMBODIMENTS

It is to be understood that while certain embodiments have been described in conjunction with the detailed description thereof, the foregoing description is intended to illustrate and not limit the scope of the disclosure. Other aspects, advantages, and modifications are within the scope of the following embodiments and claims.

Embodiment 1

A composition comprising non-defatted pennycress seed meal comprising an acid detergent fiber (ADF) content of 5%, 8%, or 10% to 15%, 18%, or 20% by dry weight.

Embodiment 2

The composition of embodiment 1, wherein said composition has a protein content of 28%, 30%, 32%, or 34% to 38% or 40% by dry weight.

Embodiment 3

The composition of embodiment 1, wherein said composition has an oil content of 30%, 32%, or 34% to 40%, 42%, 46%, 48%, or 50% by dry weight.

Embodiment 4

The composition of embodiment 1, wherein said composition has a neutral detergent fiber (NDF) content of 10%, 12%, 14%, or 16% to 20%, 22%, 24%, or 25% by dry weight.

Embodiment 5

The composition of embodiment 1, wherein said composition has a protein content of 28%, 30%, 32%, or 34% to 38% or 40% by dry weight and an oil content of 30% to 50% by dry weight.

Embodiment 6

A composition comprising defatted pennycress seed meal comprising an acid detergent fiber (ADF) content of 7%, 8%, 10%, or 12% to 20%, 22%, 24%, or 25% by dry weight.

Embodiment 7

The composition of embodiment 6, wherein said composition has a protein content of 30%, 35%, 40%, or 45% to 55%, 60%, 65%, or 70% by dry weight.

Embodiment 8

The composition of embodiment 6, wherein said composition has an oil content of 0%, 2%, or 4% to 8%, 10%, or 12% by dry weight.

Embodiment 9

The composition of embodiment 6, wherein said composition has a neutral detergent fiber (NDF) content of 10%, 12%, or 15% to 20%, 25%, 28%, or 30% by dry weight.

Embodiment 10

The composition of embodiment 6, wherein said composition has a protein content of 30%, 35%, 40%, or 45% to 55%, 60%, 65%, or 70% by dry weight and an oil content of 0%, 2%, or 4% to 8%, 10%, or 12% by dry weight.

Embodiment 11

The composition of embodiment 6, wherein said composition has a protein content of 30%, 35%, 40%, or 45% to 55%, 60%, 65%, or 70% by dry weight and a neutral detergent fiber (NDF) content of 10%, 12%, or 15% to 20%, 25%, 28%, or 30% by dry weight.

Embodiment 12

The composition of any one of embodiments 1-11, wherein said composition further comprises a preservative, a dust preventing agent, a bulking agent, a flowing agent, or any combination thereof.

Embodiment 13

The composition of any one of embodiments 1-12, wherein said pennycress seed meal is obtained from pennycress seeds that have been crushed, ground, macerated, expelled, extruded, expanded, or any combination thereof.

Embodiment 14

The composition of any one of embodiments 1-13, wherein said pennycress seed meal is obtained from a population of pennycress seeds comprising seeds having at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 15

The composition of any one of embodiments 1-14, wherein said pennycress seed meal is obtained from a population of pennycress seeds comprising seeds having at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 16

The composition of any one of embodiments 1-15, wherein said composition comprises a detectable amount of a polynucleotide comprising at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80,171, 173, and allelic variants thereof.

Embodiment 17

The composition of any one of embodiments 1-16, wherein said pennycress seed meal comprises: (i) pennycress variety Y1067, Y1126, BC38, BJ8, P32, J22, Q36, BD24, AX17, E5-444, E5-540, E5-541, E5-542, E5-543, E5-544, E5-545, E5-547, E5-549, E5-582, E5-586, D3-N10 P5, D5-191, A7-95, A7-187 or A7-261 seed meal; (ii) seed meal of hybrids of the varieties; (iii) seed meal from progeny of the varieties; (iv) seed meal from seed comprising germplasm from the varieties that provides seed comprising an acid detergent fiber (ADF) content of 5% to 20% by dry weight; or (v) seed meal of any combination of said varieties, hybrid varieties, progeny of said varieties, or seed comprising the germplasm.

Embodiment 18

The composition of any one of embodiments 1-17, wherein said pennycress seed meal comprises seed meal obtained from the seed lot of anyone of embodiments 43 to 62, or any combination thereof.

Embodiment 19

The composition of any one of embodiments 1 to 18, wherein the composition exhibits a lighter-color in comparison to a control composition comprising wild-type pennycress seed meal.

Embodiment 20

Pennycress seed meal comprising an acid detergent fiber (ADF) content of 5%, 8%, or 10% to 15%, 18%, or 20% by dry weight, wherein the seed meal is non-defatted.

Embodiment 21

The seed meal of embodiment 20, wherein said seed meal has a protein content of 28%, 30%, 32%, or 34% to 38% or 40% by dry weight.

Embodiment 22

The seed meal of embodiment 21, wherein said seed meal has an oil content of 30%, 32%, or 34% to 40%, 42%, 46%, 48%, or 50% by dry weight.

Embodiment 23

The seed meal of embodiment 21, wherein said seed meal has a neutral detergent fiber (NDF) content of 10%, 12%, 14%, or 16% to 20%, 22%, 24%, or 25% by dry weight.

Embodiment 24

The seed meal of embodiment 21, wherein said seed meal has a protein content of 28%, 30%, 32%, or 34% to 38% or 40% by dry weight and an oil content of 30%, 32%, or 34% to 40%, 42%, 46%, 48%, or 50% by dry weight.

Embodiment 25

Pennycress seed meal comprising an acid detergent fiber (ADF) content of 7%, 8%, 10%, or 12% to 20%, 22%, 24%, or 25% by dry weight, wherein the seed meal is defatted.

Embodiment 26

The seed meal of embodiment 25, wherein said seed meal has a protein content of 30%, 35%, 40%, or 45% to 55%, 60%, 65%, or 70% by dry weight.

Embodiment 27

The seed meal of embodiment 25, wherein said seed meal has an oil content of 0%, 2%, or 4% to 8%, 10%, or 12% by dry weight.

Embodiment 27

The seed meal of embodiment 25, wherein said seed meal has a neutral detergent fiber (NDF) content of 10%, 12%, or 15% to 20%, 25%, 28%, or 30% by dry weight.

Embodiment 28

The seed meal of embodiment 25, wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 29

The pennycress seed meal of any one of embodiments 20-28, wherein the meal comprises ground and/or macerated seed of the seed lot of any one of embodiments 43 to 62.

Embodiment 30

The pennycress seed meal of any one of embodiments 20-29, wherein said meal comprises a detectable amount of a polynucleotide comprising at least one loss-of-function mutation in at least one endogenous wild-type pennycress gene comprising a polynucleotide sequence selected from the group consisting of SEQ ID NO:1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 31

The pennycress seed meal of any one of embodiments 20-30, wherein said meal comprises ground and/or macerated seed of a population of pennycress seeds comprising seeds having at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 32

The pennycress seed meal of any one of embodiments 20-31, wherein said meal comprises ground and/or macerated seed of a population of pennycress seeds comprising seeds having at least one loss-of-function mutation in at least one endogenous pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172 and allelic variants thereof.

Embodiment 33

The pennycress seed meal of any one of embodiments 20-32, wherein said meal comprises ground and/or macerated seed of a population of pennycress seeds comprising seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 34

The pennycress seed meal of any one of embodiments 20-33, wherein the meal exhibits a lighter-color in comparison to a control pennycress seed meal prepared from wild-type pennycress seed.

Embodiment 35

Pennycress seed cake comprising an acid detergent fiber (ADF) content of 7%, 8%, 10%, or 12% to 20%, 22%, 24%, or 25% by dry weight.

Embodiment 36

The seed cake of embodiment 35, wherein said seed meal has a protein content of 30%, 35%, 40%, or 45% to 55%, 60%, 65%, or 70% by dry weight.

Embodiment 37

The seed cake of embodiment 35, wherein said seed meal has an oil content of 0%, 2%, or 4% to 8%, 10%, or 12% by dry weight.

Embodiment 38

The seed cake of embodiment 35, wherein said seed meal has a neutral detergent fiber (NDF) content of 10%, 12%, or 15% to 20%, 25%, 28%, or 30% by dry weight.

Embodiment 39

The seed cake of embodiment 35, wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 40

The pennycress seed cake of any one of embodiments 35 to 39, wherein the cake comprises crushed or expelled seed of the seed lot of any one of embodiments 43 to 62.

Embodiment 41

The pennycress seed cake of any one of embodiments 35 to 40, wherein the cake comprises a detectable amount of a polynucleotide comprising at least one loss-of-function mutation in at least one endogenous wild-type pennycress gene comprising a polynucleotide sequence selected from the group consisting of SEQ ID NO: 1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 42

The pennycress seed meal or pennycress seed meal cake of any one of embodiments 36 to 41, wherein the cake exhibits a lighter-color in comparison to a control pennycress seed meal cake prepared from wild-type pennycress seed.

Embodiment 43

A seed lot comprising a population of pennycress seeds that comprise an acid detergent fiber (ADF) content of 5%, 8%, or 10% to 15%, 18%, or 20% by dry weight.

Embodiment 44

The seed lot of embodiment 43, wherein said seed has a protein content of 28%, 30%, 32%, or 34% to 38% or 40% by dry weight.

Embodiment 45

The seed lot of embodiment 43, wherein said seed has an oil content of 30%, 32%, or 34% to 40%, 42%, 46%, 48%, or 50% by dry weight.

Embodiment 46

The seed lot embodiment 43, wherein said seed has a neutral detergent fiber (NDF) content of 10%, 12%, 14%, or 16% to 20%, 22%, 24%, or 25% by dry weight.

Embodiment 47

The seed lot of embodiment 43, wherein said seed has a protein content of 28%, 30%, 32%, or 34% to 38% or 40% by dry weight and an oil content of 30%, 32%, or 34% to 40%, 42%, 46%, 48%, or 50% by dry weight.

Embodiment 48

The seed lot of any one of embodiments 43 to 47, wherein the population comprises at least 10, 20, 50, 100, 500, or 1,000 seeds comprising said ADF content.

Embodiment 49

The seed lot of any one of embodiments 43 to 48, wherein at least 95% of the pennycress seeds in the seed lot are seeds comprising said ADF content and said protein content.

Embodiment 50

The seed lot of any one of embodiments 43 to 49, wherein less than 5% of the seeds in said seed lot have an ADF content of greater than 20% by dry weight.

Embodiment 51

The seed lot of any one of embodiments 43 to 50, wherein said seeds further comprise an agriculturally acceptable excipient or adjuvant.

Embodiment 52

The seed lot of any one of embodiments 43 to 51, wherein said seeds further comprise a fungicide, a safener, or any combination thereof.

Embodiment 53

The seed lot of any one of embodiments 43 to 52, wherein said population of pennycress seeds comprise seeds having at least one loss-of-function mutation in at least one endogenous pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof or comprise seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 54

The seed lot of any one of embodiments 43 to 53, wherein said population of pennycress seeds comprise seeds having at least one loss-of-function mutation in an endogenous wild-type pennycress gene that encodes SEQ ID NO:2, 70, 76, or an allelic variant thereof.

Embodiment 55

The seed lot of embodiment 54, wherein the loss-of-function mutation in the gene encoding SEQ ID NO:2, 70, 76, or the allelic variant thereof comprises an insertion, deletion, or substitution of one or more nucleotides.

Embodiment 56

The seed lot of embodiment 54, wherein the loss-of-function mutation in the gene encoding SEQ ID NO:2 or the allelic variant thereof comprises a mutation that introduces a pre-mature stop codon or frameshift mutation at codon positions 1-108 of SEQ ID NO:1 or an allelic variant thereof, wherein the loss-of-function mutation in the gene encoding SEQ ID NO:70 or the allelic variant thereof comprises a mutation set forth in SEQ ID NO:127, 129, 131, 133, 135, or 137, or wherein the loss-of-function mutation in the gene encoding SEQ ID NO:76 or the allelic variant thereof comprises a mutation set forth in SEQ ID NO:165, 167, or 170.

Embodiment 57

The seed lot of any one of embodiments 54-56, wherein the loss-of-function mutation in the gene encoding SEQ ID NO:2 or the allelic variant thereof comprises a substitution of a guanine residue at nucleotide 491 of SEQ ID NO:1 with an adenine residue or a substitution of a guanine residue a nucleotide equivalent to nucleotide 491 of SEQ ID NO:1 in the allelic variant thereof with an adenine residue.

Embodiment 58

The seed lot of any one of embodiments 43 to 57, wherein said population of pennycress seeds comprise seeds having at least one loss-of-function mutation in at least one endogenous wild-type pennycress gene comprising a polynucleotide sequence selected from the group consisting of SEQ ID NO:1, 3, 6, 8, 9, 11, 12, 14, 15, 17, 18, 20, 21, 23, 24, 26, 27, 29, 30, 32, 33, 35, 36, 38, 39, 41, 42, 44, 45, 47, 48, 50, 51, 53, 54, 56, 57, 59, 60, 62, 63, 65, 66, 68, 69, 71, 72, 74, 75, 77, 78, 80, 171, 173, and allelic variants thereof.

Embodiment 59

The seed lot of any one of embodiments 43 to 58, wherein said population of pennycress seeds comprising seeds having at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof.

Embodiment 60

The seed lot of any one of embodiments 43 to 59, wherein said population of pennycress seeds comprise: (i) pennycress variety Y1067, Y1126, BC38, BJ8, P32, J22, Q36, BD24, AX17, AX17, E5-444, E5-540, E5-541, E5-542, E5-543, E5-544, E5-545, E5-547, E5-549, E5-582, E5-586, D3-N10 P5, D5-191, A7-95, A7-187 or A7-261 seed; (ii) hybrid seed of said varieties; (iii) seed from progeny of said varieties; (iv) seed comprising germplasm from said varieties that provides seed having an acid detergent fiber (ADF) content of 10% to 20% by dry weight; or (v) any combination of said seed, hybrid seed, seed from progeny of said varieties, or seed comprising said germplasm.

Embodiment 61

The seed lot of any one of embodiments 43 to 60, wherein the seeds in the population exhibit a lighter-colored seed coat in comparison to a wild-type pennycress seed.

Embodiment 62

A method of making non-defatted pennycress seed meal comprising an acid detergent fiber (ADF) content of 5%, 8%, or 10% to 15%, 18%, or 20% by dry weight, comprising the step of grinding, macerating, extruding, and/or crushing the seed lot of any one of embodiments 43 to 62, thereby obtaining the non-defatted seed meal.

Embodiment 63

The method of embodiment 62, wherein the seed meal has a protein content of 28%, 30%, 32%, or 34% to 38% or 40% by dry weight, or the combination thereof.

Embodiment 64

The method of embodiment 62, wherein said seed meal has an oil content of 30%, 32%, or 34% to 40%, 42%, 46%, 48%, or 50% by dry weight.

Embodiment 65

The method of embodiment 62, wherein said seed meal has a neutral detergent fiber (NDF) content of 10%, 12%, 14%, or 16% to 20%, 22%, 24%, or 25% by dry weight.

Embodiment 66

The method of embodiment 62, wherein said seed meal has a protein content of 28%, 30%, 32%, or 34% to 38% or 40% by dry weight and an oil content of 30%, 32%, or 34% to 40%, 42%, 46%, 48%, or 50% by dry weight.

Embodiment 67

A method of making defatted pennycress seed meal comprising an acid detergent fiber (ADF) content of 7%, 8%, 10%, or 12% to 20%, 22%, 24%, or 25% by dry weight, comprising the step of solvent extracting the seed lot of any one of embodiments 43 to 62, separating the extracted seed meal from the solvent, thereby obtaining the defatted seed meal.

Embodiment 68

The method of embodiment 67, wherein the seed meal has a protein content of 30%, 35%, 40%, or 45% to 55%, 60%, 65%, or 70% by dry weight.

Embodiment 69

The method of embodiment 67, wherein said seed meal has an oil content of 0%, 2%, or 4% to 8%, 10%, or 12% by dry weight.

Embodiment 70

The method of embodiment 67, wherein said seed meal has a neutral detergent fiber (NDF) content of 10% to 30% by dry weight.

Embodiment 71

The method of embodiment 67 wherein said seed meal has a protein content of 30%, 35%, 40%, or 45% to 55%, 60%, 65%, or 70% by dry weight and an oil content of 0%, 2%, or 4% to 8%, 10%, or 12% by dry weight.

Embodiment 72

The method of any one of embodiments 67 to 71, wherein the solvent is hexane or mixed hexanes.

Embodiment 73

A method of making pennycress seed cake comprising an acid detergent fiber (ADF) content of 7%, 8%, 10%, or 12% to 20%, 22%, 24%, or 25% by dry weight, comprising the step of crushing or expelling the seed of the seed lot any one of embodiments 43 to 62, thereby obtaining a seed cake.

Embodiment 74

The method of embodiment 73, wherein the seed cake has a protein content of 30%, 35%, 40%, or 45% to 55%, 60%, 65%, or 70% by dry weight.

Embodiment 75

The method of embodiment 74, wherein the seed cake has an oil content of 0%, 2%, or 4% to 8%, 10%, or 12% by dry weight.

Embodiment 76

A method of making a pennycress seed lot comprising the steps of:

(a) introducing at least one loss-of-function mutation in at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof;

(b) selecting germplasm that is homozygous for said loss-of-function mutation; and, (c) harvesting seed from the homozygous germplasm, thereby obtaining a seed lot, wherein said seed lot comprises an acid detergent fiber (ADF) content of 5%, 8%, or 10% to 15%, 18%, or 20% by dry weight.

Embodiment 77

The method of embodiment 76, wherein said seed lot comprise the seed lot of any one of embodiments 43 to 61.

Embodiment 78

A method of making a pennycress seed lot comprising the steps of:

(a) introducing at least one transgene that suppresses expression of at least one endogenous wild-type pennycress gene encoding a polypeptide selected from the group consisting of SEQ ID NO:2, 7, 10, 13, 16, 19, 22, 25, 28, 31, 34, 37, 40, 43, 46, 49, 52, 55, 58, 61, 64, 67, 70, 73, 76, 79, 172, and allelic variants thereof into a pennycress plant genome;

(b) selecting a transgenic plant line that comprises said transgene; and, (c) harvesting seed from the transgenic plant line, thereby obtaining a seed lot, wherein said seed lot comprises an acid detergent fiber (ADF) content of 5%, 8%, or 10% to 15%, 18%, or 20% by dry weight.

Embodiment 79

The method of embodiment 78, wherein said harvested seed comprise a seed lot of any one of embodiments 43 to 61.

What is claimed is:

1. Pennycress seed meal comprising an acid detergent fiber (ADF) content of 7% to 25% by dry weight, wherein the seed meal is defatted, and wherein said meal comprises a detectable amount of a polynucleotide comprising: (i) at least one loss-of-function mutation in an endogenous wild-type pennycress gene comprising the polynucleotide sequence of SEQ ID NO: 77 or SEQ ID NO: 47; or (ii) at least one loss-of-function mutation in an allelic variant of the endogenous wild-type pennycress gene having at least 95% sequence identity to SEQ ID NO: 77 or SEQ ID NO: 47.

2. The seed meal of claim 1, wherein said seed meal has a protein content of 30% to 70% by dry weight, an oil content of 0% to 12% by dry weight, and/or a neutral detergent fiber (NDF) content of 10% to 30% by dry weight.

3. The seed meal of claim 1, wherein said meal comprises an acid detergent fiber (ADF) content of 8% to 20% by dry weight and a detectable amount of the polynucleotide comprising: (i) the at least one loss-of-function mutation in the endogenous wild-type pennycress gene comprising the polynucleotide sequence of SEQ ID NO: 77 or SEQ ID NO: 47; or (ii) the at least one loss-of-function mutation in the allelic variant of the endogenous wild-type pennycress gene, wherein the allelic variant has at least 99% sequence identity to SEQ ID NO: 77 or SEQ ID NO: 47.

4. The pennycress seed meal of claim 1, wherein the meal exhibits a lighter-color in comparison to a control pennycress seed meal prepared from wild-type pennycress seed.

5. A composition comprising the defatted pennycress seed meal of claim 1.

6. Pennycress seed meal comprising an acid detergent fiber (ADF) content of 5% to 20% by dry weight, wherein the seed meal is non-defatted, and wherein said meal comprises a detectable amount of a polynucleotide comprising: (i) at least one loss-of-function mutation in an endogenous wild-type pennycress gene comprising the polynucleotide sequence of SEQ ID NO: 77 or SEQ ID NO: 47; or (ii) at least one loss-of-function mutation in an allelic variant of the endogenous wild-type pennycress gene having at least 95% sequence identity to SEQ ID NO: 77 or SEQ ID NO: 47.

7. The seed meal of claim 6, wherein said meal comprises an acid detergent fiber (ADF) content of 8% to 20% by dry weight and a detectable amount of the polynucleotide comprising: (i) the at least one loss-of-function mutation in the endogenous wild-type pennycress gene comprising the polynucleotide sequence of SEQ ID NO: 77 or SEQ ID NO: 47; or (ii) the at least one loss-of-function mutation in the allelic variant of the endogenous wild-type pennycress gene, wherein the allelic variant has at least 99% sequence identity to SEQ ID NO: 77 or SEQ ID NO: 47.

8. The seed meal of claim 6, wherein said seed meal has a protein content of 28% to 40% by dry weight, an oil content of 30% to 50% by dry weight, and/or a neutral detergent fiber (NDF) content of 10% to 25% by dry weight.

9. The seed meal of claim 6, wherein the meal exhibits a lighter-color in comparison to a control pennycress seed meal prepared from wild-type pennycress seed.

10. A composition comprising the non-defatted seed meal of claim 6.

11. A seed lot comprising a population of pennycress seeds that comprise an acid detergent fiber (ADF) content of 5% to 20% by dry weight, wherein the population comprises at least 10 seeds comprising said ADF content and wherein said population of pennycress seeds comprise: (i) seeds having at least one loss-of-function mutation in an endogenous wild-type pennycress gene encoding the polypeptide of SEQ ID NO: 76 or SEQ ID NO: 46; (ii) seeds having at least one loss-of-function mutation in an allelic variant of the endogenous wild-type pennycress gene encoding a polypeptide having at least 95% sequence identity to SEQ ID NO: 76 or SEQ ID NO: 46; (iii) seeds having at least one transgene that suppresses expression of an endogenous wild-type pennycress gene encoding the polypeptide of SEQ ID NO: 76 or SEQ ID NO: 46; or (iv) seeds having at least one transgene that suppresses expression of an allelic variant of the endogenous wild-type pennycress gene encoding a polypeptide having at least 95% sequence identity to SEQ ID NO: 76 or SEQ ID NO: 46.

12. The seed lot of claim 11, wherein said seeds have a protein content of 28% to 40% by dry weight, an oil content of 30% to 50% by dry weight, and/or a neutral detergent fiber (NDF) content of 10% to 25% by dry weight.

13. The seed lot of claim 11, wherein the population comprises at least 500 seeds comprising said ADF content.

14. The seed lot of claim 11, wherein at least 95% of the pennycress seeds in the seed lot are seeds comprising said ADF content.

15. The seed lot of claim 11, wherein said seeds further comprise an agriculturally acceptable excipient or adjuvant.

16. The seed lot of claim 11, wherein said seeds further comprise a fungicide, a safener, or any combination thereof.

17. The seed lot of claim 11, wherein the population of pennycress seeds comprise: (i) seeds having the at least one loss-of-function mutation in the allelic variant of the endogenous wild-type pennycress gene encoding a polypeptide having at least 99% sequence identity to SEQ ID NO: 76 or SEQ ID NO: 46; (ii) seeds having the at least one transgene that suppresses expression of an endogenous wild-type pennycress gene encoding the polypeptide of SEQ ID NO: 76 or SEQ ID NO: 46; or (iii) seeds having the at least one transgene that suppresses expression of the allelic variant of the endogenous wild-type pennycress gene, wherein the allelic variant encodes a polypeptide having at least 99% sequence identity to SEQ ID NO: 76 or SEQ ID NO: 46.

18. The seed lot of claim 11, wherein the seeds in the population exhibit a lighter-colored seed coat in comparison to a wild-type pennycress seed.

19. A method of making defatted pennycress seed meal comprising an acid detergent fiber (ADF) content of 7% to 25% by dry weight, comprising solvent extracting the seed lot of claim 11 and separating the extracted seed meal from the solvent, thereby obtaining the defatted pennycress seed meal.

20. A method of making a composition comprising non-defatted pennycress seed meal comprising an acid detergent fiber (ADF) content of 7% to 25% by dry weight, comprising the step of grinding, macerating, extruding, expanding, and/or crushing the seed lot of claim 11, wherein said composition further comprises a preservative, a dust preventing agent, a bulking agent, a flowing agent, or any combination thereof, thereby obtaining the non-defatted pennycress seed meal composition.

* * * * *

SEQUENCE LISTING

<160> NUMBER OF SEQ ID NOS: 183

<210> SEQ ID NO 1
<211> LENGTH: 795
<212> TYPE: DNA
<213> ORGANISM: Thlaspi arvense

<400> SEQUENCE: 1

```
atggggaaga gaacaagtaa cagtttgaag aaagatgagt taaacagagg agcttggact      60

gatcaagaag acaagatcct taaagattat atcatgatcc atggcgaagg caaatggagc     120

actctcccaa accaagccgg tctcaagagg tgtggcaaaa gctgcagact caggtggaag     180

aactacttga gaccggggat aaagcgcgga aacatctcat ctgatgaaga agaactcata     240

atccgcctcc ataatctcct tggaaacaga tggtctctga tagctgggag gcttccgggg     300

cgaacagaca atgaaataaa gaaccattgg aactcaaacc tccgcaaaag acttcccaaa     360

acaaaaacca accaaccaaa acttcgaaaa cattcaacca acatcaagaa caatgtctgt     420

gttatacgca caaaggcgat taggtgctca aaggctctga cttttcagaa ccagagtagt     480

agtggtagta ccaatcttct tcctatgaaa gaacaagtga gctctatgat ggatcatgaa     540

gctggttctt cgttgttgga agatcttgaa attgattttg ataaaatcca atcagagttt     600

ctcttccctg atctgatgga tttggaaggt ttgggttgtg gaaacgtaac atcacttgtt     660

tcatctgagg agattttagg agattatgtt cgtgctgatg aatcttctca gggtaatctt     720

gatctcaata gacctttcac tccttgtctt catcgtggca acgatgaaga ttggctccga     780

gttttcaatt gttag                                                      795
```

<210> SEQ ID NO 2
<211> LENGTH: 264
<212> TYPE: PRT
<213> ORGANISM: Thlaspi arvense

<400> SEQUENCE: 2

```
Met Gly Lys Arg Thr Ser Asn Ser Leu Lys Lys Asp Glu Leu Asn Arg
1               5                   10                  15

Gly Ala Trp Thr Asp Gln Glu Asp Lys Ile Leu Lys Asp Tyr Ile Met
            20                  25                  30

Ile His Gly Glu Gly Lys Trp Ser Thr Leu Pro Asn Gln Ala Gly Leu
        35                  40                  45

Lys Arg Cys Gly Lys Ser Cys Arg Leu Arg Trp Lys Asn Tyr Leu Arg
    50                  55                  60

Pro Gly Ile Lys Arg Gly Asn Ile Ser Ser Asp Glu Glu Glu Leu Ile
65                  70                  75                  80

Ile Arg Leu His Asn Leu Leu Gly Asn Arg Trp Ser Leu Ile Ala Gly
                85                  90                  95

Arg Leu Pro Gly Arg Thr Asp Asn Glu Ile Lys Asn His Trp Asn Ser
            100                 105                 110

Asn Leu Arg Lys Arg Leu Pro Lys Thr Lys Thr Asn Gln Pro Lys Leu
        115                 120                 125

Arg Lys His Ser Thr Asn Ile Lys Asn Asn Val Cys Val Ile Arg Thr
    130                 135                 140

Lys Ala Ile Arg Cys Ser Lys Ala Leu Thr Phe Gln Asn Gln Ser Ser
145                 150                 155                 160

Ser Gly Ser Thr Asn Leu Leu Pro Met Lys Glu Gln Val Ser Ser Met
                165                 170                 175
```

```
Met Asp His Glu Ala Gly Ser Ser Leu Leu Glu Asp Leu Glu Ile Asp
            180                 185                 190

Phe Asp Lys Ile Gln Ser Glu Phe Leu Phe Pro Asp Leu Met Asp Leu
        195                 200                 205

Glu Gly Leu Gly Cys Gly Asn Val Thr Ser Leu Val Ser Ser Glu Glu
    210                 215                 220

Ile Leu Gly Asp Tyr Val Arg Ala Asp Glu Ser Ser Gln Gly Asn Leu
225                 230                 235                 240

Asp Leu Asn Arg Pro Phe Thr Pro Cys Leu His Arg Gly Asn Asp Glu
                245                 250                 255

Asp Trp Leu Arg Val Phe Asn Cys
            260


<210> SEQ ID NO 3
<211> LENGTH: 3512
<212> TYPE: DNA
<213> ORGANISM: Thlaspi arvense

<400> SEQUENCE: 3

tctcagccaa attgacaaat aaaaatcaca tttagaaaac atttcacggt tttgtatgta     60

aactagtaaa aaaaaaaaaa gagaacatgt tatttcaata tataacattg gaaagtatag    120

tatattgatt ctctcactaa tctaaaaatt tatgcatcaa taatttttaa tagattaaaa    180

atctaaagtt aatcttattg gaaattaaat ataattatta agtttcaata tatatagaca    240

tgttatctct ttcattttta accaactagt gatatgggac aaagtacaaa atgttagtta    300

catcagtttt aatctgatat aaaatttgta tcaatttttt taatgttaac aaaattattg    360

attacattga ttatttaaat agtgtaaatt tataatttta tatcagtttt gtttaactga    420

tgtaaactaa tataagtttg tatcaatttt attgaacgga agtcaaataa tcaataaaaa    480

tatcaatttt cagaactgat gttaaatcac atattttata tcatttatta ataagtaatt    540

cacctttttt gtagtgtgat atgagttatt ggcgtttaat aataatttta aaaaattata    600

gtttcatgtt aaatcttaca aaattatata aatcttttaa aatcaaaaat tatttatttg    660

agcatttgca ataatgaaca gttgcgaatg aataattaat aaaatattta aaaattaaaa    720

atgtaaataa caaaatgtat ttaaactctg aatatatgta tataataaca taaattgact    780

taaaaaataa taaatcatat gtacaaagtt gacgccttct taaatactgt ttttataatt    840

tctaatataa taattattca aatggaaaaa ttaaacttga atatgaacct tttaactctt    900

tgattgtcaa aaataaaaag ttttcatgaa atagagttcc gaacttaaaa aagagacatt    960

tgaaacttgg gaccccaaat ttatgtaaca ctgaaagatc ttaaggagtt ttattttttg   1020

tttgttcatg acgcaggact atgtgtactg tgtaggcatg aagaccatgt gttaccgtct   1080

taactgtatc aaatgatgat tgcttacata ctagaatgtg gctagcaatg actattttca   1140

ctctgtatac atacttatac cccatatgca atacaataat gatcaaggtc gttttaggac   1200

ctatatgatt ggagtctaag gcacgagaga ctagactagc gatcatcgtg tgaagtgagt   1260

tcaaaggatt tcagatcctt agtaataagt acaaaagtat attcttgatg acaaaattcg   1320

gtagagttaa atctcaccaa aactgataca ctattattac caggtgagaa aaggattgat   1380

atttcaaagt gtgtgtgtgt gacagaagtt ttggaaagcg acatgtgtac ggacattgca   1440

acaactccat ataaagttac tttgttaaca caaaaagaat ctattctcta ctcaacacta   1500

aagacaattg taccaaccaa acaaccacaa gagagagaaa gagagtatgg ggaagagaac   1560

aagtaacagt ttgaagaaag atgagttaaa cagaggagct tggactgatc aagaagacaa   1620
```

```
gatccttaaa gattatatca tgatccatgg cgaaggcaaa tggagcactc tcccaaacca   1680
agccggtaca tatccatcta tctattgatc tatccgtctt taaatgcaaa tcttcatcta   1740
cttacaataa ttgcacataa aggtctcaag aggtgtggca aaagctgcag actcaggtgg   1800
aagaactact tgagaccggg gataaagcgc ggaaacatct catctgatga agaagaactc   1860
ataatccgcc tccataatct ccttggaaac aggttaatta acttcctctt tcaccgaaac   1920
acagattgtt ttcttttcaa gttaagtttt tccataattt ttgcggcgta atgcagatgg   1980
tctctgatag ctgggaggct tccggggcga acagacaatg aaataaagaa ccattggaac   2040
tcaaacctcc gcaaaagact tcccaaaaca aaaaccaacc aaccaaaact tcgaaaacat   2100
tcaaccaaca tcaagaacaa tgtctgtgtt atacgcacaa aggcgattag gtgctcaaag   2160
gctctgactt ttcagaacca gagtagtagt ggtagtacca atcttcttcc tatgaaagaa   2220
caagtgagct ctatgatgga tcatgaagct ggttcttcgt tgttggaaga tcttgaaatt   2280
gattttgata aaatccaatc agagtttctc ttccctgatc tgatggattt ggaaggtttg   2340
ggttgtggaa acgtaacatc acttgtttca tctgaggaga ttttaggaga ttatgttcgt   2400
gctgatgaat cttctcaggg taatcttgat ctcaatagac ctttcactcc ttgtcttcat   2460
cgtggcaacg atgaagattg gctccgagtt ttcaattgtt agagcgtatc actagtctac   2520
ataattacat acatatatat ctgtacgaac aaaattatat ttgtattttg tttgaaagct   2580
tctaatttct aattactaat tttgttgtgt tttctaatcc atagattatc aattttgcac   2640
tctttttcaa ttaaagactt atggaaatgg cttttgtctt tagaataaaa tacaaattgc   2700
aaaatatcgc aaatacgcaa tgaagattat ttattttcga tagattttat tcaattatta   2760
tgtgcatgca taaatgatag agcttttatt atagcctaac taccgcttaa ctaccctacc   2820
aataaattat acgagggtca ttgttcttgg taatacgaaa aaaatctttg caatattgtc   2880
ttaacgaaat tgaattttaa tatacacaca tatccattta taggcagaca cggtcataca   2940
tctaaggatt tattgttttt tgtttcttat cattcttcgg aatcattgta taaatggtta   3000
ttgttgtaac aagagaaagg acatcgggtt ataattttat agaggaaacc taaatttgtg   3060
attgtcgact gtggccgctg acggcggttc agtgtcacta gtttatggtc ttttatctat   3120
gctattgtgg gtgcgaatat gtccttttgt taaccttctt aaatattgaa ataaggttgt   3180
tttcggattg tcaatgttat taaacaaatc cattctcaat agtttgacaa aaaaaaaaaa   3240
aaaatccatt ctcaataaat agctgatgca ggaaagacta ttggtttttc tgtattttaa   3300
gttatcggat cttttatatg atataatcca ttacaaatag acactaatta gacaagtgtt   3360
aaaaatagtt cttattatca atttggcagt gatacataaa taaacctatt acacctacct   3420
attaggtgat tatctgcgta tacatacata cacacggatt tacattttat tatagatttt   3480
aaaatgtata aataatatac catattttat tt                                 3512
```

<210> SEQ ID NO 4
<211> LENGTH: 795
<212> TYPE: DNA
<213> ORGANISM: Thlaspi arvense

<400> SEQUENCE: 4

```
atggggaaga gaacaagtaa cagtttgaag aaagatgagt taaacagagg agcttggact     60
gatcaagaag acaagatcct taaagattat atcatgatcc atggcgaagg caaatggagc    120
actctcccaa accaagccgg tctcaagagg tgtggcaaaa gctgcagact caggtggaag    180
```

```
aactacttga gaccggggat aaagcgcgga aacatctcat ctgatgaaga agaactcata    240
atccgcctcc ataatctcct tggaaacaga tggtctctga tagctgggag gcttccgggg    300
cgaacagaca atgaaataaa gaaccattga aactcaaacc tccgcaaaag acttcccaaa    360
acaaaaacca accaaccaaa acttcgaaaa cattcaacca acatcaagaa caatgtctgt    420
gttatacgca caaaggcgat taggtgctca aaggctctga cttttcagaa ccagagtagt    480
agtggtagta ccaatcttct tcctatgaaa gaacaagtga gctctatgat ggatcatgaa    540
gctggttctt cgttgttgga agatcttgaa attgattttg ataaaatcca atcagagttt    600
ctcttccctg atctgatgga tttggaaggt ttgggttgtg gaaacgtaac atcacttgtt    660
tcatctgagg agattttagg agattatgtt cgtgctgatg aatcttctca gggtaatctt    720
gatctcaata gacctttcac tccttgtctt catcgtggca acgatgaaga ttggctccga    780
gttttcaatt gttag                                                     795
```

```
<210> SEQ ID NO 5
<211> LENGTH: 109
<212> TYPE: PRT
<213> ORGANISM: Thlaspi arvense

<400> SEQUENCE: 5

Met Gly Lys Arg Thr Ser Asn Ser Leu Lys Lys Asp Glu Leu Asn Arg
1               5                   10                  15

Gly Ala Trp Thr Asp Gln Glu Asp Lys Ile Leu Lys Asp Tyr Ile Met
            20                  25                  30

Ile His Gly Glu Gly Lys Trp Ser Thr Leu Pro Asn Gln Ala Gly Leu
        35                  40                  45

Lys Arg Cys Gly Lys Ser Cys Arg Leu Arg Trp Lys Asn Tyr Leu Arg
    50                  55                  60

Pro Gly Ile Lys Arg Gly Asn Ile Ser Ser Asp Glu Glu Glu Leu Ile
65                  70                  75                  80

Ile Arg Leu His Asn Leu Leu Gly Asn Arg Trp Ser Leu Ile Ala Gly
                85                  90                  95

Arg Leu Pro Gly Arg Thr Asp Asn Glu Ile Lys Asn His
            100                 105
```

```
<210> SEQ ID NO 6
<211> LENGTH: 813
<212> TYPE: DNA
<213> ORGANISM: Thlaspi arvense

<400> SEQUENCE: 6

atgagagatt caaactcaat ccttgatctg tctcttcaga tcagccttcc taactctcac     60
gccggagaac ttcttcacgg cggtgaccga agctccacca caagtagtga ttctggaagc    120
agtctcagtg agttgggcca tgagaacaac ttcttcaaca aacctctcct aagcttaggt    180
tttgatcatc attatcgtta tcaaaggcac tcaaacatga tccaaccaca aatctacggt    240
cgagatttca agagaagctc atcatcaatg gtttgtctta aacgaagcat tcgagctcca    300
agaatgagat ggacttctac tctccatgcg cactttgtcc atgctgttca gcttcttggc    360
ggccatgaaa gagctacgcc taaatcagtg ttggagttga tgaatgtgaa ggatctaacc    420
ctagctcatg tcaagagtca cttgcagatg tatagaacag tgaaatgcac tgataaagga    480
tcatcaggag aaggaaaggt agagaaagat acagagctga tgacagagga caataataat    540
aatgaagaag ctgacgaagg aactgacaca aattcgccaa actcatcatc tgtgcaaaag    600
```

acccaaaggg cttcttgttc atccaaaaag agagtgtgta tgaacatatc tacacaagca 660
gaacctcact tgggatcaac tcgtcacact aatgatgatg ggaagaaaga ggcgatcaac 720
gctcatctca atttggaatt cacattaggc cggcaaagtt gggggatgga ctattcggaa 780
cccttaagag atctaactct tctcaagtgc taa 813

<210> SEQ ID NO 7
<211> LENGTH: 270
<212> TYPE: PRT
<213> ORGANISM: Thlaspi arvense

<400> SEQUENCE: 7

Met Arg Asp Ser Asn Ser Ile Leu Asp Leu Ser Leu Gln Ile Ser Leu
1 5 10 15

Pro Asn Ser His Ala Gly Glu Leu Leu His Gly Gly Asp Arg Ser Ser
20 25 30

Thr Thr Ser Ser Asp Ser Gly Ser Ser Leu Ser Glu Leu Gly His Glu
35 40 45

Asn Asn Phe Phe Asn Lys Pro Leu Leu Ser Leu Gly Phe Asp His His
50 55 60

Tyr Arg Tyr Gln Arg His Ser Asn Met Ile Gln Pro Gln Ile Tyr Gly
65 70 75 80

Arg Asp Phe Lys Arg Ser Ser Ser Ser Met Val Cys Leu Lys Arg Ser
85 90 95

Ile Arg Ala Pro Arg Met Arg Trp Thr Ser Thr Leu His Ala His Phe
100 105 110

Val His Ala Val Gln Leu Leu Gly Gly His Glu Arg Ala Thr Pro Lys
115 120 125

Ser Val Leu Glu Leu Met Asn Val Lys Asp Leu Thr Leu Ala His Val
130 135 140

Lys Ser His Leu Gln Met Tyr Arg Thr Val Lys Cys Thr Asp Lys Gly
145 150 155 160

Ser Ser Gly Glu Gly Lys Val Glu Lys Asp Thr Glu Leu Met Thr Glu
165 170 175

Asp Asn Asn Asn Asn Glu Glu Ala Asp Glu Gly Thr Asp Thr Asn Ser
180 185 190

Pro Asn Ser Ser Ser Val Gln Lys Thr Gln Arg Ala Ser Cys Ser Ser
195 200 205

Lys Lys Arg Val Cys Met Asn Ile Ser Thr Gln Ala Glu Pro His Leu
210 215 220

Gly Ser Thr Arg His Thr Asn Asp Asp Gly Lys Lys Glu Ala Ile Asn
225 230 235 240

Ala His Leu Asn Leu Glu Phe Thr Leu Gly Arg Gln Ser Trp Gly Met
245 250 255

Asp Tyr Ser Glu Pro Leu Arg Asp Leu Thr Leu Leu Lys Cys
260 265 270

<210> SEQ ID NO 8
<211> LENGTH: 4752
<212> TYPE: DNA
<213> ORGANISM: Thlaspi arvense

<400> SEQUENCE: 8
gaggtcggtc gattcaaact tcttttccct ttttgtcttt tgtgtatatt tccatatcta 60
tcctttattc tccgagtaat aaggaaattc ttctttatct tttgaattag tccgatgttt 120

```
ccggtcttca aaggttatcc ttaagagatt tccttaaatc cgaactaggt cggcacggtc    180
ttcctagtct tgatgggctt aagttattgc gagggaaaac cttttaggaa atgtattcat    240
tttccctcta acaatgtttt aagtatgtat taacaaaata aaaattaata tatgaaaaca    300
attaataaaa ataagtaaga tgcttatgtg aagcagaata ttcccgaccg tgtgtctact    360
taccgtggcc aaagacatcg catgaaaaaa caaaccaaag agtaaggtaa attaaataga    420
atgtatttaa ctagattgaa cttggagtaa ttagttgtct ttctcttttt gcacttttga    480
aaagataaac aaaatttcct tttggagcta ctttgtggtt caaacaagaa tccccatggc    540
aaaacggcag ttactttgtc agtcaacttt tgaaatctga ggctttcaag gattgtaaga    600
aatattaaat acaaaactct gttgtatttt ccatcgaccc taagagacag gccttttcaa    660
gcctatcttt ttagcattgg aaattttaaa gtgttttatt ttatttattt aaaatagtaa    720
aaacatgcaa atcatagggt actcattatc taattatcac actcactctc tttcctcggc    780
ttggtttaac ctttttaacc actgatcaaa taatacgtag ccaatttgtc caaaatcttc    840
caacttcttt tcctcctttc ttacttcttt aaattatttt agtattcgtc ataaatcaaa    900
agatacgttg tcttgaacat gtacacaggt tgtagtattt gtgtgaaaca caaaagtgta    960
tactagtatt ttagttagga aatctacacc atatatttac ttttcttata aattaagtat   1020
atgactttga cattatttta atgatacata atcttttgat tactttcatc agttattttt   1080
tttgctaaaa attaatttaa atgttgtttt taacctacta aagatttcat gcgtacgtca   1140
gagactattt tttgtttctc atatcatgat atgtaatcag aaaagtgaaa acaggttgcc   1200
atgtacattc atttatgata cacaattgat tttttttttc tttttaccaa ataacaggtt   1260
attcatcagt tgccacattg gcgaaagatg aaaatactat tttcattgat ccgcataaat   1320
aaaaaatcct ttgattttac cactttgtta tggtagtcat ttacgtagtt ttaattcggt   1380
tatctacccg aattacgttt tttttgctta aaagttgaaa atgttattct acgtagggac   1440
taacatctgg taatacagta ctacgataag agtgaataat taagagtttt ataaataggt   1500
tatatattta aatcatttgt acacgtagaa aataaaacat attattctta aaaaaagacg   1560
atagactatg tttattgaga taaagacaat agttacgtcg ttgcttttct tgctctctct   1620
ctctccattt ctttctctct ccgctattta aatagacaaa ggattaatga aaaagtagag   1680
agatgatgat gttagactcc agaagcagta tgagagattc aaactcaatc cttgatctgt   1740
ctcttcagat cagccttcct aactctcacg ccggagaact tcttcacggc ggtgaccgaa   1800
gctccaccac aagtagtgat tctggaagca gtctcagtga gttgggccat gagaacaact   1860
tcttcaacaa acctctccta agcttaggtt ttgatcatca ttatcgttat caaaggcact   1920
caaacatgat ccaaccacaa atctacggtc gagatttcaa gagaagctca tcatcaatgg   1980
tttgtcttaa acgaagcatt cgagctccaa gaatgagatg gacttctact ctccatgcgc   2040
actttgtcca tgctgttcag cttcttggcg gccatgaaag tattttgctt tcacattttc   2100
ctttttaaaa gaaataatca agatttatgt caagtaaaat gttttgaaac caaagtacta   2160
agatttgttg cttatttgct ggtctcagga gctacgccta aatcagtgtt ggagttgatg   2220
aatgtgaagg atctaaccct agctcatgtc aagagtcact tgcaggtcca tctctatttt   2280
aatttatttt tcttatatat tttattataa aaatagtaat ggaatctcat aagaatgcaa   2340
taggtttaag taaacattta tgaaagtgta tctatttggt ccactagcta acacatgatt   2400
gcgtagttga aataaacttg tattagctat acttttttta ttttttattt ggttttgatt   2460
tttaaaggat gtgtgtttgt tgatgcagat gtatagaaca gtgaaatgca ctgataaagg   2520
```

```
atcatcaggt atgcattcaa accggattgg ctgatttttg aattcctact ggatgtaaat   2580
gtaactatct catttttttt tttttgtttt aatttgtatt tgtttcttct tgggaataac   2640
aggagaagga aaggtagaga aagatacaga gctgatgaca gaggacaata ataataatga   2700
agaagctgac gaaggaactg acacaaattc gccaaactca tcatctgtgc aaaagaccca   2760
aaggttactc ttttatctat tctattttgt aaaaactttg catttaatct ctttgccttt   2820
gttatgcgcg aattttgatg aatccctctt ctagtcgtat gtgaccctgc ttgtccattt   2880
ttataaatag aaaaaatttc tatgatctca gttaaattgt gtgtattcac tgttgatagt   2940
aaataagtag gttcaaataa aacaatatat gaatatgaat gtccaacaat atgaattatt   3000
attagtagat ttctcaaatg tgttttttat catttaaatt tgaacagggc ttcttgttca   3060
tccaaaaaga gagtgtgtat gaacatatct acacaagcag aacctcactt gggatcaact   3120
cgtcacacta atgtacattc tttaacaaat tgttacaatg ttattataga tgtgcactct   3180
cacatatacg tacatatacc cttctgtata ctgtttctaa aatgtgaaat ctttggaaat   3240
aggatgatgg gaagaaagag gcgatcaacg ctcatctcaa tttggaattc acattaggcc   3300
ggcaaagttg gggatggac tattcggaac ccttaagaga tctaactctt ctcaagtgct   3360
aatcgtttag cttggagaac tacaacaaat aagtcagctt aggttatcaa tttaacataa   3420
ttaacttgtt tgatcgtaat agacattgga agaatcatta tcatcatata tgaatttctt   3480
acaaaaaatg ttctcatttt tttttttggg atgtaaacaa gagattcgga ttaagtagta   3540
gctatgttat ggttgtagtg gatgagaagg gagtgcaagt tcaagtagag atgaacttat   3600
gattggttgc caccaaatat gcatggtgga tttgttggta gttttttttt atgttttcat   3660
tgactgctat tcatattgtc gcagtgaata tatatttaaa tgattttgtt ttgattcttt   3720
gtcttgattt ggattagaaa gtagaattcg gcaaaactag aggtttttttt actgatattc   3780
tgcatgacaa taaaactctc agttctattt aaatttttcg ctttgttatt gatacatata   3840
ccgtttaaaa ggatacatta aacaatactg aatagtactc tcaaattctg tttttcgaag   3900
gatatgagtt ggtagatatt tcacaacatc aaaaaacgaa ggtgaaaata ccttcttcag   3960
attgcaaaga attacagaaa ttttgtgcca ggtttcgcag accgcctgtt gtaagagatc   4020
gcaacatata tcttgaacca atccctcgaa agcataaata aacaaagtag acactaagaa   4080
atgattatat aaataatata atatgtttaa tttattaatt atatgtagct gcaattgctt   4140
catgaatatt atgtggtaga gactgacaaa aataaatgga aagagacact tcatcacaac   4200
atggtaatca taactcttca tccagaaaac ttccatacct cttcatttat atgagaattt   4260
aatgttatag gcaatctaat aaatactctc cctttgaagg tgcatccaac tgaaaagcag   4320
ggaccgatgc cttccctttc taggaaactt gtcgcgcctt accagaacag tactctgcca   4380
agtccaatct agacttcata ttgtcctttg tcttcctttg acattgagaa cggtgttgat   4440
tatgttgtct ataaaattct tcgtattgtg cataacatct agattatgcc ttatcaaatg   4500
gtccttccaa aaagacaatt cccaaaatat actcatctta tacaaactat gttggtcacc   4560
acaagcgttc acatgataat gataaccttc catgcattgg ccatcagaat aacatgccat   4620
atgctggaaa aaggctaata gtccacatta atactgaccc catgacaata ttctgctgac   4680
aagaaacatg aaatgcctga acactatgct cctataatat ttgcagctca taaaacaatg   4740
attggagaaa tt                                                        4752
```

<210> SEQ ID NO 9

<211> LENGTH: 1041
<212> TYPE: DNA
<213> ORGANISM: Thlaspi arvense

<400> SEQUENCE: 9

```
atgacaatct tggatcagac cgttgtaaca accggatcga agaaggcttg tgtcatcggt     60

ggcacaggaa acttagcttc tactctcatc aagcatttgc ttcaaagtgg ctacaaagtt    120

aacactacag ttagagatcc agagaatgag aagaaaatgg ctcacttaag ggtacttcaa    180

gaacttgggg acctcaagat cttcaaggcg gaatttactg atgaagagag tttcgattca    240

ccagtttcgg gctgtgatta cgttttccat gtcgcaacgc ctatcaactt tacatctgaa    300

gatcccgaga aagacatgat caagccaggg atacaaggag tgaccaatgt gttgaaatct    360

tgcttaaaat cgaaatcagt caagcgtgtg atctacactt cttcagctgc tgcggtttcc    420

atcaacaatc tttctggacc tggacttgtg atgaacgaag aaaactggac tgaccttgat    480

tatctcacaa aggagaagcc gtttaactgg ggctacccag tgtcaaagat actagcagaa    540

aaggcagctt gtaaatttgc ggaagagaac aagatcgatc tagttaccgt gattccggca    600

ctcatatccg gaaaatctct cctctcggat cctcctccga gcagctcatt tctctctatg    660

tctttaatca ccgggaatga aatgtatctg aaaggtctca aggaaatgca gaagcaatct    720

ggctccatct cgttcagcca cgtgaaggat ttggctcgtg cccatttgtt tcttgcggag    780

aaagaaactg cgtctggtcg ttacatttgc tgtacttaca acacaagtgt tccggagatt    840

gcagattttc tcaggcagag atatcctaag tacaatgtgc tgtctgaatt cgaagagtgc    900

ttatcaagtg cgaagctgac gctatcttcg gaaaaactca tcaatgaagg ctttcgattc    960

gaatatggga ttaatgagat ctatgatgag atgatagagc acttcgagtc caaaggatta   1020

atcaaagcta aagaatcttg a                                              1041
```

<210> SEQ ID NO 10
<211> LENGTH: 346
<212> TYPE: PRT
<213> ORGANISM: Thlaspi arvense

<400> SEQUENCE: 10

```
Met Thr Ile Leu Asp Gln Thr Val Val Thr Thr Gly Ser Lys Lys Ala
1               5                   10                  15

Cys Val Ile Gly Gly Thr Gly Asn Leu Ala Ser Thr Leu Ile Lys His
            20                  25                  30

Leu Leu Gln Ser Gly Tyr Lys Val Asn Thr Thr Val Arg Asp Pro Glu
        35                  40                  45

Asn Glu Lys Lys Met Ala His Leu Arg Val Leu Gln Glu Leu Gly Asp
    50                  55                  60

Leu Lys Ile Phe Lys Ala Glu Phe Thr Asp Glu Glu Ser Phe Asp Ser
65                  70                  75                  80

Pro Val Ser Gly Cys Asp Tyr Val Phe His Val Ala Thr Pro Ile Asn
                85                  90                  95

Phe Thr Ser Glu Asp Pro Glu Lys Asp Met Ile Lys Pro Gly Ile Gln
            100                 105                 110

Gly Val Thr Asn Val Leu Lys Ser Cys Leu Lys Ser Lys Ser Val Lys
        115                 120                 125

Arg Val Ile Tyr Thr Ser Ser Ala Ala Ala Val Ser Ile Asn Asn Leu
    130                 135                 140

Ser Gly Pro Gly Leu Val Met Asn Glu Glu Asn Trp Thr Asp Leu Asp
145                 150                 155                 160
```

```
Tyr Leu Thr Lys Glu Lys Pro Phe Asn Trp Gly Tyr Pro Val Ser Lys
                165                 170                 175

Ile Leu Ala Glu Lys Ala Ala Cys Lys Phe Ala Glu Glu Asn Lys Ile
            180                 185                 190

Asp Leu Val Thr Val Ile Pro Ala Leu Ile Ser Gly Lys Ser Leu Leu
        195                 200                 205

Ser Asp Pro Pro Pro Ser Ser Ser Phe Leu Ser Met Ser Leu Ile Thr
    210                 215                 220

Gly Asn Glu Met Tyr Leu Lys Gly Leu Lys Glu Met Gln Lys Gln Ser
225                 230                 235                 240

Gly Ser Ile Ser Phe Ser His Val Lys Asp Leu Ala Arg Ala His Leu
                245                 250                 255

Phe Leu Ala Glu Lys Glu Thr Ala Ser Gly Arg Tyr Ile Cys Cys Thr
            260                 265                 270

Tyr Asn Thr Ser Val Pro Glu Ile Ala Asp Phe Leu Arg Gln Arg Tyr
        275                 280                 285

Pro Lys Tyr Asn Val Leu Ser Glu Phe Glu Glu Cys Leu Ser Ser Ala
    290                 295                 300

Lys Leu Thr Leu Ser Ser Glu Lys Leu Ile Asn Glu Gly Phe Arg Phe
305                 310                 315                 320

Glu Tyr Gly Ile Asn Glu Ile Tyr Asp Glu Met Ile Glu His Phe Glu
                325                 330                 335

Ser Lys Gly Leu Ile Lys Ala Lys Glu Ser
            340                 345


<210> SEQ ID NO 11
<211> LENGTH: 4124
<212> TYPE: DNA
<213> ORGANISM: Thlaspi arvense

<400> SEQUENCE: 11

gccgccgccg ccgcgaaggc caagaagaag gatgtggagg ctccgctgac aattgcttta      60

ggcttacagg cgccgaaatc gggaacgaag cggccgagtg aagggacttc aagggaggct     120

aattcaaagc gagctaagaa ggttacttca ggggacgacg agaagaagat cggcgaagac     180

tcaaagaaac ctgcttttca gagactgtgg tctgaggaag acgaaatcac tgtgcttcaa     240

ggtatgatcg atttcaatgc tgatacaggc aagtctcctt acgaagacac gaatgtgtat     300

tacgatttca tcaagaaaaa gattagcttt gaggttagca agaaccagtt catggataag     360

attaggagct tgaagaagaa gtatataggc aaaggaaaga ctgccttcac gaaacctcac     420

gatcagagat ctttcaagct gtgccaacac atatggggac ctgaaggaat ggctctcgag     480

tcagcggtta agtccaatgg cgtatcgaga aagagccaga agaagaagaa gcttgactct     540

gtgaagcaag agctgtcttt tgcttcttcc cctaatggca aaacggttga tgatgataaa     600

aaagtgttga tccatggagg agatgtggag tcttcggttg ctgcgaagaa gcatgattgg     660

ttcgagagct cgtttcttgt tcgcgccatt gccggtttgg gagttgatga gtatactgtg     720

aaacagaggt ggagcttggt gcctgttgag acgaagaaga aggttgaaga gaagatgaag     780

atgttgcagg ccaaggagat tgattttgtg ttggagaaga cacagttttt gcatgaggtt     840

acatcgatga tcgctgaagc atctaagaag aagacattag atatatagat ttgatccgaa     900

aatgccaatg ccaatgcctc tctcttttgt tttttgaatc ttaggaatta tctcttttac     960

ttccctttta tgatctatca atctatgtaa tttttctggt ttttctggtg gtttttaata    1020
```

-continued

```
tggaactctc tctcttttgg atttgttgct tatacataaa agcaccatgg aagtaaattc   1080
tacatggtga aatatgaaga agatccaaac aaactgtttt tttttttttt atgaaatggg   1140
tttattcagg atgaattttg ttgaattgag gctaaaaaat tttggtgttc tctaaaacaa   1200
aaagttaaat gaaactttca gctcaaagat caaattggtt gaagaaagca aaactctttt   1260
cacaagtaga tgatatcaaa tcagcaagtc aattaaaagt ttgactcttt ttttgattct   1320
taggtgagag agttagttat taaagaagag gaaggtaaca caaaattagt tgcttcaaaa   1380
ctcacgtgct taccttctaa aaagactttt tgatcaatgg ttgtaccaaa tgtgcaagac   1440
cataagcttt gccactataa aaacgagtgc taaggccata aactcataac agtcagatct   1500
aaatatctgt gtttaagaac tagtatcaga tgacaatctt ggatcagacc gttgtaacaa   1560
ccggatcgaa gaaggcttgt gtcatcggtg gcacaggaaa cttagcttct actctcatca   1620
agcatttgct tcaaagtggc tacaaagtta acactacagt tagagatcca ggttcttcat   1680
ttcttctttc tttcttctct tgaggttctt tgagtgttta gtgactcttt tattctgaat   1740
ttgcagagaa tgagaagaaa atggctcact taagggtact tcaagaactt ggggacctca   1800
agatcttcaa ggcggaattt actgatgaag agagtttcga ttcaccagtt tcgggctgtg   1860
attacgtttt ccatgtcgca acgcctatca actttacatc tgaagatccc gaggtctgat   1920
tttcaacaga ttgtgtatgt tttttttttct ctgactctta agagaaacgt tttcagctat   1980
cctttgtttg tgtttccatg tacagaaaga catgatcaag ccagggatac aaggagtgac   2040
caatgtgttg aaatcttgct taaaatcgaa atcagtcaag cgtgtgatct acacttcttc   2100
agctgctgcg gtttccatca acaatctttc tggacctgga cttgtgatga acgaagaaaa   2160
ctggactgac cttgattatc tcacaaagga gaagccgttt aactgggtaa tttacaattt   2220
cttgcgagcc aagatagggt ttacttggac cagtttactt actacatctc tgttcttttc   2280
tagggctacc cagtgtcaaa gatactagca gaaaaggcag cttgtaaatt tgcggaagag   2340
aacaagatcg atctagttac cgtgattccg gcactcatat ccggaaaatc tctcctctcg   2400
gatcctcctc cgagcagctc atttctctct atgtctttaa tcaccggtaa acaccaattt   2460
tactgtttga ctccttctgt taaagtttca caataagaaa gtcaaagatg aatggttttt   2520
ttttgttagg gaatgaaatg tatctgaaag gtctcaagga aatgcagaag caatctggct   2580
ccatctcgtt cagccacgtg aaggatttgg ctcgtgccca tttgtttctt gcggagaaag   2640
aaactgcgtc tggtcgttac atttgctgta cttacaacac aagtgttccg gagattgcag   2700
attttctcag gcagagatat cctaagtaca atgtgctgtc tgagtaagca tttatatcca   2760
cagaaactga aaatcttaat ggaaaattct gaattttctc gttaattttc gctgtgaaat   2820
ttggcagatt cgaagagtgc ttatcaagtg cgaagctgac gctatcttcg gaaaaactca   2880
tcaatgaagg ctttcgattc gaatatggga ttaatgagat ctatgatgag atgatagagc   2940
acttcgagtc caaaggatta atcaaagcta aagaatcttg aaatttataa tgtgaagata   3000
tggatttatg agtatatgag tctttgttct cattctcatt ctataaatgg cattaaataa   3060
taagttggtt gatttgatat gtattttgat atacacacct agaaaatgaa aaacaagatt   3120
tttcaagctt tatattactc tacgaagctg attagtaatt ttacttctaa gtttctcaca   3180
tttcacaact accttttttc tttcccatgt tataaatata taactttttt ttcagcataa   3240
aaagaagttg tggaaagaat gcgacgaact attttaccaa aaaaaaaggt gacaatctac   3300
atggaaaaaa gtaaataaaa tgtgttaata aactttcgat ttaaacaagt tgtgtattta   3360
catacaattg atatatatat atataatact ttataatact gtattctttt atcaaaagga   3420
```

tatatactgt aatatttagc aaattataca taaaactatc aaattaaaga gtatgatgta 3480
ttccactgaa aacataaaaa atgatatatg tagaaaccaa cctgagtgta tgcgcgtgga 3540
tattcgttta gtaataatga taatgatatg agtagactat attacctaaa gccaatcaac 3600
atatgaccaa tctacaagct cgagctttat tagatcaaaa cataaaaatt ggtatatgta 3660
gaaatgttgt ctaaattaaa ccaagatgaa aaacatgaga aaacattaaa acatcacttt 3720
ttattcttgg tgatttgtta ttagaactcc gagcaaagaa cgaatctgtg aggacatcat 3780
gcatgtatgt cttactcagc gtaataggga cattgtgcaa gtcactgcaa gagatctcca 3840
atgatgatct aacggatcca agaaagtaaa ggaaaagaag aaggaagagc agattggtga 3900
gactcggatc caagaattag aggaagatct gaaggatctg aagcggatgt gcactgttct 3960
agaaaccttt ctagggaaag aaaaggcaaa tgtgtttgaa gccagagccc ctgctatgac 4020
gttagatgag ttgtataatg acttaggttc tgcatgatgc gttgtggtat tgtatgttca 4080
gggccggctc taagattatg ggagtttgaa acaaaataaa aaat 4124

<210> SEQ ID NO 12
<211> LENGTH: 1461
<212> TYPE: DNA
<213> ORGANISM: Thlaspi arvense

<400> SEQUENCE: 12
atggatccga cgacgccgtt tctcggtggc gaggtcgaag aggattatgc tccggcgagg 60
acatggagcg acgtcaagcg agtttttgct acggagtcgg ccaaaatgtg gatgatcgcc 120
gctcccattg gtttcaacat catctgtcag tacggagtta cctccatcac caatattttc 180
gtcggccata tcggcgaggt cgagctctcc gccgtcgcca tctccctctc cgtcatcggc 240
accttttcct tcggcttcct gcttggcatg ggaagtgcac ttgaaacact ctgtggacaa 300
gcatttggag ctggtcaagt ccatatgtta ggcgtttaca tgcagagatc ttggattatc 360
ttattcgtct cctgcatctt tctccttcct atttacatat tcgccacgcc gattctgaga 420
ctcctcggcc aagcagagga gatcgccgtt ccagctggag aattcactct tttaaccatc 480
cctcagctat tctcactcgc catcaacttc ccaacctcca agttccttca agcgcagagc 540
aaagtcatcg cgattgcttg gatcgggttc atcgctttcg tcctacacgt cggtatgctc 600
tggctgttta taatcgtgtt tggttgggga acaaacggtg ctgccttggc gtttaatctc 660
accaactggg gaacagcgat ctctcaagtc gtttatgtga ttggttggtg taatgaaggc 720
tggtctggtt tgtcttggtt ggcatttaaa gagatttggg ctttcgttag actctccata 780
gcatctgctg ttatgctttg tcttgagatc tggtacatga tgagtatcat cgtccttact 840
ggtcgccttg acaacgctgt tatcgctgtt gattcccttt ccatatgcat gaatctcaat 900
ggtctggagg ccatgttgtt catcggaata aacgctgcta taagtgtccg tgtctccaat 960
gagcttggct taggccgtcc acgagcagcg aaatactctg tctatgtcac ggtgttcgag 1020
tctctcctca tcggtcttgt ctttatggtg gctatcatca taggcagaga ccattttgcg 1080
atcatcttca cgagcagcaa agtacttcaa cgcgcagtgt ctaagctagc ttatcttctt 1140
ggtataacca tggttctcaa cagcgtgcag ccagtcattt ccggtgtggc tgttggagga 1200
ggttggcaaa gtttggtggc ttatataaac ttgggttgtt actacatttt cggccttccc 1260
tttggatatc ttcttggtta caaagcaaac ttaggagtga tgggactttg gtcgggaatg 1320
atagccggga cagcgcttca aacgttgcta ctgatgtttg tcttgtacaa gacaaactgg 1380
aataaagagg ttgaagagac gatggaacgt atgaagaaat ggggagggag cgagacgaca 1440
tcgaatgatg taactgcgtg a 1461

<210> SEQ ID NO 13
<211> LENGTH: 486
<212> TYPE: PRT
<213> ORGANISM: Thlaspi arvense

<400> SEQUENCE: 13

Met Asp Pro Thr Thr Pro Phe Leu Gly Gly Glu Val Glu Glu Asp Tyr
1 5 10 15

Ala Pro Ala Arg Thr Trp Ser Asp Val Lys Arg Val Phe Ala Thr Glu
20 25 30

Ser Ala Lys Met Trp Met Ile Ala Ala Pro Ile Gly Phe Asn Ile Ile
35 40 45

Cys Gln Tyr Gly Val Thr Ser Ile Thr Asn Ile Phe Val Gly His Ile
50 55 60

Gly Glu Val Glu Leu Ser Ala Val Ala Ile Ser Leu Ser Val Ile Gly
65 70 75 80

Thr Phe Ser Phe Gly Phe Leu Leu Gly Met Gly Ser Ala Leu Glu Thr
85 90 95

Leu Cys Gly Gln Ala Phe Gly Ala Gly Gln Val His Met Leu Gly Val
100 105 110

Tyr Met Gln Arg Ser Trp Ile Ile Leu Phe Val Ser Cys Ile Phe Leu
115 120 125

Leu Pro Ile Tyr Ile Phe Ala Thr Pro Ile Leu Arg Leu Leu Gly Gln
130 135 140

Ala Glu Glu Ile Ala Val Pro Ala Gly Glu Phe Thr Leu Leu Thr Ile
145 150 155 160

Pro Gln Leu Phe Ser Leu Ala Ile Asn Phe Pro Thr Ser Lys Phe Leu
165 170 175

Gln Ala Gln Ser Lys Val Ile Ala Ile Ala Trp Ile Gly Phe Ile Ala
180 185 190

Phe Val Leu His Val Gly Met Leu Trp Leu Phe Ile Ile Val Phe Gly
195 200 205

Trp Gly Thr Asn Gly Ala Ala Leu Ala Phe Asn Leu Thr Asn Trp Gly
210 215 220

Thr Ala Ile Ser Gln Val Val Tyr Val Ile Gly Trp Cys Asn Glu Gly
225 230 235 240

Trp Ser Gly Leu Ser Trp Leu Ala Phe Lys Glu Ile Trp Ala Phe Val
245 250 255

Arg Leu Ser Ile Ala Ser Ala Val Met Leu Cys Leu Glu Ile Trp Tyr
260 265 270

Met Met Ser Ile Ile Val Leu Thr Gly Arg Leu Asp Asn Ala Val Ile
275 280 285

Ala Val Asp Ser Leu Ser Ile Cys Met Asn Leu Asn Gly Leu Glu Ala
290 295 300

Met Leu Phe Ile Gly Ile Asn Ala Ala Ile Ser Val Arg Val Ser Asn
305 310 315 320

Glu Leu Gly Leu Gly Arg Pro Arg Ala Ala Lys Tyr Ser Val Tyr Val
325 330 335

Thr Val Phe Glu Ser Leu Leu Ile Gly Leu Val Phe Met Val Ala Ile
340 345 350

Ile Ile Gly Arg Asp His Phe Ala Ile Ile Phe Thr Ser Ser Lys Val

```
        355                 360                 365

Leu Gln Arg Ala Val Ser Lys Leu Ala Tyr Leu Leu Gly Ile Thr Met
    370                 375                 380

Val Leu Asn Ser Val Gln Pro Val Ile Ser Gly Val Ala Val Gly Gly
385                 390                 395                 400

Gly Trp Gln Ser Leu Val Ala Tyr Ile Asn Leu Gly Cys Tyr Tyr Ile
                405                 410                 415

Phe Gly Leu Pro Phe Gly Tyr Leu Leu Gly Tyr Lys Ala Asn Leu Gly
            420                 425                 430

Val Met Gly Leu Trp Ser Gly Met Ile Ala Gly Thr Ala Leu Gln Thr
        435                 440                 445

Leu Leu Leu Met Phe Val Leu Tyr Lys Thr Asn Trp Asn Lys Glu Val
    450                 455                 460

Glu Glu Thr Met Glu Arg Met Lys Lys Trp Gly Gly Ser Glu Thr Thr
465                 470                 475                 480

Ser Asn Asp Val Thr Ala
                485
```

<210> SEQ ID NO 14
<211> LENGTH: 4540
<212> TYPE: DNA
<213> ORGANISM: Thlaspi arvense

<400> SEQUENCE: 14

```
gcagttcaca tttaaatagt ccaatatgtt attattggca agcaacccga attgaaatga     60

gacagtggaa acattagcaa tccaaaacat catacgaacc tacttctact tataccttag    120

agaagaataa tcagattacg agtaacaaga atgaagaacc tgagtcgctt agccttaatg    180

ttctaaatca aataactaat ctgagctcat ttgcaaaaca ttggcccatt ttaaaattct    240

tggcactgat acgcagcaca aaaggaggtt actgtaaaag cccaatgtgc gtacattcat    300

tattcacaaa aaaaaatctt gtttgactta aaattgtggc cccctttttg ggtttgtctt    360

ttaatttcat gtatttttta attaattgtt ttctattttg gcattaatat ggctctatta    420

attataattt atgatacaaa atcagaatgg accgggctgg gcctttggtg aagttggtgg    480

gctcggttta agaattttat ttttttcatt attttgactt gcattaaata aaacaagtca    540

atgggaaatg tcatcattta tctgactggt ttaatgacaa aggtttaatg atgaaacagg    600

gaaataaata caaacgatga cgtaaactga aaggggacca caggaccctg tcgtttccga    660

tgaaaaagaa gaagaaaatt ccctctccga ttcttcttcc tgttcatatt cattttacaa    720

acggtacgta actcactttt taatacttca cttaaggaca tcaacctatt ttcggaaacg    780

acaactttc cactcttggt tcgagcttag attgattcaa cattttttc ctaattaact    840

tacatatact gtattcattt tactgtctaa cagtaaactc gagctatcct ggcaagttta    900

atcttctcga caacttacta tatagttgat actatatcac taggatcaat tttataaaaa    960

aaaaaacaaa ttaatcacgt gaaaataatt ctcacacatg ataaataaac taggagtaac   1020

aagtttgatg tgacattaca ctaacaaact ttcacaacac taccctatca atattaaatg   1080

tcaaatgatg gaaaagagaa aagcagtttt atgcttttga ataatcttgt atgcatattt   1140

ctgatatgtc aaagtacgtg gtgtctcatg caccacccgt tagcctcacc tacctaatct   1200

acttctcaat tccatgccga attcggtaat aaatttctcg tacgttttgt ttttcctttc   1260

cgctaattac ccaaaaacta aaataggcta ataactcctt caatttttat tattgttatt   1320

atttgattag tatggcaaaa caaggggaga gagaagtgcg tgattcaacg gttttgttat   1380
```

```
ataaaccaaa accccataat tccgcaacaa acattgactc agagtgagag agagagagag   1440
agagagagag aagtctgtct gtgtgagctt tgggtttaac attttgagac tcgcacggag   1500
atggatccga cgacgccgtt tctcggtggc gaggtcgaag aggattatgc tccggcgagg   1560
acatggagcg acgtcaagcg agtttttgct acggagtcgg ccaaaatgtg gatgatcgcc   1620
gctcccattg gtttcaacat catctgtcag tacggagtta cctccatcac caatattttc   1680
gtcggccata tcggcgaggt cgagctctcc gccgtcgcca tctccctctc cgtcatcggc   1740
accttttcct tcggcttcct ggtatgcttt tctcttcttc taactgatat ctttcatgta   1800
actctgctat gtatcaatca agagcatctt cttgtgacaa atcgacaaga aacagagtct   1860
aatttaggtt tgaaaactgc agcttggcat gggaagtgca cttgaaacac tctgtggaca   1920
agcatttgga gctggtcaag tccatatgtt aggcgtttac atgcagagat cttggattat   1980
cttattcgtc tcctgcatct ttctccttcc tatttacata ttcgccacgc cgattctgag   2040
actcctcggc caagcagagg agatcgccgt tccagctgga gaattcactc ttttaaccat   2100
ccctcagcta ttctcactcg ccatcaactt cccaacctcc aagttccttc aagcgcagag   2160
caaagtcatc gcgattgctt ggatcgggtt catcgctttc gtcctacacg tcggtatgct   2220
ctggctgttt ataatcgtgt ttggttgggg aacaaacggt gctgccttgg cgtttaatct   2280
caccaactgg ggaacagcga tctctcaagt cgtttatgtg attggttggt gtaatgaagg   2340
ctggtctggt ttgtcttggt tggcatttaa agagatttgg gctttcgtta gactctccat   2400
agcatctgct gttatgcttt gtcttgagat ctggtacatg atgagtatca tcgtccttac   2460
tggtcgcctt gacaacgctg ttatcgctgt tgattccctt tccatatggt gagttttgat   2520
caacatttta caatgcttct tgtatcatca acatctttcc cactcttttt ttttgcattt   2580
catttcagca tgaatctcaa tggtctggag gccatgttgt tcatcggaat aaacgctgct   2640
ataaggtagt actatcatta tctgacacaa cttttgttta acccattgtt cagcttgtaa   2700
actgatcatg tgtctaccta cttgtgtact atatattagt gtccgtgtct ccaatgagct   2760
tggcttaggc cgtccacgag cagcgaaata ctctgtctat gtcacggtgt tcgagtctct   2820
cctcatcggt cttgtcttta tggtggctat catcataggc agagaccatt ttgcgatcat   2880
cttcacgagc agcaaagtac ttcaacgcgc agtgtctaag ctagcttatc ttcttggtat   2940
aaccatggtt ctcaacagcg tgcagccagt catttccggt aacaaaaatc taaaattctc   3000
atgttccatc aaaacaaaaa ccagaggtct cataagacca taaccgtccc ggtttgttca   3060
tcttgtttta ggtgtggctg ttggaggagg ttggcaaagt ttggtggctt atataaactt   3120
gggttgttac tacattttcg gccttccctt tggatatctt cttggttaca aagcaaactt   3180
aggagtgatg gtaagcgaat acaaagaatg acatgaataa tgtagatctt tcggacatgc   3240
atgtttcata aactgatacg tgagagatta taacgttttc agggactttg gtcgggaatg   3300
atagccggga cagcgcttca aacgttgcta ctgatgtttg tcttgtacaa gacaaactgg   3360
aataaagagg taaagaacac ctgagacaca aaaccgtagt atatacactg gttcattgag   3420
atcgattgac ttatggaaat ataaaattgt aaaaactgtg atgaacaggt tgaagagacg   3480
atggaacgta tgaagaaatg gggagggagc gagacgacat cgaatgatgt aactgcgtga   3540
ctatttcttt tgttaatatt aattaattaa ttattgttta gctttatata tatgaacatg   3600
taggtctcag ctttttgtt tgttttccat tggtttggca gcaccagtaa ctctctattt   3660
actatttacg ctgtaggaaa cttttcattc agtgatgtaa cgatgcatgc ttttgtcact   3720
```

```
ttgtttctct tggagtaaac taaatgttag gtacattttc tcgtgtaaca caaattttat   3780
tagacggctt ttagtcttca atgcaaattc aagtgacttg tacatagatt cctgtcttct   3840
acttccattt ccttcagaag tcaattgtat gtttccattt tattcttcta ccggtggaaa   3900
ataatatagt atcagtacgt aatttttagc gtgcttgtaa cacaggatgg ccgagcggtc   3960
taagccacga gactcaagtt cttgtcctcc tataggagga tatggattca aatccctctt   4020
gtgacataat aatttcttta aaaaaaaaat catttttgcta tactttgcat atttttcttt  4080
ttctttttaa gaatgcatgc atgtcttact ttctcgtttc tgcttgatag gtcgtagtgt   4140
cctaataagc tcttctgaga aatctcttat ttttcttctt gaacgttgga ttcagcattt   4200
cttcattgtg atttttgact tgcgaagata cgcacactta tacattgatt agggtcatcc   4260
tcgtctcaag tgttattgca atgtctaggt ttggacatag cacactagtc tttgctattt   4320
catcacccaa aatccattaa atcatggtga tgatttgatt taaagctaat ggttttgcta   4380
atttgatttt ttttatgtgt attttttgtt ctgtaatagg tggcgtgagt ggaacaacag   4440
aagggtggaa cacaaacact tattaggtct ccctgttttc aacatgatgc atttgatttt   4500
gttggttata tctcctcaaa tgcttgttgc attgcctaaa                         4540
```

<210> SEQ ID NO 15
<211> LENGTH: 2322
<212> TYPE: DNA
<213> ORGANISM: Thlaspi arvense

<400> SEQUENCE: 15

```
atgtcaatgg ccgtcgaaat gtcatcgaaa caacccacca aagatttctt ctcctctcca     60
gccctctccc tctctctcgc tggtatattc cggaatgcat cctccggcag caggaaccct    120
gaggaggact ttttggggag aagggtagtt gacgatgagg atcggacggt ggagatgagc    180
agcgagaact cgggacccac gagatccaga tcagaggaag acttggagga tcaagaggag    240
gaggaggagg atgaggagga agacggagca ggaaacaagg gcaacaagag gaagaggaag    300
aagtatcacc gccacaccac cgatcagatt agacacatgg aagcgctgtt caaagagacg    360
ccccatccag acgagaagca aagacagcag ctgagcaagc aattagggct ggctcctcgc    420
caggtcaaat tctggttcca aaaccgccgc acccagatca aggctattca agaacggcac    480
gagaactcgc tgctgaaagc ggaactagag aagctgaggg aggaaaaaca aggcatgaga    540
gagtcttttg ccaaggctaa ttcttgctgc ccaaactgcg gaggaggcac cgatgatgtc    600
cacatcgaga actccaaact gaaggcggag ctggataagc ttcgtgcggc tctcggacgc    660
actccctacc cactccaggc ctcatgctcc gatgatcaac cacaccgtct cgacttctac    720
acgggcgtct ttgccctcga caagtcccgc atcgtggaga ttgccagccg agccaccctt    780
gagctccaga agatggcctc ctccggccaa cctctttggc tccgcagcct tgagactggc    840
cgtgacattc tcaactacga cgagtatctc aaggacttcc ctcaagctca ggcctctccc    900
ctccatgcaa ggagatccat cgaagcatcc agggatgtgg ggatcgtgtt tatggacgca    960
cacaaacttg ctcagagttt tatggacgtg gggcaatgga aagagatgtt tgcgtgcttg   1020
atctcaaagg cggcgacggt tgatgtaatc cggcagggtg aagggccttc aaggatcgac   1080
ggtgcgattc agttgatgtt tggggagatg caactgctca ctccggttgt ccccacaaga   1140
gaagtgtact tcgtgagaag ctgccggcag cttagccctg agaaatgggc catcgtggac   1200
gtatcagtct ctctggagga agacgacaac aacaacaaca cggaggacaa ggaggcttcg   1260
ctgcttaaat gccggaaacg cccctcaggt tgcatcatcg aggacacctc caacggccac   1320
```

tccaaggtca cctgggtgga gcacctcgac ttgtctgcct ccaccgttca gcctctcttc 1380
cgctcctttg tcaacaccgg tttggccttt ggggctcgac actgggtcgc caccctccag 1440
ctccactgcg aacgcctcgt cttcttcatg gctaccaacg tccctaccaa ggactctctc 1500
ggtccgtcca ttatttacac tctctctctc cctctctctc tttctccctc tcaccttttc 1560
ttaaccccaa tcctcctctc aggagttaca acgcttgccg ggagaaagag cgtgctcaag 1620
atggcccaga ggatgacaca aagcttctac cgcgccattg ctgcttccag ctaccaccaa 1680
tggaccaaaa tcaccaccaa aactggacaa gacatgaggg tttcttccag gaagaacctc 1740
catgatcctg gtgagcccac cggagtcatc gtctgcgctt cttcctccct ctggttacct 1800
gtttctccca ctctcctctt cgatttcttt agagatgaag ctcgtcgcca tgagtgggat 1860
gctttgtcaa acggagctca tgttcagtct atcgcaagct tatccaaggg acaagacaga 1920
ggcaactcag tgtctatcca gacagtgaaa tcgagagaaa agagcatatg ggtgctgcag 1980
gacagcagca caaactcata tgagtcggtg gtcgtatacg ctcccgtaga tataaacacg 2040
acacagctgg tgattgcagg acatgatcca agcaacatcc aaatcctgcc ttgtggattc 2100
tcaatcatac ccgatggagt agaatcaaga ccactggtaa tcacgtctgc acaagaggac 2160
agaaacagcc aaggagggtc tctgctcaca ctggccctcc aaacgctcat caacacttct 2220
cctgcagcaa agctgaatat ggagtccgtg gaatccgtca caaacctcgt ctctctcacc 2280
ctccacaaca ttaagagaag cctccaaatc gaagattgtt ga 2322

<210> SEQ ID NO 16
<211> LENGTH: 773
<212> TYPE: PRT
<213> ORGANISM: Thlaspi arvense

<400> SEQUENCE: 16

Met Ser Met Ala Val Glu Met Ser Ser Lys Gln Pro Thr Lys Asp Phe
1 5 10 15

Phe Ser Ser Pro Ala Leu Ser Leu Ser Leu Ala Gly Ile Phe Arg Asn
20 25 30

Ala Ser Ser Gly Ser Arg Asn Pro Glu Glu Asp Phe Leu Gly Arg Arg
35 40 45

Val Val Asp Asp Glu Asp Arg Thr Val Glu Met Ser Ser Glu Asn Ser
50 55 60

Gly Pro Thr Arg Ser Arg Ser Glu Glu Asp Leu Glu Asp Gln Glu Glu
65 70 75 80

Glu Glu Glu Asp Glu Glu Glu Asp Gly Ala Gly Asn Lys Gly Asn Lys
85 90 95

Arg Lys Arg Lys Lys Tyr His Arg His Thr Thr Asp Gln Ile Arg His
100 105 110

Met Glu Ala Leu Phe Lys Glu Thr Pro His Pro Asp Glu Lys Gln Arg
115 120 125

Gln Gln Leu Ser Lys Gln Leu Gly Leu Ala Pro Arg Gln Val Lys Phe
130 135 140

Trp Phe Gln Asn Arg Arg Thr Gln Ile Lys Ala Ile Gln Glu Arg His
145 150 155 160

Glu Asn Ser Leu Leu Lys Ala Glu Leu Glu Lys Leu Arg Glu Glu Asn
165 170 175

Lys Gly Met Arg Glu Ser Phe Ala Lys Ala Asn Ser Cys Cys Pro Asn
180 185 190

-continued

```
Cys Gly Gly Gly Thr Asp Asp Val His Ile Glu Asn Ser Lys Leu Lys
        195                 200                 205

Ala Glu Leu Asp Lys Leu Arg Ala Ala Leu Gly Arg Thr Pro Tyr Pro
    210                 215                 220

Leu Gln Ala Ser Cys Ser Asp Asp Gln Pro His Arg Leu Asp Phe Tyr
225                 230                 235                 240

Thr Gly Val Phe Ala Leu Asp Lys Ser Arg Ile Val Glu Ile Ala Ser
                245                 250                 255

Arg Ala Thr Leu Glu Leu Gln Lys Met Ala Ser Ser Gly Gln Pro Leu
            260                 265                 270

Trp Leu Arg Ser Leu Glu Thr Gly Arg Asp Ile Leu Asn Tyr Asp Glu
        275                 280                 285

Tyr Leu Lys Asp Phe Pro Gln Ala Gln Ala Ser Pro Leu His Ala Arg
    290                 295                 300

Arg Ser Ile Glu Ala Ser Arg Asp Val Gly Ile Val Phe Met Asp Ala
305                 310                 315                 320

His Lys Leu Ala Gln Ser Phe Met Asp Val Gly Gln Trp Lys Glu Met
                325                 330                 335

Phe Ala Cys Leu Ile Ser Lys Ala Ala Thr Val Asp Val Ile Arg Gln
            340                 345                 350

Gly Glu Gly Pro Ser Arg Ile Asp Gly Ala Ile Gln Leu Met Phe Gly
        355                 360                 365

Glu Met Gln Leu Leu Thr Pro Val Val Pro Thr Arg Glu Val Tyr Phe
    370                 375                 380

Val Arg Ser Cys Arg Gln Leu Ser Pro Glu Lys Trp Ala Ile Val Asp
385                 390                 395                 400

Val Ser Val Ser Leu Glu Glu Asp Asp Asn Asn Asn Asn Thr Glu Asp
                405                 410                 415

Lys Glu Ala Ser Leu Leu Lys Cys Arg Lys Arg Pro Ser Gly Cys Ile
            420                 425                 430

Ile Glu Asp Thr Ser Asn Gly His Ser Lys Val Thr Trp Val Glu His
        435                 440                 445

Leu Asp Leu Ser Ala Ser Thr Val Gln Pro Leu Phe Arg Ser Phe Val
    450                 455                 460

Asn Thr Gly Leu Ala Phe Gly Ala Arg His Trp Val Ala Thr Leu Gln
465                 470                 475                 480

Leu His Cys Glu Arg Leu Val Phe Phe Met Ala Thr Asn Val Pro Thr
                485                 490                 495

Lys Asp Ser Leu Gly Pro Ser Ile Ile Tyr Thr Leu Ser Leu Pro Leu
            500                 505                 510

Ser Leu Ser Pro Ser His Leu Phe Leu Thr Pro Ile Leu Leu Ser Gly
        515                 520                 525

Val Thr Thr Leu Ala Gly Arg Lys Ser Val Leu Lys Met Ala Gln Arg
    530                 535                 540

Met Thr Gln Ser Phe Tyr Arg Ala Ile Ala Ala Ser Ser Tyr His Gln
545                 550                 555                 560

Trp Thr Lys Ile Thr Thr Lys Thr Gly Gln Asp Met Arg Val Ser Ser
                565                 570                 575

Arg Lys Asn Leu His Asp Pro Gly Glu Pro Thr Gly Val Ile Val Cys
            580                 585                 590

Ala Ser Ser Ser Leu Trp Leu Pro Val Ser Pro Thr Leu Leu Phe Asp
        595                 600                 605

Phe Phe Arg Asp Glu Ala Arg Arg His Glu Trp Asp Ala Leu Ser Asn
```

```
    610                 615                 620

Gly Ala His Val Gln Ser Ile Ala Ser Leu Ser Lys Gly Gln Asp Arg
625                 630                 635                 640

Gly Asn Ser Val Ser Ile Gln Thr Val Lys Ser Arg Glu Lys Ser Ile
                645                 650                 655

Trp Val Leu Gln Asp Ser Ser Thr Asn Ser Tyr Glu Ser Val Val Val
            660                 665                 670

Tyr Ala Pro Val Asp Ile Asn Thr Thr Gln Leu Val Ile Ala Gly His
        675                 680                 685

Asp Pro Ser Asn Ile Gln Ile Leu Pro Cys Gly Phe Ser Ile Ile Pro
    690                 695                 700

Asp Gly Val Glu Ser Arg Pro Leu Val Ile Thr Ser Ala Gln Glu Asp
705                 710                 715                 720

Arg Asn Ser Gln Gly Gly Ser Leu Leu Thr Leu Ala Leu Gln Thr Leu
                725                 730                 735

Ile Asn Thr Ser Pro Ala Ala Lys Leu Asn Met Glu Ser Val Glu Ser
            740                 745                 750

Val Thr Asn Leu Val Ser Leu Thr Leu His Asn Ile Lys Arg Ser Leu
        755                 760                 765

Gln Ile Glu Asp Cys
    770


<210> SEQ ID NO 17
<211> LENGTH: 5982
<212> TYPE: DNA
<213> ORGANISM: Thlaspi arvense

<400> SEQUENCE: 17

aacccataaa gagcattcat ttccttttaa ggtcgctgaa attaatgagt aacgatcagt     60

caatgcgtct cgttgacctt ccaaaacatc cgacgtctct ttccgttgca tatccctcgg    120

ctctgtccct gcagctccca cgtcatccat atttcccctc tatccaattt ttaactttct    180

aacttattca acaactcttc ctccatgcat ttacctcatt atctaatcgt attgtttact    240

agtagtaata tagcatacta gagtagtaga ttcggattcc cggaataata tatattagca    300

taagttattg gagcacaagg catttcaggt ttccatgtag ctccaataat atcctcttca    360

ctctctctta ccaatgcttt tccactttcc tatgtcacgc aattactagc ttgcttgctt    420

tacaaccaag ttttattaac caacataaaa tatagagatt taatgttgca ttttgtaatc    480

ataagttact aattgcttga agaaagagat cacaataaca gacaatacgt acacattaca    540

tcataaccag gtaagtatat agtatataat aaataaataa atagaagtca taataagaga    600

aatgatgatg ataatcaagg aggaaagaag aaagcagaaa atgcggttgg agaattaggt    660

gcttaaagtt agttgagtcc atcccagtat ctaacggtca actctctcct ctttcgtcct    720

tatttgtatt ttattttgtt tttgaaacaa taaactgaca tacaatatgt ctttctctca    780

ctactctctc tctctctctc tctatacaca aattcaatta aagaagagac agagaagttc    840

gccttttgtc tgtataccct taaatcatgc aaccccctta ttctcattcc ttctctctgc    900

ctacagtaaa ctctaggaac gacattatgt ggtttaaacc gattcaattc atgattagtg    960

gcaaaattct atatgatttt caaccacatg atatatgatt ttcaacagta atattgtgcg   1020

gaaaaataat gcacagcatt ttattctata tacaaaaggt aaattggaaa ggagaatttt   1080

ccagatgcaa tagcgaattt gctcgaatat ttttataaaa aaaaacgaag tcgatatcga   1140

cgcctgcaaa taatgtagct ggccatgttt gcaaagtaat caagtgtgaa taaaattgta   1200
```

aaactaatgg agtatatata gatattaaaa agaagaaggg gttggttaaa tataattaaa 1260
tgaagcacct aaaagtcaag caatagagaa atatctgaaa aacgaccgtt tgtatgtata 1320
attagaattg aagggctagc ttagctatat agccatatac agtatatgtg aaagagtaca 1380
ttttggtaca cacacacaca aaaaaaaaga aataaggaaa atatatagag atatataaat 1440
agcacaagga agaaggagga gagggaagat aaagcaaata aaaaaattgg gagcgttcgt 1500
atgtcaatgg ccgtcgaaat gtcatcgaaa caacccacca aagatttctt ctcctctcca 1560
gccctctccc tctctctcgt acgcgtactc tctgttctac tactctcgta aactcatcta 1620
aataaaaatt tactgtattg tatatatgta tctatttgtg aatggtactg atataaatac 1680
aggctggtat attccggaat gcatcctccg gcagcaggaa ccctgaggag gactttttgg 1740
ggagaagggt agttgacgat gaggatcgga cggtggagat gagcagcgag aactcgggac 1800
ccacgagatc cagatcagag gaagacttgg aggatcaaga ggaggaggag gaggatgagg 1860
aggaagacgg agcaggaaac aagggcaaca agaggaagag gaagaagtat caccgccaca 1920
ccaccgatca gattagacac atggaagcgt acgttcttcc ttccttaatt attattcttt 1980
atatttcatc tgtagctcta atggattacc atttaatcaa attagggttt caaaacatgg 2040
aacatttcga ttaattggtc ttgatgatat atgaatttga tgacctcaac tcctccatat 2100
atacttcaat tatgactagt catcatcatc atgccctaca catagggatt agagtatata 2160
gtagtcagtc tgtgctgaac agtaggcctc ttcatttcta ctgccatata aaaaggaaga 2220
atgcatattt catgtattta ttagtagtga tgaacaaatt aatatatatt gcagatcgat 2280
gatccagcaa tagttaatta tttgaatgcg tttaattaca tatcttgctc tttaattttc 2340
tctcgtactc cctagtatat acatgtgttt atactataac ataggacggg acaagtgttt 2400
ccattcaatc accctatgat taaactaaaa ccaagttctt tcaaaacaaa aaactaaaac 2460
caagagcact aatgtgtata gctagttagg gctcatataa ttaagagttt aattcatact 2520
atgttttcga ataggaggat aaaaaaaaga tatgaaagaa ttaattaaat atgaagaatg 2580
atcatggagc tatgaatgag aaaactgagg gttgcattgc aggctgttca aagagacgcc 2640
ccatccagac gagaagcaaa gacagcagct gagcaagcaa ttagggctgg ctcctcgcca 2700
ggtcaaattc tggttccaaa accgccgcac ccagatcaag gtatgtatat cgacgtacgt 2760
gatgatgatg atatatatgg atttcttaag acaaaaagac tattcgcttg gagctacata 2820
tgtatatagt tatagtgaaa tactgaaatg taactgaaca ggctattcaa gaacggcacg 2880
agaactcgct gctgaaagcg gaactagaga agctgaggga ggaaaacaaa ggcatgagag 2940
agtcttttgc caaggctaat tcttgctgcc caaactgcgg aggaggcacc gatgatgtcc 3000
acatcgagaa ctccaaactg aaggcggagc tggataagct tcgtgcggct ctcggacgca 3060
ctccctaccc actccaggcc tcatgctccg atgatcaacc acaccgtctc gacttctaca 3120
cgggcgtctt tgccctcgac aagtcccgca tcgtggagat tgccagccga gccacccttg 3180
agctccagaa gatggcctcc tccggccaac ctctttggct ccgcagcctt gagactggcc 3240
gtgacattct caactacgac gagtatctca aggacttccc tcaagctcag gcctctcccc 3300
tccatgcaag gagatccatc gaagcatcca gggatgtggg gatcgtgttt atggacgcac 3360
acaaacttgc tcagagtttt atggacgtgg tactcttttt ctttcatttc ctccaaatat 3420
ttacgaatat acttttgtgt atcacatgta ggcaatataa agatatatat acaacgtgca 3480
ggggcaatgg aaagagatgt ttgcgtgctt gatctcaaag gcggcgacgg ttgatgtaat 3540

-continued

```
ccggcagggt gaagggcctt caaggatcga cggtgcgatt cagttggtta gtgaatcacc   3600
ttttgataga tagtgatgac acgcgagaga tgagagctaa tataatacat tgatggacat   3660
attggcagat gtttggggag atgcaactgc tcactccggt tgtccccaca agagaagtgt   3720
acttcgtgag aagctgccgg cagcttagcc ctgagaaatg ggccatcgtg gacgtatcag   3780
tctctctgga ggaagacgac aacaacaaca acacggagga caaggaggct tcgctgctta   3840
aatgccggaa acgcccctca ggttgcatca tcgaggacac ctccaacggc cactccaagg   3900
tcacctgggt ggagcacctc gacttgtctg cctccaccgt tcagcctctc ttccgctcct   3960
ttgtcaacac cggtttggcc tttggggctc gacactgggt cgccaccctc cagctccact   4020
gcgaacgcct cgtcttcttc atggctacca acgtccctac caaggactct ctcggtccgt   4080
ccattattta cactctctct ctccctctct ctctttctcc ctctcacctt ttcttaaccc   4140
caatcctcct ctcaggagtt acaacgcttg ccgggagaaa gagcgtgctc aagatggccc   4200
agaggatgac acaaagcttc taccgcgcca ttgctgcttc cagctaccac caatggacca   4260
aaatcaccac caaaactgga caagacatga gggtttcttc caggaagaac ctccatgatc   4320
ctggtgagcc caccggagtc atcgtctgcg cttcttcctc cctctggtta cctgtttctc   4380
ccactctcct cttcgatttc tttagagatg aagctcgtcg ccatgaggta ccttgtggca   4440
tacacttcct tcgcacacac agaaccaata aaaccgtttt aaatctaact atacatacgt   4500
attattatca tcagtgggat gctttgtcaa acggagctca tgttcagtct atcgcaagct   4560
tatccaaggg acaagacaga ggcaactcag tgtctatcca gacagtgaaa tcgagagaaa   4620
agagcatatg ggtgctgcag gacagcagca caaactcata tgagtcggtg gtcgtatacg   4680
ctcccgtaga tataaacacg acacagctgg tgattgcagg acatgatcca agcaacatcc   4740
aaatcctgcc ttgtggattc tcaatcatac ccgatggagt agaatcaaga ccactggtaa   4800
tcacgtctgc acaagaggac agaaacagcc aaggagggtc tctgctcaca ctggccctcc   4860
aaacgctcat caacacttct cctgcagcaa agctgaatat ggagtccgtg gaatccgtca   4920
caaacctcgt ctctctcacc ctccacaaca ttaagagaag cctccaaatc gaagattgtt   4980
gatgacaact cacagcaggt gtgatgattg ttgttacata tataagtata tcataatgta   5040
tagcagtgca ttaagttttg tacaaaaaca accctctctc tctctcccgc aatcatactg   5100
ttatccaaca ctttttgcag cattaagaga gcatcatact cgactaagaa cccaatacac   5160
aaaactttac cgaaacaaaa gtgggatcag atgaaccaaa tgcataaccc tgatttagat   5220
acacagtaat tggatcagaa acgaaggcct gatcaaattc cacaacttaa acaatacgca   5280
attcgagcag gaaaacaaaa tgcattccat aaacagagag aattacactt gattgcaata   5340
cacaacaaac agaaacgaaa aacagtaaaa aagacagctt ttttttttta ccaaaacaaa   5400
caaacactca gtgagtcgca ttctcctcta cgccggctgc tgagattcca agggaatgcc   5460
gaggtcgttc ccagcttctc ctccgccttc cgctttcctg ctgctccttg agacgacagc   5520
aagcgccacg aatgacttag tcttactgat gggtctgctc ttctccagcc tcaccacatc   5580
gcccaccttg aactgattat ccgggtcatg cgcctggtac ttcttcttct tcctcacgcg   5640
cctcttgtac ttgggatgcg gagccagcct caccacctcc accgccacgg tcttgtcgtt   5700
ggttgcgcac accacgcgcc cctgcatcgt tttcatggct ctgatgaccg gaaccaatgc   5760
cggccttcga gggttcggga ataaattggg cttagagaga gatgagagtg gagtcgagcc   5820
atgggcgaat ggagacgaaa gcttcagagc ttgcagagat gaggttatta gcgacgtcat   5880
cgttatcccc ctcctctatg ggatcgattt ggaagacgat gaagaagata aggcgataga   5940
```

tcatgttatt ataatattgg cttttgctaa atgggttaac aa 5982

<210> SEQ ID NO 18
<211> LENGTH: 2007
<212> TYPE: DNA
<213> ORGANISM: Thlaspi arvense

<400> SEQUENCE: 18
atggctacta cgtataagcc taagaacatt ctcatcactg gagctgctgg attcattgcc 60
tctcatgttg ccaacagatt aatccgtagc tatccagatt acaagatcgt tgtgttggac 120
aagcttgatt actgttcaga tctgaagaat ctcgatcctt cgttttcttc tccaaatttc 180
aagtttgtga aaggagatat cgcgagtgat gacctcgtta actacctcct catcactgaa 240
aacatcgaca ccatcatgca ctttgctgct caaacccatg ttgataactc ctttggtaat 300
agctttgagt tcaccaagaa caacatttat ggtactcatg tcctcttgga agcctgtaaa 360
gtaacaggac agatcaggag gtttattcat gtgagcaccg atgaagtcta tggagaaacc 420
gatgaggatg ctgctgtagg aaaccatgag gcgtctcagc ttttacccac aaacccatac 480
tcagccacta aggctggtgc tgagatgctt gtgatggctt acggtagatc atacggactg 540
ccggttatta caactcgtgg gaacaatgtt tacggtccta accagtttcc cgaaaaactg 600
attcctaagt tcatcttgtt ggctatgagt gggaagccgc ttccgatcca cggagatgga 660
tctaacgtaa ggagttactt atactgtgaa gacgttgctg aagcgtttga ggttgttctt 720
cacaaaggag aagtcggtca cgtctacaac atcgggacaa agagagaaag aagagtgatc 780
gatgtggcga cagacatctg caaacttttc gggaaagatc ctgagtcgag catcgagttc 840
gtggagaatc gaccgtttaa cgatcaaagg tacttccttg atgatcagaa gctgaagaat 900
ctgggttggt cagagcgaac cgcgtgggaa gatggactga agaagacaat ggaatggtac 960
attcagaatc ctgagtggtg gggtgatgtt tctggagctt tgcttcctca tccgagaatg 1020
cttatgatgc ccggaggaag agttcctgac ggctccgatg agaagaatga ctcgtcaagc 1080
aacgcggtcc agacattcac ggttgtaaca ccgaacaaca agactggtgg ttctagtgac 1140
aaagctttct tgaagttttt gatctacggt aagactggtt ggatcggtgg tctcttaggg 1200
aaactatgtg agaagcaagg gattacttat gagtatggga aaggacgttt agaagataga 1260
gcctctctcg tcgcggatat tcgcagtatc aaaccgaccc atgtgtttaa cgctgctggt 1320
ttaactggca gaccaaacgt tgactggtgt gaatctcaca aaccagagac cattcgtgtc 1380
aatgtcgctg gtactttgac tctcgctgat gtttgcagag agaatgatct cttgatgatg 1440
aacttcgcca ccggttgcat attcgagtac gatgctgcac atccagagcg ttcgggtatt 1500
ggtttcaagg aagaagacaa gccgaatttc actggctctt tctactcaaa aaccaaagcc 1560
atggtcgagg agcttctgag agaatttgac aatgtgtgta ccttgagagt gcggatgccg 1620
atctcatcag acctaaacaa cccgagaaac ttcatcacga agatctcgcg gtacaacaaa 1680
gtggtgaaca tcccgaacag catgaccata ctggacgagc ttctgccgat ctccatcgag 1740
atggcgaaga gaaacctaag agggatatgg aacttcacca acccaggggt ggtgagccac 1800
aacgagatac tggagatgta caagagttac atcgagccag ggtttaaatg gtccaacttc 1860
acagtggaag aacaagcaaa ggtcattgtt gctcctcgaa gcaacaatga aatggatggg 1920
actaaactaa gcaaggagtt cccagagatg ctaccaatta aagaggcgct gatcaaatac 1980
gtcttcgaac ctaacaagag aacctga 2007

<210> SEQ ID NO 19
<211> LENGTH: 668
<212> TYPE: PRT
<213> ORGANISM: Thlaspi arvense

<400> SEQUENCE: 19

```
Met Ala Thr Thr Tyr Lys Pro Lys Asn Ile Leu Ile Thr Gly Ala Ala
1               5                   10                  15

Gly Phe Ile Ala Ser His Val Ala Asn Arg Leu Ile Arg Ser Tyr Pro
            20                  25                  30

Asp Tyr Lys Ile Val Val Leu Asp Lys Leu Asp Tyr Cys Ser Asp Leu
        35                  40                  45

Lys Asn Leu Asp Pro Ser Phe Ser Ser Pro Asn Phe Lys Phe Val Lys
    50                  55                  60

Gly Asp Ile Ala Ser Asp Asp Leu Val Asn Tyr Leu Leu Ile Thr Glu
65                  70                  75                  80

Asn Ile Asp Thr Ile Met His Phe Ala Ala Gln Thr His Val Asp Asn
                85                  90                  95

Ser Phe Gly Asn Ser Phe Glu Phe Thr Lys Asn Asn Ile Tyr Gly Thr
            100                 105                 110

His Val Leu Leu Glu Ala Cys Lys Val Thr Gly Gln Ile Arg Arg Phe
        115                 120                 125

Ile His Val Ser Thr Asp Glu Val Tyr Gly Glu Thr Asp Glu Asp Ala
    130                 135                 140

Ala Val Gly Asn His Glu Ala Ser Gln Leu Leu Pro Thr Asn Pro Tyr
145                 150                 155                 160

Ser Ala Thr Lys Ala Gly Ala Glu Met Leu Val Met Ala Tyr Gly Arg
                165                 170                 175

Ser Tyr Gly Leu Pro Val Ile Thr Thr Arg Gly Asn Asn Val Tyr Gly
            180                 185                 190

Pro Asn Gln Phe Pro Glu Lys Leu Ile Pro Lys Phe Ile Leu Leu Ala
        195                 200                 205

Met Ser Gly Lys Pro Leu Pro Ile His Gly Asp Gly Ser Asn Val Arg
    210                 215                 220

Ser Tyr Leu Tyr Cys Glu Asp Val Ala Glu Ala Phe Glu Val Val Leu
225                 230                 235                 240

His Lys Gly Glu Val Gly His Val Tyr Asn Ile Gly Thr Lys Arg Glu
                245                 250                 255

Arg Arg Val Ile Asp Val Ala Thr Asp Ile Cys Lys Leu Phe Gly Lys
            260                 265                 270

Asp Pro Glu Ser Ser Ile Glu Phe Val Glu Asn Arg Pro Phe Asn Asp
        275                 280                 285

Gln Arg Tyr Phe Leu Asp Asp Gln Lys Leu Lys Asn Leu Gly Trp Ser
    290                 295                 300

Glu Arg Thr Ala Trp Glu Asp Gly Leu Lys Lys Thr Met Glu Trp Tyr
305                 310                 315                 320

Ile Gln Asn Pro Glu Trp Trp Gly Asp Val Ser Gly Ala Leu Leu Pro
                325                 330                 335

His Pro Arg Met Leu Met Met Pro Gly Gly Arg Val Pro Asp Gly Ser
            340                 345                 350

Asp Glu Lys Asn Asp Ser Ser Ser Asn Ala Val Gln Thr Phe Thr Val
        355                 360                 365

Val Thr Pro Asn Asn Lys Thr Gly Gly Ser Ser Asp Lys Ala Phe Leu
    370                 375                 380
```

```
Lys Phe Leu Ile Tyr Gly Lys Thr Gly Trp Ile Gly Gly Leu Leu Gly
385                 390                 395                 400

Lys Leu Cys Glu Lys Gln Gly Ile Thr Tyr Glu Tyr Gly Lys Gly Arg
                405                 410                 415

Leu Glu Asp Arg Ala Ser Leu Val Ala Asp Ile Arg Ser Ile Lys Pro
            420                 425                 430

Thr His Val Phe Asn Ala Ala Gly Leu Thr Gly Arg Pro Asn Val Asp
        435                 440                 445

Trp Cys Glu Ser His Lys Pro Glu Thr Ile Arg Val Asn Val Ala Gly
    450                 455                 460

Thr Leu Thr Leu Ala Asp Val Cys Arg Glu Asn Asp Leu Leu Met Met
465                 470                 475                 480

Asn Phe Ala Thr Gly Cys Ile Phe Glu Tyr Asp Ala Ala His Pro Glu
                485                 490                 495

Arg Ser Gly Ile Gly Phe Lys Glu Glu Asp Lys Pro Asn Phe Thr Gly
            500                 505                 510

Ser Phe Tyr Ser Lys Thr Lys Ala Met Val Glu Glu Leu Leu Arg Glu
        515                 520                 525

Phe Asp Asn Val Cys Thr Leu Arg Val Arg Met Pro Ile Ser Ser Asp
    530                 535                 540

Leu Asn Asn Pro Arg Asn Phe Ile Thr Lys Ile Ser Arg Tyr Asn Lys
545                 550                 555                 560

Val Val Asn Ile Pro Asn Ser Met Thr Ile Leu Asp Glu Leu Leu Pro
                565                 570                 575

Ile Ser Ile Glu Met Ala Lys Arg Asn Leu Arg Gly Ile Trp Asn Phe
            580                 585                 590

Thr Asn Pro Gly Val Val Ser His Asn Glu Ile Leu Glu Met Tyr Lys
        595                 600                 605

Ser Tyr Ile Glu Pro Gly Phe Lys Trp Ser Asn Phe Thr Val Glu Glu
    610                 615                 620

Gln Ala Lys Val Ile Val Ala Pro Arg Ser Asn Asn Glu Met Asp Gly
625                 630                 635                 640

Thr Lys Leu Ser Lys Glu Phe Pro Glu Met Leu Pro Ile Lys Glu Ala
                645                 650                 655

Leu Ile Lys Tyr Val Phe Glu Pro Asn Lys Arg Thr
            660                 665
```

<210> SEQ ID NO 20
<211> LENGTH: 5240
<212> TYPE: DNA
<213> ORGANISM: Thlaspi arvense

<400> SEQUENCE: 20

```
acccttattt tcaatcacag ctccccaaga tagatcagtt aagcaacagc aacacacata     60

tggccattga tgctaagctg ttgcaggcgc aatcacagtt cggtccagcg ggagcagcag    120

cggttgcggt agcggcacac cggaacattg gcacaattag ttacggcgca gcatcgtaga    180

ctcatcaaac aaacagcatt ttcagacaca tctttaactt acatcaccct ccaaatccag    240

gcaacgcgaa accaggtgat tccggtctcg gtctctttat gtaagtatta ttcagccagg    300

ctctgattta aacaactttg cagtgatatt aataaaagac tttcagttgt aactcaccag    360

aacaagatcg cttagatcag tctgatcccg ggttatcacc ggtgattgtt tcggttatct    420

tgtttgctcc atagtctttg aatttgttat aagcgtagtt catcgaagag aagaaaaccg    480
```

```
tcgtgattat atacttctta aacttcaaga tcggtcccat tactccttaa ttgttcttca    540
acaatgatga atctctttgt ctatcagaaa attgattgat ctatttggct atatagagag    600
aatcattagg ccgaaaattg tggaagtcaa caaaagtcat tggtccgtag atctttctca    660
tccgtaaatc aatcttttgc acattataat tagccatttt attcaatggt taccagtaaa    720
aaagatatgt aaaagataat ttcgaattct tgacgccatt aaagtgtcta tataatttac    780
ccgccaattt aagataaccg gttttatggg cctgaactca gcacattaaa ggttaacatt    840
tactataata attcaatgaa cttaactcct tttcttcaat tacatgaaaa agtgcatttt    900
tgtctacttg atttttaat tgatgaaaaa ggaagtaaat taattattcc gttacgtgac    960
cttaagcatc agcattgaat catctgttat gtttaatttc aggtcttttc ttgttgaact   1020
gatgattgat atcaggttga catgtgatat ttctattcag tctagaatta tttgtttttc   1080
taactgaaca tatgtacgtt ttatcataaa caaatcaggg attttattaa atcccaagtt   1140
taaccttcca ataaaagaaa tcatattttt attcagttta aatcatttta agaaatatat   1200
atcagacaaa aatgcaaaat attttgttta cttcttccac aattaattaa tctccttaat   1260
tatacaaatt ttattctctt tttatttttt ggaattttct tctattagta tagattttgt   1320
gtgaaaaaat aaacaaaaaa aagacatcaa atttttatgt cggacgctaa gctcacgtaa   1380
aatccgtaat atctaagaca agtaagggta aatttgtcaa ttgacccta cggttctccg   1440
taactgtctc aggatatatg aggcgcactg ttcagagacg ctccgtagac cgtagattcc   1500
ctcttcttcc tcctctctct ctctctctct ctctctctct ctcttctcat agaagtgtct   1560
ctctctctct cttaggattc ttctctgatt ctaacctgaa ttgtgtcggt acgtgatatg   1620
ttgctctctt tttgttgctg ctgaaatttc cataatgctt taagttaatt ttgcgaaatg   1680
ctatacgtga gtaacggaca agtgtacaac atcagacaac tgatcttgtt tttgttcttt   1740
tttttagatt tctgtgttgt cggtttatga tcccatatga aaagttcatt atttttgttc   1800
gtataagatc tggctactga atttattcgg ttttggcgat tggatctgga tctgccttta   1860
ttctgatttc ctttcatatg atccgttctg aattttcgaa tgatactgtg acgttattgt   1920
tgttgttgtt gcagatactt gatttcaaat ggctactacg tataagccta agaacattct   1980
catcactgga gctgctggat tcattgcctc tcatgttgcc aacagattaa tccgtagcta   2040
tccagattac aagatcgttg tgttggacaa gcttgattac tgttcagatc tgaagaatct   2100
cgatccttcg ttttcttctc caaatttcaa gtttgtgaaa ggagatatcg cgagtgatga   2160
cctcgttaac tacctcctca tcactgaaaa catcgacacc atcatgcact ttgctgctca   2220
aacccatgtt gataactcct ttggtaatag ctttgagttc accaagaaca acatttatgg   2280
tactcatgtc ctcttggaag cctgtaaagt aacaggacag atcaggaggt ttattcatgt   2340
gagcaccgat gaagtctatg gagaaaccga tgaggatgct gctgtaggaa accatgaggc   2400
gtctcagctt ttacccacaa acccatactc agccactaag gctggtgctg agatgcttgt   2460
gatggcttac ggtagatcat acggactgcc ggttattaca actcgtggga acaatgttta   2520
cggtcctaac cagtttcccg aaaaactgat tcctaagttc atcttgttgg ctatgagtgg   2580
gaagccgctt ccgatccacg gagatggatc taacgtaagg agttacttat actgtgaaga   2640
cgttgctgaa gcgtttgagg ttgttcttca caaaggagaa gtcggtcacg tctacaacat   2700
cgggacaaag agagaaagaa gagtgatcga tgtggcgaca gacatctgca aacttttcgg   2760
gaaagatcct gagtcgagca tcgagttcgt ggagaatcga ccgtttaacg atcaaaggta   2820
cttccttgat gatcagaagc tgaagaatct gggttggtca gagcgaaccg cgtgggaaga   2880
```

tggactgaag aagacaatgg aatggtacat tcagaatcct gagtggtggg gtgatgtttc 2940
tggagctttg cttcctcatc cgagaatgct tatgatgccc ggaggaagag ttcctgacgg 3000
ctccgatgag aagaatgact cgtcaagcaa cgcggtccag acattcacgg ttgtaacacc 3060
gaacaacaag actggtggtt ctagtgacaa agctttcttg aagtttttga tctacggtaa 3120
gactggttgg atcggtggtc tcttagggaa actatgtgag aagcaaggga ttacttatga 3180
gtatgggaaa ggacgtttag aagatagagc ctctctcgtc gcggatattc gcagtatcaa 3240
accgacccat gtgtttaacg ctgctggttt aactggcaga ccaaacgttg actggtgtga 3300
atctcacaaa ccagagacca ttcgtgtcaa tgtcgctggt actttgactc tcgctgatgt 3360
ttgcagagag aatgatctct tgatgatgaa cttcgccacc ggttgcatat tcgagtacga 3420
tgctgcacat ccagagcgtt cgggtattgg tttcaaggaa gaagacaagc cgaatttcac 3480
tggctctttc tactcaaaaa ccaaagccat ggtaaaatac taatatctat aactcatgac 3540
agtctcgaaa caaagaagag tgtctttgtt tataatctgg ttctgctttt ttctcttctt 3600
ctttgttcac caggtcgagg agcttctgag agaatttgac aatgtgtgta ccttgagagt 3660
gcggatgccg atctcatcag acctaaacaa cccgagaaac ttcatcacga agatctcgcg 3720
gtacaacaaa gtggtgaaca tcccgaacag catgaccata ctggacgagc ttctgccgat 3780
ctccatcgag atggcgaaga gaaacctaag agggatatgg aacttcacca acccaggggt 3840
ggtgagccac aacgagatac tggagatgta caagagttac atcgagccag ggtttaaatg 3900
gtccaacttc acagtggaag aacaagcaaa ggtcattgtt gctcctcgaa gcaacaatga 3960
aatggatggg actaaactaa gcaaggagtt cccagagatg ctaccaatta aagaggcgct 4020
gatcaaatac gtcttcgaac ctaacaagag aacctgagac ctgaacagca ctcttcgcca 4080
caagtgctta cctataactg tttccttttc tttctttctc tttcaacaga aatgtctttt 4140
tatgtttact catcgtctta tgatccttgt aggtagtttc actatattga ttctactaaa 4200
atatgattta tcattattat ttatagagac taaagttttt tttttctttc tcaaattcta 4260
catttcccct cggattttac ttactaagag acagtagtac acttataaaa atgaagagcc 4320
acttactggt tgtgatcatt agggattcca ccaaggcagg ttcaaaacac ttgaacttga 4380
ttattaagct atagcctgag aagagaagca aacaacaagt gttgatttga aataaaccga 4440
agtatatgat gtgaatttgg tcaatattca gggttatagt ttcttacgt gaacagttga 4500
gggcgggaac gagagagctg agagcgttta ataggggaga gaataaggtt tcgtagagtt 4560
gactggggat tagcagcgcc accaccaccg ccaaatacag gatgtcctcc tcctcctgct 4620
cttctgtttc caaggtctgt tggaattgcg ggtgagtcgt tggagatgtc gaatggacct 4680
gagtttgaac tgttctgtct tgctggccaa atctcatctt taggtcctgg tgttgcagga 4740
gagtaaaacg accggtctgc gccaaataag tcaacttgat ttggagatat taaccaacaa 4800
tagacttgga atcaaaagaa gcactaggct caaggtagtt cattaacctt tgcgaggggg 4860
ctctctgttc tccatcatgt taactggtgg gtttgagaaa aagtcaggtt cgtggtgtcg 4920
tgggtagaaa ttgtttgctg gttggatggc tgtacgttta catgactcgt attcacttct 4980
tagctggtca tacatctcat cgagcttcct cttctgtctg gtgtttgaaa caataattac 5040
agctgagtta gagataagga acagaaccag gcaaacaaag cgtgtgttaa atcactgacc 5100
ttgatttctc ggagaacttc tcttggagct cttgtttatc cttggtcaag ttttctacct 5160
cttgctccat catctgacac ctcttgccca tcttctggta tgctgtatgc acctgctcca 5220
ttttctcgct aaactttgct 5240

<210> SEQ ID NO 21
<211> LENGTH: 1995
<212> TYPE: DNA
<213> ORGANISM: Thlaspi arvense

<400> SEQUENCE: 21
atggctacat ataagcccaa gaacatcctc atcactgggg ctgctggatt catagcgtcc 60
catgtcgcca acaggcttgt tcgaagctac cctgactaca aaatcgttgt gcttgacaag 120
cttgattact gctcaaacct gaaaaacctc aatccttcga aatcctctcc aaacttcaag 180
tttgtcaagg gagacatcgc cagtgctgac ctcgtcaact accttctcat cactgaaaac 240
atcgacacga ttatgcactt tgctgctcag acccatgtcg acaattcctt cggtaacagc 300
ttcgagttta ccaagaacaa tatttacggc acccatgtcc ttctggaagc ttgcaaagtc 360
actgggcaga tcaggaggtt catccatgtg agtaccgatg aggtctatgg agagactgat 420
gaggatgctt cagtgggaaa ccatgaggct tctcagttgc tccctacaaa cccttactct 480
gccactaaag ctggagctga gatgcttgtg atggcatacg gtagatcata cgggttgcca 540
gttataacga ctcgcgggaa caatgtctat ggtccgaatc agtttcctga aaagttgatc 600
cctaagttca ttctgttggc tatgagtggg aagccactgc cgatccacgg agatggatct 660
aacgtgagga gttacctcta ctgcgaagat gttgctgagg cgtttgaggt tgttctacac 720
aaaggggaag tcaaccatgt ctacaatata gggacaacga gagaaaggag agtgattgat 780
gttgccaacg acatctcaaa actctttgga atagaccctg actccaccat tcagtttgtt 840
gagaaccggc cttttaatga ccagaggtac ttcctcgatg accagaagct gaagaagttg 900
ggatggtctg aacgaaccac ttgggaagaa ggactgaaaa agacaatgga ttggtacact 960
gcgaaccctg agtggtgggg agatgtctcc ggagctctgc tgcctcatcc acggatgttg 1020
atgatgcctg gtgatagact ctctgatggc tctgacgagc gcaaggatgc agacggtaat 1080
cagacattca cggtggttac tcccaccaag gccggtggtt ccgcagacaa aacatcctta 1140
aagttcctca tctatggcaa aactgggtgg ctcggtggtc tcctaggaaa gatatgtgag 1200
aagcaaggga ttccgtacga gtatggaaaa gggagactag aagacagagc ttcaatcatg 1260
gcggatattc gcagcgtcaa acctacccat gtcttcaatg ccgcgggctt aacaggcagg 1320
cctaatgttg actggtgtga gtctcacaaa accgagacta tccgagtcaa cgtcgctggt 1380
actttgactc tggcagatgt ttgcagagag aatgatctgt tgatgatgaa ctttgccacc 1440
ggttgtatat ttgagtatga cgctgcacat ccagaaggtt cagggattgg cttcaaggaa 1500
gaagacaaac cgaatttcac cggttccttc tactcaaaga caaaggcaat ggtcgaagag 1560
cttctaagag agtttgacaa cgtatgcacc ttgagagtga ggatgccaat ctcatccgac 1620
ttgaacaacc cgcgaaactt catcacaaag atctcgcgtt acaacaaagt ggtgaacatc 1680
ccaaacagca tgaccatact cgacgagctc ttaccaatct caatcgagat ggcgaagagg 1740
aacctacggg ggatttggaa tttcaccaac ccaggagtgg tgagtcacaa cgagatacta 1800
gagatgtaca agagctacat cgagccaggt ttcaaatggt ccaacttcac tttagaggaa 1860
caggctaagg tcattgtcgc accacggagc aacaacgaga tggatggttt taagctcagc 1920
aaggagtttc cagagatgct ttccatcaaa gattcgttga tcaaatacgt cttcgaaccc 1980
aacaagagaa cgtaa 1995

```
<210> SEQ ID NO 22
<211> LENGTH: 664
<212> TYPE: PRT
<213> ORGANISM: Thlaspi arvense

<400> SEQUENCE: 22

Met Ala Thr Tyr Lys Pro Lys Asn Ile Leu Ile Thr Gly Ala Ala Gly
1               5                   10                  15

Phe Ile Ala Ser His Val Ala Asn Arg Leu Val Arg Ser Tyr Pro Asp
            20                  25                  30

Tyr Lys Ile Val Val Leu Asp Lys Leu Asp Tyr Cys Ser Asn Leu Lys
        35                  40                  45

Asn Leu Asn Pro Ser Lys Ser Ser Pro Asn Phe Lys Phe Val Lys Gly
    50                  55                  60

Asp Ile Ala Ser Ala Asp Leu Val Asn Tyr Leu Leu Ile Thr Glu Asn
65                  70                  75                  80

Ile Asp Thr Ile Met His Phe Ala Ala Gln Thr His Val Asp Asn Ser
                85                  90                  95

Phe Gly Asn Ser Phe Glu Phe Thr Lys Asn Asn Ile Tyr Gly Thr His
            100                 105                 110

Val Leu Leu Glu Ala Cys Lys Val Thr Gly Gln Ile Arg Arg Phe Ile
        115                 120                 125

His Val Ser Thr Asp Glu Val Tyr Gly Glu Thr Asp Glu Asp Ala Ser
    130                 135                 140

Val Gly Asn His Glu Ala Ser Gln Leu Leu Pro Thr Asn Pro Tyr Ser
145                 150                 155                 160

Ala Thr Lys Ala Gly Ala Glu Met Leu Val Met Ala Tyr Gly Arg Ser
                165                 170                 175

Tyr Gly Leu Pro Val Ile Thr Thr Arg Gly Asn Asn Val Tyr Gly Pro
            180                 185                 190

Asn Gln Phe Pro Glu Lys Leu Ile Pro Lys Phe Ile Leu Leu Ala Met
        195                 200                 205

Ser Gly Lys Pro Leu Pro Ile His Gly Asp Gly Ser Asn Val Arg Ser
    210                 215                 220

Tyr Leu Tyr Cys Glu Asp Val Ala Glu Ala Phe Glu Val Val Leu His
225                 230                 235                 240

Lys Gly Glu Val Asn His Val Tyr Asn Ile Gly Thr Thr Arg Glu Arg
                245                 250                 255

Arg Val Ile Asp Val Ala Asn Asp Ile Ser Lys Leu Phe Gly Ile Asp
            260                 265                 270

Pro Asp Ser Thr Ile Gln Phe Val Glu Asn Arg Pro Phe Asn Asp Gln
        275                 280                 285

Arg Tyr Phe Leu Asp Asp Gln Lys Leu Lys Lys Leu Gly Trp Ser Glu
    290                 295                 300

Arg Thr Thr Trp Glu Glu Gly Leu Lys Lys Thr Met Asp Trp Tyr Thr
305                 310                 315                 320

Ala Asn Pro Glu Trp Trp Gly Asp Val Ser Gly Ala Leu Leu Pro His
                325                 330                 335

Pro Arg Met Leu Met Met Pro Gly Asp Arg Leu Ser Asp Gly Ser Asp
            340                 345                 350

Glu Arg Lys Asp Ala Asp Gly Asn Gln Thr Phe Thr Val Val Thr Pro
        355                 360                 365

Thr Lys Ala Gly Gly Ser Ala Asp Lys Thr Ser Leu Lys Phe Leu Ile
    370                 375                 380
```

```
Tyr Gly Lys Thr Gly Trp Leu Gly Gly Leu Leu Gly Lys Ile Cys Glu
385                 390                 395                 400

Lys Gln Gly Ile Pro Tyr Glu Tyr Gly Lys Gly Arg Leu Glu Asp Arg
                405                 410                 415

Ala Ser Ile Met Ala Asp Ile Arg Ser Val Lys Pro Thr His Val Phe
            420                 425                 430

Asn Ala Ala Gly Leu Thr Gly Arg Pro Asn Val Asp Trp Cys Glu Ser
        435                 440                 445

His Lys Thr Glu Thr Ile Arg Val Asn Val Ala Gly Thr Leu Thr Leu
    450                 455                 460

Ala Asp Val Cys Arg Glu Asn Asp Leu Leu Met Met Asn Phe Ala Thr
465                 470                 475                 480

Gly Cys Ile Phe Glu Tyr Asp Ala Ala His Pro Glu Gly Ser Gly Ile
                485                 490                 495

Gly Phe Lys Glu Glu Asp Lys Pro Asn Phe Thr Gly Ser Phe Tyr Ser
            500                 505                 510

Lys Thr Lys Ala Met Val Glu Glu Leu Leu Arg Glu Phe Asp Asn Val
        515                 520                 525

Cys Thr Leu Arg Val Arg Met Pro Ile Ser Ser Asp Leu Asn Asn Pro
    530                 535                 540

Arg Asn Phe Ile Thr Lys Ile Ser Arg Tyr Asn Lys Val Val Asn Ile
545                 550                 555                 560

Pro Asn Ser Met Thr Ile Leu Asp Glu Leu Leu Pro Ile Ser Ile Glu
                565                 570                 575

Met Ala Lys Arg Asn Leu Arg Gly Ile Trp Asn Phe Thr Asn Pro Gly
            580                 585                 590

Val Val Ser His Asn Glu Ile Leu Glu Met Tyr Lys Ser Tyr Ile Glu
        595                 600                 605

Pro Gly Phe Lys Trp Ser Asn Phe Thr Leu Glu Glu Gln Ala Lys Val
    610                 615                 620

Ile Val Ala Pro Arg Ser Asn Asn Glu Met Asp Gly Phe Lys Leu Ser
625                 630                 635                 640

Lys Glu Phe Pro Glu Met Leu Ser Ile Lys Asp Ser Leu Ile Lys Tyr
                645                 650                 655

Val Phe Glu Pro Asn Lys Arg Thr
            660


<210> SEQ ID NO 23
<211> LENGTH: 5650
<212> TYPE: DNA
<213> ORGANISM: Thlaspi arvense

<400> SEQUENCE: 23

cctttcgttt gcatttttgt gttacggtgt gatatctggt gaggatgtac atatgtggta      60

aagtggcaat aatagtagct atttataaaa ttttatcata aatattattt tttacatgaa     120

actatatata atacaaaatt tttaggcaaa caaaaattat tagtcaaaaa gtataattca     180

aaactcactt gattcaaata tcggaatcag cgcgctagat ggggtgataa gatttaccat     240

ctcaactaaa tgaccatata tatgactcca tataaatata atcaaatagt tttgatttaa     300

taaaacgttt actattatat acgtttaata aaaaagtact ttaccagctt ttacgtgagt     360

tatggaaaaa ttatgaaatc caagatgtaa tcaagggttg ctgtccaaaa aaataaaaaa     420

aaaacattag ttaagggttg ataagacgta gaaataaata gatcgttacg taaaacatct     480

gcaggaagtg tattgatttg taaacgttaa aatacttctc tctgaccatt tattatatgt     540
```

```
cagtcgttat aagagaaaac aaaacgcaca tgttatattg acatgtggac gataatgtat    600
attgacatgt gaagaagcca actccgtacg taaagcgcca tttgcgctgc aaatactgat    660
cctcaactac agtggattct tttctcacaa aaacatagac cgtttcaaat atatgttccc    720
aaacacttgt gagacattct atacaaagtt tatcatgcac ccttcctttt tttttaacgt    780
caaaatgatc atgtacttct gtcacattat ttttgtacat tatgaatata tagacatttg    840
tattctctct ttcgccgaat acacacatct atatatttgt aaatgtagca ggtttaaatt    900
ttggagtaaa agaatagttg attttgacca catagagaac taatggatca attctcacta    960
atacaaatat ttggtgaaag ccttagaggt gagaaagtcc aaggcccata aaggcctatt   1020
acggccaccc ccggtcacgt aaaaccaagc ctcgttctcg ttgatgaggc cgaatataaa   1080
aggcatcatc aaatcaaaca tgtgcgtaac gtgatattta atttagcatt tgcaagtaat   1140
gatcacttct gtttttttctt ttagtattta gttcttcact taagttttcc acgttattta   1200
ttaatataca ggaactgctt tttcttattt tattggaaaa atcatgtttt atgtttgttc   1260
aattaaaatt tcagcacaat ttctttttca tttttttata tgaaaacttt aaggtagaaa   1320
tgggaaattg cgaaaccgaa tcatgcggac aaaacgaaat ttctgcgttg cctatatttt   1380
ttgttggtaa tttttaaaac aataaacaat taatttgacg tgataaaaac aaagggacat   1440
gaaaaaactc taaaagcgta gtaatggtaa tttggtaatt tcaaagtccg ctggttctcc   1500
gtaactgtct caaattaaaa agagggctta ctgttttctg acgctcgtta gattccctct   1560
ctttcttctt cattttctcc tcttcgtctt cactgctaat tcccttgatc tctctccctg   1620
tcctccaatt ttccctctct acaaatatcg actccttctt caatattaga ttgatcctga   1680
tccgattcga gccggtacgt acctgaactg tttctgtttc tctgagctaa ttcgtgaatg   1740
tacgaggttc tgctgcgttt tatttttttt gatggtatag ttgacatgtt ttcaggattt   1800
tttgttgtat actctgatct ttgatgcttg tttatcgttt tgccattgga tctgctgctc   1860
gatctgggca atttctcgca tttgattgct acatttgtca taacttcggg atctggatct   1920
accttttttt tctgatcatt tagaatttcg ctaacagctt tagattttcg tacttatcgc   1980
gtggatttgg cttcccgcta cttgttcagc tgtatctgtt aaaatctcac aaatttttat   2040
tgaactgaat catggggttt tcaataggat agatctggtt gagttgttct cctcagtagc   2100
tgtttccttc cacatttgag cttaatcgat ttcatggagt aatacgggtg atcgtgattt   2160
cgttaatcac atctgatccg atgacgttca tgatatatat actagccatt atttacctgt   2220
ttgctggatc ttttgtcctt cgattaaatc tggctgtttc gtcattgacg agtgtactga   2280
aagcttttcc gaatgcaaat ataatgtttt gtgttgttgc agattatata tttatcatca   2340
catggctaca tataagccca agaacatcct catcactggg gctgctggat tcatagcgtc   2400
ccatgtcgcc aacaggcttg ttcgaagcta ccctgactac aaaatcgttg tgcttgacaa   2460
gcttgattac tgctcaaacc tgaaaaacct caatccttcg aaatcctctc caaacttcaa   2520
gtttgtcaag ggagacatcg ccagtgctga cctcgtcaac taccttctca tcactgaaaa   2580
catcgacacg attatgcact ttgctgctca gacccatgtc gacaattcct tcggtaacag   2640
cttcgagttt accaagaaca atatttacgg cacccatgtc cttctggaag cttgcaaagt   2700
cactgggcag atcaggaggt tcatccatgt gagtaccgat gaggtctatg gagagactga   2760
tgaggatgct tcagtgggaa accatgaggc ttctcagttg ctccctacaa acccttactc   2820
tgccactaaa gctggagctg agatgcttgt gatggcatac ggtagatcat acgggttgcc   2880
```

agttataacg actcgcggga acaatgtcta tggtccgaat cagtttcctg aaaagttgat 2940
ccctaagttc attctgttgg ctatgagtgg gaagccactg ccgatccacg gagatggatc 3000
taacgtgagg agttacctct actgcgaaga tgttgctgag gcgtttgagg ttgttctaca 3060
caaaggggaa gtcaaccatg tctacaatat agggacaacg agagaaagga gagtgattga 3120
tgttgccaac gacatctcaa aactctttgg aatagaccct gactccacca ttcagtttgt 3180
tgagaaccgg ccttttaatg accagaggta cttcctcgat gaccagaagc tgaagaagtt 3240
gggatggtct gaacgaacca cttgggaaga aggactgaaa aagacaatgg attggtacac 3300
tgcgaaccct gagtggtggg gagatgtctc cggagctctg ctgcctcatc cacggatgtt 3360
gatgatgcct ggtgatagac tctctgatgg ctctgacgag cgcaaggatg cagacggtaa 3420
tcagacattc acggtggtta ctcccaccaa ggccggtggt tccgcagaca aaacatcctt 3480
aaagttcctc atctatggca aaactgggtg gctcggtggt ctcctaggaa agatatgtga 3540
gaagcaaggg attccgtacg agtatggaaa agggagacta gaagacagag cttcaatcat 3600
ggcggatatt cgcagcgtca aacctaccca tgtcttcaat gccgcgggct taacaggcag 3660
gcctaatgtt gactggtgtg agtctcacaa aaccgagact atccgagtca acgtcgctgg 3720
tactttgact ctggcagatg tttgcagaga gaatgatctg ttgatgatga actttgccac 3780
cggttgtata tttgagtatg acgctgcaca tccagaaggt tcagggattg gcttcaagga 3840
agaagacaaa ccgaatttca ccggttcctt ctactcaaag acaaaggcaa tggtaatata 3900
ctactacatc acataaccaa atcacatgtg atcctcaaac tgtgcaactc tgttcataaa 3960
tcctctgttt ctattttcgc caggtcgaag agcttctaag agagtttgac aacgtatgca 4020
ccttgagagt gaggatgcca atctcatccg acttgaacaa cccgcgaaac ttcatcacaa 4080
agatctcgcg ttacaacaaa gtggtgaaca tcccaaacag catgaccata ctcgacgagc 4140
tcttaccaat ctcaatcgag atggcgaaga ggaacctacg gggatttgg aatttcacca 4200
acccaggagt ggtgagtcac aacgagatac tagagatgta caagagctac atcgagccag 4260
gtttcaaatg gtccaacttc actttagagg aacaggctaa ggtcattgtc gcaccacgga 4320
gcaacaacga gatggatggt tttaagctca gcaaggagtt tccagagatg ctttccatca 4380
aagattcgtt gatcaaatac gtcttcgaac ccaacaagag aacgtaatac cctcagtaac 4440
acatacacac acacacactt cctctttatc tgttcattgt tatattatta tcttgcaggt 4500
agtttcacca ctataatgat tctactataa ttttattttg tcatatgatt catttactct 4560
ttttttggct ttctacgtcg aacatgtagc tctcttgacg cattctacgt cacaacacat 4620
tttgttttca ttaatattat ttattaaacg ataaaattgc ttgaagttta ttactttcac 4680
tattgattcc tccttttagt tttcatctca aaagagcaga ggacagagat taagaacgaa 4740
acagcattga ctgataactt atttccctat gcttttaaac ttgaggtttc tatttgttac 4800
aaaacaatgt ctttcataaa gttaaatctt tctattgcat aaatcgaaac tgcaaactca 4860
aaatgtaata taaattaaac cttctgtact tcctgtcccc aaatcttcac catacgacca 4920
tctaaaagca gaatttttca cactacgaac aacattccat aatctgatca tccttgcaac 4980
aaagcatacc gattcgtaag ccttcaattt gaatgaagac gtaaaatgat gaataaaagg 5040
taagagagag gaacagaaaa agctcagcac cttgaaattt gttgttctct tcacatagct 5100
tgagcgtatt gttgtctaga caatggtgga atttcttgtc ccgtcataaa atttaaagtc 5160
aaaagtcagt agtagttggt gattgattgg ctcctgagtt cttacaaagg aggagaacac 5220
ttaaaaaaca gagtatgaga atataccttc tgcctctgta gacaaccaat catgtgcaca 5280

```
gaacagagcc tgtctaatat cagggctcaa ggaactctgg ctatcatcga tcaccggtct   5340

cccggagttg aacgttgaat caggcgcaag gatcgacatc ggcgtcccca agatatcgcg   5400

tgccatcata gagaggatag ggtatctcgg cgtatggacc ttccagtaat tcagaatgtt   5460

gaactcgcca ctacgaggaa agattggttc agacaagtac ttgtccaagt ccgatgttgt   5520

gttctggctc tgagatgtct cgtggagaaa cttgtcgaat cctttcaacc tgtctctagt   5580

gtccatacct gctctaccta agccagagcc agagtaggaa gagtcgtccc caacaatggc   5640

tgagcatatc                                                          5650
```

<210> SEQ ID NO 24
<211> LENGTH: 1092
<212> TYPE: DNA
<213> ORGANISM: Thlaspi arvense

<400> SEQUENCE: 24

```
atgggtagac attcttgctg ttacaaacaa aagctgagga aagggctttg gtctcctgaa     60

gaagacgaga agcttctcaa tcacatcaca aatcacggcc atggctgctg gagctctgtc    120

cctaaactcg ctggtttgca gagatgcgga aagagttgca gactgagatg gatcaattac    180

ttgagacctg atttaaagag aggagctttc tctccagagg aagaaaatct catcgtcgag    240

cttcacgctg tcctcggaaa cagatggtca cagattgcag caaggcttcc gggaagaacc    300

gataacgaga tcaagaatct gtggaattca agtatcaaga agaaactgaa acaaagaggc    360

attgatccaa acacacacaa acccatctct gaagttgagg gctttagcga caaagacaaa    420

ccagcaacaa gcgacaataa aagaagcagc aacgatcata agtctccgag ttcctcctct    480

gcaaccaacc aagacttctt cctagaaagg ccatctgatt tctccgacta cttcggtttt    540

cagaagctta acttcaactc caacctcgga ctctctgctg caactgattc ttcactctgc    600

tccatcattc cggcgcagtt tagccccgga aacatgtctg gttctgtctt ccagactccg    660

gtatgcgtaa agccttcaat tagtcttcct ccggacaaca gttcgagcac cgtctccgga    720

ggagatcatg tgaaactggc tgcacctaat tgggaatttc agacaaacaa cgcctccagt    780

ttcttcgaca atggcggatt ctcatggtca atcccaaatt cttcttcttc actagtcaaa    840

cccaatcata acttcgaaga aatgaaatgg tcagagtatt tgaacacacc gttcttcaat    900

gggagcactg tacagagtca aagctcacaa ccgatctaca tcaaatcaga ggcagattac    960

ttagccaatg tttcgaacat gacagatcct tggagccaaa cccagaacga gaatttgggc   1020

acaaatgaag ctactgacgt gttctccaag gatcttcaga gaatggccgt ctcctttggt   1080

cagtcccttt ag                                                       1092
```

<210> SEQ ID NO 25
<211> LENGTH: 363
<212> TYPE: PRT
<213> ORGANISM: Thlaspi arvense

<400> SEQUENCE: 25

```
Met Gly Arg His Ser Cys Cys Tyr Lys Gln Lys Leu Arg Lys Gly Leu
1               5                   10                  15

Trp Ser Pro Glu Glu Asp Glu Lys Leu Leu Asn His Ile Thr Asn His
            20                  25                  30

Gly His Gly Cys Trp Ser Ser Val Pro Lys Leu Ala Gly Leu Gln Arg
        35                  40                  45

Cys Gly Lys Ser Cys Arg Leu Arg Trp Ile Asn Tyr Leu Arg Pro Asp
```

```
    50                  55                  60

Leu Lys Arg Gly Ala Phe Ser Pro Glu Glu Glu Asn Leu Ile Val Glu
65                  70                  75                  80

Leu His Ala Val Leu Gly Asn Arg Trp Ser Gln Ile Ala Ala Arg Leu
                85                  90                  95

Pro Gly Arg Thr Asp Asn Glu Ile Lys Asn Leu Trp Asn Ser Ser Ile
            100                 105                 110

Lys Lys Lys Leu Lys Gln Arg Gly Ile Asp Pro Asn Thr His Lys Pro
        115                 120                 125

Ile Ser Glu Val Glu Gly Phe Ser Asp Lys Asp Lys Pro Ala Thr Ser
    130                 135                 140

Asp Asn Lys Arg Ser Ser Asn Asp His Lys Ser Pro Ser Ser Ser Ser
145                 150                 155                 160

Ala Thr Asn Gln Asp Phe Phe Leu Glu Arg Pro Ser Asp Phe Ser Asp
                165                 170                 175

Tyr Phe Gly Phe Gln Lys Leu Asn Phe Asn Ser Asn Leu Gly Leu Ser
            180                 185                 190

Ala Ala Thr Asp Ser Ser Leu Cys Ser Ile Ile Pro Ala Gln Phe Ser
        195                 200                 205

Pro Gly Asn Met Ser Gly Ser Val Phe Gln Thr Pro Val Cys Val Lys
    210                 215                 220

Pro Ser Ile Ser Leu Pro Pro Asp Asn Ser Ser Ser Thr Val Ser Gly
225                 230                 235                 240

Gly Asp His Val Lys Leu Ala Ala Pro Asn Trp Glu Phe Gln Thr Asn
                245                 250                 255

Asn Ala Ser Ser Phe Phe Asp Asn Gly Gly Phe Ser Trp Ser Ile Pro
            260                 265                 270

Asn Ser Ser Ser Ser Leu Val Lys Pro Asn His Asn Phe Glu Glu Met
        275                 280                 285

Lys Trp Ser Glu Tyr Leu Asn Thr Pro Phe Phe Asn Gly Ser Thr Val
    290                 295                 300

Gln Ser Gln Ser Ser Gln Pro Ile Tyr Ile Lys Ser Glu Ala Asp Tyr
305                 310                 315                 320

Leu Ala Asn Val Ser Asn Met Thr Asp Pro Trp Ser Gln Thr Gln Asn
                325                 330                 335

Glu Asn Leu Gly Thr Asn Glu Ala Thr Asp Val Phe Ser Lys Asp Leu
            340                 345                 350

Gln Arg Met Ala Val Ser Phe Gly Gln Ser Leu
        355                 360


<210> SEQ ID NO 26
<211> LENGTH: 4198
<212> TYPE: DNA
<213> ORGANISM: Thlaspi arvense

<400> SEQUENCE: 26

aaaataatta attctaactt atgacttaaa aaccttgtat acgtctagct aaatcttatt     60

ttcgacgatc ttttttagga ttgggtccca ataaacaaat ggataaacgg taagagtcta    120

attacgagag gccatgtcca gataacgtaa gaaaactaca aaaattcaac atgtgaatat    180

ttgagggaaa gtttgggtaa atggacaaag aatataccct ctctattatg actggcttaa    240

aggcaaaaaa agggagaaaa ttgccaaaga gaagtgagtc catttaaatt taaaaatgta    300

taaagcaaac aaaagagaga cttaattatt ctcattcatc tgcaaaagaa accatgtatt    360
```

```
taaagcaaaa tttctaaatt ccgttatgta gacatttaat tccatttaat catttctgga    420
aacattaacc aatgatgaca atttcttgct ggttataaac ctttcccatt atttccttta    480
attgatgcgt tcatcttcac aaagatttag tccacattta gcatttgctt ttaattcatt    540
gcagaagtct ttcatgacga caacaatcaa ctcttctttg tccacattct tatctagcta    600
tacgatctac ctcgtgtgtt attttaattc ttccgttctc actgtaaatc atttttgtat    660
agcgcttcca ccgctaacta ttgaatatca cttttcaata cattaatcgt tacaataagt    720
ttgtagctgc aagaaaaaat ttagactcgg atgcatttgg taacatagat atcatataaa    780
acttttaaac tttttctcgt catgcatcac tcaaagagtg ctatatcctt gtcacatacc    840
aaaaacgttt taggagcacg cattgcttca aactctcgtc tatgtgcgat ttcgatacat    900
ttttctaatt actctcaagt ctcaactaag cacacttaat tatggatttc tttttaaaa    960
atagcctatt tctcgattta caccactgta aatatatttc cataaattct atatcgaacc   1020
atatactaca tgagtatttt taagtgaaaa ctaattattt tgtgacataa aaaacctgat   1080
atacgtctac caaaaaaggt tttttttgta aaccatgact tacgtgaatc tccgaaataa   1140
aaatctttag aaaagttgtt gaggtcacgc tggcttttgg ctgcgtacgt atagagtggt   1200
ccgtaacatc ttcgaggaca aactgaacat aaatgagcat gtctccacta cttagaacca   1260
cacttactat taattttaaa agaagttttt tttttttttt atcaattgtt gcatttgtat   1320
gtatgatcat aatgggtcca tttggagatg acgaatgtat gatgattaga gtgatgtaaa   1380
ggtcaaaact acatgaactc catctcttaa ccctgattat tttaccattg gtgtgaacca   1440
atctgatgtg gaccaatcat attgttttta caaaagctaa aaaagatgta catacttttt   1500
gctatttaat ctttaaagag agtatagaat ttcaacaaac ccttccgaag aaagtgactt   1560
ttcttagtcc tattaatact ctctctctct ctggagatct gttatttcgt tttctccacc   1620
tttctcttca gattccatta accttcaaaa gttttaaata catgctctct gctcaaagcg   1680
tttttctttc gttacttgta aagtaaaaca cagagctctc ttctctttca tcgttccttt   1740
gctcagcatt gcagctttaa taaaccaaaa tgggtagaca ttcttgctgt tacaaacaaa   1800
agctgaggaa agggctttgg tctcctgaag aagacgagaa gcttctcaat cacatcacaa   1860
atcacggcca tggctgctgg agctctgtcc ctaaactcgc tggtaacatt ttcttcctta   1920
attcatggga tacaaaacat gaacttaaaa aggctacctt ttttgtaata acaattcaca   1980
aatctgagtc tactacaggt ttgcagagat gcggaaagag ttgcagactg agatggatca   2040
attacttgag acctgattta aagagaggag ctttctctcc agaggaagaa aatctcatcg   2100
tcgagcttca cgctgtcctc ggaaacaggt aataattcat agaaaacaga ggatcatgtt   2160
tgtgtcttaa gcttcctctg tttttaacag aggatcatgt atatctttta accttcctct   2220
gtttttttat cagatggtca cagattgcag caaggcttcc gggaagaacc gataacgaga   2280
tcaagaatct gtggaattca agtatcaaga agaaactgaa acaaagaggc attgatccaa   2340
acacacacaa acccatctct gaagttgagg gctttagcga caaagacaaa ccagcaacaa   2400
gcgacaataa aagaagcagc aacgatcata agtctccgag ttcctcctct gcaaccaacc   2460
aagacttctt cctagaaagg ccatctgatt tctccgacta cttcggtttt cagaagctta   2520
acttcaactc caacctcgga ctctctgctg caactgattc ttcactctgc tccatcattc   2580
cggcgcagtt tagccccgga aacatgtctg gttctgtctt ccagactccg gtatgcgtaa   2640
agccttcaat tagtcttcct ccggacaaca gttcgagcac cgtctccgga ggagatcatg   2700
tgaaactggc tgcacctaat tgggaatttc agacaaacaa cgcctccagt ttcttcgaca   2760
```

atggcggatt ctcatggtca atcccaaatt cttcttcttc actagtcaaa cccaatcata 2820
acttcgaaga aatgaaatgg tcagagtatt tgaacacacc gttcttcaat gggagcactg 2880
tacagagtca aagctcacaa ccgatctaca tcaaatcaga ggcagattac ttagccaatg 2940
tttcgaacat gacagatcct tggagccaaa cccagaacga gaatttgggc acaaatgaag 3000
ctactgacgt gttctccaag gatcttcaga gaatggccgt ctcctttggt cagtcccttt 3060
agcttttttt ttttcttctt ttctttattc taacagatgt agagaacaaa aaaatataca 3120
atacatacat acgtacagtg gatttaagtc tgtatattcc atgagctgtc tttattttta 3180
catttttaa gtgtgtttta tacgtcaaat attcttctat tttttgcaaa cctttcagtc 3240
tcatactata tatacacttt tatttctttt gttttgttat aaagattatg atgcatagaa 3300
ttctcgatga tttcagaggc ctgtgtttgc aattaatctg ttgaagaaca atgatgaaag 3360
taataaatca gtttctgtct gtttccgtga acgagttgta atccagagtc acatccttca 3420
ccatttttca gacctgtaat gaattaaaag acaaaaaagg acaaaaacat aaaactaaag 3480
caaatcataa taaataaact aaagtgggaa ttagctcaac taataagaag ggacactttt 3540
ttcgaaagga cccgagtttt aatacgatgt aaattttta aaaaaaaga tttctctttt 3600
ctgaaatcaa tgactgatca catatttgag agattagaaa tcgaataccc ctaatttctt 3660
cgggctatta taaactttga aaaaggtacg tatgtcgttt ttgcttagtc ttatcagaga 3720
actggaattg tccccattga cggcgtcgga atattcttta gcggtagaaa attcggaaca 3780
gttcgagaat tttctatttt tttgtctgtt aaataaaata gttatatgat ttgaccttaa 3840
taaacatgaa ggaggtgatg actgatgaga aggtgacttc atttttaatc ctaaaaagtc 3900
aattgattta ttttataacc catatttttt tttttagatt ctaatccaaa acaattactt 3960
attacttttt tagaaataac ctaacgcaat aactcgactg ataggtaaaa ctaaggtact 4020
ataatatgtt tgttttgact ttaaatttaa agacgatgct atattttttt gaaaatgaaa 4080
agaaattgat ctatcaaaca cataagtcta gattcaacag taattataaa aatagaataa 4140
agagagaaaa gttaatattt tcttggcatt atgagaaatc aaatatattt aacctata 4198

<210> SEQ ID NO 27
<211> LENGTH: 939
<212> TYPE: DNA
<213> ORGANISM: Thlaspi arvense

<400> SEQUENCE: 27
atgttctcat cactctccaa ccacaattca ccacaatcaa tggagtcacc acaatacgag 60
atctcttcaa gctcttcttc tgaaaaacct agatactact ttcaatcatc tgatatattc 120
cccaacctca ctcaaaaccc tagtaacagc aatacccaaa tcgagtcgtt accgcttatc 180
gatgggataa atttaaactc aaaccttaac ctaaacctta agccaccgta tgttgaaaaa 240
gaagaggaag agaaagaaga ggaggaagat cacgttgatc tgagcttata catcggcctt 300
cctagctctg ataattcgag aaacggtgtt aaactgccga agaagaaaaa tgggaaggac 360
atcatcactc atgacgctgg aaaacagatg gagaatgaac tttccggcaa agcatactgg 420
attccggcgg tggagcaaat tataataggc ttcactcatt tttcttgcca tgtatgcttc 480
aagacattca atcgctacaa caatcttcag atgcacatgt ggggccacgg ttcacaatac 540
aggaaaggac cagagtcact taaagggacg cagccacgag caatgctagg gatcccttgt 600
tactgctgcg tcgaagggtg taggaaccac attgaccatc ctcgatccaa gccgcttaaa 660

```
gacttccgaa cgctccaaac acactacaaa cgcaaacacg gccaaaagcc ctatgcgtgt    720

cgcatctgcg gtaagctgtt ggctgtcaaa ggcgattggc gcacacacga gaagaattgt    780

gggaaacgct gggtttgcgt ttgcggttct gactttaaac acaaacgctc ccttaaggac    840

catgttaagg cttttgggcc tggtcatggg tcttatctaa ccggtttgct tgacgagcag    900

gcctctcatt cttctctctc tgagaatttg ttcttttaa                           939
```

```
<210> SEQ ID NO 28
<211> LENGTH: 312
<212> TYPE: PRT
<213> ORGANISM: Thlaspi arvense

<400> SEQUENCE: 28

Met Phe Ser Ser Leu Ser Asn His Asn Ser Pro Gln Ser Met Glu Ser
1               5                   10                  15

Pro Gln Tyr Glu Ile Ser Ser Ser Ser Ser Ser Glu Lys Pro Arg Tyr
            20                  25                  30

Tyr Phe Gln Ser Ser Asp Ile Phe Pro Asn Leu Thr Gln Asn Pro Ser
        35                  40                  45

Asn Ser Asn Thr Gln Ile Glu Ser Leu Pro Leu Ile Asp Gly Ile Asn
    50                  55                  60

Leu Asn Ser Asn Leu Asn Leu Asn Leu Lys Pro Pro Tyr Val Glu Lys
65                  70                  75                  80

Glu Glu Glu Glu Lys Glu Glu Glu Glu Asp His Val Asp Leu Ser Leu
                85                  90                  95

Tyr Ile Gly Leu Pro Ser Ser Asp Asn Ser Arg Asn Gly Val Lys Leu
            100                 105                 110

Pro Lys Lys Lys Asn Gly Lys Asp Ile Ile Thr His Asp Ala Gly Lys
        115                 120                 125

Gln Met Glu Asn Glu Leu Ser Gly Lys Ala Tyr Trp Ile Pro Ala Val
    130                 135                 140

Glu Gln Ile Ile Ile Gly Phe Thr His Phe Ser Cys His Val Cys Phe
145                 150                 155                 160

Lys Thr Phe Asn Arg Tyr Asn Asn Leu Gln Met His Met Trp Gly His
                165                 170                 175

Gly Ser Gln Tyr Arg Lys Gly Pro Glu Ser Leu Lys Gly Thr Gln Pro
            180                 185                 190

Arg Ala Met Leu Gly Ile Pro Cys Tyr Cys Cys Val Glu Gly Cys Arg
        195                 200                 205

Asn His Ile Asp His Pro Arg Ser Lys Pro Leu Lys Asp Phe Arg Thr
    210                 215                 220

Leu Gln Thr His Tyr Lys Arg Lys His Gly Gln Lys Pro Tyr Ala Cys
225                 230                 235                 240

Arg Ile Cys Gly Lys Leu Leu Ala Val Lys Gly Asp Trp Arg Thr His
                245                 250                 255

Glu Lys Asn Cys Gly Lys Arg Trp Val Cys Val Cys Gly Ser Asp Phe
            260                 265                 270

Lys His Lys Arg Ser Leu Lys Asp His Val Lys Ala Phe Gly Pro Gly
        275                 280                 285

His Gly Ser Tyr Leu Thr Gly Leu Leu Asp Glu Gln Ala Ser His Ser
    290                 295                 300

Ser Leu Ser Glu Asn Leu Phe Phe
305                 310
```

<210> SEQ ID NO 29
<211> LENGTH: 4025
<212> TYPE: DNA
<213> ORGANISM: Thlaspi arvense

<400> SEQUENCE: 29
ttattgttta tcaccagttt ggttgtcatt aattaataag taagatttgt gtttagtgac 60
ggctgattcc gtttctagtg agtcagatgc gagatgattg aaaaccgaga agacgatgac 120
tccacaaaat aagattttgt ttaagtttta taattgagtt ttagcgaaat tcgttttcaa 180 ttttttttt tagctttatt ttttttattg agaatttaag aattataaaa gttttttagg 240
taaaatttga agaaatttg attaataaat tatttaatga aatagcttta aattattggt 300
tgtagaagat gacataacag ttttgaactc tactattgat taattatttt tgctgatgtg 360
gcatattgtt ttattcttat tagttagttt tttcataatt taatgatgtg gtaatttgtt 420
atattcttat taactgatta ttttgatgat tatttttgct tatgtgacac cttttagaga 480
gcaggaaatc tatcctttta tataaaggag attagatttt accgatcatg tattatttag 540
tagccaattc catacgtaaa aaaaaagatt tttacaattt ggttataaat agcctgcatg 600
ttttatcggt cctatcttga ttgtatatcg taaaaaaaga tgctgactct aagaaaacga 660
atttcatatg gaccgtagta acagggccca cgagtaatta gggttttaac ggctgacatt 720
ttgatctctc atacatctaa gtatctaact agaagtgttg accgttagag aagaattaaa 780
taacttacat acatacaaaa acataagtcg aagaataatc ataacagtgc atcttctaca 840
ataatgataa caaaaaaagt aaattagaaa ttagcattta ttccaattaa tacccatatt 900
cgaaaatgca catggtagaa aagcaaaaaa agcttacgta aattccaaat attgtcaaac 960
ccctgcaatg acaaagttgc caaaaattga agaggttggt ccacacaatt taaggttctt 1020
tgcttcacac tctatttata ggcaaagaga tgaaacagag gagattaaat tgcttcttaa 1080
caaaggttgt tttcactcaa ccacatgcct tctcaagtgt ctgctgctca cattccccga 1140
gattctcatt tactttttcc tctatttggt acgtacttta tattacaatt ctatttgttt 1200
ctttgattat tcgttttgtt catacttagt tatcataaac atacatagtt gatcttatat 1260
tatacagtaa atttgataaa tgtttctctt aattaattta ctcacgcaat ttaaaggaga 1320
cgattgatac gcgggcctac ttacgcacct gcatgattat tagttataaa agttattgca 1380
aacattaaat tactttgata gctagagagc aattattata taaagctaat ttttaattgt 1440
agatatacat ttagtcgaaa gttaaaaaga aaaatgaaat ccctaaacaa acgttcccaa 1500
atgttctcat cactctccaa ccacaattca ccacaatcaa tggagtcacc acaatacgag 1560
atctcttcaa gctcttcttc tgaaaaacct agatactact ttcaatcatc tgatatattc 1620
cccaacctca ctcaaaaccc tagtaacagc aatacccaaa tcgagtcgtt accgcttatc 1680
gatgggataa atttaaactc aaaccttaac ctaaacctta agccaccgta tgttgaaaaa 1740
gaagaggaag agaaagaaga ggaggaagat cacgttgatc tgagcttata catcggcctt 1800
cctagctctg ataattcgag aaacggtgtt aaactgccga agaagaaaaa tgggaaggac 1860
atcatcactc atgacgctgg aaaacagatg gagaatgaac tttccggcaa agcatactgg 1920
attccggcgg tggagcaaat tataataggc ttcactcatt tttcttgcca tgtatgcttc 1980
aagacattca atcgctacaa caatcttcag gtacaaacca atgttatctc atgcgcatta 2040
cgtgcatgca taaccaaata aaatcttaat tcatatttga atttgtttgt tagagaacaa 2100
acggagaaaa tcctattcga tttatatgtt tataaccccc ttatctaatg ttatgagtta 2160

```
gaatgaattt atacatacat aatcaaaccc taagttgact aactatatat tattttgtag   2220

aataattgtt aatatagatc tgtttggatg catggttgag atttaattaa aatatactgt   2280

taaataaacc caaatttaaa atgaatttaa tagtttttct ccatataatt aattaacgtt   2340

tcctttaaaa tttcatccaa attaataatt aatagattac ttcagtgaaa caatatgatc   2400

gatcaacaat aagattgtaa tgattaatga accattttat tagttgttaa acttatattt   2460

gattaaaaaa aggtgggggg tatttgttat gaaaatttat cttgaaatcg tcagtctaac   2520

cattgttatc catttcattt tttgttatta catatactga tatacaaatc tttgttgaca   2580

ccaaatatga attcagatgc acatgtgggg ccacggttca caatacagga aaggaccaga   2640

gtcacttaaa gggacgcagc cacgagcaat gctagggatc ccttgttact gctgcgtcga   2700

agggtgtagg aaccacattg accatcctcg atccaagccg cttaaagact tccgaacgct   2760

ccaaacacac tacaaacgca aacacggcca aaagccctat gcgtgtcgca tctgcggtaa   2820

gctgttggct gtcaaaggcg attggcgcac acacgagaag aattgtggga aacgctgggt   2880

ttgcgtttgc ggttctgact ttaaacacaa acgctccctt aaggaccatg ttaaggcttt   2940

tgggcctggt catgggtctt atctaaccgg tttgcttgac gagcaggcct ctcattcttc   3000

tctctctgag aatttgttct tttaaaactt tgtgcatcta tcagtctttt gacgtgtgtt   3060

gtccgtttat ttagtctaga ataatgtggt atctaataat tctcgtagtg aataaatatca  3120

taatctactt gatatgagag gtcaacatat ttagtcccgc agttaataat atcataattt   3180

ggtgcaccaa ctaagggaaa tgactatcag ccacacttag ggattactca ttaatcgtag   3240

actcataaaa gctatatgtt taaaaatgct agtttgtata catatcatta gccacactta   3300

gggattacgc ataaaccgta gactcataaa atctatatgt ttaaaaatgt tagtttgtat   3360

aaaaggagat atatatgaaa tgagtaagga agtcacattc aagagcaagt gtagtgtgct   3420

ttccgagaaa tttcctccac atgtccagac ggtacgaaat gccagttaat tccaattcta   3480

tcattattga tctgaatgtg atcgcaaaac atgatttgat tagtttcctc tctttataat   3540

ttactaaaat aaaatgacga ccatataaca tcatttttca gaaggaaatt aaaacatatc   3600

aagaatattc atgtaaaata gttaaaatat cagttaaaaa tgttaccatt ctatacatat   3660

tatattttat atacatggac tgaattcgac aatattggta aatatcaata aatccaaaat   3720

cctgattatt tgtaaatcaa taaaatagta ttatgataca aaccaattca tatacggtga   3780

ttcgaaattt cagtacatca tgaacatgga acaatggatt ttatgaactg atgagttgtc   3840

caacgttcgt tacgtgcatg cattcaatgc ctcggtgcca cattactcac cttttatgta   3900

tcctctctcc attgtttttt tttttttatc taacttattg ggtatccaaa ttcatttttg   3960

atccttattt tagtgaaacc atgcatgtcc tacgtactat cgctcgtcat atttaaagga   4020

acagg                                                               4025
```

<210> SEQ ID NO 30
<211> LENGTH: 966
<212> TYPE: DNA
<213> ORGANISM: Thlaspi arvense

<400> SEQUENCE: 30

```
atgttctcat cactctccaa ccacgattca ccacattcaa tggagtcacc agactcacca     60

caatatgaga tctcttcatg ctcttcttct gaaaaaccta gatactactt tcaatccctt    120

gatctcttcc ccaacctcac tcaaaacgct tgtaacaaca ataacctaat cgagccttta    180

ccacttatcg atcggataga ctcaagctca aaccttaacc ttaaccgtaa gccaaaggca    240
```

```
ttgtatgttg aggaaggaga ggaagaggaa gaacaggagg aagaggacgt ggatgtgagc    300

ttacgcatcg gccttcctgg ctctgataat ttgagcaacg gtgctaaatt ttcgaagaaa    360

aatgggaagg agatcatcac tcacgatgcc ggaaaacaat cagagaatga actttccggc    420

aaggcatact ggattccagc agtggagcaa attataatag gcttcactca tttttcttgt    480

cacgtctgtt tcaagacatt caaccgctac aacaatcttc agatgcacat gtggggccac    540

ggttcacagt acaggaaagg accagattca cttaaaggga cgcagccacg agccatgcta    600

gggatccctt gttactgctg cgtcgaaggc tgtaagaacc acattgacca tcctcgctcc    660

aagccgctca aagactttcg aacgctccaa acgcactaca aacgcaaaca cggccaaaag    720

ccctatgcgt gtcgcatctg cggtaagctt ttggctgtca aaggtgattg gcgtacgcat    780

gagaagaatt gcgggaaacg gtgggtttgc gtttgcggtt ccgattttaa acacaaacgc    840

tccctgaagg atcacgttaa agcttttggg cctggtcatg ggtcttatcc gaccggtttg    900

tttgatgagc aggcctctaa ttcttctgtc tttgaaagtt tgttctgtgt gatcggtgag    960

tattag                                                                966
```

<210> SEQ ID NO 31
<211> LENGTH: 321
<212> TYPE: PRT
<213> ORGANISM: Thlaspi arvense

<400> SEQUENCE: 31

```
Met Phe Ser Ser Leu Ser Asn His Asp Ser Pro His Ser Met Glu Ser
1               5                   10                  15

Pro Asp Ser Pro Gln Tyr Glu Ile Ser Ser Cys Ser Ser Ser Glu Lys
            20                  25                  30

Pro Arg Tyr Tyr Phe Gln Ser Leu Asp Leu Phe Pro Asn Leu Thr Gln
        35                  40                  45

Asn Ala Cys Asn Asn Asn Asn Leu Ile Glu Pro Leu Pro Leu Ile Asp
    50                  55                  60

Arg Ile Asp Ser Ser Ser Asn Leu Asn Leu Asn Arg Lys Pro Lys Ala
65                  70                  75                  80

Leu Tyr Val Glu Glu Gly Glu Glu Glu Glu Glu Gln Glu Glu Glu Asp
                85                  90                  95

Val Asp Val Ser Leu Arg Ile Gly Leu Pro Gly Ser Asp Asn Leu Ser
            100                 105                 110

Asn Gly Ala Lys Phe Ser Lys Lys Asn Gly Lys Glu Ile Ile Thr His
        115                 120                 125

Asp Ala Gly Lys Gln Ser Glu Asn Glu Leu Ser Gly Lys Ala Tyr Trp
    130                 135                 140

Ile Pro Ala Val Glu Gln Ile Ile Ile Gly Phe Thr His Phe Ser Cys
145                 150                 155                 160

His Val Cys Phe Lys Thr Phe Asn Arg Tyr Asn Asn Leu Gln Met His
                165                 170                 175

Met Trp Gly His Gly Ser Gln Tyr Arg Lys Gly Pro Asp Ser Leu Lys
            180                 185                 190

Gly Thr Gln Pro Arg Ala Met Leu Gly Ile Pro Cys Tyr Cys Cys Val
        195                 200                 205

Glu Gly Cys Lys Asn His Ile Asp His Pro Arg Ser Lys Pro Leu Lys
    210                 215                 220

Asp Phe Arg Thr Leu Gln Thr His Tyr Lys Arg Lys His Gly Gln Lys
225                 230                 235                 240
```

```
Pro Tyr Ala Cys Arg Ile Cys Gly Lys Leu Leu Ala Val Lys Gly Asp
                245                 250                 255

Trp Arg Thr His Glu Lys Asn Cys Gly Lys Arg Trp Val Cys Val Cys
            260                 265                 270

Gly Ser Asp Phe Lys His Lys Arg Ser Leu Lys Asp His Val Lys Ala
        275                 280                 285

Phe Gly Pro Gly His Gly Ser Tyr Pro Thr Gly Leu Phe Asp Glu Gln
    290                 295                 300

Ala Ser Asn Ser Ser Val Phe Glu Ser Leu Phe Cys Val Ile Gly Glu
305                 310                 315                 320

Tyr


<210> SEQ ID NO 32
<211> LENGTH: 3923
<212> TYPE: DNA
<213> ORGANISM: Thlaspi arvense

<400> SEQUENCE: 32

cacgaaacaa gttcaattaa atttaacgga aataaatggt aattaatgaa agtttgaatt     60

gtattaatta ctgcttccac gaaacaacca aaaaaatcat ttgacaaagt aatttgtgta    120

cggtattagc cacatggggc caatcctcta tgtatatcgg agttgttttg ccaaatgccc    180

aattcttact ctagtaaata ttaaaccatt ttgtagatcc taatcttgag tcaactcaaa    240

gtcctatgtt tggaaactaa aaataagttt aaatcctcta gactacgact aagttgtaaa    300

aagaaatgtt caaaattcct tagacattga aattgaatac ttcaattaaa gaaaatttta    360

ccagcatgtt catagtagta gaccaccaca gaacaaaatt aatagttttt acattgcatt    420

cttatataat aattttggag tataattgta attataaaca aaataactaa aagaaaagga    480

aagtattctt gacatattta taggtactaa tttgctagta cgactattaa ttatggagat    540

taaatctagt atttgactaa ccagaaacat tttaaaggta agtgataagt tgataacctc    600

gcaattattt ttgaaagcta ttaatcactt tagcagaatg tatacaagtt ctatattaac    660

aagtttatct caaaatcttg agatcctact aataaatcat aacttttctc ttattggtat    720

gtcgaatcta gtgtttacca aactagaggt gttgaccgtt agagacaatt aaacaactta    780

catacataca aaagtacaag ccgaagaata atagtaataa cagtgcattt tctacaataa    840

ttaaaacaaa aaagtatatt aaaaattagc atttattcca attaatacca atattcgaaa    900

attaatatgg tagaaaagca aaaagcttac gtaaattcca cagattgtca aaaccctgca    960

atgaaaaagt tgccaaaaat tgacgaggtt ggtccacaaa atttaaggtt ctttgcttca   1020

cactctattt ataggcgaag agatgaaaca gaggaaatta attactcctt aacaaaggtt   1080

gttttcactc aaccacatgc cttctcaagt gtctgctgct cacattcccc gagattctca   1140

tttacttact cctctatttg gtacgtcctt tatattacaa ttctagtatt tttttttca   1200

ttattcgttt tgttcatact tcgtttcata aacatatata gttaatctta tattatacag   1260

taactttgat aaatatgtat cttaatttac tcacgcagtt tagagagacg attgatacgt   1320

ggggactact tacgtacctg catgattata taagttataa aagttattgc agaacattaa   1380

attactttga tagctcgaga gcaatcatta tataaagcta tatttttaat cacaaatata   1440

catctactcg aaagtttttt ttttaaaaaa aagatgaaat ccctaaacaa acgttcccaa   1500

atgttctcat cactctccaa ccacgattca ccacattcaa tggagtcacc agactcacca   1560

caatatgaga tctcttcatg ctcttcttct gaaaaaccta gatactactt tcaatccctt   1620
```

-continued

```
gatctcttcc ccaacctcac tcaaaacgct tgtaacaaca ataacctaat cgagccttta   1680
ccacttatcg atcggataga ctcaagctca aaccttaacc ttaaccgtaa gccaaaggca   1740
ttgtatgttg aggaaggaga ggaagaggaa gaacaggagg aagaggacgt ggatgtgagc   1800
ttacgcatcg gccttcctgg ctctgataat ttgagcaacg gtgctaaatt ttcgaagaaa   1860
aatgggaagg agatcatcac tcacgatgcc ggaaaacaat cagagaatga actttccggc   1920
aaggcatact ggattccagc agtggagcaa attataatag gcttcactca tttttcttgt   1980
cacgtctgtt tcaagacatt caaccgctac aacaatcttc aggtaccaat gttatctcaa   2040
ccaaattaaa accagaattc aaattcgttt ttttgtttct ttatttaata aaaatagact   2100
ttaatatata tatgtttgga tgcatggtaa agaaaatatt tattgaatag accatggttt   2160
aaattcaaat tacaagtttg attggctatc gttttaatag tttttcctct tataattaac   2220
tcttccttta atagttattc aaagagattt caaccaaatt aatacacaga tttcttcaat   2280
gaaacagtat gatcgatctc taacaagatt gtaatgattg atgaaccatg ttattattag   2340
ttaaaataaa attggagtca aagatatgtg tatttgctgt gaacatttat cttgaatacg   2400
gcagtcaaac catttttat caatttcatt ttttgtttt acgtatgcaa atctttgttg   2460
actccaaata tgaatgcaga tgcacatgtg gggccacggt tcacagtaca ggaaaggacc   2520
agattcactt aaagggacgc agccacgagc catgctaggg atcccttgtt actgctgcgt   2580
cgaaggctgt aagaaccaca ttgaccatcc tcgctccaag ccgctcaaag actttcgaac   2640
gctccaaacg cactacaaac gcaaacacgg ccaaaagccc tatgcgtgtc gcatctgcgg   2700
taagcttttg gctgtcaaag gtgattggcg tacgcatgag aagaattgcg ggaaacggtg   2760
ggtttgcgtt tgcggttccg attttaaaca caaacgctcc ctgaaggatc acgttaaagc   2820
ttttgggcct ggtcatgggt cttatccgac cggtttgttt gatgagcagg cctctaattc   2880
ttctgtcttt gaaagtttgt tctgtgtgat cggtgagtat tagagtaact gagaggaatg   2940
taactgagag aaaaaagaaa agtaataatt aaaataattg aaaataataa gtaagagcat   3000
ctagatagtc cttaccaaaa aaaagatcat ctagatagtc tttccatagt atctgattta   3060
tataatacta atataatgta tttatataat taaattataa attaataaag agatgaacca   3120
attcttaaca gacatttgcc tagagacata tctttattct taacaaacat ttggctagaa   3180
acatatctaa tagtttcttg tttcaaaaat gtcttcgctt tttttctgtt tttctccctt   3240
cctttttcct tatttttttt atttttctta ttcactaaat atactcccat aatatctgct   3300
atataatatt aatataatat atttatataa ttaaattaaa aattcataaa gagatgaacc   3360
aattcttaat agatatttgg ctaaatacat atttaatatt tttttgtttg aaagatatct   3420
ttgctatttt tttctgtttc cttctcttct tttcttctta tatttcttat ttttttttatt   3480
caataaatat attttaaaaa acaccaattt tcttataaga atatctgaaa ataattgaga   3540
ataattaaat taaatatttt cttttagtaa aacttataat tatatatatg ctaaaaagat   3600
atgtgatatt tattattcta tctttaaaga ttttttttatc gtgaatcact attttcagtt   3660
atccaaccta aaatgaatac tcagagagca accacatcga aagtgttaga gattgaatga   3720
atacagttct taaaaggttt atttcacatt aatgaagtct atcaaaacaa aatttatcta   3780
attacatctc tataacaaaa atgataattc taaagttaaa tgaaaaaaaa aaacaaaaaa   3840
atagagagaa tttttcttta aaaaaaagat aagaaagatc aataaaaccg acttcctcac   3900
attataaata gaaaagtctt cat                                           3923
```

<210> SEQ ID NO 33
<211> LENGTH: 1707
<212> TYPE: DNA
<213> ORGANISM: Thlaspi arvense

<400> SEQUENCE: 33

```
atgtcacaat attccttctt ctatttcttc ctaatctctc ttttcctcta cgaaaattgc     60
attgcgtatc gctacacatt cacggttatt gaagctccat atagcaaact gtgtagcacg    120
aagaagattt tgaccgttaa tggtcagttt cctggaccag tgttaagggc ttacaaaggt    180
gacaccattt acgttaacgt tcgtaaccaa gctagtgaaa atatcacatt gcattggcat    240
ggtgtagagc agccgagaaa cccgtggtca gatggacccg aatacatcac acaatgcccg    300
attcaacccg ggtcagattt tacgtacaaa attttacttt ccatcgaaga cgcgactgtt    360
tggtggcatg cgcatagctc gtggacacgt gccaccgtac acggtctgat tttcgtgtat    420
cctcggcctc ctgataccct gccttttcca gaaccggact acgaagtccc cttagttttt    480
ggagagtggt ggaagaggga tgtgagagaa gtagtggagg atttcatgag gaacggaggt    540
gaacctaatg tgtccgatgc tttgactatc aatgggcatc ctggtttctt gtatccttgc    600
tctcaatcag atacattcaa gctcgtggta gagaagggca aaacctaccg cattcggatg    660
gtaaacgccg cgatgaacct aattctcttc ttcgccatcg cgaaccacaa actcaccgtg    720
gtcgccgccg atggccacta caccaaacct ctaaccgcta gttatatcac catatctcct    780
ggccaaacgc tagacctgtt actatacgcc gaccaaagtc cagagagcac ttataacatg    840
gcggccagag cttaccatag caaccccaac gttgggttca acaactctac caccgtcggg    900
atcttacgtt actactcttc aaacgacgcc ggaacgtctt catcagaacg ttacccgtac    960
cttcctggct acaatgacac ctcagcagct ttcgatttct tcacaaaaat caaaggctta   1020
tactccagag tagctcccgc caaagtttca cgtaggataa tcacgacggt ttcgataaat   1080
ctcctcaagt gtcccaacga ctcgtgtgca ggcccaaacg ggtcgaggtt agcggcgagt   1140
atgaacaaca tatcgttcgt cacaccgagc cacgtggaca tactaagagc ttattacctt   1200
cacattaacg gcgtttacgg aacgcggttt ccggagttcc caccgcggat attcaatttc   1260
acagcggacg accaaccgct gtttttgcag actccgaggc tggcgacgga ggtaaagaag   1320
tttcagtacg ggagacggt tgagattgtt atacaaggga cgagtttggt aggtggtgga   1380
atcgatcatc ctatgcatct ccatggtttt agcttctacg tggttggttt agggtttggg   1440
aattttaacg cacgtaaaga tccctccaac tataatctag acgatcctcc ttacagaaac   1500
acggcgactg tgcccaggaa cggttggatc gctatcagat tcgtagctga caatccaggg   1560
gtttggttca tgcactgtca ctttgataga catcaaacgt ggggtatgaa tgttgtcttc   1620
attgttaaga atggaataaa accaaatcag aagattctac ctccaccgcc tggcttacca   1680
ccttgtgacc aatttgagaa tctataa                                       1707
```

<210> SEQ ID NO 34
<211> LENGTH: 568
<212> TYPE: PRT
<213> ORGANISM: Thlaspi arvense

<400> SEQUENCE: 34

```
Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30
```

```
Pro Tyr Ser Lys Leu Cys Ser Thr Lys Lys Ile Leu Thr Val Asn Gly
        35                  40                  45

Gln Phe Pro Gly Pro Val Leu Arg Ala Tyr Lys Gly Asp Thr Ile Tyr
    50                  55                  60

Val Asn Val Arg Asn Gln Ala Ser Glu Asn Ile Thr Leu His Trp His
65                  70                  75                  80

Gly Val Glu Gln Pro Arg Asn Pro Trp Ser Asp Gly Pro Glu Tyr Ile
                85                  90                  95

Thr Gln Cys Pro Ile Gln Pro Gly Ser Asp Phe Thr Tyr Lys Ile Leu
            100                 105                 110

Leu Ser Ile Glu Asp Ala Thr Val Trp Trp His Ala His Ser Ser Trp
        115                 120                 125

Thr Arg Ala Thr Val His Gly Leu Ile Phe Val Tyr Pro Arg Pro Pro
    130                 135                 140

Asp Thr Leu Pro Phe Pro Glu Pro Asp Tyr Glu Val Pro Leu Val Phe
145                 150                 155                 160

Gly Glu Trp Trp Lys Arg Asp Val Arg Glu Val Val Glu Asp Phe Met
                165                 170                 175

Arg Asn Gly Gly Glu Pro Asn Val Ser Asp Ala Leu Thr Ile Asn Gly
            180                 185                 190

His Pro Gly Phe Leu Tyr Pro Cys Ser Gln Ser Asp Thr Phe Lys Leu
        195                 200                 205

Val Val Glu Lys Gly Lys Thr Tyr Arg Ile Arg Met Val Asn Ala Ala
    210                 215                 220

Met Asn Leu Ile Leu Phe Phe Ala Ile Ala Asn His Lys Leu Thr Val
225                 230                 235                 240

Val Ala Ala Asp Gly His Tyr Thr Lys Pro Leu Thr Ala Ser Tyr Ile
                245                 250                 255

Thr Ile Ser Pro Gly Gln Thr Leu Asp Leu Leu Leu Tyr Ala Asp Gln
            260                 265                 270

Ser Pro Glu Ser Thr Tyr Asn Met Ala Ala Arg Ala Tyr His Ser Asn
        275                 280                 285

Pro Asn Val Gly Phe Asn Asn Ser Thr Thr Val Gly Ile Leu Arg Tyr
    290                 295                 300

Tyr Ser Ser Asn Asp Ala Gly Thr Ser Ser Ser Glu Arg Tyr Pro Tyr
305                 310                 315                 320

Leu Pro Gly Tyr Asn Asp Thr Ser Ala Ala Phe Asp Phe Phe Thr Lys
                325                 330                 335

Ile Lys Gly Leu Tyr Ser Arg Val Ala Pro Ala Lys Val Ser Arg Arg
            340                 345                 350

Ile Ile Thr Thr Val Ser Ile Asn Leu Leu Lys Cys Pro Asn Asp Ser
        355                 360                 365

Cys Ala Gly Pro Asn Gly Ser Arg Leu Ala Ala Ser Met Asn Asn Ile
    370                 375                 380

Ser Phe Val Thr Pro Ser His Val Asp Ile Leu Arg Ala Tyr Tyr Leu
385                 390                 395                 400

His Ile Asn Gly Val Tyr Gly Thr Arg Phe Pro Glu Phe Pro Pro Arg
                405                 410                 415

Ile Phe Asn Phe Thr Ala Asp Asp Gln Pro Leu Phe Leu Gln Thr Pro
            420                 425                 430

Arg Leu Ala Thr Glu Val Lys Lys Phe Gln Tyr Gly Glu Thr Val Glu
        435                 440                 445
```

```
Ile Val Ile Gln Gly Thr Ser Leu Val Gly Gly Gly Ile Asp His Pro
    450                 455                 460

Met His Leu His Gly Phe Ser Phe Tyr Val Val Gly Leu Gly Phe Gly
465                 470                 475                 480

Asn Phe Asn Ala Arg Lys Asp Pro Ser Asn Tyr Asn Leu Asp Asp Pro
                485                 490                 495

Pro Tyr Arg Asn Thr Ala Thr Val Pro Arg Asn Gly Trp Ile Ala Ile
            500                 505                 510

Arg Phe Val Ala Asp Asn Pro Gly Val Trp Phe Met His Cys His Phe
        515                 520                 525

Asp Arg His Gln Thr Trp Gly Met Asn Val Val Phe Ile Val Lys Asn
    530                 535                 540

Gly Ile Lys Pro Asn Gln Lys Ile Leu Pro Pro Pro Pro Gly Leu Pro
545                 550                 555                 560

Pro Cys Asp Gln Phe Glu Asn Leu
                565
```

<210> SEQ ID NO 35
<211> LENGTH: 5054
<212> TYPE: DNA
<213> ORGANISM: Thlaspi arvense

<400> SEQUENCE: 35

```
catgcacgta agaaactaaa tcaacacata aggtaacgag gctcggaata gttgggtttc      60

ggatttttat ttttaaaaag aaagcatcac ctaaccaaaa ctcataaggg catctccata     120

ttaaaaaata caaattaata gaatggaaaa agaaagatag agacgtatct cgtttgaact     180

ttgaaatatg tttagcaacg tatctaatta agtgtcatat tctgattagt ttatattatt     240

tttagatact ctatttaaga tatgcaccgt taaaggtgtt ctaaagcatc ttcatttact     300

ctgatagtat atccaaaact tattataata atataattta tttgtgtaat aaaatattaa     360

attattaaaa gtgtgatgca tatattaaaa atgacagata ttgagaaaca tatctcatgt     420

catgctcttt tctttgaaaa acagttcgta atttctctca ttctctctct ttctttctaa     480

ttaatttttt tattatccag atattctctg aaataccgtt gttgcaaata cttttagaac     540

acctttaaca gtgtataatc tcaaatagaa tatctaagat ttttttttat taatataaaa     600

aaattaaact aactaatact tgacacttgg tcagatacat ttctagatag gattctctat     660

ctctctccat cctttccatt attttgtaca ttttaattat tataaattgg tcatatatga     720

ctttcagata ttattctcga attttccatc acttaccaac atttgttaaa ataattttcc     780

gtttaaaata gtttaatagt atatattaac aggttacagg tatgaaaatg actttagtat     840

gagataggga gtcgagagtt tttaaaatat tcgaatactt tagacttctc aaattaccca     900

tttaaaaata ttcaataact tagacttctc gcattaccca aaataccaaa tttgtctgaa     960

accaagctat atctgaattc ttttgtcctg tattttaatt actatacttc gaacagtata    1020

ttcagatatc tgaacaattc gttctcacct cttaccttct attactggtt tcaatactcg    1080

aaataaatgc tattgctaaa aagtctgttt gttactttta cactataaat ttagaatgtt    1140

atttccctta agttgaaagt tacgtttgac cgagagatgt caagtatttt caagagtatt    1200

acgattcttt tcagacatag atattctaat taacttttaa agcttacgat acgaagacag    1260

gatttgtgta tgaacatcga tggcataaca acatatcttg aatcttgtcc accagagtta    1320

tctggggggc agttttgaaa atataaaaga tctgtaaggt taataaaaaa aacattatct    1380

tgtaattccg tagttcttat atcgaaactg ttactaattt gagaaagacg tggagagcta    1440
```

```
gaggcgtcta taaatatata ttcctctctc agaaatcata atatacctaa tttattaaaa   1500
aagtctctca aaatgtcaca atattccttc ttctatttct tcctaatctc tcttttcctc   1560
tacgaaaatt gcattgcgta tcgctacaca ttcacggtga gttcaaaatt aattaatcaa   1620
tttagtcagg cgtgagtaaa ctaacttaaa actgatggta tataggttat tgaagctcca   1680
tatagcaaac tgtgtagcac gaagaagatt ttgaccgtta atggtcagtt tcctggacca   1740
gtgttaaggg cttacaaagg tgacaccatt tacgttaacg ttcgtaacca agctagtgaa   1800
aatatcacat tgcattggta tttcatccaa aacccttttt ttcgtcttct taattatgta   1860
accattttaa atacaagaac ataaacgaaa tttcgatggt tgaataaaaa caggcatggt   1920
gtagagcagc cgagaaaccc gtggtcagat ggacccgaat acatcacaca atgcccgatt   1980
caacccgggt cagattttac gtacaaaatt ttactttcca tcgaagacgc gactgtttgg   2040
tggcatgcgc atagctcgtg gacacgtgcc accgtacacg gtctgatttt cgtgtatcct   2100
cggcctcctg ataccctgcc ttttccagaa ccggactacg aagtcccctt agtttttggt   2160
acaaaccagg acatataaca aaagatcagt gaagttgctt ttttttttt ttttttttt   2220
atctctctta aattaaaatt aatttcataa aaacttgaca ggagagtggt ggaagaggga   2280
tgtgagagaa gtagtggagg atttcatgag gaacggaggt gaacctaatg tgtccgatgc   2340
tttgactatc aatgggcatc ctggtttctt gtatccttgc tctcaatcag gtttctttta   2400
ctttttccct ttctcctatt aatttcttat tttgttttta atatacagtt gtgggataaa   2460
aactaattgt ggagatgaaa taaaatttag ggatattgat cattgaaaca aattgtgaaa   2520
tgattcaaac gagcattttt tttttcaagt caactgtttt taatttgttt ttcctcgttt   2580
tttcaaaagt ttcttactaa tttagttagt taaacataat taatgtttga tcaaattgtc   2640
caaaaattag ttaagaactt acgagtggtt gataaaaaaa aaatcacgag gcatattaat   2700
tcaaaccaaa atagttgtgt ttgtatttat tagttcttaa aaattgtgct cataaatttg   2760
aaactagcat ttgcatgcat atttatgttt aaaacctagt tagtaaagtc cgttattgac   2820
atgcatacgt tacgtatacg tatgtttaac agatacattc aagctcgtgg tagagaaggg   2880
caaaacctac cgcattcgga tggtaaacgc cgcgatgaac ctaattctct tcttcgccat   2940
cgcgaaccac aaactcaccg tggtcgccgc cgatggccac tacaccaaac ctctaaccgc   3000
tagttatatc accatatctc ctggccaaac gctagacctg ttactatacg ccgaccaaag   3060
tccagagagc acttataaca tggcggccag agcttaccat agcaacccca acgttgggtt   3120
caacaactct accaccgtcg ggatcttacg ttactactct tcaaacgacg ccggaacgtc   3180
ttcatcagaa cgttacccgt accttcctgg ctacaatgac acctcagcag ctttcgattt   3240
cttcacaaaa atcaaaggct tatactccag agtagctccc gccaaagttt cacgtaggat   3300
aatcacgacg gtttcgataa atctcctcaa gtgtcccaac gactcgtgtg caggcccaaa   3360
cgggtcgagg ttagcggcga gtatgaacaa catatcgttc gtcacaccga gccacgtgga   3420
catactaaga gcttattacc ttcacattaa cggcgtttac ggaacgcggt ttccggagtt   3480
cccaccgcgg atattcaatt tcacagcgga cgaccaaccg ctgtttttgc agactccgag   3540
gctggcgacg gaggtaaaga agtttcagta cggggagacg gttgagattg ttatacaagg   3600
gacgagtttg gtaggtggtg gaatcgatca tcctatgcat ctccatggtt ttagcttcta   3660
cgtggttggt ttagggtttg ggaattttaa cgcacgtaaa gatccctcca actataatct   3720
agacgatcct ccttacagaa acacggcgac tgtgcccagg aacggttgga tcgctatcag   3780
```

attcgtagct gacaatccag gtacgtacac ttacataaac ctctaacttt gatttggttc 3840
aaatctcttt ttaatatttt gtgtttttgt aggggtttgg ttcatgcact gtcactttga 3900
tagacatcaa acgtggggta tgaatgttgt cttcattgtt aagaatggaa taaaaccaaa 3960
tcagaagatt ctacctccac cgcctggctt accaccttgt gaccaatttg agaatctata 4020
aatgatttta tagcatgttg cagtattgtg tttgatgtaa taaactactg catatttaca 4080
aaaaaaaata taatcttaaa ttttgttttt atttaattaa ttttcacaag tttttctatc 4140
gtagcagtca taataaggaa agatactccc aagacaaaac agtgtctgaa gtcattattt 4200
taaccctgag cctttctttc tcataaatatc ttcaaaagct atagatgtgg tgaagtttac 4260
ctcgctcaca ctgataagtc catgtcttgt accatatcat cataatcttg agggacctct 4320
gcgtgatgga aacgccctgt gcaagtggag tgatgcatct gtgtaatgtg actctgttga 4380
agtgctatag ccttgtggct tctactccag tctcttcggc tccaaaggta taacggtggc 4440
ggcatattgt tccactgctc tatcgtttga tcatttacat ctatcgatcc aggcaagtag 4500
aacgactaca gagcaaaaaa acaaaggaat gtgattgaaa tgtattggtt atactaaacg 4560
agagtttgat tcattagtga acgtacttac catgccagaa agtaatctcg tgtcttccca 4620
aatcaagtca tactcagcta tctcgtcgac cctgtgattg tagaggaaaa caaaggttat 4680
gaaaagtttg taactgacac tctatatttg ctatttacct ttttgtttca cttggtacga 4740
tgaggattag aatcttgggt ctaaactcga gggccttcct gatgaaaatg ttagcaagac 4800
tggatttgta accgaaaggc gggtttaatc ccattatctg tttttactca cgaccaagta 4860
atatctcagt tagtgaattc aaaaagtgta tttcaccttt aggatgttgg ttgcgttttt 4920
taccagtcga gagccatcgg gtaactcttg tttcttcaca ctcaaccaat ctctcttctc 4980
aaagttgaag ttatactgcc atggaaacat agtgtttcag aaacatcttc aaacacaaca 5040
ataaaagagt agtg 5054

<210> SEQ ID NO 36
<211> LENGTH: 1524
<212> TYPE: DNA
<213> ORGANISM: Thlaspi arvense

<400> SEQUENCE: 36
atgagctcca cggagacata tgagcctcta ttgagacggc tccactcaga ttctcagtta 60
accgtaggtt cttcaccgga gatagaggag tttctcggcc gtcgtagatc cacggtgacg 120
ccacggtggt ggctaaggct ggccgtatgg gaatcaaagc ttctttggac gctctctgga 180
gcctccatag tggtctctgt gctgaattac atgctcagct tcgtcaccgt tatgttcatc 240
ggccatcttg gctctcttca gctcgccggc gcatccatcg ccaccgtcgg tatccaaggc 300
ctcgcttacg gtatcatgtt gggaatggcg agcgcggtcc agacagtgtg tggtcaagcg 360
tacggcgcga ggcagtactc atcaatggga ataatttgcc aacgagccat ggtcttgcac 420
ctcgcagctg cggtcctcct cacgttcctc tactggtact cgggtccgat cctaaaggcg 480
atgggccaat ccgcagccat cgcacgcgag ggtcaggtct ttgcacgtgg gattattccg 540
cagatttatg cttttgccct cgcttgccct atgcagaggt tcctccaggc tcaaaaaatt 600
gtaaaccctt tggcttacat gtcactagga gttttcgtgc tacacacgct actaacctgg 660
ctggtaacca acgtcctgca tttcggcttg ctcggtgcag ctctggtgct gagtttttcg 720
tggtggcttc tcgcggctgt gaatggtctg tatatcgtga tgagcccgag ttgcaaggaa 780
acttggaccg ggttctcagc tagggcttta agagggattt ggccttactt caagctcacg 840

```
atagcttcag cagtcatgct atgtttggag atatggtacg tccaagggct agtgattatt    900

tccggtttac tcaccaatcc cacaattgcc ctagacgcaa tttcgatttg catgtattac    960

tggaattggg atatgcagtt catgcttggt ctaagtgcgg caatcactgt ccgagtgagc   1020

aacgagctag gagcgggaaa cccacgagtg gctaagttat cagtggtagt ggttaacatc   1080

acgacggttg tcatcagctt attcctctgt gtcgttgtgc tcgtgttccg cattggcctt   1140

agtaaagcct tcaccagcga cgcagaggtt atagctgcag tctctgatct ctttcccctg   1200

ctcgccgttt ccattttctt aaacggaatc caaccaattc tctctggtgt tgccattgga   1260

agtgggtggc aagcagtggt ggcttatgtg aatcttgtta cttactatgt cattggtctt   1320

cctattggct gtgttcttgg cttcaaaacc agtcttggag ttgcggggat ctggtggggg   1380

atgattgcag gagttatact tcaaacccta actttgattg ttcttacact cagaactaac   1440

tggaattccg aggtggagaa tgcagctcat aggttaaaag cttcagcaaa tgagagtcaa   1500

gaaatggcta ccgaaggaat ctaa                                          1524


<210> SEQ ID NO 37
<211> LENGTH: 507
<212> TYPE: PRT
<213> ORGANISM: Thlaspi arvense

<400> SEQUENCE: 37

Met Ser Ser Thr Glu Thr Tyr Glu Pro Leu Leu Arg Arg Leu His Ser
1               5                   10                  15

Asp Ser Gln Leu Thr Val Gly Ser Ser Pro Glu Ile Glu Glu Phe Leu
            20                  25                  30

Gly Arg Arg Arg Ser Thr Val Thr Pro Arg Trp Trp Leu Arg Leu Ala
        35                  40                  45

Val Trp Glu Ser Lys Leu Leu Trp Thr Leu Ser Gly Ala Ser Ile Val
    50                  55                  60

Val Ser Val Leu Asn Tyr Met Leu Ser Phe Val Thr Val Met Phe Ile
65                  70                  75                  80

Gly His Leu Gly Ser Leu Gln Leu Ala Gly Ala Ser Ile Ala Thr Val
                85                  90                  95

Gly Ile Gln Gly Leu Ala Tyr Gly Ile Met Leu Gly Met Ala Ser Ala
            100                 105                 110

Val Gln Thr Val Cys Gly Gln Ala Tyr Gly Ala Arg Gln Tyr Ser Ser
        115                 120                 125

Met Gly Ile Ile Cys Gln Arg Ala Met Val Leu His Leu Ala Ala Ala
    130                 135                 140

Val Leu Leu Thr Phe Leu Tyr Trp Tyr Ser Gly Pro Ile Leu Lys Ala
145                 150                 155                 160

Met Gly Gln Ser Ala Ala Ile Ala Arg Glu Gly Gln Val Phe Ala Arg
                165                 170                 175

Gly Ile Ile Pro Gln Ile Tyr Ala Phe Ala Leu Ala Cys Pro Met Gln
            180                 185                 190

Arg Phe Leu Gln Ala Gln Lys Ile Val Asn Pro Leu Ala Tyr Met Ser
        195                 200                 205

Leu Gly Val Phe Val Leu His Thr Leu Leu Thr Trp Leu Val Thr Asn
    210                 215                 220

Val Leu His Phe Gly Leu Leu Gly Ala Ala Leu Val Leu Ser Phe Ser
225                 230                 235                 240

Trp Trp Leu Leu Ala Ala Val Asn Gly Leu Tyr Ile Val Met Ser Pro
```

```
                245                 250                 255

Ser Cys Lys Glu Thr Trp Thr Gly Phe Ser Ala Arg Ala Leu Arg Gly
            260                 265                 270

Ile Trp Pro Tyr Phe Lys Leu Thr Ile Ala Ser Ala Val Met Leu Cys
        275                 280                 285

Leu Glu Ile Trp Tyr Val Gln Gly Leu Val Ile Ile Ser Gly Leu Leu
    290                 295                 300

Thr Asn Pro Thr Ile Ala Leu Asp Ala Ile Ser Ile Cys Met Tyr Tyr
305                 310                 315                 320

Trp Asn Trp Asp Met Gln Phe Met Leu Gly Leu Ser Ala Ala Ile Thr
                325                 330                 335

Val Arg Val Ser Asn Glu Leu Gly Ala Gly Asn Pro Arg Val Ala Lys
            340                 345                 350

Leu Ser Val Val Val Val Asn Ile Thr Thr Val Val Ile Ser Leu Phe
        355                 360                 365

Leu Cys Val Val Val Leu Val Phe Arg Ile Gly Leu Ser Lys Ala Phe
    370                 375                 380

Thr Ser Asp Ala Glu Val Ile Ala Ala Val Ser Asp Leu Phe Pro Leu
385                 390                 395                 400

Leu Ala Val Ser Ile Phe Leu Asn Gly Ile Gln Pro Ile Leu Ser Gly
                405                 410                 415

Val Ala Ile Gly Ser Gly Trp Gln Ala Val Val Ala Tyr Val Asn Leu
            420                 425                 430

Val Thr Tyr Tyr Val Ile Gly Leu Pro Ile Gly Cys Val Leu Gly Phe
        435                 440                 445

Lys Thr Ser Leu Gly Val Ala Gly Ile Trp Trp Gly Met Ile Ala Gly
    450                 455                 460

Val Ile Leu Gln Thr Leu Thr Leu Ile Val Leu Thr Leu Arg Thr Asn
465                 470                 475                 480

Trp Asn Ser Glu Val Glu Asn Ala Ala His Arg Leu Lys Ala Ser Ala
                485                 490                 495

Asn Glu Ser Gln Glu Met Ala Thr Glu Gly Ile
            500                 505
```

<210> SEQ ID NO 38
<211> LENGTH: 4858
<212> TYPE: DNA
<213> ORGANISM: Thlaspi arvense

<400> SEQUENCE: 38

```
accgtttctt tttgttgcgt gtcgagaata atagtcatct atgtgtttta tatatagaga      60

gtcatagact atagaaaaaa tgttataaga ggacaaaatt tcaataaatt gaattagttt     120

aaatttgatc aacaattttt ttatcatctt atttaattct tagatgatta tagtaaacaa     180

ctaagatatc ccagtatcaa tatattcatg cataaataga atgaaattgt attggggggg     240

gggggaata tacattattt aattatatag attgtcatca agtaattaaa taaaatacca      300

aaatgacatt aaccataaca aagtgaatat gctgctgcat atttgtaaga aatcaaaaga     360

aactttgcag catataatta ctcgatgact aatacaagta tattgtgttg aaatttgatg     420

tagtgtggaa tagttaagat tatttagaaa ataaaaccac ttttaataat tacctgaaaa     480

tgagtaataa tcttctaatt tggtggggcc atccgaccta atagacaact cattgatttc     540

atcttacgtc agggacagtt cataaaatgc aaataattgt cttttttttt ggtaatgatt     600

gtctttaatc tttattttgt agattaacag attatattat tcctttttct ttcttactgt     660
```

tcttcagatt atttggatgg tttcagttgg gcctcaggag cagaccggta aatgggttgg 720
aggactattg gtgggccaca tttctgaaaa gcatttcttc ctctcaaaag ctcattatta 780
tgagtatctt tttatacggt agaaaggagt acataagtgg taacataaaa tatattctgc 840
caaaaaagtt agttgattct tcttaatcac tactcctttt cttgataatt atctacgtgg 900
gaaacactat ttgtcctccc cccatttaat ttggttgaaa gtcttgagac tagaggttgg 960
ctcaatccaa aatcgttgac gaacgttagg tatcgttatc aactacaact cttttttca 1020
ctgaggtacc gttatattta tatacctacc tagttttact cttgtgcaca aggatatttc 1080
ggttcggttt gatatctttc tcgatcttga agaaatatta ccaatttgga gcttatacat 1140
tcctcggtct ggtatcattc aacaaagttt ttggtttggt ttgtttaaca aataatatga 1200
atgtgtgttt agtcgtccct taggtatttc tcaatctctt tcttttaagc ttcactttct 1260
taataagcca ttaagtaacg taactagaga atggttgtta cactatacac taacaaaaat 1320
cagaccaaac agtcatgaaa gatcttaacc atcaattccg tttcggtcaa cgactcgaac 1380
cctcagcata accaaaacaa acagtcgtaa tataaacacg cccggtctat aactataaca 1440
aaataacggc aaaagaaaga aaatacgaga aaaagaagaa gacgaacaaa caaacggacc 1500
atgagctcca cggagacata tgagcctcta ttgagacggc tccactcaga ttctcagtta 1560
accgtaggtt cttcaccgga gatagaggag tttctcggcc gtcgtagatc cacggtgacg 1620
ccacggtggt ggctaaggct ggccgtatgg gaatcaaagc ttctttggac gctctctgga 1680
gcctccatag tggtctctgt gctgaattac atgctcagct tcgtcaccgt tatgttcatc 1740
ggccatcttg gctctcttca gctcgccggc gcatccatcg ccaccgtcgg tatccaaggc 1800
ctcgcttacg gtatcatggt atgtgcttta gagagtaaac gacgttgacg tcgttcgatg 1860
ttatagcttc acattcattt gcttatcatt ttgtaatata gtaaatccgg gttttgaatt 1920
aggtttctca atattttgac cattttatga ataccagcaa ccataataaa aatacaaact 1980
gtcggatcag ttttgttctc catttgagat ccgattttgg tctttcagat gcaaaccata 2040
ttaggataca gttcggtttt catgtcggct attttggtcc ggtttatcat ttttgatcaa 2100
tcttagcctt aggcatctcc caactgtttt tatgtatcaa atgtactagt tgggaatggc 2160
gagcgcggtc cagacagtgt gtggtcaagc gtacggcgcg aggcagtact catcaatggg 2220
aataatttgc caacgagcca tggtcttgca cctcgcagct gcggtcctcc tcacgttcct 2280
ctactggtac tcgggtccga tcctaaaggc gatgggccaa tccgcagcca tcgcacgcga 2340
gggtcaggtc tttgcacgtg ggattattcc gcagatttat gcttttgccc tcgcttgccc 2400
tatgcagagg ttcctccagg ctcaaaaaat tgtaaaccct ttggcttaca tgtcactagg 2460
agttttcgtg ctacacacgc tactaacctg gctggtaacc aacgtcctgc atttcggctt 2520
gctcggtgca gctctggtgc tgagtttttc gtggtggctt ctcgcggctg tgaatggtct 2580
gtatatcgtg atgagcccga gttgcaagga aacttggacc gggttctcag ctagggcttt 2640
aagagggatt tggccttact tcaagctcac gatagcttca gcagtcatgc tatggtaaat 2700
gtctttaatc taaacacaaa tctgtatgat ttgaccggtt aaaatttatg gtttgaagaa 2760
agctgatata taccaattta aaatgaaata tctgcagttt ggagatatgg tacgtccaag 2820
ggctagtgat tatttccggt ttactcacca atcccacaat tgccctagac gcaatttcga 2880
tttggtactc ctttcacccg agatttatca tatgccgacg aacctcaacg gttacgtctt 2940
aacccggtta agtgattttg cagcatgtat tactggaatt gggatatgca gttcatgctt 3000

-continued

```
ggtctaagtg cggcaatcac gtaacaaaac aaaattaaaa atggcatgta gtttttaatt   3060
taaatgatcc atttgcaaaa accgtgccgt ttttgtgtgt tttgtgttag tgtccgagtg   3120
agcaacgagc taggagcggg aaacccacga gtggctaagt tatcagtggt agtggttaac   3180
atcacgacgg ttgtcatcag cttattcctc tgtgtcgttg tgctcgtgtt ccgcattggc   3240
cttagtaaag ccttcaccag cgacgcagag gttatagctg cagtctctga tctctttccc   3300
ctgctcgccg tttccatttt cttaaacgga atccaaccaa ttctctctgg taaaaacaca   3360
cacaagaaaa agaggctctt ttgtgaattt tggtttgttg attgatcttt gctctatgga   3420
ttcaaaggtg ttgccattgg aagtgggtgg caagcagtgg tggcttatgt gaatcttgtt   3480
acttactatg tcattggtct tcctattggc tgtgttcttg gcttcaaaac cagtcttgga   3540
gttgcggtat aatctctttt actctttctt tgtgtttata tgtattgtat gcatcataag   3600
agatgggagg tatttcatta caggggatct ggtgggggat gattgcagga gttatacttc   3660
aaaccctaac tttgattgtt cttacactca gaactaactg gaattccgag gtaaaacaat   3720
caccaaatct ctcttttttt ctctaaatac tccaaagtcc ttacctttac tctgcatctc   3780
ttacaggtgg agaatgcagc tcataggtta aaagcttcag caaatgagag tcaagaaatg   3840
gctaccgaag gaatctaaca gcaactctgt tcttttctcc tctcttttgt tggcaagaga   3900
tatgaaataa ataccttctg tttattagga ttcagtaaca tatttcattt cgttaaacta   3960
cagacaaaaa ataatggaca aactacttaa tcctcttctg caaaatcttt cttctgcctt   4020
tagatgatta caaaaatcaa aactttctcg ttgttttcat aaccccacaa gtttttccgt   4080
ctgtgagcta acataagcca aagacttttc ttgtgtttta tcatacaaca cagtttctct   4140
tgcatcatca tcaccatctc cttcatagtc ctcctcatcc tcatcctcat cctcatcatc   4200
actactcaca tcgacatcat catcatcatc atcatcatca tcagatctgt agactccagc   4260
aatgatggtt gtagtctcat ctctgagacc agtaagttct ttagcttcct ctagctcatc   4320
ttgagttgaa gccaatgaca aaagcacatt cttcgctttc tgatcaggtg gtaccccaca   4380
actctccatc tccttgtacc aactaagagc gctcccgaaa tccttgcacc tcccagacgc   4440
atccatgata gtcgttatga tggtttgatt cgctttgatg ccacttaacc tcattttctc   4500
atatacctcc ataattttat caagatcgtt tgctttcgca tagcctttta tcattgtccc   4560
ataggtgact atattcggct caaaaccatc tacctttatc ctcttgaaga atttctcagc   4620
accctccatg tccgaagcat tcacatacgc tgataacata gttgtgtaag accagagatc   4680
cgggaaaaat ctgcaaaggg aattatgttt tgttaccaat ctaaaacaga gaagcaacac   4740
agttcacatg atagaattat tctttacctg tcacgtcgca tgctttgaaa aacggtcttt   4800
gcttgatcca ccattccaga aatagcgaat gcatcaagca aaatgttata agctttat     4858
```

<210> SEQ ID NO 39
<211> LENGTH: 2214
<212> TYPE: DNA
<213> ORGANISM: Thlaspi arvense

<400> SEQUENCE: 39

```
atgcttccat taatggcgat accacttgcg acttgcagga gcatcaactg gtcagccacg     60
gaaaggattc ctgtttcgct tctgttccgg agtattcttc tccaagacga cgaagtttgt    120
agcgctgtgc cactataccg gatcctcgat cagaatgacg ggcaacttgg tcctataagt    180
atggccgagg aatcagacaa accattgctg gatcctgata ctctcaacag agaaggaatt    240
gacttgggtc tgttgccatt ggaggaggtt tttgaatacc taagaacatc tccacggggg    300
```

```
ctttatctg gagatgctga agaaagattg acgatatttg gtcctaacag ccttgaagag    360
aaacgggaga acaagtttct gaagttccta ggttttatgt ggaatccttt gtcatgggtt    420
atggaagctg cagcattgat ggccatcgcc ctagcagata gtgaagtaga gactatcagt    480
cttttgctat accatttctg ctcagtgctg accggagaat cgctacctgt gaccaagaag    540
aagggtgagc aagtcttctc tggctctact tgtaagcaag gtgagataga agctgttgtg    600
atagccaccg gttcgagcac tttctttggt aaaacagcat ctttggtgga cagcacagat    660
gcaactggac attttcagca ggttctaagc ttgtgccagc agaaaaatga gattgcgcaa    720
agagtttatg ccatcataaa tagatttgca gaaaaaggtt tgaggtctct tgctgttgct    780
tatcaggaaa ttccagagag aagcagcaac agtcctggag gaccatggtt gttctgtggt    840
ctgttgccac tgtttgatcc tccaaggcat gacagtgctg aaaccatact gagagctctt    900
aaccttggag tttgtgttaa gatgatcacc ggtgatcagt tggcgattgc aaaggagaca    960
ggaaggcgac ttgggatggg aaccaatatg tatccttctt cctctttgtt aggccacaac   1020
aacgatgatc acgaagccat tccattggat gagcttattg aaatggcaga tggatttgct   1080
ggagtgttcc ctgaacacaa gtatgagatt gtaaagatat tacaagaaaa gaagcatgtg   1140
gttggaatga ccggagatgg tgtgaatgat gctcctgctc tgaaaaaggc tgacattgga   1200
atagctgtcg ctgatgcaac agatgccgca agaagttctg ctgacattgt actaactgag   1260
cctggcttaa gtgtaattat cagtgctgtc ttgaccagca gagccatttt ccagcgtatg   1320
aagaactata cagtatatgc agtctcgatc accatacgaa tagtgctcgg ttttacactt   1380
ttagcgttga tatgggaata cgactttcca cctttcatgg ttttgataat cgcaatactc   1440
aatgacggga ccatcatgac tatctctaaa gatcgagtaa ggccatctcc tacacccgag   1500
agttggaagc tcaaccagat atttgcgact ggaattgtca ttggaacata ccttgcattg   1560
gtcactgtcc tattctactg gatcattgtc tctaccacct tcttcgagaa acacttccat   1620
gtaaaatcaa tcggcaacaa cagtgaacaa gtctcatccg ctctgtatct ccaagtaagc   1680
atcatcagtc aagcactcat atttgtaaca cgtagtcgaa gctggtcttt tcttgaacgt   1740
cccgggactc tcctgatttt cgccttcctt gttgcccaac ttgccgctac attgattgct   1800
gtctatgcca acatcagctt tgctaacatc accggcattg gatggggatg ggcaggtgtt   1860
atatggttat acagtttgat tttttacata cctcttgata ttataaagtt cttcttccac   1920
tacgcattga gtggagatgc ttggaacctt gtatttgacc gtaagacagc atttactaat   1980
aagaaagatt atagaaaaga tgacggagcg tccaatgtaa ccatctctca gagaagtcac   2040
tctgcagaag aactcagtgg aagtcgttct cgcgcatctt ggatcgctga gcagaccaga   2100
aggcgtgcag aaaccgccag gctcttggag ggacactcgg tgtcaaggca tttggaatca   2160
gtaatgaagc tcaaacaaat tgaccccaag atgattcgtg cagacactgt ctaa         2214
```

<210> SEQ ID NO 40
<211> LENGTH: 737
<212> TYPE: PRT
<213> ORGANISM: Thlaspi arvense

<400> SEQUENCE: 40

```
Met Leu Pro Leu Met Ala Ile Pro Leu Ala Thr Cys Arg Ser Ile Asn
1               5                   10                  15

Trp Ser Ala Thr Glu Arg Ile Pro Val Ser Leu Leu Phe Arg Ser Ile
            20                  25                  30
```

```
Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125

Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160

Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Leu Gly Val
    290                 295                 300

Cys Val Lys Met Ile Thr Gly Asp Gln Leu Ala Ile Ala Lys Glu Thr
305                 310                 315                 320

Gly Arg Arg Leu Gly Met Gly Thr Asn Met Tyr Pro Ser Ser Ser Leu
                325                 330                 335

Leu Gly His Asn Asn Asp Asp His Glu Ala Ile Pro Leu Asp Glu Leu
            340                 345                 350

Ile Glu Met Ala Asp Gly Phe Ala Gly Val Phe Pro Glu His Lys Tyr
        355                 360                 365

Glu Ile Val Lys Ile Leu Gln Glu Lys Lys His Val Val Gly Met Thr
    370                 375                 380

Gly Asp Gly Val Asn Asp Ala Pro Ala Leu Lys Lys Ala Asp Ile Gly
385                 390                 395                 400

Ile Ala Val Ala Asp Ala Thr Asp Ala Ala Arg Ser Ser Ala Asp Ile
                405                 410                 415

Val Leu Thr Glu Pro Gly Leu Ser Val Ile Ile Ser Ala Val Leu Thr
            420                 425                 430

Ser Arg Ala Ile Phe Gln Arg Met Lys Asn Tyr Thr Val Tyr Ala Val
        435                 440                 445

Ser Ile Thr Ile Arg Ile Val Leu Gly Phe Thr Leu Leu Ala Leu Ile
```

```
    450                 455                 460

Trp Glu Tyr Asp Phe Pro Pro Phe Met Val Leu Ile Ile Ala Ile Leu
465                 470                 475                 480

Asn Asp Gly Thr Ile Met Thr Ile Ser Lys Asp Arg Val Arg Pro Ser
                485                 490                 495

Pro Thr Pro Glu Ser Trp Lys Leu Asn Gln Ile Phe Ala Thr Gly Ile
            500                 505                 510

Val Ile Gly Thr Tyr Leu Ala Leu Val Thr Val Leu Phe Tyr Trp Ile
        515                 520                 525

Ile Val Ser Thr Thr Phe Phe Glu Lys His Phe His Val Lys Ser Ile
    530                 535                 540

Gly Asn Asn Ser Glu Gln Val Ser Ser Ala Leu Tyr Leu Gln Val Ser
545                 550                 555                 560

Ile Ile Ser Gln Ala Leu Ile Phe Val Thr Arg Ser Arg Ser Trp Ser
                565                 570                 575

Phe Leu Glu Arg Pro Gly Thr Leu Leu Ile Phe Ala Phe Leu Val Ala
            580                 585                 590

Gln Leu Ala Ala Thr Leu Ile Ala Val Tyr Ala Asn Ile Ser Phe Ala
        595                 600                 605

Asn Ile Thr Gly Ile Gly Trp Gly Trp Ala Gly Val Ile Trp Leu Tyr
    610                 615                 620

Ser Leu Ile Phe Tyr Ile Pro Leu Asp Ile Ile Lys Phe Phe Phe His
625                 630                 635                 640

Tyr Ala Leu Ser Gly Asp Ala Trp Asn Leu Val Phe Asp Arg Lys Thr
                645                 650                 655

Ala Phe Thr Asn Lys Lys Asp Tyr Arg Lys Asp Asp Gly Ala Ser Asn
            660                 665                 670

Val Thr Ile Ser Gln Arg Ser His Ser Ala Glu Glu Leu Ser Gly Ser
        675                 680                 685

Arg Ser Arg Ala Ser Trp Ile Ala Glu Gln Thr Arg Arg Ala Glu
    690                 695                 700

Thr Ala Arg Leu Leu Glu Gly His Ser Val Ser Arg His Leu Glu Ser
705                 710                 715                 720

Val Met Lys Leu Lys Gln Ile Asp Pro Lys Met Ile Arg Ala Asp Thr
                725                 730                 735

Val


<210> SEQ ID NO 41
<211> LENGTH: 5382
<212> TYPE: DNA
<213> ORGANISM: Thlaspi arvense

<400> SEQUENCE: 41

atgcttccat taatggcgat accacttgcg acttgcagga gcatcaactg gtcagccacg      60

gaaaggtggt ttcaattttc attcgtggac ccttttttaag gattcctgtt tcgcttctgt    120

tccggagtat tcttctccaa gacgacgaag tttgtagcgc tgtgccacta taccggatcc    180

tcgatcagaa tgacgggcaa cttggtcgta acatagtggt ttaagttcgt gtgtagctcg    240

tactatgttt tgatggtttg ctattacctt agaattttaa ataattatct tatgtacatc    300

gacgaagtta cggtttttgc tattgttcac tagttccaag gtgtggatcg aatctaggaa    360

tgtgggcttt gaagtggtac ttgtaccgtg gattttgaag ctataagtat ggccgaggaa    420

tcagacaaac cattgctgga tcctgatact ctcaacagag aaggaattga cttggtaaat    480
```

-continued

```
gatgtgtggt tcctttactt ttattaaaat tcttggattc tttagtggca aaaatggttt    540
tgacgcttga gctggacagg gtctgttgcc attggaggag gtttttgaat acctaagaac    600
atctccacgg gggcttttat ctggagatgc tgaagaaaga ttgacgatat ttggtcctaa    660
cagccttgaa gagaaacggg taataaaaag cttatcgtca aagtttttcc atagtgttcc    720
tgcctaagac aggagagaag cttactagtt ctgagatctt attcattatg aacactcttc    780
atttcttttt cacatattat ccttaggcca cacactgatt tttctgccaa gttgtggttc    840
tttacattag ctcttgtata atatgttagt gttgtcctaa tgacactgaa aacgaaacga    900
tacaggagaa caagtttctg aagttcctag gttttatgtg gaatcctttg tcatgggtta    960
tggaagctgc agcattgatg gccatcgccc tagcagatag tgaagtagag actatcagtc   1020
ttttgctata ccatttctgc gtacatgaga gtttatgaaa tcgtttctgc tcttgaaact   1080
catggtgaaa aatgtttatt acagagctta ggtcctgact gggaagactt tgttggaatc   1140
gtttgccttt tactgatcaa cgcaacaatc agcttctttg aagaaaacaa tgctgggaat   1200
gctgctggag ctcttatggc tcgcctggct ccaaaaacaa gagtctgctt cttcacctta   1260
tgcattttca ctcttattac cttaaatctg atcaagatcc actcttgata ggttcttaga   1320
gatggacagt ggcaagagca agacgcgtct atcttggtac ctggtgatat tattagcata   1380
aagcttgggg atatcattcc tgcagatgct cgccttcttg aaggagaccc cttgaaaatt   1440
gatcaggcac gcacagatta tatttagcgc taagtcacat ttcttctctc ttagtacatt   1500
atgtaaagac tgtatctgac agaatattcc tgcagtcagt gctgaccgga gaatcgctac   1560
ctgtgaccaa gaagaagggt gagcaagtct tctctggctc tacttgtaag caaggtgaga   1620
tagaagctgt tgtgatagcc accggttcga gcactttctt tggtaaaaca gcatctttgg   1680
tggacagcac agatgcaact ggacattttc agcaggttct ttattgttcc ttaactccct   1740
tttctggttg aaacagtctg actggtaaaa gaccaaacct tgtaaagctg tgaatacctt   1800
tgcaagaaca tgacatgttt ctgtgacatg ttttccttat aggttcttac gtcaattggg   1860
aacttctgca tttgctcaat tgctgttgga atggttcttg aaatcattgt catgttccct   1920
atacaacatc gctcatacag aattgggatc aataaccttc ttgtactact gattggaggg   1980
atacccattg ccatgcccac tgtactatct gtcacgcttg ccattggatc tcatcgactc   2040
tcacaacagg tgtcgtttct cttgactgat taactgtaac agagtgaacc aagaagaatc   2100
caacttttaa gcttctgtag aactttttgt tagcaatata atatgtgttt cttgttgttt   2160
taaaagggtg ccatcacgaa aaggatgacg gcgatagagg aaatggctgg gatggatgtc   2220
ctctgctgtg ataaaactgg aacccttacc ttgaacagtc tcaccgttga tagaaatctt   2280
attgaggtac caaccaatac ttcccatgtg acttgcattt caaagtccaa agagtacagt   2340
taacaacagt tgcctccatc tttacaggtt ttcgatgact acatggacaa ggacacaatt   2400
ttgctgcttg caggcagagc ttcacggtta gaaaaccagg atgccataga tgcagcaatt   2460
gttagcatgc ttgctgatcc gaaagaggtg gagatgtttc ttttacataa actctgtttt   2520
atgaaaatat tgtcatcttc tttagaagtt ttacttatta gaaaaggttg tttatcttta   2580
ggcacgtgca aacattaaag aaattcattt cttgccattc aatcctgtgg acaaacgtac   2640
agcaataaca tatattgact ccgatggaaa atggtatcgc gctagcaaag gagctcccga   2700
acaggtaaca aagaatcacc ctatactact tggcactttc aaaactgact ctagatgtaa   2760
aaaaatgaaa gttcttttat atataggtcc ataaaagata tatcatcact gattcaattc   2820
caactgtact gtatacatag gttctaagct tgtgccagca gaaaaatgag attgcgcaaa   2880
```

gagtttatgc catcataaat agatttgcag aaaaaggttt gaggtctctt gctgttgctt 2940
atcaggtaaa atatttctgt tatccctttt ctctcttgat atggttttta ttgtaagtgt 3000
actatttggg gaagaagctt ataatgacat tagttatact cattcaatca ttttaatcat 3060
tgtttctagg aaattccaga gagaagcagc aacagtcctg gaggaccatg gttgttctgt 3120
ggtctgttgc cactgtttga tcctccaagg catgacagtg ctgaaaccat actgagagct 3180
cttaaccttg gagtttgtgt taagatgatc accggtaatt ctgaacccta gagcaggctt 3240
gcttgggacc acagaggaac agacacgctc tcatggtgaa aatctgataa gtttggataa 3300
aaaaaatgta ggtgatcagt tggcgattgc aaaggagaca ggaaggcgac ttgggatggg 3360
aaccaatatg tatccttctt cctctttgtt aggccacaac aacgatgatc acgaagccat 3420
tccattggat gagcttattg aaatggcaga tggatttgct ggagtgttcc ctggtcatac 3480
tcacaacaca gcgcttatat cttaccgagt ttcagatttt ctctctttta ctgatcccag 3540
tttcttttga tggctctcat gtttcagaac acaagtatga gattgtaaag atattacaag 3600
aaaagaagca tgtggttgga atgaccggag atggtgtgaa tgatgctcct gctctgaaaa 3660
aggctgacat tggaatagct gtcgctgatg caacagatgc cgcaagaagt tctgctgaca 3720
ttgtactaac tgagcctggc ttaagtgtaa ttatcagtgc tgtcttgacc agcagagcca 3780
ttttccagcg tatgaagaac tatacagtaa gtactaaaga caactatcat ctgattccac 3840
attgctaaag ataagcaaat ccatgtaata taggatatga atttcaagta gtttaatgaa 3900
attctgaagt ttcttttggt ttcctctgca ggtatatgca gtctcgatca ccatacgaat 3960
agtggtaagg agcttcaaga tacacgatct aacttgctaa gttacatcta cttgagcctt 4020
ctcttcttat cattgtttca tgcagctcgg ttttacactt ttagcgttga tatgggaata 4080
cgactttcca cctttcatgg ttttgataat cgcaatactc aatgacggta atcttttaat 4140
cctctcaata gcttcatgtt tgaattgttg atgttaaaaa ctctaaattc ttaacacttt 4200
caagtgctct tgtttatctc ctacgcaaca gggaccatca tgactatctc taaagatcga 4260
gtaaggccat ctcctacacc cgagagttgg aagctcaacc agatatttgc gactggaatt 4320
gtcattggaa cataccttgc attggtcact gtcctattct actggatcat tgtctctacc 4380
accttcttcg aggtatcttc ccgtcgctcg aaagtaatca aattcgattt gcttaccgag 4440
aaaaacgcat aaccatgacc atccctgaat cttaaatggc tgcagaaaca cttccatgta 4500
aaatcaatcg gcaacaacag tgaacaagtc tcatccgctc tgtatctcca agtaagcatc 4560
atcagtcaag cactcatatt tgtaacacgt agtcgaagct ggtcttttct tgaacgtccc 4620
gggactctcc tgattttcgc cttccttgtt gcccaacttg taagaactct tcatgtttaa 4680
cctttttcca tcacagaata ctacatacag catacatagg tcttggtttt gatttgtccg 4740
ttttcatgta cacaggccgc tacattgatt gctgtctatg ccaacatcag ctttgctaac 4800
atcaccggca ttggatgggg atgggcaggt gttatatggt tatacagttt gatttttac 4860
atacctcttg atattataaa gttcttcttc cactacgcat tgagtggaga tgcttggaac 4920
cttgtatttg accgtaaggt tagtgcatgt cttgtcctct gtctcagact ttaactctgt 4980
ttttttctta aaagacaaag agtgttggtt ttgtcttgca gacagcattt actaataaga 5040
aagattatag aaaagatgac ggagcgtcca atgtaaccat ctctcagaga agtcactctg 5100
cagaagaact cagtggaagt cgttctcgcg catcttggat cgctgagcag accagaaggc 5160
gtgcagaaac cgccaggttc tcttttgtct atacgacttt ttttgggtttt ctctttcatt 5220

```
tcacatacta ccagaaccat ctctggtcca cagaaaatag aaacttagtt tttttgttca   5280

tttgataggc tcttggaggg acactcggtg tcaaggcatt tggaatcagt aatgaagctc   5340

aaacaaattg accccaagat gattcgtgca gacactgtct aa                      5382
```

<210> SEQ ID NO 42
<211> LENGTH: 1857
<212> TYPE: DNA
<213> ORGANISM: Thlaspi arvense

<400> SEQUENCE: 42

```
atggagagta gtgtagttaa tcatccattg caagaagatg agaagggttt ttctgatgaa     60

gataatgctg taaataatga gaaagagagt ttattgcaaa catctggctc tgtagagaat    120

gctcctgaag gttctggtcg ttcttcggat tggcgtaggg gactagacca ctgcataact    180

gcacctgttg gtctctatgg agatatggta atcgatgaca atgaggttaa gtactctcgg    240

tccataacag agagattgtc ccctgcgagt cataattcaa aattagatcg attatcggag    300

cgggaaaagc aaaaactcat tgttgagcta gtcagaatac aaaatgacgg gaccgtggaa    360

gttgatatag ataacggtac accggtatcg gagttattgg agtttcagcc aaccaaaggg    420

cagccaacaa tcacatatga aaagtcattt gctgattcct ttagatcaat tccaagatta    480

aaaattgtga tacttgtggt tggaactcgc ggtgatgtgc agcctttctt ggccatggca    540

aagcgcctcc aggagtttgg tcatcgtgtt aggttggcaa ctcatgcaaa tttctgctct    600

tttgtacgat ctgctggagt agagttctat cccttgggtg gtgatcctcg agaactagct    660

ggatatatgg ctagaaataa aggtctgatt ccttctgggc ctggagaaat agcaaaacag    720

agaaaacagt tgagggcaat tatagagtct cttcttccgg cttgcacaga gcctgatatg    780

caaactgctg cctctttcag agctcaagca ataattgcaa accctcctgc gtatggacat    840

gtgcatgttg ctgaagctct aggagtacca attcacattt ttttcacaat gccttggacg    900

ccaactcatg aatttcccca ccctttggcc cgagttcctc aaagtcctgc gtattggcta    960

tcatatatag ttgttgatct gatggtatgg tggagcataa ggacatacat aaatgatttt   1020

aggaagagga agctaaacct tgcacctttc gcatatttca gcacatacca tggctcaatt   1080

tctcacttgc ctactgctta catgtggagt ccccatgttg tgccaaaacc aagtgattgg   1140

ggtcctttag ttgatgttgt tgggtattgt ttcttgagcc ttggatcgaa gtaccaacct   1200

cgtgaagatt ttatccactg gatagaaaga ggatcaccgc ccgtatatat tggtttcgga   1260

agcatgcctc ttgacaatcc gaaaaaaaca atggatatta tactggaaac actgagagat   1320

acagaacaca gagggatagt tgatcgaggt tggggtggcc ttggaaacct tgctgaagtt   1380

cctgaaaatg tattcctctt ggaggactgt cctcatgatt ggttgtttcc tcaatgttca   1440

gctgtgattc atcatggagg tgctggaacc acagcgactg gactaaaagc tgggtgtcca   1500

acaacaatcg tgccgttctt tggggatcag ttcttctggg gtgacaggat ctatgagaaa   1560

ggacttgggc ctgcgccaat accaatagct cagctcaatg ttgagaacct ctgcaattcc   1620

ataagattca tgcttcaacc agaggtgaaa tcacgagtga tggaactagc gaaagtactg   1680

gagaacgagg acggtgtagc tgcagctgtt gatgcattcc acaggcattt gccactggct   1740

ctgccactcc cggagtcctc gccggagaaa agacacgaag atgatcgacc agacctgtta   1800

cagtggttct tcatccagat tggtaaaaag tgttgccttc catgtggtgg tgtgtga      1857
```

<210> SEQ ID NO 43
<211> LENGTH: 618

<212> TYPE: PRT
<213> ORGANISM: Thlaspi arvense

<400> SEQUENCE: 43

Met Glu Ser Ser Val Val Asn His Pro Leu Gln Glu Asp Glu Lys Gly
1 5 10 15

Phe Ser Asp Glu Asp Asn Ala Val Asn Asn Glu Lys Glu Ser Leu Leu
20 25 30

Gln Thr Ser Gly Ser Val Glu Asn Ala Pro Glu Gly Ser Gly Arg Ser
35 40 45

Ser Asp Trp Arg Arg Gly Leu Asp His Cys Ile Thr Ala Pro Val Gly
50 55 60

Leu Tyr Gly Asp Met Val Ile Asp Asp Asn Glu Val Lys Tyr Ser Arg
65 70 75 80

Ser Ile Thr Glu Arg Leu Ser Pro Ala Ser His Asn Ser Lys Leu Asp
85 90 95

Arg Leu Ser Glu Arg Glu Lys Gln Lys Leu Ile Val Glu Leu Val Arg
100 105 110

Ile Gln Asn Asp Gly Thr Val Glu Val Asp Ile Asp Asn Gly Thr Pro
115 120 125

Val Ser Glu Leu Leu Glu Phe Gln Pro Thr Lys Gly Gln Pro Thr Ile
130 135 140

Thr Tyr Glu Lys Ser Phe Ala Asp Ser Phe Arg Ser Ile Pro Arg Leu
145 150 155 160

Lys Ile Val Ile Leu Val Val Gly Thr Arg Gly Asp Val Gln Pro Phe
165 170 175

Leu Ala Met Ala Lys Arg Leu Gln Glu Phe Gly His Arg Val Arg Leu
180 185 190

Ala Thr His Ala Asn Phe Cys Ser Phe Val Arg Ser Ala Gly Val Glu
195 200 205

Phe Tyr Pro Leu Gly Gly Asp Pro Arg Glu Leu Ala Gly Tyr Met Ala
210 215 220

Arg Asn Lys Gly Leu Ile Pro Ser Gly Pro Gly Glu Ile Ala Lys Gln
225 230 235 240

Arg Lys Gln Leu Arg Ala Ile Ile Glu Ser Leu Leu Pro Ala Cys Thr
245 250 255

Glu Pro Asp Met Gln Thr Ala Ala Ser Phe Arg Ala Gln Ala Ile Ile
260 265 270

Ala Asn Pro Pro Ala Tyr Gly His Val His Val Ala Glu Ala Leu Gly
275 280 285

Val Pro Ile His Ile Phe Phe Thr Met Pro Trp Thr Pro Thr His Glu
290 295 300

Phe Pro His Pro Leu Ala Arg Val Pro Gln Ser Pro Ala Tyr Trp Leu
305 310 315 320

Ser Tyr Ile Val Val Asp Leu Met Val Trp Trp Ser Ile Arg Thr Tyr
325 330 335

Ile Asn Asp Phe Arg Lys Arg Lys Leu Asn Leu Ala Pro Phe Ala Tyr
340 345 350

Phe Ser Thr Tyr His Gly Ser Ile Ser His Leu Pro Thr Ala Tyr Met
355 360 365

Trp Ser Pro His Val Val Pro Lys Pro Ser Asp Trp Gly Pro Leu Val
370 375 380

Asp Val Val Gly Tyr Cys Phe Leu Ser Leu Gly Ser Lys Tyr Gln Pro
385 390 395 400

```
Arg Glu Asp Phe Ile His Trp Ile Glu Arg Gly Ser Pro Pro Val Tyr
                405                 410                 415

Ile Gly Phe Gly Ser Met Pro Leu Asp Asn Pro Lys Lys Thr Met Asp
            420                 425                 430

Ile Ile Leu Glu Thr Leu Arg Asp Thr Glu His Arg Gly Ile Val Asp
        435                 440                 445

Arg Gly Trp Gly Gly Leu Gly Asn Leu Ala Glu Val Pro Glu Asn Val
    450                 455                 460

Phe Leu Leu Glu Asp Cys Pro His Asp Trp Leu Phe Pro Gln Cys Ser
465                 470                 475                 480

Ala Val Ile His His Gly Gly Ala Gly Thr Thr Ala Thr Gly Leu Lys
                485                 490                 495

Ala Gly Cys Pro Thr Thr Ile Val Pro Phe Phe Gly Asp Gln Phe Phe
            500                 505                 510

Trp Gly Asp Arg Ile Tyr Glu Lys Gly Leu Gly Pro Ala Pro Ile Pro
        515                 520                 525

Ile Ala Gln Leu Asn Val Glu Asn Leu Cys Asn Ser Ile Arg Phe Met
    530                 535                 540

Leu Gln Pro Glu Val Lys Ser Arg Val Met Glu Leu Ala Lys Val Leu
545                 550                 555                 560

Glu Asn Glu Asp Gly Val Ala Ala Ala Val Asp Ala Phe His Arg His
                565                 570                 575

Leu Pro Leu Ala Leu Pro Leu Pro Glu Ser Ser Pro Glu Lys Arg His
            580                 585                 590

Glu Asp Asp Arg Pro Asp Leu Leu Gln Trp Phe Phe Ile Gln Ile Gly
        595                 600                 605

Lys Lys Cys Cys Leu Pro Cys Gly Gly Val
    610                 615
```

<210> SEQ ID NO 44
<211> LENGTH: 7708
<212> TYPE: DNA
<213> ORGANISM: Thlaspi arvense

<400> SEQUENCE: 44

```
ctaaaagagc atgagcagca ccgcgatcat catcggaata gtccgccacc aacgcaattg     60

aactaagaaa ggctacaaaa ctgctttaaa tccatcctgc tgcttattcc ttttgcgtgt    120

ggccgccaga agaagatgag aaaacttact ttcaccatta gaaattagaa taaagagtca    180

ccgaaagtga aagtgaatag gatattcacc agaccgcctt tgagaagcgc cagttctgca    240

gatcctgcat ctcaatcact caagataact cccaaatctc aaatcaactc cgctaaagaa    300

acttcctctt cgcaatcacg acgatttatt aacagaaaag agaaggaatt gctctttcgg    360

gagaagatcc agcataacta acggaaagag tttcatcaaa ttcgtctgga ataaagatga    420

aaacaagcaa aaggaaaacc gaacgttgtc ggagaactta gaatcctata aacggaaaat    480

aaaatccgat caacggaaaa gaagatccga ttgacggaac tataagacag ccaaaaagcc    540

gatcaaatcg gatcaaagaa agaactctct cgctctgaaa gattttaaag agagaagaga    600

gagagagccc ttcaccttgt gccacccgta cttttaagag catctccaac catattctat    660

tttcaactcc aaatgctatt ttgaagtaaa atcctctcca accctagtct attttcaact    720

ttaaaataga gtaaacctaa attttactct atatttggag taaatctaaa ctttactcca    780

tcttggaatt agactttttt atttgcaaat taatccttga gatttattat aattatattt    840
```

```
tatactattt aatatttata acaaatatta taaaactgat aattatgaat atttaaatac    900
tgcaattatt cctacaaaat taaaaaatat aataaacttt aaaatacaaa ataagggcta    960
aaattaagat aaacaacata aataaattta agacaacaaa tactaaaaat attaatgata   1020
attttttttt attatagtaa tgtttaaata aaaattgcat atgctttttt gtgatgttat   1080
gtaattttta ttatttgata aatatttaag ttatagtttt tcaaagaaat tgtaaataat   1140
aaaataagtg ggatttattt ataaatttta aaactaaaaa atatttataa taaaatcaaa   1200
taagattcta tttagaatat ttctttttag agtaaaaaat aaagaaatac attagagtaa   1260
aacacaactc tattttagag ttactctatt tttctatttt ggagtagaaa atgaagaaat   1320
aattgaagat ggtataacaa acgaaaagtc gcattatctt actgttaaat tactataatt   1380
cataatcaat tggttttgtt tcggtggcat ccggcatccc ctaatatgat tgatttttat   1440
cgctgcattt attaaaatat atatatcttc atcctcgatc accacaattc attgattcaa   1500
aagtctccaa accccttgga agctcaacat tacaatctcg ccaaattcct caaaaccaga   1560
attttccaca gacccagaaa catttctcat caaagttctc tcctttcctg tctcttgaac   1620
tttctctcct actcactcag ttcaagaaca atctttcgat cattgatcag tgatggtaga   1680
ttcaattgtt gggtttcatt tacttgggca atggcttttc ttttcttttc tcttctcttt   1740
tcgattgatt gattggttaa ttctgtgtct ctgtacagtt tcgaattgtg tctttcaagt   1800
taaagctgga tcatttttct agttgatctc atcctcgcgc ttaacgtgag agactctctg   1860
ctctgtaatc tttccctgcg ttttcttgtt ttatctgaaa cggttaatat agagataaaa   1920
aaacccaatt tctctgactt ttttttcttt ctttaatata tcatttcttc tcccttttgc   1980
tttttgtata aagtgcagct aactttcctt aaggattcac tggttggttc aagcactgat   2040
tcgccgcgta cagcttttgg caggagccat ttgcatctct gatcgacatg gattagaata   2100
gtgtgcagtt gtgttgtgta caactcgctg catagatgtt actttgtgga gttcaattca   2160
tatgtagtat gtttgttgtt taagaagctg atctttgtgg gggcattggg tagtgagatc   2220
tgttaaattg aagtcggtga tggagagtag tgtagttaat catccattgc aagaagatga   2280
gaagggtttt tctgatgaag ataatgctgt aaataatgag aaagagagtt tattgcaaac   2340
atctggctct gtagagaatg ctcctgaagg ttctggtcgt tcttcggatt ggcgtagggg   2400
ttagtcctct attggaacac gtgtatttat cttattccaa gctttgccat caaaaccata   2460
acttagagca taacaactta tcaagattgt atgttcttga aggactagac cactgcataa   2520
ctgcacctgt tggtctctat ggagatatgg taatcgatga caatgaggtt aagtactctc   2580
ggtccataac agagagattg tcccctgcga gtcataattc aaaattagat cgattatcgg   2640
agcgggaaaa ggtaggaatc tgaaccttca ttgcaatgga tatgttcttc atttgattac   2700
aaattttttt ggtaacttga aaacttcttg ttattccagc aaaaactcat tgttgagcta   2760
gtcagaatac aaaatgacgg gaccgtggaa gttgatatag ataacggtac accggtatcg   2820
gagttattgg agtttcagcc aaccaaaggg cagccaacaa tcacatatga aaagtcattt   2880
gctgattcct ttagatcaat tccaagatta aaaattgtga tacttgtggt tggaactcgc   2940
ggtgatgtgc agcctttctt ggccatggca aagcgcctcc aggtagtttc gaaattgctt   3000
tctcattctt tgtatccttt tgcgaaatta agattcacag agggaatcat tgtgacttta   3060
catatgtata ttttgtggat gcatgcatat agtacactgc aattgaacag gctcgtatca   3120
aagtgttggc atgtgcctat atcatgtgtt ctcgtcattt taaatttgtt tcatttcttc   3180
atcctatcgt catatgtgtt cttgacgctt ttcttagcat ttggtgagag atttggaact   3240
```

```
gattggcatt gagagaggtt aaagttagat attgtttttc tctgttgcag gagtttggtc   3300
atcgtgttag gttggcaact catgcaaatt tctgctcttt tgtacgatct gctggagtag   3360
agttctatcc cttgggtggt gatcctcgag aactagctgg atgtaagaag tcctccttga   3420
aaagattcgt ttatatttta gtttctcgag tttttttgt ttgatgatga aagctgtcat   3480
aaattctctc tttagcttca tgtgggtatt tttgaatgta gatatggcta gaaataaagg   3540
tctgattcct tctgggcctg gagaaatagc aaaacagaga aaacagttga gggcaattat   3600
agagtctctt cttccggctt gcacagagcc tgatatgcaa actgctgcct ctttcagagc   3660
tcaagcaata attgcaaacc ctcctgcgta tggtatatcc ttcgttaact ttaaaactct   3720
ttgatccatc agaacctcat tgtttgtaaa cctttcttaa gcactttttc tatgaaactg   3780
atggtatggt ttttggttct aattatagga catgtgcatg ttgctgaagc tctaggagta   3840
ccaattcaca ttttttcac aatgccttgg acgtgagttg acttctctgc ttttaaactt   3900
gccttaacgt gttatttggt ttcctgttct cttacatcat cttcatgtag gcaggccaac   3960
tcatgaattt ccccaccctt tggcccgagt tcctcaaagt cctgcgtatt gggtaatgtt   4020
attctttctt atgaccatat actctctcga agataatgag gcttattgtt tcacaacatt   4080
tttttgtctc agctatcata tatagttgtt gatctgatgg tatggtggag cataaggaca   4140
tacataaatg attttaggaa gaggaagcta aaccttgcac ctttcgcata tttcagcaca   4200
taccatggct caatttctca cttgcctact gcttacatgt ggagtcccca tgttgtgcca   4260
aaaccaagtg gtgagattcc cgctgcatcc ccagtacata tattccgctg aggtttatca   4320
tatgtattgt agcttcattc tggcttctag attaatgttg ttcttctggc tttgtcaatt   4380
ggcaagacca taatgggttg tcaattttag gctgagctct ttatctttcc ttcggtagat   4440
atctgaaaga ttttgctttt tgtttgacta atttgcagat tggggtcctt tagttgatgt   4500
tgttgggtat tgtttcttga gccttggatc gaagtaccaa cctcgtgaag attttatcca   4560
ctggatagaa agaggatcac cgcccgtata tattggtttc ggaagcatgg taaactgatg   4620
atccttagaa aatatgctct tccttgcttt ggtgatattc agttataatg catagtactg   4680
atattgttgt ttcttctctt ttacacaacc aagcctcttg acaatccgaa aaaaacaatg   4740
gatattatac tggaaacact gagagataca gaacacagag ggatagttga tcgaggttgg   4800
ggtggccttg gaaaccgtaa gcagcttctg taccttctct tttgatgctc tgtgtcctga   4860
ttcctgaact actttttcttc tttgcttata cataattttt tttatcttca aacatcttgc   4920
agttgctgaa gttcctgaaa atgtattcct cttggaggac tgtcctcatg attggttgtt   4980
tcctcaatgt tcagctgtgg taacccccttt ttagattaac tacatcatgt ctccaaagac   5040
attatcttct aatccaggct atttcttgtg ttgtggatat gaagattcat catggaggtg   5100
ctggaaccac agcgactgga ctaaaagctg ggtaaaaaca ttttgctttc acagaaatgt   5160
cctgtagtga aatcagtttt cttgaccata tgaaacctaa tggttcctat attcttttga   5220
attctatgat atgtctccag tgtccaacaa caatcgtgcc gttctttggg gatcagttct   5280
tctggggtga caggatctat gagaaaggac ttgggcctgc gccaatacca atagctcagc   5340
tcaatgttga gaacctctgc aattccataa gattcatgct tcaaccagag gtaaacaaac   5400
ttaaattttc cttctttttt tccatgtatc tcatgcccat gtaggatgtt tgagtaaaga   5460
accacagtag aagttaaaca caaacactct ttcttgcaaa attaaacaaa ctaaacaaaa   5520
cccaaaacct aaagctgtcc ttttgagttc aaaaaagtag aaagatgtaa tcttgtatat   5580
```

```
acacttaaat attgcttata cagttcatac aaatagaaaa tgtcatcttt atagttcata   5640
gaagtagaaa gatgtaatct ttatatatac acttagaaat tgcttatata gttcatacaa   5700
atagaaaaat gtcatcttta tagttcatac aaatagaaag atttaatctt tatagttcat   5760
acaaatagaa agatgtaact tttatgtata tgcgtggata tcgctttatc agttttttaa   5820
tatgtgaagg ccctcgcaca aaaaaaaaaa tattatgtga aagaaagctc ggtgcttaat   5880
atttgaacta tgaagcaact ttctatatat atacacaaaa ctgacattgc tttatagttc   5940
atacaaaaaa aaagatgtaa tcgttatagt tagttcatac aaaagaaaga tgtgatcttt   6000
ctattttcgt tcagtgatgt tatgtgaaga aaaattcggt gtttagattt gaactatgaa   6060
gcatctttct atttatatac acaaaactga tattgtttta tactcataca aatagaaaga   6120
tgtatgaact ataaaaatag aaagcatcat acaaatacaa atagttcata caaacatcac   6180
acacaatgca cactagctca aagctttttc ctctgtttaa aactcataaa acttccaaag   6240
gtctctctct agctttgttg tatctcacaa acggaactgg aatcggtaga atatgtaaaa   6300
ccaatcatgg cctatccagg tgaaatcacg agtgatggaa ctagcgaaag tactggagaa   6360
cgaggacggt gtagctgcag ctgttgatgc attccacagg catttgccac tggctctgcc   6420
actcccggag tcctcgccgg agaaaagaca cgaagatgat cgaccagacc tgttacagtg   6480
gttcttcatc cagattggta aaaagtgttg ccttccatgt ggtggtgtgt gataacaaac   6540
tcccttagat attttgatct tgtctctgca actcgtttca tttcattcag ttgtcaagaa   6600
tatgattaga tttttaacac agctgcaaaa gatgggtttg gggcatcttt ataagtttgt   6660
tgttcagtga gaataagatg atatttgtgt gagtttgtct taagaacaaa gtaccgatct   6720
cctttattgt atacttaaaa cccattcgaa acagaatctc ccacgtcaaa ctacatttct   6780
cagcttgtag gcattggatt tcatcagctc ctgagcatgt gccagatgac ccttcatatg   6840
atctgttaag tttcagtggc tcaaaacggc acctttaaga gaagcttgaa gtatcaaaac   6900
gtgagattaa aacggaagtt gcagaaactt gcagaaagca gagtatgaga gattgagaga   6960
agaagaaggg agaagggaac acatacaaat atttaacgag ttcacgccca taacacgcta   7020
tatctcacca agactaagct ggaaatccac tagatatcag agagaataca tatttagaga   7080
cgaacaagtg accgttttaa tatctttcac tagcacttaa aattcactat gttaaatcaa   7140
ttaaaaccag aaaaaaaaca atagctaaac ttatgctaag atgtgttttt ctctccactc   7200
tcactagcga ctacattgtg tctatctcgt tctcttcctc atgtgtacta caatctctct   7260
cacgtcttca gcttcacttt atagtgacaa caacattaga cctaaagcac cttgccaaac   7320
gccaaaacag cttcctatag atgcgtttgc tttttttatca tatcttagag gcaaatactc   7380
cttagctttt aaattcacaa caagacaaaa gcaagaggct ctccttgtgg tcccaaaagt   7440
aactcaatcc aatatgaact caccaaagta atcatagtta tgccttgagt tacttgactt   7500
gaatttgctt gagcgacaag ttctcgtctt cacaaatctc cacctgagaa catgatgttc   7560
aagccaaacg acatacactc ttgagaaaga tatagaacgc cttcttctag cttatggatt   7620
ctaatcttgg tttctgagta tgattaccca gtcttgatac taagcagatt taaataccat   7680
aaaactgata gatccttgct ggatttaa                                      7708
```

<210> SEQ ID NO 45
<211> LENGTH: 732
<212> TYPE: DNA
<213> ORGANISM: Thlaspi arvense

<400> SEQUENCE: 45

```
atgggaagag ggaagataga gataaagaag atagagaatc agacagcgag gcaagtgacc      60

ttctgcaaga ggagaactgg tcttatcaag aagactaatg agctctctgt tctctgcgat     120

gctcacattg gtctcatcgt cttctcctcc accggaaagc tctcgcagta ctgttccgaa     180

cccctcagga tgcctcagct cattgaccga tacttgaaga ccagtggaat gcgacttcct     240

gatcctaatg acggccggga ggaattgtac caagagatgg aagtactaaa aagagagaca     300

tgtaagcttg agcttcgtct gcgtccatac catggacatg acttaacctc ccttcctcca     360

cacgagctcg atggtctcga gcaacagctc gaacattctg tccttaaagt ccgcgagcgt     420

aagaatgagt tgatgcagca acagttggag aatctaagca gaaagaggcg gatgctagaa     480

gaagataaca acaatatgta ccgtttgctt catgagcatc gtaacgcggt tgaatttcag     540

caagctggga tagagacgaa accaggggag tatcaacagt ttctagagca gcttcagtac     600

tataatgatc atcagcaaca accaaacagt gttcttcagc ttgctacgct tccttctgag     660

attgatccta attaccatct ccagcttgct cagcctaatc ttcaaaacga tccaacggcc     720

aagattgatt ag                                                         732
```

<210> SEQ ID NO 46
<211> LENGTH: 243
<212> TYPE: PRT
<213> ORGANISM: Thlaspi arvense

<400> SEQUENCE: 46

```
Met Gly Arg Gly Lys Ile Glu Ile Lys Lys Ile Glu Asn Gln Thr Ala
1               5                   10                  15

Arg Gln Val Thr Phe Cys Lys Arg Arg Thr Gly Leu Ile Lys Lys Thr
            20                  25                  30

Asn Glu Leu Ser Val Leu Cys Asp Ala His Ile Gly Leu Ile Val Phe
        35                  40                  45

Ser Ser Thr Gly Lys Leu Ser Gln Tyr Cys Ser Glu Pro Leu Arg Met
    50                  55                  60

Pro Gln Leu Ile Asp Arg Tyr Leu Lys Thr Ser Gly Met Arg Leu Pro
65                  70                  75                  80

Asp Pro Asn Asp Gly Arg Glu Glu Leu Tyr Gln Glu Met Glu Val Leu
                85                  90                  95

Lys Arg Glu Thr Cys Lys Leu Glu Leu Arg Leu Arg Pro Tyr His Gly
            100                 105                 110

His Asp Leu Thr Ser Leu Pro Pro His Glu Leu Asp Gly Leu Glu Gln
        115                 120                 125

Gln Leu Glu His Ser Val Leu Lys Val Arg Glu Arg Lys Asn Glu Leu
    130                 135                 140

Met Gln Gln Gln Leu Glu Asn Leu Ser Arg Lys Arg Arg Met Leu Glu
145                 150                 155                 160

Glu Asp Asn Asn Asn Met Tyr Arg Leu Leu His Glu His Arg Asn Ala
                165                 170                 175

Val Glu Phe Gln Gln Ala Gly Ile Glu Thr Lys Pro Gly Glu Tyr Gln
            180                 185                 190

Gln Phe Leu Glu Gln Leu Gln Tyr Tyr Asn Asp His Gln Gln Gln Pro
        195                 200                 205

Asn Ser Val Leu Gln Leu Ala Thr Leu Pro Ser Glu Ile Asp Pro Asn
    210                 215                 220

Tyr His Leu Gln Leu Ala Gln Pro Asn Leu Gln Asn Asp Pro Thr Ala
225                 230                 235                 240
```

Lys Ile Asp

<210> SEQ ID NO 47
<211> LENGTH: 5332
<212> TYPE: DNA
<213> ORGANISM: Thlaspi arvense

<400> SEQUENCE: 47
ttacatttca aacagatttg acataacatg taatattgct taggacattt gtgttcatca 60
cgtccgtctt tcaatgacca attaatgctg ttttgtttgt ttgttttaac cacgttttag 120
caaaagtaca tttatacagg actttttttaa tccgctcgtt acttaatcga caaatatata 180
atgtccctca atactatttg gtatatattt tttacaaaac atgccactga aaatgattca 240
gttgtatatg ttcatatcat cacataattg tgttcaacct gatgtagcgg ctgattactc 300
tatgcacaat gttagaaaat ctgaatatta actcgatgat ctaaatacca atttcttttc 360
cagaatttta atacgttcga gtttcagcat aaaagctttt actcacacca cttgtttccc 420
cttgcgttgt gtggcaatgt cgctgtataa atgtacatat tccttttgtt ttcctccaaa 480
aagtttatta atgaaattca gattctacga tataataata aataatgtta cttcaaaaat 540
aaaagagtgt gccaatatgg actgtgcttt taccatgagg gatttaaact cgattttttt 600
tttgttacac tgaagttgat gaatatagac attaaattaa ctcgaataga caggaaaaat 660
ccgatgtcca aaaaaaaaga caggaaagag atatcacaaa taatctaaca aaactattat 720
ggctaagtat cacattttta gatatatcaa cggttcaaag cccgatccat actgtcatac 780
gtaaaaaaat attgttttgg caaaactaca tataaggtga tgttactata gaaataaaac 840
caaattaaga ggaaggtggg taagaaaaaa taagagagag tcactttcaa gtattgttac 900
attttgtctt ttcccatttg gctatctctc tcttttgcct tttccctttt gtggtaactt 960
tattttccct ataacatttt ttcattaagt ttccatttat ggattatttt ctagttgcgt 1020
caagcatgga atatcaaaga aattagttcg agatttgact aaaaagggtc atttctgcta 1080
aataaattac taacactgcc attaggccaa tcacatgtct agtaacaatt tgacatttca 1140
cttactattg taacttttga tagatattga gactttacaa aaaaatattt taagaaaatt 1200
ttgttgaaga aaaaaacttg aatatcattc actataaaaa aaaggaaaaa atgtataggt 1260
ttttgttaca atactgaacg taaattgtga ccatgattcc ataaagcagt aacatttcaa 1320
actctaaaaa ttgttgatat taaaaacttg aatatcatcc actataaaaa aaaggaaaaa 1380
atgtataggt ttttgttaca atactgaacg taaattgtga ccatgattcc ataaagcagt 1440
aacatttcaa actctaaaaa ttgttgatat taatctagtt tacagaaaaa gtagaagaaa 1500
gaaaaaatga aattagaaaa tgttgagctg acatcacacg ccacacacag aattgtatag 1560
aaaagaggaa gtgtaattaa gcatattctt ccgcattaac ctctctcctc tctgtgtcat 1620
ccaacctcat atactactga tctccatttc cagatcccca agaacacaac tcatcaacaa 1680
gtactttaaa tactctatct ctctctttag agatctctct ttctctctct ctctctctct 1740
ctctctctct ctctctttct ctctgtttct cactaattac tctctacctc tcttacatac 1800
acaaacacaa tctctctcgc ttctctctaa ttcacacatc aagataaaag aatcaaacca 1860
tccttgaaat gaatcctgta attaattata ggatttcagt ttttgagttt tttgttctta 1920
atttggtttt gtagttaatt agggtttctt tatagtttat ctaccttgca tatatatatg 1980
tatgacatag acttacatga cactgaatca ggaggaagag gaaggaacga ataagaggaa 2040
gaggagagag atgggaagag ggaagataga gataaagaag atagagaatc agacagcgag 2100
gcaagtgacc ttctgcaaga ggagaactgg tcttatcaag aagactaatg agctctctgt 2160
tctctgcgat gctcacattg gtctcatcgt cttctcctcc accggaaagc tctcgcagta 2220
ctgttccgaa cccctcaggt taacttcttc ttcctctccc tctctcgaat tagggtttca 2280
gagatctata catacatgtg tatgtattat ctaattaaat gagtaaataa gagatatata 2340
gctcgtgctt gtgaacagac aattctcatc attagtttct gaagttagca ggtatcatga 2400
atactatgtt tcagatttta atttgaccca gaagttaaga atctctctga tgctatatat 2460
atatatatat atatatatat atatttactt ttgcagtatt tgatttgtat atatctgtag 2520
atgcatgtat ataatcattg tttattgata tcggtcaaat tctgtaattt ctacacctgc 2580
caagcaaaga gatgtttttt caaagatttt tcatttcttg atcaaccttt tttcccatat 2640
aatgtttacg acatatatat atatatacct agtatatata taagtcttat ttgaatcatt 2700
cgatataagt accattaatt ataaaggatt tttattaaaa gttgtaaatc taagtcatga 2760
accagaagac gaatttattc acatctagcc taacaatata agaagaaagg tatgctgata 2820
tagtttgaat tttgctatca taaaacaaaa atggggaaaa tgtatactct ctccgttttt 2880
ttatataaaa tattttatga attgtttttt gttcaaaaat agttgatgtt ctcacatatc 2940
tatgcagaaa ttaattgcat tttattgatt ttaagtgttt aaattttgta tattgttttt 3000
ttattggttg aattgttttg gaattaatga ctaaaacatg ttttgttttg gaaatataca 3060
aaattaaatg atttcttaat ctatataaaa aaaccttaaa catcgtatat aaaaaaacgg 3120
agggagtatg ttatttgatt tttgtgttcc tccaatgatg attaaagtct tgacgatgta 3180
cgattaaaga tactatttga taacaattta ttattaccaa tgttgaatag gatgcctcag 3240
ctcattgacc gatacttgaa gaccagtgga atgcgacttc ctgatcctaa tgacggccgg 3300
gtaatatata tatacacgca tacttattcc tttgtcttag ccaattcaaa acaaagaata 3360
taacattctc acaaaaatca ataatcattt ggagtttttt gtgtgtatat ataggaggaa 3420
ttgtaccaag agatggaagt actaaaaaga gagacatgta agcttgagct tcgtctgcgt 3480
ccataccatg gacatgactt aacctccctt cctccacacg agctcgatgg tctcgagcaa 3540
cagctcgaac attctgtcct taaagtccgc gagcgtaagg taacgtaata tatgttcaca 3600
tcaatataca tattctctta aaactatagt gattattaca cttttgtttg atctctcttt 3660
tctatctcta ctgttaataa attgaagaat gagttgatgc agcaacagtt ggagaatcta 3720
agcagaaagg tcgctctcta attaatcatt cttttgataa gtactcttaa ttttattttc 3780
ctctaattag tcatctttta taccgcggat ttaatgatca ttaccgtgtc tatataaata 3840
tatgatcaga ggcggatgct agaagaagat aacaacaata tgtaccgttt ggtaagtttg 3900
gttactagag aacgtttaat ttggttgcac attttcggtt tgtgtgacat aattattcaa 3960
cgtattaatt gcagcttcat gagcatcgta acgcggttga atttcagcaa gctgggatag 4020
agacgaaacc aggggagtat caacagtttc tagagcagct tcagtactat aatgatcatc 4080
agcaacaacc aaacagtgtt cttcagcttg ctacgcttcc ttctgagatt gatcctaatt 4140
accatctcca gcttgctcag cctaatcttc aaaacgatcc aacggccaag attgattagt 4200
cctcaaaagt gaatcattta tgtcttttat tactacctat tttgattata gccaatgcct 4260
tcttctgtgt ctgttttgtg tggttatgga aacctaatat tgtttgaagt acaattcact 4320
tgaaaagcgt ttatggtctt tctttgatta aataatttaa tcttcattat cacacatttg 4380
ccaactagag atcaactgtt tatgtaatcg cagattttga gatacatttt tggccataga 4440

```
aagagtggga gacacatgag taaactattc ttaggttgtt gacaaaagga agaaccaaca   4500

cctcagaatc ttaataatgt gtgatcgaca agcttatcaa ggaccttcac tgaaaataga   4560

ttttatatat ttcagacaga ttagatcgca atcccaaaaa tagctcttat aaactcagcc   4620

aagattgcaa aaattcaatc aacttctgta gggtattgca agggacgatc aagaagcagg   4680

aaaagagttc tggaagaaga atcttccttt cctcttttcc tcttcaatct gttttcatca   4740

taaagacgag aaaaaattga atacttggct tcttgatcgc tcgaataacc atcatcatca   4800

tctagatccc ccaaacgctg cgtttttgt tggctgaacc gtctacatcc atgacaggag   4860

gatattttat atccgagagt ggccatggaa aagagtacca agaaggccgt gttactgctt   4920

ttgtcgtgat ctcctgcatt gtggctgcaa tgggaggtct cctcttcggt tacgatatcg   4980

gtatctcagg tttgtttctt cccaaccaag aaaccccaag atttctcctt ctctcttctt   5040

ctttctcttc tcatcatggc gggatatatt tttttcagga ggagtgacat caatggatga   5100

gtttctaacg agattcttcc ccgacgtgca acgccaaagg caacacaata cagggcatga   5160

aacagagtat tgcaaattcg acaatgagct tctcactctc ttcacctcct ctctctacct   5220

cgcggctcta ttcgcttcct tcctcgcttc aacgatcaca aggcttttttg gccggaaaat   5280

ctcaatgaag atcggaggtc tcgcttttct ctccggagct cttctcaacg gt           5332
```

<210> SEQ ID NO 48
<211> LENGTH: 1071
<212> TYPE: DNA
<213> ORGANISM: Thlaspi arvense

<400> SEQUENCE: 48

```
atggctgcag tagaaagagt ggagagttta gccaaaagcg gaatcaaatc tatcccaaaa     60

gattacgttc gtccgaaaga agagctcgag agcatcaacg acgttttcca agaagagaag    120

aaagaagaag gtcctcaagt ccccaccatc gatctacaag acatcgagtc agaagacgaa    180

acgatccgcg agaagtgcac agaggagctg aggaaggcgg ctatggattg gggagtgatg    240

catttgatca accatggtat accggtcgat ctaatggagc gtgtgaagaa aaccggagaa    300

gagtttttcg gttctcctgt ggaagtgaag gagaagtatg ccaacgatca agccacaggg    360

aagattcaag ggtatggaag taagttggct aacaacgcga gcggacagtt ggagtggcaa    420

gattacttct tccatcttgt ttatcctgaa gataagagag atctaacact ttggcccaag    480

acaccaagtg attacattga agcaacgagt gagtacgcga agtgtcttcg tttgctagcg    540

acaaaagtct tcaaggctct ttctatcggt ctagggttag agcctgaccg tttagagaga    600

gaagtgggtg gtttagaaga gcttcttcta cagatgaaga tcaattatta cccaaaatgc    660

cctcagcctg agctagcact tggcgtggaa gctcacaccg acgttagcgc cttaaccttc    720

attctacaca acatggttcc aggtttgcag ctattctacg agggcaaatg ggtcattgca    780

aaatgtgtcc ccgactcgat tgtgatgcac attggagaca ctctagagat tcttagtaat    840

ggcaagtata agagtatact tcatcgtggg ttggtgaaca aggagaaggt tagggtttct    900

tgggctgtgt tttgtgagcc accaaaggaa aagattgttc ttaaaccgtt gccggagttg    960

gtgactgttg agtctccggc taagtttcct ccaaggacat ttgcacaaca tgtcgagcat   1020

aagttgttta ggaaggaaca agaggaattg gtgtctgaga aaaaaagttg a            1071
```

<210> SEQ ID NO 49
<211> LENGTH: 356
<212> TYPE: PRT

```
<213> ORGANISM: Thlaspi arvense

<400> SEQUENCE: 49

Met Ala Ala Val Glu Arg Val Glu Ser Leu Ala Lys Ser Gly Ile Lys
1               5                   10                  15

Ser Ile Pro Lys Asp Tyr Val Arg Pro Lys Glu Glu Leu Glu Ser Ile
            20                  25                  30

Asn Asp Val Phe Gln Glu Glu Lys Lys Glu Glu Gly Pro Gln Val Pro
        35                  40                  45

Thr Ile Asp Leu Gln Asp Ile Glu Ser Glu Asp Glu Thr Ile Arg Glu
    50                  55                  60

Lys Cys Thr Glu Glu Leu Arg Lys Ala Ala Met Asp Trp Gly Val Met
65                  70                  75                  80

His Leu Ile Asn His Gly Ile Pro Val Asp Leu Met Glu Arg Val Lys
                85                  90                  95

Lys Thr Gly Glu Glu Phe Phe Gly Ser Pro Val Glu Val Lys Glu Lys
            100                 105                 110

Tyr Ala Asn Asp Gln Ala Thr Gly Lys Ile Gln Gly Tyr Gly Ser Lys
        115                 120                 125

Leu Ala Asn Asn Ala Ser Gly Gln Leu Glu Trp Gln Asp Tyr Phe Phe
    130                 135                 140

His Leu Val Tyr Pro Glu Asp Lys Arg Asp Leu Thr Leu Trp Pro Lys
145                 150                 155                 160

Thr Pro Ser Asp Tyr Ile Glu Ala Thr Ser Glu Tyr Ala Lys Cys Leu
                165                 170                 175

Arg Leu Leu Ala Thr Lys Val Phe Lys Ala Leu Ser Ile Gly Leu Gly
            180                 185                 190

Leu Glu Pro Asp Arg Leu Glu Arg Glu Val Gly Gly Leu Glu Glu Leu
        195                 200                 205

Leu Leu Gln Met Lys Ile Asn Tyr Tyr Pro Lys Cys Pro Gln Pro Glu
    210                 215                 220

Leu Ala Leu Gly Val Glu Ala His Thr Asp Val Ser Ala Leu Thr Phe
225                 230                 235                 240

Ile Leu His Asn Met Val Pro Gly Leu Gln Leu Phe Tyr Glu Gly Lys
                245                 250                 255

Trp Val Ile Ala Lys Cys Val Pro Asp Ser Ile Val Met His Ile Gly
            260                 265                 270

Asp Thr Leu Glu Ile Leu Ser Asn Gly Lys Tyr Lys Ser Ile Leu His
        275                 280                 285

Arg Gly Leu Val Asn Lys Glu Lys Val Arg Val Ser Trp Ala Val Phe
    290                 295                 300

Cys Glu Pro Pro Lys Glu Lys Ile Val Leu Lys Pro Leu Pro Glu Leu
305                 310                 315                 320

Val Thr Val Glu Ser Pro Ala Lys Phe Pro Pro Arg Thr Phe Ala Gln
                325                 330                 335

His Val Glu His Lys Leu Phe Arg Lys Glu Gln Glu Glu Leu Val Ser
            340                 345                 350

Glu Lys Lys Ser
        355


<210> SEQ ID NO 50
<211> LENGTH: 4065
<212> TYPE: DNA
<213> ORGANISM: Thlaspi arvense
```

<400> SEQUENCE: 50

```
gtaaagtaga cagctttttg gaatttgcag agattatggt acaggaataa acactgaatc     60
gagattatag ccactgaatc aatcaaagcc ttgagcaaat gcgattgaga gctgaaattt    120
aacagggttt cgagccacaa tactataaac tagtgactga aaaacttcga tcactaaagc    180
ttcagctaga tttggtggaa gaagaaatct accactaaat tctaaaaggc tccatctttg    240
tagaatcaat tgtgaacgga ttctaggtaa aggatgaaaa ttgaagacct gattgctctg    300
tggtggcttt tgcaggcaat aagaaggatc ttcttctcaa ggaaatcgat cttccagggc    360
tgagctgatc ccattgagtc ctcggcgacg acgacgacgg aggagaagga gaagagaaag    420
aagtggtggg tttgcgagaa acggcggaga aaagtcgagg gcttgtcaaa ttgaacaaca    480
tcttgctacc cattttcccc gggagaagca aggagagatc cttttcctct gttttccggg    540
aaggaacctg tggttgaaga tgagttactg tgagcttcag gttccttctg atttttttat    600
tttattttaa ttcaatattt tattatttat ttatttaatt tagtagagag gatttggagg    660
gaagaaatta ggaaagataa gagaggtgtg gagatgaatt cctaggcaga tctctgatat    720
tttttccccc tctcatctta aagaaaaaga atatccacgt cagcaataaa tatcccacct    780
ttctgtattt tttgtaactt tataagaatt ttatttactt taatattttt taaatgatac    840
agtgatttct ctttgtatat aaaaaaacttt gaagtactaa tttactttag acaaacaaat    900
gtgatattat tatttccttt gttcagttga tcttttatac aattagtctt tttgaaactg    960
aaaccagtca aatactcaaa atgtttttag tgatgctaaa aattacagaa attatgataa   1020
aatgtggaca ttaaaaataa aataaaaagg tggataatgt acagacacct atattgattg   1080
aactatttaa aggtggacac gtggagatac gatttaggca cgtgcacacg gacgcagaag   1140
aaacgccacc aaaagtctga cgttgatagt catcggttta actctattgg gcttcttttt   1200
tatgggcttt taaatccaaa gcccttacca agctaggaca tactgtagta acttctcttc   1260
cagaattaaa agaaaacttt tttgaccgtt ggatctcaag gatggtgaaa ccatcagtca   1320
acctctctcg ttgacctgac cgtgaagtgt gttgtcactc actcacctgt tcttcctccc   1380
tacccaaccg gtagctccac acttcctaat tccttgatta attcttaatt ctaatggaaa   1440
attaatataa ttatctttgt tatataagaa agcctctgca tatatttcat ttgacatgca   1500
acaaaatcgg caagaagaat agtagaacaa agtatttatt cgttagttat cttacacact   1560
gtttttttcct ctgctttatt aagtttcttt acttacttac tctgtttctt tgctctgttt   1620
tagcttttaa aagaagacaa taaagatggc tgcagtagaa agagtggaga gtttagccaa   1680
aagcggaatc aaatctatcc caaaagatta cgttcgtccg aaagaagagc tcgagagcat   1740
caacgacgtt ttccaagaag agaagaaaga agaaggtcct caagtcccca ccatcgatct   1800
acaagacatc gagtcagaag acgaaacgat ccgcgagaag tgcacagagg agctgaggaa   1860
ggcggctatg gattggggag tgatgcattt gatcaaccat ggtataccgg tcgatctaat   1920
ggagcgtgtg aagaaaaccg gagaagagtt tttcggttct cctgtggaag tgaaggagaa   1980
gtatgccaac gatcaagcca cagggaagat tcaagggtat ggaagtaagt tggctaacaa   2040
cgcgagcgga cagttggagt ggcaagatta cttcttccat cttgtttatc ctgaagataa   2100
gagagatcta acactttggc ccaagacacc aagtgattac atgtaagctt ttgattcgtt   2160
tgttttatca tttataaaac aaagttcttg ctttggttat agtaacgttt tttggatgat   2220
tgtagtgaag caacgagtga gtacgcgaag tgtcttcgtt tgctagcgac aaaagtcttc   2280
aaggctcttt ctatcggtct agggttagag cctgaccgtt tagagagaga agtgggtggt   2340
```

```
ttagaagagc ttcttctaca gatgaagatc aattattacc caaaatgccc tcagcctgag   2400
ctagcacttg gcgtggaagc tcacaccgac gttagcgcct taaccttcat tctacacaac   2460
atggttccag gtttgcagct attctacgag ggcaaatggg tcattgcaaa atgtgtcccc   2520
gactcgattg tgatgcacat tggagacact ctagagattc ttagtaatgg caagtataag   2580
agtatacttc atcgtgggtt ggtgaacaag gagaaggtta gggtttcttg ggctgtgttt   2640
tgtgagccac caaaggaaaa gattgttctt aaaccgttgc cggagttggt gactgttgag   2700
tctccggcta agtttcctcc aaggacattt gcacaacatg tcgagcataa gttgtttagg   2760
aaggaacaag aggaattggt gtctgagaaa aaaagttgaa gtttgagtct aatatgagta   2820
aaaactccat gttaaagttt ctcgtttctt ttgtgtttat gtctttatcc tgtatttgat   2880
gcgtcttgtt gaagatgaca cgaaatattt ctaccgattg tgaaattgtt aaaaatttca   2940
ctctattata agttggtttt atgtatcgcc gaagtgacag atgttggaag aaatctagtc   3000
attggaaact gtattacatt cgtgctaatt gcatttcttt tcaagtttaa accaaattag   3060
tggaacgtct ccggttctag tctgtgtgac ttagttatag cttggtgaat agtaaaggaa   3120
gctcagtaaa tacgagtaac atagaaagat atttatgaac cacattgttg tattaaggac   3180
ttgagaatat tctgatttac atttccagtt tgttcttttt tgttatgcta ctaactgtaa   3240
aaaaactact cttctccctc ctttaatgat aattggcatt ccctgcttgg aaagagttca   3300
ctctatttc cttgaagacc ttaaaaccaa gaatagattg cacaactcaa tgattagtgt   3360
tggaaaatag aaaaaaaaaa atcaaaaatt gagtttcaag tttcacaagg ctgcaccttt   3420
ggttgacgaa atcttgtgag agatccattg ttttgctgga gctccgattt gatagagagc   3480
tgcacaggtt taatacgggt caagagagcg tatacaaata aactagagtg tgtttaagaa   3540
agatccatta catcaaacca tgagctgtac cttgctgaaa agatctgttg gtaaatctgg   3600
ctgaactctc ttttccgaat gaaaactaaa ctcctgtgtt tgcattccca aaacagtttg   3660
catcctcatc aggtaactca attttacaga catacagaag atcaagcgca aaaagaataa   3720
ttggtaaaga ctaccatacc aaaggtactg ttgtttctcg cttgctgttt ttgaaaatgc   3780
ccatgtctcc tctgcttgag agtatctgtt ttgcaggagt gtgaaactat gtaaggtgtg   3840
acacgtataa ttaacgcaag cgaaatgaga ctcgagaaag gataatacct tcttgttcag   3900
aggacgagct ttaaaaacgt gttttccctc cgagacatca tgcttaggta tatccataac   3960
gcttggtctg caagaaaaaa atacactttt atgtttacat tcacttcaac cacaagttga   4020
agtgagaaat caagcaatcc ttcttaatgt tccatgtgac tttat                   4065
```

<210> SEQ ID NO 51
<211> LENGTH: 645
<212> TYPE: DNA
<213> ORGANISM: Thlaspi arvense

<400> SEQUENCE: 51

```
atggttgtga agctatacgg gcaggtaacg gcagcttgtc cacagagggt cttgctttgt     60
tttctggaga aagaaattga atttgagatt gttcatatcg atcttgatac atttgagcag    120
aaaaaaccag aacatcttct tcgtcagcca tttggtcaag ttccagccat agaagatgga    180
gatttcaagc tttttgaatc aagagccatt gcgagatact acgcgaccaa gtactcggac    240
caaggcacga accttttggg caagtctcta gagcaccgag ccatcgtgga tcagtgggcc    300
gatgttgaga cccattactt caacgttctg gcccacccca ttgtgattaa cctagtcatc    360
```

```
aagcctaggt taggcgaaga atgtgacgtc gttttggtca aggacctcaa ggtgaagctt    420

gaggaagttt tggacatata cgagaaccgg cttgcttcga accggttttt ggctggtgat    480

gaattcacca tggctgattt gacgcacatg ccagctatgc ggtatttgat gggtataatc    540

gatataaacc ggatggtcaa ggctcgggtg aatatgaacc ggtggtggga agagattacg    600

gctagaccgg cttggaagaa gcttatggtg atggctggtt cttga                    645


<210> SEQ ID NO 52
<211> LENGTH: 214
<212> TYPE: PRT
<213> ORGANISM: Thlaspi arvense

<400> SEQUENCE: 52

Met Val Val Lys Leu Tyr Gly Gln Val Thr Ala Ala Cys Pro Gln Arg
1               5                   10                  15

Val Leu Leu Cys Phe Leu Glu Lys Glu Ile Glu Phe Glu Ile Val His
            20                  25                  30

Ile Asp Leu Asp Thr Phe Glu Gln Lys Lys Pro Glu His Leu Leu Arg
        35                  40                  45

Gln Pro Phe Gly Gln Val Pro Ala Ile Glu Asp Gly Asp Phe Lys Leu
    50                  55                  60

Phe Glu Ser Arg Ala Ile Ala Arg Tyr Tyr Ala Thr Lys Tyr Ser Asp
65                  70                  75                  80

Gln Gly Thr Asn Leu Leu Gly Lys Ser Leu Glu His Arg Ala Ile Val
                85                  90                  95

Asp Gln Trp Ala Asp Val Glu Thr His Tyr Phe Asn Val Leu Ala His
            100                 105                 110

Pro Ile Val Ile Asn Leu Val Ile Lys Pro Arg Leu Gly Glu Glu Cys
        115                 120                 125

Asp Val Val Leu Val Lys Asp Leu Lys Val Lys Leu Glu Glu Val Leu
    130                 135                 140

Asp Ile Tyr Glu Asn Arg Leu Ala Ser Asn Arg Phe Leu Ala Gly Asp
145                 150                 155                 160

Glu Phe Thr Met Ala Asp Leu Thr His Met Pro Ala Met Arg Tyr Leu
                165                 170                 175

Met Gly Ile Ile Asp Ile Asn Arg Met Val Lys Ala Arg Val Asn Met
            180                 185                 190

Asn Arg Trp Trp Glu Glu Ile Thr Ala Arg Pro Ala Trp Lys Lys Leu
        195                 200                 205

Met Val Met Ala Gly Ser
    210


<210> SEQ ID NO 53
<211> LENGTH: 3574
<212> TYPE: DNA
<213> ORGANISM: Thlaspi arvense

<400> SEQUENCE: 53

ttaaatgtcg gattccaatt gagttaagta agtctcatct atatgtaaat gggtttttgg     60

aatagtatca tcttataatc attttacaca gaatcaaagt tattagcctt gctaaatcta    120

ggttgtattg atcgaatgat cttcgaaaaa actcagttag ctgtaaatgc tttgcagggt    180

atgttaatga atgaaaatct acataatcac atccctcttg aactaatatg tctgtttata    240

gatcaaaaac aagttaggca tgtgaaagtt ttgtaatctt gttctggtta tggtatttgt    300

gcaagctttc gaactcgtgt ataaaggttt tcttctcatt ttcatgttac aacaacgcag    360
```

agatctcagg tcaaggttac caccacttca gatccactca cacgatgctc ttatccaaga 420
agtccagctt tggatctcgg cttcacttca gctatttttc taatgatggc tcagataatc 480
gtcagcgtcg gaagcggctg tctctgttgt agaaaaggtc ctgctccttc cagatctaat 540
tggattatcg ccttaacctg cttcgttgtt tcctggtaat cctcatcatt tctttctcct 600
atcgagcttt cctacttcac aattttgctg gacagacaca agtgacgaat ctttgtgttt 660
actcttaggt tcacttttgt gatagctttc ctcttgctgc taaccggagc tgcactcaac 720
gatgaacaca ctgaggagtc aatgtatgcc ggttactact cctgctacat tgtgaaaccg 780
ggagttttct ctaccggttc tttgctttcg cttctcactg ttgccctcgg gattgtctac 840
tatttgtgtt tgacttcgag taaacaaaac gttgctgaca cagcgacgac ggcgaaccga 900
ggaggaggta tagcaatggg acagcctcag attccggaga gagtggaaga tcctgtcttt 960
gttcatgaag atacttacat gagaagacag ttcacttaaa aacagaacat ggctttcttt 1020
ggatacacgt taggttttag gatgataatt agataaacaa gagatgctgt tttttttttt 1080
tggggatttt atctttgtga ttttagtatg tgaaactaag accatgaaac ttggtagctg 1140
gtaatgatga ttaatgatga ttgataacgt acagaaaacc aaacaaacgt ctccttttac 1200
ttatctatgt gaatttaaag tggttgttgg gaagtgttca caaaaatcag aaattgaaat 1260
aaataattaa cctatccacc ggtccgacca aacacgggac atctaataga aatcaatttt 1320
gtttatctcg aatcataaga cgaaaactac tgaaattttt atgttaataa gtttgtagag 1380
caactttgga tgatatccac cgttagtgga acaaccacca catgctctac ccaaccagca 1440
caacaaccag ctccttttaa atgtttttga gtctaataaa atgccaacac atctactact 1500
ctcacttctt cacatttata aataagatcc agagaagcaa ttttaaaata acacattgaa 1560
attgtttcaa agcttatttt tttttaaatt tatatcaata aaaatttggt tgcaaagtta 1620
ttgtaacgct tatagaatgg ttgtgaagct atacgggcag gtaacggcag cttgtccaca 1680
gagggtcttg ctttgttttc tggagaaaga aattgaattt gagattgttc atatcgatct 1740
tgatacattt gagcagaaaa aaccagaaca tcttcttcgt caggtcaaac attttatatt 1800
ttctaatttt gaaaagtcat gaattgtatt taatatcatt aatgttttct tttagccatt 1860
tggtcaagtt ccagccatag aagatggaga tttcaagctt tttggtaaga tcctaataac 1920
agcattgtaa aacattcttt aatacttgtt ttatatcatt aatatgtaga ttgtgttttg 1980
aaatttggcg tgtgtgctca gaatcaagag ccattgcgag atactacgcg accaagtact 2040
cggaccaagg cacgaacctt ttgggcaagt ctctagagca ccgagccatc gtggatcagt 2100
gggccgatgt tgagacccat tacttcaacg ttctggccca ccccattgtg attaacctag 2160
tcatcaagcc taggttaggc gaagaatgtg acgtcgtttt ggtcaaggac ctcaaggtga 2220
agcttgagga agttttggac atatacgaga accggcttgc ttcgaaccgg tttttggctg 2280
gtgatgaatt caccatggct gatttgacgc acatgccagc tatgcggtat ttgatgggta 2340
taatcgatat aaaccggatg gtcaaggctc gggtgaatat gaaccggtgg tgggaagaga 2400
ttacggctag accggcttgg aagaagctta tggtgatggc tggttcttga attatttcga 2460
atttatggtg atctgaacca aataagcttc atattttctg tactattttc tttatctatg 2520
ttttgtaagt ttcaattgat aaaataaatt tacttttaaa gatttaaatt cgttaatatt 2580
ttctttatct atgttttgta agtttcaatt gataaaataa atttactttt aaagatttaa 2640
attcgttaat tctcaatttt aaaggggact atagatttac agttatcatt ttgttacgta 2700

-continued

```
ttactacaaa ttgctgaatt gttatagaac tttttttcca attgtttgtg aacctaatac   2760
tttaaatctg aatagacatc atgtatttaa ttatttccca tgttatattt tcatctagta   2820
tatatagttc attcatttgt agccatgcag atgcacaatg aatctcgatt tttttttttt   2880
ttgtgcgagc acaatgaatc tcgatctctt agtgtttttg aattcagtaa cttctttgca   2940
tctttcacta aactatctct ccaaccaaaa aaattcatat ttcttcagca gccaagagag   3000
aaataaaaaa tttcaaaaat tactttttac atagagaaaa agaagggaac atccgcccat   3060
ttatatgtat attagttaac atgataaaaa atccgaccct aagtttttc attaatcaca    3120
aaagccctct ctttggttgt ttttcttggc ttctctcatt catgtcgact tagaagaaga   3180
agctaatctt gagcttgaag tctttagcac tgattttgca taagccaatg gcaaagctgc   3240
aattttcttg gctttcccta cataagctct ctttgtaaaa ttgttgtaat cattcgcttc   3300
aatctcgtcc agtatcctcc tgtataatag cagcgatgcc catacctgaa aaaattgcac   3360
agccaagtgt aagggggtta aatcgatcca aacaaaaaag ctttggggcg aaaacaaaac   3420
aaaaatgtaa acggtaaagt gtaaacgtgg gggcttaaga gtgttgttag agacacttac   3480
cggccatctg cttgcggcgt cgagctccgt gacgcctttc tcagcttcgt cgaagaacat   3540
tcttgctcgt ttaagctgca ttttcatgaa gttt                               3574
```

<210> SEQ ID NO 54
<211> LENGTH: 1155
<212> TYPE: DNA
<213> ORGANISM: Thlaspi arvense

<400> SEQUENCE: 54

```
atggttagtc acaaagagac cgtgtgtgta acaggcgcat cgggattcat cggttcatgg     60
cttgttatgc gattattgga gcgtggttac tttgtccgtg ccactgttcg cgaccccgga    120
aatttgaaga aagtgcaaca tcttgttgat ttacctaacg ccaagacgca actcactcta    180
tggaaagccg atttatctga tgaaggaagc tacgatgacg ccataaacgg atgcgacggc    240
gttttccatg tagcaactcc catggatttt gaatcaacgg atccggaaaa cgaagtgata    300
aaaccaacag tgaatggagt gttggggata atgaaagctt gtgataaggc aaaaacagta    360
cgaagaatca tctttacttc ttctgccgga actgttaatg tcgaggaaca tcagaaaaat    420
gtctacgttg aaaatgattg gagtgatctt gactttatca tgtccaaaaa gatgaccgga    480
tggatgtatt tcttgtcgaa aactttagcc gagaaagcag cgtgggatta tgcgaaggaa    540
aatggattag acttcattag tataattcct acattggtga tcggtccatt cataacaaca    600
tctatgccgc ctagcctcat caccgcgctc tctcctatca ctcggaacga ggcacattac    660
tcgatcataa gacaagggca gtacgtgcat ttggacgact tatgcaatgc tcatatattc    720
ttgtacgaac aagctgatgc caagggacgt tatgtttgtt cctctcacga tgccacgatt    780
cttagtatct ctgaatttat taggaaaaag taccccgagt ataacgtgcc ttcaacgttt    840
gaaggtgtgg atgaaaatct agagagcatt gtgttcagtt cgaagaagct gattgatatg    900
ggatttagct ttaagtatag tctcgaggag atgttggtcg aatcgattga gacatgtcgt    960
caaaagggtt ttctcccggt ttctttacca gatccatcaa tatttgagga caaagttccg   1020
actagtgatg acaagattga gcacaaaacc ggagctggtt tacccgatga tgtggtgccc   1080
tgtaagaaga cagaaccggt ggtaatccgc gagaaaaccg atgcttgcat gccggcagag   1140
cagatgtgtg cttag                                                    1155
```

<210> SEQ ID NO 55
<211> LENGTH: 384
<212> TYPE: PRT
<213> ORGANISM: Thlaspi arvense

<400> SEQUENCE: 55

Met Val Ser His Lys Glu Thr Val Cys Val Thr Gly Ala Ser Gly Phe
1 5 10 15

Ile Gly Ser Trp Leu Val Met Arg Leu Leu Glu Arg Gly Tyr Phe Val
20 25 30

Arg Ala Thr Val Arg Asp Pro Gly Asn Leu Lys Lys Val Gln His Leu
35 40 45

Val Asp Leu Pro Asn Ala Lys Thr Gln Leu Thr Leu Trp Lys Ala Asp
50 55 60

Leu Ser Asp Glu Gly Ser Tyr Asp Asp Ala Ile Asn Gly Cys Asp Gly
65 70 75 80

Val Phe His Val Ala Thr Pro Met Asp Phe Glu Ser Thr Asp Pro Glu
85 90 95

Asn Glu Val Ile Lys Pro Thr Val Asn Gly Val Leu Gly Ile Met Lys
100 105 110

Ala Cys Asp Lys Ala Lys Thr Val Arg Arg Ile Ile Phe Thr Ser Ser
115 120 125

Ala Gly Thr Val Asn Val Glu Glu His Gln Lys Asn Val Tyr Val Glu
130 135 140

Asn Asp Trp Ser Asp Leu Asp Phe Ile Met Ser Lys Lys Met Thr Gly
145 150 155 160

Trp Met Tyr Phe Leu Ser Lys Thr Leu Ala Glu Lys Ala Ala Trp Asp
165 170 175

Tyr Ala Lys Glu Asn Gly Leu Asp Phe Ile Ser Ile Ile Pro Thr Leu
180 185 190

Val Ile Gly Pro Phe Ile Thr Thr Ser Met Pro Pro Ser Leu Ile Thr
195 200 205

Ala Leu Ser Pro Ile Thr Arg Asn Glu Ala His Tyr Ser Ile Ile Arg
210 215 220

Gln Gly Gln Tyr Val His Leu Asp Asp Leu Cys Asn Ala His Ile Phe
225 230 235 240

Leu Tyr Glu Gln Ala Asp Ala Lys Gly Arg Tyr Val Cys Ser Ser His
245 250 255

Asp Ala Thr Ile Leu Ser Ile Ser Glu Phe Ile Arg Lys Lys Tyr Pro
260 265 270

Glu Tyr Asn Val Pro Ser Thr Phe Glu Gly Val Asp Glu Asn Leu Glu
275 280 285

Ser Ile Val Phe Ser Ser Lys Lys Leu Ile Asp Met Gly Phe Ser Phe
290 295 300

Lys Tyr Ser Leu Glu Glu Met Leu Val Glu Ser Ile Glu Thr Cys Arg
305 310 315 320

Gln Lys Gly Phe Leu Pro Val Ser Leu Pro Asp Pro Ser Ile Phe Glu
325 330 335

Asp Lys Val Pro Thr Ser Asp Asp Lys Ile Glu His Lys Thr Gly Ala
340 345 350

Gly Leu Pro Asp Asp Val Val Pro Cys Lys Lys Thr Glu Pro Val Val
355 360 365

Ile Arg Glu Lys Thr Asp Ala Cys Met Pro Ala Glu Gln Met Cys Ala
370 375 380

<210> SEQ ID NO 56
<211> LENGTH: 4705
<212> TYPE: DNA
<213> ORGANISM: Thlaspi arvense

<400> SEQUENCE: 56
cctccgttat tatggagcct tgtaattagt gttcagaaaa tcaatcccaa caatattatc 60
taatattttc tatagaaaaa atatagttta acaagtgttt agatgcctca tatcaaactc 120
tctaagattg tgtttctaat ctagtactaa gtacaagtcc aatgactcca accacaatca 180
tatttattct acacatgagg ggtgaaattt taattgttaa ataaaaaaat atagatacaa 240
ttattctatt ctatagttta tatgttgaca aagaaatctt tggtaaattt tatttttaaa 300
agtcaaaaag atatttgtta aaagtattgt tgtttgagga aatgctccaa aataatccag 360
aataagaaaa taatatgaaa cggtactcca ttgagaaaaa actgtgaaaa taacccatat 420
tttatgattt tttttaaata ccagtgctac atttctaact atttttactt gtagtctaat 480
ggcatactga atgcagagta ctggcagact gattggtctt acaattgaat atagactatt 540
ggcagactaa atgcaaatta ctgacagact aacgacagat taaaagcata ttagtggatc 600
ctgcttatgg atcatttgaa aaaggttcat gtttggtaac aaaattacca aatgaataat 660
ttcaaaaatt atcccatttg agtaaagtat atttttattt ttggctaatt tcttctttga 720
attaacccaa attatggtgt ttgtaaattg taactgtgat ttttttttac atcaagaagt 780
gaatggttga caaaaaaaaa agaatgatta aggtttaaat actaaactcg tatatttaaa 840
ttataaactt ttcgaattca ttttttttaa ttttatcaat ctttagaaaa atattatatg 900
tttctagaaa gtttctataa attctaatgt gtttaccatt aaaaatatat tatttatttt 960
cctcatttga aatatcaatt tatttatata taactcataa ttttaaaaat ttatatatca 1020
actcatgtca aaattttaat ttcatatcag tttatttcaa taatgttttt acacgtatta 1080
aaatctaatc aattacactc ttttattatt aacaaatttg acgtattaaa ttttatatga 1140
taaattttgt taacgtatta aaataatata aactcttctt gtagtttagt aacaaaataa 1200
aaaaattaca aaaaacaata agtaagaaaa ggaaacttca actcttgtcg ctatctcact 1260
aaacaaacaa gcaaacccat tcggcgtagt tcacccacca gtacaactaa aactatatcc 1320
taaaaaataa taaaatcaaa cttaccagtt tgtcacgtac cacacaaccc agtccttcgc 1380
caaccaacgt tcctcacgtg cttcgccggt tggtactcac gtgaccggca gctttctaat 1440
agcaattctc aatacatata taatctcttc ataccaaagc tacatatata gtctcttcat 1500
accaaagcta catagcaaag tctatcccaa agcacagtcc atctttataa tacacaaaaa 1560
tggttagtca caaagagacc gtgtgtgtaa caggcgcatc gggattcatc ggttcatggc 1620
ttgttatgcg attattggag cgtggttact ttgtccgtgc cactgttcgc gaccccggta 1680
cgtatatatg ttcttacaaa ctaactcgtt aattaatttt tcctaagatt aattaaatct 1740
atgtgtggct aatttacggg ttttattggg ttatttatat aggaaatttg aagaaagtgc 1800
aacatcttgt tgatttacct aacgccaaga cgcaactcac tctatggaaa gccgatttat 1860
ctgatgaagg aagctacgat gacgccataa acggatgcga cggcgttttc catgtagcaa 1920
ctcccatgga ttttgaatca acggatccgg aagtaagtta taatatgaac ctcttttagg 1980
tttcatatca accctaaaag atcttgttgg ttaaattttt tttttttttt aatcagaacg 2040
aagtgataaa accaacagtg aatggagtgt tggggataat gaaagcttgt gataaggcaa 2100
aaacagtacg aagaatcatc tttacttctt ctgccggaac tgttaatgtc gaggaacatc 2160

```
agaaaaatgt ctacgttgaa aatgattgga gtgatcttga ctttatcatg tccaaaaaga   2220
tgaccggatg ggtaaatata tataaattat atatcaaaca tcacactaac cctaagttta   2280
ttcttcttca tagttattta tgttttaata aaatgttttt ggcagatgta tttcttgtcg   2340
aaaactttag ccgagaaagc agcgtgggat tatgcgaagg aaaatggatt agacttcatt   2400
agtataattc ctacattggt gatcggtcca ttcataacaa catctatgcc gcctagcctc   2460
atcaccgcgc tctctcctat cactcgtgag ctctcactta atttctactc tttttgtaaa   2520
ctaagagatt tcttgacctt aggccaggtc ttgctcataa aatcaatgtc cactgagcaa   2580
tattctattt tataagccta ataatcataa atggcaagga aaacaaccta ttttttttta   2640
aagaacctta acgtctaacc aaaaattaca aaaagttata tggacccaat gcaaatacat   2700
ctttggcaca tgccaagaac cggatcgtag gaagatcttt ctggctagcg actagagcat   2760
gtcaactagt ctcttctatc ttccatcttc ttttgttgga atttgaaatg ttaatttttt   2820
ttaaaaacgg tgaaaatgtt tcagggaacg aggcacatta ctcgatcata agacaagggc   2880
agtacgtgca tttggacgac ttatgcaatg ctcatatatt cttgtacgaa caagctgatg   2940
ccaagggacg ttatgtttgt tcctctcacg atgccacgat tcttagtatc tctgaattta   3000
ttaggaaaaa gtaccccgag tataacgtgc cttcaacgta agatttatag atttaaatta   3060
cggagtttaa gccttgtttt gcttaagcaa tcaagatcgt ttgctgaaaa actatttgga   3120
acaggtttga aggtgtggat gaaaatctag agagcattgt gttcagttcg aagaagctga   3180
ttgatatggg atttagcttt aagtatagtc tcgaggagat gttggtcgaa tcgattgaga   3240
catgtcgtca aaagggtttt ctcccggttt ctttaccaga tccatcaata tttgaggaca   3300
aagttccgac tagtgatgac aagattgagc acaaaaccgg agctggttta cccgatgatg   3360
tggtgccctg taagaagaca gaaccggtgg taatccgcga gaaaaccgat gcttgcatgc   3420
cggcagagca gatgtgtgct tagagattta accggtatct attatatatc aattgtcgta   3480
tcgttttagt attggatgtg tgttttgaat ttgttacttt ctgaatcgta gattattatt   3540
gaagggtggt atggactgat tctgatagta acatgattga gtgtaacatt atgaactttt   3600
acatatttaa gaagcagagt gatatttaaa caatgttgcc ttgagtcaaa ttagtcgtgt   3660
aatgtcgctt gaatgcttcc ataatctata attagacaat ttcaacatct caatcgcagg   3720
catgcatttc ttaacaaaga gttatatatt cggtggtcac tggaaatatt ttatacatat   3780
ataatataat ttaactacta tgcagattac agagtataag aaaacaattc ttggctaaat   3840
agattttcag ttacaaaata aagaaaaacc aaatgactga actttttta tttgaagaac   3900
aaaaaatgaa aatttagtcg ttcgagttaa tttacggatc ctatcagcta aaaataattt   3960
agttctgttg agatgtccat gcttttttg gaatttggat tttcctttt ccatatgtga   4020
aacctttcca tataccaaaa actctatcat caaactaccc agcctttgta tctctatgcc   4080
aaaaaaaaaa aattaaacaa aatctttaat ttgaagtcgg actgtcggag tatatggttt   4140
ttcttgtacg tacgttttcc aaatgcttca gtaaattgct cttcgaagtc tttcatcgtc   4200
agctggaaag aaatacaaaa gtgattcctc ttgtgcctca aatgttcttt tgtagcttag   4260
gagaggatat tgggagatgg gttttaaaga atttttcaaa ttttgagatt ctattgttta   4320
taaattttta aaatcttaat agttaatatt gttattggtt gaaagatttt aaaattctat   4380
ccaaaatcct ttgttattta aaaaatttag cttttaaaga ttttatgatt tattaaaatc   4440
ttgtgttatt ggaacatgaa ttttaaacaa tctaacttat aaaataattc tttcaaaata   4500
```

```
ctacctatat agcttagatt ctcaaagtca ttataataaa atattttgat agatttttta   4560

aatataaaaa ctctttccaa atttaacaaa tatttttttac aagtttaaca aatctcccaa   4620

ctcttgaaat caatcaaaac tttataattt catctcttaa tgaccctccc ttactctttg   4680

ctttttgttg tttgtttctc aattc                                           4705
```

<210> SEQ ID NO 57
<211> LENGTH: 1188
<212> TYPE: DNA
<213> ORGANISM: Thlaspi arvense

<400> SEQUENCE: 57

```
atggtgatgg gtacacaacc gtcgttggaa gagatcagaa aggcacagag agcggatggc     60

cccgcaggca tcttggggat aggcacggcc aaccctgcga accatgtgat ccaggcagag    120

tatccggact actacttccg catcaccaac agtgagcaca tgactgacct caaggagaag    180

ttcaagcgca tgtgcgacaa gtcgatgata cggaaacggc acatgcacct gacggaggag    240

ttcctgaagg agaatccgga catgtgcgcc tacatggctc cttctcttga tgtgaggcag    300

gacatcgtgg tggtcgaggt ccctaagcta gggaaagagg cggcagtgaa ggccatcaag    360

gagtggggtc agcccaagtc caagatcacc cacgtcgtct tctgcactac atccggagtt    420

gacatgcctg gtgctgacta ccagctcacc aagctcctcg gtcttcgccc ttccgtcaag    480

cgtctcatga tgtaccagca aggttgctac gccggcggca ctgtcctccg actcgccaag    540

gacctcgctg agaataaccg tggtgctcgt gtccttgtcg tctgctccga gatcacagcc    600

gtcaccttcc gtggcccctc tgacacacac ctcgactccc tcgttggtca ggctctcttc    660

agtgacggtg ctgccgcgct cattgttggt gcggaccctg atgcctccgt gggagagaag    720

cctatcttcg agatggtgtc tgctgcacag accatcctcc cagactcgga cggagccata    780

gatggacact tgagggaagt tgggctcacc ttccatctcc tcaaggacgt ccctgggctc    840

atctcgaaga acatagagaa gagtctagaa gaagcgttta aaccgctcgg gataagtgac    900

tggaactctc tcttttggat agctcaccct ggaggtcctg cgatcctgga ccaggttgag    960

ttaaagctag gactcaagga agagaagatg agggccacgc gtcacgtgct gagcgagtac   1020

ggaaacatgt cgagcgcgtg cgttctcttc attatggacg agatgaggag gaagtccaag   1080

gaggatggtg tggccacgac aggagaaggg ttggagtggg gtgtcttgtt tggtttcgga   1140

ccaggtctca ccgtagagac agtcgtcttg cacagcgtcc ctgtttga                 1188
```

<210> SEQ ID NO 58
<211> LENGTH: 395
<212> TYPE: PRT
<213> ORGANISM: Thlaspi arvense

<400> SEQUENCE: 58

```
Met Val Met Gly Thr Gln Pro Ser Leu Glu Glu Ile Arg Lys Ala Gln
1               5                   10                  15

Arg Ala Asp Gly Pro Ala Gly Ile Leu Gly Ile Gly Thr Ala Asn Pro
            20                  25                  30

Ala Asn His Val Ile Gln Ala Glu Tyr Pro Asp Tyr Tyr Phe Arg Ile
        35                  40                  45

Thr Asn Ser Glu His Met Thr Asp Leu Lys Glu Lys Phe Lys Arg Met
    50                  55                  60

Cys Asp Lys Ser Met Ile Arg Lys Arg His Met His Leu Thr Glu Glu
65                  70                  75                  80
```

```
Phe Leu Lys Glu Asn Pro Asp Met Cys Ala Tyr Met Ala Pro Ser Leu
                85                  90                  95

Asp Val Arg Gln Asp Ile Val Val Val Glu Val Pro Lys Leu Gly Lys
            100                 105                 110

Glu Ala Ala Val Lys Ala Ile Lys Glu Trp Gly Gln Pro Lys Ser Lys
        115                 120                 125

Ile Thr His Val Val Phe Cys Thr Thr Ser Gly Val Asp Met Pro Gly
    130                 135                 140

Ala Asp Tyr Gln Leu Thr Lys Leu Leu Gly Leu Arg Pro Ser Val Lys
145                 150                 155                 160

Arg Leu Met Met Tyr Gln Gln Gly Cys Tyr Ala Gly Gly Thr Val Leu
                165                 170                 175

Arg Leu Ala Lys Asp Leu Ala Glu Asn Asn Arg Gly Ala Arg Val Leu
            180                 185                 190

Val Val Cys Ser Glu Ile Thr Ala Val Thr Phe Arg Gly Pro Ser Asp
        195                 200                 205

Thr His Leu Asp Ser Leu Val Gly Gln Ala Leu Phe Ser Asp Gly Ala
    210                 215                 220

Ala Ala Leu Ile Val Gly Ala Asp Pro Asp Ala Ser Val Gly Glu Lys
225                 230                 235                 240

Pro Ile Phe Glu Met Val Ser Ala Ala Gln Thr Ile Leu Pro Asp Ser
                245                 250                 255

Asp Gly Ala Ile Asp Gly His Leu Arg Glu Val Gly Leu Thr Phe His
            260                 265                 270

Leu Leu Lys Asp Val Pro Gly Leu Ile Ser Lys Asn Ile Glu Lys Ser
        275                 280                 285

Leu Glu Glu Ala Phe Lys Pro Leu Gly Ile Ser Asp Trp Asn Ser Leu
    290                 295                 300

Phe Trp Ile Ala His Pro Gly Gly Pro Ala Ile Leu Asp Gln Val Glu
305                 310                 315                 320

Leu Lys Leu Gly Leu Lys Glu Glu Lys Met Arg Ala Thr Arg His Val
                325                 330                 335

Leu Ser Glu Tyr Gly Asn Met Ser Ser Ala Cys Val Leu Phe Ile Met
            340                 345                 350

Asp Glu Met Arg Arg Lys Ser Lys Glu Asp Gly Val Ala Thr Thr Gly
        355                 360                 365

Glu Gly Leu Glu Trp Gly Val Leu Phe Gly Phe Gly Pro Gly Leu Thr
    370                 375                 380

Val Glu Thr Val Val Leu His Ser Val Pro Val
385                 390                 395
```

<210> SEQ ID NO 59
<211> LENGTH: 4151
<212> TYPE: DNA
<213> ORGANISM: Thlaspi arvense

<400> SEQUENCE: 59

```
cgaatccgca tagagaagct gaagctcagg tttctcaatt atttcttctt tctttttcaa     60

aaggcttatc attgacttgt ctctgttttt tttttttttt ttttgtgatc attgattcag    120

tctctccaac ttgatgaaaa agataaccat ccaagagccc acctttgaga gaattattgt    180

agtatacagg tacaagagta gagtaatggt gaaatctttg gagggatgtg agtttgattc    240

tcattttggc tttggattca catacacgca ggagagtttc agggaagaga gaatcagaaa    300

ggaacatata tgtgaaacac ttcaagagca ttcctatggc tgatatggaa attgtgcttg    360
```

```
taagcatcca ttaaccaaca ctttgtgctc aaatgtatct tactaattat aaattaactg    420
attgctcata acggcacagc cagagaagaa aaatccaggt cttacgccac tggactgggt    480
caagtttctt gtctctgctg ccattggact ggtcagttct gctacactat tctaaagact    540
ttaataatca gactctgaaa attttgattt ctcaaactct gcttttacag gtcacagtgg    600
ttagttcagt gagcctaaaa aaaactgaca tcagagtcat tgctgccata cttagcacgg    660
tcgtggccta ctgcgttaaa acatatttca cgtaatctac actcaataat cagacaacac    720
cctcgcttat agctaaatta atccttaatt agctctgtct cttcctctgt atgaaatgta    780
ggttccagag aaacttggta gattatcaga gccttatcac aagatctgtg tatgataagc    840
agctagacag tggaagaggc actctgcttc acctctgcga tgaagtcatc caacaagagg    900
tgctaataaa tagtcctttt ttcttatttt tcttatgtca tattcttgtg ttttgctaat    960
taaaaaactg atcaaacgca ggttaaagag gtcattattt ccttcttcat gctgataaag   1020
caagggcgtc ccacgagcaa ggaggagctt gacatgcaaa gtgaagcatt catcaaagaa   1080
gaattcaacg aaagttgcaa tttcgatgtg gatgatgctg tcaagaagct tgagaagctt   1140
ggacttgtct ctcgtgtgag tctccttcat ctctcttcta taatcttttc tttttctcca   1200
cgcatatgct tgtatatact cagtaagtaa actaatattg tgaaaatgga aagggttggt   1260
caggattcag aagacaagta tagatgcgtg aatatgaagg aagcaaacga gataatggga   1320
acaacgacgg aagagatggt actcaaggca agaagaggtg gtgaatatga agatgaagag   1380
gcagcagaga ctgagccacg gatgaatcct caagatgaac tcacagcaaa ggaagaacgt   1440
tatcaatctc aattagacga gttcgagacc ttgtggttgt aaaaagattt gacgtcattc   1500
aagacaaata aatttgatat tgtattaaag aaaaagaaaa aaagacataa aggcagacaa   1560
attaattgaa aggacccatc aacaatgagt ccaccacatt tcacatttca cactaaatga   1620
attctccctt aattatttca tacataattt atattaaaat gaaaaacata agactcgatg   1680
atggaaagta tgtgtaggta ggtaggcata taagaggaga gcgctctgta tggtgatggg   1740
tacacaaccg tcgttggaag agatcagaaa ggcacagaga gcggatggcc ccgcaggcat   1800
cttggggata ggcacggcca accctgcgaa ccatgtgatc caggcagagt atccggacta   1860
ctacttccgc atcaccaaca gtgagcacat gactgacctc aaggagaagt tcaagcgcat   1920
gtgtgagtat ccctcttaat actccctatt ttgtatctct tcatttcttt tggcatatgg   1980
ttcccatagt taacaattac tgtaacaggc gacaagtcga tgatacggaa acggcacatg   2040
cacctgacgg aggagttcct gaaggagaat ccggacatgt gcgcctacat ggctccttct   2100
cttgatgtga ggcaggacat cgtggtggtc gaggtcccta agctagggaa agaggcggca   2160
gtgaaggcca tcaaggagtg ggtcagcccc aagtccaaga tcacccacgt cgtcttctgc   2220
actacatccg gagttgacat gcctggtgct gactaccagc tcaccaagct cctcggtctt   2280
cgcccttccg tcaagcgtct catgatgtac cagcaaggtt gctacgccgg cggcactgtc   2340
ctccgactcg ccaaggacct cgctgagaat aaccgtggtg ctcgtgtcct tgtcgtctgc   2400
tccgagatca cagccgtcac cttccgtggc ccctctgaca cacacctcga ctccctcgtt   2460
ggtcaggctc tcttcagtga cggtgctgcc gcgctcattg ttggtgcgga ccctgatgcc   2520
tccgtgggag agaagcctat cttcgagatg gtgtctgctg cacagaccat cctcccagac   2580
tcggacggag ccatagatgg acacttgagg gaagttgggc tcaccttcca tctcctcaag   2640
gacgtccctg ggctcatctc gaagaacata gagaagagtc tagaagaagc gtttaaaccg   2700
```

ctcgggataa gtgactggaa ctctctcttt tggatagctc accctggagg tcctgcgatc 2760
ctggaccagg ttgagttaaa gctaggactc aaggaagaga agatgagggc cacgcgtcac 2820
gtgctgagcg agtacggaaa catgtcgagc gcgtgcgttc tcttcattat ggacgagatg 2880
aggaggaagt ccaaggagga tggtgtggcc acgacaggag aagggttgga gtggggtgtc 2940
ttgtttggtt tcggaccagg tctcaccgta gagacagtcg tcttgcacag cgtccctgtt 3000
tgacttttac aattcaagtc ttttagagtt tgatcgatga gtgagattgt gtactatgca 3060
agttatgtat atttgatggc aagcggagag tgggagttta tattaacgag agaaagggag 3120
aagagagagt gtggtaggtt agatggacgg gcagatgaag cactacgtgt ctatgtgtta 3180
gctccctttt atgtggttct ccttcttgct tcccttttat ttcgttactt accaagaata 3240
ttgaatggtg gttttttat tgattttacg tatattcgca acaacaagtc atattaattt 3300
ctatgtgcgt aattattata tattcgatgt atatacatgt aaagatacgt acggcctact 3360
ggagaggtta gttgtataga ttttcccaca cgtgcatact taactccatc attagctcct 3420
actaatctaa ttttccttct taatatacct gataatccta taactaacta aaaattacat 3480
taggtacgtc tcgttttctc tctcccaccc catcatgatg atagtttgaa tctgctcctt 3540
tttcggcttc caacaacgca agatgcattt cgcatcccat cataatgata tttgtgttgt 3600
tgctgttctt tatgttagac taataaaaga tgcatttgta agcttttgcc tcattaattt 3660
tattcggaaa aaaattgaat atgcgtaata tcacatcgtt ttttgttagt attcatttat 3720
tcaattcatg tcttaataat gttgtagata tttttattgg aaaaataata tcaatgggcc 3780
cataaaagaa ggtgggccct agagctggtt atgcttagcc atgtgggcag aatataacca 3840
gagtgtgttg tcattgtggt aagtaggggc actccaatgc gggtgttttt atcaacccgg 3900
cccggcccaa agcctatccg tcgaaaaccc gtgtccatca aaaactcgcc aaactagcgg 3960
ttatatttag ggttgggcaa attatccgtt atatttgatt cgatctgcta tttgtttcga 4020
ttcgattcga aaaatccaga tatccatagc tttacggagc aaagcaaata ctaaattttg 4080
atattcgtta aaaacggagc aaatcacaaa tattaaaatt ttaagagtcg gatatccgat 4140
ctgctctaat a 4151

<210> SEQ ID NO 60
<211> LENGTH: 759
<212> TYPE: DNA
<213> ORGANISM: Thlaspi arvense

<400> SEQUENCE: 60
atgtcttctt ccgcatgtcc gtcaccgtta ccctcagtca gcaaacttca tgtcgattcc 60
gttacttttc caccgtccgt caattcaccg gcttcctcca atcccctatt cctcggtggc 120
gcaggggtgc gagggttaga tattcaagga aagtttgtga ttttcaccgt catcggagtt 180
tacctagacg ctgtcgccgt cccgtcactc tctgttaagt gggagggcaa aactacagaa 240
gagttaacgg aatccgtccc ttttttccgt gaaatcgtca caggtgcgtt tgagaaattc 300
ataaaggtga cgatgaaact gccgttaacg ggacagcagt attcggagaa agtaacggag 360
aattgtgtgg cgatttggaa atcgttaggg atttacacag agagtgaagc taaagctgtg 420
gagagatttt tggaagtctt caaggaccaa actttcgctc ctggtgcatc catcctcttc 480
gctctctccc ctaacggctc cctcacggtt gcgttttcga aagacgatag cattcctgaa 540
accggaaaag cggtgatcga gaataaattg ttggcagagg cagttcttga atcaataatt 600
ggaaagaagg gtgtgtctcc tgggactagg ctgagtatag cagagaggtt agctaagctg 660
atgaagaaga agaaggtcga agaagatgca tcatcactga ctgatcaaga ggaagctaca 720
gatctctccc tcggagataa attggccaaa gagaactga 759

<210> SEQ ID NO 61
<211> LENGTH: 252
<212> TYPE: PRT
<213> ORGANISM: Thlaspi arvense

<400> SEQUENCE: 61

Met Ser Ser Ser Ala Cys Pro Ser Pro Leu Pro Ser Val Ser Lys Leu
1 5 10 15

His Val Asp Ser Val Thr Phe Pro Pro Ser Val Asn Ser Pro Ala Ser
20 25 30

Ser Asn Pro Leu Phe Leu Gly Gly Ala Gly Val Arg Gly Leu Asp Ile
35 40 45

Gln Gly Lys Phe Val Ile Phe Thr Val Ile Gly Val Tyr Leu Asp Ala
50 55 60

Val Ala Val Pro Ser Leu Ser Val Lys Trp Glu Gly Lys Thr Thr Glu
65 70 75 80

Glu Leu Thr Glu Ser Val Pro Phe Phe Arg Glu Ile Val Thr Gly Ala
85 90 95

Phe Glu Lys Phe Ile Lys Val Thr Met Lys Leu Pro Leu Thr Gly Gln
100 105 110

Gln Tyr Ser Glu Lys Val Thr Glu Asn Cys Val Ala Ile Trp Lys Ser
115 120 125

Leu Gly Ile Tyr Thr Glu Ser Glu Ala Lys Ala Val Glu Arg Phe Leu
130 135 140

Glu Val Phe Lys Asp Gln Thr Phe Ala Pro Gly Ala Ser Ile Leu Phe
145 150 155 160

Ala Leu Ser Pro Asn Gly Ser Leu Thr Val Ala Phe Ser Lys Asp Asp
165 170 175

Ser Ile Pro Glu Thr Gly Lys Ala Val Ile Glu Asn Lys Leu Leu Ala
180 185 190

Glu Ala Val Leu Glu Ser Ile Ile Gly Lys Lys Gly Val Ser Pro Gly
195 200 205

Thr Arg Leu Ser Ile Ala Glu Arg Leu Ala Lys Leu Met Lys Lys Lys
210 215 220

Lys Val Glu Glu Asp Ala Ser Ser Leu Thr Asp Gln Glu Glu Ala Thr
225 230 235 240

Asp Leu Ser Leu Gly Asp Lys Leu Ala Lys Glu Asn
245 250

<210> SEQ ID NO 62
<211> LENGTH: 3963
<212> TYPE: DNA
<213> ORGANISM: Thlaspi arvense

<400> SEQUENCE: 62
ttccccacaa acaatgtgtg tgtcagctat atatttatgg gaaggctgaa acgtttaaat 60
actagcctct gcatcgtttg ttgtaatttt gtgataaaat tgtaacatat ttaatcgttt 120
tatctctagg tacttttatg gaatattgta aaagaattct atttttgtgt aaaatccaaa 180
ttagcgtatt atacttgaat acacaagcat ttcggcacat agttcaattg gggttaattc 240
atgaatcatt tttaattcaa aaatttcgac ccatcaaaat tagacaatga ccaaagaaat 300

```
tataaaaaat gagatgatgt ttgaaaatgt ttagtgagga agtgaaggta tagattatag    360
acgtttattg tcaaatttca acggatgtta tatacgttgt taaatttaaa acaactttag    420
aatatatatg gcgcgtgatt ttgttaaatc gactttggta ggaaaatgtt attttgcgat    480
tttgtcaaga aaacgtaatt ttgtgatttt gaccaaaaaa aatgttattt acagtaatag    540
aaaaaaataa ttttataatt taaaaaacat gatttttgat tttattgaaa ttttttttt     600
ttaattttag tgagaagtga ttgcacattt ttaatgggaa aattttctac aattttaatt    660
aaaaaaatga tttcagcata attttagtaa aaaaattgtg attttacagt tttataaaaa    720
aatatacgtt tttatttttt tgaaataatt gaaaaatctc atttatatta tgttgattta    780
ttcatctgaa atttgcattt aaatattcta tctaaataaa agtattttaa ttatttgtta    840
ttttaaaata gattatttcc atttttttatc aataaacaac cccatatgtt gttaaacaaa    900
gaaagaaagg acaatctata tttcttagtt atttttatta ttatattttc tttattcttt    960
attctcttta tttatattat ttttataatg ttcattaatt aaaacctacc tcttacagaa   1020
ctttttttggg ttgttttaaa aggatcagac atagtgtaaa ctaaaaaatt aaactgaacc   1080
aaaccaaact atgtcttata cttatcaagt aatatacact acatgataag cttaaactag   1140
attctatctt tatcataaat taattttatc tttatcacat tgtggtctac ataaatcctc   1200
attacataag tatcttaatt aaatcttcta gattcttcct taacagtaaa ccaagattaa   1260
aaatgatctg atttgaactg ataaaaccta aactaaaaag aaattggcat acctaccgac   1320
tctaaagcgg tcagagttcc cgcaaccacc aaaattataa accactgaat cttccaatca   1380
acaaaaccac gtgtttaccc atccaacact cgtaagctat tgctagttgc tacctacctc   1440
catcttctct tataattacc aatctccatc aaattctttt ttactttttt ttacattata   1500
atcaaaccta acaccctcaa agtcaaaacc atgtcttctt ccgcatgtcc gtcaccgtta   1560
ccctcagtca gcaaacttca tgtcgattcc gttacttttc caccgtccgt caattcaccg   1620
gcttcctcca atcccctatt cctcggtggc gcaggttcga gtgctgttta attcatttgc   1680
tcttgcagca ttcttttttt tttttttaaa tgcgtttttt gttgcctctt tgagtttctc   1740
tgtttcttgc taacttacgc aggggtgcga gggttagata ttcaaggaaa gtttgtgatt   1800
ttcaccgtca tcggagttta cctagacgct gtcgccgtcc cgtcactctc tgttaagtgg   1860
gagggcaaaa ctacagaaga gttaacggaa tccgtccctt ttttccgtga aatcgtcaca   1920
ggtgcttgtc atgcaacaaa ctgttttaag tcaaaaaggg attttaattt gtttagacca   1980
aactatttga ccgtcattaa tttattatta ccatttttag ttaattatga ttttttttttg   2040
tttttgggca cgattaggtg cgtttgagaa attcataaag gtgacgatga aactgccgtt   2100
aacgggacag cagtattcgg agaaagtaac ggagaattgt gtggcgattt ggaaatcgtt   2160
agggatttac acagagagtg aagctaaagc tgtggagaga tttttggaag tcttcaagga   2220
ccaaactttc gctcctggtg catccatcct cttcgctctc tcccctaacg gctccctcac   2280
ggtacttctt gtcctatcac acagctttgc gtttgcgttt acattactat tacgaactgt   2340
ttacaatgaa acgcaaatta atgtagaaat agcgtttaaa acgaactgtg cccaaaacat   2400
gtatttttaa gtaagatttg gttttaaaaa ttgttttacg tgtattaaac gcaattgacg   2460
ttagaaaaac agtcgtaggt tgtaaaatgt ctttgttgtg aaaaaaaaat cgttttgcag   2520
gttgcgtttt cgaaagacga tagcattcct gaaaccggaa aagcggtgat cgagaataaa   2580
ttgttggcag aggcagttct tgaatcaata attggaaaga agggtgtgtc tcctgggact   2640
aggctgagta tagcagagag gttagctaag ctgatgaaga agaagaaggt cgaagaagat   2700
```

gcatcatcac tgactgatca agaggaagct acagatctct ccctcggaga taaattggcc 2760
aaagagaact gatcctatgc cgagattttt cttggtttct gagggatttt atgtttctgt 2820
tatatttaat cctattccat cgcatgttta atttatctct gttcgtaaga ataattaaat 2880
aacctcatgg tattggatca aagtttccaa acaaaacaaa attgtattgt caaatattta 2940
atacaagcca aacttgataa acatttagtt ctaggcttga tcacacggat ccgcaaggtt 3000
aagtaattgg ttaaccgaag ggaagggaaa acacctacac gaatcccgga ccgggcctaa 3060
attcttttaa ctagaacacg gcccaatctg tagaccagtt cggcccattg tagtatcaaa 3120
aatattccat aaacgaaatc atttgatttc aaatggagga aatcattaaa ttagcagacg 3180
cggaaaacca ctatctcatc aaaataaatt gcgaaattta ttgaataaac taatgaatca 3240
ataaataaat gaaatggtcc aaccatctaa aaattgattt tctaagatgt cactgtatca 3300
atatcaccca ttcatgttca tataaaccct acccgccagc ataatgcata ttgagtattg 3360
acgacttata aacaaaagaa gaaatcactt acagaaaaat gatttcttga ggaaatagat 3420
cacaggatgt gtatgttgat taatgaccta gggtacaata atgcagtttg attcactact 3480
agacccataa tttttttttt ttaaaaataa aaagggcttt catgacccat aaaaattatt 3540
attatctttt tttcccataa aaattatttg ataattgttt acgtgtttgt ttgttttctc 3600
gttcatattg atatttctct catccgaatt cttgcatttt caacgtgtca attatctttt 3660
taaaactacg taaatactat tatgatacct tgtaggcttg tactgaatat ttgtgagtat 3720
tttaggcttt ataaattctt atgccgactt tgttatcaag ccttcgacac attttctgtg 3780
gcgttcttga gactataaaa tttgggagac gattgaacca ttttgttttt atctataatg 3840
gtttttcttt tgtatccttt atttgatttt ttttcttctt tttttggctg gttctagaga 3900
ccttcttagc cacagtgatt cttctgtcat cagttcatca aatcctgaaa agagcatcat 3960
agc 3963

<210> SEQ ID NO 63
<211> LENGTH: 1239
<212> TYPE: DNA
<213> ORGANISM: Thlaspi arvense

<400> SEQUENCE: 63
atggctccag ggactctcac cgagctcgcc ggagaggcta agctcaactc taaattcgtc 60
cgggacgagg acgaacgtcc caaggtggca tacaacaagt ttagcgacga tatcccggtg 120
atatctctcg ccggactcga cgatgttggt gggaaaagag gagagatctg ccgtaagatc 180
gttgaggctt gcgagaattg gggcgtgttc caggtggtcg atcatggtgt cgataccaat 240
ttggtagagg atatgactcg cctcgctcgc gacttctttg ctttaccacc cgaagagaaa 300
cttagtttcg acatgtctgg tggtaagaaa ggcggcttca tcgtctctag tcaccttcag 360
ggagagactg tgcaagattg gagagagatc gtgacgtact tctcgtaccc ggtgagaaac 420
agagactact cacggtggcc agataagccg gaagggtggg tgaaagtgac ggaggagtac 480
agcgacaaac tgatgggttt agcttgtaag cttcttgagg ttttgtctga agctatgggg 540
ctcgagaaag aagcacttac caatgcttgc gtcgatatgg accaaaagat agttgttaat 600
tattacccta aatgccctca gcctgatctc accctcggac tcaagcgtca cactgatcct 660
ggaaccatca ctttgctgct ccaagaccag gtcggtggat tacaagccac acgcgacgat 720
ggcaaaacat ggataacggt tcagccaatt gagggagctt ttgtcgtgaa tctcggcgac 780

```
catggtcact atttgagcaa cgggaggttc aagaacgcgg atcatcaggc ggtggtgaat    840

tccaactcga gcaggctatc tatagccacg tttcagaatc cggcgcagga tgcaaccgtg    900

tatccgctta aagttagaga aggagagaag ccgatcttgg aggagccaat cacttttgca    960

gagatgtata agagaaagat gggaaaagat ctggagctgg ctcgcctcaa gaagcttgcg   1020

aaagaagaaa atgaccagaa gctggccaaa gaagaacatg acaagaacct ggccaaagaa   1080

gaaaatgatc agaagctggc taaagaagaa catgaccaga agctggccaa agaagaacat   1140

gacaagagcc ttgccaaaga agaaaattac caaaagctgg ccaaagatga acatagccac   1200

acggaagctg ttaagcgtct cggccaaatc ctcgcttag                          1239


<210> SEQ ID NO 64
<211> LENGTH: 412
<212> TYPE: PRT
<213> ORGANISM: Thlaspi arvense

<400> SEQUENCE: 64

Met Ala Pro Gly Thr Leu Thr Glu Leu Ala Gly Glu Ala Lys Leu Asn
1               5                   10                  15

Ser Lys Phe Val Arg Asp Glu Asp Glu Arg Pro Lys Val Ala Tyr Asn
            20                  25                  30

Lys Phe Ser Asp Asp Ile Pro Val Ile Ser Leu Ala Gly Leu Asp Asp
        35                  40                  45

Val Gly Gly Lys Arg Gly Glu Ile Cys Arg Lys Ile Val Glu Ala Cys
    50                  55                  60

Glu Asn Trp Gly Val Phe Gln Val Val Asp His Gly Val Asp Thr Asn
65                  70                  75                  80

Leu Val Glu Asp Met Thr Arg Leu Ala Arg Asp Phe Phe Ala Leu Pro
                85                  90                  95

Pro Glu Glu Lys Leu Ser Phe Asp Met Ser Gly Gly Lys Lys Gly Gly
            100                 105                 110

Phe Ile Val Ser Ser His Leu Gln Gly Glu Thr Val Gln Asp Trp Arg
        115                 120                 125

Glu Ile Val Thr Tyr Phe Ser Tyr Pro Val Arg Asn Arg Asp Tyr Ser
    130                 135                 140

Arg Trp Pro Asp Lys Pro Glu Gly Trp Val Lys Val Thr Glu Glu Tyr
145                 150                 155                 160

Ser Asp Lys Leu Met Gly Leu Ala Cys Lys Leu Leu Glu Val Leu Ser
                165                 170                 175

Glu Ala Met Gly Leu Glu Lys Glu Ala Leu Thr Asn Ala Cys Val Asp
            180                 185                 190

Met Asp Gln Lys Ile Val Val Asn Tyr Tyr Pro Lys Cys Pro Gln Pro
        195                 200                 205

Asp Leu Thr Leu Gly Leu Lys Arg His Thr Asp Pro Gly Thr Ile Thr
    210                 215                 220

Leu Leu Leu Gln Asp Gln Val Gly Gly Leu Gln Ala Thr Arg Asp Asp
225                 230                 235                 240

Gly Lys Thr Trp Ile Thr Val Gln Pro Ile Glu Gly Ala Phe Val Val
                245                 250                 255

Asn Leu Gly Asp His Gly His Tyr Leu Ser Asn Gly Arg Phe Lys Asn
            260                 265                 270

Ala Asp His Gln Ala Val Val Asn Ser Asn Ser Ser Arg Leu Ser Ile
        275                 280                 285

Ala Thr Phe Gln Asn Pro Ala Gln Asp Ala Thr Val Tyr Pro Leu Lys
```

```
    290                 295                 300

Val Arg Glu Gly Glu Lys Pro Ile Leu Glu Glu Pro Ile Thr Phe Ala
305                 310                 315                 320

Glu Met Tyr Lys Arg Lys Met Gly Lys Asp Leu Glu Leu Ala Arg Leu
                325                 330                 335

Lys Lys Leu Ala Lys Glu Glu Asn Asp Gln Lys Leu Ala Lys Glu Glu
            340                 345                 350

His Asp Lys Asn Leu Ala Lys Glu Glu Asn Asp Gln Lys Leu Ala Lys
        355                 360                 365

Glu Glu His Asp Gln Lys Leu Ala Lys Glu Glu His Asp Lys Ser Leu
    370                 375                 380

Ala Lys Glu Glu Asn Tyr Gln Lys Leu Ala Lys Asp Glu His Ser His
385                 390                 395                 400

Thr Glu Ala Val Lys Arg Leu Gly Gln Ile Leu Ala
                405                 410
```

<210> SEQ ID NO 65
<211> LENGTH: 4251
<212> TYPE: DNA
<213> ORGANISM: Thlaspi arvense

<400> SEQUENCE: 65

```
aaaatgtagg gaaaaaaaaa cagagagaat cagatacaga gagacgaaat ccgaatcgga      60
gtctatctat ctacttgaaa ttggtgacag aagaggaaca gagaattgct aataaaattc     120
taagataggc acaaaaaaac aagaacaagt ttcatttgga acaagaagat gactgaaaga     180
aactgcaaga agagaatcat ggaaagacaa aacataccta atgaaaaggg aattttagag     240
tcagaatcag agttactgat tgaaaagata gcctgcgatc tagtgactct tcttgctgat     300
gatggagtct ccattaggat cttgatcgtc ttgcaagcaa caacggctaa agatcaagtg     360
aaagaatttc tgggaaaatc aatctgaatt tcaatatctg agatatcaat aaagaagaga     420
aaggggataa acaattgcga atctcttagg tagcagtatt ataggtatgg ggaaaaggtt     480
accgtttgaa ataaactagc cgttgcgtct aaacggaagg aaggagccgt aatactagcc     540
gttgggtcca ttctctcatg gaaagaaatc aagaatggtt aaagacttaa agtagctgtt     600
tgggttgaaa tctcagtacg ttaggggctt ttacggatta agaaggctgc gattaatagc     660
tcggcccatt tatctctctg ttgcgagttg caagctgcta aaagttttat aagctttttt     720
attcggttat ttgccaatcg tttaaattac tcctatgatt tataaatctt ggaatgtgtg     780
tatgagacga agtattcatt gttttcaatc tatggtgtct gttttatgtt ttgctttttt     840
ttttttaatt aaatatacaa ctcacaattc acaagccatg acaaaacata tcaaaatgtt     900
gataagagta atgaaaacta aatacactag aaaagtcaga tccaacattt cgtcttctcg     960
gattaaggac gatataaata taatatatat agtgaaaaaa aggtttttct tctctgatct    1020
caatgggatt atgtacaaat aaccatgcaa aattgatgat catttggatt tttgtagtgc    1080
aaacccgtaa cgtaacaatt tttgccatgt gaattcaccg agaacgacca ttttttttct    1140
ttttttaata aaaaaatatg caacccattt tttaagacgt ggcattaaat tcaccgtaaa    1200
aaacatttaa ctatattggg catggtgtta aagcaacttt actagaaacg atttatgtac    1260
acaatggaat gtagcgcaga aaatatgatt tattagaaag aaattaaaga cagaagcacg    1320
tataggaagt tgagtaactg cgtgtttcta gaaacagaac ggacggtata gtactgtggt    1380
aggtagcgag cgacctcttc gttcgtcagt cttcacaacc tttgaaaggt ttttcagcta    1440
```

-continued

```
ccagtcatct ccttatatat tggttacctc ttttatctct ctttataaac ttaattagtc   1500
ttttgccttt gtaaccaaac actcacaaaa aaatataaaa atggctccag ggactctcac   1560
cgagctcgcc ggagaggcta agctcaactc taaattcgtc cgggacgagg acgaacgtcc   1620
caaggtggca tacaacaagt ttagcgacga tatcccggtg atatctctcg ccggactcga   1680
cgatgttggt gggaaaagag gagagatctg ccgtaagatc gttgaggctt gcgagaattg   1740
gggcgtgttc caggtggtcg atcatggtgt cgataccaat ttggtagagg atatgactcg   1800
cctcgctcgc gacttctttg ctttaccacc cgaagagaaa cttagtttcg acatgtctgg   1860
tggtaagaaa ggcggcttca tcgtctctag tcaccttcag gtaaagccac acaatttacg   1920
ttacgttttc atgcgactca aacttttata ctgtagactt aattagacct ataatcacat   1980
ttcgggccgc aaaaatacga attatgtttt gatcttgtag ttaaatacga aataatgatg   2040
ataaacgcag ggagagactg tgcaagattg gagagagatc gtgacgtact tctcgtaccc   2100
ggtgagaaac agagactact cacggtggcc agataagccg gaagggtggg tgaaagtgac   2160
ggaggagtac agcgacaaac tgatgggttt agcttgtaag cttcttgagg ttttgtctga   2220
agctatgggg ctcgagaaag aagcacttac caatgcttgc gtcgatatgg accaaaagat   2280
agttgttaat tattacccta aatgccctca gcctgatctc accctcggac tcaagcgtca   2340
cactgatcct ggaaccatca ctttgctgct ccaagaccag gtcggtggat tacaagccac   2400
acgcgacgat ggcaaaacat ggataacggt tcagccaatt gagggagctt ttgtcgtgaa   2460
tctcggcgac catggtcacg tacgtcagta tactctctca atctctctgc ttatattttt   2520
ctccgtttgt gattttgact tggccaaact tgcttgtcta ttgaagtatt tgagcaacgg   2580
gaggttcaag aacgcggatc atcaggcggt ggtgaattcc aactcgagca ggctatctat   2640
agccacgttt cagaatccgg cgcaggatgc aaccgtgtat ccgcttaaag ttagagaagg   2700
agagaagccg atcttggagg agccaatcac ttttgcagag atgtataaga gaaagatggg   2760
aaaagatctg gagctggctc gcctcaagaa gcttgcgaaa gaagaaaatg accagaagct   2820
ggccaaagaa gaacatgaca agaacctggc caaagaagaa aatgatcaga agctggctaa   2880
agaagaacat gaccagaagc tggccaaaga agaacatgac aagagccttg ccaaagaaga   2940
aaattaccaa aagctggcca aagatgaaca tagccacacg gaagctgtta agcgtctcgg   3000
ccaaatcctc gcttagagtc cttgttgctc cgctgtgttg gtttcggttt ggttttgtaa   3060
tttgttttat cgtcaagtta acgaacgtgg tgtgtttgag tttcttctca atatagaaat   3120
aatgacaagt aatgcaattg tacttgctct gtttgtttgg ttacttttta tgtcagaagc   3180
acatacatta ctttctcgct attcgtgtgg atgtaaattt aataagataa tgacggttaa   3240
accggtagta ggaccatttt atttctttat ggtttcttta cgccacgtgt ccgtctaaaa   3300
gaaacttacc ttgaaaaagt gaataattca tccctctttt tcaagtttcg attttttttt   3360
ctcttttcga gtcattttgt tctaatcaac gacgacgcga cggagatgaa tccttttcac   3420
ggtgccgacg ggaagcaaag accggcgatg tatccggaca tcgatcaatc aattccggat   3480
aatcctttcg ctcagacaaa cccttatgcc gcttctgccc ctaatctcta cccttctccc   3540
tcctcgaaca atctcgggcc taatcttttc ccggaccacg gagatgcatc caacaaccag   3600
tcaccgtctg ctccgcctca agcgacggag gaggttctca tccgtgtccc gggctccatt   3660
ctcaacctta tcgacaaatc ctacagcgtc gaactcgcgt gcggtgactt caccatcgtt   3720
cgaatcgtcc agggccagaa catcgtcgcc gttctcgcca acgtcgccga tgagattcaa   3780
tggccgttga acaagagcga ggtagcagcg aaggtcgatg ggtcgcacta tttcttttca   3840
```

atccacccgc caaaggaaga gggtcacgga tctgggtccg actccgatgg tgagaagcag 3900
gggaaaaaga gcaatccgaa accggaggac gaaattctca attacggatt gaccattgct 3960
tcgaaagggc aagagaacgt attaaacgag ctcgaccggg ttctccggga ctattgctgc 4020
ttcacggagc agaggatgtc tgaaaaggcg aaggagacgg gagaggaggt gctgggaaac 4080
tccatggctg cggcgacttc gccggaggag ctgaagggtg agaggaaaga catcgtggag 4140
ggtcaatgcg cggcgtattg gaccacactc gcgcctaaca tcgaggatta cagtagcaag 4200
actgctaagt tgatagcttc cgggtcaggt cagctgatca gagggatact t 4251

<210> SEQ ID NO 66
<211> LENGTH: 1545
<212> TYPE: DNA
<213> ORGANISM: Thlaspi arvense

<400> SEQUENCE: 66
atggccactc tcttactcac aatcctcctc cccactttcc tcttcctcct cgtcctcctc 60
ctttctctcc gccgcaacca caaccgcagt agccgtctcc caccaggccc aaaaccatgg 120
cccatcctcg gaaacctccc tcacatgggt cctaaacccc atcgaaccct agccgccatg 180
gtaaccacct acggtccaat cctccacctc cgattagggt tctccaacgt cgtggttgct 240
gcgtctaaat ccgtggccga acagttcttc aaaatccatg atgccaattt cgctagccga 300
ccaccaaatt caggagccaa acacatggca tataactatc aagatcttgt ctttgcgcct 360
tacggacaac gatggagaat gttgaggaag attagttctg ttcatttatt ttcagctaaa 420
gctcttgaag attacaagca tgttcggcag gaagaggtag gaacgctcac gcgcgagcta 480
gtggatgcag gcacgaaacc cgtaaactta ggccagttgg tgaacatgtg tgtggtcaac 540
gcgcttggaa gagagatgat cggacggcgt ctgttcggcg ccggagctga tcacaaagcg 600
gaggagtttc gatcgatggt gacggaaatg atggctctcg ccggagtatt caacctcgga 660
gatttcgtgc cggctctgga ttggttagat ttacaaggcg ttgctggtaa aatgaaacgg 720
ctacacaaaa gattcgacac ttttctatcg tcgattttga aggagcacga gatgatgcac 780
ggtcaagatc aaaagcataa agatatgctc agcactttaa tctcgctcaa gggaactgat 840
tttgacggtg acggcggaag cctaacggat actgagatca aagccttgct cttgaacatg 900
tttacggctg gaactgacac gtcagcaagt acggtggact gggccatagc tgaactgata 960
cgacacccgg atgcaatgac cagagcccaa gaagaacttg attcagttgt aggccgcgat 1020
aggcccatta acgagtcaga cctttctcgg cttccttatc ttcaggcggt tatcaaagag 1080
aatttcaggc ttcatccgcc gacaccactc tcgttaccac acatcgcatc agagagctgt 1140
gagatcaacg gctaccatat cccgaaagga tcgactcttt taacaaacat atgggccata 1200
gcccgtgacc cggaacaatg gtccgacccg ttatcgtttc gacccgagag atttttacag 1260
ggtggagaaa aatccggcgt cgatgtgaaa ggaagcgatt tcgagcttat accgttcgga 1320
gccgggagga gaatctgcgc tgggctcagt ttagggctac ggatgattca gttactgacg 1380
gcgacgctgg ttcacggatt tgattgggaa ttggccggag gaattccgcc ggagaagctg 1440
aatatggagg agacttatgg gattactctg caaagagcag ttcctttggt ggtgcatcct 1500
aagccaaggt tggctcccag tgtttacgaa ctcgggtcgc gctaa 1545

<210> SEQ ID NO 67
<211> LENGTH: 514
<212> TYPE: PRT

<213> ORGANISM: Thlaspi arvense

<400> SEQUENCE: 67

```
Met Ala Thr Leu Leu Leu Thr Ile Leu Leu Pro Thr Phe Leu Phe Leu
1               5                   10                  15

Leu Val Leu Leu Leu Ser Leu Arg Arg Asn His Asn Arg Ser Ser Arg
            20                  25                  30

Leu Pro Pro Gly Pro Lys Pro Trp Pro Ile Leu Gly Asn Leu Pro His
        35                  40                  45

Met Gly Pro Lys Pro His Arg Thr Leu Ala Ala Met Val Thr Thr Tyr
    50                  55                  60

Gly Pro Ile Leu His Leu Arg Leu Gly Phe Ser Asn Val Val Val Ala
65                  70                  75                  80

Ala Ser Lys Ser Val Ala Glu Gln Phe Phe Lys Ile His Asp Ala Asn
                85                  90                  95

Phe Ala Ser Arg Pro Pro Asn Ser Gly Ala Lys His Met Ala Tyr Asn
            100                 105                 110

Tyr Gln Asp Leu Val Phe Ala Pro Tyr Gly Gln Arg Trp Arg Met Leu
        115                 120                 125

Arg Lys Ile Ser Ser Val His Leu Phe Ser Ala Lys Ala Leu Glu Asp
    130                 135                 140

Tyr Lys His Val Arg Gln Glu Glu Val Gly Thr Leu Thr Arg Glu Leu
145                 150                 155                 160

Val Asp Ala Gly Thr Lys Pro Val Asn Leu Gly Gln Leu Val Asn Met
                165                 170                 175

Cys Val Val Asn Ala Leu Gly Arg Glu Met Ile Gly Arg Arg Leu Phe
            180                 185                 190

Gly Ala Gly Ala Asp His Lys Ala Glu Glu Phe Arg Ser Met Val Thr
        195                 200                 205

Glu Met Met Ala Leu Ala Gly Val Phe Asn Leu Gly Asp Phe Val Pro
    210                 215                 220

Ala Leu Asp Trp Leu Asp Leu Gln Gly Val Ala Gly Lys Met Lys Arg
225                 230                 235                 240

Leu His Lys Arg Phe Asp Thr Phe Leu Ser Ser Ile Leu Lys Glu His
                245                 250                 255

Glu Met Met His Gly Gln Asp Gln Lys His Lys Asp Met Leu Ser Thr
            260                 265                 270

Leu Ile Ser Leu Lys Gly Thr Asp Phe Asp Gly Asp Gly Gly Ser Leu
        275                 280                 285

Thr Asp Thr Glu Ile Lys Ala Leu Leu Leu Asn Met Phe Thr Ala Gly
    290                 295                 300

Thr Asp Thr Ser Ala Ser Thr Val Asp Trp Ala Ile Ala Glu Leu Ile
305                 310                 315                 320

Arg His Pro Asp Ala Met Thr Arg Ala Gln Glu Glu Leu Asp Ser Val
                325                 330                 335

Val Gly Arg Asp Arg Pro Ile Asn Glu Ser Asp Leu Ser Arg Leu Pro
            340                 345                 350

Tyr Leu Gln Ala Val Ile Lys Glu Asn Phe Arg Leu His Pro Pro Thr
        355                 360                 365

Pro Leu Ser Leu Pro His Ile Ala Ser Glu Ser Cys Glu Ile Asn Gly
    370                 375                 380

Tyr His Ile Pro Lys Gly Ser Thr Leu Leu Thr Asn Ile Trp Ala Ile
385                 390                 395                 400
```

```
Ala Arg Asp Pro Glu Gln Trp Ser Asp Pro Leu Ser Phe Arg Pro Glu
                405                 410                 415

Arg Phe Leu Gln Gly Gly Glu Lys Ser Gly Val Asp Val Lys Gly Ser
            420                 425                 430

Asp Phe Glu Leu Ile Pro Phe Gly Ala Gly Arg Arg Ile Cys Ala Gly
        435                 440                 445

Leu Ser Leu Gly Leu Arg Met Ile Gln Leu Leu Thr Ala Thr Leu Val
    450                 455                 460

His Gly Phe Asp Trp Glu Leu Ala Gly Gly Ile Pro Pro Glu Lys Leu
465                 470                 475                 480

Asn Met Glu Glu Thr Tyr Gly Ile Thr Leu Gln Arg Ala Val Pro Leu
                485                 490                 495

Val Val His Pro Lys Pro Arg Leu Ala Pro Ser Val Tyr Glu Leu Gly
            500                 505                 510

Ser Arg


<210> SEQ ID NO 68
<211> LENGTH: 7303
<212> TYPE: DNA
<213> ORGANISM: Thlaspi arvense

<400> SEQUENCE: 68

ctctttttcg tttaaaaata aatataaaat cagttcttta tgaaattcaa atgcggtcta      60

tgatccataa acgtggcctt ggcatttacc cgaatcccat ccgtctccat catttgcctt     120

tcgatcgtat atggaagttg gaacgacgtc gacgccaatt ctgcggtaat cgtaatagta     180

ttaaaattgt ggagccaacg gaaacacaat gcatttttgc atttccatgc acacctttgt     240

ttaattttct aaagagaaat tagtatatat ataatttgta ttgatctaat tttttaaat     300

ccagttcgac tttgaaggaa tttaagttcg acttgtatat aattcttgtc aagacctcga     360

tcccgcatcc agtaataaaa taataatgat tgcaaaggac aacactaata aagaaaatgc     420

tataacgaga aagaattctg aaagacgtac taacgaaaat tgtgtcctag tgaccataac     480

aggagtatca tccaacacta tgaaccacat atcttaccta cccttcacga gtactctcca     540

gctaccacga ttaacgataa atatatggtc cagagaattt ccgaatgatc cgctaatatt     600

cgaataactg aaattatcaa gcagtgagtt taattttttg taaccgtata tctttttagc     660

cttttaaaat gataaactca tttatgaatt aattgaatat atattacgtt taacccatcc     720

attcatattg tcacatattt ttgaattttg ttaacttcct ttttatttct tttcgtattt     780

tctcaaaatc atatgtagtc attatatata cacacaaaaa aaagagatag atattgacta     840

aaaggtagtg aaaaattaca aatctataga cattacacca taaaaaccat ttttcaatag     900

acaaatatat ggttttacta tgtgttgcgg gaatcaacgg aatcaacttg atgttagtat     960

ttacaaatag acgataaatc ttctaaaatt aattataaac acgtgaaagc ttaaagacat    1020

tgtgtaatat cttctgataa tttttaatgt tcaagacagt attttgatta tgaagcttgg    1080

tcgaaaccaa aaacaaaaat caaaagacaa gaagaattga agaagtgaag aacacaacgt    1140

ttcgttttaa accatacaaa aaagtggttc acgatgtgat cttaaatgta tatctcttta    1200

ataatcactt ttccgttgaa aaggagagga aaaaatcact gtagacttag tttttggaaa    1260

gtatttctca tccccttttc gcaaggggat tgtgtttttt tttatcgaaa atacatggtc    1320

catggttaaa tgggtcaaga gtataattta gtactataat tttataatca aaatgttcta    1380

agttctatct tatatttata taaaaataga agaagatgtt ctaacttata tcatattaat    1440
```

-continued

```
tagtggcttt acttaaccaa aagattgtta cttatatttt tcaacctacg ttctactaac   1500
gactaagtat tcagtaagat atatagctac ctttcatagt attaatcaaa tcttacgaac   1560
cagaaagctc acctaccatt cgactctctt tcgcttccaa cttattctac ataagataag   1620
attttctcat ctacatattc gtatgtttga cgtcgtggtg ggatccatga tttatccact   1680
ttaacaatag aaaacaaaaa cctaatcaga gaaatataag ctcttatgtt ttaaaaggaa   1740
aaaagcaatg gaaattgaag ctttttaacc aacaaaaaaa ccagagaaat atacattatt   1800
ataattttat atattctgtc aagacgataa ttatcaatgt atatgtgtac taataatgtt   1860
attactcgat tacacccgta gttaataagc cacttaaaat taactattta caaaaaaaaa   1920
aaatcttttg gtgactttga tttgatggtg tgaaaatcta catctcattc ttcagtattc   1980
agatgattat aacaaaatgt tttttttcta aacttgcatt tccgataatc taatactaaa   2040
aaatgtatcg gcagaaagaa tactagcttg aaaaaccttt ttataaaaaa gaaaagtaaa   2100
tatactagct aatggtgccc aacaggagat cgaagtggtg atgtttaatt agttaaaggt   2160
aaaagaaaac ctatttctaa cttttgatga aacaataaaa acaaaaaaat ctttctaacc   2220
taaccgagac atgcatagat agattattgg atttcgcaaa aaaaaaaaaa tcacccttta   2280
tttatagctt atgtttgtta ttcctcattt ctcacttacc attcaaaccc aacactatgg   2340
ccactctctt actcacaatc ctcctcccca ctttcctctt cctcctcgtc ctcctccttt   2400
ctctccgccg caaccacaac cgcagtagcc gtctcccacc aggcccaaaa ccatggccca   2460
tcctcggaaa cctccctcac atgggtccta aaccccatcg aaccctagcc gccatggtaa   2520
ccacctacgg tccaatcctc cacctccgat tagggttctc caacgtcgtg gttgctgcgt   2580
ctaaatccgt ggccgaacag ttcttcaaaa tccatgatgc caatttcgct agccgaccac   2640
caaattcagg agccaaacac atggcatata actatcaaga tcttgtcttt gcgccttacg   2700
gacaacgatg gagaatgttg aggaagatta gttctgttca tttattttca gctaaagctc   2760
ttgaagatta caagcatgtt cggcaggtaa cagtattagt tataaacgtt attctcattt   2820
cctaacgcta taactcacct atatatagag atagtcatgc cgttaatttt tatatttatg   2880
attagtttat tttatatcat tatttaactg tggtacgaac tctagaattt aataaaataa   2940
atttagagaa gtacgtatag agatttttaa tggtggagtg gcgttttttt gtttagtatt   3000
atgttttcag tgttgataaa ataaccaaaa aataataatg ttagtaatcg ttaaaacaca   3060
aaacaaattt tgttgataaa acgagattta tgacttttta tcaacagatt ttgttttgaa   3120
aaacgagaac tagaacataa tactataaca agttccaatc ctgtagaact agtcaccaag   3180
tcataaaact ggaacttttt tatcaaaaaa tattgtttcg tttttcacga tttgcaacct   3240
ttttcgttat tttaacaata ttggaaacat tgcaacctat aaaccccaat ttaaacgagt   3300
aaaacaaaaa aaaaatacta aagtaggcct aagtgcaact gtgcaatact gtcgttgcca   3360
tagacgtaca gtacgatgta tccttgataa taccatggaa aaatggaaag ttcatcagaa   3420
acccaaggac aaaatacttc aatatgtatg gaccacattt ttccttaaat aagatgtatc   3480
aacgagtcac cacgagacac gagtgattca ctttcagtag tataagattg tttttgcatt   3540
ttcgtttaaa aaaatgtaga tgaacataca agatgatcct gacaatttat ttataggtag   3600
attacttttc attgatggaa caattgaata tacaaaaatg taaactagac ttcagaattt   3660
taagtttagg ggttaaagta acttaactag ggtctaaagt gtatataggc tttatatttg   3720
agcttaggat ttagatattg gttaattagt ggattttaat cgatttaaat ttagaagcaa   3780
gattatttgt tattaagtta ttacttttta aaatcatagt taaagtcatg tgttaggggt   3840
```

ttaataaatt ctaaatatta gttgaaattt aatgttatta atttttataa gaaatcgatt 3900
ttacattcga ttttagtttt taacatcttt gtaagtgctt ttgagttact aaagcaactt 3960
tcttatttaa aaacaggctt attgaatttt ttttaaaaat tacgttttga aagcatttga 4020
gtaattgtaa atcttaagta aatttataaa tcaattataa ccctaactaa aatttattaa 4080
tcaactaaac ttcatacacc aataatccta cttagagttt tataaggttt ttgctgttaa 4140
tcaaacatca agatttaaaa atgagtaaaa taaattccaa aatcaactaa tatacccaaa 4200
attttccatt tatagtttaa gtagagcaaa attgaatttt acaggaagag gtaggaacgc 4260
tcacgcgcga gctagtggat gcaggcacga aacccgtaaa cttaggccag ttggtgaaca 4320
tgtgtgtggt caacgcgctt ggaagagaga tgatcggacg gcgtctgttc ggcgccggag 4380
ctgatcacaa agcggaggag tttcgatcga tggtgacgga aatgatggct ctcgccggag 4440
tattcaacct cggagatttc gtgccggctc tggattggtt agatttacaa ggcgttgctg 4500
gtaaaatgaa acggctacac aaaagattcg acacttttct atcgtcgatt ttgaaggagc 4560
acgagatgat gcacggtcaa gatcaaaagc ataaagatat gctcagcact ttaatctcgc 4620
tcaagggaac tgattttgac ggtgacggcg gaagcctaac ggatactgag atcaaagcct 4680
tgctcttggt tcgtataacg atcaattaat tgtagtatta atttcatact ttatgaaaag 4740
ttattgattc cttcttaaat acagaacatg tttacggctg gaactgacac gtcagcaagt 4800
acggtggact gggccatagc tgaactgata cgacacccgg atgcaatgac cagagcccaa 4860
gaagaacttg attcagttgt aggccgcgat aggcccatta acgagtcaga cctttctcgg 4920
cttccttatc ttcaggtata cccttaaccg ggaattagga attgtcttgg ttaacgagct 4980
ctattgttaa tccggtttaa acggttttgt tttaaaaaca ggcggttatc aaagagaatt 5040
tcaggcttca tccgccgaca ccactctcgt taccacacat cgcatcagag agctgtgaga 5100
tcaacggcta ccatatcccg aaaggatcga ctcttttaac aaacatatgg gccatagccc 5160
gtgacccgga acaatggtcc gacccgttat cgtttcgacc cgagagattt ttacagggtg 5220
gagaaaaatc cggcgtcgat gtgaaaggaa gcgatttcga gcttataccg ttcggagccg 5280
ggaggagaat ctgcgctggg ctcagtttag ggctacggat gattcagtta ctgacggcga 5340
cgctggttca cggatttgat tgggaattgg ccggaggaat tccgccggag aagctgaata 5400
tggaggagac ttatgggatt actctgcaaa gagcagttcc tttggtggtg catcctaagc 5460
caaggttggc tcccagtgtt tacgaactcg ggtcgcgcta aacctaagtt tgcttgccag 5520
caaaggtagg tcttgcacgg aggttaaaaa gcttgtttct ggaatttcct caaataaagt 5580
ttaaaatagc gtaatgtggt ccggagtata aggctatgtt atctgcgtcg tcgatccgat 5640
gccgaggaag aagacgatgg ctctcgaaag caaacctgat ccgcggaccc gacccgtttt 5700
atacgactaa gattttcatt cataatagta tatgataatt ttaaatttta aatttttatc 5760
gtgtaatttt tacagtactg aattttgtat taaagcatct tccttactgt accagatgca 5820
tttacaactc tagatttttt tctgccagca aaatcagatt tttccatctt ttttatatat 5880
attaaagtgg aacaccacta caacctgcaa ttctgcaaca catgttacat tacacattca 5940
tttggcgttt tccaataagt tataaacagt gaatgtttgt agacaataga caattataaa 6000
cagtaaatca tgtttcccct ctgttttcaa aagtgaaaaa gtttctaaat atgtatatgt 6060
attatacttt aataactcgt cggaccatac tattcccacc ttctaattaa ccttgtatac 6120
actggtttac caacaccatg tctcttcctt gttcaaaaaa actccatgtc tctttaatta 6180

```
cttttttttct tcttctcgaa atttgttgat aatagaaact agtcgaagtt tctctttaat   6240

tctgttttca tttaatataa gcgtcgttgt tataatttca aatttcaaaa aggtacttac   6300

aagttcacac ggagagctac aataatggaa aagctgactc aagaagggct agaaaagaaa   6360

caagagtcac ggaacaagta gtcactttca atctcagtat acagtacact agtgtctgct   6420

tgcatctctc tctctctctc tctctctctc ttggtctaaa aatatcagaa gagaaaatct   6480

ctctatctat ttatctctct ttccctttct ctttcaacaa gacaatagtg acgacatttg   6540

tgtttccatg gctgttctgg ttctctatct cctcggtttc ctcatggctg gccactgtag   6600

taagaaactc tcgctcttca ctacattact tatctctctc ttttttttaa atgtgtctat   6660

tgatgggaac taaatttcaa taaaattctt tcggctctta gctagttatc actacatctc   6720

ttaagttcac gaccctcaaa aagaaggttt cctcaaatct tcttggcttc acacttacaa   6780

tttgtttcat ttggtaggcg cgacgtggtg tgtgtgcaaa acaggactga gtgactcagt   6840

gctacaaaag acattagact atgcttgcgg gaatggagct gactgtaacc caactcaccc   6900

aaaagggtct tgcttcaacc ccgacaatgt tagggctcat tgtaactatg ctgtcaatag   6960

cttctatcaa aagaaaggtc aagcttctga atcttgtaat ttcactggaa ctgccactcc   7020

taccacaact gatcccagta agtttccctc agaaatctga tgcttttact gtgattgttt   7080

acaactctaa atagtttttg gagtcacaga aagtccaccg tcattttggt tacttaaaat   7140

gatttggtat tagagattag tgaatattaa agtttaaagt aacaatttgg ttttagtaat   7200

gtatgaggag gatctgattt ggttacagta cactaaatgt tttttttttt gtgtgtgtgc   7260

tttttgctt tgatgggtga acattttgtc acaggctact cag                      7303
```

<210> SEQ ID NO 69
<211> LENGTH: 1581
<212> TYPE: DNA
<213> ORGANISM: Thlaspi arvense

<400> SEQUENCE: 69

```
atggatgaat caagtatttt tacggcagag aaagtgatcg gagctgagaa aagagagctt     60

caagggctgc ttaaggcggc ggtgcaatct gtggagtgga cttatagtct cttctggcaa    120

ctttgtcctc aacaaagggt tttgctgtgg gagaatggat actacaacgg tgcaataaag    180

acgaggaaga caactcagcc ggcggaagtg acggcggaag aggctgcgtt agagaggagt    240

cagcagctaa gggaacttta cgaggcccctt ttggccggag agtcctcatc ggaagctagg    300

gcatgcacgg cattatcgcc ggaggatctg acggagactg aatggtttta tctaatgtgt    360

gtctctttct ctttccctcc tccttccggg atgccaggaa aggcgtatgc gaggaggaaa    420

cacgtatggc tatgtggtgc aaatgaggtt gacagtaaaa tcttttctag ggctattctc    480

gcaaagagtg ccaaaatcca gcagacagtg gtttgcattc ccatgcttga tggcgttgtg    540

gaactaggca caacgaacaa ggtaaaagaa gatatagcgt ttgttgagct cataaagagt    600

tttttccata accaccccaa gtcaaaccca aaagctgctc tttctgaaca ctccatcaac    660

gaagagcacg aagaagacga agaacaagaa gaagaagaag aagaagaagt agaagaagaa    720

atgacaatgt cagaggagat aaggcttggc tctcctgatg atgatgacgt ctccaatcaa    780

aacctactct ctgatttcca tgtagaatca acccacactt tagacacaca catggacatg    840

atgaatctaa tggaggaggg tggaaactat tctcagacag tatcaacact tcttatgtca    900

caacccacga gtcttttttc agattcagtt tccacatctt cttacatcca atcatcattt    960

gccacatgga aggctgataa ttttaaagag catcagcgag tggaaactaa atcgacgtcg   1020
```

tcgtcgcaat ggatgctcaa acacataatc ttgagagttc ctttactcca cgaccacact 1080
aaagaaaaga ggctgcctcg agaagagctt aatcacgtgg tggcagagcg ccgcaggaga 1140
gagaagctga atgagagatt cataacactg agatcattgg ttccctttgt gaccaagatg 1200
gataaagtct caattcttgg agacaccatc aactacgtaa accatcttcg aaatagggtc 1260
caagagctgg agactaatca tcacgaacaa aaacataagc ggatgcgtag ctgtaaggga 1320
aaaacgtggg aagaggtcgt tgaggtttcc atcatagaga gtgatgtttt gttagagatg 1380
agatgcgagt accgagatgg tctattgctc gacatccttc aggttcttaa ggaacatggt 1440
atagagacta ctgcagttca taccgcggtg aacgagcgtg atttcgaggc cgagataagg 1500
gctatggtga gagggaagaa accaagcatt gctgaggtca aaagagccat ccatcaaact 1560
atatccaata ttaaactata g 1581

<210> SEQ ID NO 70
<211> LENGTH: 526
<212> TYPE: PRT
<213> ORGANISM: Thlaspi arvense

<400> SEQUENCE: 70

Met Asp Glu Ser Ser Ile Phe Thr Ala Glu Lys Val Ile Gly Ala Glu
1 5 10 15

Lys Arg Glu Leu Gln Gly Leu Leu Lys Ala Ala Val Gln Ser Val Glu
20 25 30

Trp Thr Tyr Ser Leu Phe Trp Gln Leu Cys Pro Gln Gln Arg Val Leu
35 40 45

Leu Trp Glu Asn Gly Tyr Tyr Asn Gly Ala Ile Lys Thr Arg Lys Thr
50 55 60

Thr Gln Pro Ala Glu Val Thr Ala Glu Glu Ala Ala Leu Glu Arg Ser
65 70 75 80

Gln Gln Leu Arg Glu Leu Tyr Glu Ala Leu Leu Ala Gly Glu Ser Ser
85 90 95

Ser Glu Ala Arg Ala Cys Thr Ala Leu Ser Pro Glu Asp Leu Thr Glu
100 105 110

Thr Glu Trp Phe Tyr Leu Met Cys Val Ser Phe Ser Phe Pro Pro Pro
115 120 125

Ser Gly Met Pro Gly Lys Ala Tyr Ala Arg Arg Lys His Val Trp Leu
130 135 140

Cys Gly Ala Asn Glu Val Asp Ser Lys Ile Phe Ser Arg Ala Ile Leu
145 150 155 160

Ala Lys Ser Ala Lys Ile Gln Gln Thr Val Val Cys Ile Pro Met Leu
165 170 175

Asp Gly Val Val Glu Leu Gly Thr Thr Asn Lys Val Lys Glu Asp Ile
180 185 190

Ala Phe Val Glu Leu Ile Lys Ser Phe Phe His Asn His Pro Lys Ser
195 200 205

Asn Pro Lys Ala Ala Leu Ser Glu His Ser Ile Asn Glu Glu His Glu
210 215 220

Glu Asp Glu Glu Gln Glu Glu Glu Glu Glu Glu Glu Val Glu Glu Glu
225 230 235 240

Met Thr Met Ser Glu Glu Ile Arg Leu Gly Ser Pro Asp Asp Asp Asp
245 250 255

Val Ser Asn Gln Asn Leu Leu Ser Asp Phe His Val Glu Ser Thr His
260 265 270

```
Thr Leu Asp Thr His Met Asp Met Met Asn Leu Met Glu Glu Gly Gly
        275                 280                 285

Asn Tyr Ser Gln Thr Val Ser Thr Leu Leu Met Ser Gln Pro Thr Ser
    290                 295                 300

Leu Phe Ser Asp Ser Val Ser Thr Ser Ser Tyr Ile Gln Ser Ser Phe
305                 310                 315                 320

Ala Thr Trp Lys Ala Asp Asn Phe Lys Glu His Gln Arg Val Glu Thr
                325                 330                 335

Lys Ser Thr Ser Ser Ser Gln Trp Met Leu Lys His Ile Ile Leu Arg
            340                 345                 350

Val Pro Leu Leu His Asp His Thr Lys Glu Lys Arg Leu Pro Arg Glu
        355                 360                 365

Glu Leu Asn His Val Val Ala Glu Arg Arg Arg Arg Glu Lys Leu Asn
    370                 375                 380

Glu Arg Phe Ile Thr Leu Arg Ser Leu Val Pro Phe Val Thr Lys Met
385                 390                 395                 400

Asp Lys Val Ser Ile Leu Gly Asp Thr Ile Asn Tyr Val Asn His Leu
                405                 410                 415

Arg Asn Arg Val Gln Glu Leu Glu Thr Asn His His Glu Gln Lys His
            420                 425                 430

Lys Arg Met Arg Ser Cys Lys Gly Lys Thr Trp Glu Glu Val Val Glu
        435                 440                 445

Val Ser Ile Ile Glu Ser Asp Val Leu Leu Glu Met Arg Cys Glu Tyr
    450                 455                 460

Arg Asp Gly Leu Leu Leu Asp Ile Leu Gln Val Leu Lys Glu His Gly
465                 470                 475                 480

Ile Glu Thr Thr Ala Val His Thr Ala Val Asn Glu Arg Asp Phe Glu
                485                 490                 495

Ala Glu Ile Arg Ala Met Val Arg Gly Lys Lys Pro Ser Ile Ala Glu
            500                 505                 510

Val Lys Arg Ala Ile His Gln Thr Ile Ser Asn Ile Lys Leu
        515                 520                 525
```

<210> SEQ ID NO 71
<211> LENGTH: 5726
<212> TYPE: DNA
<213> ORGANISM: Thlaspi arvense

<400> SEQUENCE: 71

```
atctaatcaa gagaagctag ctaacaatat cgaagggaag acatgaacac atcctcactt     60

ttgcctaatc gaatgaaagc taaaaatgga tctagggttt aagggatcta acgatggaaa    120

gcaaaggact caagagaacg gcggctagga acggcggaac gacggcggct ctcctcagcg    180

gcggcggtcg gcggcgaaaa cgaacggcgg cggcggcttg ctcggttagg gttcctaggt    240

tatatctctg agtgctttgg gagttatgat ggaaaaccta attctctaac tctgtttata    300

tagggaagac tcaggaaaaa tcctaatatc cttttctctt gggcttctga cacatgaacc    360

tttccttttc ctattgagcc tagatccagg acgttacaac tagaatcaga atcgaacaac    420

aagcgtatgc gcttaagaaa tgatttttac tcacactata tgggcgcgca tggcattgtc    480

gtaagaatta aataagcttc gtcccactcc ttaatggatt tacgcacaca gtcaatccac    540

gtggttgtca taactaaata taattggtga aaaaactaat ttaaagacaa agtaagaagc    600

ggaaaccgaa ggaaaagcca aacaacatta tgtttatcga caaaaaagcc aaaacaacat    660
```

```
ttaatgttaa tttttgtcca aaccaggaat acatcactca tacggtcata tataccatac    720
cccaaattgt atgtactaca tgtgtacgta actgatttat gtatatctat ctatttctct    780
tttattgtag ggtcaaaat ctacctatcg atatttataa ataggatttt ataagacatt    840
gttaaaatgg aaaacatggt agctacttgg ccagcgatta acatcaataa ttaaaaatac    900
gaattgtgaa acatctcact ctcttccttt tatcacacca aaccacttct ctttctttac    960
ttaccggtca ggtcaacaat tctaccattc cctttattta gttttttttt ttcatctatc   1020
tctcttttca tttttaactt ttaaaaaata ttagtccgaa aatcgcactc ttttatattc   1080
gttgatgggc attaaaatat tgtaaaaatt aaaaaaaatg tgtaaattaa aacgcaattt   1140
gtttgcacct gcagcagtag taacacacaa gtcaaagcaa tgtctgtttt ctcttgtatg   1200
tcggttagct attttatgta ctgaaatatg ttattctttc tgaccaaaac atattaagaa   1260
atttgcattc tgtaatttga tttatccaat cagtagagga cacgtaacca agataattag   1320
atatttttat tctatctgta tactactaat tcatccaacg tctgttggac gaccaaccag   1380
tcaaaactca taaaagtcaa cttttactac atcgtgaatt ttttggtcat gcatttatat   1440
acacatacat ggaagaaaaa acaatacttt acctatgtca aaatgctgca aaagcattaa   1500
gatggtatgt atacatacat attgatataa cagtggtccc atatatcatt ttaaatcatc   1560
ataaagagta tccatcttct ttcatattaa catccccttc aaagttataa gatttttctc   1620
tcttcattag agagagagag agagagaatt aacacaagtt ttaatctccg ggaaagatgg   1680
atgaatcaag tatttttacg gcagagaaag tgatcggagc tgagaaaaga gagcttcaag   1740
ggctgcttaa ggcggcggtg caatctgtgg agtggactta tagtctcttc tggcaacttt   1800
gtcctcaaca aaggttcttt ttttttttta ataaatttca tcgatctctc acaataaaaa   1860
ccctaaattt tatatcattt attattatat gtttaactac ataattatca gtattttaac   1920
cgtccatgtg ctttatttgg ttccatttct gtctcatatt ttacttgagg ttcagactgc   1980
cgagcacatc tctcgtttgt ctcgaatctg tgagactttt tcgtttattg gcacttctgt   2040
gtcaattgag ttatactgaa gtaattatat gtttaaatga attagggttt tgctgtggga   2100
gaatggatac tacaacggtg caataaagac gaggaagaca actcagccgg cggaagtgac   2160
ggcggaagag gctgcgttag agaggagtca gcagctaagg gaactttacg aggccctttt   2220
ggccggagag tcctcatcgg aagctagggc atgcacggca ttatcgccgg aggatctgac   2280
ggagactgaa tggttttatc taatgtgtgt ctctttctct ttccctcctc cttccgggta   2340
cccaactctc tctctctctc tctctctctc tctctctctc tctctctctc tctctctctt   2400
ttgtctatac tgaagtttct taatttatct ttttatcatc tcctactgaa gacaaaaata   2460
gtattgtgtg ttaaatgcga atcacgaata ttgtggaagc attaaaaaca aactgaggag   2520
gttgagttac tgaaagaaga aatgtattgg agttgatgaa acgtacactc cattttagtg   2580
aacataattg gaccgttgag attcttattt ttttgctgat tgattatcta aagtagaagc   2640
ataaatagat aatacataaa tgcataacaa attgtgttag ttatgggtat agttaatgct   2700
ttttctctat gagaggaaaa aaaaaaaaat atataaatgt ggaagtaata attttgtagg   2760
atgccaggaa aggcgtatgc gaggaggaaa cacgtatggc tatgtggtgc aaatgaggtt   2820
gacagtaaaa tcttttctag ggctattctc gcaaaggtct atttcctttt tcatttacca   2880
ctactctatg catctacttc tctacctatt tatatatctc atctttcaaa ttaattaatt   2940
ttctgtcttt attttcttgg atgctccttc tacatcggtc ggttccttaa tggttagagt   3000
gccaaaatcc aggtaaacgt tgtctttatt gattaattct aattttgagt aatattttac   3060
```

```
atttatttta catgtttgaa aattgttttg tgataaaaaa aaagcagaca gtggtttgca   3120
ttcccatgct tgatggcgtt gtggaactag gcacaacgaa caaggtacgg cgtagttatc   3180
tttttatata tgcataacca aatggttaag aaaaaggtta gaagagaaat agatcatgct   3240
taagttttat cagttaaatt aaaaatgtaa aaataagata ttatgttcat taataatgta   3300
tagtccctgt tagttaaaaa aaagaataaa atatttaacc atttgaagtc ataatataaa   3360
aatattgttt ttggagatag tacataattc tcacaataaa aaaaataaca aagggatgat   3420
taagggaagg agttggatac atgttgtttg tctgtgtgtg tgaaggtaaa agaagatata   3480
gcgtttgttg agctcataaa gagtttttc cataaccacc ccaagtcaaa cccaaaagct   3540
gctctttctg aacactccat caacgaagag cacgaagaag acgaagaaca agaagaagaa   3600
gaagaagaag aagtagaaga agaaatgaca atgtcagagg agataaggct tggctctcct   3660
gatgatgatg acgtctccaa tcaaaaccta ctctctgatt tccatgtaga atcaacccac   3720
actttaggta tacacttata cattaaatta gttaacgata tcattacacg tatctattta   3780
ttttgttaac aagaaattta aaaatattcg ccatttcttt gttatgtcta aagaaaatct   3840
ataaaatttt atgaatagac acacacatgg acatgatgaa tctaatggag gagggtggaa   3900
actattctca gacagtatca acacttctta tgtcacaacc cacgagtctt ttttcagatt   3960
cagtttccac atcttcttac atccaatcat catttgccac atggaaggct gataatttta   4020
aagagcatca gcgagtggaa actaaatcga cgtcgtcgtc gcaatggatg ctcaaacaca   4080
taatcttgag agttccttta ctccacgacc acactaaaga aaagaggctg cctcgagaag   4140
agcttaatca cgtggtggca gagcgccgca ggagagagaa gctgaatgag agattcataa   4200
cactgagatc attggttccc tttgtgacca agatggataa agtctcaatt cttggagaca   4260
ccatcaacta cgtaaaccat cttcgaaata gggtccaaga gctggagact aatcatcacg   4320
aacaaaaaca taagcggatg cgtagctgta agggaaaaac gtgggaagag gtcgttgagg   4380
tttccatcat agagagtgat gttttgttag agatgagatg cgagtaccga gatggtctat   4440
tgctcgacat ccttcaggtt cttaaggaac atggtataga gactactgca gttcataccg   4500
cggtgaacga gcgtgatttc gaggccgaga taagggctat ggtgagaggg aagaaaccaa   4560
gcattgctga ggtcaaaaga gccatccatc aaactatatc caatattaaa ctatagttta   4620
agactctaac aatattgatg ccaactctag aaaaggacaa ctgaacttat tttgttttaa   4680
gccttggcta tattacatta tcagttttac acttctacgt atacacaact ttaatttttc   4740
tatattacta catgcatact agatgttaga aatatcttat ataagcatac atattaaatt   4800
agttatgcga tatttaaaat taatgtatat aaatattcag tttcaaagct tacgaatacg   4860
taaaattaat caatacaaac cgaaaccaaa aagccacttc tcatctcaaa atgttaatta   4920
caaatttaca ataagccgaa tcactatcta aaaagctttt gggatcccga gacccaaaac   4980
atttcttcgt ataagtgcaa caattatcga gtgtgatgag acacgtaaaa agcaaggatc   5040
gggacaacga ttttcggcta tatagtagtt tctcatatct gactttatta gcaaattact   5100
acataaaatt gcttttaagt atgattaacg gaacaagtat aatgcgttta tttaattaca   5160
gatctggcta aatgtaatat ggtatcaaag ctggaaagac aaatagtcta aggtttggaa   5220
tttttcatct gtctataaaa ttcttaagac actgatagat cattaactta ttttggagtc   5280
accaatggac aaatcaataa ctattgatgt ccaaaaccca caagacaagc ctattttttt   5340
tgcacgtgca agtacaccgg tggaagaatt catttgtata ctgaatctga aattataaaa   5400
```

gattagaatt ggttgaagaa tttacttcaa aacaagctag aagatggtgt tatttaaata 5460
aacaatgtta aattatatca atgactttca aattttatca aaacattttt tgaaagagaa 5520
tcacgcacaa agtatttcga attacaaaac aattttttgc aataaatttt atagttaaag 5580
caaattttgt caattattga aaaaaattac ttagataaaa tatctaattt tttttttaa 5640 acaatgtctc tataaaagat ggattagcca agaaaatctg atggatgcta caacgcaggg 5700
ttggagatat ggtgctgaca ctacat 5726

<210> SEQ ID NO 72
<211> LENGTH: 2583
<212> TYPE: DNA
<213> ORGANISM: Thlaspi arvense

<400> SEQUENCE: 72
atggaaggga actctttaag ttcatcttcc ttagtttcag ccaatcgggt gggtcaatgt 60
gacaatcttg agcatagtag aatgacttgt tctcgaaatt tcattgagat gcatttgact 120
gaccagctga gaaaaactca gatagtgaac gagaccaata aggatcttgt tgtcgaggca 180
ctgagatcaa tcgcggagat attgacttat ggcgatcagc acgacccttt attctttgaa 240
ttttttatgg agaagcaagt aatgggagag tttgtacgta ttttgagggt tagcaagaca 300
gtaacagttt ccgttcagtt gttgcaaacc atgagtatta tgatccagaa cctaaaaagt 360
gaacaagcca tctactactt gttcagtaac gaatatgtaa attatttgat aacatataca 420
tttgacttcc aacatgaaga gcttctatct tactacatat ccttcctaag agctgttagt 480
gggaaactaa accagcatac aatatcgttg cttttgaaga ccgagaacga tgtagtagtt 540
tcttttcccc tttacgtcga gggcataaaa tttgcatttc atgaagagaa catgatacgc 600
actgcagttc gtgccctgac tcttaatgtg tatcatgttg gcgatgaatc tgtgaatgat 660
tatgtagtta gtccaccgca cactgagtac ttttcaaaat tagttacatt tttccaaaag 720
caatgcatgg atctaagtgc aatggtgttg aacactctaa agagcccatc ccgagactca 780
ggtggaaaat tgtttgctgc cgttgatggg atcgaggaca cgctgtacta ctttagtgat 840
gttatctctg ctggcatacc tgatatcggg aggctgataa cagatcacat tctacagcat 900
ctaactctcc cacttcttct cccgtctttg tgctctgagg ctgataaatc agttgatcct 960
gtgacttctc tctatctgct ctgttgcatc gtgcggatag ttaaaatcaa agatttggcg 1020
aatttgactg ctgctacttt tttctgccct gtagaagctt tcatttcaag ttccctagtg 1080
aaacctaata gtagcttggc tcctgaacgt cttacatatg gaaatgggca tccagacaat 1140
ggtgttgctg aggaaacagt tcaacagtgt ccaagcactg cagtctcgag tgaatatgga 1200
aattcccacg tttgcagtga aaatactacg aaaagcatct tcaacaattc acgtattacg 1260
tttagggata ctttacttca atatatttct gagggagatg atgtgcaagc tcagggttcc 1320
ttgtttgtgc tagccacgtt gttgcagaca aaagaacttg aagagtcaat gctagatgct 1380
tttggcattc ttcctcagcg taagcagcac aaaaagcttt tgctgcaatc tttggttggg 1440
gaagacactg gtgaagaaca actgttttca ccacaaaatg gttccatgag agatggctta 1500
agcagcgaac ttgattggta tctacggagg ttggaggagc agtttggagt atgctgttca 1560
ctgcctgggg ctgcaatgtg cccgcgtgta catagacatc aggtggtgga tgcattggtc 1620
attcttctct gccgtgaaaa catatctgca gaaacattat gggatggagg gtggctttta 1680
cggcagttgc ttccttatag cgaggcagag tttaatcgta aacatctcaa aatgctgaat 1740
gattcatatg agaagtgcac aagtgcacta atccgggagg ttaaaggtac ctggcctgat 1800

```
ctactcatca cggtgctgct tgatgagtgg aaaaagttga tcgaagctcc atcccctcaa   1860

aaagagccta aatctgttct tctccagctg gataaatcct cttctagtgg taacactgtt   1920

agcgaatcat cattcacagc cggtgaaaaa ctgtgcgagg tggtgaaggt ttttgtgctt   1980

cttcaccaac tccagatctt ctcgcttggt aggcccttgc cagagcagcc tcctatccat   2040

cctcctgcag acagatctga aacgtctcgc gccacaagtg ctggtttgga tgtttcagtc   2100

cccaaaactg gcaccgaagt gaagctagtt gatgctgtac actgtaggat tgcctttgaa   2160

agaggcaagg agcggaattt ctcgtttcta gcattatcat ctggtgtgtc tgggtggatt   2220

gtccttgctg aagaatcgct ttcgaagcca gatcacggaa ccgtccgtgt taccgcacct   2280

ttagccggct gcaaaccccg gatagatgaa aagcacccaa gatggctaca cttgaagatc   2340

cggccatcga cgttaccatt cttggatcca acaaagcgag gagtctatga gaagctcaag   2400

tccaaaggtc tagtagacgg gagatggaca ttagcattca gagacgaaga gtcttgttac   2460

tctgcttact caatggttgt acatgagatc gatctacaat gcagcgaggt tgaaaggagg   2520

ttaaagccat tgttcgacct tgagagaaac cagcaagatc aatcaaacgt tgcttctcta   2580

tag                                                                 2583
```

<210> SEQ ID NO 73
<211> LENGTH: 860
<212> TYPE: PRT
<213> ORGANISM: Thlaspi arvense

<400> SEQUENCE: 73

```
Met Glu Gly Asn Ser Leu Ser Ser Ser Ser Leu Val Ser Ala Asn Arg
1               5                   10                  15

Val Gly Gln Cys Asp Asn Leu Glu His Ser Arg Met Thr Cys Ser Arg
            20                  25                  30

Asn Phe Ile Glu Met His Leu Thr Asp Gln Leu Arg Lys Thr Gln Ile
        35                  40                  45

Val Asn Glu Thr Asn Lys Asp Leu Val Val Glu Ala Leu Arg Ser Ile
    50                  55                  60

Ala Glu Ile Leu Thr Tyr Gly Asp Gln His Asp Pro Leu Phe Phe Glu
65                  70                  75                  80

Phe Phe Met Glu Lys Gln Val Met Gly Glu Phe Val Arg Ile Leu Arg
                85                  90                  95

Val Ser Lys Thr Val Thr Val Ser Val Gln Leu Leu Gln Thr Met Ser
            100                 105                 110

Ile Met Ile Gln Asn Leu Lys Ser Glu Gln Ala Ile Tyr Tyr Leu Phe
        115                 120                 125

Ser Asn Glu Tyr Val Asn Tyr Leu Ile Thr Tyr Thr Phe Asp Phe Gln
    130                 135                 140

His Glu Glu Leu Leu Ser Tyr Tyr Ile Ser Phe Leu Arg Ala Val Ser
145                 150                 155                 160

Gly Lys Leu Asn Gln His Thr Ile Ser Leu Leu Leu Lys Thr Glu Asn
                165                 170                 175

Asp Val Val Val Ser Phe Pro Leu Tyr Val Glu Gly Ile Lys Phe Ala
            180                 185                 190

Phe His Glu Glu Asn Met Ile Arg Thr Ala Val Arg Ala Leu Thr Leu
        195                 200                 205

Asn Val Tyr His Val Gly Asp Glu Ser Val Asn Asp Tyr Val Val Ser
    210                 215                 220
```

```
Pro Pro His Thr Glu Tyr Phe Ser Lys Leu Val Thr Phe Phe Gln Lys
225                 230                 235                 240

Gln Cys Met Asp Leu Ser Ala Met Val Leu Asn Thr Leu Lys Ser Pro
                245                 250                 255

Ser Arg Asp Ser Gly Gly Lys Leu Phe Ala Ala Val Asp Gly Ile Glu
            260                 265                 270

Asp Thr Leu Tyr Tyr Phe Ser Asp Val Ile Ser Ala Gly Ile Pro Asp
        275                 280                 285

Ile Gly Arg Leu Ile Thr Asp His Ile Leu Gln His Leu Thr Leu Pro
    290                 295                 300

Leu Leu Leu Pro Ser Leu Cys Ser Glu Ala Asp Lys Ser Val Asp Pro
305                 310                 315                 320

Val Thr Ser Leu Tyr Leu Leu Cys Cys Ile Val Arg Ile Val Lys Ile
                325                 330                 335

Lys Asp Leu Ala Asn Leu Thr Ala Ala Thr Phe Phe Cys Pro Val Glu
            340                 345                 350

Ala Phe Ile Ser Ser Ser Leu Val Lys Pro Asn Ser Ser Leu Ala Pro
        355                 360                 365

Glu Arg Leu Thr Tyr Gly Asn Gly His Pro Asp Asn Gly Val Ala Glu
    370                 375                 380

Glu Thr Val Gln Gln Cys Pro Ser Thr Ala Val Ser Ser Glu Tyr Gly
385                 390                 395                 400

Asn Ser His Val Cys Ser Glu Asn Thr Thr Lys Ser Ile Phe Asn Asn
                405                 410                 415

Ser Arg Ile Thr Phe Arg Asp Thr Leu Leu Gln Tyr Ile Ser Glu Gly
            420                 425                 430

Asp Asp Val Gln Ala Gln Gly Ser Leu Phe Val Leu Ala Thr Leu Leu
        435                 440                 445

Gln Thr Lys Glu Leu Glu Glu Ser Met Leu Asp Ala Phe Gly Ile Leu
    450                 455                 460

Pro Gln Arg Lys Gln His Lys Lys Leu Leu Leu Gln Ser Leu Val Gly
465                 470                 475                 480

Glu Asp Thr Gly Glu Glu Gln Leu Phe Ser Pro Gln Asn Gly Ser Met
                485                 490                 495

Arg Asp Gly Leu Ser Ser Glu Leu Asp Trp Tyr Leu Arg Arg Leu Glu
            500                 505                 510

Glu Gln Phe Gly Val Cys Cys Ser Leu Pro Gly Ala Ala Met Cys Pro
        515                 520                 525

Arg Val His Arg His Gln Val Val Asp Ala Leu Val Ile Leu Leu Cys
    530                 535                 540

Arg Glu Asn Ile Ser Ala Glu Thr Leu Trp Asp Gly Gly Trp Leu Leu
545                 550                 555                 560

Arg Gln Leu Leu Pro Tyr Ser Glu Ala Glu Phe Asn Arg Lys His Leu
                565                 570                 575

Lys Met Leu Asn Asp Ser Tyr Glu Lys Cys Thr Ser Ala Leu Ile Arg
            580                 585                 590

Glu Val Lys Gly Thr Trp Pro Asp Leu Leu Ile Thr Val Leu Leu Asp
        595                 600                 605

Glu Trp Lys Lys Leu Ile Glu Ala Pro Ser Pro Gln Lys Glu Pro Lys
    610                 615                 620

Ser Val Leu Leu Gln Leu Asp Lys Ser Ser Ser Ser Gly Asn Thr Val
625                 630                 635                 640

Ser Glu Ser Ser Phe Thr Ala Gly Glu Lys Leu Cys Glu Val Val Lys
```

```
                645                 650                 655

Val Phe Val Leu Leu His Gln Leu Gln Ile Phe Ser Leu Gly Arg Pro
            660                 665                 670

Leu Pro Glu Gln Pro Pro Ile His Pro Pro Ala Asp Arg Ser Glu Thr
        675                 680                 685

Ser Arg Ala Thr Ser Ala Gly Leu Asp Val Ser Val Pro Lys Thr Gly
    690                 695                 700

Thr Glu Val Lys Leu Val Asp Ala Val His Cys Arg Ile Ala Phe Glu
705                 710                 715                 720

Arg Gly Lys Glu Arg Asn Phe Ser Phe Leu Ala Leu Ser Ser Gly Val
                725                 730                 735

Ser Gly Trp Ile Val Leu Ala Glu Glu Ser Leu Ser Lys Pro Asp His
            740                 745                 750

Gly Thr Val Arg Val Thr Ala Pro Leu Ala Gly Cys Lys Pro Arg Ile
        755                 760                 765

Asp Glu Lys His Pro Arg Trp Leu His Leu Lys Ile Arg Pro Ser Thr
    770                 775                 780

Leu Pro Phe Leu Asp Pro Thr Lys Arg Gly Val Tyr Glu Lys Leu Lys
785                 790                 795                 800

Ser Lys Gly Leu Val Asp Gly Arg Trp Thr Leu Ala Phe Arg Asp Glu
                805                 810                 815

Glu Ser Cys Tyr Ser Ala Tyr Ser Met Val Val His Glu Ile Asp Leu
            820                 825                 830

Gln Cys Ser Glu Val Glu Arg Arg Leu Lys Pro Leu Phe Asp Leu Glu
        835                 840                 845

Arg Asn Gln Gln Asp Gln Ser Asn Val Ala Ser Leu
    850                 855                 860
```

<210> SEQ ID NO 74
<211> LENGTH: 7185
<212> TYPE: DNA
<213> ORGANISM: Thlaspi arvense

<400> SEQUENCE: 74

```
cgtggatgga ggaagggttt ctcgtcgtgt tcgtcgcgaa agatggttcc tcttctgcgc      60

cgccaccgcc ggagatcgag gagaatcgca acgtgagagt cgtggaaatc accggtgatg     120

aatgaatgaa taattatgtc tttaaaactt caaaatctgt gtattatatg aacagagtaa     180

tcatgttgtg atcgtgctgc tgttttcgta tgtaatagtg aaagttgcat aaaagccctt     240

aaactaatca aagttttcaa aataacccat catttaagaa aactataaaa cgatcaaaat     300

taatgtaaaa tctacatttg agcttccgac tacaacattt attcgattca atttcccttt     360

taataatcta acaaattttc caaatttcaa caaatctcga accgaatgat tatttgattc     420

aaagacaaac tattatgttt tcgctacaac ccaaaacgat gaatttaagt gtacagtcgg     480

aattgtatta ctgtatagat tttaaattag atgggacatt tgtttaaaca atttaattaa     540

gtgagggtta ttttacaact ttgctatatt ttgaggggtt ttgttataat tttgtgactt     600

aatagcaaga gtcgtctttg aaggaaccgt tgtgacgtgg cggtcttcaa cactcgaatg     660

gtcgatcgta aaaataaatg ttttccctaa ttaaaatgcc atagacggat ccccccattc     720

taaagattct ttctttgaat tcgatattga acccgacccg gatccgaatc tggatacttg     780

acccaacgcc agctcaacgc cccacttcgg tgcttgcttc tattcgtctc tccgtcaaca     840

attctgttgt ttaccggaat acctagagcc ttcgagaaat tcaaacacga cgcagatatc     900
```

```
attctttcgc ttacgctatt gatttgtatg attttgtcgt cggtgaagca atccgaaccg    960
gaactggaat cggatttcat caggacttgt ggggttccct ttaatcgagg agcaaccatg   1020
gaattggggt tttcgcggga gtgaaggatg atccagagaa gactggattc agaggattga   1080
tccgataatc atgtggttct ccttcttaag acccagagat cgattctcct tggtcgaact   1140
caggttaaat tttttttgt ttgatcgggt cgatcccgca acaagttcca tttgcgatat    1200
atatctctgt ttcgtttgat ccctattgtg actaagatta gcggattttt gtgaattctg   1260
gccttaaaat gtgtctttta agggtggttg agaggttttt cgtcgtaatc tctttggtgt   1320
gaatgacttg ttctcgaaat ttcattgaga ttttagtgta cgacaagtat ttgttcggtg   1380
attgtaagcg ttgaaatttt gagtttttc gtcgtagtct cttcggaatt agaatgggca    1440
gtttgcagtt atctgttagg gttttcgaga atttgaacat ttgatcgctt gaatggtgtc   1500
atggaaggga actctttaag ttcatcttcc ttagtttcag ccaatcgggt gggtcaatgt   1560
gacaatcttg agcatagtag aatgacttgt tctcgaaatt tcattgagat gttagtgtac   1620
gacaagtatt tgttcggtga ttataccaga tgatgaagca taaacgttga aactttgggt   1680
tttgtttttg taggcatttg actgaccagc tgagaaaaac tcagatagtg aacgagacca   1740
ataaggtcag tgggataaaa gtctttttca ctttagcaac tttgtcttgg cattactgtt   1800
ctgtttttc cttgtggatt cgatctttgt ttaccgtttt gaaggatctt gttgtcgagg    1860
cactgagatc aatcgcggag atattgactt atggcgatca gcacgaccct ttattctttg   1920
agtgagagtc tttatgtcaa ttatcagtca atgcccttca ttttcttatt ggcatatatg   1980
ctaataatac tttgcgctcg ttgcagattt tttatggaga agcaagtaat gggagagttt   2040
gtacgtattt tgagggttag caagacagta acagtttccg ttcagttgtt gcaaaccatg   2100
agtattatga tccagaacct aaaaagtgaa caagccatct gtgagttcat cagaagcagt   2160
gtatattttg tctttgataa ttcgtaatga ttatagccta ttgatgatct tcttttgaaa   2220
ctacttgcag actacttgtt cagtaacgaa tatgtaaatt atttgataac atatacattt   2280
gacttccaac atgaagagct tctatcttac tacatatcct tcctaaggta cattcttctg   2340
ttgttgacct cggcttcagg aagtacatgt tgactgtatc tggtaactgt tttgttttct   2400
ttttgtagag ctgttagtgg gaaactaaac cagcatacaa tatcgttgct tttgaagacc   2460
gagaacgtga gtattcttta agttgcatct tccttaaact tctataatag tcctttatgg   2520
attttttttt tctgccatat tttaattctg cgtttctgcg tctaggatgt agtagtttct   2580
tttccccttt acgtcgaggg cataaaattt gcatttcatg aagagaacat gatacgcact   2640
gcagttcgtg ccctgactct taatgtgtat catggtaagt cactcagtcc tttcgatttg   2700
tcactttaat gactcagaag cttttagcaa tgtttctgat gcctttagtt ttttttttct   2760
tttcgcagtt ggcgatgaat ctgtgaatga ttatgtagtt agtccaccgc acactgagta   2820
cttttcaaaa ttagttacat ttttccaaaa gcaatgcatg gatctaagtg caatggtgtt   2880
gaacactcta aagtaagatt cactgcatct tcatttccca gggcaataat atcgtgttaa   2940
atacgtatca tatccccttt tcatctattg actcattagt tatattcttc tgaaagattt   3000
ccatttactt tgtctaaagg agcccatccc gagactcagg tggaaaattg tttgctgccg   3060
ttgatgggat cgaggacacg ctgtactact ttagtgatgt tatctctgct ggcatacctg   3120
atatcgggag gctgataaca gatcacattc tacagcatct aactctccca cttcttctcc   3180
cgtctttgtg ctctgaggct gtaaatgtat aacatatcta ctttttcgat ttattttgtc   3240
cttttgtgct aattttgtaa gccttgttag ttttttctat gcaagagtac aatttctaat   3300
```

gtcagtatac tgtttgttct gtggttattt caggataaat cagttgatcc tgtgacttct 3360
ctctatctgc tctgttgcat cgtgcggata gttaaaatca aagatttggc gaatttgact 3420
gctgctactt ttttctgccc tgtagaagct ttcatttcaa gttccctagt gaaacctaat 3480
agtagcttgg ctcctgaacg tcttacatat ggaaatgggc atccagacaa tggtgttgct 3540
gaggaaacag ttcaacagtg tccaagcact gcagtctcga gtgaatatgg aaattcccac 3600
gtttgcagtg aaaatactac gaaaagcatc ttcaacaatt cacgtattac gtttaggtaa 3660
catgttatct aacaacctga gtgaatttga gatagttgct ttttacactc cttaagctgt 3720
cttaatcata atatattcct atatctctcc gaagctgatg ttccttttgt aaatagggat 3780
actttacttc aatatatttc tgagggagat gatgtgcaag ctcagggttc cttgtttgtg 3840
ctagccacgt tgttgcagac aaaaggtatt ggtagtggct ttgtgcatct ccttatttta 3900
tttctagttt tgacagggaa attcgcatct cacgcttaca ttctctttgt ggtagaactt 3960
gaagagtcaa tgctagatgc ttttggcatt cttcctcagc gtaagcagca caaaaagctt 4020
ttgctggtga gtatctgtca ttattcttta tcttctgctc ttttccagca aattccaagg 4080
cagattgcca gggaaattcg catctcatgg tttatggacc gtctactata gtctggacca 4140
aaaatataag ctttacttct tggatagcta aacttaattt ggtggtcatc tctgacagca 4200
atctttggtt ggggaagaca ctggtgaaga acaactgttt tcaccacaaa atggttccat 4260
gagagatggc ttaagcagcg aacttgattg gtatctacgg aggttggagg tacttcagtc 4320
actgcatatc ttagaatttt gcaaacacgt tctacttctc catctctttg gtgttgtgtt 4380
aaattgtgat tgacttactc attcaagtac cctcaacagg agcagtttgg agtatgctgt 4440
tcactgcctg ggctgcaat gtgcccgcgt gtacatagac atcaggtaaa ttacgaatgt 4500
ttgtaaacct aaattattag cctcgcttct tctgaaaagt gaaaattcca tctgcttgag 4560
ttaggttctt tcttcatcac agagcaagtt cttgtcttga atcaatgaaa aaattgtggt 4620
ataggtggtg gatgcattgg tcattcttct ctgccgtgaa aacatatctg cagaaacatt 4680
atgggatgga gggtggcttt tacggcagtt gcttccttat agcgaggcag agtttaatcg 4740
taaacatctc aaaatgctga atgtatgtgt gttgctttta agatgttgac actgttacac 4800
tctcccttc gtcattattt accagtttcc tgctgatgtc aggattcata tgagaagtgc 4860
acaagtgcac taatccggga ggttaaaggt acctggcctg atctactcat cacggtgctg 4920
cttgatgagt ggaaaaagtg taaaagaggc aagtaaagaa gcaaaatgtt tggattttga 4980
ttctaaattt acatgttcag tgaatctaat accaaatctc ttgtgacagt gatcgaagct 5040
ccatcccctc aaaaagagcc taaatctgtt cttctccagc tggataaatc ctcttctagt 5100
ggtagaattt ttgttttaca atcaatgtga atgatataga cactcccttg ttcagttcct 5160
gctaatgcaa accgttaaca actgaacttt tacaggtaac actgttagcg aatcatcatt 5220
cacagccggt gaaaaactgt gcgaggtggt gaaggtaagt ccattgtgtt ccctctgtat 5280
tttcaatcag cgcttgtcgt tgatgtgtaa atgctacaga aatctgagaa tggagcattt 5340
tactccttag gtttttgtgc ttcttcacca actccagatc ttctcgcttg gtaggccctt 5400
gccagagcag cctcctatcc atcctcctgc agacagatct gaaacgtctc gcgccacaag 5460
tgctggtttg gatgtttcag tccccaaaac tggcaccgaa gtgaagctag gttagcacat 5520
gatgctcttt atgcttgctt agttcaacat ctaccaaacc gacaccatgt ccgtagttaa 5580
actgatgttt gaaatttccc ggtgcagttg atgctgtaca ctgtaggatt gcctttgaaa 5640
gaggcaagga gcggaatttc tcgtttctag cattatcatc tggtgtgtct gggtggattg 5700
tccttgctga agaatcgctt tcgaagccag atcacggaac cgtccgtgtt accgcacctt 5760
tagccggctg caaagtacgt gctcacctac attgtctttt tttttgtaac gatattgctt 5820
gtgaacacca cttacaagga cagatataat catgatgttg gcatagagaa atgagctatc 5880
ttttgtttgg tattcagccc cggatagatg aaaagcaccc aagatggcta cacttgaaga 5940
tccggccatc gacgttacca ttcttggatc caacaaagcg aggagtctat gagaagctca 6000
agtccaaagg tctagtagac gggagatgga cattagcatt cagagacgaa gagtcttgtt 6060
actctgctta ctcaatggtt gtacatgaga tcgatctaca atgcagcgag gttgaaagga 6120
ggttaaagcc attgttcgac cttgagagaa accagcaaga tcaatcaaac gttgcttctc 6180
tatagctctt gggtttgttt ttgttttatt cattaaattt tttgtttctt ctttgtaatg 6240
ttgctataat gtgataatat cgttgtatat ttgaaagtga tagtgaattt cagtttttat 6300
cacacaaaaa tatgactagt gtgagtgtcg agaactctgc ttactcttat aattctgtga 6360
ttctgcgtct cttcttgttg aatatgaaac cctaaaacaa atgaaccctt actcttcttt 6420
atgcatcctg tagctgtcaa cgagagcagt tttgtatgag ttacggacac tctgtttcca 6480
gatggagaga gaagcaatca ccgtccgtat tttgagcaat cctcttttta acgcagctaa 6540
tggatgcaac attggctttt agacttgtaa ctatgtctct ctctctctct ctcttccttc 6600
agccgcagtt taaaagaccc acatacagta ccacatcata cctcagatgt gaatggtttg 6660
tcttcactaa aaggtttgct ggaaccaaaa cctaaacagg aaacataact ccttgaccca 6720
cagtaaatta aactaccaga atcactctga aagaagttcc tcgaccagaa atatccaaaa 6780
gccacataaa cagggtctgg tcagacataa cagtggcaac atcgtaataa gaaagatgcc 6840
aagaagttgc agaggctaat gtttgaaaaa aaaagaagcc atgagagacc aaaattaaga 6900
gaatttgtaa ttaatacagt actcaggaaa agagtttcaa ccacttgcgc caacaaacta 6960
gatagacatt gttatccaac acacaaactc atgtccaacc aaaagataga gagataaaga 7020
gacattatcc aacacaacac atgtccaaat aaaagagata acagataaaa gatagaagag 7080
tgggttctcc ttttcttact acaaacaccc atgaattcga ttccctactt tcggccaagt 7140
accctgaaac acaacacaaa actgaattgt tatacaaaac tatgt 7185

<210> SEQ ID NO 75
<211> LENGTH: 1026
<212> TYPE: DNA
<213> ORGANISM: Thlaspi arvense

<400> SEQUENCE: 75
atggataact cagctccgga ttctttgtcc agatcggaaa ccgccgtcac ctacgattct 60
ccttacccac tctacgccat ggccttctct tccatcggta ctccctccgg ccaccgaatc 120
gccgtcggaa gcttcctcga ggattacaac aaccgcatcg acattctctc cttcgattcc 180
gactccatga cggtgaagcc tctcccgaat ctctccttcg atcatcctta tcctcccaca 240
aagctgatgt tcagccctcc ctccctccgt cgtccctccg ccggcgatct cctcgcttcc 300
tccggcgatt tcctccgttt atgggagatc agtgaagatt cctccaccgt cgagcctgtc 360
tcggtgctca acaacagcaa gacgagcgag ttctgcgcgc cgttgacctc cttcgactgg 420
aacgacgtcg agccgaaacg cctgggaacc tgcagcatcg acacgacctg cacgatttgg 480
gacatcgaga agtgcgtggt ggagacgcag ctcatagcgc acgataagga ggtccacgac 540
atcgcttggg gagaagctag ggttttcgcg tcggtctccg ccgacggatc cgtcaggatc 600

```
ttcgatctac gcgacaagga gcattccacc atcatctacg agagtcctca gcccgatacg    660

cctctcctaa gactcgcctg gaacaaacaa gacctgaggt acatggcgac gatcctgatg    720

gattcgaata aggtcgtgat tctcgacatt cgctcgccga cgatgcctgt cgccgagctc    780

gaacggcacc aggctagcgt caacgccata gcttgggctc cacagagctg caaacacatc    840

tgctctgctg gtgacgacac gcaggctctc atctgggagc tcccgactgt agctggaccc    900

aacggcattg atccgatgtc ggtttactca gccggctcgg agataaacca gttgcagtgg    960

tcctcttcac agcctgattg gattggcatc gctttcgcta acaaaatgca gctccttaga   1020

gtttga                                                              1026


<210> SEQ ID NO 76
<211> LENGTH: 341
<212> TYPE: PRT
<213> ORGANISM: Thlaspi arvense

<400> SEQUENCE: 76

Met Asp Asn Ser Ala Pro Asp Ser Leu Ser Arg Ser Glu Thr Ala Val
1               5                   10                  15

Thr Tyr Asp Ser Pro Tyr Pro Leu Tyr Ala Met Ala Phe Ser Ser Ile
            20                  25                  30

Gly Thr Pro Ser Gly His Arg Ile Ala Val Gly Ser Phe Leu Glu Asp
        35                  40                  45

Tyr Asn Asn Arg Ile Asp Ile Leu Ser Phe Asp Ser Asp Ser Met Thr
    50                  55                  60

Val Lys Pro Leu Pro Asn Leu Ser Phe Asp His Pro Tyr Pro Pro Thr
65                  70                  75                  80

Lys Leu Met Phe Ser Pro Pro Ser Leu Arg Arg Pro Ser Ala Gly Asp
                85                  90                  95

Leu Leu Ala Ser Ser Gly Asp Phe Leu Arg Leu Trp Glu Ile Ser Glu
            100                 105                 110

Asp Ser Ser Thr Val Glu Pro Val Ser Val Leu Asn Asn Ser Lys Thr
        115                 120                 125

Ser Glu Phe Cys Ala Pro Leu Thr Ser Phe Asp Trp Asn Asp Val Glu
    130                 135                 140

Pro Lys Arg Leu Gly Thr Cys Ser Ile Asp Thr Thr Cys Thr Ile Trp
145                 150                 155                 160

Asp Ile Glu Lys Cys Val Val Glu Thr Gln Leu Ile Ala His Asp Lys
                165                 170                 175

Glu Val His Asp Ile Ala Trp Gly Glu Ala Arg Val Phe Ala Ser Val
            180                 185                 190

Ser Ala Asp Gly Ser Val Arg Ile Phe Asp Leu Arg Asp Lys Glu His
        195                 200                 205

Ser Thr Ile Ile Tyr Glu Ser Pro Gln Pro Asp Thr Pro Leu Leu Arg
    210                 215                 220

Leu Ala Trp Asn Lys Gln Asp Leu Arg Tyr Met Ala Thr Ile Leu Met
225                 230                 235                 240

Asp Ser Asn Lys Val Val Ile Leu Asp Ile Arg Ser Pro Thr Met Pro
                245                 250                 255

Val Ala Glu Leu Glu Arg His Gln Ala Ser Val Asn Ala Ile Ala Trp
            260                 265                 270

Ala Pro Gln Ser Cys Lys His Ile Cys Ser Ala Gly Asp Asp Thr Gln
        275                 280                 285
```

```
Ala Leu Ile Trp Glu Leu Pro Thr Val Ala Gly Pro Asn Gly Ile Asp
    290                 295                 300

Pro Met Ser Val Tyr Ser Ala Gly Ser Glu Ile Asn Gln Leu Gln Trp
305                 310                 315                 320

Ser Ser Ser Gln Pro Asp Trp Ile Gly Ile Ala Phe Ala Asn Lys Met
                325                 330                 335

Gln Leu Leu Arg Val
            340


<210> SEQ ID NO 77
<211> LENGTH: 4435
<212> TYPE: DNA
<213> ORGANISM: Thlaspi arvense

<400> SEQUENCE: 77

acacatatct aatactataa aaaaaggtgt atagcgtccg cgaaactcat gtcttccata     60

atcattaatc aaaaaccgat atctctaatc aagatgcatt tgacaagaaa aaagaatcaa    120

aatgcattgc caagaaaaaa agaatcaaga tgcatgattg tttggtgagt aaacgagaca    180

tcttaatttt aatataacaa ttcgttcctt gttttttttt ttcctgtatc gtacgtgatt    240

catgtgttca actgttttgt tgtcatctca tgtgttagtt aaattctatc ttattgattt    300

taatacatag atatttcggt gcagcgcaaa aacattatta tatttcggtg tagccgcatt    360

tagcacaatc atacctaaat attaccaaat tgtgctccac tatcttacgt gattcatgtg    420

ttaaactgtt ttttctttcc tgtggtctac caaaattaag tttttaattg caaagacgat    480

tgccaatttt aattgacgat ctaatttgtc acagataaca taattatctg atggcgtata    540

agttataagc tcttttattt tttgaacaaa atatttttgt tcttagctga gctgggaaat    600

gtcgtattta aagtattaaa cctataatct cttcggtaat atgttaaata aatctgtttt    660

ttcaggtcgt tagtaaatta tttcggctac agacgccata tcaaataata tatcaggttg    720

ctgtgaatga gtatctcaat ttgcatgcta agaactatat aaactgtatt aacttttatc    780

ttaataccat gagtaagtcg aattatcgat ctatctatta tttttatttt taaacgtgtg    840

gcctgattga taaaataaac ttgtggtcat atcaaatctg aaactggagt aaacgtggga    900

ttggggatga agaaattagg gcatgtcaac gtcttgggac ttaccgtcat gtcccttcac    960

tgtaatattg gacctatcat tttcttcctt atcatcttag ttttttttgt cgtctcatcc   1020

tctttaaaat aaagtaaaag taattaacac tattatattt tctcacaaaa ttagatatta   1080

tatgctcttt tcaaaaaaat gttaggcatc taacatgata tttttgagat agaaaatgac   1140

acaaatactc ttcaccccaa cctcacgcat atctctatat ttattacatc gctattacac   1200

acattacaca tagtattcat gtacatgtct atttacgcaa aggatcacac gttccacaaa   1260

ccatttgcta aatcctaaat gagtagtaac aagatattgt ccgtctcaaa acaaaatata   1320

tatttgtaga gaatatcata attttagtat cgtcttcaaa atggtttgaa aatgttattg   1380

actttttgta gacaacattt taatctgtgt gtttgggaaa gaaatgtgga aagctcgctt   1440

agcgttgaaa aggcctacta tgtaaagaca caaggcccaa aaatgcgttg aaaggcccac   1500

tatcaataga tattgattga cacagagggt ttagcatgca gtcaaaatat cgcactggac   1560

actgaccata gaactttctg tcattttcct ctgaaaaacg gagatgtcgc cgtgaagaat   1620

ccaaaaatcg aatcgaatca gatcaaacca ttccacattt tcgtgcagag ataatggata   1680

actcagctcc ggattctttg tccagatcgg aaaccgccgt cacctacgat tctccttacc   1740

cactctacgc catggccttc tcttccatcg gtactccctc cggccaccga atcgccgtcg   1800
```

```
gaagcttcct cgaggattac aacaaccgca tcgacattct ctccttcgat tccgactcca   1860
tgacggtgaa gcctctcccg aatctctcct tcgatcatcc ttatcctccc acaaagctga   1920
tgttcagccc tccctccctc cgtcgtccct ccgccggcga tctcctcgct tcctccggcg   1980
atttcctccg tttatgggag atcagtgaag attcctccac cgtcgagcct gtctcggtgc   2040
tcaacaacag caagacgagc gagttctgcg cgccgttgac ctccttcgac tggaacgacg   2100
tcgagccgaa acgcctggga acctgcagca tcgacacgac ctgcacgatt tgggacatcg   2160
agaagtgcgt ggtggagacg cagctcatag cgcacgataa ggaggtccac gacatcgctt   2220
ggggagaagc tagggttttc gcgtcggtct ccgccgacgg atccgtcagg atcttcgatc   2280
tacgcgacaa ggagcattcc accatcatct acgagagtcc tcagcccgat acgcctctcc   2340
taagactcgc ctggaacaaa caagacctga ggtacatggc gacgatcctg atggattcga   2400
ataaggtcgt gattctcgac attcgctcgc cgacgatgcc tgtcgccgag ctcgaacggc   2460
accaggctag cgtcaacgcc atagcttggg ctccacagag ctgcaaacac atctgctctg   2520
ctggtgacga cacgcaggct ctcatctggg agctcccgac tgtagctgga cccaacggca   2580
ttgatccgat gtcggtttac tcagccggct cggagataaa ccagttgcag tggtcctctt   2640
cacagcctga ttggattggc atcgctttcg ctaacaaaat gcagctcctt agagtttgag   2700
gttaggtttt atatttaact atgaagtcga tgatatgaat gatatcacct ggttaggcct   2760
aatgaattcg caaagaaagt tgaactgaaa actcacttga atgctttcat ggctggctat   2820
tacagattgt cttgtagcta taagagaact ttgttagtaa atgatctcac agttgctgta   2880
atggctgata aaatgatatt catgtagacg atgattgggt acaaaaacacc tttgtacttt   2940
gtgcttcagg tttttgcaac tcatatagag aatctagatt gaacaataac attgcacatg   3000
tagaaaatca aataacattt ccttattata tacatctcgc ttgatgtcag atgcagatgg   3060
tgaagtggtc aaaatcagat ttagcataga cccgatgtga caagtaggtt cggtgcacgc   3120
gcactctcgc gtcttgggtc agcaagcaat gcctctgtat ctacctgatt gtaactaaaa   3180
ctgatttcat ttgatgaacc aaatgccact gttatctttc tgttttgtgt ataaacccca   3240
accagaattt attgcggttt ctggtgttta gatttgaagt ggaagcttat tacagtataa   3300
tgcaccctgt ctttcctttg ttgggtattc ttcggataaa acagctactt gtcatcggtt   3360
atttagcatc taaacaaagc aattataaaa tatgtgttac aggttccaac ttcgaacacc   3420
tgtttttagt cagagttttt tttttgtatt ttgcaaatta acttcaagtg acaagcaaat   3480
tctcaattta ttataccttc ttcgtttgag aaaacctctg aacgtccgac tgttatattt   3540
ctctatctca ttctttacaa agagataaat ttatgttaaa cttctctatt taccattttt   3600
aaaatttcat ataaccaatt tacataactt tggagaacgt tgatattcat attttccatt   3660
taataaaatg aataaaaata gaaaatttag cttaagggaa aggaaaatat gtgtcagatt   3720
cttgatttca caaaacccta caagcaaccc cctctacata taaatagcaa cgtccttgta   3780
acttaaaagg caagtgataa taatagtgca aaaagatttg aaaaaaaagg ttagagagaa   3840
tgtccaccag cgagcttgcc tgcacatatg ccgctctaat cctccacgat gatgggattg   3900
acatcaccgt tagttttctc ttctctctaa ttctcaattt taacctcttt ttgatctagt   3960
ttctactctt tttctttgct cttcatgcat gtacttatat atgttgtagt tgcgaatttc   4020
gtttatatag tttcatgtcg gtaactttct tgtttattgt ggatttacta ggccgagaag   4080
atatcaaagc tggtgaaagc agccaacgtg aatgttgaat catactggcc tagcctcttt   4140
```

gctaagctat gtgcgaagaa gaatattgac gatctcatca tgaatgttgg agccagtggt 4200
ggtggtgagg cagctccggt tgcaaccaac gttcctccaa ctgctcaagc agctccagca 4260
gttgaggaga caaagaagaa gaaggtatat cctattgtct ttctaacagt cttagcgtta 4320
ttgcaatcca aatcatcaac tatataattt aacaagctta tgattaaaac taaccaatgg 4380
gaatattgtt ttaaaaattc tcaggaggag gtgaaggaag agagtgaaga tgaca 4435

<210> SEQ ID NO 78
<211> LENGTH: 1275
<212> TYPE: DNA
<213> ORGANISM: Thlaspi arvense

<400> SEQUENCE: 78
atggaggtga aagagagtga aagagtggta atagccaaac cagtggcttc aaggccttca 60
tgctctagct tcaggacttt cactgagctt ctgactgatt cagctactgt gtctcctcaa 120
tcgaattgcc acgagattgt agacgctgcc attagaccaa agactctcag gtttaaccag 180
ccagctgcag ctgcggtctc atgtccacgg gctaaagaaa atggcaatgg aaagtcttgt 240
gatgacacag atggcggaaa ctacgtcgtt tacaaaccta aagcaaagct tgtctccaaa 300
gcaaccgtct ctgtgttggc taacatgggg aatcgtcaac agacttggag acaacccgaa 360
gcagtagcgt atgggaagag tgtgagtcaa ggtactggtc ctaatctagt ccagagagtt 420
tcatccttta cagaaacaga gacatcggtc ggggacagat catctgtgga cggatacaac 480
tggaggaaat acggacagaa gcaagttaaa ggaagtgagt gtccaagaag ctattacaaa 540
tgcacacacc cgaaatgtcc ggtgaagaag aaagtagaga ggtcattggg aggtcaggtc 600
tcagagattg tgtatcaagg tgagcataat cactcgaagc cgtcttgtcc acttccacgg 660
cgcgcttcgt catcatcctc ttcagggttt cagaaaccac caaaagggct tgtctctgaa 720
ggatcaatgg gacaagaccc taatagtaat gccttttatc atcatcctct ttggagcaat 780
caaagcaatg actcgtctaa gatgtatgag ggttgtgttg taactccatt cgagttcgct 840
gttccaagat cggcgaattc aaccggcgga acttcggatt ccggttgtcg aagtagccag 900
tgtgatgaag gcagcaatgg aggagagctt gatgatccaa gcagaagcaa aagaagcagg 960
aagaacgaga agcaatcaag tgaagcagga gtatcgcaag gttcggtgga atcagacagt 1020
cttgaagatg gatttaggtg gagaaaatac ggacagaaag ttgttggagg caatgcgtat 1080
ccaagaagtt attacagatg cacgagcgcg aattgcagag caaggaaaca cgtcgagaga 1140
gcgagtgatg atccaagagc ttttattaca acctacgaag gtaaacacaa tcaccatttg 1200
ctcttgagac ctccaccttc gtctacggtt cttcttccct ttaactccac acaacattct 1260
aatcaagcca tttga 1275

<210> SEQ ID NO 79
<211> LENGTH: 424
<212> TYPE: PRT
<213> ORGANISM: Thlaspi arvense

<400> SEQUENCE: 79

Met Glu Val Lys Glu Ser Glu Arg Val Val Ile Ala Lys Pro Val Ala
1 5 10 15

Ser Arg Pro Ser Cys Ser Ser Phe Arg Thr Phe Thr Glu Leu Leu Thr
20 25 30

Asp Ser Ala Thr Val Ser Pro Gln Ser Asn Cys His Glu Ile Val Asp
35 40 45

```
Ala Ala Ile Arg Pro Lys Thr Leu Arg Phe Asn Gln Pro Ala Ala Ala
    50                  55                  60

Ala Val Ser Cys Pro Arg Ala Lys Glu Asn Gly Asn Gly Lys Ser Cys
65                  70                  75                  80

Asp Asp Thr Asp Gly Gly Asn Tyr Val Val Tyr Lys Pro Lys Ala Lys
                85                  90                  95

Leu Val Ser Lys Ala Thr Val Ser Val Leu Ala Asn Met Gly Asn Arg
            100                 105                 110

Gln Gln Thr Trp Arg Gln Pro Glu Ala Val Ala Tyr Gly Lys Ser Val
        115                 120                 125

Ser Gln Gly Thr Gly Pro Asn Leu Val Gln Arg Val Ser Ser Phe Thr
    130                 135                 140

Glu Thr Glu Thr Ser Val Gly Asp Arg Ser Ser Val Asp Gly Tyr Asn
145                 150                 155                 160

Trp Arg Lys Tyr Gly Gln Lys Gln Val Lys Gly Ser Glu Cys Pro Arg
                165                 170                 175

Ser Tyr Tyr Lys Cys Thr His Pro Lys Cys Pro Val Lys Lys Lys Val
            180                 185                 190

Glu Arg Ser Leu Gly Gly Gln Val Ser Glu Ile Val Tyr Gln Gly Glu
        195                 200                 205

His Asn His Ser Lys Pro Ser Cys Pro Leu Pro Arg Arg Ala Ser Ser
    210                 215                 220

Ser Ser Ser Ser Gly Phe Gln Lys Pro Pro Lys Gly Leu Val Ser Glu
225                 230                 235                 240

Gly Ser Met Gly Gln Asp Pro Asn Ser Asn Ala Phe Tyr His His Pro
                245                 250                 255

Leu Trp Ser Asn Gln Ser Asn Asp Ser Ser Lys Met Tyr Glu Gly Cys
            260                 265                 270

Val Val Thr Pro Phe Glu Phe Ala Val Pro Arg Ser Ala Asn Ser Thr
        275                 280                 285

Gly Gly Thr Ser Asp Ser Gly Cys Arg Ser Ser Gln Cys Asp Glu Gly
    290                 295                 300

Ser Asn Gly Gly Glu Leu Asp Asp Pro Ser Arg Ser Lys Arg Ser Arg
305                 310                 315                 320

Lys Asn Glu Lys Gln Ser Ser Glu Ala Gly Val Ser Gln Gly Ser Val
                325                 330                 335

Glu Ser Asp Ser Leu Glu Asp Gly Phe Arg Trp Arg Lys Tyr Gly Gln
            340                 345                 350

Lys Val Val Gly Gly Asn Ala Tyr Pro Arg Ser Tyr Tyr Arg Cys Thr
        355                 360                 365

Ser Ala Asn Cys Arg Ala Arg Lys His Val Glu Arg Ala Ser Asp Asp
    370                 375                 380

Pro Arg Ala Phe Ile Thr Thr Tyr Glu Gly Lys His Asn His His Leu
385                 390                 395                 400

Leu Leu Arg Pro Pro Pro Ser Ser Thr Val Leu Leu Pro Phe Asn Ser
                405                 410                 415

Thr Gln His Ser Asn Gln Ala Ile
            420
```

<210> SEQ ID NO 80
<211> LENGTH: 5443
<212> TYPE: DNA
<213> ORGANISM: Thlaspi arvense
<220> FEATURE:
<221> NAME/KEY: misc_feature
<222> LOCATION: (887)..(887)
<223> OTHER INFORMATION: n is a, c, g, or t

<400> SEQUENCE: 80

```
ttgaatgtga tatatgatat tgcggctggc cgagctggct ggtttaagta ctcaaccaga     60
cagtaaagta aaacagccgc atagattgaa atctcgtgga acgtataacc agctcctgtc    120
tgtcctagaa ttggcggttc gggatagaac tgttccttac atctcttgga atctccggtt    180
gagttgatgc taattgtatc actacttgtg atgtgatcta gaaacaaaca tagcttatgt    240
tttgcgtttg cggtctctga gaaatcgttg gggttctatg attcttctgg cctgacaatt    300
aaaatcattt tatggaccca attgaaagac taaaccggac gcagcctatt gcaatttaaa    360
gaacaataac gagcatgtag gttagaaacc ggtttgtagt tccacttgag tcgaaactgt    420
actacttgaa aaatttgggt tttagactta aactggtttc aagctccttt tatctagggt    480
ggagagaact tgttaggaaa aaaaacaaat tgttgtaatg cgcggaacgg atcgacttat    540
gctctataaa agtctgcgga cgcagccaat attaaaggca tgttattata agaaaatgtc    600
ttgcggatgc aaaattaagg taaaataaaa cttctgtttt aaactgtaac tgtgtgtaca    660
ttgattatgc tcaaacaaac caccttctta acgaatcttt aaggaggtgt tattggttct    720
tatattttaa tggatttgag aatctaaacc aaattcagta ttattggttt ttgtatttta    780
aaatttatat tgaaatatag tgttattagt tttatgattt taaaattcat aatgaaatac    840
agtgttattg gttctattat tttagaatct aaatattata aggattnaag aaaatgtctt    900
gcggatgcaa aattaaggta aaataaaact tctgttttaa actgtaactg tgtgtacatt    960
gattatgctc aaacaaacca ccttcttaac gaatctttaa ggaggtgtta ttggttttta   1020
tattttaatg gatttgagaa tctaaaccaa attcagtatt attattttaa aatttatatt   1080
gaaatatagt gttattagtt ttatgatttt aaaatccata atgaaataca gtgttattgt   1140
atctatcatt ttagaatcta aatattataa ggatttgagt tttaattgaa tttgaatgga   1200
tttggaagga ttttcatgac taaaatataa agatccaaat acaaagtcta attttggtat   1260
ttaaatagat ttgatttttt ttttattttta ttgattttga aatcaataaa tttatcaaat   1320
ccaaaaaaga tttataaatc taccaaaata caagaaccaa taacccctag taagtaatcc   1380
agcaaactgt ttgtataatg tcacctctaa tagtagttga aaattacaaa ctaataattg   1440
tttaactttc ataaatgttt ctgttaatgg ataattcata atattttttg tattgtgata   1500
ctttattata ttcatgcgaa taataatatt ttagtttcgg ttcaatataa acttctgaaa   1560
ttgggacaac agcaacgtga taatattata tatcttctta tttctgacaa tggagagggg   1620
tgaaatcgag aatgaaccgg tttaaatttc ggtacggttc agttcacttt gtctaaacga   1680
gttggtatgg ttcacgcgtg ctttacttct aacaagacaa gctcgcgcgc gtgtgtcaac   1740
aaccaaccaa agtcactttg gccgctggag cctcaaccaa aattcgaaac gacgccgttt   1800
ctttggccgc gtttccaact aactttcaaa ggcctataaa actcaactaa cgttcaacca   1860
aaactatctg tctcttctct gtctttcatt ttcatcgcct tctttcatca ctatagacta   1920
gctcatctaa agtacggacc ttgatccatc caacgtaccc taccttgaca cgtgtccctt   1980
gacagtgtgt cggcaagact caacgaactg aaccgatacg acggatacat caacgcccac   2040
cttaatgaaa aacccgaatt cggatcttcc taaagggttt tgcctcaaac tcctttttttg   2100
aacttcagat tctgcatcat catctctctc accgtgagta acttacttat gtcctctctt   2160
ttgcgtcact tatggtttta catttgtatt catcttttgg gtttttgatt tggaatgatt   2220
```

```
cagaacctaa tcacaactgt atcggcgcat gtgggtatca tcaagtttct tttttttttt   2280
tttccggcat catcaagttt ctttcttttt gctatagttt gcatcaaact ttccaaggct   2340
ctatatatag atcgagatta tgtattgttg gatttgatgc ttctcaccgt ccaaatccaa   2400
tcttttgttc ctctcctttt aaaaccttct cgatacttga cttaagactc tagaaaatga   2460
gctccgattc agaatctgaa tctcttataa atttgattga ggctatgtga agctaatgtg   2520
ttgattttta atctgtggaa catttttcag gttgaatcaa agctttttga ctggaaacaa   2580
ttttgggtgg taaggttgga acaatggagg tgaaagagag tgaaagagtg gtaatagcca   2640
aaccagtggc ttcaaggcct tcatgctcta gcttcaggac tttcactgag cttctgactg   2700
attcagctac tgtgtctcct caatcgaatt gccacgagat tgtagacgct gccattagac   2760
caaagactct caggtttaac cagccagctg cagctgcggt ctcatgtcca cgggtgattc   2820
atcttattaa tctcttggca atataatata tcttcttatt tctgaatctt ctgcatttta   2880
gcactgactc gtataagttt ttctcataat cttaggctaa agaaaatggc aatggaaagt   2940
cttgtgatga cacagatggc ggaaactacg tcgtttacaa acctaaagca aagcttgtct   3000
ccaaagcaac cgtctctgtg ttggctaaca tggtaagttg tttctagtgc tacaaagatc   3060
aagaatttct cggaattagt ttcttaactc tgtttttgtt ttagcttcag gggaatcgtc   3120
aacagacttg gagacaaccc gaagcagtag cgtatgggaa gagtgtgagt caaggtactg   3180
gtcctaatct agtccagaga gtttcatcct ttacagaaac agagacatcg gtcggggaca   3240
gatcatctgt ggacggatac aactggagga aatacggaca gaagcaagtt aaaggaagtg   3300
agtgtccaag aagctattac aaatgcacac acccgaaatg tccggtgaag aagaaagtag   3360
agaggtcatt gggaggtcag gtctcagaga ttgtgtatca aggtgagcat aatcactcga   3420
agccgtcttg tccacttcca cggcgcgctt cgtcatcatc ctcttcaggg tttcagaaac   3480
caccaaaagg gcttgtctct gaaggatcaa tgggacaaga ccctaatagt aatgcctttt   3540
atcatcatcc tctttggagc aatcaaagca atgactcgtc taagatgtat gagggttgtg   3600
ttgtaactcc attcgagttc gctgttccaa gatcggcgaa ttcaaccggc ggaacttcgg   3660
attccggttg tcgaagtagc cagtgtgatg aaggcagcaa tggaggagag cttgatgatc   3720
caagcagaag caaaagaagg tataatatta gagagctttg aatagtttca aaacaccaat   3780
cttcttcgtt tactgttaca ttgactttta tgaataataa tatacagcag gaagaacgag   3840
aagcaatcaa gtgaagcagg agtatcgcaa ggttcggtgg aatcagacag tcttgaagat   3900
ggatttaggt ggagaaaata cggacagaaa gttgttggag gcaatgcgta tccaagaagt   3960
tattacagat gcacgagcgc gaattgcaga gcaaggaaac acgtcgagag agcgagtgat   4020
gatccaagag cttttattac aacctacgaa ggtaaacaca atcaccattt gctcttgaga   4080
cctccacctt cgtctacggt tcttcttccc tttaactcca cacaacattc taatcaagcc   4140
atttgatgaa tgatggtata ttgatacatt acttcttcaa tcttcatagc aacattagtt   4200
catcattttc ttgttgttgc actgtgaatt tatttatttt acatcaaaat tgtaaggaga   4260
agcaaaatag ttgttattta acaaacgaaa aaaaaagcaa ataaaaagag tgttatattt   4320
taggtttaac aacttatgtt cccatgttgt agctttcttc tgttagtata ttgggtttga   4380
tctacagtag tggtaaaaag aaactacttt tactaatcac aaaaacagta aatgtaaaac   4440
gcaacacaca cttaccgctt aataaatcat ttgaagctta accaccaatt agttgaaata   4500
caaacatgaa aggtttggtt acaattgatt tcatggcaat aaacaatttt tatttaggaa   4560
aatagcagaa aatcggaata tttaatttgg agttaagaac cattgaagat ggaaaccata   4620
```

```
tcactttaat gtatcagctt tctaattaga aatataaaga tgaaatattc ttaaatatga   4680

aaccgtttga tcaaagatcc caagtcgata aagcgtcaaa acttgattaa aggtagagaa   4740

atttctgaa acatatccaa agctaacgaa aacagcacaa aaaaaatgtc tttggagata   4800

taatgcaaac tcagggcaaa ggaagatccc ttaacgattg gccttggcaa cacgctcaat   4860

ctcatctttc ttcttgatag catagctgca aagacaagac aaagatgcat ctcatcagct   4920

actaaagtaa cacaaatgtg aagccattta atagacaaga cgatgtagag aatttgtttt   4980

ataaaacctg ttggaagatc ccttggcagc attgatgagt tcatcagcaa ggcactcagc   5040

gattgtcttg acgtttctaa acgcagcctc acgtgcacca gtggtgatca agaagattgc   5100

ttggttcaca cgtcttagag gagagatatc aacggcctgc ctcctaacca caccagcaga   5160

tccaatcctg gtagcatctt ctctcggacc actgtctcac caaaaataaa cgaacatcat   5220

gagaaaagag gttcataaca acacaacaag aaagtgagag ggtttcagta tcaccacatg   5280

tttgatttac ttacctgtta acaatggcat caatgataac ctgaatcggg ttctggtcag   5340

acaagagatg gatgatctcc atggcgtgct tgatgatcct gacggccatc agcttcttac   5400

cgttgttcct tccgtgcatc atgagagagt tcgtgagcct ctc                     5443
```

<210> SEQ ID NO 81
<211> LENGTH: 404
<212> TYPE: DNA
<213> ORGANISM: Thlaspi arvense

<400> SEQUENCE: 81

```
caaacacacg ctcggacgca tattacacat gttcatacac ttaatactcg ctgttttgaa     60

ttgatgtttt aggaatatat atgtagctat ctgatcggtc agtattttca caggtcgtga    120

tatgattcaa ttagcttccg actcattcat ccaaataccg agtcgccaaa attcaaacta    180

gactcgttaa atgaatgaat gatgcggtag acaaattgga tcattgattc tctttgataa    240

tactcaccga tcagacagct ctcttttgta ttccaatttt cttgattaat ctttcctgca    300

caaaaacatg cttgatccac taagtgacat atatgctgcc ttcgtatata tagttctggt    360

aaaattaaca ttttgggttt atctttattt aaggcatcgc catg                      404
```

<210> SEQ ID NO 82
<211> LENGTH: 404
<212> TYPE: DNA
<213> ORGANISM: Thlaspi arvense

<400> SEQUENCE: 82

```
caaacacacg ctcggacgca tattacacat gttcatacac ttaatactcg ctgttttgaa     60

ttgatgtttt aggaatatat atgtaggaac gtattaccta cacattttca caggtcgtga    120

tatgattcaa ttagcttccg actcattcat ccaaataccg agtcgccaaa attcaaacta    180

gactcgttaa atgaatgaat gatgcggtag acaaattgga tcattgattc tctttgataa    240

tgtgaaggta atacgctcct ctcttttgta ttccaatttt cttgattaat ctttcctgca    300

caaaaacatg cttgatccac taagtgacat atatgctgcc ttcgtatata tagttctggt    360

aaaattaaca ttttgggttt atctttattt aaggcatcgc catg                      404
```

<210> SEQ ID NO 83
<211> LENGTH: 404
<212> TYPE: DNA
<213> ORGANISM: Thlaspi arvense

<400> SEQUENCE: 83
caaacacacg ctcggacgca tattacacat gttcatacac ttaatactcg ctgttttgaa 60
ttgatgtttt aggaatatat atgtagtcag ctccgagtta tcaattttca caggtcgtga 120
tatgattcaa ttagcttccg actcattcat ccaaataccg agtcgccaaa attcaaacta 180
gactcgttaa atgaatgaat gatgcggtag acaaattgga tcattgattc tctttgataa 240
ttgaaaactc ggagccgact ctcttttgta ttccaatttt cttgattaat ctttcctgca 300
caaaaacatg cttgatccac taagtgacat atatgctgcc ttcgtatata tagttctggt 360
aaaattaaca ttttgggttt atctttattt aaggcatcgc catg 404

<210> SEQ ID NO 84
<211> LENGTH: 404
<212> TYPE: DNA
<213> ORGANISM: Thlaspi arvense

<400> SEQUENCE: 84
caaacacacg ctcggacgca tattacacat gttcatacac ttaatactcg ctgttttgaa 60
ttgatgtttt aggaatatat atgtaggaac ttgacagtat aatcttttca caggtcgtga 120
tatgattcaa ttagcttccg actcattcat ccaaataccg agtcgccaaa attcaaacta 180
gactcgttaa atgaatgaat gatgcggtag acaaattgga tcattgattc tctttgataa 240
gattttactg tcaagctcct ctcttttgta ttccaatttt cttgattaat ctttcctgca 300
caaaaacatg cttgatccac taagtgacat atatgctgcc ttcgtatata tagttctggt 360
aaaattaaca ttttgggttt atctttattt aaggcatcgc catg 404

<210> SEQ ID NO 85
<211> LENGTH: 1998
<212> TYPE: DNA
<213> ORGANISM: Thlaspi arvense

<400> SEQUENCE: 85
ctataaaata taatatttag caccttgaca ggattgtcag ttattatatt gttagagtga 60
taaagatcat catcacgtac atataaagag attataagat aaaaataatt ttcggtactg 120
taggttttct gcaatttaaa ttatttaaaa tatgtaattg agaaaatatt cggtcgcctg 180
gtttatatag tcaagtgtta cgaaaacatg tttgttttgt atgcaatttt tgttttactt 240
atttgagaca taaatgagtt attttataat gggctgttac agatatgttt aattaatata 300
aattattggt ttttaacttg ttgatttttt atttttattt ttcaagcttt agaaactgat 360
gccacgtggc attgtgggag agagtttttt ttgcttaggt ggatagccta agaagcccca 420
aataatcctt tttatttagt atagattagt cacggcttcc acgaaacaag ttcaattaaa 480
tttaacggaa ataaatggta attaatgaaa gtttgaattg tattaattac tgcttccacg 540
aaacaaccaa aaaaatcatt tgacaaagta atttgtgtac ggtattagcc acatggggcc 600
aatcctctat gtatatcgga gttgttttgc caaatgccca attcttactc tagtaaatat 660
taaaccattt tgtagatcct aatcttgagt caactcaaag tcctatgttt ggaaactaaa 720
aataagttta aatcctctag actacgacta agttgtaaaa agaaatgttc aaaattcctt 780
agacattgaa attgaatact tcaattaaag aaaattttac cagcatgttc atagtagtag 840
accaccacag aacaaaatta atagttttta cattgcattc ttatataata attttggagt 900
ataattgtaa ttataaacaa aataactaaa agaaaaggaa agtattcttg acatatttat 960
aggtactaat ttgctagtac gactattaat tatggagatt aaatctagta tttgactaac 1020
cagaaacatt ttaaaggtaa gtgataagtt gataacctcg caattatttt tgaaagctat 1080
taatcacttt agcagaatgt atacaagttc tatattaaca agtttatctc aaaatcttga 1140
gatcctacta ataaatcata acttttctct tattggtatg tcgaatctag tgtttaccaa 1200
actagaggtg ttgaccgtta gagacaatta aacaacttac atacatacaa aagtacaagc 1260
cgaagaataa tagtaataac agtgcatttt ctacaataat taaaacaaaa aagtatatta 1320
aaaattagca tttattccaa ttaataccaa tattcgaaaa ttaatatggt agaaaagcaa 1380
aaagcttacg taaattccac agattgtcaa aaccctgcaa tgaaaaagtt gccaaaaatt 1440
gacgaggttg gtccacaaaa tttaaggttc tttgcttcac actctattta taggcgaaga 1500
gatgaaacag aggaaattaa ttactcctta acaaaggttg ttttcactca accacatgcc 1560
ttctcaagtg tctgctgctc acattccccg agattctcat ttacttactc ctctatttgg 1620
tacgtccttt atattacaat tctagtattt ttttttcat tattcgtttt gttcatactt 1680
cgtttcataa acatatatag ttaatcttat attatacagt aactttgata aatatgtatc 1740
ttaatttact cacgcagttt agagagacga ttgatacgtg gggactactt acgtacctgc 1800
atgattatat aagttataaa agttattgca gaacattaaa ttactttgat agctcgagag 1860
caatcattat ataaagctat atttttaatc acaaatatac atctactcga aagttttttt 1920
tttaaaaaaa agatgaaatc cctaaacaaa cgttcccaaa tgttctcatc actctccaac 1980
cacgattcac cacattca 1998

<210> SEQ ID NO 86
<211> LENGTH: 1978
<212> TYPE: DNA
<213> ORGANISM: Thlaspi arvense

<400> SEQUENCE: 86
agtaactgag aggaatgtaa ctgagagaaa aaagaaaagt aataattaaa ataattgaaa 60
ataataagta agagcatcta gatagtcctt accaaaaaaa agatcatcta gatagtcttt 120
ccatagtatc tgatttatat aatactaata taatgtattt atataattaa attataaatt 180
aataaagaga tgaaccaatt cttaacagac atttgcctag agacatatct ttattcttaa 240
caaacatttg gctagaaaca tatctaatag tttcttgttt caaaaatgtc ttcgcttttt 300
ttctgttttt ctcccttcct ttttccttat ttttttatt tttcttattc actaaatata 360
ctcccataat atctgctata taatattaat ataatatatt tatataatta aattaaaaat 420
tcataaagag atgaaccaat tcttaataga tatttggcta aatacatatt taatattttt 480
ttgtttgaaa gatatctttg ctattttttt tctgtttctt tctcttcttt tcttcttata 540
tttcttattt tttttattca ataaatatat tttaaaaaac accaattttc ttataagaat 600
atctgaaaat aattgagaat aattaaatta aatattttct tttagtaaaa cttataatta 660
tatatatgct aaaaagatat gtgatattta ttattctatc tttaaagatt tttttatcgt 720
gaatcactat tttcagttat ccaacctaaa atgaatactc agagagcaac cacatcgaaa 780
gtgttagaga ttgaatgaat acagttctta aaaggtttat ttcacattaa tgaagtctat 840
caaaacaaaa tttatctaat tacatctcta taacaaaaat gataattcta aagttaaatg 900
aaaaaaaaaa acaaaaaaat agagagaatt tttctttaaa aaaaagataa gaaagatcaa 960
taaaaccgac ttcctcacat tataaataga aaagtcttca taatttgaag attcaatccg 1020
aaaatcccta aaattctaga aagtaagacc aaatgttcaa agttttctag tttaattttt 1080

```
tcaagtgttc ttacacacag tttagcaaaa cgtgattgtt aagctatctt tgtaatcact   1140

ctgagctttt gagtaataat gagatttaat tttttaaaca cacaacctta tattgctttt   1200

tttctttgag tgatatcttg gttaacaatt gacgtcgtct gtagaaaata aagaataaat   1260

tcttaagcaa aacaaggttt agagatgagc tctccgaata agagcaatca acacactcaa   1320

atccctacct ttgatgagca cagcaacccc cattgtcatt ggaaatcaaa caccacctcc   1380

accactagcc acatgaacat tgacccttgt ctctaccggt gatcttgctg ctgcaattca   1440

acccgcccta aaaatcgatc acctaagacc ttagttccaa attcgataac ttgcaagctc   1500

agcaagcaag ggatcaggaa caactcaacc tcatggcaac ctcggccact aaacaagttg   1560

caccacttgg acgaagactt gtctttgaga cacccaccgt ccacatcgta gcaagagcca   1620

caacagacac ccaagcaaac aagacgaatg tcccagccct aactaatgaa gcgttacatg   1680

ccaaggtggg ttatgaagtc tcacctgcca aggtgggtta gacgaatgtc tctctgttag   1740

acacctccac ttgaccactt gtttgaggat ggtaaggagt agcaacctta tgcttaacac   1800

catgcttcct tagcagattc tcaaaaactt tgttgatgaa gtggcttcct ccatcactta   1860

taacacacct tggaacacca aaccttggga agatgattat cttgaaaagt ttcagcacaa   1920

ccctagcatc atttgttgga ctggctatgg cttcaaccca ctttgagaca tagtctac     1978
```

<210> SEQ ID NO 87
<211> LENGTH: 1424
<212> TYPE: DNA
<213> ORGANISM: Thlaspi arvense

<400> SEQUENCE: 87

```
tgctttggga gttatgatgg aaaacctaat tctctaactc tgtttatata gggaagactc     60

aggaaaaatc ctaatatcct tttctcttgg gcttctgaca catgaacctt tccttttcct    120

attgagccta gatccagaac gttacaacta gaatcagaat cgaacaacaa gcgtatgcgc    180

ttaagaaatg atttttactc acactatatg ggcgcgcatg gcattgtcgt aagaattaaa    240

taagcttcgt cccactcctt attggattta cgcacacagt caatccacgt ggttgtcata    300

actaaatata attggtgaaa aaactaattt aaagacaaag taagaagcgg aaaccgaagg    360

aaaagccaaa caacattatg tttatcgaca aaaaagccaa aacaacattt aatgttaatt    420

tttgtccaaa ccaggaatac atcactcata cggtcatata taccataccc caaattgtat    480

gtactacatg tgtacgtaac tgatttatgt atatctatct atttctcttt tattgtaggg    540

gtcaaaatct acctatcgat atttataaat aggattttat aagacattgt taaaatggaa    600

aacatggtag ctacttggcc agcgattaac atcaataatt aaaaatacga attgtgaaac    660

atctcactct cttcctttta tcacaccaaa ccacttctct ttctttactt accggtcagg    720

tcaacaattc taccattccc tttatttagt ttttttttt catctatctc tcttttcatt    780

tttaactttt aaaaaatatt agtccgaaaa tcgcactctt ttatattcgt tgatgggcat    840

taaaatattg taaaaattaa aaaaaatgtg taaattaaaa cgcaatttgt ttgcacctgc    900

agcagtagta acacacaagt caaagcaatg tctgttttct cttgtatgtc ggttagctat    960

tttatgtact gaaatatgtt attctttctg accaaaacat attaagaaat ttgcattctg   1020

taatttgatt tatccaatca gtagaggaca cgtaaccaag ataattagat atttttattc   1080

tatctgtata ctactaattc atccaacgtc tgttggacga ccaaccagtc aaaactcata   1140

aaagtcaact tttactacat cgtgaatttt ttggtcatgc atttatatac acatacatgg   1200

aagaaaaaac aatactttac ctatgtcaaa atgctgcaaa agcattaaga tggtatgtat   1260
```

acatacatat tgatataaca gtggtcccat atatcatttt aaatcatcat aaagagtatc 1320
catcttcttt catattaaca tccccttcaa agttataaga tttttctctc ttcattagag 1380
agagagagag agagaattaa cacaagtttt aatctccggg aaag 1424

<210> SEQ ID NO 88
<211> LENGTH: 1982
<212> TYPE: DNA
<213> ORGANISM: Thlaspi arvense

<400> SEQUENCE: 88
tttaagactc taacaatatt gatgccaact ctagaaaagg acaactgaac ttattttgtt 60
ttaagccttg gctatattac attatcagtt ttacacttct acgtatacac aactttaatt 120
tttctatatt actacatgca tactagatgt tagaaatatc ttatataagc atacatatta 180
aattagttat gcgatattta aaattaatgt atataaatat tcagtttcaa agcttacgaa 240
tacgtaaaat taatcaatac aaaccgaaac caaaaagcca cttctcatct caaaatgtta 300
attacaaatt tacaataagc cgaatcacta tctaaaaagc ttttgggatc ccgagaccca 360
aaacatttct tcgtataagt gcaacaatta tcgagtgtga tgagacacgt aaaaagcaag 420
gatcgggaca acgattttcg gctatatagt agtttctcat atctgacttt attagcaaat 480
tactacataa aattgctttt aagtatgatt aacggaacaa gtataatgcg tttatttaat 540
tacagatctg gctaaatgta atatggtatc aaagctggaa agacaaatag tctaaggttt 600
ggaatttttc atctgtctat aaaattctta agacactgat agatcattaa cttattttgg 660
agtcaccaat ggacaaatca ataactattg atgtccaaaa cccacaagac aagcctattt 720
tttttgcacg tgcaagtaca ccggtggaag aattcatttg tatactgaat ctgaaattat 780
aaaagattag aattggttga agaatttact tcaaaacaag ctagaagatg gtgttattta 840
aataaacaat gttaaattat atcaatgact ttcaaatttt atcaaaacat tttttgaaag 900
agaatcacgc acaaagtatt tcgaattaca aaacaatttt ttgcaataaa ttttatagtt 960
aaagcaaatt ttgtcaatta ttgaaaaaaa ttacttagat aaaatatcta attttttttt 1020
ttaaacaatg tctctataaa agatggatta gccaagaaaa tctgatggat gctacaacgc 1080
agggttggag atatggtgct gacactacat actattaatt ggttgataga atcggtaaat 1140
atagatatga atatcgaaat ggagacaaca ggaaactcaa ccgtatggaa ggaataaaat 1200
agaggaactt taaagagaac ttgaggatat acaaacagat gactcacgta tgcaagagaa 1260
gcttaatgag ataacaaata actaaaggat gcgtatcggg atgagaaaca attctggcaa 1320
cagaagagca gaaacttatg gaacaaatgt ggagatttta atacataatt ttataatact 1380
tcaacaaagc aacggaggac tataaacaga atagtgggac tacatgatag tcagggtgta 1440
tggataactt aggttgcatg gaaactccct ccgaggtacg tttctcgctt ccgaaacgtt 1500
tcggaaaccg aaactctcgg aagctcgtcg gaaacacaaa aatcacgttt cctaaaaatt 1560
ctaatttgtg aatactttgg aaacacgttt ccattttaaa aacacatgtt tccattttgg 1620
aaagaagata aaaactaatt ttttttgttt tatgaaataa atagataatt ataaaaatta 1680
gatttaaatg atcaatttaa ttatttatag taaataataa ttgatttggt aactaaaatt 1740
aattttgata ttattaagtt tgaaaattat tctttccatg aattagaatt agagatagtt 1800
tggttaatga aactaataaa attgataata aagaaaatct tctaaatttt tgactttaca 1860
tattttaatt tttatagttt aataattatg taaaaattat atattagatt ttgttgattt 1920
aaatattcta cttataacat aattagatct ttaataatta atatatatat atacacattt 1980
cc 1982

<210> SEQ ID NO 89
<211> LENGTH: 24
<212> TYPE: DNA
<213> ORGANISM: Thlaspi arvense

<400> SEQUENCE: 89
attgtatatc atgatccatg gcga 24

<210> SEQ ID NO 90
<211> LENGTH: 24
<212> TYPE: DNA
<213> ORGANISM: Thlaspi arvense

<400> SEQUENCE: 90
aaactcgcca tggatcatga tata 24

<210> SEQ ID NO 91
<211> LENGTH: 24
<212> TYPE: DNA
<213> ORGANISM: Thlaspi arvense

<400> SEQUENCE: 91
attgatctga tggatttgga aggt 24

<210> SEQ ID NO 92
<211> LENGTH: 24
<212> TYPE: DNA
<213> ORGANISM: Thlaspi arvense

<400> SEQUENCE: 92
aaacaccttc caaatccatc agat 24

<210> SEQ ID NO 93
<211> LENGTH: 24
<212> TYPE: DNA
<213> ORGANISM: Thlaspi arvense

<400> SEQUENCE: 93
attgttcgtg ctgatgaatc ttct 24

<210> SEQ ID NO 94
<211> LENGTH: 24
<212> TYPE: DNA
<213> ORGANISM: Thlaspi arvense

<400> SEQUENCE: 94
aaacagaaga ttcatcagca cgaa 24

<210> SEQ ID NO 95
<211> LENGTH: 24
<212> TYPE: DNA
<213> ORGANISM: Thlaspi arvense

<400> SEQUENCE: 95
attgacaacg gtgcaataaa gacg 24

<210> SEQ ID NO 96
<211> LENGTH: 24
<212> TYPE: DNA
<213> ORGANISM: Thlaspi arvense

<400> SEQUENCE: 96
aaaccgtctt tattgcaccg ttgt 24

<210> SEQ ID NO 97
<211> LENGTH: 24
<212> TYPE: DNA
<213> ORGANISM: Thlaspi arvense

<400> SEQUENCE: 97
attggcatgc cctagcttcc gatg 24

<210> SEQ ID NO 98
<211> LENGTH: 24
<212> TYPE: DNA
<213> ORGANISM: Thlaspi arvense

<400> SEQUENCE: 98
aaaccatcgg aagctagggc atgc 24

<210> SEQ ID NO 99
<211> LENGTH: 24
<212> TYPE: DNA
<213> ORGANISM: Thlaspi arvense

<400> SEQUENCE: 99
attgatgcac ggcattatcg ccgg 24

<210> SEQ ID NO 100
<211> LENGTH: 24
<212> TYPE: DNA
<213> ORGANISM: Thlaspi arvense

<400> SEQUENCE: 100
aaacccggcg ataatgccgt gcat 24

<210> SEQ ID NO 101
<211> LENGTH: 24
<212> TYPE: DNA
<213> ORGANISM: Thlaspi arvense

<400> SEQUENCE: 101
attgagtttc ctggaccagt gtta 24

<210> SEQ ID NO 102
<211> LENGTH: 24
<212> TYPE: DNA
<213> ORGANISM: Thlaspi arvense

<400> SEQUENCE: 102
aaactaacac tggtccagga aact 24

<210> SEQ ID NO 103
<211> LENGTH: 24
<212> TYPE: DNA
<213> ORGANISM: Thlaspi arvense

<400> SEQUENCE: 103
attgccatcg aagacgcgac tgtt 24

<210> SEQ ID NO 104
<211> LENGTH: 24
<212> TYPE: DNA

<213> ORGANISM: Thlaspi arvense

<400> SEQUENCE: 104
aaacaacagt cgcgtcttcg atgg 24

<210> SEQ ID NO 105
<211> LENGTH: 24
<212> TYPE: DNA
<213> ORGANISM: Thlaspi arvense

<400> SEQUENCE: 105
attggttctc tgcgatgctc acat 24

<210> SEQ ID NO 106
<211> LENGTH: 24
<212> TYPE: DNA
<213> ORGANISM: Thlaspi arvense

<400> SEQUENCE: 106
aaacatgtga gcatcgcaga gaac 24

<210> SEQ ID NO 107
<211> LENGTH: 24
<212> TYPE: DNA
<213> ORGANISM: Thlaspi arvense

<400> SEQUENCE: 107
attggaccga tacttgaaga ccag 24

<210> SEQ ID NO 108
<211> LENGTH: 24
<212> TYPE: DNA
<213> ORGANISM: Thlaspi arvense

<400> SEQUENCE: 108
aaacctggtc ttcaagtatc ggtc 24

<210> SEQ ID NO 109
<211> LENGTH: 20
<212> TYPE: DNA
<213> ORGANISM: Thlaspi arvense

<400> SEQUENCE: 109
cggaagaggc tgcgttagag 20

<210> SEQ ID NO 110
<211> LENGTH: 20
<212> TYPE: DNA
<213> ORGANISM: Thlaspi arvense

<400> SEQUENCE: 110
gcagctaagg gaactttacg 20

<210> SEQ ID NO 111
<211> LENGTH: 20
<212> TYPE: DNA
<213> ORGANISM: Thlaspi arvense

<400> SEQUENCE: 111
cggaagaggc tgcgttagag 20

<210> SEQ ID NO 112
<211> LENGTH: 20

<212> TYPE: DNA
<213> ORGANISM: Thlaspi arvense

<400> SEQUENCE: 112
caggaaaggc gtatgcgagg 20

<210> SEQ ID NO 113
<211> LENGTH: 20
<212> TYPE: DNA
<213> ORGANISM: Thlaspi arvense

<400> SEQUENCE: 113
cgccgtcgga agcttcctcg 20

<210> SEQ ID NO 114
<211> LENGTH: 20
<212> TYPE: DNA
<213> ORGANISM: Thlaspi arvense

<400> SEQUENCE: 114
caaacaagac ctgaggtaca 20

<210> SEQ ID NO 115
<211> LENGTH: 20
<212> TYPE: DNA
<213> ORGANISM: Thlaspi arvense

<400> SEQUENCE: 115
agcattccac catcatctac 20

<210> SEQ ID NO 116
<211> LENGTH: 20
<212> TYPE: DNA
<213> ORGANISM: Thlaspi arvense

<400> SEQUENCE: 116
tcgactggaa cgacgtcgag 20

<210> SEQ ID NO 117
<211> LENGTH: 1188
<212> TYPE: DNA
<213> ORGANISM: Thlaspi arvense

<400> SEQUENCE: 117
atggtgatgg gtacacaacc gtcgttggaa gagatcagaa aggcacagag agcggatggc 60
cccgcaggca tcttggggat aggcacggcc aaccctgcga accatgtgat ccaggcagag 120
tatccggact actacttccg catcaccaac agtgagcaca tgactgacct caaggagaag 180
ttcaagcgca tgtgcgacaa gtcgatgata cggaaacggc acatgcacct gacggaggag 240
ttcctgaagg agaatccgga catgtgcgcc tacatggctc cttctcttga tgtgaggcag 300
gacatcgtgg tggtcgaggt ccctaagcta gggaaagagg cggcagtgaa ggccatcaag 360
gagtggggtc agcccaagtc caagatcacc cacgtcgtct tctgcactac atccggagtt 420
gacatgcctg gtgctgacta ccagctcacc aagctcctcg gtcttcgccc ttccgtcaag 480
cgtctcatga tgtaccagca aggttgctac gccggcggca ctgtcctccg actcgccaag 540
gacctcgctg agaataaccg tggtgctcgt gtccttgtcg tctgctccaa gatcacagcc 600
gtcaccttcc gtggcccctc tgacacacac ctcgactccc tcgttggtca ggctctcttc 660
agtgacggtg ctgccgcgct cattgttggt gcggaccctg atgcctccgt gggagagaag 720

```
cctatcttcg agatggtgtc tgctgcacag accatcctcc cagactcgga cggagccata    780

gatggacact tgagggaagt tgggctcacc ttccatctcc tcaaggacgt ccctgggctc    840

atctcgaaga acatagagaa gagtctagaa gaagcgttta aaccgctcgg gataagtgac    900

tggaactctc tcttttggat agctcaccct ggaggtcctg cgatcctgga ccaggttgag    960

ttaaagctag gactcaagga agagaagatg agggccacgc gtcacgtgct gagcgagtac   1020

ggaaacatgt cgagcgcgtg cgttctcttc attatggacg agatgaggag gaagtccaag   1080

gaggatggtg tggccacgac aggagaaggg ttggagtggg gtgtcttgtt tggtttcgga   1140

ccaggtctca ccgtagagac agtcgtcttg cacagcgtcc ctgtttga                1188
```

<210> SEQ ID NO 118
<211> LENGTH: 395
<212> TYPE: PRT
<213> ORGANISM: Thlaspi arvense

<400> SEQUENCE: 118

```
Met Val Met Gly Thr Gln Pro Ser Leu Glu Glu Ile Arg Lys Ala Gln
1               5                   10                  15

Arg Ala Asp Gly Pro Ala Gly Ile Leu Gly Ile Gly Thr Ala Asn Pro
            20                  25                  30

Ala Asn His Val Ile Gln Ala Glu Tyr Pro Asp Tyr Tyr Phe Arg Ile
        35                  40                  45

Thr Asn Ser Glu His Met Thr Asp Leu Lys Glu Lys Phe Lys Arg Met
    50                  55                  60

Cys Asp Lys Ser Met Ile Arg Lys Arg His Met His Leu Thr Glu Glu
65                  70                  75                  80

Phe Leu Lys Glu Asn Pro Asp Met Cys Ala Tyr Met Ala Pro Ser Leu
                85                  90                  95

Asp Val Arg Gln Asp Ile Val Val Val Glu Val Pro Lys Leu Gly Lys
            100                 105                 110

Glu Ala Ala Val Lys Ala Ile Lys Glu Trp Gly Gln Pro Lys Ser Lys
        115                 120                 125

Ile Thr His Val Val Phe Cys Thr Thr Ser Gly Val Asp Met Pro Gly
    130                 135                 140

Ala Asp Tyr Gln Leu Thr Lys Leu Leu Gly Leu Arg Pro Ser Val Lys
145                 150                 155                 160

Arg Leu Met Met Tyr Gln Gln Gly Cys Tyr Ala Gly Gly Thr Val Leu
                165                 170                 175

Arg Leu Ala Lys Asp Leu Ala Glu Asn Asn Arg Gly Ala Arg Val Leu
            180                 185                 190

Val Val Cys Ser Lys Ile Thr Ala Val Thr Phe Arg Gly Pro Ser Asp
        195                 200                 205

Thr His Leu Asp Ser Leu Val Gly Gln Ala Leu Phe Ser Asp Gly Ala
    210                 215                 220

Ala Ala Leu Ile Val Gly Ala Asp Pro Asp Ala Ser Val Gly Glu Lys
225                 230                 235                 240

Pro Ile Phe Glu Met Val Ser Ala Ala Gln Thr Ile Leu Pro Asp Ser
                245                 250                 255

Asp Gly Ala Ile Asp Gly His Leu Arg Glu Val Gly Leu Thr Phe His
            260                 265                 270

Leu Leu Lys Asp Val Pro Gly Leu Ile Ser Lys Asn Ile Glu Lys Ser
        275                 280                 285

Leu Glu Glu Ala Phe Lys Pro Leu Gly Ile Ser Asp Trp Asn Ser Leu
```

290 295 300

Phe Trp Ile Ala His Pro Gly Gly Pro Ala Ile Leu Asp Gln Val Glu
305 310 315 320

Leu Lys Leu Gly Leu Lys Glu Glu Lys Met Arg Ala Thr Arg His Val
325 330 335

Leu Ser Glu Tyr Gly Asn Met Ser Ser Ala Cys Val Leu Phe Ile Met
340 345 350

Asp Glu Met Arg Arg Lys Ser Lys Glu Asp Gly Val Ala Thr Thr Gly
355 360 365

Glu Gly Leu Glu Trp Gly Val Leu Phe Gly Phe Gly Pro Gly Leu Thr
370 375 380

Val Glu Thr Val Val Leu His Ser Val Pro Val
385 390 395

<210> SEQ ID NO 119
<211> LENGTH: 1188
<212> TYPE: DNA
<213> ORGANISM: Thlaspi arvense

<400> SEQUENCE: 119
atggtgatgg gtacacaacc gtcgttggaa gagatcagaa aggcacagag agcggatggc 60
cccgcaggca tcttggggat aggcacggcc aaccctgcga accatgtgat ccaggcagag 120
tatccggact actacttccg catcaccaac agtgagcaca tgactgacct caaggagaag 180
ttcaagcgca tgtgcgacaa gtcgatgata cggaaacggc acatgcacct gacggaggag 240
ttcctgaagg agaatccgga catgtgcgcc tacatggctc cttctcttga tgtgaggcag 300
gacatcgtgg tggtcgaggt ccctaagcta gggaaagagg cggcagtgaa ggccatcaag 360
gagtggggtc agcccaagtc caagatcacc cacgtcgtct tctgcactac atccggagtt 420
gacatgcctg gtgctgacta ccagctcacc aagctcctcg gtcttcgccc ttccgtcaag 480
cgtctcatga tgtaccagca aggttgctac gccggcggca ctgtcctccg actcgccaag 540
gacctcgctg agaataaccg tggtgctcgt gtccttgtcg tctgctccga gatcacagcc 600
gtcaccttcc gtggcccctc tgacacacac ctcgactccc tcgttggtca ggctctcttc 660
agtgacggtg ctgccgcgct cattgttggt gcggaccctg atgcctccgt gggagagaag 720
cctatcttcg agatggtgtc tgctgcacag accatcctcc cagactcgga cggagccata 780
gatggacact tgagggaagt tgggctcacc ttccatctcc tcaaggacgt ccctgggctc 840
atctcgaaga acatagagaa gagtctagaa gaagcgttta aaccgctcgg gataagtgac 900
tgaaactctc tcttttggat agctcaccct ggaggtcctg cgatcctgga ccaggttgag 960
ttaaagctag gactcaagga agagaagatg agggccacgc gtcacgtgct gagcgagtac 1020
ggaaacatgt cgagcgcgtg cgttctcttc attatggacg agatgaggag gaagtccaag 1080
gaggatggtg tggccacgac aggagaaggg ttggagtggg gtgtcttgtt tggtttcgga 1140
ccaggtctca ccgtagagac agtcgtcttg cacagcgtcc ctgtttga 1188

<210> SEQ ID NO 120
<211> LENGTH: 300
<212> TYPE: PRT
<213> ORGANISM: Thlaspi arvense

<400> SEQUENCE: 120

Met Val Met Gly Thr Gln Pro Ser Leu Glu Glu Ile Arg Lys Ala Gln
1 5 10 15

```
Arg Ala Asp Gly Pro Ala Gly Ile Leu Gly Ile Gly Thr Ala Asn Pro
            20                  25                  30

Ala Asn His Val Ile Gln Ala Glu Tyr Pro Asp Tyr Tyr Phe Arg Ile
        35                  40                  45

Thr Asn Ser Glu His Met Thr Asp Leu Lys Glu Lys Phe Lys Arg Met
    50                  55                  60

Cys Asp Lys Ser Met Ile Arg Lys Arg His Met His Leu Thr Glu Glu
65                  70                  75                  80

Phe Leu Lys Glu Asn Pro Asp Met Cys Ala Tyr Met Ala Pro Ser Leu
                85                  90                  95

Asp Val Arg Gln Asp Ile Val Val Val Glu Val Pro Lys Leu Gly Lys
            100                 105                 110

Glu Ala Ala Val Lys Ala Ile Lys Glu Trp Gly Gln Pro Lys Ser Lys
        115                 120                 125

Ile Thr His Val Val Phe Cys Thr Thr Ser Gly Val Asp Met Pro Gly
    130                 135                 140

Ala Asp Tyr Gln Leu Thr Lys Leu Leu Gly Leu Arg Pro Ser Val Lys
145                 150                 155                 160

Arg Leu Met Met Tyr Gln Gln Gly Cys Tyr Ala Gly Gly Thr Val Leu
                165                 170                 175

Arg Leu Ala Lys Asp Leu Ala Glu Asn Asn Arg Gly Ala Arg Val Leu
            180                 185                 190

Val Val Cys Ser Glu Ile Thr Ala Val Thr Phe Arg Gly Pro Ser Asp
        195                 200                 205

Thr His Leu Asp Ser Leu Val Gly Gln Ala Leu Phe Ser Asp Gly Ala
    210                 215                 220

Ala Ala Leu Ile Val Gly Ala Asp Pro Asp Ala Ser Val Gly Glu Lys
225                 230                 235                 240

Pro Ile Phe Glu Met Val Ser Ala Ala Gln Thr Ile Leu Pro Asp Ser
                245                 250                 255

Asp Gly Ala Ile Asp Gly His Leu Arg Glu Val Gly Leu Thr Phe His
            260                 265                 270

Leu Leu Lys Asp Val Pro Gly Leu Ile Ser Lys Asn Ile Glu Lys Ser
        275                 280                 285

Leu Glu Glu Ala Phe Lys Pro Leu Gly Ile Ser Asp
    290                 295                 300
```

<210> SEQ ID NO 121
<211> LENGTH: 1239
<212> TYPE: DNA
<213> ORGANISM: Thlaspi arvense

<400> SEQUENCE: 121

```
atggctccag ggactctcac cgagctcgcc ggagaggcta agctcaactc taaattcgtc      60

cgggacgagg acgaacgtcc caaggtggca tacaacaagt ttagcgacga tatcccggtg     120

atatctctcg ccggactcga cgatgttggt gggaaaagag gagagatctg ccgtaagatc     180

gttgaggctt gcgagaattg gggcgtgttc caggtggtcg atcatggtgt cgataccaat     240

ttggtagagg atatgactcg cctcgctcgc gacttctttg ctttaccacc cgaagagaaa     300

cttagtttcg acatgtctgg tggtaagaaa ggcggcttca tcgtctctag tcaccttcag     360

ggagagactg tgtaagattg gagagagatc gtgacgtact tctcgtaccc ggtgagaaac     420

agagactact cacggtggcc agataagccg gaagggtggg tgaaagtgac ggaggagtac     480

agcgacaaac tgatgggttt agcttgtaag cttcttgagg ttttgtctga agctatgggg     540
```

ctcgagaaag aagcacttac caatgcttgc gtcgatatgg accaaaagat agttgttaat 600
tattacccta aatgccctca gcctgatctc accctcggac tcaagcgtca cactgatcct 660
ggaaccatca ctttgctgct ccaagaccag gtcggtggat tacaagccac acgcgacgat 720
ggcaaaacat ggataacggt tcagccaatt gagggagctt ttgtcgtgaa tctcggcgac 780
catggtcact atttgagcaa cgggaggttc aagaacgcgg atcatcaggc ggtggtgaat 840
tccaactcga gcaggctatc tatagccacg tttcagaatc cggcgcagga tgcaaccgtg 900
tatccgctta aagttagaga aggagagaag ccgatcttgg aggagccaat cacttttgca 960
gagatgtata agagaaagat gggaaaagat ctggagctgg ctcgcctcaa gaagcttgcg 1020
aaagaagaaa atgaccagaa gctggccaaa gaagaacatg acaagaacct ggccaaagaa 1080
gaaaatgatc agaagctggc taaagaagaa catgaccaga agctggccaa agaagaacat 1140
gacaagagcc ttgccaaaga agaaaattac caaaagctgg ccaaagatga acatagccac 1200
acggaagctg ttaagcgtct cggccaaatc ctcgcttag 1239

<210> SEQ ID NO 122
<211> LENGTH: 124
<212> TYPE: PRT
<213> ORGANISM: Thlaspi arvense

<400> SEQUENCE: 122

Met Ala Pro Gly Thr Leu Thr Glu Leu Ala Gly Glu Ala Lys Leu Asn
1 5 10 15

Ser Lys Phe Val Arg Asp Glu Asp Glu Arg Pro Lys Val Ala Tyr Asn
20 25 30

Lys Phe Ser Asp Asp Ile Pro Val Ile Ser Leu Ala Gly Leu Asp Asp
35 40 45

Val Gly Gly Lys Arg Gly Glu Ile Cys Arg Lys Ile Val Glu Ala Cys
50 55 60

Glu Asn Trp Gly Val Phe Gln Val Val Asp His Gly Val Asp Thr Asn
65 70 75 80

Leu Val Glu Asp Met Thr Arg Leu Ala Arg Asp Phe Phe Ala Leu Pro
85 90 95

Pro Glu Glu Lys Leu Ser Phe Asp Met Ser Gly Gly Lys Lys Gly Gly
100 105 110

Phe Ile Val Ser Ser His Leu Gln Gly Glu Thr Val
115 120

<210> SEQ ID NO 123
<211> LENGTH: 1239
<212> TYPE: DNA
<213> ORGANISM: Thlaspi arvense

<400> SEQUENCE: 123
atggctccag ggactctcac cgagctcgcc ggagaggcta agctcaactc taaattcgtc 60
cgggacgagg acgaacgtcc caaggtggca tacaacaagt ttagcgacga tatcccggtg 120
atatctctcg ccggactcga cgatgttggt gggaaaagag gagagatctg ccgtaagatc 180
gttgaggctt gcgagaattg gggcgtgttc caggtggtcg atcatggtgt cgataccaat 240
ttggtagagg atatgactcg cctcgctcgc gacttctttg ctttaccacc cgaagagaaa 300
cttagtttcg acatgtctgg tggtaagaaa ggcggcttca tcgtctctag tcaccttcag 360
ggagagactg tgcaagattg gagagagatc gtgacgtact tctcgtaccc ggtgagaaac 420

```
agagactact cacggtggcc agataagccg gaagggtggg tgaaagtgac ggaggagtac    480
agcgacaaac tgatgggttt agcttgtaag cttcttgagg ttttgtctga agctatgggg    540
ctcgagaaag aagcacttac caatgcttgc gtcgatatgg accaaaagat agttgttaat    600
tattacccta aatgccctca gcctgatctc accctcggac tcaagcgtca cactgatcct    660
ggaaccatca ctttgctgct ccaagaccag gtcggtggat tacaagccac acgcgacgat    720
ggcaaaacat ggataacggt tcagccaatt gagggagctt ttgtcgtgaa tctcggcgac    780
catggtcact atttgagcaa cgggaggttc aagaacgcgg atcatcaggc ggtggtgaat    840
tccaactcga gcaggctatc tatagccacg tttcagaatc tggcgcagga tgcaaccgtg    900
tatccgctta aagttagaga aggagagaag ccgatcttgg aggagccaat cacttttgca    960
gagatgtata agagaaagat gggaaaagat ctggagctgg ctcgcctcaa gaagcttgcg   1020
aaagaagaaa atgaccagaa gctggccaaa gaagaacatg acaagaacct ggccaaagaa   1080
gaaaatgatc agaagctggc taaagaagaa catgaccaga agctggccaa agaagaacat   1140
gacaagagcc ttgccaaaga agaaaattac caaaagctgg ccaaagatga acatagccac   1200
acggaagctg ttaagcgtct cggccaaatc ctcgcttag                          1239

<210> SEQ ID NO 124
<211> LENGTH: 412
<212> TYPE: PRT
<213> ORGANISM: Thlaspi arvense

<400> SEQUENCE: 124

Met Ala Pro Gly Thr Leu Thr Glu Leu Ala Gly Glu Ala Lys Leu Asn
1               5                   10                  15

Ser Lys Phe Val Arg Asp Glu Asp Glu Arg Pro Lys Val Ala Tyr Asn
            20                  25                  30

Lys Phe Ser Asp Asp Ile Pro Val Ile Ser Leu Ala Gly Leu Asp Asp
        35                  40                  45

Val Gly Gly Lys Arg Gly Glu Ile Cys Arg Lys Ile Val Glu Ala Cys
    50                  55                  60

Glu Asn Trp Gly Val Phe Gln Val Val Asp His Gly Val Asp Thr Asn
65                  70                  75                  80

Leu Val Glu Asp Met Thr Arg Leu Ala Arg Asp Phe Phe Ala Leu Pro
                85                  90                  95

Pro Glu Glu Lys Leu Ser Phe Asp Met Ser Gly Gly Lys Lys Gly Gly
            100                 105                 110

Phe Ile Val Ser Ser His Leu Gln Gly Glu Thr Val Gln Asp Trp Arg
        115                 120                 125

Glu Ile Val Thr Tyr Phe Ser Tyr Pro Val Arg Asn Arg Asp Tyr Ser
    130                 135                 140

Arg Trp Pro Asp Lys Pro Glu Gly Trp Val Lys Val Thr Glu Glu Tyr
145                 150                 155                 160

Ser Asp Lys Leu Met Gly Leu Ala Cys Lys Leu Leu Glu Val Leu Ser
                165                 170                 175

Glu Ala Met Gly Leu Glu Lys Glu Ala Leu Thr Asn Ala Cys Val Asp
            180                 185                 190

Met Asp Gln Lys Ile Val Val Asn Tyr Tyr Pro Lys Cys Pro Gln Pro
        195                 200                 205

Asp Leu Thr Leu Gly Leu Lys Arg His Thr Asp Pro Gly Thr Ile Thr
    210                 215                 220

Leu Leu Leu Gln Asp Gln Val Gly Gly Leu Gln Ala Thr Arg Asp Asp
```

```
225                 230                 235                 240

Gly Lys Thr Trp Ile Thr Val Gln Pro Ile Glu Gly Ala Phe Val Val
                245                 250                 255

Asn Leu Gly Asp His Gly His Tyr Leu Ser Asn Gly Arg Phe Lys Asn
            260                 265                 270

Ala Asp His Gln Ala Val Val Asn Ser Asn Ser Ser Arg Leu Ser Ile
        275                 280                 285

Ala Thr Phe Gln Asn Leu Ala Gln Asp Ala Thr Val Tyr Pro Leu Lys
    290                 295                 300

Val Arg Glu Gly Glu Lys Pro Ile Leu Glu Glu Pro Ile Thr Phe Ala
305                 310                 315                 320

Glu Met Tyr Lys Arg Lys Met Gly Lys Asp Leu Glu Leu Ala Arg Leu
                325                 330                 335

Lys Lys Leu Ala Lys Glu Glu Asn Asp Gln Lys Leu Ala Lys Glu Glu
            340                 345                 350

His Asp Lys Asn Leu Ala Lys Glu Glu Asn Asp Gln Lys Leu Ala Lys
        355                 360                 365

Glu Glu His Asp Gln Lys Leu Ala Lys Glu Glu His Asp Lys Ser Leu
    370                 375                 380

Ala Lys Glu Glu Asn Tyr Gln Lys Leu Ala Lys Asp Glu His Ser His
385                 390                 395                 400

Thr Glu Ala Val Lys Arg Leu Gly Gln Ile Leu Ala
                405                 410
```

<210> SEQ ID NO 125
<211> LENGTH: 1545
<212> TYPE: DNA
<213> ORGANISM: Thlaspi arvense

<400> SEQUENCE: 125

```
atggccactc tcttactcac aatcctcctc cccactttcc tcttcctcct cgtcctcctc      60

ctttctctcc gccgcaacca caaccgcagt agccgtctcc caccaggccc aaaaccatgg     120

cccatcctcg gaaacctccc tcacatgggt cctaaacccc atcgaaccct agccgccatg     180

gtaaccacct acggtccaat cctccacctc cgattagggt tctccaacgt cgtggttgct     240

gcgtctaaat ccgtggccga acagttcttc aaaatccatg atgccaattt cgctagccga     300

ccaccaaatt caagagccaa acacatggca tataactatc aagatcttgt ctttgcgcct     360

tacggacaac gatggagaat gttgaggaag attagttctg ttcatttatt ttcagctaaa     420

gctcttgaag attacaagca tgttcggcag gaagaggtag gaacgctcac gcgcgagcta     480

gtggatgcag gcacgaaacc cgtaaactta ggccagttgg tgaacatgtg tgtggtcaac     540

gcgcttggaa gagagatgat cggacggcgt ctgttcggcg ccggagctga tcacaaagcg     600

gaggagtttc gatcgatggt gacggaaatg atggctctcg ccggagtatt caacctcgga     660

gatttcgtgc cggctctgga ttggttagat ttacaaggcg ttgctggtaa aatgaaacgg     720

ctacacaaaa gattcgacac ttttctatcg tcgattttga aggagcacga gatgatgcac     780

ggtcaagatc aaaagcataa agatatgctc agcactttaa tctcgctcaa gggaactgat     840

tttgacggtg acggcggaag cctaacggat actgagatca aagccttgct cttgaacatg     900

tttacggctg gaactgacac gtcagcaagt acggtggact gggccatagc tgaactgata     960

cgacacccgg atgcaatgac cagagcccaa gaagaacttg attcagttgt aggccgcgat    1020

aggcccatta acgagtcaga cctttctcgg cttccttatc ttcaggcggt tatcaaagag    1080
```

aatttcaggc ttcatccgcc gacaccactc tcgttaccac acatcgcatc agagagctgt 1140
gagatcaacg gctaccatat cccgaaagga tcgactcttt taacaaacat atgggccata 1200
gcccgtgacc cggaacaatg gtccgacccg ttatcgtttc gacccgagag atttttacag 1260
ggtggagaaa aatccggcgt cgatgtgaaa ggaagcgatt tcgagcttat accgttcgga 1320
gccgggagga gaatctgcgc tgggctcagt ttagggctac ggatgattca gttactgacg 1380
gcgacgctgg ttcacggatt tgattgggaa ttggccggag gaattccgcc ggagaagctg 1440
aatatggagg agacttatgg gattactctg caaagagcag ttcctttggt ggtgcatcct 1500
aagccaaggt tggctcccag tgtttacgaa ctcgggtcgc gctaa 1545

<210> SEQ ID NO 126
<211> LENGTH: 514
<212> TYPE: PRT
<213> ORGANISM: Thlaspi arvense

<400> SEQUENCE: 126

Met Ala Thr Leu Leu Leu Thr Ile Leu Leu Pro Thr Phe Leu Phe Leu
1 5 10 15

Leu Val Leu Leu Leu Ser Leu Arg Arg Asn His Asn Arg Ser Ser Arg
20 25 30

Leu Pro Pro Gly Pro Lys Pro Trp Pro Ile Leu Gly Asn Leu Pro His
35 40 45

Met Gly Pro Lys Pro His Arg Thr Leu Ala Ala Met Val Thr Thr Tyr
50 55 60

Gly Pro Ile Leu His Leu Arg Leu Gly Phe Ser Asn Val Val Val Ala
65 70 75 80

Ala Ser Lys Ser Val Ala Glu Gln Phe Phe Lys Ile His Asp Ala Asn
85 90 95

Phe Ala Ser Arg Pro Pro Asn Ser Arg Ala Lys His Met Ala Tyr Asn
100 105 110

Tyr Gln Asp Leu Val Phe Ala Pro Tyr Gly Gln Arg Trp Arg Met Leu
115 120 125

Arg Lys Ile Ser Ser Val His Leu Phe Ser Ala Lys Ala Leu Glu Asp
130 135 140

Tyr Lys His Val Arg Gln Glu Glu Val Gly Thr Leu Thr Arg Glu Leu
145 150 155 160

Val Asp Ala Gly Thr Lys Pro Val Asn Leu Gly Gln Leu Val Asn Met
165 170 175

Cys Val Val Asn Ala Leu Gly Arg Glu Met Ile Gly Arg Arg Leu Phe
180 185 190

Gly Ala Gly Ala Asp His Lys Ala Glu Glu Phe Arg Ser Met Val Thr
195 200 205

Glu Met Met Ala Leu Ala Gly Val Phe Asn Leu Gly Asp Phe Val Pro
210 215 220

Ala Leu Asp Trp Leu Asp Leu Gln Gly Val Ala Gly Lys Met Lys Arg
225 230 235 240

Leu His Lys Arg Phe Asp Thr Phe Leu Ser Ser Ile Leu Lys Glu His
245 250 255

Glu Met Met His Gly Gln Asp Gln Lys His Lys Asp Met Leu Ser Thr
260 265 270

Leu Ile Ser Leu Lys Gly Thr Asp Phe Asp Gly Asp Gly Gly Ser Leu
275 280 285

Thr Asp Thr Glu Ile Lys Ala Leu Leu Leu Asn Met Phe Thr Ala Gly

```
    290                 295                 300

Thr Asp Thr Ser Ala Ser Thr Val Asp Trp Ala Ile Ala Glu Leu Ile
305                 310                 315                 320

Arg His Pro Asp Ala Met Thr Arg Ala Gln Glu Glu Leu Asp Ser Val
                325                 330                 335

Val Gly Arg Asp Arg Pro Ile Asn Glu Ser Asp Leu Ser Arg Leu Pro
            340                 345                 350

Tyr Leu Gln Ala Val Ile Lys Glu Asn Phe Arg Leu His Pro Pro Thr
        355                 360                 365

Pro Leu Ser Leu Pro His Ile Ala Ser Glu Ser Cys Glu Ile Asn Gly
    370                 375                 380

Tyr His Ile Pro Lys Gly Ser Thr Leu Leu Thr Asn Ile Trp Ala Ile
385                 390                 395                 400

Ala Arg Asp Pro Glu Gln Trp Ser Asp Pro Leu Ser Phe Arg Pro Glu
                405                 410                 415

Arg Phe Leu Gln Gly Gly Glu Lys Ser Gly Val Asp Val Lys Gly Ser
            420                 425                 430

Asp Phe Glu Leu Ile Pro Phe Gly Ala Gly Arg Arg Ile Cys Ala Gly
        435                 440                 445

Leu Ser Leu Gly Leu Arg Met Ile Gln Leu Leu Thr Ala Thr Leu Val
    450                 455                 460

His Gly Phe Asp Trp Glu Leu Ala Gly Gly Ile Pro Pro Glu Lys Leu
465                 470                 475                 480

Asn Met Glu Glu Thr Tyr Gly Ile Thr Leu Gln Arg Ala Val Pro Leu
                485                 490                 495

Val Val His Pro Lys Pro Arg Leu Ala Pro Ser Val Tyr Glu Leu Gly
            500                 505                 510

Ser Arg
```

<210> SEQ ID NO 127
<211> LENGTH: 1581
<212> TYPE: DNA
<213> ORGANISM: Thlaspi arvense

<400> SEQUENCE: 127

```
atggatgaat caagtatttt tacggcaaag aaagtgatcg gagctgagaa aagagagctt     60

caagggctgc ttaaggcggc ggtgcaatct gtggagtgga cttatagtct cttctggcaa    120

ctttgtcctc aacaaagggt tttgctgtgg gagaatggat actacaacgg tgcaataaag    180

acgaggaaga caactcagcc ggcggaagtg acggcggaag aggctgcgtt agagaggagt    240

cagcagctaa gggaacttta cgaggcccctt ttggccggag agtcctcatc ggaagctagg    300

gcatgcacgg cattatcgcc ggaggatctg acggagactg aatggtttta tctaatgtgt    360

gtctctttct ctttccctcc tccttccggg atgccaggaa aggcgtatgc gaggaggaaa    420

cacgtatggc tatgtggtgc aaatgaggtt gacagtaaaa tcttttctag ggctattctc    480

gcaaagagtg ccaaaatcca gcagacagtg gtttgcattc ccatgcttga tggcgttgtg    540

gaactaggca caacgaacaa ggtaaaagaa gatatagcgt ttgttgagct cataaagagt    600

tttttccata accaccccaa gtcaaaccca aaagctgctc tttctgaaca ctccatcaac    660

gaagagcacg aagaagacga agaacaagaa gaagaagaag aagaagaagt agaagaagaa    720

atgacaatgt cagaggagat aaggcttggc tctcctgatg atgatgacgt ctccaatcaa    780

aacctactct ctgatttcca tgtagaatca acccacactt tagacacaca catggacatg    840
```

atgaatctaa tggaggaggg tggaaactat tctcagacag tatcaacact tcttatgtca 900
caacccacga gtctttttc agattcagtt tccacatctt cttacatcca atcatcattt 960
gccacatgga aggctgataa ttttaaagag catcagcgag tggaaactaa atcgacgtcg 1020
tcgtcgcaat ggatgctcaa acacataatc ttgagagttc ctttactcca cgaccacact 1080
aaagaaaaga ggctgcctcg agaagagctt aatcacgtgg tggcagagcg ccgcaggaga 1140
gagaagctga atgagagatt cataacactg agatcattgg ttccctttgt gaccaagatg 1200
gataaagtct caattcttgg agacaccatc aactacgtaa accatcttcg aaatagggtc 1260
caagagctgg agactaatca tcacgaacaa aaacataagc ggatgcgtag ctgtaaggga 1320
aaaacgtggg aagaggtcgt tgaggtttcc atcatagaga gtgatgtttt gttagagatg 1380
agatgcgagt accgagatgg tctattgctc gacatccttc aggttcttaa ggaacatggt 1440
atagagacta ctgcagttca taccgcggtg aacgagcgtg atttcgaggc cgagataagg 1500
gctatggtga gagggaagaa accaagcatt gctgaggtca aaagagccat ccatcaaact 1560
atatccaata ttaaactata g 1581

<210> SEQ ID NO 128
<211> LENGTH: 526
<212> TYPE: PRT
<213> ORGANISM: Thlaspi arvense

<400> SEQUENCE: 128

Met Asp Glu Ser Ser Ile Phe Thr Ala Lys Lys Val Ile Gly Ala Glu
1 5 10 15

Lys Arg Glu Leu Gln Gly Leu Leu Lys Ala Ala Val Gln Ser Val Glu
20 25 30

Trp Thr Tyr Ser Leu Phe Trp Gln Leu Cys Pro Gln Gln Arg Val Leu
35 40 45

Leu Trp Glu Asn Gly Tyr Tyr Asn Gly Ala Ile Lys Thr Arg Lys Thr
50 55 60

Thr Gln Pro Ala Glu Val Thr Ala Glu Glu Ala Ala Leu Glu Arg Ser
65 70 75 80

Gln Gln Leu Arg Glu Leu Tyr Glu Ala Leu Leu Ala Gly Glu Ser Ser
85 90 95

Ser Glu Ala Arg Ala Cys Thr Ala Leu Ser Pro Glu Asp Leu Thr Glu
100 105 110

Thr Glu Trp Phe Tyr Leu Met Cys Val Ser Phe Ser Phe Pro Pro Pro
115 120 125

Ser Gly Met Pro Gly Lys Ala Tyr Ala Arg Arg Lys His Val Trp Leu
130 135 140

Cys Gly Ala Asn Glu Val Asp Ser Lys Ile Phe Ser Arg Ala Ile Leu
145 150 155 160

Ala Lys Ser Ala Lys Ile Gln Gln Thr Val Val Cys Ile Pro Met Leu
165 170 175

Asp Gly Val Val Glu Leu Gly Thr Thr Asn Lys Val Lys Glu Asp Ile
180 185 190

Ala Phe Val Glu Leu Ile Lys Ser Phe Phe His Asn His Pro Lys Ser
195 200 205

Asn Pro Lys Ala Ala Leu Ser Glu His Ser Ile Asn Glu Glu His Glu
210 215 220

Glu Asp Glu Glu Gln Glu Glu Glu Glu Glu Glu Glu Val Glu Glu Glu
225 230 235 240

```
Met Thr Met Ser Glu Glu Ile Arg Leu Gly Ser Pro Asp Asp Asp Asp
                245                 250                 255

Val Ser Asn Gln Asn Leu Leu Ser Asp Phe His Val Glu Ser Thr His
            260                 265                 270

Thr Leu Asp Thr His Met Asp Met Met Asn Leu Met Glu Glu Gly Gly
        275                 280                 285

Asn Tyr Ser Gln Thr Val Ser Thr Leu Leu Met Ser Gln Pro Thr Ser
    290                 295                 300

Leu Phe Ser Asp Ser Val Ser Thr Ser Ser Tyr Ile Gln Ser Ser Phe
305                 310                 315                 320

Ala Thr Trp Lys Ala Asp Asn Phe Lys Glu His Gln Arg Val Glu Thr
                325                 330                 335

Lys Ser Thr Ser Ser Ser Gln Trp Met Leu Lys His Ile Ile Leu Arg
            340                 345                 350

Val Pro Leu Leu His Asp His Thr Lys Glu Lys Arg Leu Pro Arg Glu
        355                 360                 365

Glu Leu Asn His Val Val Ala Glu Arg Arg Arg Arg Glu Lys Leu Asn
    370                 375                 380

Glu Arg Phe Ile Thr Leu Arg Ser Leu Val Pro Phe Val Thr Lys Met
385                 390                 395                 400

Asp Lys Val Ser Ile Leu Gly Asp Thr Ile Asn Tyr Val Asn His Leu
                405                 410                 415

Arg Asn Arg Val Gln Glu Leu Glu Thr Asn His His Glu Gln Lys His
            420                 425                 430

Lys Arg Met Arg Ser Cys Lys Gly Lys Thr Trp Glu Glu Val Val Glu
        435                 440                 445

Val Ser Ile Ile Glu Ser Asp Val Leu Leu Glu Met Arg Cys Glu Tyr
    450                 455                 460

Arg Asp Gly Leu Leu Leu Asp Ile Leu Gln Val Leu Lys Glu His Gly
465                 470                 475                 480

Ile Glu Thr Thr Ala Val His Thr Ala Val Asn Glu Arg Asp Phe Glu
                485                 490                 495

Ala Glu Ile Arg Ala Met Val Arg Gly Lys Lys Pro Ser Ile Ala Glu
            500                 505                 510

Val Lys Arg Ala Ile His Gln Thr Ile Ser Asn Ile Lys Leu
        515                 520                 525
```

<210> SEQ ID NO 129
<211> LENGTH: 1581
<212> TYPE: DNA
<213> ORGANISM: Thlaspi arvense

<400> SEQUENCE: 129

```
atggatgaat caagtatttt tacggcagag aaagtgatcg gagctgagaa aagagagctt      60

caagggctgc ttaaggcggc ggtgcaatct gtggagtgga cttatagtct cttctggcaa     120

ctttgtcctc aacaaagggt tttgctgtgg gagaatggat actacaacgg tgcaataaag     180

acgaggaaga caactcagcc ggcggaagtg acggcggaag aggctgcgtt agagaggagt     240

cagcagctaa gggaacttta cgaggccctt ttggccggag agtcctcatc ggaagctagg     300

gcatgcacgg cattatcgcc ggaggatctg acggagactg aatggtttta tctaatgtgt     360

gtctctttct ctttccctcc tccttccggg atgccaggaa aggcgtatgc gaggaggaaa     420

cacgtatggc tatgtggtgc aaatgaggtt gacagtaaaa tcttttctag ggctattctc     480

gcaaagagtg ccaaaatcca gcagacagtg gtttgcattc ccatgcttga tggcgttgtg     540
```

```
gaactaggca caacgaacaa ggtaaaagaa gatatagcgt ttgttgagct cataaagagt    600
tttttccata accaccccaa gtcaaaccca aaagctgctc tttctgaaca ctccatcaac    660
gaagagcacg aagaagacga agaacaagaa gaagaagaag aagaagaagt agaagaagaa    720
atgacaatgt cagaggagat aaggcttggc tctcctgatg atgatgacgt ctccaatcaa    780
aacctactct ctgatttcca tgtagaatca acccacactt tagacacaca catggacatg    840
atgaatctaa tggaggaggg tggaaactat tctcagacag tatcaacact tcttatgtca    900
caacccacga gtctttttc agattcagtt tccacatctt cttacatcta atcatcattt    960
gccacatgga aggctgataa ttttaaagag catcagcgag tggaaactaa atcgacgtcg   1020
tcgtcgcaat ggatgctcaa acacataatc ttgagagttc ctttactcca cgaccacact   1080
aaagaaaaga ggctgcctcg agaagagctt aatcacgtgg tggcagagcg ccgcaggaga   1140
gagaagctga atgagagatt cataacactg agatcattgg ttccctttgt gaccaagatg   1200
gataaagtct caattcttgg agacaccatc aactacgtaa accatcttcg aaatagggtc   1260
caagagctgg agactaatca tcacgaacaa aaacataagc ggatgcgtag ctgtaaggga   1320
aaaacgtggg aagaggtcgt tgaggtttcc atcatagaga gtgatgtttt gttagagatg   1380
agatgcgagt accgagatgg tctattgctc gacatccttc aggttcttaa ggaacatggt   1440
atagagacta ctgcagttca taccgcggtg aacgagcgtg atttcgaggc cgagataagg   1500
gctatggtga gagggaagaa accaagcatt gctgaggtca aaagagccat ccatcaaact   1560
atatccaata ttaaactata g                                             1581
```

```
<210> SEQ ID NO 130
<211> LENGTH: 316
<212> TYPE: PRT
<213> ORGANISM: Thlaspi arvense

<400> SEQUENCE: 130

Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Lys Thr Arg Lys Thr
    50                  55                  60

Thr Gln Pro Ala Glu Val Thr Ala Glu Glu Ala Ala Leu Glu Arg Ser
65                  70                  75                  80

Gln Gln Leu Arg Glu Leu Tyr Glu Ala Leu Leu Ala Gly Glu Ser Ser
                85                  90                  95

Ser Glu Ala Arg Ala Cys Thr Ala Leu Ser Pro Glu Asp Leu Thr Glu
            100                 105                 110

Thr Glu Trp Phe Tyr Leu Met Cys Val Ser Phe Ser Phe Pro Pro Pro
        115                 120                 125

Ser Gly Met Pro Gly Lys Ala Tyr Ala Arg Arg Lys His Val Trp Leu
    130                 135                 140

Cys Gly Ala Asn Glu Val Asp Ser Lys Ile Phe Ser Arg Ala Ile Leu
145                 150                 155                 160

Ala Lys Ser Ala Lys Ile Gln Gln Thr Val Val Cys Ile Pro Met Leu
                165                 170                 175

Asp Gly Val Val Glu Leu Gly Thr Thr Asn Lys Val Lys Glu Asp Ile
```

```
            180                 185                 190

Ala Phe Val Glu Leu Ile Lys Ser Phe Phe His Asn His Pro Lys Ser
        195                 200                 205

Asn Pro Lys Ala Ala Leu Ser Glu His Ser Ile Asn Glu Glu His Glu
    210                 215                 220

Glu Asp Glu Glu Gln Glu Glu Glu Glu Glu Glu Glu Val Glu Glu Glu
225                 230                 235                 240

Met Thr Met Ser Glu Glu Ile Arg Leu Gly Ser Pro Asp Asp Asp Asp
                245                 250                 255

Val Ser Asn Gln Asn Leu Leu Ser Asp Phe His Val Glu Ser Thr His
            260                 265                 270

Thr Leu Asp Thr His Met Asp Met Met Asn Leu Met Glu Glu Gly Gly
        275                 280                 285

Asn Tyr Ser Gln Thr Val Ser Thr Leu Leu Met Ser Gln Pro Thr Ser
    290                 295                 300

Leu Phe Ser Asp Ser Val Ser Thr Ser Ser Tyr Ile
305                 310                 315


<210> SEQ ID NO 131
<211> LENGTH: 1581
<212> TYPE: DNA
<213> ORGANISM: Thlaspi arvense

<400> SEQUENCE: 131

atggatgaat caagtatttt tacggcagag aaagtgatcg gagctgagaa aagagagctt      60

caagggctgc ttaaggcggc ggtgcaatct gtggagtgga cttatagtct cttctggcaa     120

ctttgtcctc aacaaagggt tttgctgtgg gagaatggat actacaacgg tgcaataaag     180

acgaggaaga caactcagcc ggcggaagtg acggcggaag aggctgcgtt agagaggagt     240

cagcagctaa gggaacttta cgaggccctt ttggccggag agtcctcatc ggaagctagg     300

gcatgcacgg cattatcgcc ggaggatctg acggagactg aatggtttta tctaatgtgt     360

gtctctttct ctttccctcc tccttccggg atgccaggaa aggcgtatgc gaggaggaaa     420

cacgtatggc tatgtggtgc aaatgaggtt gacagtaaaa tcttttctag ggctattctc     480

gcaaagagtg ccaaaatcca gcagacagtg gtttgcattc ccatgcttga tggcgttgtg     540

gaactaggca caacgaacaa ggtaaaagaa gatatagcgt ttgttgagct cataaagagt     600

tttttccata accaccccaa gtcaaaccca aaagctgctc tttctgaaca ctccatcaac     660

gaagagcacg aagaagacga agaacaagaa gaagaagaag aagaagaagt agaagaagaa     720

atgacaatgt cagaggagat aaggcttggc tctcctgatg atgatgacgt ctccaatcaa     780

aacctactct ctgatttcca tgtagaatca acccacactt tagacacaca catggacatg     840

atgaatctaa tggaggaggg tggaaactat tctcagacag tatcaacact tcttatgtca     900

caacccacga gtcttttttc agattcagtt tccacatctt cttacatcca atcatcattt     960

gccacatgaa aggctgataa ttttaaagag catcagcgag tggaaactaa atcgacgtcg    1020

tcgtcgcaat ggatgctcaa acacataatc ttgagagttc ctttactcca cgaccacact    1080

aaagaaaaga ggctgcctcg agaagagctt aatcacgtgg tggcagagcg ccgcaggaga    1140

gagaagctga atgagagatt cataacactg agatcattgg ttccctttgt gaccaagatg    1200

gataaagtct caattcttgg agacaccatc aactacgtaa accatcttcg aaatagggtc    1260

caagagctgg agactaatca tcacgaacaa aaacataagc ggatgcgtag ctgtaaggga    1320

aaaacgtggg aagaggtcgt tgaggtttcc atcatagaga gtgatgtttt gttagagatg    1380
```

agatgcgagt accgagatgg tctattgctc gacatccttc aggttcttaa ggaacatggt 1440
atagagacta ctgcagttca taccgcggtg aacgagcgtg atttcgaggc cgagataagg 1500
gctatggtga gagggaagaa accaagcatt gctgaggtca aaagagccat ccatcaaact 1560
atatccaata ttaaactata g 1581

<210> SEQ ID NO 132
<211> LENGTH: 322
<212> TYPE: PRT
<213> ORGANISM: Thlaspi arvense

<400> SEQUENCE: 132

Met Asp Glu Ser Ser Ile Phe Thr Ala Glu Lys Val Ile Gly Ala Glu
1 5 10 15

Lys Arg Glu Leu Gln Gly Leu Leu Lys Ala Ala Val Gln Ser Val Glu
20 25 30

Trp Thr Tyr Ser Leu Phe Trp Gln Leu Cys Pro Gln Gln Arg Val Leu
35 40 45

Leu Trp Glu Asn Gly Tyr Tyr Asn Gly Ala Ile Lys Thr Arg Lys Thr
50 55 60

Thr Gln Pro Ala Glu Val Thr Ala Glu Glu Ala Ala Leu Glu Arg Ser
65 70 75 80

Gln Gln Leu Arg Glu Leu Tyr Glu Ala Leu Leu Ala Gly Glu Ser Ser
85 90 95

Ser Glu Ala Arg Ala Cys Thr Ala Leu Ser Pro Glu Asp Leu Thr Glu
100 105 110

Thr Glu Trp Phe Tyr Leu Met Cys Val Ser Phe Ser Phe Pro Pro Pro
115 120 125

Ser Gly Met Pro Gly Lys Ala Tyr Ala Arg Arg Lys His Val Trp Leu
130 135 140

Cys Gly Ala Asn Glu Val Asp Ser Lys Ile Phe Ser Arg Ala Ile Leu
145 150 155 160

Ala Lys Ser Ala Lys Ile Gln Gln Thr Val Val Cys Ile Pro Met Leu
165 170 175

Asp Gly Val Val Glu Leu Gly Thr Thr Asn Lys Val Lys Glu Asp Ile
180 185 190

Ala Phe Val Glu Leu Ile Lys Ser Phe Phe His Asn His Pro Lys Ser
195 200 205

Asn Pro Lys Ala Ala Leu Ser Glu His Ser Ile Asn Glu Glu His Glu
210 215 220

Glu Asp Glu Glu Gln Glu Glu Glu Glu Glu Glu Glu Val Glu Glu Glu
225 230 235 240

Met Thr Met Ser Glu Glu Ile Arg Leu Gly Ser Pro Asp Asp Asp Asp
245 250 255

Val Ser Asn Gln Asn Leu Leu Ser Asp Phe His Val Glu Ser Thr His
260 265 270

Thr Leu Asp Thr His Met Asp Met Met Asn Leu Met Glu Glu Gly Gly
275 280 285

Asn Tyr Ser Gln Thr Val Ser Thr Leu Leu Met Ser Gln Pro Thr Ser
290 295 300

Leu Phe Ser Asp Ser Val Ser Thr Ser Ser Tyr Ile Gln Ser Ser Phe
305 310 315 320

Ala Thr

<210> SEQ ID NO 133
<211> LENGTH: 1582
<212> TYPE: DNA
<213> ORGANISM: Thlaspi arvense

<400> SEQUENCE: 133
atggatgaat caagtatttt tacggcagag aaagtgatcg gagctgagaa aagagagctt 60
caagggctgc ttaaggcggc ggtgcaatct gtggagtgga cttatagtct cttctggcaa 120
ctttgtcctc aacaaagggt tttgctgtgg gagaatggat actacaacgg tgcaataaag 180
aacgaggaag acaactcagc cggcggaagt gacggcggaa gaggctgcgt tagagaggag 240
tcagcagcta agggaacttt acgaggccct tttggccgga gagtcctcat cggaagctag 300
ggcatgcacg gcattatcgc cggaggatct gacggagact gaatggtttt atctaatgtg 360
tgtctctttc tctttccctc ctccttccgg gatgccagga aaggcgtatg cgaggaggaa 420
acacgtatgg ctatgtggtg caaatgaggt tgacagtaaa atcttttcta gggctattct 480
cgcaaagagt gccaaaatcc agcagacagt ggtttgcatt cccatgcttg atggcgttgt 540
ggaactaggc acaacgaaca aggtaaaaga agatatagcg tttgttgagc tcataaagag 600
ttttttccat aaccacccca agtcaaaccc aaaagctgct ctttctgaac actccatcaa 660
cgaagagcac gaagaagacg aagaacaaga agaagaagaa gaagaagaag tagaagaaga 720
aatgacaatg tcagaggaga taaggcttgg ctctcctgat gatgatgacg tctccaatca 780
aaacctactc tctgatttcc atgtagaatc aacccacact ttagacacac acatggacat 840
gatgaatcta atggaggagg gtggaaacta ttctcagaca gtatcaacac ttcttatgtc 900
acaacccacg agtctttttt cagattcagt ttccacatct tcttacatcc aatcatcatt 960
tgccacatgg aaggctgata attttaaaga gcatcagcga gtggaaacta aatcgacgtc 1020
gtcgtcgcaa tggatgctca aacacataat cttgagagtt cctttactcc acgaccacac 1080
taaagaaaag aggctgcctc gagaagagct taatcacgtg gtggcagagc gccgcaggag 1140
agagaagctg aatgagagat tcataacact gagatcattg gttccctttg tgaccaagat 1200
ggataaagtc tcaattcttg gagacaccat caactacgta aaccatcttc gaaatagggt 1260
ccaagagctg gagactaatc atcacgaaca aaaacataag cggatgcgta gctgtaaggg 1320
aaaaacgtgg gaagaggtcg ttgaggtttc catcatagag agtgatgttt tgttagagat 1380
gagatgcgag taccgagatg gtctattgct cgacatcctt caggttctta aggaacatgg 1440
tatagagact actgcagttc ataccgcggt gaacgagcgt gatttcgagg ccgagataag 1500
ggctatggtg agagggaaga aaccaagcat tgctgaggtc aaaagagcca tccatcaaac 1560
tatatccaat attaaactat ag 1582

<210> SEQ ID NO 134
<211> LENGTH: 99
<212> TYPE: PRT
<213> ORGANISM: Thlaspi arvense

<400> SEQUENCE: 134

Met Asp Glu Ser Ser Ile Phe Thr Ala Glu Lys Val Ile Gly Ala Glu
1 5 10 15

Lys Arg Glu Leu Gln Gly Leu Leu Lys Ala Ala Val Gln Ser Val Glu
20 25 30

Trp Thr Tyr Ser Leu Phe Trp Gln Leu Cys Pro Gln Gln Arg Val Leu
35 40 45

```
Leu Trp Glu Asn Gly Tyr Tyr Asn Gly Ala Ile Lys Asn Glu Glu Asp
    50                  55                  60

Asn Ser Ala Gly Gly Ser Asp Gly Gly Arg Gly Cys Val Arg Glu Glu
65                  70                  75                  80

Ser Ala Ala Lys Gly Thr Leu Arg Gly Pro Phe Gly Arg Arg Val Leu
                85                  90                  95

Ile Gly Ser


<210> SEQ ID NO 135
<211> LENGTH: 1579
<212> TYPE: DNA
<213> ORGANISM: Thlaspi arvense

<400> SEQUENCE: 135

atggatgaat caagtatttt tacggcagag aaagtgatcg gagctgagaa aagagagctt      60

caagggctgc ttaaggcggc ggtgcaatct gtggagtgga cttatagtct cttctggcaa     120

ctttgtcctc aacaaagggt tttgctgtgg gagaatggat actacaacgg tgcaataaac     180

gaggaagaca actcagccgg cggaagtgac ggcggaagag gctgcgttag agaggagtca     240

gcagctaagg gaactttacg aggccctttt ggccggagag tcctcatcgg aagctagggc     300

atgcacggca ttatcgccgg aggatctgac ggagactgaa tggtttttatc taatgtgtgt     360

ctctttctct ttccctcctc cttccgggat gccaggaaag gcgtatgcga ggaggaaaca     420

cgtatggcta tgtggtgcaa atgaggttga cagtaaaatc ttttctaggg ctattctcgc     480

aaagagtgcc aaaatccagc agacagtggt ttgcattccc atgcttgatg gcgttgtgga     540

actaggcaca acgaacaagg taaaagaaga tatagcgttt gttgagctca taaagagttt     600

tttccataac caccccaagt caaacccaaa agctgctctt tctgaacact ccatcaacga     660

agagcacgaa gaagacgaag aacaagaaga agaagaagaa gaagaagtag aagaagaaat     720

gacaatgtca gaggagataa ggcttggctc tcctgatgat gatgacgtct ccaatcaaaa     780

cctactctct gatttccatg tagaatcaac ccacacttta gacacacaca tggacatgat     840

gaatctaatg gaggagggtg gaaactattc tcagacagta tcaacacttc ttatgtcaca     900

acccacgagt ctttttttcag attcagtttc cacatcttct tacatccaat catcatttgc     960

cacatggaag gctgataatt ttaaagagca tcagcgagtg gaaactaaat cgacgtcgtc    1020

gtcgcaatgg atgctcaaac acataatctt gagagttcct ttactccacg accacactaa    1080

agaaaagagg ctgcctcgag aagagcttaa tcacgtggtg gcagagcgcc gcaggagaga    1140

gaagctgaat gagagattca taacactgag atcattggtt ccctttgtga ccaagatgga    1200

taaagtctca attcttggag acaccatcaa ctacgtaaac catcttcgaa atagggtcca    1260

agagctggag actaatcatc acgaacaaaa acataagcgg atgcgtagct gtaagggaaa    1320

aacgtgggaa gaggtcgttg aggtttccat catagagagt gatgttttgt tagagatgag    1380

atgcgagtac cgagatggtc tattgctcga catccttcag gttcttaagg aacatggtat    1440

agagactact gcagttcata ccgcggtgaa cgagcgtgat ttcgaggccg agataagggc    1500

tatggtgaga gggaagaaac caagcattgc tgaggtcaaa agagccatcc atcaaactat    1560

atccaatatt aaactatag                                                 1579


<210> SEQ ID NO 136
<211> LENGTH: 98
<212> TYPE: PRT
<213> ORGANISM: Thlaspi arvense
```

<400> SEQUENCE: 136

```
Met Asp Glu Ser Ser Ile Phe Thr Ala Glu Lys Val Ile Gly Ala Glu
1               5                   10                  15

Lys Arg Glu Leu Gln Gly Leu Leu Lys Ala Ala Val Gln Ser Val Glu
            20                  25                  30

Trp Thr Tyr Ser Leu Phe Trp Gln Leu Cys Pro Gln Gln Arg Val Leu
        35                  40                  45

Leu Trp Glu Asn Gly Tyr Tyr Asn Gly Ala Ile Asn Glu Glu Asp Asn
    50                  55                  60

Ser Ala Gly Gly Ser Asp Gly Gly Arg Gly Cys Val Arg Glu Glu Ser
65                  70                  75                  80

Ala Ala Lys Gly Thr Leu Arg Gly Pro Phe Gly Arg Arg Val Leu Ile
                85                  90                  95

Gly Ser
```

<210> SEQ ID NO 137
<211> LENGTH: 1582
<212> TYPE: DNA
<213> ORGANISM: Thlaspi arvense

<400> SEQUENCE: 137

```
atggatgaat caagtatttt tacggcagag aaagtgatcg gagctgagaa aagagagctt     60

caagggctgc ttaaggcggc ggtgcaatct gtggagtgga cttatagtct cttctggcaa    120

ctttgtcctc aacaaagggt tttgctgtgg gagaatggat actacaacgg tgcaataaag    180

gacgaggaag acaactcagc cggcggaagt gacggcggaa gaggctgcgt tagagaggag    240

tcagcagcta agggaacttt acgaggccct tttggccgga gagtcctcat cggaagctag    300

ggcatgcacg gcattatcgc cggaggatct gacggagact gaatggtttt atctaatgtg    360

tgtctctttc tctttccctc ctccttccgg gatgccagga aaggcgtatg cgaggaggaa    420

acacgtatgg ctatgtggtg caaatgaggt tgacagtaaa atctttttcta gggctattct    480

cgcaaagagt gccaaaatcc agcagacagt ggtttgcatt cccatgcttg atggcgttgt    540

ggaactaggc acaacgaaca aggtaaaaga agatatagcg tttgttgagc tcataaagag    600

ttttttccat aaccacccca agtcaaaccc aaaagctgct ctttctgaac actccatcaa    660

cgaagagcac gaagaagacg aagaacaaga agaagaagaa gaagaagaag tagaagaaga    720

aatgacaatg tcagaggaga taaggcttgg ctctcctgat gatgatgacg tctccaatca    780

aaacctactc tctgatttcc atgtagaatc aacccacact ttagacacac acatggacat    840

gatgaatcta atggaggagg gtggaaacta ttctcagaca gtatcaacac ttcttatgtc    900

acaacccacg agtctttttt cagattcagt ttccacatct tcttacatcc aatcatcatt    960

tgccacatgg aaggctgata attttaaaga gcatcagcga gtggaaacta aatcgacgtc   1020

gtcgtcgcaa tggatgctca aacacataat cttgagagtt cctttactcc acgaccacac   1080

taaagaaaag aggctgcctc gagaagagct taatcacgtg gtggcagagc gccgcaggag   1140

agagaagctg aatgagagat tcataacact gagatcattg gttccctttg tgaccaagat   1200

ggataaagtc tcaattcttg gagacaccat caactacgta aaccatcttc gaaatagggt   1260

ccaagagctg gagactaatc atcacgaaca aaaacataag cggatgcgta gctgtaaggg   1320

aaaaacgtgg gaagaggtcg ttgaggtttc catcatagag agtgatgttt tgttagagat   1380

gagatgcgag taccgagatg gtctattgct cgacatcctt caggttctta aggaacatgg   1440

tatagagact actgcagttc ataccgcggt gaacgagcgt gatttcgagg ccgagataag   1500
```

ggctatggtg agagggaaga aaccaagcat tgctgaggtc aaaagagcca tccatcaaac 1560
tatatccaat attaaactat ag 1582

<210> SEQ ID NO 138
<211> LENGTH: 99
<212> TYPE: PRT
<213> ORGANISM: Thlaspi arvense

<400> SEQUENCE: 138

Met Asp Glu Ser Ser Ile Phe Thr Ala Glu Lys Val Ile Gly Ala Glu
1 5 10 15

Lys Arg Glu Leu Gln Gly Leu Leu Lys Ala Ala Val Gln Ser Val Glu
20 25 30

Trp Thr Tyr Ser Leu Phe Trp Gln Leu Cys Pro Gln Gln Arg Val Leu
35 40 45

Leu Trp Glu Asn Gly Tyr Tyr Asn Gly Ala Ile Lys Asn Glu Glu Asp
50 55 60

Asn Ser Ala Gly Gly Ser Asp Gly Gly Arg Gly Cys Val Arg Glu Glu
65 70 75 80

Ser Ala Ala Lys Gly Thr Leu Arg Gly Pro Phe Gly Arg Arg Val Leu
85 90 95

Ile Gly Ser

<210> SEQ ID NO 139
<211> LENGTH: 1707
<212> TYPE: DNA
<213> ORGANISM: Thlaspi arvense

<400> SEQUENCE: 139
atgtcacaat attccttctt ctatttcttc ctaatctctc ttttcctcta cgaaaattgc 60
attgcgtatc gctacacatt cacggttatt gaagctccat atagcaaact gtgtagcacg 120
aagaagattt tgaccgttaa tggtcagttt cctggaccag tgttaagggc ttacaaaggt 180
gacaccattt acgttaacgt tcgtaaccaa gctagtgaaa atatcacatt gcattggcat 240
ggtgtagagc agccgagaaa cccgtggtca gatggacccg aatacatcac acaatgcccg 300
attcaacccg ggtcagattt tacgtacaaa attttacttt ccatcgaaga cgcgactgtt 360
tgatggcatg cgcatagctc gtggacacgt gccaccgtac acggtctgat tttcgtgtat 420
cctcggcctc ctgataccct gccttttcca gaaccggact acgaagtccc cttagttttt 480
ggagagtggt ggaagaggga tgtgagagaa gtagtggagg atttcatgag gaacggaggt 540
gaacctaatg tgtccgatgc tttgactatc aatgggcatc ctggtttctt gtatccttgc 600
tctcaatcag atacattcaa gctcgtggta gagaagggca aaacctaccg cattcggatg 660
gtaaacgccg cgatgaacct aattctcttc ttcgccatcg cgaaccacaa actcaccgtg 720
gtcgccgccg atggccacta caccaaacct ctaaccgcta gttatatcac catatctcct 780
ggccaaacgc tagacctgtt actatacgcc gaccaaagtc cagagagcac ttataacatg 840
gcggccagag cttaccatag caaccccaac gttgggttca acaactctac caccgtcggg 900
atcttacgtt actactcttc aaacgacgcc ggaacgtctt catcagaacg ttacccgtac 960
cttcctggct acaatgacac ctcagcagct ttcgatttct tcacaaaaat caaaggctta 1020
tactccagag tagctcccgc caaagtttca cgtaggataa tcacgacggt ttcgataaat 1080
ctcctcaagt gtcccaacga ctcgtgtgca ggcccaaacg ggtcgaggtt agcggcgagt 1140

```
atgaacaaca tatcgttcgt cacaccgagc cacgtggaca tactaagagc ttattacctt   1200

cacattaacg gcgtttacgg aacgcggttt ccggagttcc caccgcggat attcaatttc   1260

acagcggacg accaaccgct gtttttgcag actccgaggc tggcgacgga ggtaaagaag   1320

tttcagtacg gggagacggt tgagattgtt atacaaggga cgagtttggt aggtggtgga   1380

atcgatcatc ctatgcatct ccatggtttt agcttctacg tggttggttt agggtttggg   1440

aattttaacg cacgtaaaga tccctccaac tataatctag acgatcctcc ttacagaaac   1500

acggcgactg tgcccaggaa cggttggatc gctatcagat tcgtagctga caatccaggg   1560

gtttggttca tgcactgtca ctttgataga catcaaacgt ggggtatgaa tgttgtcttc   1620

attgttaaga atggaataaa accaaatcag aagattctac ctccaccgcc tggcttacca   1680

ccttgtgacc aatttgagaa tctataa                                       1707
```

```
<210> SEQ ID NO 140
<211> LENGTH: 120
<212> TYPE: PRT
<213> ORGANISM: Thlaspi arvense

<400> SEQUENCE: 140

Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly Pro Val Leu Arg Ala Tyr Lys Gly Asp Thr Ile Tyr
    50                  55                  60

Val Asn Val Arg Asn Gln Ala Ser Glu Asn Ile Thr Leu His Trp His
65                  70                  75                  80

Gly Val Glu Gln Pro Arg Asn Pro Trp Ser Asp Gly Pro Glu Tyr Ile
                85                  90                  95

Thr Gln Cys Pro Ile Gln Pro Gly Ser Asp Phe Thr Tyr Lys Ile Leu
            100                 105                 110

Leu Ser Ile Glu Asp Ala Thr Val
        115                 120
```

```
<210> SEQ ID NO 141
<211> LENGTH: 1707
<212> TYPE: DNA
<213> ORGANISM: Thlaspi arvense

<400> SEQUENCE: 141

atgtcacaat attccttctt ctatttcttc ctaatctctc ttttcctcta cgaaaattgc     60

attgcgtatc gctacacatt cacggttatt gaagctccat atagcaaact gtgtagcacg    120

aagaagattt tgaccgttaa tggtcagttt cctggaccag tgttaagggc ttacaaaggt    180

gacaccattt acgttaacgt tcgtaaccaa gctagtgaaa atatcacatt gcattggcat    240

ggtgtagagc agccgagaaa cccgtggtca gatggacccg aatacatcac acaatgcccg    300

attcaacccg ggtcagattt tacgtacaaa attttacttt ccatcgaaga cgcgactgtt    360

tggtggcatg cgcatagctc gtggacacgt gccaccgtac acggtctgat tttcgtgtat    420

cctcggcctc ctgataccct gccttttcca gaaccggact acgaagtccc cttagttttt    480

ggagagtggt ggaagaggga tgtgagagaa gtagtggagg atttcatgag gaacggaggt    540

gaacctaatg tgtccgatgc tttgactatc aatgggcatc ctggtttctt gtatccttgc    600
```

```
tctcaatcag atacattcaa gctcgtggta gagaagggca aaacctaccg catttggatg    660
gtaaacgccg cgatgaacct aattctcttc ttcgccatcg cgaaccacaa actcaccgtg    720
gtcgccgccg atggccacta caccaaacct ctaaccgcta gttatatcac catatctcct    780
ggccaaacgc tagacctgtt actatacgcc gaccaaagtc cagagagcac ttataacatg    840
gcggccagag cttaccatag caaccccaac gttgggttca acaactctac caccgtcggg    900
atcttacgtt actactcttc aaacgacgcc ggaacgtctt catcagaacg ttacccgtac    960
cttcctggct acaatgacac ctcagcagct ttcgatttct tcacaaaaat caaaggctta   1020
tactccagag tagctcccgc caaagtttca cgtaggataa tcacgacggt ttcgataaat   1080
ctcctcaagt gtcccaacga ctcgtgtgca ggcccaaacg ggtcgaggtt agcggcgagt   1140
atgaacaaca tatcgttcgt cacaccgagc cacgtggaca tactaagagc ttattacctt   1200
cacattaacg gcgtttacgg aacgcggttt ccggagttcc caccgcggat attcaatttc   1260
acagcggacg accaaccgct gtttttgcag actccgaggc tggcgacgga ggtaaagaag   1320
tttcagtacg gggagacggt tgagattgtt atacaaggga cgagtttggt aggtggtgga   1380
atcgatcatc ctatgcatct ccatggtttt agcttctacg tggttggttt agggtttggg   1440
aattttaacg cacgtaaaga tccctccaac tataatctag acgatcctcc ttacagaaac   1500
acggcgactg tgcccaggaa cggttggatc gctatcagat tcgtagctga caatccaggg   1560
gtttggttca tgcactgtca ctttgataga catcaaacgt ggggtatgaa tgttgtcttc   1620
attgttaaga atggaataaa accaaatcag aagattctac ctccaccgcc tggcttacca   1680
ccttgtgacc aatttgagaa tctataa                                       1707
```

<210> SEQ ID NO 142
<211> LENGTH: 568
<212> TYPE: PRT
<213> ORGANISM: Thlaspi arvense

<400> SEQUENCE: 142

```
Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly Pro Val Leu Arg Ala Tyr Lys Gly Asp Thr Ile Tyr
    50                  55                  60

Val Asn Val Arg Asn Gln Ala Ser Glu Asn Ile Thr Leu His Trp His
65                  70                  75                  80

Gly Val Glu Gln Pro Arg Asn Pro Trp Ser Asp Gly Pro Glu Tyr Ile
                85                  90                  95

Thr Gln Cys Pro Ile Gln Pro Gly Ser Asp Phe Thr Tyr Lys Ile Leu
            100                 105                 110

Leu Ser Ile Glu Asp Ala Thr Val Trp Trp His Ala His Ser Ser Trp
        115                 120                 125

Thr Arg Ala Thr Val His Gly Leu Ile Phe Val Tyr Pro Arg Pro Pro
    130                 135                 140

Asp Thr Leu Pro Phe Pro Glu Pro Asp Tyr Glu Val Pro Leu Val Phe
145                 150                 155                 160

Gly Glu Trp Trp Lys Arg Asp Val Arg Glu Val Val Glu Asp Phe Met
                165                 170                 175
```

```
Arg Asn Gly Gly Glu Pro Asn Val Ser Asp Ala Leu Thr Ile Asn Gly
            180                 185                 190

His Pro Gly Phe Leu Tyr Pro Cys Ser Gln Ser Asp Thr Phe Lys Leu
        195                 200                 205

Val Val Glu Lys Gly Lys Thr Tyr Arg Ile Trp Met Val Asn Ala Ala
    210                 215                 220

Met Asn Leu Ile Leu Phe Phe Ala Ile Ala Asn His Lys Leu Thr Val
225                 230                 235                 240

Val Ala Ala Asp Gly His Tyr Thr Lys Pro Leu Thr Ala Ser Tyr Ile
                245                 250                 255

Thr Ile Ser Pro Gly Gln Thr Leu Asp Leu Leu Leu Tyr Ala Asp Gln
            260                 265                 270

Ser Pro Glu Ser Thr Tyr Asn Met Ala Ala Arg Ala Tyr His Ser Asn
        275                 280                 285

Pro Asn Val Gly Phe Asn Asn Ser Thr Thr Val Gly Ile Leu Arg Tyr
    290                 295                 300

Tyr Ser Ser Asn Asp Ala Gly Thr Ser Ser Ser Glu Arg Tyr Pro Tyr
305                 310                 315                 320

Leu Pro Gly Tyr Asn Asp Thr Ser Ala Ala Phe Asp Phe Phe Thr Lys
                325                 330                 335

Ile Lys Gly Leu Tyr Ser Arg Val Ala Pro Ala Lys Val Ser Arg Arg
            340                 345                 350

Ile Ile Thr Thr Val Ser Ile Asn Leu Leu Lys Cys Pro Asn Asp Ser
        355                 360                 365

Cys Ala Gly Pro Asn Gly Ser Arg Leu Ala Ala Ser Met Asn Asn Ile
    370                 375                 380

Ser Phe Val Thr Pro Ser His Val Asp Ile Leu Arg Ala Tyr Tyr Leu
385                 390                 395                 400

His Ile Asn Gly Val Tyr Gly Thr Arg Phe Pro Glu Phe Pro Pro Arg
                405                 410                 415

Ile Phe Asn Phe Thr Ala Asp Asp Gln Pro Leu Phe Leu Gln Thr Pro
            420                 425                 430

Arg Leu Ala Thr Glu Val Lys Lys Phe Gln Tyr Gly Glu Thr Val Glu
        435                 440                 445

Ile Val Ile Gln Gly Thr Ser Leu Val Gly Gly Gly Ile Asp His Pro
    450                 455                 460

Met His Leu His Gly Phe Ser Phe Tyr Val Val Gly Leu Gly Phe Gly
465                 470                 475                 480

Asn Phe Asn Ala Arg Lys Asp Pro Ser Asn Tyr Asn Leu Asp Asp Pro
                485                 490                 495

Pro Tyr Arg Asn Thr Ala Thr Val Pro Arg Asn Gly Trp Ile Ala Ile
            500                 505                 510

Arg Phe Val Ala Asp Asn Pro Gly Val Trp Phe Met His Cys His Phe
        515                 520                 525

Asp Arg His Gln Thr Trp Gly Met Asn Val Val Phe Ile Val Lys Asn
    530                 535                 540

Gly Ile Lys Pro Asn Gln Lys Ile Leu Pro Pro Pro Pro Gly Leu Pro
545                 550                 555                 560

Pro Cys Asp Gln Phe Glu Asn Leu
                565
```

<210> SEQ ID NO 143
<211> LENGTH: 1708

<212> TYPE: DNA
<213> ORGANISM: Thlaspi arvense

<400> SEQUENCE: 143

```
atgtcacaat attccttctt ctatttcttc ctaatctctc ttttcctcta cgaaaattgc     60
attgcgtatc gctacacatt cacggttatt gaagctccat atagcaaact gtgtagcacg    120
aagaagattt tgaccgttaa tggtcagttt cctggaccag tgtttaaggg cttacaaagg    180
tgacaccatt tacgttaacg ttcgtaacca agctagtgaa aatatcacat tgcattggca    240
tggtgtagag cagccgagaa acccgtggtc agatggaccc gaatacatca cacaatgccc    300
gattcaaccc gggtcagatt ttacgtacaa aattttactt tccatcgaag acgcgactgt    360
ttggtggcat gcgcatagct cgtggacacg tgccaccgta cacggtctga ttttcgtgta    420
tcctcggcct cctgataccc tgccttttcc agaaccggac tacgaagtcc ccttagtttt    480
tggagagtgg tggaagaggg atgtgagaga agtagtggag gatttcatga ggaacggagg    540
tgaacctaat gtgtccgatg ctttgactat caatgggcat cctggtttct tgtatccttg    600
ctctcaatca gatacattca agctcgtggt agagaagggc aaaacctacc gcattcggat    660
ggtaaacgcc gcgatgaacc taattctctt cttcgccatc gcgaaccaca aactcaccgt    720
ggtcgccgcc gatggccact acaccaaacc tctaaccgct agttatatca ccatatctcc    780
tggccaaacg ctagacctgt tactatacgc cgaccaaagt ccagagagca cttataacat    840
ggcggccaga gcttaccata gcaaccccaa cgttgggttc aacaactcta ccaccgtcgg    900
gatcttacgt tactactctt caaacgacgc cggaacgtct tcatcagaac gttacccgta    960
ccttcctggc tacaatgaca cctcagcagc tttcgatttc ttcacaaaaa tcaaaggctt   1020
atactccaga gtagctcccg ccaaagtttc acgtaggata atcacgacgg tttcgataaa   1080
tctcctcaag tgtcccaacg actcgtgtgc aggcccaaac gggtcgaggt tagcggcgag   1140
tatgaacaac atatcgttcg tcacaccgag ccacgtggac atactaagag cttattacct   1200
tcacattaac ggcgtttacg gaacgcggtt tccggagttc ccaccgcgga tattcaattt   1260
cacagcggac gaccaaccgc tgtttttgca gactccgagg ctggcgacgg aggtaaagaa   1320
gtttcagtac ggggagacgg ttgagattgt tatacaaggg acgagtttgg taggtggtgg   1380
aatcgatcat cctatgcatc tccatggttt tagcttctac gtggttggtt tagggtttgg   1440
gaattttaac gcacgtaaag atccctccaa ctataatcta gacgatcctc cttacagaaa   1500
cacggcgact gtgcccagga acggttggat cgctatcaga ttcgtagctg acaatccagg   1560
ggtttggttc atgcactgtc actttgatag acatcaaacg tggggtatga atgttgtctt   1620
cattgttaag aatggaataa aaccaaatca gaagattcta cctccaccgc ctggcttacc   1680
accttgtgac caatttgaga atctataa                                      1708
```

<210> SEQ ID NO 144
<211> LENGTH: 60
<212> TYPE: PRT
<213> ORGANISM: Thlaspi arvense

<400> SEQUENCE: 144

```
Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45
```

```
Gln Phe Pro Gly Pro Val Phe Lys Gly Leu Gln Arg
    50                  55                  60

<210> SEQ ID NO 145
<211> LENGTH: 1708
<212> TYPE: DNA
<213> ORGANISM: Thlaspi arvense

<400> SEQUENCE: 145

atgtcacaat attccttctt ctatttcttc ctaatctctc ttttcctcta cgaaaattgc      60
attgcgtatc gctacacatt cacggttatt gaagctccat atagcaaact gtgtagcacg     120
aagaagattt tgaccgttaa tggtcagttt cctggaccag tgattaaggg cttacaaagg     180
tgacaccatt tacgttaacg ttcgtaacca agctagtgaa aatatcacat tgcattggca     240
tggtgtagag cagccgagaa acccgtggtc agatggaccc gaatacatca cacaatgccc     300
gattcaaccc gggtcagatt ttacgtacaa aattttactt tccatcgaag acgcgactgt     360
ttggtggcat gcgcatagct cgtggacacg tgccaccgta cacggtctga ttttcgtgta     420
tcctcggcct cctgataccc tgccttttcc agaaccggac tacgaagtcc ccttagtttt     480
tggagagtgg tggaagaggg atgtgagaga agtagtggag gatttcatga ggaacggagg     540
tgaacctaat gtgtccgatg ctttgactat caatgggcat cctggtttct tgtatccttg     600
ctctcaatca gatacattca agctcgtggt agagaagggc aaaacctacc gcattcggat     660
ggtaaacgcc gcgatgaacc taattctctt cttcgccatc gcgaaccaca aactcaccgt     720
ggtcgccgcc gatggccact acaccaaacc tctaaccgct agttatatca ccatatctcc     780
tggccaaacg ctagacctgt tactatacgc cgaccaaagt ccagagagca cttataacat     840
ggcggccaga gcttaccata gcaaccccaa cgttgggttc aacaactcta ccaccgtcgg     900
gatcttacgt tactactctt caaacgacgc cggaacgtct tcatcagaac gttacccgta     960
ccttcctggc tacaatgaca cctcagcagc tttcgatttc ttcacaaaaa tcaaaggctt    1020
atactccaga gtagctcccg ccaaagtttc acgtaggata atcacgacgg tttcgataaa    1080
tctcctcaag tgtcccaacg actcgtgtgc aggcccaaac gggtcgaggt tagcggcgag    1140
tatgaacaac atatcgttcg tcacaccgag ccacgtggac atactaagag cttattacct    1200
tcacattaac ggcgtttacg gaacgcggtt tccggagttc ccaccgcgga tattcaattt    1260
cacagcggac gaccaaccgc tgtttttgca gactccgagg ctggcgacgg aggtaaagaa    1320
gtttcagtac ggggagacgg ttgagattgt tatacaaggg acgagtttgg taggtggtgg    1380
aatcgatcat cctatgcatc tccatggttt tagcttctac gtggttggtt tagggtttgg    1440
gaattttaac gcacgtaaag atccctccaa ctataatcta gacgatcctc cttacagaaa    1500
cacggcgact gtgcccagga acggttggat cgctatcaga ttcgtagctg acaatccagg    1560
ggtttggttc atgcactgtc actttgatag acatcaaacg tggggtatga atgttgtctt    1620
cattgttaag aatggaataa aaccaaatca gaagattcta cctccaccgc ctggcttacc    1680
accttgtgac caatttgaga atctataa                                       1708

<210> SEQ ID NO 146
<211> LENGTH: 60
<212> TYPE: PRT
<213> ORGANISM: Thlaspi arvense

<400> SEQUENCE: 146

Met Ser Gln Tyr Ser Phe Phe Tyr Phe Phe Leu Ile Ser Leu Phe Leu
```

```
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly Pro Val Phe Lys Gly Leu Gln Arg
    50                  55                  60


<210> SEQ ID NO 147
<211> LENGTH: 1700
<212> TYPE: DNA
<213> ORGANISM: Thlaspi arvense

<400> SEQUENCE: 147

atgtcacaat attccttctt ctatttcttc ctaatctctc ttttcctcta cgaaaattgc     60

attgcgtatc gctacacatt cacggttatt gaagctccat atagcaaact gtgtagcacg    120

aagaagattt tgaccgttaa tggtcagttt cctggttaag ggcttacaaa ggtgacacca    180

tttacgttaa cgttcgtaac caagctagtg aaaatatcac attgcattgg catggtgtag    240

agcagccgag aaacccgtgg tcagatggac ccgaatacat cacacaatgc ccgattcaac    300

ccgggtcaga ttttacgtac aaaattttac tttccatcga agacgcgact gtttggtggc    360

atgcgcatag ctcgtggaca cgtgccaccg tacacggtct gattttcgtg tatcctcggc    420

ctcctgatac cctgcctttt ccagaaccgg actacgaagt cccccttagtt tttggagagt    480

ggtggaagag ggatgtgaga gaagtagtgg aggatttcat gaggaacgga ggtgaaccta    540

atgtgtccga tgctttgact atcaatgggc atcctggttt cttgtatcct tgctctcaat    600

cagatacatt caagctcgtg gtagagaagg gcaaaaccta ccgcattcgg atggtaaacg    660

ccgcgatgaa cctaattctc ttcttcgcca tcgcgaacca caaactcacc gtggtcgccg    720

ccgatggcca ctacaccaaa cctctaaccg ctagttatat caccatatct cctggccaaa    780

cgctagacct gttactatac gccgaccaaa gtccagagag cacttataac atggcggcca    840

gagcttacca tagcaacccc aacgttgggt tcaacaactc taccaccgtc gggatcttac    900

gttactactc ttcaaacgac gccggaacgt cttcatcaga acgttacccg taccttcctg    960

gctacaatga cacctcagca gctttcgatt tcttcacaaa aatcaaaggc ttatactcca   1020

gagtagctcc cgccaaagtt tcacgtagga taatcacgac ggtttcgata aatctcctca   1080

agtgtcccaa cgactcgtgt gcaggcccaa acgggtcgag gttagcggcg agtatgaaca   1140

acatatcgtt cgtcacaccg agccacgtgg acatactaag agcttattac cttcacatta   1200

acggcgttta cggaacgcgg tttccggagt tcccaccgcg gatattcaat ttcacagcgg   1260

acgaccaacc gctgttttg cagactccga ggctggcgac ggaggtaaag aagtttcagt   1320

acggggagac ggttgagatt gttatacaag ggacgagttt ggtaggtggt ggaatcgatc   1380

atcctatgca tctccatggt tttagcttct acgtggttgg tttagggttt gggaatttta   1440

acgcacgtaa agatccctcc aactataatc tagacgatcc tccttacaga aacacggcga   1500

ctgtgcccag gaacggttgg atcgctatca gattcgtagc tgacaatcca ggggtttggt   1560

tcatgcactg tcactttgat agacatcaaa cgtggggtat gaatgttgtc ttcattgtta   1620

agaatggaat aaaaccaaat cagaagattc tacctccacc gcctggctta ccaccttgtg   1680

accaatttga gaatctataa                                                1700


<210> SEQ ID NO 148
```

<211> LENGTH: 52
<212> TYPE: PRT
<213> ORGANISM: Thlaspi arvense

<400> SEQUENCE: 148

```
Met Ser Gln Tyr Ser Phe Phe Tyr Phe Phe Leu Ile Ser Leu Phe Leu
1               5                   10                  15

Tyr Glu Asn Cys Ile Ala Tyr Arg Tyr Thr Phe Thr Val Ile Glu Ala
            20                  25                  30

Pro Tyr Ser Lys Leu Cys Ser Thr Lys Lys Ile Leu Thr Val Asn Gly
        35                  40                  45

Gln Phe Pro Gly
    50
```

<210> SEQ ID NO 149
<211> LENGTH: 1520
<212> TYPE: DNA
<213> ORGANISM: Thlaspi arvense

<400> SEQUENCE: 149

```
atgagctcca cggagacata tgagcctcta ttgagacggc tccactcaga ttctcagtta     60

accgtaggtt cttcaccgga gatagaggag tttctcggcc gtcgtagatc cacggtgacg    120

ccacggtggt ggctaaggct ggccgtatgg gaatcaaagc ttctttggac gctctctgga    180

gcctccatag tggtctctgt gctgaattac atgctcagct tcgtcaccgt tatgttcatc    240

ggccatcttg gctctcttca gctcgccggc gcatccatcg ccaccgtcgg tatccaaggc    300

ctcgcttacg gtatcatgtt gggaatggcg agcgcggtcc agacagtgtg tggtcaagcg    360

tacggcgcga ggcagtactc atcaatggga ataatttgcc aacgagccat ggtcttgcac    420

ctcgcagctg cggtcctcct cacgttcctc tactggtact cgggtccgat cctaaaggcg    480

atgggccaat ccgcagccat cgcacgcgag ggtcaggtct ttgcacgtgg gattattccg    540

cagatttatg cttttgccct cgcttgccct atgcagaggt tcctccaggc tcaaaaaatt    600

gtaaaccctt ttacatgtca ctaggagttt tcgtgctaca cacgctacta acctggctgg    660

taaccaacgt cctgcatttc ggcttgctcg gtgcagctct ggtgctgagt tttcgtggt     720

ggcttctcgc ggctgtgaat ggtctgtata tcgtgatgag cccgagttgc aaggaaactt    780

ggaccgggtt ctcagctagg gctttaagag ggatttggcc ttacttcaag ctcacgatag    840

cttcagcagt catgctatgt ttggagatat ggtacgtcca agggctagtg attatttccg    900

gtttactcac caatcccaca attgccctag acgcaatttc gatttgcatg tattactgga    960

attgggatat gcagttcatg cttggtctaa gtgcggcaat cactgtccga gtgagcaacg   1020

agctaggagc gggaaaccca cgagtggcta agttatcagt ggtagtggtt aacatcacga   1080

cggttgtcat cagcttattc ctctgtgtcg ttgtgctcgt gttccgcatt ggccttagta   1140

aagccttcac cagcgacgca gaggttatag ctgcagtctc tgatctcttt cccctgctcg   1200

ccgtttccat tttcttaaac ggaatccaac caattctctc tggtgttgcc attggaagtg   1260

ggtggcaagc agtggtggct tatgtgaatc ttgttactta ctatgtcatt ggtcttccta   1320

ttggctgtgt tcttggcttc aaaaccagtc ttggagttgc ggggatctgg tgggggatga   1380

ttgcaggagt tatacttcaa accctaactt tgattgttct tacactcaga actaactgga   1440

attccgaggt ggagaatgca gctcataggt taaaagcttc agcaaatgag agtcaagaaa   1500

tggctaccga aggaatctaa                                               1520
```

<210> SEQ ID NO 150
<211> LENGTH: 207
<212> TYPE: PRT
<213> ORGANISM: Thlaspi arvense

<400> SEQUENCE: 150

```
Met Ser Ser Thr Glu Thr Tyr Glu Pro Leu Leu Arg Arg Leu His Ser
1               5                   10                  15

Asp Ser Gln Leu Thr Val Gly Ser Ser Pro Glu Ile Glu Glu Phe Leu
            20                  25                  30

Gly Arg Arg Arg Ser Thr Val Thr Pro Arg Trp Trp Leu Arg Leu Ala
        35                  40                  45

Val Trp Glu Ser Lys Leu Leu Trp Thr Leu Ser Gly Ala Ser Ile Val
    50                  55                  60

Val Ser Val Leu Asn Tyr Met Leu Ser Phe Val Thr Val Met Phe Ile
65                  70                  75                  80

Gly His Leu Gly Ser Leu Gln Leu Ala Gly Ala Ser Ile Ala Thr Val
                85                  90                  95

Gly Ile Gln Gly Leu Ala Tyr Gly Ile Met Leu Gly Met Ala Ser Ala
            100                 105                 110

Val Gln Thr Val Cys Gly Gln Ala Tyr Gly Ala Arg Gln Tyr Ser Ser
        115                 120                 125

Met Gly Ile Ile Cys Gln Arg Ala Met Val Leu His Leu Ala Ala Ala
    130                 135                 140

Val Leu Leu Thr Phe Leu Tyr Trp Tyr Ser Gly Pro Ile Leu Lys Ala
145                 150                 155                 160

Met Gly Gln Ser Ala Ala Ile Ala Arg Glu Gly Gln Val Phe Ala Arg
                165                 170                 175

Gly Ile Ile Pro Gln Ile Tyr Ala Phe Ala Leu Ala Cys Pro Met Gln
            180                 185                 190

Arg Phe Leu Gln Ala Gln Lys Ile Val Asn Pro Phe Thr Cys His
        195                 200                 205
```

<210> SEQ ID NO 151
<211> LENGTH: 1524
<212> TYPE: DNA
<213> ORGANISM: Thlaspi arvense

<400> SEQUENCE: 151

```
atgagctcca cggagacata tgagcctcta ttgagacggc tccactcaga ttctcagtta     60

accgtaggtt cttcaccgga gatagaggag tttctcggcc gtcgtagatc cacggtgacg    120

ccacggtggt ggctaaggct ggccgtatgg gaatcaaagc ttctttggac gctctctgga    180

gcctccatag tggtctctgt gctgaattac atgctcagct tcgtcaccgt tatgttcatc    240

ggccatcttg gctctcttca gctcgccggc gcatccatcg ccaccgtcgg tatccaaggc    300

ctcgcttacg gtatcatgtt gggaatggcg agcgcggtcc agacagtgtg tggtcaagcg    360

tacggcgcga ggcagtactc atcaatggga ataatttgcc aacgagccat ggtcttgcac    420

ctcgcagctg cggtcctcct cacgttcctc tactggtact cgggtccgat cctaaaggcg    480

atgggccaat ccgcagccat cgcacgcgag ggtcaggtct ttgcacgtgg gattattccg    540

cagatttatg cttttgccct cgcttgccct atgcagaggt tcctccaggc tcaaaaaatt    600

gtaaaccctt tggcttacat gtcactagga gttttcgtgc tacacacgct actaacctgg    660

ctggtaacca acgtcctgca tttcggcttg ctcggtgcag ctctggtgct gagtttttcg    720

tggtggcttc tcgcggctgt gaatggtctg tatatcgtga tgagcccgag ttgcaaggaa    780
```

```
acttggaccg ggttctcagc tagggcttta agagggattt ggccttactt caagctcacg    840

atagcttcag cagtcatgct atgtttggag atatggtacg tccaagggct agtgattatt    900

tccggtttac tcaccaatcc cacaattgcc ctagacgcaa tttcgatttg catgtattac    960

tggaattggg atatgcagtt catgcttggt ctaagtgcgg caatcactgt ccgagtgagc   1020

aacgagctag gagcgggaaa cccacgagtg gctaagttat cagtggtagt ggttaacatc   1080

acgacggttg tcatcagctt attcctctgt gtcgttgtgc tcgtgttccg cattggcctt   1140

agtaaagcct tcaccagcga cgcagaggtt atagctgcag tctctgatct ctttcccctg   1200

ctcgccgttt ccattttctt aaacggaatc caaccaattc tctctagtgt tgccattgga   1260

agtgggtggc aagcagtggt ggcttatgtg aatcttgtta cttactatgt cattggtctt   1320

cctattggct gtgttcttgg cttcaaaacc agtcttggag ttgcggggat ctggtggggg   1380

atgattgcag gagttatact tcaaacccta actttgattg ttcttacact cagaactaac   1440

tggaattccg aggtggagaa tgcagctcat aggttaaaag cttcagcaaa tgagagtcaa   1500

gaaatggcta ccgaaggaat ctaa                                          1524
```

<210> SEQ ID NO 152
<211> LENGTH: 507
<212> TYPE: PRT
<213> ORGANISM: Thlaspi arvense

<400> SEQUENCE: 152

```
Met Ser Ser Thr Glu Thr Tyr Glu Pro Leu Leu Arg Arg Leu His Ser
1               5                   10                  15

Asp Ser Gln Leu Thr Val Gly Ser Ser Pro Glu Ile Glu Glu Phe Leu
            20                  25                  30

Gly Arg Arg Arg Ser Thr Val Thr Pro Arg Trp Trp Leu Arg Leu Ala
        35                  40                  45

Val Trp Glu Ser Lys Leu Leu Trp Thr Leu Ser Gly Ala Ser Ile Val
    50                  55                  60

Val Ser Val Leu Asn Tyr Met Leu Ser Phe Val Thr Val Met Phe Ile
65                  70                  75                  80

Gly His Leu Gly Ser Leu Gln Leu Ala Gly Ala Ser Ile Ala Thr Val
                85                  90                  95

Gly Ile Gln Gly Leu Ala Tyr Gly Ile Met Leu Gly Met Ala Ser Ala
            100                 105                 110

Val Gln Thr Val Cys Gly Gln Ala Tyr Gly Ala Arg Gln Tyr Ser Ser
        115                 120                 125

Met Gly Ile Ile Cys Gln Arg Ala Met Val Leu His Leu Ala Ala Ala
    130                 135                 140

Val Leu Leu Thr Phe Leu Tyr Trp Tyr Ser Gly Pro Ile Leu Lys Ala
145                 150                 155                 160

Met Gly Gln Ser Ala Ala Ile Ala Arg Glu Gly Gln Val Phe Ala Arg
                165                 170                 175

Gly Ile Ile Pro Gln Ile Tyr Ala Phe Ala Leu Ala Cys Pro Met Gln
            180                 185                 190

Arg Phe Leu Gln Ala Gln Lys Ile Val Asn Pro Leu Ala Tyr Met Ser
        195                 200                 205

Leu Gly Val Phe Val Leu His Thr Leu Leu Thr Trp Leu Val Thr Asn
    210                 215                 220

Val Leu His Phe Gly Leu Leu Gly Ala Ala Leu Val Leu Ser Phe Ser
225                 230                 235                 240
```

```
Trp Trp Leu Leu Ala Ala Val Asn Gly Leu Tyr Ile Val Met Ser Pro
                245                 250                 255

Ser Cys Lys Glu Thr Trp Thr Gly Phe Ser Ala Arg Ala Leu Arg Gly
            260                 265                 270

Ile Trp Pro Tyr Phe Lys Leu Thr Ile Ala Ser Ala Val Met Leu Cys
        275                 280                 285

Leu Glu Ile Trp Tyr Val Gln Gly Leu Val Ile Ile Ser Gly Leu Leu
    290                 295                 300

Thr Asn Pro Thr Ile Ala Leu Asp Ala Ile Ser Ile Cys Met Tyr Tyr
305                 310                 315                 320

Trp Asn Trp Asp Met Gln Phe Met Leu Gly Leu Ser Ala Ala Ile Thr
                325                 330                 335

Val Arg Val Ser Asn Glu Leu Gly Ala Gly Asn Pro Arg Val Ala Lys
            340                 345                 350

Leu Ser Val Val Val Val Asn Ile Thr Thr Val Val Ile Ser Leu Phe
        355                 360                 365

Leu Cys Val Val Val Leu Val Phe Arg Ile Gly Leu Ser Lys Ala Phe
    370                 375                 380

Thr Ser Asp Ala Glu Val Ile Ala Ala Val Ser Asp Leu Phe Pro Leu
385                 390                 395                 400

Leu Ala Val Ser Ile Phe Leu Asn Gly Ile Gln Pro Ile Leu Ser Ser
                405                 410                 415

Val Ala Ile Gly Ser Gly Trp Gln Ala Val Val Ala Tyr Val Asn Leu
            420                 425                 430

Val Thr Tyr Tyr Val Ile Gly Leu Pro Ile Gly Cys Val Leu Gly Phe
        435                 440                 445

Lys Thr Ser Leu Gly Val Ala Gly Ile Trp Trp Gly Met Ile Ala Gly
    450                 455                 460

Val Ile Leu Gln Thr Leu Thr Leu Ile Val Leu Thr Leu Arg Thr Asn
465                 470                 475                 480

Trp Asn Ser Glu Val Glu Asn Ala Ala His Arg Leu Lys Ala Ser Ala
                485                 490                 495

Asn Glu Ser Gln Glu Met Ala Thr Glu Gly Ile
            500                 505


<210> SEQ ID NO 153
<211> LENGTH: 2214
<212> TYPE: DNA
<213> ORGANISM: Thlaspi arvense

<400> SEQUENCE: 153

atgcttccat taatggcgat accacttgcg acttgcagga gcatcaactg gtcagccacg     60

gaaaggattc ctgtttcgct tctgttccgg agtattcttc tccaagacga cgaagtttgt    120

agcgctgtgc cactataccg gatcctcgat cagaatgacg ggcaacttgg tcctataagt    180

atggccgagg aatcagacaa accattgctg gatcctgata ctctcaacag agaaggaatt    240

gacttgggtc tgttgccatt ggaggaggtt tttgaatacc taagaacatc tccacggggg    300

cttttatctg gagatgctga agaaagattg acgatatttg gtcctaacag ccttgaagag    360

aaacgggaga acaagtttct gaagttccta ggttttatgt ggaatccttt gtcatgggtt    420

atggaagctg cagcattgat ggccatcgcc ctagcagata gtgaagtaga gactatcagt    480

cttttgctat accatttctg ctcagtgctg accggagaat cgctacctgt gaccaagaag    540

aagggtgagc aagtcttctc tggctctact tgtaagcaag gtgagataga agctgttgtg    600
```

```
atagccaccg gttcgagcac tttctttggt aaaacagcat ctttggtgga cagcacagat    660

gcaactggac attttcagca ggttctaagc ttgtgccagc agaaaaatga gattgcgcaa    720

agagtttatg ccatcataaa tagatttgca gaaaaaggtt tgaggtctct tgctgttgct    780

tatcaggaaa ttccagagag aagcagcaac agtcctggag gaccatggtt gttctgtggt    840

ctgttgccac tgtttgatcc tccaaggcat gacagtgctg aaaccatact gagagctctt    900

aactttggag tttgtgttaa gatgatcacc ggtgatcagt tggcgattgc aaaggagaca    960

ggaaggcgac ttgggatggg aaccaatatg tatccttctt cctctttgtt aggccacaac   1020

aacgatgatc acgaagccat tccattggat gagcttattg aaatggcaga tggatttgct   1080

ggagtgttcc ctgaacacaa gtatgagatt gtaaagatat tacaagaaaa gaagcatgtg   1140

gttggaatga ccggagatgg tgtgaatgat gctcctgctc tgaaaaaggc tgacattgga   1200

atagctgtcg ctgatgcaac agatgccgca agaagttctg ctgacattgt actaactgag   1260

cctggcttaa gtgtaattat cagtgctgtc ttgaccagca gagccatttt ccagcgtatg   1320

aagaactata cagtatatgc agtctcgatc accatacgaa tagtgctcgg ttttacactt   1380

ttagcgttga tatgggaata cgactttcca cctttcatgg ttttgataat cgcaatactc   1440

aatgacggga ccatcatgac tatctctaaa gatcgagtaa ggccatctcc tacacccgag   1500

agttggaagc tcaaccagat atttgcgact ggaattgtca ttggaacata ccttgcattg   1560

gtcactgtcc tattctactg gatcattgtc tctaccacct tcttcgagaa acacttccat   1620

gtaaaatcaa tcggcaacaa cagtgaacaa gtctcatccg ctctgtatct ccaagtaagc   1680

atcatcagtc aagcactcat atttgtaaca cgtagtcgaa gctggtcttt tcttgaacgt   1740

cccgggactc tcctgatttt cgccttcctt gttgcccaac ttgccgctac attgattgct   1800

gtctatgcca acatcagctt tgctaacatc accggcattg gatggggatg ggcaggtgtt   1860

atatggttat acagtttgat tttttacata cctcttgata ttataaagtt cttcttccac   1920

tacgcattga gtggagatgc ttggaacctt gtatttgacc gtaagacagc atttactaat   1980

aagaaagatt atagaaaaga tgacggagcg tccaatgtaa ccatctctca gagaagtcac   2040

tctgcagaag aactcagtgg aagtcgttct cgcgcatctt ggatcgctga gcagaccaga   2100

aggcgtgcag aaaccgccag gctcttggag ggacactcgg tgtcaaggca tttggaatca   2160

gtaatgaagc tcaaacaaat tgaccccaag atgattcgtg cagacactgt ctaa         2214


<210> SEQ ID NO 154
<211> LENGTH: 737
<212> TYPE: PRT
<213> ORGANISM: Thlaspi arvense

<400> SEQUENCE: 154

Met Leu Pro Leu Met Ala Ile Pro Leu Ala Thr Cys Arg Ser Ile Asn
1               5                   10                  15

Trp Ser Ala Thr Glu Arg Ile Pro Val Ser Leu Leu Phe Arg Ser Ile
            20                  25                  30

Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
```

-continued

```
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125

Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160

Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Phe Gly Val
    290                 295                 300

Cys Val Lys Met Ile Thr Gly Asp Gln Leu Ala Ile Ala Lys Glu Thr
305                 310                 315                 320

Gly Arg Arg Leu Gly Met Gly Thr Asn Met Tyr Pro Ser Ser Ser Leu
                325                 330                 335

Leu Gly His Asn Asn Asp Asp His Glu Ala Ile Pro Leu Asp Glu Leu
            340                 345                 350

Ile Glu Met Ala Asp Gly Phe Ala Gly Val Phe Pro Glu His Lys Tyr
        355                 360                 365

Glu Ile Val Lys Ile Leu Gln Glu Lys Lys His Val Val Gly Met Thr
    370                 375                 380

Gly Asp Gly Val Asn Asp Ala Pro Ala Leu Lys Lys Ala Asp Ile Gly
385                 390                 395                 400

Ile Ala Val Ala Asp Ala Thr Asp Ala Ala Arg Ser Ser Ala Asp Ile
                405                 410                 415

Val Leu Thr Glu Pro Gly Leu Ser Val Ile Ile Ser Ala Val Leu Thr
            420                 425                 430

Ser Arg Ala Ile Phe Gln Arg Met Lys Asn Tyr Thr Val Tyr Ala Val
        435                 440                 445

Ser Ile Thr Ile Arg Ile Val Leu Gly Phe Thr Leu Leu Ala Leu Ile
    450                 455                 460

Trp Glu Tyr Asp Phe Pro Pro Phe Met Val Leu Ile Ile Ala Ile Leu
465                 470                 475                 480

Asn Asp Gly Thr Ile Met Thr Ile Ser Lys Asp Arg Val Arg Pro Ser
                485                 490                 495

Pro Thr Pro Glu Ser Trp Lys Leu Asn Gln Ile Phe Ala Thr Gly Ile
            500                 505                 510
```

```
Val Ile Gly Thr Tyr Leu Ala Leu Val Thr Val Leu Phe Tyr Trp Ile
        515                 520                 525

Ile Val Ser Thr Thr Phe Phe Glu Lys His Phe His Val Lys Ser Ile
    530                 535                 540

Gly Asn Asn Ser Glu Gln Val Ser Ser Ala Leu Tyr Leu Gln Val Ser
545                 550                 555                 560

Ile Ile Ser Gln Ala Leu Ile Phe Val Thr Arg Ser Arg Ser Trp Ser
                565                 570                 575

Phe Leu Glu Arg Pro Gly Thr Leu Leu Ile Phe Ala Phe Leu Val Ala
            580                 585                 590

Gln Leu Ala Ala Thr Leu Ile Ala Val Tyr Ala Asn Ile Ser Phe Ala
        595                 600                 605

Asn Ile Thr Gly Ile Gly Trp Gly Trp Ala Gly Val Ile Trp Leu Tyr
    610                 615                 620

Ser Leu Ile Phe Tyr Ile Pro Leu Asp Ile Ile Lys Phe Phe Phe His
625                 630                 635                 640

Tyr Ala Leu Ser Gly Asp Ala Trp Asn Leu Val Phe Asp Arg Lys Thr
                645                 650                 655

Ala Phe Thr Asn Lys Lys Asp Tyr Arg Lys Asp Asp Gly Ala Ser Asn
            660                 665                 670

Val Thr Ile Ser Gln Arg Ser His Ser Ala Glu Glu Leu Ser Gly Ser
        675                 680                 685

Arg Ser Arg Ala Ser Trp Ile Ala Glu Gln Thr Arg Arg Arg Ala Glu
    690                 695                 700

Thr Ala Arg Leu Leu Glu Gly His Ser Val Ser Arg His Leu Glu Ser
705                 710                 715                 720

Val Met Lys Leu Lys Gln Ile Asp Pro Lys Met Ile Arg Ala Asp Thr
                725                 730                 735

Val
```

<210> SEQ ID NO 155
<211> LENGTH: 2214
<212> TYPE: DNA
<213> ORGANISM: Thlaspi arvense

<400> SEQUENCE: 155

```
atgcttccat taatggcgat accacttgcg acttgcagga gcatcaactg gtcagccacg      60

gaaaggattc ctgtttcgct tctgttccgg agtattcttc tccaagacga cgaagtttgt     120

agcgctgtgc cactataccg gatcctcgat cagaatgacg ggcaacttgg tcctataagt     180

atggccgagg aatcagacaa accattgctg gatcctgata ctctcaacag agaaggaatt     240

gacttgggtc tgttgccatt ggaggaggtt tttgaatacc taagaacatc tccacggggg     300

cttttatctg gagatgctga agaaagattg acgatatttg gtcctaacag ccttgaagag     360

aaacgggaga acaagtttct gaagttccta ggttttatgt ggaatccttt gtcatgggtt     420

atggaagctg cagcattgat ggccatcgcc ctagcagata gtgaagtaga gactatcagt     480

cttttgctat accatttctg ctcagtgctg accggagaat cgctacctgt gaccaagaag     540

aagggtgagc aagtcttctc tggctctact tgtaagcaag gtgagataga agctgttgtg     600

atagccaccg gttcgagcac tttctttggt aaaacagcat ctttggtgga cagcacagat     660

gcaactggac attttcagca ggttctaagc ttgtgccagc agaaaaatga gattgcgcaa     720

agagtttatg ccatcataaa tagatttgca gaaaaaggtt tgaggtctct tgctgttgct     780
```

```
tatcaggaaa ttccagagag aagcagcaac agtcctggag gaccatggtt gttctgtggt    840
ctgttgccac tgtttgatcc tccaaggcat gacagtgctg aaaccatact gagagctctt    900
aaccttggag tttgtgttaa gatgatcacc ggtgatcagt tggcgattgc aaaggagaca    960
ggaaggtgac ttgggatggg aaccaatatg tatccttctt cctctttgtt aggccacaac   1020
aacgatgatc acgaagccat tccattggat gagcttattg aaatggcaga tggatttgct   1080
ggagtgttcc ctgaacacaa gtatgagatt gtaaagatat tacaagaaaa gaagcatgtg   1140
gttggaatga ccggagatgg tgtgaatgat gctcctgctc tgaaaaaggc tgacattgga   1200
atagctgtcg ctgatgcaac agatgccgca agaagttctg ctgacattgt actaactgag   1260
cctggcttaa gtgtaattat cagtgctgtc ttgaccagca gagccatttt ccagcgtatg   1320
aagaactata cagtatatgc agtctcgatc accatacgaa tagtgctcgg ttttacactt   1380
ttagcgttga tatgggaata cgactttcca cctttcatgg ttttgataat cgcaatactc   1440
aatgacggga ccatcatgac tatctctaaa gatcgagtaa ggccatctcc tacacccgag   1500
agttggaagc tcaaccagat atttgcgact ggaattgtca ttggaacata ccttgcattg   1560
gtcactgtcc tattctactg gatcattgtc tctaccacct tcttcgagaa acacttccat   1620
gtaaaatcaa tcggcaacaa cagtgaacaa gtctcatccg ctctgtatct ccaagtaagc   1680
atcatcagtc aagcactcat atttgtaaca cgtagtcgaa gctggtcttt tcttgaacgt   1740
cccgggactc tcctgatttt cgccttcctt gttgcccaac ttgccgctac attgattgct   1800
gtctatgcca acatcagctt tgctaacatc accggcattg gatggggatg ggcaggtgtt   1860
atatggttat acagtttgat tttttacata cctcttgata ttataaagtt cttcttccac   1920
tacgcattga gtggagatgc ttggaacctt gtatttgacc gtaagacagc atttactaat   1980
aagaaagatt atagaaaaga tgacggagcg tccaatgtaa ccatctctca gagaagtcac   2040
tctgcagaag aactcagtgg aagtcgttct cgcgcatctt ggatcgctga gcagaccaga   2100
aggcgtgcag aaaccgccag gctcttggag ggacactcgg tgtcaaggca tttggaatca   2160
gtaatgaagc tcaaacaaat tgaccccaag atgattcgtg cagacactgt ctaa         2214
```

<210> SEQ ID NO 156
<211> LENGTH: 322
<212> TYPE: PRT
<213> ORGANISM: Thlaspi arvense

<400> SEQUENCE: 156

```
Met Leu Pro Leu Met Ala Ile Pro Leu Ala Thr Cys Arg Ser Ile Asn
1               5                   10                  15

Trp Ser Ala Thr Glu Arg Ile Pro Val Ser Leu Leu Phe Arg Ser Ile
            20                  25                  30

Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125
```

```
Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160

Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Leu Gly Val
    290                 295                 300

Cys Val Lys Met Ile Thr Gly Asp Gln Leu Ala Ile Ala Lys Glu Thr
305                 310                 315                 320

Gly Arg
```

<210> SEQ ID NO 157
<211> LENGTH: 2214
<212> TYPE: DNA
<213> ORGANISM: Thlaspi arvense

<400> SEQUENCE: 157

```
atgcttccat taatggcgat accacttgcg acttgcagga gcatcaactg gtcagccacg      60

gaaaggattc ctgtttcgct tctgttccgg agtattcttc tccaagacga cgaagtttgt     120

agcgctgtgc cactataccg gatcctcgat cagaatgacg ggcaacttgg tcctataagt     180

atggccgagg aatcagacaa accattgctg gatcctgata ctctcaacag agaaggaatt     240

gacttgggtc tgttgccatt ggaggaggtt tttgaatacc taagaacatc tccacggggg     300

cttttatctg gagatgctga agaaagattg acgatatttg gtcctaacag ccttgaagag     360

aaacgggaga acaagtttct gaagttccta ggttttatgt ggaatccttt gtcatgggtt     420

atggaagctg cagcattgat ggccatcgcc ctagcagata gtgaagtaga gactatcagt     480

cttttgctat accatttctg ctcagtgctg accggagaat cgctacctgt gaccaagaag     540

aagggtgagc aagtcttctc tggctctact tgtaagcaag gtgagataga agctgttgtg     600

atagccaccg gttcgagcac tttctttggt aaaacagcat ctttggtgga cagcacagat     660

gcaactggac attttcagca ggttctaagc ttgtgccagc agaaaaatga gattgcgcaa     720

agagtttatg ccatcataaa tagatttgca gaaaaaggtt tgaggtctct tgctgttgct     780

tatcaggaaa ttccagagag aagcagcaac agtcctggag gaccatggtt gttctgtggt     840

ctgttgccac tgtttgatcc tccaaggcat gacagtgctg aaaccatact gagagctctt     900

aaccttggag tttgtgttaa gatgatcacc ggtgatcagt tggcgattgc aaaggagaca     960
```

```
ggaaggcgac ttgggatggg aaccaatatg tatccttctt cctctttgtt aggccacaac   1020

aacgatgatc acgaagccat tccattggat gagcttattg aaatggcaga tggatttgct   1080

ggagtgttcc ctgaacacaa gtatgagatt gtaaagatat tacaagaaaa gaagcatgtg   1140

gttggaatga ccagagatgg tgtgaatgat gctcctgctc tgaaaaaggc tgacattgga   1200

atagctgtcg ctgatgcaac agatgccgca agaagttctg ctgacattgt actaactgag   1260

cctggcttaa gtgtaattat cagtgctgtc ttgaccagca gagccatttt ccagcgtatg   1320

aagaactata cagtatatgc agtctcgatc accatacgaa tagtgctcgg ttttacactt   1380

ttagcgttga tatgggaata cgactttcca cctttcatgg ttttgataat cgcaatactc   1440

aatgacggga ccatcatgac tatctctaaa gatcgagtaa ggccatctcc tacacccgag   1500

agttggaagc tcaaccagat atttgcgact ggaattgtca ttggaacata ccttgcattg   1560

gtcactgtcc tattctactg gatcattgtc tctaccacct tcttcgagaa acacttccat   1620

gtaaaatcaa tcggcaacaa cagtgaacaa gtctcatccg ctctgtatct ccaagtaagc   1680

atcatcagtc aagcactcat atttgtaaca cgtagtcgaa gctggtcttt tcttgaacgt   1740

cccgggactc tcctgatttt cgccttcctt gttgcccaac ttgccgctac attgattgct   1800

gtctatgcca acatcagctt tgctaacatc accggcattg gatggggatg ggcaggtgtt   1860

atatggttat acagtttgat tttttacata cctcttgata ttataaagtt cttcttccac   1920

tacgcattga gtggagatgc ttggaacctt gtatttgacc gtaagacagc atttactaat   1980

aagaaagatt atagaaaaga tgacggagcg tccaatgtaa ccatctctca gagaagtcac   2040

tctgcagaag aactcagtgg aagtcgttct cgcgcatctt ggatcgctga gcagaccaga   2100

aggcgtgcag aaaccgccag gctcttggag ggacactcgg tgtcaaggca tttggaatca   2160

gtaatgaagc tcaaacaaat tgaccccaag atgattcgtg cagacactgt ctaa         2214
```

```
<210> SEQ ID NO 158
<211> LENGTH: 737
<212> TYPE: PRT
<213> ORGANISM: Thlaspi arvense

<400> SEQUENCE: 158

Met Leu Pro Leu Met Ala Ile Pro Leu Ala Thr Cys Arg Ser Ile Asn
1               5                   10                  15

Trp Ser Ala Thr Glu Arg Ile Pro Val Ser Leu Leu Phe Arg Ser Ile
            20                  25                  30

Leu Leu Gln Asp Asp Glu Val Cys Ser Ala Val Pro Leu Tyr Arg Ile
        35                  40                  45

Leu Asp Gln Asn Asp Gly Gln Leu Gly Pro Ile Ser Met Ala Glu Glu
    50                  55                  60

Ser Asp Lys Pro Leu Leu Asp Pro Asp Thr Leu Asn Arg Glu Gly Ile
65                  70                  75                  80

Asp Leu Gly Leu Leu Pro Leu Glu Glu Val Phe Glu Tyr Leu Arg Thr
                85                  90                  95

Ser Pro Arg Gly Leu Leu Ser Gly Asp Ala Glu Glu Arg Leu Thr Ile
            100                 105                 110

Phe Gly Pro Asn Ser Leu Glu Glu Lys Arg Glu Asn Lys Phe Leu Lys
        115                 120                 125

Phe Leu Gly Phe Met Trp Asn Pro Leu Ser Trp Val Met Glu Ala Ala
    130                 135                 140

Ala Leu Met Ala Ile Ala Leu Ala Asp Ser Glu Val Glu Thr Ile Ser
145                 150                 155                 160
```

```
Leu Leu Leu Tyr His Phe Cys Ser Val Leu Thr Gly Glu Ser Leu Pro
                165                 170                 175

Val Thr Lys Lys Lys Gly Glu Gln Val Phe Ser Gly Ser Thr Cys Lys
            180                 185                 190

Gln Gly Glu Ile Glu Ala Val Val Ile Ala Thr Gly Ser Ser Thr Phe
        195                 200                 205

Phe Gly Lys Thr Ala Ser Leu Val Asp Ser Thr Asp Ala Thr Gly His
    210                 215                 220

Phe Gln Gln Val Leu Ser Leu Cys Gln Gln Lys Asn Glu Ile Ala Gln
225                 230                 235                 240

Arg Val Tyr Ala Ile Ile Asn Arg Phe Ala Glu Lys Gly Leu Arg Ser
                245                 250                 255

Leu Ala Val Ala Tyr Gln Glu Ile Pro Glu Arg Ser Ser Asn Ser Pro
            260                 265                 270

Gly Gly Pro Trp Leu Phe Cys Gly Leu Leu Pro Leu Phe Asp Pro Pro
        275                 280                 285

Arg His Asp Ser Ala Glu Thr Ile Leu Arg Ala Leu Asn Leu Gly Val
    290                 295                 300

Cys Val Lys Met Ile Thr Gly Asp Gln Leu Ala Ile Ala Lys Glu Thr
305                 310                 315                 320

Gly Arg Arg Leu Gly Met Gly Thr Asn Met Tyr Pro Ser Ser Ser Leu
                325                 330                 335

Leu Gly His Asn Asn Asp Asp His Glu Ala Ile Pro Leu Asp Glu Leu
            340                 345                 350

Ile Glu Met Ala Asp Gly Phe Ala Gly Val Phe Pro Glu His Lys Tyr
        355                 360                 365

Glu Ile Val Lys Ile Leu Gln Glu Lys Lys His Val Val Gly Met Thr
    370                 375                 380

Arg Asp Gly Val Asn Asp Ala Pro Ala Leu Lys Lys Ala Asp Ile Gly
385                 390                 395                 400

Ile Ala Val Ala Asp Ala Thr Asp Ala Ala Arg Ser Ser Ala Asp Ile
                405                 410                 415

Val Leu Thr Glu Pro Gly Leu Ser Val Ile Ile Ser Ala Val Leu Thr
            420                 425                 430

Ser Arg Ala Ile Phe Gln Arg Met Lys Asn Tyr Thr Val Tyr Ala Val
        435                 440                 445

Ser Ile Thr Ile Arg Ile Val Leu Gly Phe Thr Leu Leu Ala Leu Ile
    450                 455                 460

Trp Glu Tyr Asp Phe Pro Pro Phe Met Val Leu Ile Ile Ala Ile Leu
465                 470                 475                 480

Asn Asp Gly Thr Ile Met Thr Ile Ser Lys Asp Arg Val Arg Pro Ser
                485                 490                 495

Pro Thr Pro Glu Ser Trp Lys Leu Asn Gln Ile Phe Ala Thr Gly Ile
            500                 505                 510

Val Ile Gly Thr Tyr Leu Ala Leu Val Thr Val Leu Phe Tyr Trp Ile
        515                 520                 525

Ile Val Ser Thr Thr Phe Phe Glu Lys His Phe His Val Lys Ser Ile
    530                 535                 540

Gly Asn Asn Ser Glu Gln Val Ser Ser Ala Leu Tyr Leu Gln Val Ser
545                 550                 555                 560

Ile Ile Ser Gln Ala Leu Ile Phe Val Thr Arg Ser Arg Ser Trp Ser
                565                 570                 575
```

```
Phe Leu Glu Arg Pro Gly Thr Leu Leu Ile Phe Ala Phe Leu Val Ala
            580                 585                 590

Gln Leu Ala Ala Thr Leu Ile Ala Val Tyr Ala Asn Ile Ser Phe Ala
        595                 600                 605

Asn Ile Thr Gly Ile Gly Trp Gly Trp Ala Gly Val Ile Trp Leu Tyr
    610                 615                 620

Ser Leu Ile Phe Tyr Ile Pro Leu Asp Ile Ile Lys Phe Phe Phe His
625                 630                 635                 640

Tyr Ala Leu Ser Gly Asp Ala Trp Asn Leu Val Phe Asp Arg Lys Thr
                645                 650                 655

Ala Phe Thr Asn Lys Lys Asp Tyr Arg Lys Asp Asp Gly Ala Ser Asn
            660                 665                 670

Val Thr Ile Ser Gln Arg Ser His Ser Ala Glu Glu Leu Ser Gly Ser
        675                 680                 685

Arg Ser Arg Ala Ser Trp Ile Ala Glu Gln Thr Arg Arg Ala Glu
    690                 695                 700

Thr Ala Arg Leu Leu Glu Gly His Ser Val Ser Arg His Leu Glu Ser
705                 710                 715                 720

Val Met Lys Leu Lys Gln Ile Asp Pro Lys Met Ile Arg Ala Asp Thr
                725                 730                 735

Val
```

<210> SEQ ID NO 159
<211> LENGTH: 733
<212> TYPE: DNA
<213> ORGANISM: Thlaspi arvense

<400> SEQUENCE: 159

```
atgggaagag ggaagataga gataaagaag atagagaatc agacagcgag gcaagtgacc     60

ttctgcaaga ggagaactgg tcttatcaag aagactaatg agctctctgt tctctgcgat    120

gctcacattg gtctcatcgt cttctcctcc accggaaagc tctcgcagta ctgttccgaa    180

cccctcagga tgcctcagct cattgaccga tacttgaaga cccagtggaa tgcgacttcc    240

tgatcctaat gacggccggg aggaattgta ccaagagatg gaagtactaa aaagagagac    300

atgtaagctt gagcttcgtc tgcgtccata ccatggacat gacttaacct cccttcctcc    360

acacgagctc gatggtctcg agcaacagct cgaacattct gtccttaaag tccgcgagcg    420

taagaatgag ttgatgcagc aacagttgga gaatctaagc agaaagaggc ggatgctaga    480

agaagataac aacaatatgt accgtttgct tcatgagcat cgtaacgcgg ttgaatttca    540

gcaagctggg atagagacga aaccagggga gtatcaacag tttctagagc agcttcagta    600

ctataatgat catcagcaac aaccaaacag tgttcttcag cttgctacgc ttccttctga    660

gattgatcct aattaccatc tccagcttgc tcagcctaat cttcaaaacg atccaacggc    720

caagattgat tag                                                        733
```

<210> SEQ ID NO 160
<211> LENGTH: 80
<212> TYPE: PRT
<213> ORGANISM: Thlaspi arvense

<400> SEQUENCE: 160

```
Met Gly Arg Gly Lys Ile Glu Ile Lys Lys Ile Glu Asn Gln Thr Ala
1               5                   10                  15

Arg Gln Val Thr Phe Cys Lys Arg Arg Thr Gly Leu Ile Lys Lys Thr
            20                  25                  30
```

```
Asn Glu Leu Ser Val Leu Cys Asp Ala His Ile Gly Leu Ile Val Phe
        35                  40                  45

Ser Ser Thr Gly Lys Leu Ser Gln Tyr Cys Ser Glu Pro Leu Arg Met
    50                  55                  60

Pro Gln Leu Ile Asp Arg Tyr Leu Lys Thr Gln Trp Asn Ala Thr Ser
65                  70                  75                  80


<210> SEQ ID NO 161
<211> LENGTH: 733
<212> TYPE: DNA
<213> ORGANISM: Thlaspi arvense

<400> SEQUENCE: 161

atgggaagag ggaagataga gataaagaag atagagaatc agacagcgag gcaagtgacc      60

ttctgcaaga ggagaactgg tcttatcaag aagactaatg agctctctgt tctctgcgat     120

gctcacattg gtctcatcgt cttctcctcc accggaaagc tctcgcagta ctgttccgaa     180

cccctcagga tgcctcagct cattgaccga tacttgaaga cgcagtggaa tgcgacttcc     240

tgatcctaat gacggccggg aggaattgta ccaagagatg gaagtactaa aaagagagac     300

atgtaagctt gagcttcgtc tgcgtccata ccatggacat gacttaacct cccttcctcc     360

acacgagctc gatggtctcg agcaacagct cgaacattct gtccttaaag tccgcgagcg     420

taagaatgag ttgatgcagc aacagttgga gaatctaagc agaaagaggc ggatgctaga     480

agaagataac aacaatatgt accgtttgct tcatgagcat cgtaacgcgg ttgaatttca     540

gcaagctggg atagagacga aaccagggga gtatcaacag tttctagagc agcttcagta     600

ctataatgat catcagcaac aaccaaacag tgttcttcag cttgctacgc ttccttctga     660

gattgatcct aattaccatc tccagcttgc tcagcctaat cttcaaaacg atccaacggc     720

caagattgat tag                                                        733


<210> SEQ ID NO 162
<211> LENGTH: 80
<212> TYPE: PRT
<213> ORGANISM: Thlaspi arvense

<400> SEQUENCE: 162

Met Gly Arg Gly Lys Ile Glu Ile Lys Lys Ile Glu Asn Gln Thr Ala
1               5                   10                  15

Arg Gln Val Thr Phe Cys Lys Arg Arg Thr Gly Leu Ile Lys Lys Thr
            20                  25                  30

Asn Glu Leu Ser Val Leu Cys Asp Ala His Ile Gly Leu Ile Val Phe
        35                  40                  45

Ser Ser Thr Gly Lys Leu Ser Gln Tyr Cys Ser Glu Pro Leu Arg Met
    50                  55                  60

Pro Gln Leu Ile Asp Arg Tyr Leu Lys Thr Gln Trp Asn Ala Thr Ser
65                  70                  75                  80


<210> SEQ ID NO 163
<211> LENGTH: 733
<212> TYPE: DNA
<213> ORGANISM: Thlaspi arvense

<400> SEQUENCE: 163

atgggaagag ggaagataga gataaagaag atagagaatc agacagcgag gcaagtgacc      60

ttctgcaaga ggagaactgg tcttatcaag aagactaatg agctctctgt tctctgcgat     120
```

gctcacattg gtctcatcgt cttctcctcc accggaaagc tctcgcagta ctgttccgaa 180
cccctcagga tgcctcagct cattgaccga tacttgaaga ctcagtggaa tgcgacttcc 240
tgatcctaat gacggccggg aggaattgta ccaagagatg gaagtactaa aaagagagac 300
atgtaagctt gagcttcgtc tgcgtccata ccatggacat gacttaacct cccttcctcc 360
acacgagctc gatggtctcg agcaacagct cgaacattct gtccttaaag tccgcgagcg 420
taagaatgag ttgatgcagc aacagttgga gaatctaagc agaaagaggc ggatgctaga 480
agaagataac aacaatatgt accgtttgct tcatgagcat cgtaacgcgg ttgaatttca 540
gcaagctggg atagagacga aaccagggga gtatcaacag tttctagagc agcttcagta 600
ctataatgat catcagcaac aaccaaacag tgttcttcag cttgctacgc ttccttctga 660
gattgatcct aattaccatc tccagcttgc tcagcctaat cttcaaaacg atccaacggc 720
caagattgat tag 733

<210> SEQ ID NO 164
<211> LENGTH: 80
<212> TYPE: PRT
<213> ORGANISM: Thlaspi arvense

<400> SEQUENCE: 164

Met Gly Arg Gly Lys Ile Glu Ile Lys Lys Ile Glu Asn Gln Thr Ala
1               5                   10                  15

Arg Gln Val Thr Phe Cys Lys Arg Arg Thr Gly Leu Ile Lys Lys Thr
            20                  25                  30

Asn Glu Leu Ser Val Leu Cys Asp Ala His Ile Gly Leu Ile Val Phe
        35                  40                  45

Ser Ser Thr Gly Lys Leu Ser Gln Tyr Cys Ser Glu Pro Leu Arg Met
    50                  55                  60

Pro Gln Leu Ile Asp Arg Tyr Leu Lys Thr Gln Trp Asn Ala Thr Ser
65                  70                  75                  80

<210> SEQ ID NO 165
<211> LENGTH: 1005
<212> TYPE: DNA
<213> ORGANISM: Thlaspi arvense

<400> SEQUENCE: 165
atggataact cagctccgga ttctttgtcc agatcggaaa ccgccgtcac ctacgattct 60
ccttacccac tctacgccat ggccttctct tccatcggta ctccctccgg ccaccgaatc 120
gccgtcggaa gcttcctcga ggattacaac aaccgcatcg acattctctc cttcgattcc 180
gactccatga cggtgaagcc tctcccgaat ctctccttcg atcatcctta tcctcccaca 240
aagctgatgt tcagccctcc ctccctccgt cgtccctccg ccggcgatct cctccgttta 300
tgggagatca gtgaagattc ctccaccgtc gagcctgtct cggtgctcaa caacagcaag 360
acgagcgagt tctgcgcgcc gttgacctcc ttcgactgga acgacgtcga gccgaaacgc 420
ctgggaacct gcagcatcga cacgacctgc acgatttggg acatcgagaa gtgcgtggtg 480
gagacgcagc tcatagcgca cgataaggag gtccacgaca tcgcttgggg agaagctagg 540
gttttcgcgt cggtctccgc cgacggatcc gtcaggatct tcgatctacg cgacaaggag 600
cattccacca tcatctacga gagtcctcag cccgatacgc ctctcctaag actcgcctgg 660
aacaaacaag acctgaggta catggcgacg atcctgatgg attcgaataa ggtcgtgatt 720
ctcgacattc gctcgccgac gatgcctgtc gccgagctcg aacggcacca ggctagcgtc 780

```
aacgccatag cttgggctcc acagagctgc aaacacatct gctctgctgg tgacgacacg    840

caggctctca tctgggagct cccgactgta gctggaccca acggcattga tccgatgtcg    900

gtttactcag ccggctcgga gataaaccag ttgcagtggt cctcttcaca gcctgattgg    960

attggcatcg ctttcgctaa caaaatgcag ctccttagag tttga                   1005
```

```
<210> SEQ ID NO 166
<211> LENGTH: 334
<212> TYPE: PRT
<213> ORGANISM: Thlaspi arvense

<400> SEQUENCE: 166

Met Asp Asn Ser Ala Pro Asp Ser Leu Ser Arg Ser Glu Thr Ala Val
1               5                   10                  15

Thr Tyr Asp Ser Pro Tyr Pro Leu Tyr Ala Met Ala Phe Ser Ser Ile
            20                  25                  30

Gly Thr Pro Ser Gly His Arg Ile Ala Val Gly Ser Phe Leu Glu Asp
        35                  40                  45

Tyr Asn Asn Arg Ile Asp Ile Leu Ser Phe Asp Ser Asp Ser Met Thr
    50                  55                  60

Val Lys Pro Leu Pro Asn Leu Ser Phe Asp His Pro Tyr Pro Pro Thr
65                  70                  75                  80

Lys Leu Met Phe Ser Pro Pro Ser Leu Arg Arg Pro Ser Ala Gly Asp
                85                  90                  95

Leu Leu Arg Leu Trp Glu Ile Ser Glu Asp Ser Ser Thr Val Glu Pro
            100                 105                 110

Val Ser Val Leu Asn Asn Ser Lys Thr Ser Glu Phe Cys Ala Pro Leu
        115                 120                 125

Thr Ser Phe Asp Trp Asn Asp Val Glu Pro Lys Arg Leu Gly Thr Cys
    130                 135                 140

Ser Ile Asp Thr Thr Cys Thr Ile Trp Asp Ile Glu Lys Cys Val Val
145                 150                 155                 160

Glu Thr Gln Leu Ile Ala His Asp Lys Glu Val His Asp Ile Ala Trp
                165                 170                 175

Gly Glu Ala Arg Val Phe Ala Ser Val Ser Ala Asp Gly Ser Val Arg
            180                 185                 190

Ile Phe Asp Leu Arg Asp Lys Glu His Ser Thr Ile Ile Tyr Glu Ser
        195                 200                 205

Pro Gln Pro Asp Thr Pro Leu Leu Arg Leu Ala Trp Asn Lys Gln Asp
    210                 215                 220

Leu Arg Tyr Met Ala Thr Ile Leu Met Asp Ser Asn Lys Val Val Ile
225                 230                 235                 240

Leu Asp Ile Arg Ser Pro Thr Met Pro Val Ala Glu Leu Glu Arg His
                245                 250                 255

Gln Ala Ser Val Asn Ala Ile Ala Trp Ala Pro Gln Ser Cys Lys His
            260                 265                 270

Ile Cys Ser Ala Gly Asp Asp Thr Gln Ala Leu Ile Trp Glu Leu Pro
        275                 280                 285

Thr Val Ala Gly Pro Asn Gly Ile Asp Pro Met Ser Val Tyr Ser Ala
    290                 295                 300

Gly Ser Glu Ile Asn Gln Leu Gln Trp Ser Ser Ser Gln Pro Asp Trp
305                 310                 315                 320

Ile Gly Ile Ala Phe Ala Asn Lys Met Gln Leu Leu Arg Val
                325                 330
```

<210> SEQ ID NO 167
<211> LENGTH: 1026
<212> TYPE: DNA
<213> ORGANISM: Thlaspi arvense

<400> SEQUENCE: 167

```
atggataact cagctccgga ttctttgtcc agatcggaaa ccgccgtcac ctacgattct     60

ccttacccac tctacgccat ggccttctct tccatcggta ctccctccgg ccaccgaatc    120

gccgtcggaa gcttcctcga ggattacaac aaccgcatcg acattctctc cttcgattcc    180

gactccatga cggtgaagcc tctcccgaat ctctccttcg atcatcctta tcctcccaca    240

aagctgatgt tcagccctcc ctccctccgt cgtccctccg ccggcgatct cctcgcttcc    300

ttcggcgatt tcctccgttt atgggagatc agtgaagatt cctccaccgt cgagcctgtc    360

tcggtgctca acaacagcaa gacgagcgag ttctgcgcgc cgttgacctc cttcgactgg    420

aacgacgtcg agccgaaacg cctgggaacc tgcagcatcg acacgacctg cacgatttgg    480

gacatcgaga agtgcgtggt ggagacgcag ctcatagcgc acgataagga ggtccacgac    540

atcgcttggg gagaagctag ggttttcgcg tcggtctccg ccgacggatc cgtcaggatc    600

ttcgatctac gcgacaagga gcattccacc atcatctacg agagtcctca gcccgatacg    660

cctctcctaa gactcgcctg gaacaaacaa gacctgaggt acatggcgac gatcctgatg    720

gattcgaata aggtcgtgat tctcgacatt cgctcgccga cgatgcctgt cgccgagctc    780

gaacggcacc aggctagcgt caacgccata gcttgggctc cacagagctg caaacacatc    840

tgctctgctg gtgacgacac gcaggctctc atctgggagc tcccgactgt agctggaccc    900

aacggcattg atccgatgtc ggtttactca gccggctcgg agataaacca gttgcagtgg    960

tcctcttcac agcctgattg gattggcatc gctttcgcta acaaaatgca gctccttaga   1020

gtttga                                                              1026
```

<210> SEQ ID NO 168
<211> LENGTH: 341
<212> TYPE: PRT
<213> ORGANISM: Thlaspi arvense

<400> SEQUENCE: 168

```
Met Asp Asn Ser Ala Pro Asp Ser Leu Ser Arg Ser Glu Thr Ala Val
1               5                   10                  15

Thr Tyr Asp Ser Pro Tyr Pro Leu Tyr Ala Met Ala Phe Ser Ser Ile
            20                  25                  30

Gly Thr Pro Ser Gly His Arg Ile Ala Val Gly Ser Phe Leu Glu Asp
        35                  40                  45

Tyr Asn Asn Arg Ile Asp Ile Leu Ser Phe Asp Ser Asp Ser Met Thr
    50                  55                  60

Val Lys Pro Leu Pro Asn Leu Ser Phe Asp His Pro Tyr Pro Pro Thr
65                  70                  75                  80

Lys Leu Met Phe Ser Pro Pro Ser Leu Arg Arg Pro Ser Ala Gly Asp
                85                  90                  95

Leu Leu Ala Ser Phe Gly Asp Phe Leu Arg Leu Trp Glu Ile Ser Glu
            100                 105                 110

Asp Ser Ser Thr Val Glu Pro Val Ser Val Leu Asn Asn Ser Lys Thr
        115                 120                 125

Ser Glu Phe Cys Ala Pro Leu Thr Ser Phe Asp Trp Asn Asp Val Glu
    130                 135                 140
```

```
Pro Lys Arg Leu Gly Thr Cys Ser Ile Asp Thr Thr Cys Thr Ile Trp
145                 150                 155                 160

Asp Ile Glu Lys Cys Val Val Glu Thr Gln Leu Ile Ala His Asp Lys
                165                 170                 175

Glu Val His Asp Ile Ala Trp Gly Glu Ala Arg Val Phe Ala Ser Val
            180                 185                 190

Ser Ala Asp Gly Ser Val Arg Ile Phe Asp Leu Arg Asp Lys Glu His
        195                 200                 205

Ser Thr Ile Ile Tyr Glu Ser Pro Gln Pro Asp Thr Pro Leu Leu Arg
    210                 215                 220

Leu Ala Trp Asn Lys Gln Asp Leu Arg Tyr Met Ala Thr Ile Leu Met
225                 230                 235                 240

Asp Ser Asn Lys Val Val Ile Leu Asp Ile Arg Ser Pro Thr Met Pro
                245                 250                 255

Val Ala Glu Leu Glu Arg His Gln Ala Ser Val Asn Ala Ile Ala Trp
            260                 265                 270

Ala Pro Gln Ser Cys Lys His Ile Cys Ser Ala Gly Asp Asp Thr Gln
        275                 280                 285

Ala Leu Ile Trp Glu Leu Pro Thr Val Ala Gly Pro Asn Gly Ile Asp
    290                 295                 300

Pro Met Ser Val Tyr Ser Ala Gly Ser Glu Ile Asn Gln Leu Gln Trp
305                 310                 315                 320

Ser Ser Ser Gln Pro Asp Trp Ile Gly Ile Ala Phe Ala Asn Lys Met
                325                 330                 335

Gln Leu Leu Arg Val
            340


<210> SEQ ID NO 169
<211> LENGTH: 1026
<212> TYPE: DNA
<213> ORGANISM: Thlaspi arvense

<400> SEQUENCE: 169

atggataact cagctccgga ttctttgtcc agatcggaaa ccgccgtcac ctacgattct      60

ccttacccac tctacgccat ggccttctct tccatcggta ctccctccgg ccaccgaatc     120

gccgtcggaa gcttcctcga ggattacaac aaccgcatcg acattctctc cttcgattcc     180

gactccatga cggtgaagcc tctcccgaat ctctccttcg atcatcctta tcctcccaca     240

aagctgatgt tcagccctcc ctccctccgt cgtccctccg ccggcgatct cctcgcttcc     300

tccggcgatt tcctccgttt atgggagatc agtgaagatt cctccaccgt cgagcctgtc     360

tcggtgctca acaacagcaa gacgagcgag ttctgcgcgc cgttgacctc cttcgactgg     420

aacgacgtcg agccgaaacg cctgggaacc tgcagcatcg acacgacctg cacgatttgg     480

gacatcgaga agtgcgtggt ggagacgcag ctcatagcgc acgataagga ggtccacgac     540

atcgcttggg aagaagctag ggttttcgcg tcggtctccg ccgacggatc cgtcaggatc     600

ttcgatctac gcgacaagga gcattccacc atcatctacg agagtcctca gcccgatacg     660

cctctcctaa gactcgcctg gaacaaacaa gacctgaggt acatggcgac gatcctgatg     720

gattcgaata aggtcgtgat tctcgacatt cgctcgccga cgatgcctgt cgccgagctc     780

gaacggcacc aggctagcgt caacgccata gcttgggctc cacagagctg caaacacatc     840

tgctctgctg gtgacgacac gcaggctctc atctgggagc tcccgactgt agctggaccc     900

aacggcattg atccgatgtc ggtttactca gccggctcgg agataaacca gttgcagtgg     960
```

```
tcctcttcac agcctgattg gattggcatc gctttcgcta acaaaatgca gctccttaga   1020

gtttga                                                              1026


<210> SEQ ID NO 170
<211> LENGTH: 341
<212> TYPE: PRT
<213> ORGANISM: Thlaspi arvense

<400> SEQUENCE: 170

Met Asp Asn Ser Ala Pro Asp Ser Leu Ser Arg Ser Glu Thr Ala Val
1               5                   10                  15

Thr Tyr Asp Ser Pro Tyr Pro Leu Tyr Ala Met Ala Phe Ser Ser Ile
            20                  25                  30

Gly Thr Pro Ser Gly His Arg Ile Ala Val Gly Ser Phe Leu Glu Asp
        35                  40                  45

Tyr Asn Asn Arg Ile Asp Ile Leu Ser Phe Asp Ser Asp Ser Met Thr
    50                  55                  60

Val Lys Pro Leu Pro Asn Leu Ser Phe Asp His Pro Tyr Pro Pro Thr
65                  70                  75                  80

Lys Leu Met Phe Ser Pro Pro Ser Leu Arg Arg Pro Ser Ala Gly Asp
                85                  90                  95

Leu Leu Ala Ser Ser Gly Asp Phe Leu Arg Leu Trp Glu Ile Ser Glu
            100                 105                 110

Asp Ser Ser Thr Val Glu Pro Val Ser Val Leu Asn Asn Ser Lys Thr
        115                 120                 125

Ser Glu Phe Cys Ala Pro Leu Thr Ser Phe Asp Trp Asn Asp Val Glu
    130                 135                 140

Pro Lys Arg Leu Gly Thr Cys Ser Ile Asp Thr Thr Cys Thr Ile Trp
145                 150                 155                 160

Asp Ile Glu Lys Cys Val Val Glu Thr Gln Leu Ile Ala His Asp Lys
                165                 170                 175

Glu Val His Asp Ile Ala Trp Glu Glu Ala Arg Val Phe Ala Ser Val
            180                 185                 190

Ser Ala Asp Gly Ser Val Arg Ile Phe Asp Leu Arg Asp Lys Glu His
        195                 200                 205

Ser Thr Ile Ile Tyr Glu Ser Pro Gln Pro Asp Thr Pro Leu Leu Arg
    210                 215                 220

Leu Ala Trp Asn Lys Gln Asp Leu Arg Tyr Met Ala Thr Ile Leu Met
225                 230                 235                 240

Asp Ser Asn Lys Val Val Ile Leu Asp Ile Arg Ser Pro Thr Met Pro
                245                 250                 255

Val Ala Glu Leu Glu Arg His Gln Ala Ser Val Asn Ala Ile Ala Trp
            260                 265                 270

Ala Pro Gln Ser Cys Lys His Ile Cys Ser Ala Gly Asp Asp Thr Gln
        275                 280                 285

Ala Leu Ile Trp Glu Leu Pro Thr Val Ala Gly Pro Asn Gly Ile Asp
    290                 295                 300

Pro Met Ser Val Tyr Ser Ala Gly Ser Glu Ile Asn Gln Leu Gln Trp
305                 310                 315                 320

Ser Ser Ser Gln Pro Asp Trp Ile Gly Ile Ala Phe Ala Asn Lys Met
                325                 330                 335

Gln Leu Leu Arg Val
            340
```

<210> SEQ ID NO 171
<211> LENGTH: 1917
<212> TYPE: DNA
<213> ORGANISM: Thlaspi arvense

<400> SEQUENCE: 171
atgatggatg gaatggttac tgaacaaaac agaatatctg ttccggagaa tctgaaaaaa 60
cagctcgcag tttcagttcg aagaattcaa tggagttacg caatcttctg gtctatttct 120
gcttctcagc ctggagtgtt agaatgggga gatggatact ataatggaga tatcaaaacg 180
aggaagacga ttctagcatc ggagatcaaa gctgatcagc ttggtttacg aaggagcgag 240
caacttaggg agctttacga gtctctttct gtcgctgaat cttcttcctc cggcgtcgcc 300
gccggatctc aggtcactag acgagcttct gccgccgcac tctcgccgga agatctcgcc 360
gacacagagt ggtactactt ggtttgtatg tctttcgtct tcaacatcgg tgaaggaatg 420
cctggacgaa cgtttgcgaa cagtgaaccg atatggttgt gcaacgctca caccgcagat 480
agtaaagtct ttagccgctc tcttctggca aaaagtgctt cggttgtgac agtgatttgc 540
ttcccgtttc ttggaggagt cgttgagatc ggtactacag aacatatcat agaggacatg 600
aatgtaatac aatgcgtgaa gacatcattc ctcgaagctc cagatccata cgcttcactg 660
ttaccaacaa gatccgatta tcacatcgac aacgttctcg atccgcaaca gatcctaggt 720
gacgagattt acgcgcctat gtttggtact gagacttttc cggcgacttc tcctagcaga 780
actaccagca ggttcgatcc tgaacacgag caagtagcag aagatcatga ctcgttcatg 840
gccgaaggaa tcaatggagg agcttctcag gttcaaagct ggcagttcat ggacgaagag 900
cttagtaact gcgttcacca atcgcttaat tccagtgatt gcgtctctca aacgtttgtt 960
aaagcagcgg ctggacgagt ttcttgcaac gcaagaaaag gaagggctca aaggttaggg 1020
catattcaag agcggcagag aaatgtgaaa atgttgtctt ttgatccaag aaacgatgac 1080
gttcattacc aaagtgtgat ctccacaatt tttaagacca accatcagtt aattctcgga 1140
ccgcagttcc ggaattgcga taagcggtca agcttcacga ggtggaagaa attatcgtca 1200
tcatcatctg gaaccgcgtc aatcgtatca ccgtcacaag gaatgttaaa gaagattctt 1260
ttcgaggttc ctcgagtgca ccagaaagag aagttgttgt tggattcacc agggatcggg 1320
gatgaaacca cgaaccacgc ggttttagag aagaaacggc gtgagaaatt gaacgaacgg 1380
ttcatgatct tgagatcaat cattccatca atcaataaga tcgataaagt atcaattctt 1440
gacgatacga tagagtatct tcaagaactg gaaagacgtg ttcaagaact agaatcttgc 1500
agagaatcaa ccgatacaga aacacgtggg acaatgacag tgaagaggaa gaaatctcac 1560
gacgcagggg aaagaacttc agccaactgc acaaacaatg aaaccggaaa cgggaagaga 1620
gttcaggttg gagaaaccga gccggcagag accgattata ccggtttaac tgataattta 1680
aggatcggtt cgtttggtaa tgaggtcgtt attgagctta gatgtgcttg gagagaagga 1740
gtattgcttg agataatgga tgtcattagt gatctcaact tagattctca ttcggtacaa 1800
tcctcgacag gagatggttt actctgctta accgtcaact gcaagcacaa gggttcaaaa 1860
atgacgacaa caggaatgat caaagaggca cttcaaaagg ttgcatggat ctgttga 1917

<210> SEQ ID NO 172
<211> LENGTH: 638
<212> TYPE: PRT
<213> ORGANISM: Thlaspi arvense

<400> SEQUENCE: 172

```
Met Met Asp Gly Met Val Thr Glu Gln Asn Arg Ile Ser Val Pro Glu
1               5                   10                  15

Asn Leu Lys Lys Gln Leu Ala Val Ser Val Arg Arg Ile Gln Trp Ser
            20                  25                  30

Tyr Ala Ile Phe Trp Ser Ile Ser Ala Ser Gln Pro Gly Val Leu Glu
        35                  40                  45

Trp Gly Asp Gly Tyr Tyr Asn Gly Asp Ile Lys Thr Arg Lys Thr Ile
    50                  55                  60

Leu Ala Ser Glu Ile Lys Ala Asp Gln Leu Gly Leu Arg Arg Ser Glu
65                  70                  75                  80

Gln Leu Arg Glu Leu Tyr Glu Ser Leu Ser Val Ala Glu Ser Ser Ser
                85                  90                  95

Ser Gly Val Ala Ala Gly Ser Gln Val Thr Arg Arg Ala Ser Ala Ala
            100                 105                 110

Ala Leu Ser Pro Glu Asp Leu Ala Asp Thr Glu Trp Tyr Tyr Leu Val
        115                 120                 125

Cys Met Ser Phe Val Phe Asn Ile Gly Glu Gly Met Pro Gly Arg Thr
    130                 135                 140

Phe Ala Asn Ser Glu Pro Ile Trp Leu Cys Asn Ala His Thr Ala Asp
145                 150                 155                 160

Ser Lys Val Phe Ser Arg Ser Leu Leu Ala Lys Ser Ala Ser Val Val
                165                 170                 175

Thr Val Ile Cys Phe Pro Phe Leu Gly Gly Val Val Glu Ile Gly Thr
            180                 185                 190

Thr Glu His Ile Ile Glu Asp Met Asn Val Ile Gln Cys Val Lys Thr
        195                 200                 205

Ser Phe Leu Glu Ala Pro Asp Pro Tyr Ala Ser Leu Leu Pro Thr Arg
    210                 215                 220

Ser Asp Tyr His Ile Asp Asn Val Leu Asp Pro Gln Gln Ile Leu Gly
225                 230                 235                 240

Asp Glu Ile Tyr Ala Pro Met Phe Gly Thr Glu Thr Phe Pro Ala Thr
                245                 250                 255

Ser Pro Ser Arg Thr Thr Ser Arg Phe Asp Pro Glu His Glu Gln Val
            260                 265                 270

Ala Glu Asp His Asp Ser Phe Met Ala Glu Gly Ile Asn Gly Gly Ala
        275                 280                 285

Ser Gln Val Gln Ser Trp Gln Phe Met Asp Glu Glu Leu Ser Asn Cys
    290                 295                 300

Val His Gln Ser Leu Asn Ser Ser Asp Cys Val Ser Gln Thr Phe Val
305                 310                 315                 320

Lys Ala Ala Ala Gly Arg Val Ser Cys Asn Ala Arg Lys Gly Arg Ala
                325                 330                 335

Gln Arg Leu Gly His Ile Gln Glu Arg Gln Arg Asn Val Lys Met Leu
            340                 345                 350

Ser Phe Asp Pro Arg Asn Asp Asp Val His Tyr Gln Ser Val Ile Ser
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
```

```
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asp Asn Leu
545                 550                 555                 560

Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635
```

```
<210> SEQ ID NO 173
<211> LENGTH: 3577
<212> TYPE: DNA
<213> ORGANISM: Thlaspi arvense

<400> SEQUENCE: 173

atgatgtaaa gagttgcagg tttttctttt cttttttgt ttgctataat tttaacccca      60

aaaaaaaaac tcactttttc taaatcagga caaaaatgaa attgatcctt ttgttttctt     120

tttccatttt gtatggtttc atgaaaattt agggatggaa tggttactga acaaaacaga     180

atatctgttc cggagaatct gaaaaaacag ctcgcagttt cagttcgaag aattcaatgg     240

agttacgcaa tcttctggtc tatttctgct tctcagcctg ggtgagtttc ttaatcacta     300

tccttgaaac tgatcagttt tgttattttt gaaggttcaa atctctacta gggggaaaaa     360

aatgaatttc gaattttcat tgctaaagcc tttgtctgaa gctagaagtg cttttggttc     420

tgccttaaaa attattaaaa ctttgataaa aagattactg atttaatttg ggaaattttg     480

atttattctg cttctaagtt ccatcaatga agttcttcaa ctcaagacaa tgttctaagt     540

cgatttgagt tttaggttga tactgtctta gagattatta gaaattttat aagtggaaat     600

agtgagacct tattagttac aaaaaaaact caaaacaaag attaattatg gttttttttt     660

tcttaaaatt caattttctt ttgtcttttt tttgtgtgtg gataattcgg gccggaaacc     720

gattaatctc agagtgtgca agttcgttgg gttcttgaag ttcttcatta gtttcttact     780

gattcgattc gatttttgt tttttattgt ttgaaccaaa agagtgttag aatggggaga      840

tggatactat aatggagata tcaaaacgag gaagacgatt ctagcatcgg agatcaaagc     900
```

tgatcagctt ggtttacgaa ggagcgagca acttagggag ctttacgagt ctctttctgt 960
cgctgaatct tcttcctccg gcgtcgccgc cggatctcag gtcactagac gagcttctgc 1020
cgccgcactc tcgccggaag atctcgccga cacagagtgg tactacttgg tttgtatgtc 1080
tttcgtcttc aacatcggtg aagggtaatt gcgtctattt atctttcggc attgacattt 1140
actatgtgcg tcgtcatgtt cggattgatc ttgtcagtga aataaataaa aaaaagacaa 1200
aataccctttt tattacatgt atgtctggat attagacttt ttggtaaaaa actaaaaagt 1260
tttaactaga aaccaaaaat tattattttc cacaatcgtt tgaaatttct tttttttttc 1320
ttttttttt ggtttggttt ggttcagttt agggtttttt tggattttca gatttttagg 1380
tcctggagaa aagaagtcca agatcggttt ggttaagtca aattttaaaa tgatttggat 1440
aattggtctt ggtttggttt ttaattaaaa attaatcaaa atgaaaatat ataattagat 1500
ttaatcatta ttataaattt tgtaaatgct taatgaaatg aatttcgatt tattcagttc 1560
tgttacacca aatatgcgtt tggttttgct ttttatgcat ggcatttccg tcttttcacg 1620
tatctagcta ttcattcaca gaatgcctgg acgaacgttt gcgaacagtg aaccgatatg 1680
gttgtgcaac gctcacaccg cagatagtaa agtctttagc cgctctcttc tggcaaaagt 1740
tagttgtatt atattgtagt tgctatataa catttctttt tttgcgactg caaacgctta 1800
aattaatcgt tttttttgtg tgtttgtgtg ttttgtgcct gtttagagtg cttcggttgt 1860
gacagtgatt tgcttcccgt ttcttggagg agtcgttgag atcggtacta cagaacatgt 1920
aaggcaaaat ttccattttc tgtcacaatt tgagaatagt tataaaacaa ccactagtta 1980
agtttataac agtgcgaact aattcatcag accgacgaat taaggtataa agttatgata 2040
caaaaagttt aaagacttat cttgttgtgt gttttatccc gtagatcata gaggacatga 2100
atgtaataca atgcgtgaag acatcattcc tcgaagctcc agatccatac gcttcactgt 2160
taccaacaag atccgattat cacatcgaca acgttctcga tccgcaacag atcctaggtg 2220
acgagattta cgcgcctatg tttggtactg agacttttcc ggcgacttct cctagcagaa 2280
ctaccagcag gttcgatcct gaacacgagc aagtagcaga agatcatgac tcgttcatgg 2340
ccgaaggaat caatggagga gcttctcagg ttcaaagctg gcagttcatg gacgaagagc 2400
ttagtaactg cgttcaccaa tcgcttaatt ccagtgattg cgtctctcaa acgtttgtta 2460
aagcagcggc tggacgagtt tcttgcaacg caagaaaagg aagggctcaa aggttagggc 2520
atattcaaga gcggcagaga aatgtgaaaa tgttgtcttt tgatccaaga aacgatgacg 2580
ttcattacca aagtgtgatc tccacaattt ttaagaccaa ccatcagtta attctcggac 2640
cgcagttccg gaattgcgat aagcggtcaa gcttcacgag gtggaagaaa ttatcgtcat 2700
catcatctgg aaccgcgtca atcgtatcac cgtcacaagg aatgttaaag aagattcttt 2760
tcgaggttcc tcgagtgcac cagaaagaga agttgttgtt ggattcacca gggatcgggg 2820
atgaaaccac gaaccacgcg gttttagaga agaaacggcg tgagaaattg aacgaacggt 2880
tcatgatctt gagatcaatc attccatcaa tcaataaggt atatataacc gaatcttcaa 2940
aaattcaaat tcatattatg taaccagagt taactaattc taggtttgac attttcaata 3000
gatcgataaa gtatcaattc ttgacgatac gatagagtat cttcaagaac tggaaagacg 3060
tgttcaagaa ctagaatctt gcagagaatc aaccgataca gaaacacgtg ggacaatgac 3120
agtgaagagg aagaaatctc acgacgcagg ggaaagaact tcagccaact gcacaaacaa 3180
tgaaaccgga aacgggaaga gagttcaggt tggagaaacc gagccggcag agaccgatta 3240
taccggttta actgataatt taaggatcgg ttcgtttggt aatgaggtcg ttattgagct 3300

```
tagatgtgct tggagagaag gagtattgct tgagataatg gatgtcatta gtgatctcaa   3360
cttagattct cattcggtac aatcctcgac aggagatggt ttactctgct taaccgtcaa   3420
ctgcaaggta cagcctttaa cctaattttt gcttaaccgg gataaggtta acatggattg   3480
atatattgtg aaatgttggt ttcagcacaa gggttcaaaa atgacgacaa caggaatgat   3540
caaagaggca cttcaaaagg ttgcatggat ctgttga                            3577
```

<210> SEQ ID NO 174
<211> LENGTH: 1917
<212> TYPE: DNA
<213> ORGANISM: Thlaspi arvense

<400> SEQUENCE: 174

```
atgatggatg gaatggttac tgaacaaaac agaatatctg ttccggagaa tctgaaaaaa     60
cagctcgcag tttcagttcg aagaattcaa tggagttacg caatcttctg gtctatttct    120
gcttctcagc ctggagtgtt agaatgggga gatggatact ataatggaga tatcaaaacg    180
aggaagacga ttctagcatc ggagatcaaa gctgatcagc ttggtttacg aaggagcgag    240
caacttagga agctttacga gtctctttct gtcgctgaat cttcttcctc cggcgtcgcc    300
gccggatctc aggtcactag acgagcttct gccgccgcac tctcgccgga agatctcgcc    360
gacacagagt ggtactactt ggtttgtatg tctttcgtct tcaacatcgg tgaaggaatg    420
cctggacgaa cgtttgcgaa cagtgaaccg atatggttgt gcaacgctca caccgcagat    480
agtaaagtct ttagccgctc tcttctggca aaaagtgctt cggttgtgac agtgatttgc    540
ttcccgtttc ttggaggagt cgttgagatc ggtactacag aacatatcat agaggacatg    600
aatgtaatac aatgcgtgaa gacatcattc ctcgaagctc cagatccata cgcttcactg    660
ttaccaacaa gatccgatta tcacatcgac aacgttctcg atccgcaaca gatcctaggt    720
gacgagattt acgcgcctat gtttggtact gagacttttc cggcgacttc tcctagcaga    780
actaccagca ggttcgatcc tgaacacgag caagtagcag aagatcatga ctcgttcatg    840
gccgaaggaa tcaatggagg agcttctcag gttcaaagct ggcagttcat ggacgaagag    900
cttagtaact gcgttcacca atcgcttaat tccagtgatt gcgtctctca aacgtttgtt    960
aaagcagcgg ctggacgagt ttcttgcaac gcaagaaaag gaagggctca aaggttaggg   1020
catattcaag agcggcagag aaatgtgaaa atgttgtctt ttgatccaag aaacgatgac   1080
gttcattacc aaagtgtgat ctccacaatt tttaagacca accatcagtt aattctcgga   1140
ccgcagttcc ggaattgcga taagcggtca agcttcacga ggtggaagaa attatcgtca   1200
tcatcatctg gaaccgcgtc aatcgtatca ccgtcacaag gaatgttaaa gaagattctt   1260
ttcgaggttc ctcgagtgca ccagaaagag aagttgttgt tggattcacc agggatcggg   1320
gatgaaacca cgaaccacgc ggttttagag aagaaacggc gtgagaaatt gaacgaacgg   1380
ttcatgatct tgagatcaat cattccatca atcaataaga tcgataaagt atcaattctt   1440
gacgatacga tagagtatct tcaagaactg gaaagacgtg ttcaagaact agaatcttgc   1500
agagaatcaa ccgatacaga aacacgtggg acaatgacag tgaagaggaa gaaatctcac   1560
gacgcagggg aaagaacttc agccaactgc acaaacaatg aaaccggaaa cgggaagaga   1620
gttcaggttg gagaaaccga gccggcagag accgattata ccggtttaac tgataattta   1680
aggatcggtt cgtttggtaa tgaggtcgtt attgagctta gatgtgcttg gagagaagga   1740
gtattgcttg agataatgga tgtcattagt gatctcaact tagattctca ttcggtacaa   1800
```

tcctcgacag gagatggttt actctgctta accgtcaact gcaagcacaa gggttcaaaa 1860
atgacgacaa caggaatgat caaagaggca cttcaaaagg ttgcatggat ctgttga 1917

<210> SEQ ID NO 175
<211> LENGTH: 638
<212> TYPE: PRT
<213> ORGANISM: Thlaspi arvense

<400> SEQUENCE: 175

Met Met Asp Gly Met Val Thr Glu Gln Asn Arg Ile Ser Val Pro Glu
1 5 10 15

Asn Leu Lys Lys Gln Leu Ala Val Ser Val Arg Arg Ile Gln Trp Ser
20 25 30

Tyr Ala Ile Phe Trp Ser Ile Ser Ala Ser Gln Pro Gly Val Leu Glu
35 40 45

Trp Gly Asp Gly Tyr Tyr Asn Gly Asp Ile Lys Thr Arg Lys Thr Ile
50 55 60

Leu Ala Ser Glu Ile Lys Ala Asp Gln Leu Gly Leu Arg Arg Ser Glu
65 70 75 80

Gln Leu Arg Lys Leu Tyr Glu Ser Leu Ser Val Ala Glu Ser Ser Ser
85 90 95

Ser Gly Val Ala Ala Gly Ser Gln Val Thr Arg Arg Ala Ser Ala Ala
100 105 110

Ala Leu Ser Pro Glu Asp Leu Ala Asp Thr Glu Trp Tyr Tyr Leu Val
115 120 125

Cys Met Ser Phe Val Phe Asn Ile Gly Glu Gly Met Pro Gly Arg Thr
130 135 140

Phe Ala Asn Ser Glu Pro Ile Trp Leu Cys Asn Ala His Thr Ala Asp
145 150 155 160

Ser Lys Val Phe Ser Arg Ser Leu Leu Ala Lys Ser Ala Ser Val Val
165 170 175

Thr Val Ile Cys Phe Pro Phe Leu Gly Gly Val Val Glu Ile Gly Thr
180 185 190

Thr Glu His Ile Ile Glu Asp Met Asn Val Ile Gln Cys Val Lys Thr
195 200 205

Ser Phe Leu Glu Ala Pro Asp Pro Tyr Ala Ser Leu Leu Pro Thr Arg
210 215 220

Ser Asp Tyr His Ile Asp Asn Val Leu Asp Pro Gln Gln Ile Leu Gly
225 230 235 240

Asp Glu Ile Tyr Ala Pro Met Phe Gly Thr Glu Thr Phe Pro Ala Thr
245 250 255

Ser Pro Ser Arg Thr Thr Ser Arg Phe Asp Pro Glu His Glu Gln Val
260 265 270

Ala Glu Asp His Asp Ser Phe Met Ala Glu Gly Ile Asn Gly Gly Ala
275 280 285

Ser Gln Val Gln Ser Trp Gln Phe Met Asp Glu Glu Leu Ser Asn Cys
290 295 300

Val His Gln Ser Leu Asn Ser Ser Asp Cys Val Ser Gln Thr Phe Val
305 310 315 320

Lys Ala Ala Ala Gly Arg Val Ser Cys Asn Ala Arg Lys Gly Arg Ala
325 330 335

Gln Arg Leu Gly His Ile Gln Glu Arg Gln Arg Asn Val Lys Met Leu
340 345 350

Ser Phe Asp Pro Arg Asn Asp Asp Val His Tyr Gln Ser Val Ile Ser

```
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asp Asn Leu
545                 550                 555                 560

Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635
```

<210> SEQ ID NO 176
<211> LENGTH: 1917
<212> TYPE: DNA
<213> ORGANISM: Thlaspi arvense

<400> SEQUENCE: 176

```
atgatggatg gaatggttac tgaacaaaac agaatatctg ttccggagaa tctgaaaaaa      60

cagctcgcag tttcagttcg aagaattcaa tggagttacg caatcttctg gtctatttct     120

gcttctcagc ctggagtgtt agaatgggga gatggatact ataatggaga tatcaaaacg     180

aggaagacga ttctagcatc ggagatcaaa gctgatcagc ttggtttacg aaggagcgag     240

caacttaggg agctttacga gtctctttct gtcgctgaat cttcttcctc cggcgtcgcc     300

gccggatctc aggtcactag acgagcttct gccgccgcac tctcgccgga agatctcgcc     360

gacacaaagt ggtactactt ggtttgtatg tctttcgtct tcaacatcgg tgaaggaatg     420

cctggacgaa cgtttgcgaa cagtgaaccg atatggttgt gcaacgctca caccgcagat     480

agtaaagtct ttagccgctc tcttctggca aaaagtgctt cggttgtgac agtgatttgc     540
```

```
ttcccgtttc ttggaggagt cgttgagatc ggtactacag aacatatcat agaggacatg    600

aatgtaatac aatgcgtgaa gacatcattc ctcgaagctc cagatccata cgcttcactg    660

ttaccaacaa gatccgatta tcacatcgac aacgttctcg atccgcaaca gatcctaggt    720

gacgagattt acgcgcctat gtttggtact gagacttttc cggcgacttc tcctagcaga    780

actaccagca ggttcgatcc tgaacacgag caagtagcag aagatcatga ctcgttcatg    840

gccgaaggaa tcaatggagg agcttctcag gttcaaagct ggcagttcat ggacgaagag    900

cttagtaact gcgttcacca atcgcttaat tccagtgatt gcgtctctca aacgtttgtt    960

aaagcagcgg ctggacgagt ttcttgcaac gcaagaaaag gaagggctca aaggttaggg   1020

catattcaag agcggcagag aaatgtgaaa atgttgtctt ttgatccaag aaacgatgac   1080

gttcattacc aaagtgtgat ctccacaatt tttaagacca accatcagtt aattctcgga   1140

ccgcagttcc ggaattgcga taagcggtca agcttcacga ggtggaagaa attatcgtca   1200

tcatcatctg gaaccgcgtc aatcgtatca ccgtcacaag gaatgttaaa gaagattctt   1260

ttcgaggttc ctcgagtgca ccagaaagag aagttgttgt tggattcacc agggatcggg   1320

gatgaaacca cgaaccacgc ggttttagag aagaaacggc gtgagaaatt gaacgaacgg   1380

ttcatgatct tgagatcaat cattccatca atcaataaga tcgataaagt atcaattctt   1440

gacgatacga tagagtatct tcaagaactg gaaagacgtg ttcaagaact agaatcttgc   1500

agagaatcaa ccgatacaga aacacgtggg acaatgacag tgaagaggaa gaaatctcac   1560

gacgcagggg aaagaacttc agccaactgc acaaacaatg aaaccggaaa cgggaagaga   1620

gttcaggttg gagaaaccga gccggcagag accgattata ccggtttaac tgataattta   1680

aggatcggtt cgtttggtaa tgaggtcgtt attgagctta gatgtgcttg gagagaagga   1740

gtattgcttg agataatgga tgtcattagt gatctcaact tagattctca ttcggtacaa   1800

tcctcgacag gagatggttt actctgctta accgtcaact gcaagcacaa gggttcaaaa   1860

atgacgacaa caggaatgat caaagaggca cttcaaaagg ttgcatggat ctgttga      1917
```

<210> SEQ ID NO 177
<211> LENGTH: 638
<212> TYPE: PRT
<213> ORGANISM: Thlaspi arvense

<400> SEQUENCE: 177

```
Met Met Asp Gly Met Val Thr Glu Gln Asn Arg Ile Ser Val Pro Glu
1               5                   10                  15

Asn Leu Lys Lys Gln Leu Ala Val Ser Val Arg Arg Ile Gln Trp Ser
            20                  25                  30

Tyr Ala Ile Phe Trp Ser Ile Ser Ala Ser Gln Pro Gly Val Leu Glu
        35                  40                  45

Trp Gly Asp Gly Tyr Tyr Asn Gly Asp Ile Lys Thr Arg Lys Thr Ile
    50                  55                  60

Leu Ala Ser Glu Ile Lys Ala Asp Gln Leu Gly Leu Arg Arg Ser Glu
65                  70                  75                  80

Gln Leu Arg Glu Leu Tyr Glu Ser Leu Ser Val Ala Glu Ser Ser Ser
                85                  90                  95

Ser Gly Val Ala Ala Gly Ser Gln Val Thr Arg Arg Ala Ser Ala Ala
            100                 105                 110

Ala Leu Ser Pro Glu Asp Leu Ala Asp Thr Lys Trp Tyr Tyr Leu Val
        115                 120                 125

Cys Met Ser Phe Val Phe Asn Ile Gly Glu Gly Met Pro Gly Arg Thr
```

```
    130                 135                 140

Phe Ala Asn Ser Glu Pro Ile Trp Leu Cys Asn Ala His Thr Ala Asp
145                 150                 155                 160

Ser Lys Val Phe Ser Arg Ser Leu Leu Ala Lys Ser Ala Ser Val Val
                165                 170                 175

Thr Val Ile Cys Phe Pro Phe Leu Gly Gly Val Val Glu Ile Gly Thr
            180                 185                 190

Thr Glu His Ile Ile Glu Asp Met Asn Val Ile Gln Cys Val Lys Thr
        195                 200                 205

Ser Phe Leu Glu Ala Pro Asp Pro Tyr Ala Ser Leu Leu Pro Thr Arg
    210                 215                 220

Ser Asp Tyr His Ile Asp Asn Val Leu Asp Pro Gln Gln Ile Leu Gly
225                 230                 235                 240

Asp Glu Ile Tyr Ala Pro Met Phe Gly Thr Glu Thr Phe Pro Ala Thr
                245                 250                 255

Ser Pro Ser Arg Thr Thr Ser Arg Phe Asp Pro Glu His Glu Gln Val
            260                 265                 270

Ala Glu Asp His Asp Ser Phe Met Ala Glu Gly Ile Asn Gly Gly Ala
        275                 280                 285

Ser Gln Val Gln Ser Trp Gln Phe Met Asp Glu Glu Leu Ser Asn Cys
    290                 295                 300

Val His Gln Ser Leu Asn Ser Ser Asp Cys Val Ser Gln Thr Phe Val
305                 310                 315                 320

Lys Ala Ala Ala Gly Arg Val Ser Cys Asn Ala Arg Lys Gly Arg Ala
                325                 330                 335

Gln Arg Leu Gly His Ile Gln Glu Arg Gln Arg Asn Val Lys Met Leu
            340                 345                 350

Ser Phe Asp Pro Arg Asn Asp Asp Val His Tyr Gln Ser Val Ile Ser
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asp Asn Leu
545                 550                 555                 560
```

```
Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635


<210> SEQ ID NO 178
<211> LENGTH: 1917
<212> TYPE: DNA
<213> ORGANISM: Thlaspi arvense

<400> SEQUENCE: 178

atgatggatg gaatggttac tgaacaaaac agaatatctg ttccggagaa tctgaaaaaa      60

cagctcgcag tttcagttcg aagaattcaa tggagttacg caatcttctg gtctatttct     120

gcttctcagc ctggagtgtt agaatgggga gatggatact ataatggaga tatcaaaacg     180

aggaagacga ttctagcatc ggagatcaaa gctgatcagc ttggtttacg aaggagcgag     240

caacttaggg agctttacga gtctctttct gtcgctgaat cttcttcctc cggcgtcgcc     300

gccggatctc aggtcactag acgagcttct gccgccgcac tctcgccgga agatctcgcc     360

gacacagagt ggtactactt ggtttgtatg tctttcgtct tcaacatcgg tgaaggaatg     420

cctggacgaa cgtttgcgaa cagtgaaccg atatggttgt gcaacgctca caccgcagat     480

agtaaagtct ttagccgctc tcttctggca aaaagtgctt cggttgtgac agtgatttgc     540

ttcccgtttc ttggaggagt cgttgagatc ggtactacag aacatatcat agaggacatg     600

aatgtaatac aatgcgtgaa gacatcattc ctcgaagctc cagatccata cgcttcactg     660

ttaccaacaa gatccgatta tcacatcgac aacgttctcg atccgcaaca gatcctaggt     720

gacgagattt acgcgcctat gtttggtact gagacttttc cggcgacttc tcctagcaga     780

actaccagca ggttcgatcc tgaacacgag caagtagcag aagatcatga ctcgttcatg     840

gccgaaggaa tcaatggagg agcttctcag gttcaaagct ggcagttcat ggacgaagag     900

cttagtaact gcgttcacca atcgcttaat tccagtgatt gcgtctctca aacgtttgtt     960

aaagcagcgg ctggacgagt ttcttgcaac gcaagaaaag gaagggctca aaggttaggg    1020

catattcaag agcggcagag aaatgtgaaa atgttgtctt ttgatccaag aaacgatgac    1080

gttcattacc aaagtgtgat ctccacaatt tttaagacca accatcagtt aattctcgga    1140

ccgcagttcc ggaattgcga taagcggtca agcttcacga ggtggaagaa attatcgtca    1200

tcatcatctg gaaccgcgtc aatcgtatca ccgtcacaag gaatgttaaa gaagattctt    1260

ttcgaggttc ctcgagtgca ccagaaagag aagttgttgt tggattcacc agggatcggg    1320

gatgaaacca cgaaccacgc ggttttagag aagaaacggc gtgagaaatt gaacgaacgg    1380

ttcatgatct tgagatcaat cattccatca atcaataaga tcgataaagt atcaattctt    1440

gacgatacga tagagtatct tcaagaactg gaaagacgtg ttcaagaact agaatcttgc    1500

agagaatcaa ccgatacaga aacacgtggg acaatgacag tgaagaggaa gaaatctcac    1560

gacgcagggg aaagaacttc agccaactgc acaaacaatg aaaccggaaa cgggaagaga    1620

gttcaggttg gagaaaccga gccggcagag accgattata ccggtttaac taataattta    1680
```

```
aggatcggtt cgtttggtaa tgaggtcgtt attgagctta gatgtgcttg gagagaagga   1740

gtattgcttg agataatgga tgtcattagt gatctcaact tagattctca ttcggtacaa   1800

tcctcgacag gagatggttt actctgctta accgtcaact gcaagcacaa gggttcaaaa   1860

atgacgacaa caggaatgat caaagaggca cttcaaaagg ttgcatggat ctgttga      1917
```

```
<210> SEQ ID NO 179
<211> LENGTH: 638
<212> TYPE: PRT
<213> ORGANISM: Thlaspi arvense

<400> SEQUENCE: 179

Met Met Asp Gly Met Val Thr Glu Gln Asn Arg Ile Ser Val Pro Glu
1               5                   10                  15

Asn Leu Lys Lys Gln Leu Ala Val Ser Val Arg Arg Ile Gln Trp Ser
            20                  25                  30

Tyr Ala Ile Phe Trp Ser Ile Ser Ala Ser Gln Pro Gly Val Leu Glu
        35                  40                  45

Trp Gly Asp Gly Tyr Tyr Asn Gly Asp Ile Lys Thr Arg Lys Thr Ile
    50                  55                  60

Leu Ala Ser Glu Ile Lys Ala Asp Gln Leu Gly Leu Arg Arg Ser Glu
65                  70                  75                  80

Gln Leu Arg Glu Leu Tyr Glu Ser Leu Ser Val Ala Glu Ser Ser Ser
                85                  90                  95

Ser Gly Val Ala Ala Gly Ser Gln Val Thr Arg Arg Ala Ser Ala Ala
            100                 105                 110

Ala Leu Ser Pro Glu Asp Leu Ala Asp Thr Glu Trp Tyr Tyr Leu Val
        115                 120                 125

Cys Met Ser Phe Val Phe Asn Ile Gly Glu Gly Met Pro Gly Arg Thr
    130                 135                 140

Phe Ala Asn Ser Glu Pro Ile Trp Leu Cys Asn Ala His Thr Ala Asp
145                 150                 155                 160

Ser Lys Val Phe Ser Arg Ser Leu Leu Ala Lys Ser Ala Ser Val Val
                165                 170                 175

Thr Val Ile Cys Phe Pro Phe Leu Gly Gly Val Val Glu Ile Gly Thr
            180                 185                 190

Thr Glu His Ile Ile Glu Asp Met Asn Val Ile Gln Cys Val Lys Thr
        195                 200                 205

Ser Phe Leu Glu Ala Pro Asp Pro Tyr Ala Ser Leu Leu Pro Thr Arg
    210                 215                 220

Ser Asp Tyr His Ile Asp Asn Val Leu Asp Pro Gln Gln Ile Leu Gly
225                 230                 235                 240

Asp Glu Ile Tyr Ala Pro Met Phe Gly Thr Glu Thr Phe Pro Ala Thr
                245                 250                 255

Ser Pro Ser Arg Thr Thr Ser Arg Phe Asp Pro Glu His Glu Gln Val
            260                 265                 270

Ala Glu Asp His Asp Ser Phe Met Ala Glu Gly Ile Asn Gly Gly Ala
        275                 280                 285

Ser Gln Val Gln Ser Trp Gln Phe Met Asp Glu Glu Leu Ser Asn Cys
    290                 295                 300

Val His Gln Ser Leu Asn Ser Ser Asp Cys Val Ser Gln Thr Phe Val
305                 310                 315                 320

Lys Ala Ala Ala Gly Arg Val Ser Cys Asn Ala Arg Lys Gly Arg Ala
                325                 330                 335
```

```
Gln Arg Leu Gly His Ile Gln Glu Arg Gln Arg Asn Val Lys Met Leu
            340                 345                 350

Ser Phe Asp Pro Arg Asn Asp Asp Val His Tyr Gln Ser Val Ile Ser
        355                 360                 365

Thr Ile Phe Lys Thr Asn His Gln Leu Ile Leu Gly Pro Gln Phe Arg
    370                 375                 380

Asn Cys Asp Lys Arg Ser Ser Phe Thr Arg Trp Lys Lys Leu Ser Ser
385                 390                 395                 400

Ser Ser Ser Gly Thr Ala Ser Ile Val Ser Pro Ser Gln Gly Met Leu
                405                 410                 415

Lys Lys Ile Leu Phe Glu Val Pro Arg Val His Gln Lys Glu Lys Leu
            420                 425                 430

Leu Leu Asp Ser Pro Gly Ile Gly Asp Glu Thr Thr Asn His Ala Val
        435                 440                 445

Leu Glu Lys Lys Arg Arg Glu Lys Leu Asn Glu Arg Phe Met Ile Leu
    450                 455                 460

Arg Ser Ile Ile Pro Ser Ile Asn Lys Ile Asp Lys Val Ser Ile Leu
465                 470                 475                 480

Asp Asp Thr Ile Glu Tyr Leu Gln Glu Leu Glu Arg Arg Val Gln Glu
                485                 490                 495

Leu Glu Ser Cys Arg Glu Ser Thr Asp Thr Glu Thr Arg Gly Thr Met
            500                 505                 510

Thr Val Lys Arg Lys Lys Ser His Asp Ala Gly Glu Arg Thr Ser Ala
        515                 520                 525

Asn Cys Thr Asn Asn Glu Thr Gly Asn Gly Lys Arg Val Gln Val Gly
    530                 535                 540

Glu Thr Glu Pro Ala Glu Thr Asp Tyr Thr Gly Leu Thr Asn Asn Leu
545                 550                 555                 560

Arg Ile Gly Ser Phe Gly Asn Glu Val Val Ile Glu Leu Arg Cys Ala
                565                 570                 575

Trp Arg Glu Gly Val Leu Leu Glu Ile Met Asp Val Ile Ser Asp Leu
            580                 585                 590

Asn Leu Asp Ser His Ser Val Gln Ser Ser Thr Gly Asp Gly Leu Leu
        595                 600                 605

Cys Leu Thr Val Asn Cys Lys His Lys Gly Ser Lys Met Thr Thr Thr
    610                 615                 620

Gly Met Ile Lys Glu Ala Leu Gln Lys Val Ala Trp Ile Cys
625                 630                 635
```

<210> SEQ ID NO 180
<211> LENGTH: 1041
<212> TYPE: DNA
<213> ORGANISM: Thlaspi arvense

<400> SEQUENCE: 180

```
atgacaatct tggatcagac cgttgtaaca accggatcga agaaggcttg tgtcatcggt      60

ggcacaggaa acttagcttc tactctcatc aagcatttgc ttcaaagtgg ctacaaagtt     120

aacactacag ttagagatcc agagaatgag aagaaaatgg ctcacttaag ggtacttcaa     180

gaacttgggg acctcaagat cttcaaggcg gaatttactg atgaagagag tttcgattca     240

ccagtttcgg gctgtgatta cgttttccat gtcgcaacgc ctatcaactt tacatctgaa     300

gatcccgaga aagacatgat caagccaagg atacaaggag tgaccaatgt gttgaaatct     360

tgcttaaaat cgaaatcagt caagcgtgtg atctacactt cttcagctgc tgcggtttcc     420
```

```
atcaacaatc tttctggacc tggacttgtg atgaacgaag aaaactggac tgaccttgat    480
tatctcacaa aggagaagcc gtttaactgg ggctacccag tgtcaaagat actagcagaa    540
aaggcagctt gtaaatttgc ggaagagaac aagatcgatc tagttaccgt gattccggca    600
ctcatatccg gaaaatctct cctctcggat cctcctccga gcagctcatt tctctctatg    660
tctttaatca ccgggaatga aatgtatctg aaaggtctca aggaaatgca gaagcaatct    720
ggctccatct cgttcagcca cgtgaaggat ttggctcgtg cccatttgtt tcttgcggag    780
aaagaaactg cgtctggtcg ttacatttgc tgtacttaca acacaagtgt tccggagatt    840
gcagattttc tcaggcagag atatcctaag tacaatgtgc tgtctgaatt cgaagagtgc    900
ttatcaagtg cgaagctgac gctatcttcg gaaaaactca tcaatgaagg ctttcgattc    960
gaatatggga ttaatgagat ctatgatgag atgatagagc acttcgagtc caaaggatta   1020
atcaaagcta aagaatcttg a                                             1041
```

<210> SEQ ID NO 181
<211> LENGTH: 346
<212> TYPE: PRT
<213> ORGANISM: Thlaspi arvense

<400> SEQUENCE: 181

```
Met Thr Ile Leu Asp Gln Thr Val Val Thr Thr Gly Ser Lys Lys Ala
1               5                   10                  15

Cys Val Ile Gly Gly Thr Gly Asn Leu Ala Ser Thr Leu Ile Lys His
            20                  25                  30

Leu Leu Gln Ser Gly Tyr Lys Val Asn Thr Thr Val Arg Asp Pro Glu
        35                  40                  45

Asn Glu Lys Lys Met Ala His Leu Arg Val Leu Gln Glu Leu Gly Asp
    50                  55                  60

Leu Lys Ile Phe Lys Ala Glu Phe Thr Asp Glu Glu Ser Phe Asp Ser
65                  70                  75                  80

Pro Val Ser Gly Cys Asp Tyr Val Phe His Val Ala Thr Pro Ile Asn
                85                  90                  95

Phe Thr Ser Glu Asp Pro Glu Lys Asp Met Ile Lys Pro Arg Ile Gln
            100                 105                 110

Gly Val Thr Asn Val Leu Lys Ser Cys Leu Lys Ser Lys Ser Val Lys
        115                 120                 125

Arg Val Ile Tyr Thr Ser Ser Ala Ala Ala Val Ser Ile Asn Asn Leu
    130                 135                 140

Ser Gly Pro Gly Leu Val Met Asn Glu Glu Asn Trp Thr Asp Leu Asp
145                 150                 155                 160

Tyr Leu Thr Lys Glu Lys Pro Phe Asn Trp Gly Tyr Pro Val Ser Lys
                165                 170                 175

Ile Leu Ala Glu Lys Ala Ala Cys Lys Phe Ala Glu Glu Asn Lys Ile
            180                 185                 190

Asp Leu Val Thr Val Ile Pro Ala Leu Ile Ser Gly Lys Ser Leu Leu
        195                 200                 205

Ser Asp Pro Pro Pro Ser Ser Ser Phe Leu Ser Met Ser Leu Ile Thr
    210                 215                 220

Gly Asn Glu Met Tyr Leu Lys Gly Leu Lys Glu Met Gln Lys Gln Ser
225                 230                 235                 240

Gly Ser Ile Ser Phe Ser His Val Lys Asp Leu Ala Arg Ala His Leu
                245                 250                 255
```

```
Phe Leu Ala Glu Lys Glu Thr Ala Ser Gly Arg Tyr Ile Cys Cys Thr
            260                 265                 270

Tyr Asn Thr Ser Val Pro Glu Ile Ala Asp Phe Leu Arg Gln Arg Tyr
        275                 280                 285

Pro Lys Tyr Asn Val Leu Ser Glu Phe Glu Glu Cys Leu Ser Ser Ala
    290                 295                 300

Lys Leu Thr Leu Ser Ser Glu Lys Leu Ile Asn Glu Gly Phe Arg Phe
305                 310                 315                 320

Glu Tyr Gly Ile Asn Glu Ile Tyr Asp Glu Met Ile Glu His Phe Glu
                325                 330                 335

Ser Lys Gly Leu Ile Lys Ala Lys Glu Ser
            340                 345


<210> SEQ ID NO 182
<211> LENGTH: 1188
<212> TYPE: DNA
<213> ORGANISM: Thlaspi arvense

<400> SEQUENCE: 182

atggtgatgg gtacacaacc gtcgttggaa gagatcagaa aggcacagag agcggatggc      60

cccgcaggca tcttggggat aggcacggcc aaccctgcga accatgtgat ccaggcagag     120

tatccggact actacttccg catcaccaac agtgagcaca tgactgacct caaggagaag     180

ttcaagcgca tgtgcgacaa gtcgatgata cggaaacggc acatgcacct gacggaggag     240

ttcctgaagg agaatccgga catgtgcgcc tacatggctc cttctcttga tgtgaggcag     300

gacatcgtgg tggtcgaggt ccctaagcta gggaaagagg cggcagtgaa ggccatcaag     360

gagtggggtc agcccaagtc caagatcacc cacgtcgtct tctgcactac atccggagtt     420

gacatgcctg gtgctgacta ccagctcacc aagctcctcg gtcttcgccc ttccgtcaag     480

cgtctcatga tgtaccagca aggttgctac gccggcggca ctgtcctccg actcgccaag     540

gacctcgctg agaataaccg tggtgctcgt gtccttgtcg tctgctccga gatcacagcc     600

gtcaccttcc gtggcccctc tgacacacac ctcgactccc tcgttggtca ggctctcttc     660

agtgacggtg ctgccgcgct cattgttggt gcggaccctg atgcctccgt gggagagaag     720

cctatcttcg agatggtgtc tgctgcacag accatcctcc cagactcgga cggagccata     780

gatggacact tgagggaagt tgggctcacc ttccatctcc tcaaggacgt ccctgggctc     840

atctcgaaga acatagagaa gagtctagaa gaagcgttta aaccgctcgg gataagtgac     900

tggaactctc tcttttggat agctcaccct gaaggtcctg cgatcctgga ccaggttgag     960

ttaaagctag gactcaagga agagaagatg agggccacgc gtcacgtgct gagcgagtac    1020

ggaaacatgt cgagcgcgtg cgttctcttc attatggacg agatgaggag gaagtccaag    1080

gaggatggtg tggccacgac aggagaaggg ttggagtggg gtgtcttgtt tggtttcgga    1140

ccaggtctca ccgtagagac agtcgtcttg cacagcgtcc ctgtttga                  1188


<210> SEQ ID NO 183
<211> LENGTH: 395
<212> TYPE: PRT
<213> ORGANISM: Thlaspi arvense

<400> SEQUENCE: 183

Met Val Met Gly Thr Gln Pro Ser Leu Glu Glu Ile Arg Lys Ala Gln
1               5                   10                  15

Arg Ala Asp Gly Pro Ala Gly Ile Leu Gly Ile Gly Thr Ala Asn Pro
            20                  25                  30
```

-continued

```
Ala Asn His Val Ile Gln Ala Glu Tyr Pro Asp Tyr Tyr Phe Arg Ile
        35                  40                  45

Thr Asn Ser Glu His Met Thr Asp Leu Lys Glu Lys Phe Lys Arg Met
    50                  55                  60

Cys Asp Lys Ser Met Ile Arg Lys Arg His Met His Leu Thr Glu Glu
65                  70                  75                  80

Phe Leu Lys Glu Asn Pro Asp Met Cys Ala Tyr Met Ala Pro Ser Leu
                85                  90                  95

Asp Val Arg Gln Asp Ile Val Val Val Glu Val Pro Lys Leu Gly Lys
            100                 105                 110

Glu Ala Ala Val Lys Ala Ile Lys Glu Trp Gly Gln Pro Lys Ser Lys
        115                 120                 125

Ile Thr His Val Val Phe Cys Thr Thr Ser Gly Val Asp Met Pro Gly
    130                 135                 140

Ala Asp Tyr Gln Leu Thr Lys Leu Leu Gly Leu Arg Pro Ser Val Lys
145                 150                 155                 160

Arg Leu Met Met Tyr Gln Gln Gly Cys Tyr Ala Gly Gly Thr Val Leu
                165                 170                 175

Arg Leu Ala Lys Asp Leu Ala Glu Asn Asn Arg Gly Ala Arg Val Leu
            180                 185                 190

Val Val Cys Ser Glu Ile Thr Ala Val Thr Phe Arg Gly Pro Ser Asp
        195                 200                 205

Thr His Leu Asp Ser Leu Val Gly Gln Ala Leu Phe Ser Asp Gly Ala
    210                 215                 220

Ala Ala Leu Ile Val Gly Ala Asp Pro Asp Ala Ser Val Gly Glu Lys
225                 230                 235                 240

Pro Ile Phe Glu Met Val Ser Ala Ala Gln Thr Ile Leu Pro Asp Ser
                245                 250                 255

Asp Gly Ala Ile Asp Gly His Leu Arg Glu Val Gly Leu Thr Phe His
            260                 265                 270

Leu Leu Lys Asp Val Pro Gly Leu Ile Ser Lys Asn Ile Glu Lys Ser
        275                 280                 285

Leu Glu Glu Ala Phe Lys Pro Leu Gly Ile Ser Asp Trp Asn Ser Leu
    290                 295                 300

Phe Trp Ile Ala His Pro Glu Gly Pro Ala Ile Leu Asp Gln Val Glu
305                 310                 315                 320

Leu Lys Leu Gly Leu Lys Glu Glu Lys Met Arg Ala Thr Arg His Val
                325                 330                 335

Leu Ser Glu Tyr Gly Asn Met Ser Ser Ala Cys Val Leu Phe Ile Met
            340                 345                 350

Asp Glu Met Arg Arg Lys Ser Lys Glu Asp Gly Val Ala Thr Thr Gly
        355                 360                 365

Glu Gly Leu Glu Trp Gly Val Leu Phe Gly Phe Gly Pro Gly Leu Thr
    370                 375                 380

Val Glu Thr Val Val Leu His Ser Val Pro Val
385                 390                 395
```